US005444763A

United States Patent [19]

Lazaridis et al.

[11] Patent Number: 5,444,763

[45] Date of Patent: Aug. 22, 1995

[54] TRANSLATION AND CONNECTION DEVICE FOR RADIO FREQUENCY POINT OF SALE TRANSACTION SYSTEMS

[75] Inventors: Mihal Lazaridis; Michael A. Barnstijn, both of Waterloo, Canada

[73] Assignee: Research In Motion Limited, Waterloo, Canada

[21] Appl. No.: 78,418

[22] Filed: Jun. 27, 1993

[51] Int. Cl.[6] .......................... H04M 11/00; G06K 5/00

[52] U.S. Cl. .......................................... 379/58; 235/380

[58] Field of Search ..................... 379/91, 98, 100, 99, 379/58, 59; 235/380, 381, 375

[56] References Cited

U.S. PATENT DOCUMENTS 4,122,304 10/1978 Mallien, II .
4,220,820 9/1980 Mallien, II .
4,508,935 4/1985 Mastromoro .
4,549,302 10/1985 Heatherington .
4,617,423 10/1986 Dickerson et al. .
4,658,096 4/1987 West, Jr. et al. .
4,665,519 5/1987 Kirchner et al. .
4,718,080 1/1988 Serrano et al. .
4,737,975 4/1988 Shafer .
4,751,726 6/1988 Hepp et al. .
4,775,997 10/1988 West, Jr. et al. .
4,835,372 5/1989 Gombrich et al. .
4,837,812 6/1989 Takahashi et al. .................. 379/100
4,845,740 7/1989 Tokuyama et al. .
4,852,122 7/1989 Nelson et al. .
4,857,716 8/1989 Gombrich et al. .
4,940,976 7/1990 Gastouniotis et al. .
4,955,050 9/1990 Yamauchi .
4,959,851 9/1990 Tobolski, Jr. et al. .
4,972,504 11/1990 Daniel, Jr. et al. .
5,115,463 5/1992 Moldavsky et al. .................. 379/58
5,208,446 5/1993 Martinez ............................. 235/380
5,220,593 6/1993 Zicker et al. ......................... 379/59
5,297,196 3/1994 Yamada et al. ........................ 379/99
5,310,997 5/1994 Roach et al. ......................... 235/375

FOREIGN PATENT DOCUMENTS 1175933 10/1984 Canada .
WO9014729 11/1990 WIPO .

*Primary Examiner*—Curtis Kuntz
*Assistant Examiner*—Michael B. Chernoff
*Attorney, Agent, or Firm*—Jones, Day, Reavis & Pogue

[57] ABSTRACT

A device is provided that interfaces with existing point of sale credit card reading devices, and furnishes the option of transmitting data over either the existing modem installation or a radio frequency data communication network. The device scans the information encoded on the credit card to determine which data transmission path is appropriate for a particular transaction. The device software generates the necessary signals to simulate the normal interaction between the POS cardreader device and a modem. The software also converts between serial and packetized data in order to request and receive credit card purchase authorizations over the radio frequency data communication network.

7 Claims, 2 Drawing Sheets

TRANSLATION AND CONNECTION DEVICE FOR RADIO FREQUENCY POINT OF SALE TRANSACTION SYSTEMS

BACKGROUND OF THE INVENTION

This application relates to the art of employing radio frequency data communication networks to effect point of sale ("POS") transactions. The invention is particularly applicable to credit card transactions common to retail sales operations, although it will be appreciated that the invention has broader applicability to any transaction that requires the transmission and verification of coded data.

Various types of communication networks have evolved in response to increasing needs for information exchange. Among the more familiar types of communication networks are cellular telephone technology and modem technology. The former is primarily oriented to voice communication, and the latter to more general data transmission such as between computers or fax machines. Both technologies employ the existing infrastructure of fixed telephone lines, and the fees associated with the use of these networks are accrued according to the amount of time that a user is connected to a telephone line.

Recently another type of data communication network has emerged, which enables information exchange by the sending and receiving of data through high frequency radio signals. The radio frequency data communication networks require a new infrastructure of receiving and transmitting stations connected to regional and national control centers. This control hierarchy provides the wide geographical coverage that enables the reception and re-transmission of signals beyond the range of the individual user/transmitters.

Such network infrastructures are provided, in the United States, by the Mobitex network, owned and operated by RAM Mobile Data and by Ardis, a joint venture of Motorola and IBM. Both networks employ packet switched data transmission, which aggregates digital data into packets that are then transmitted in radio frequency bursts. The fees for usage of the data communication network are then charged according to the number of data packets transmitted by the users.

The technology for POS credit transactions is also well known. A prospective credit purchaser moves a credit card through a card reader slot or manually enters a number, thereby supplying information concerning the account number of the card holder. This account number, along with the amount of the contemplated purchase, is transmitted to a central authorization center. The approval or disapproval of the transaction by a "host device" at the authorization center is then transmitted back from the authorization center to the POS.

Existing POS equipment receives and transmits data over telephone lines, using modem technology. Modems use a streaming or bit by bit serial data transmission. Moreover, in stores with many checkout counters or registers, the POS devices are "daisy-chained" or series connected to a limited number of telephone lines. During high volume periods a queuing problem develops that creates undesirable delays in obtaining individual authorizations.

POS devices equipped to utilize a radio frequency data communication network would increase the speed of data transmission and eliminate or substantially reduce high volume queuing problems. The radio frequency data communication network, transmitting at approximately 8,000 bits/sec., can quite quickly accommodate a data packet and clear the channel for other traffic. Also, at this stage of its development, the network has excess transmission capacity that further contributes to faster transmission.

Existing POS devices, however, are designed to communicate with modems, using serial data transmission algorithms such as the Mastercard Automated Point-Of-Sale Program ("MAPP"). Devices equipped to transmit data packets over a radio frequency data communication network are designed to communicate using other algorithms, such as the Mobitex Asychronous Communication ("MASC") algorithim.

Moreover, a wholesale conversion to new POS devices dedicated to operating with the radio frequency data communication networks is not practical at this time. Some credit card companies, which have not yet affiliated with radio frequency data communication networks, may not be connected to the networks at the authorization centers. Many retailers may also wish to retain the option of employing existing modem lines rather than switching entirely to radio frequency data transmission.

Thus, there is a need to transmit and receive POS transaction data over radio frequency data communication networks in conjunction with existing POS card readers. There is also a concomitant need to maintain an option to utilize an existing modem link, either upon recognition of a particular type of credit card, or at the external command of a POS user.

SUMMARY OF THE INVENTION

The present invention provides dual communication capability between a POS user and various credit card authorization centers. Upon receiving a transaction request from a POS terminal, the translation and connection device examines the data from the terminal for a radio frequency network account number embedded between two characters known as delimiters. If such an account number is present, communication control is directed to the translator, which receives serial input data from the POS device, generates the required signals back to the POS device, and assembles the serial data into data packets for transmission over the radio frequency communication network. If no delimiters are present, the translation and connection device examines the telephone number generated by the card swipe to determine if it corresponds to a radio frequency account number in a preprogrammed translation table. If so, the device similarly transfers communication control to the radio frequency translator.

In the absence of either type of indication that a radio frequency transmission is desired, communication is directed to the existing modem installation. Similarly, if the logic board that implements the invention is powered down, communication is directed to the modem.

When the radio frequency data communication network is utilized, the software logic translates from serial data to packetized data while transmitting to the authorization center, and from packetized to serial data when receiving and conveying the results of the authorization inquiry back to the POS device. The software also generates the required signals to simulate normal interaction between the POS device and a modem. Thus, no modification is required to an existing POS device to enable it to interact with the invention.

DESCRIPTION OF PREFERRED EMBODIMENT

Figure 1:
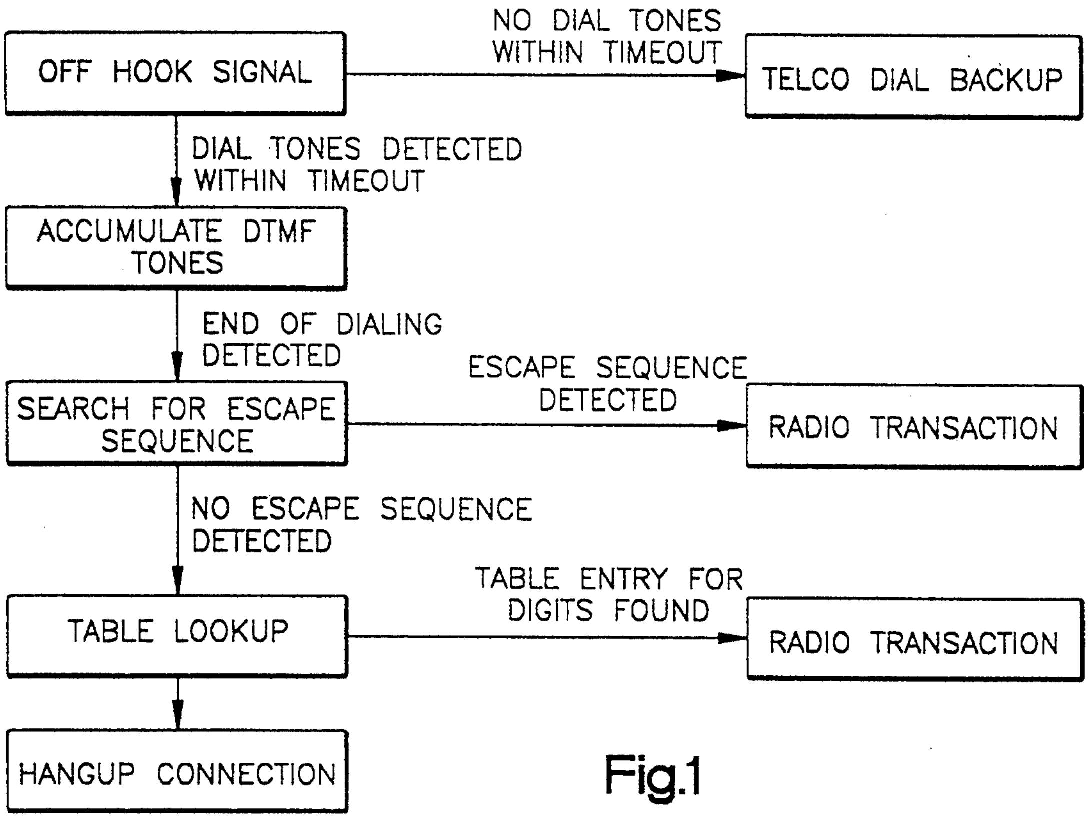
FIG. 1 is a simplified flowchart showing the switching logic that allows the invention to direct information flow either to a modem or to a radio frequency transmitter/receiver.

As shown in FIG. 1, the operation sequence of the invention is initiated by an "off hook" signal from the POS device. This signal initiates a timer sequence. If the elapsed time between the receipt of an off-hook signal and the first Dual Tone Multi-Frequency ("DTMF") tone signalling data from the POS device exceeds a configurable delay parameter, the transaction is to be conducted by modem. Accordingly, the invention directs the transaction data from the POS device to the telephone modem for normal transmission. If the first Dual Tone Multi-Frequency ("DTMF") tone falls within the configurable delay, however, the invention accumulates the tones for processing.

Some credit cards, intended for use with the radio frequency data communication network, will cause the POS device to transmit an account number for network usage. The beginning and end of this account number are signaled by preprogrammed delimiters. In the preferred embodiment, these delimiters correspond to pound signs on a touch tone telephone, but generally could be any sequence of DTMF characters. If such an account number is detected between delimiters, the invention directs the information flow from the POS device to the radio frequency data communication network by means of a radio frequency transmitter. This operation is known as the escape sequence.

If no account number is present between delimiters, the system logic examines the telephone number transmitted by the POS device. This telephone number would ordinarily be the number used to reach the authorization center in a modem transaction. The logic checks a translation table created by the user to determine whether the telephone number corresponds to a known account for the radio frequency data communication network. If so, the information flow is again directed to the network. Should no account number be found in the translation table, the system generates a "hang-up signal," signifying a failed authorization inquiry.

The system logic assumes that a POS user will desire to use the radio frequency option for those credit cards that will allow it. A user can, however, remove system power from the connection and translation device. In that event a relay will direct the information flow to the telephone modem.

The hardware implementation of the translation and connection device consists of a single microprocessor and supporting peripheral devices. Specifically, the invention employs an Intel 80C188EB microprocessor, an EEPROM (Nat. Semiconductor part no. 93C66), an INTEL FLASH ROM, a static RAM (various manufacturers), a DTMF tone decoder chip (Motorola part no. MC145436), and a Sicicon System Modem Chip (part no. 73K222).

Figure 2:
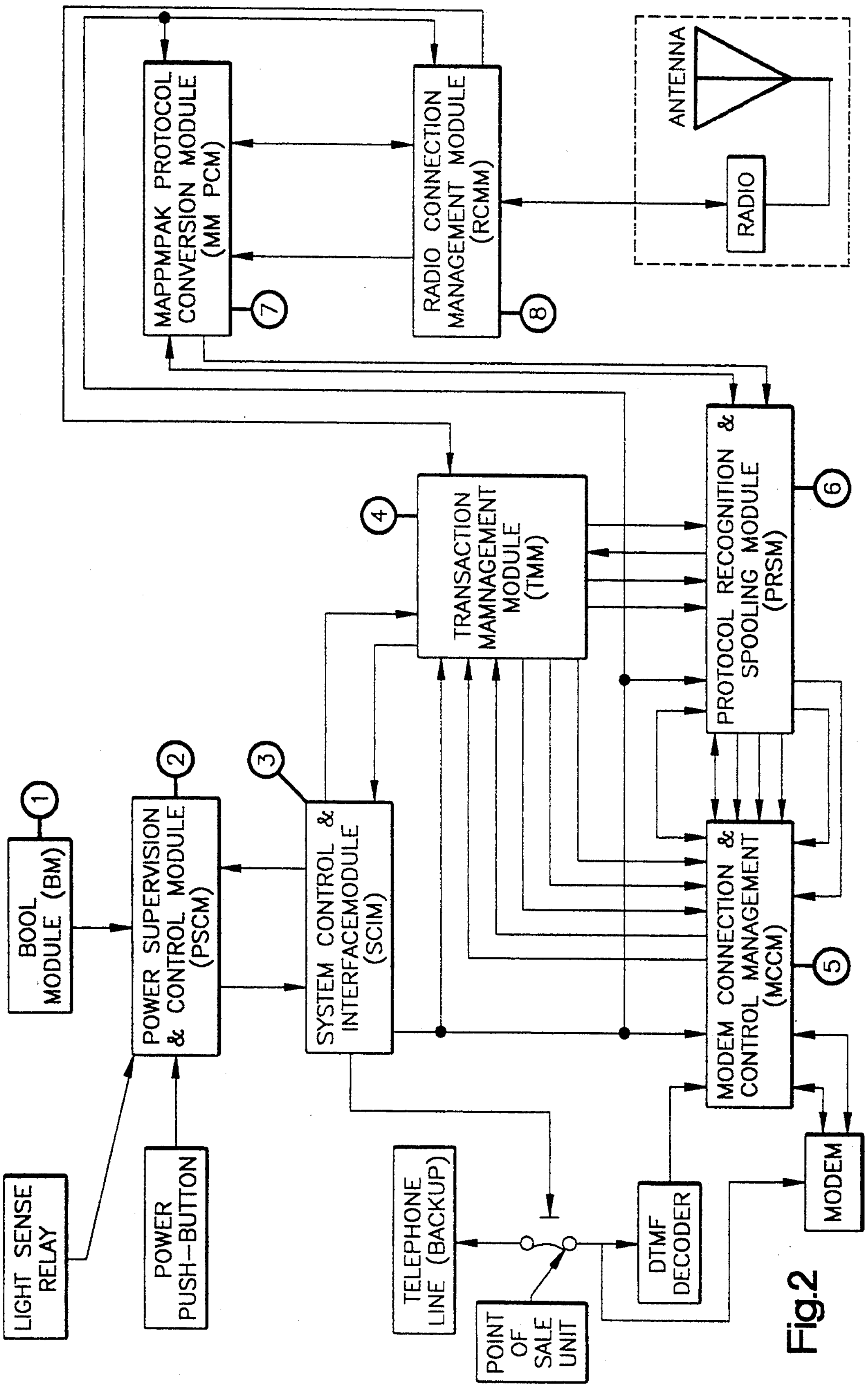
FIG. 2 is a block diagram showing the structure of the logic software design.

FIG. 2 illustrates the main software modules that constitute the system logic for the invention. The Boot Module ("BM") 1 is given initial control of the system, and determines whether the invention is to proceed in operational mode or reprogramming mode. The code necessary to implement the Boot Module is found in Appendix A.

The BM contains algorithms to communicate with a reloading program, as required. The reloading program has the ability to reprogram the remainder of the software under direction of an external computer. In the absence of a signal from a reloading program, the BM verifies the integrity of the remaining software by running a checksum operation. Upon validation of such a checksum, the BM transfers control to the PSCM 2. The code necessary to implement the PSCM is found in Appendix B.

The System Control and Interface Module ("SCIM") 3 is initialized by a signal from the PSCM, once the PSCM has determined that the invention is to be in operational mode. The SCIM is implemented as a standard multi-tasking scheduler, a programming technique well known in the field. The code necessary to implement the SCIM is found in Appendix C. The SCIM provides other modules in the system with timing signals for sequencing of their own periodic events, as well as state transitions.

The SCIM monitors the status of external hardware signals. The pressing of the "system on" switch causes the SCIM to either initiate a power down sequence if the unit is operational, or restore the system to operational state if the unit is off. The SCIM also detects an off-hook condition in the POS device, which signals the initiation of an authorization request. When hardware events are detected, such as "off-hook" and "system on" conditions, the SCIM sends corresponding signals to other application modules, as shown on FIG. 2, so that the correct actions may be taken.

The Transaction Management Module ("TMM") 4 receives a signal from the SCIM that indicates the POS device has gone off hook. This event starts the sequence of events that comprise a transaction sequence. In addition to the off-hook signal, the TMM receives signals from, the Modem Control and Connection Management Module ("MCCMM"), the Protocol Recognition and Spoofing Module ("PRSM"), and the Radio Connection Management Module ("RCCM"). The code necessary to implement the TMM, MCCMM, PRSM, and RCCM is found in Appendices D, E, F, and G respectively.

The Modem Control and Connection Management Module ("MCCMM") 5 receives signals from the Dual Tone Multi Frequency ("DTMF") decoder chip located on the circuit board of the invention, and uses these signals to recognize digits dialed by the POS device. DTMF digits are accumulated until a termination condition occurs, and then interpreted to be either a telephone number or a radio frequency data communication network account number. A termination condition occurs in the DTMF digits when one of the following events occurs: (a) the digits contain a time gap greater than a predetermined length, or (b) the digits contain two escape sequence delimiters (#'s in the preferred embodiment). If termination condition (a) occurs, telephone numbers are translated using the translation table. If termination condition (b) occurs, the digits between the two delimiters are verified to be a valid account number. All account numbers are checked for the correct number of digits. The MCCMM signals the TMM to ignore or accept the attempted transaction based on whether the accumulated DTMF characters correspond to a valid account number.

Failure to translate or to present a correct account number is signaled to the TMM, which causes the invention to terminate the attempted transaction. Correctly translated telephone numbers or correct account numbers are also signaled to the TMM.

The MCCMM contains software logic responsible for initiating modem handshake signals, and signals that establish and maintain the modem connection. This signal generation is referred to as local acknowledgement of the POS data. The modem connection is used for transferring the specific transaction request information between the POS terminal and the invention. The MCCMM provides the modem transmit and receive functions.

After the DTMF digits are received, the TMM signals the MCCMM to begin the modem handshaking process, and the MCCMM, in turn, signals the TMM with a success or failure status. The TMM can also send a signal to the MCCMM to drop the modem connection. If the modem connection is lost, the MCCMM signals the TMM of the condition and waits for the next TMM request to establish a new connection.

The Protocol Recognition and Spoofing module ("PRSM") 6 simulates a modem connection to the authorization center. The TMM signals the PRSM to begin a transaction attempt, and can also signal the termination of an attempt. The PRSM signals the TMM of the receipt of correct serial data that can be aggregated into a data packet.

The PRSM module must generate ENQ signals that will cause the POS device to begin the transaction. The PRSM must also respond with ACK, NAK, or EOT characters that the POS requires in the course of the transaction. It then forwards the serial data to the M/M PCM for transmission. All transaction timeouts, including timeouts to receive a reply from the radio frequency data network, are implemented by the PRSM. When the transaction is complete, the PRSM signals the MCCMM to drop the modem connection.

The MAPP/MPAK Protocol Conversion Module ("M/M PCM") 7 monitors the status of the radio link connections and provides packet transmit and receive functions to the transmitter module. The code necessary to implement the M/M PCM is found in Appendix H. The state machine for this module transmits the transaction request over the radio link at the request of the M/M PCM and then awaits the expected response.

If either the radio network or the authorization center is unable to receive the transaction request, the radio network will return the request as a returned packet. The M/M PCM identifies this situation, and manages retransmission attempts.

If the data packet from the authorization center contains a correct reply to a transaction request, then the data packet is stored and the PRSM is signalled. The PRSM can then obtain the response from the M/M PCM and send it to the POS device.

The Radio Connection Management Module ("RCMM") 8 communicates with the system radio transmitter/receiver through a RS-232c asynchronous data link to the radio (MASC in the preferred embodiment). This module provides initialization, termination, status request, send packet, and receive packet functions to other modules. The RCCM manages the complexities of the radio frequency data communication link, including status requests, and the required identification and acknowledgment functions to the radio link, and receives all packetized data from the radio connection. The preferred embodiment employs the MASC specification. The design of interface software for this specification is well known in the industry.

This completes the description of the software logic modules. The code for a library of support files, called up as needed by the other modules, is found in Appendix I.

Figure 3:
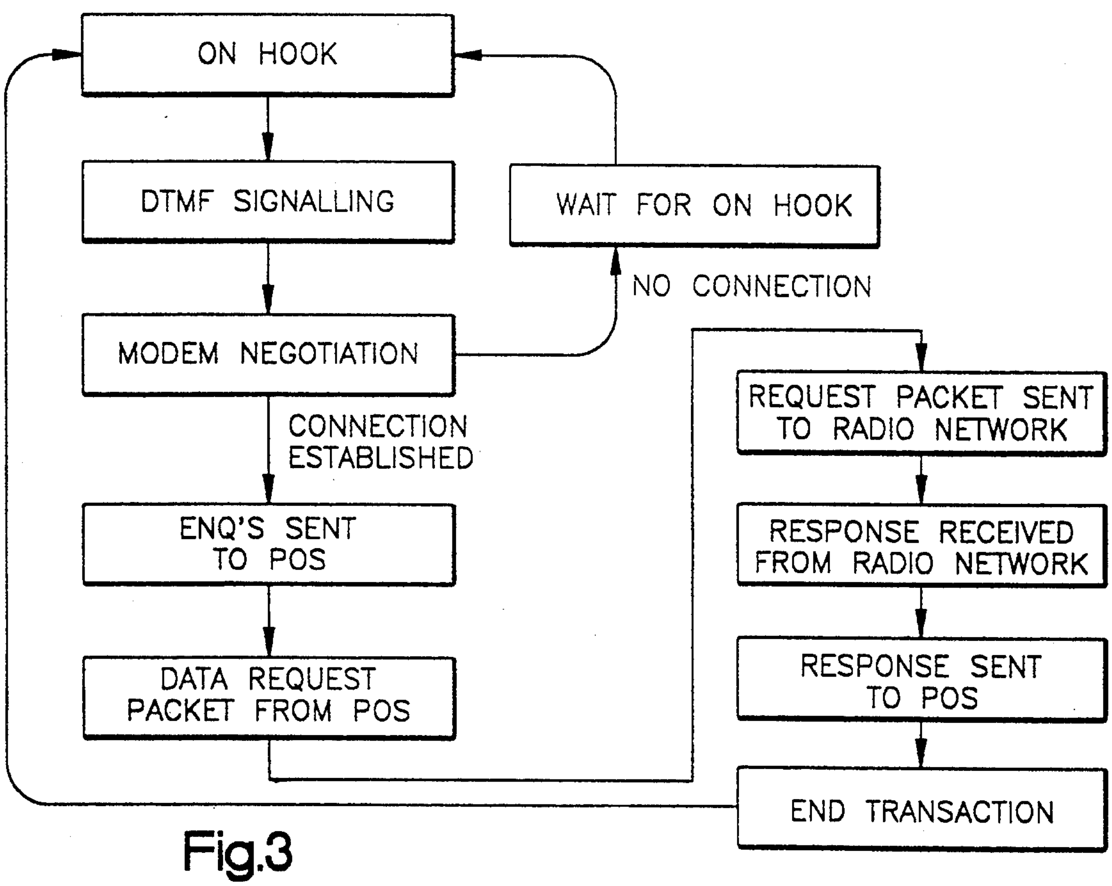
FIG. 3 is a state diagram showing the progress of a normal POS transaction through the system logic.

The normal transaction progresses through a series of states, each state entered upon meeting the required end conditions of the previous state. Additionally, other events, such as the POS device going on-hook, will cause the state progression of the transaction "state machine" to return to a former state. The normal transaction flow is illustrated in FIG. 3. From an On Hook state, the POS terminal requests a transaction by going off hook. The POS device also begins dialing DTMF digits to indicate the intended routing of the transaction request. Following the DTMF tones is a modem negotiation sequence, whereby the modem chip on the translation and connection device and the POS device establish and verify their data connection. If the modem negotiation sequence can not be completed successfully, no connection is established, and the system waits for the POS terminal to time-out and go back on hook.

If the modem connection sequence is completed successfully, ENQ signals are sent to the POS device, inviting the POS device to send data. When the complete request is received from the POS device it is translated and sent over the radio network to the appropriate transaction host at an authorization center. The transaction host sends a response back over the radio network, and the received packet is translated and sent to the POS device. The transaction is completed when the POS terminal receives this response packet and goes back on hook.

The foregoing description of a preferred embodiment and alternative embodiments of the invention have been presented for purposes of illustration and description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

BOOT MODULE (APPENDIX A)

```
typedef unsigned int uint;
typedef unsigned char   uchar;
typedef unsigned char   byte;
typedef long int        MAN;
typedef short int       boolean;

typedef int             DataHandle;
typedef int             SessionHandle;
typedef int             TransportHandle;
typedef int             TransportDataHandle;
typedef int             TimerHandle;

typedef char *          SessionParameterString;
typedef volatile unsigned char far *    far_str;
#define inCS _based(_segname("_CODE"))

#ifndef NULL
#define NULL (char *) 0
#endif

#ifndef TRUE
#define FALSE   0
#define TRUE    (~FALSE)
#endif

#define MAX_NUM_DATA_COMP_ALGOR 16
#define MAX_MAN_LIST            8
#define MAX_ADDR_LIST           8
#define MAX_PSSW_LEN            8
```

File: include\BASETYPE.HB

```
Uint                      equ     <WORD>
Uchar                     equ     <BYTE>
MAN                       equ     <DWORD>
boolean                   equ     <BYTE>
tristate                  equ     <BYTE>

DataHandle                equ     <WORD>
SessionHandle             equ     <WORD>
TransportHandle           equ     <WORD>
TransportDataHandle       equ     <WORD>
TimerHandle               equ     <WORD>
TransportType             equ     <WORD>
Protoocol                 equ     <WORD>
Timestamp                 equ     <WORD>
SessionParameterString    equ     <WORD>  ;char*

MAX_SIGNED_INT            equ     32767
MAX_UNSIGNED_INT          equ     65535

NULL                      equ     0
FALSE                     equ     0
TRUE                      equ     1
FLOATING                  equ     -1

MAX_NUM_DATA_COMP_ALGOR   equ     16
MAX_MAN_LIST              equ     8
MAX_ADDR_LIST             equ     8
MAX_PSSW_LEN              equ     8
```

File: include\BASETYPE.INB

Page 1    16 JUN 93  07:21 PM

Page 1 16 JUN 93 07:21 PM

```
typedef enum {
    DIVIDE_0,     SINGLES_STEP,  NMI,            BREAKPOINT,
    OVERFLOW,     ARRAY_BOUNDS,  UNUSED_OPCODE,  ESC_OPCODE,
    TIMER_0,      RESERVED_9,    RESERVED_10,    RESERVED_11,
    INT0,         INT1,          INT2,           INT3,
    COPROCESSOR,  INT4,          TIMER1,         TIMER2,
    SERIAL0_REC,  SERIAL0_XMIT,  RESERVED_22,    /* ... */
    RESERVED_31=31,
    FIRST_USER=32
    } Interrupts;

/* interrupt control registers */

/* EOI register 0x02, Polling, 0x04 - 0x06, */
#define INT_REQ_VEC_TYPE      0x001F    /* 4,3,2,1,0 */
#define NSPEC_EOI_ENABLE      0x8000
#define INTERRUPT_PENDING     0x8000

/* Priority mask 0x0A - use PRIORITY from Interrupt Control */
/* Interrupt Control - Serial, Timers, int0 to int4 - 0x12 - 0x1E */
#define PRIORITY        0x07
#define DISABLE         0x08
#define EDGE_LEVEL      0x10    /* not Serial or Timer */
#define CASCADE         0x20    /* int0, int1 only */
#define NESTING         0x40    /* int0, int1 only */

/* Interrupt Request, Mask, Inservice - 0x0E, 0x08, 0x0C,  */
#define TIMER_PENDING  0x01
#define SERIAL_PENDING 0x04
#define INT0_4_PENDING 0xF8     /* 3,2,1,0,4 */
#define INT1_4_PENDING 0xE8

/* Interrupt Status register - 0x10 */
#define TIMER0_REQUEST  0x01
#define TIMER1_REQUEST  0x02
#define TIMER2_REQUEST  0x04
#define SERIAL_RECEIVE  0x08
#define SERIAL_TRANSMIT 0x10
```

File: include\INTERRUP.HB

```
; interrupt offsets into the table at the beginning of memory
DIVIDE_0        equ 00h
SINGLES_STEP    equ 04h
NMI             equ 08h
BREAKPOINT      equ 0Ch
OVERFLOW        equ 10h
ARRAY_BOUNDS    equ 14h
UNUSED_OPCODE   equ 18h
ESC_OPCODE      equ 1Ch
TIMER_0         equ 20h
RESERVED_9      equ 24h
RESERVED_10     equ 28h
RESERVED_11     equ 2Ch
INT0            equ 30h
INT1            equ 34h
INT2            equ 38h
INT3            equ 3Ch
COPROCESSOR     equ 40h
INT4            equ 44h
TIMER_1         equ 48h
TIMER_2         equ 4Ch
SERIAL0_REC     equ 50h
SERIAL0_XMIT    equ 54h
RESERVED_22     equ 58h
; ...
RESERVED_31     equ 7Ch
FIRST_USER      equ 80h

; interrupt control registers

; EOI register 0x02, Polling, 0x04 - 0x06,
INT_REQ_VEC_TYPE        equ     001Fh   ; 4,3,2,1,0
NSPEC_EOI_ENABLE        equ     8000h
INTERRUPT_PENDING       equ     8000h
;
; Priority mask 0x0A - use PRIORITY from Interrupt Control
; Interrupt Control - Serial, Timers, int0 to int4 - 0x12 - 0x1E
PRIORITY        equ     07h
DISABLE         equ     08h
EDGE_LEVEL      equ     10h     ; not Serial or Timer
CASCADE         equ     20h     ; int0, int1 only
NESTING         equ     40h     ; int0, int1 only

; Interrupt Request, Mask, Inservice - 0x0E, 0x08, 0x0C,
TIMER_PENDING   equ     01h
SERIAL_PENDING  equ     04h
INT0_4_PENDING  equ     0F8h    ; 3,2,1,0,4

; Interrupt Status register - 0x10
TIMER0_REQUEST  equ     01h
TIMER1_REQUEST  equ     02h
TIMER2_REQUEST  equ     04h
SERIAL_RECEIVE  equ     08h
SERIAL_TRANSMIT equ     10h

; various interrupt priorities
AUTOBAUD        equ     02h
SYS_CLOCK       equ     03h
SERIAL_SCC      equ     04h
SERIAL_ONBOARD  equ     05h
```

```
/* function (or non-function) definitions */
#ifdef MPC
extern void TurnLEDon( byte mask );
extern void TurnLEDoff( byte mask );
extern void ToggleLED( byte mask );
#else
#define TurnLEDon( mask )
#define TurnLEDoff( mask )
#define ToggleLED( mask )
#endif

/* and the actual LEDs as well */
#define RADIORX 0x20
#define RADIOTX 0x10
#define CONTACT 0x40
#define ON_LINE 0x80
```

```
extrn   TurnLEDon:proc
extrn   TurnLEDoff:proc
extrn   ToggleLED:proc

RADIORX         equu    20h
RADIOTX         equ     10h
CONTACT         equ     40h
```

File: include\LEDS.INB

```
#include "pcb.hb"  // for LED_START

/* the following are fixed locations in the memory map */
#define RAM_START       0x0000u
#define RAM_SIZE        0x0800u /* 32k */
#define RAM1_START      0x0800u
#define RAM1_SIZE       0x0800u /* 32k */
#define FLASH_START     0xE000u /* split flash (part of boot) */
#define FLASH_SIZE      0x1800u /* application is only 96k long */
#define SIXTY_FOUR_K    0x1000u

#define BOOT_START      0xE000u
#define BOOT_SIZE       0x2000u /* 128K */

#define SERIAL_START    0x00C0u /* for the SCC */
#define SERIAL_SIZE     0x0040u /* a big 4 bytes - call it 64 bytes */

#define PCB_START       0xFF00u /* leave it there in the I/O space*/
#define PCB_SIZE        0x0100u

#define LED_START       0x0040u
#define LED_SIZE        0x0040u /* a big 1 byte - call it 64 bytes */

#define MODEM_START     0x0080u
#define MODEM_SIZE      0x0040u

#define DTMF_START      0x00C0u
#define DTMF_SIZE       0x0040u
```

File: include\MEM_MAP.HB

Page 1 16 JUN 93 07:21 PM

```
INCLUDE pcb.inc

RAM_START       equ     00000h
RAM1_START      equ     00800h
FIRST_FLASH     equ     0E000h

FLASH_START     equ     0E000h

BOOT_START      equ     0E000h
BOOT_SIZE       equ     02000h  ; 128k

SERIAL_START    equ     000C0h  ; for the SCC
SERIAL_SIZE     equ     00040h  ; a big 7 bytes - call it 64 bytes

PCB_START       equ     0FF00h  ; leave it there in the I/O space
PCB_SIZE        equ     00100h

LED_START       equ     040h
LED_SIZE        equ     040h

MODEM_START     equ     080h
MODEM_SIZE      equ     040h

DTMF_START      equ     0C0h
DTMF_SIZE       equ     040h
```

```
#define CPU_CLOCK  5529600L

/* The following are BYTE offsets into the PCB */
#define PCB_BASE        0xFF00u /* in the IO space */

#define INTERRUPTS      0x02
//--------------------------
#define END_OF_INT      0x02
#define POLL            0x04
#define POLL_STATUS     0x06
#define INTERRUPT_MASK  0x08
#define PRIORITY_MASK   0x0A
#define IN_SERVICE      0x0C
#define INT_REQUEST     0x0E
#define INT_STATUS      0x10
#define TIMER_CONTROL   0x12
#define SERIAL_CONTROL  0x14
#define INT4_CONTROL    0x16
#define INT0_CONTROL    0x18
#define INT1_CONTROL    0x1A
#define INT2_CONTROL    0x1C
#define INT3_CONTROL    0x1E


#define TIMERS          0x30
//--------------------------
#define TIMER0_COUNT    0x30
#define TIMER0_COMPAREA 0x32
#define TIMER0_COMPAREB 0x34
#define TIMER0_CONTROL  0x36
#define TIMER1_COUNT    0x38
#define TIMER1_COMPAREA 0x3A
#define TIMER1_COMPAREB 0x3C
#define TIMER1_CONTROL  0x3E
#define TIMER2_COUNT    0x40
#define TIMER2_COMPAREA 0x42
#define TIMER2_CONTROL  0x46


#define PORT            0x50
//--------------------------
#define PORT1_DIR       0x50
#define PORT1_PIN       0x52
#define PORT1_CONTROL   0x54
#define PORT1_LATCH     0x56
#define PORT2_DIR       0x58
#define PORT2_PIN       0x5A
#define PORT2_CONTROL   0x5C
#define PORT2_LATCH     0x5E


#define SERIAL          0x60
//--------------------------
#define SERIAL0_BAUD    0x60
#define SERIAL0_COUNT   0x62
#define SERIAL0_CONTROL 0x64
#define SERIAL0_STATUS  0x66
#define SERIAL0_RBUF    0x68
#define SERIAL0_TBUF    0x6A
#define SERIAL1_BAUD    0x70
#define SERIAL1_COUNT   0x72
#define SERIAL1_CONTROL 0x74
#define SERIAL1_STATUS  0x76
#define SERIAL1_RBUF    0x78
#define SERIAL1_TBUF    0x7A


#define CHIP_SELECT     0x80
//--------------------------
#define GCS_START(x)    (0x80+(unsigned)((x)<<2))
#define GCS_STOP(x)     (0x82+(unsigned)((x)<<2))
#define LCS_START       0xA0
#define LCS_STOP        0xA2
#define UCS_START       0xA4
#define UCS_STOP        0xA6
#define RELOCATION      0xA8


#define REFRESH_ETC     0xB0
//--------------------------
#define REFRESH_BASE    0xB0
#define REFRESH_TIME    0xB2
#define REFRESH_CONTROL 0xB4
#define REFRESH_ADDRESS 0xB6
#define POWER_CONTROL   0xB8
#define STEP_ID         0xBC
```

```
; The following are BYTE offsets into the PCB
PCB_BASE          equ      OFF00h  ; in the IO space


INTERRUPTS        equ       002h
;----------------------------
END_OF_INT        equ       002h
POLL              equ       004h
POLL_STATUS       equ       006h
INTERRUPT_MASK    equ       008h
PRIORITY_MASK     equ       00Ah
IN_SERVICE        equ       00Ch
INT_REQUEST       equ       00Eh
INT_STATUS        equ       010h
TIMER_CONTROL     equ       012h
SERIAL_CONTROL    equ       014h
INT4_CONTROL      equ       016h
INT0_CONTROL      equ       018h
INT1_CONTROL      equ       01Ah
INT2_CONTROL      equ       01Ch
INT3_CONTROL      equ       01Eh


TIMERS            equ       030h
;----------------------------
TIMER0_COUNT      equ       030h
TIMER0_COMPAREA   equ       032h
TIMER0_COMPAREB   equ       034h
TIMER0_CONTROL    equ       036h
TIMER1_COUNT      equ       038h
TIMER1_COMPAREA   equ       03Ah
TIMER1_COMPAREB   equ       03Ch
TIMER1_CONTROL    equ       03Eh
TIMER2_COUNT      equ       040h
TIMER2_COMPAREA   equ       042h
TIMER2_CONTROL    equ       046h


PORT              equ       050h
;----------------------------
PORT1_DIR         equ       050h
PORT1_PIN         equ       052h
PORT1_CONTROL     equ       054h
PORT1_LATCH       equ       056h
PORT2_DIR         equ       058h
PORT2_PIN         equ       05Ah
PORT2_CONTROL     equ       05Ch
PORT2_LATCH       equ       05Eh


SERIAL            equ       060h
;----------------------------
SERIAL0_BAUD      equ       060h
SERIAL0_COUNT     equ       062h
SERIAL0_CONTROL   equ       064h
SERIAL0_STATUS    equ       066h
SERIAL0_RBUF      equ       068h
SERIAL0_TBUF      equ       06Ah
SERIAL1_BAUD      equ       070h
SERIAL1_COUNT     equ       072h
SERIAL1_CONTROL   equ       074h
SERIAL1_STATUS    equ       076h
SERIAL1_RBUF      equ       078h
SERIAL1_TBUF      equ       07Ah


CHIP_SELECT       equ       080h
;----------------------------
GCS0_START        equ       080h
GCS0_STOP         equ       082h
GCS1_START        equ       084h
GCS1_STOP         equ       086h
GCS2_START        equ       088h
GCS2_STOP         equ       08Ah
GCS3_START        equ       08Ch
GCS3_STOP         equ       08Eh
GCS4_START        equ       090h
GCS4_STOP         equ       092h
GCS5_START        equ       094h
GCS5_STOP         equ       096h
GCS6_START        equ       098h
GCS6_STOP         equ       09Ah
GCS7_START        equ       09Ch
GCS7_STOP         equ       09Eh
LCS_START         equ       0A0h
LCS_STOP          equ       0A2h
UCS_START         equ       0A4h
UCS_STOP          equ       0A6h
RELOCATION        equ       0A8h


REFRESH_ETC       equ       0B0h
;----------------------------
REFRESH_BASE      equ       0B0h
REFRESH_TIME      equ       0B2h
REFRESH_CONTROL   equ       0B4h
REFRESH_ADDRESS   equ       0B6h
POWER_CONTROL     equ       0B8h
STEP_ID           equ       0BCh
```

```
/* interrupt control registers */

/* EOI register (0x02) */
#define INT_REQ_VEC_TYPE     0x001F   /* 0-4 */
#define NSPEC_EOI_ENABLE     0x8000

/* 0x04, 0x06 - bottom bits are the same and we have */
#define IREQ_PRESENT         0x8000

/* 0x08, 0x0c, 0x0e */
#define TIMER                0x0001

/* Chip select units - 0x80 - 0xA7 (by 4s) */
#define ADDRESS_MASK         0xFFC0u
#define ADDRESS_SHIFT          0x04   /* mask = (address>>4)&0xFFC0 */
#define WAIT_STATES            0x0F
#define SELECT_ENABLE          0x08
#define IGNORE_TOP             0x04
#define IO_MEM_SELECT          0x02
#define EXTERN_READY           0x01

/* serial chips */

#define INTERNAL_CLOCK       0x8000   /* in Baud rate count SERIALx_BAUD */

#define BREAK_0              0x0200   /* in the status register SERIALx_STATUS */

#define BREAK_1              0x0100
#define PARITY_ERROR         0x0080
#define REC_INT_REQ          0x0040
#define TX_INT_REQ           0x0020
#define FRAMING_ERROR        0x0010
#define TX_EMPTY             0x0008
#define OVERRUN_ERROR        0x0004
#define CTS_VALUE            0x0002

#define SEND_BREAK           0x0100   /* in control register SERIALx_CONTROL */
#define NINTH_DATA_BIT       0x0080
#define CTS_ENABLE           0x0040
#define RECEIVE_ENABLE       0x0020
#define EVEN_PARITY          0x0010
#define USE_PARITY           0x0008
#define MODE                 0x0007   /* 0 to 4 only */

// timer control

#define ENABLE_TIMER         0xC000
#define DISABLE_TIMER        0x4000
#define GENERATE_INT         0x2000
#define USING_COMPAREA       0x0000
#define USING_COMPAREB       0x1000
#define MAX_COUNT_OCCURED    0x0020
#define COUNT_TIN_EDGES      0x0004
#define COUNT_INTERNAL       0x0000
#define RETRIGGER_GATE       0x0000
#define RETRIGGER_COUNT      0x0010
#define PRESCALE_BY4         0x0000
```

```
#define PRESCALE_TIMER2      0x0008
#define ALTERNATE_REGS       0x0002
#define ONE_SHOT             0x0000
#define RUN_CONTINUOUS       0x0001
```

```
; interrupt control registers

; EOI register (0x02)
INT_REQ_VEC_TYPE    equ 0001Fh ; 0-4
NSPEC_EOI_ENABLE    equ 08000h

; 0x04, 0x06 - bottom bits are the same and we have
IREQ_PRESENT        equ 08000h

; 0x08, 0x0c, 0x0e
TIMER               equ 00001h

; Chip select units - 0x80 - 0xA7 (by 4s)
ADDRESS_MASK        equ 0FFC0h
ADDRESS_SHIFT       equ 004h  ; mask = (address>>4)&0xFFC0
WAIT_STATES         equ 00Fh
SELECT_ENABLE       equ 008h
IGNORE_TOP          equ 004h
IO_MEM_SELECT       equ 002h
EXTERN_READY        equ 001h


; serial chips

INTERNAL_CLOCK      equ 8000h ; in Baud rate count SERIALx_BAUD

BREAK_0             equ 0200h ; in the status register SERIALx_STATUS
BREAK_1             equ 0100h
PARITY_ERROR        equ 0080h
REC_INT_REQ         equ 0040h
TX_INT_REQ          equ 0020h
FRAMING_ERROR       equ 0010h
TX_EMPTY            equ 0008h
OVERRUN_ERROR       equ 0004h
CTS_VALUE           equ 0002h

SEND_BREAK          equ 0100h ; in the control register SERIALx_CONTROL
NINTH_DATA_BIT      equ 0080h
CTS_ENABLE          equ 0040h
RECEIVE_ENABLE      equ 0020h
EVEN_PARITY         equ 0010h
USE_PARITY          equ 0008h
MODE                equ 0007h ; 0 to 4 only

; timer control

ENABLE_TIMER       equ 0C000h
DISABLE_TIMER      equ  4000h
GENERATE_INT       equ  2000h
USING_COMPAREA     equ  0000h
USING_COMPAREB     equ  1000h
MAX_COUNT_OCCURED  equ  0020h
COUNT_TIN_EDGES    equ  0004h
COUNT_INTERNAL     equ  0000h
RETRIGGER_GATE     equ  0000h
RETRIGGER_COUNT    equ  0010h
PRESCALE_BY4       equ  0000h
```

File: include\PCB_BITS.INB

```
PRESCALE_TIMER2    equ  0008h
ALTERNATE_REGS     equ  0002h
ONE_SHOT           equ  0000h
RUN_CONTINUOUS     equ  0001h
```

```
#define BAUD_INTERNAL_COMPARE(X) ((unsigned short int)((CPU_CLOCK/(8L*(X)))-1L))


#define S16450_COMPARE  3L
#define S16450_CLOCK    ((CPU_CLOCK)/(8L*S16450_COMPARE))

#define BAUD_16450_DIVISOR(X) ((unsigned short int)(S16450_CLOCK/(16L*(X))))
```

File: include\SERIAL.HB　　Page 1　　16 JUN 93 07:21 PM

```
#define MASTER_CLOCK 11059200
#define MILLISECOND  1382
#define FIVE_MSEC    6912

#define SYSTEM_CLOCK MASTER_CLOCK/2
#define TIMER_CLOCK  MASTER_CLOCK/8
#define SERIAL_CLOCK MASTER_CLOCK/4
```

File: include\SYSTEM.HB

Page 1    16 JUN 93  07:21 PM

```
#include "basetype.hb"
#include "pcb.hb"
#include "pcb_bits.hb"
#include "mem_map.hb"
#include <memory.h>
#include <conio.h>

#define VPP_BIT 0x0002

#define FLASH_OK        0       // no error
#define FLASH_CMD       1       // invalid command
#define FLASH_ERASE     2       // erase operation failed
#define FLASH_PROG      3       // program operation failed
#define FLASH_VPP       4       // Vpp failed

#define FLASHSIZE 0x78    /* size of programmable Flash in Kbytes */

#define MAINSIZE  0x1C000L
#define PARM1SIZE 0x01000L
#define PARM2SIZE 0x01000L
#define BOOTSIZE  0x02000L

#define CMD_SETUP_ERASE   0x20
#define CMD_ERASE         0xD0
#define CMD_READ_STATUS   0x70
#define CMD_READ_ARRAY    0xFF
#define CMD_CLR_STATUS    0x50
#define CMD_SETUP_PROGRAM 0x40
#define CMD_READ_ID       0x90

#define WAIT_STATE_MACHINE_READY        0x80
#define ERASE_SUSPENDED                 0x40
#define ERASE_FAILURE                   0x20
#define PROGRAM_FAILURE                 0x10
#define CMD_SEQUENCE_FAILURE            0x30
#define VPP_LOW                         0x08

#ifndef MPC
unsigned int FlashBase;
#define ROMZERO(X)      (volatile char far *)(buffer)
#else
extern unsigned int FlashBase;
#define ROMZERO(X)      (volatile char far *)(((long)((X)&0xE000))<<16)
#endif

void ReadFlashROMid( char *pman_code, char *pdevice_code);
byte EraseFlashROM( volatile char far *device );
byte ProgramFlashROM( volatile char far *device,
                      char far *buffer, unsigned length );

void far ReadFlashID( char *man_code, char *device_code);
byte     EraseFlashROMblock( volatile char far *device );
byte far EraseFlash( volatile char far *device );
byte far ProgramFlash( volatile char far *device,
                       char far *buffer, unsigned length );
void SetVPP( char state );
volatile char far * addLongOffset(volatile char far *pointer,
```

File: src\28F001B.C

```
                                        long int offset);

#ifndef MPC

byte buffer[2048];
int eStatus = 0;
int pStatus = 0;

void
statusDisplay(char *title, byte status)
{
    printf("%s: ",title);
    switch ( status )
    {
        case FLASH_OK    :          printf("OK");
                                    break;
        case FLASH_CMD   :          printf("incorrect command");
                                    break;
        case FLASH_ERASE :          printf("erase failed");
                                    break;
        case FLASH_PROG  :          printf("programming failed");
                                    break;
        case FLASH_VPP   :          printf("Vpp too low");
                                    break;
        default :                   printf("unknown (%d)");
                                    break;
    }
    putchar('\n');
}

void
main()
{
    char man_code,device_code;
    byte status;

    FlashBase = (unsigned int)(((long)((char far *)&buffer[0])) >> 16);

    ReadFlashROMid(&man_code,&device_code);
    printf("FlashROM ID %02X/%02X\n",man_code&0x00FF,device_code&0x00FF);

    printf("Enter erase status in hex: ");
    if ( scanf("%x",&eStatus) != 1 )
        exit(0);

    eStatus |= WAIT_STATE_MACHINE_READY;
    printf("Erase status set to %02X\n",eStatus);

    status=EraseFlashROM((volatile char far *)buffer);
    statusDisplay("Erase FlashROM status",status);
    if ( status != FLASH_OK )
        exit(1);

    printf("Enter program status in hex: ");
    if ( scanf("%x",&pStatus) != 1 )
        exit(0);
```

```
    pStatus |= WAIT_STATE_MACHINE_READY;
    printf("Program status set to %02X\n",pStatus);

    status=ProgramFlashROM((volatile char far *)(buffer+10),
                           (char far *)main, 128);
    statusDisplay("Program FlashROM status",status);
    if ( status != FLASH_OK )
        exit(1);

    exit(0);
}
#endif

void
ReadFlashROMid( char *pman_code, char *pdevice_code)
{
    byte codeRAM[256];
    byte (far * idProc)(char *man_code,char *device_code) =
    (
       (byte (far *)(char *man_code,char *device_code))codeRAM
    );

    _fmemcpy((void far *)codeRAM,(void far *)ReadFlashID,64);

    (*idProc)(pman_code,pdevice_code);
}


byte
EraseFlashROM( volatile char far *device )
{
    byte status;
    if( status=EraseFlashROMblock(device) )
        return(status);
    else if( status=EraseFlashROMblock(addLongOffset(device,MAINSIZE)) )
        return(status);
    else
        status=EraseFlashROMblock(addLongOffset(device,MAINSIZE+PARM1SIZE));
    return(status);
}

byte
ProgramFlashROM( volatile char far *device,
                 char far *buffer,
                 unsigned length )
{
    byte status;
    byte codeRAM[256];
    byte (far * programProc)(volatile char far *,char far *,unsigned) =
    (
       (byte (far *)(volatile char far *,char far *,unsigned))codeRAM
    );

    if ( length == 0 )
        return( FLASH_OK );
```

File: src\28F001B.C

```
    _fmemcpy((void far *)codeRAM,(void far *)ProgramFlash,256);

    SetVPP(1);

    status = (*programProc)(device,buffer,length);

    SetVPP(0);

    if ( status & VPP_LOW )
        return( FLASH_VPP );
    if ( status & PROGRAM_FAILURE )
        return( FLASH_PROG );
    return( FLASH_OK );
}

void far
ReadFlashID( char *pman_code, char *pdevice_code)
{
    volatile char far *romBase = ROMZERO(FlashBase);

    *pman_code    =0x89;
    *pdevice_code =0x94;

    romBase[0]    = CMD_READ_ID;
    *pman_code    = romBase[0];
    *pdevice_code = romBase[1];
    romBase[0]    = CMD_READ_ARRAY;
}

byte
EraseFlashROMblock( volatile char far *device )
{
    char status;
    byte codeRAM[256];
    byte (far * eraseProc)(volatile char far *device) =
    (
       (byte (far *)(volatile char far *))codeRAM
    );

    _fmemcpy((void far *)codeRAM,(void far *)ErashFlash,256);

    SetVPP(1);

    status = (*eraseProc)(device);

    SetVPP(0);

    if ( status & VPP_LOW )
        return( FLASH_VPP );
    if ( (status & CMD_SEQUENCE_FAILURE) == CMD_SEQUENCE_FAILURE )
        return( FLASH_CMD );
    if ( status & ERASE_FAILURE )
        return( FLASH_ERASE );
    return( FLASH_OK );
}

byte far
```

```
ErashFlash( volatile char far *device )
    {
    char status;
    volatile char far *romBase = ROMZERO(FlashBase);
    *device = CMD_SETUP_ERASE;
    *device = CMD_ERASE;

    *romBase = CMD_READ_STATUS;

    do
    {
        #ifdef MPC
          status = *romBase;
        #else
          status = (byte)eStatus;
        #endif
    }
    while ( !(status & WAIT_STATE_MACHINE_READY) );

    *(ROMZERO(FlashBase)) = CMD_CLR_STATUS;
    *(ROMZERO(FlashBase)) = CMD_READ_ARRAY;

    return(status);
}

byte far
ProgramFlash( volatile char far *device, char far *buffer, unsigned length )
{
    char status;
    volatile char far *romBase = ROMZERO(FlashBase);

    do
    {
        *device = CMD_SETUP_PROGRAM;
        *device = *buffer;

        *romBase = CMD_READ_STATUS;

        do
        {
            #ifdef MPC
              status = *romBase;
            #else
              status = (byte)pStatus;
            #endif
        }
        while ( !(status & WAIT_STATE_MACHINE_READY) );
        if ( status & (VPP_LOW|PROGRAM_FAILURE) )
            break;
        ++device;
        ++buffer;
    }
    while ( --length != 0 );

    *(ROMZERO(FlashBase)) = CMD_CLR_STATUS;
    *(ROMZERO(FlashBase)) = CMD_READ_ARRAY;

    return(status);
}

void
SetVPP( char state )
    /* 0 == off, 1 == on */
{
    #ifdef MPC
    int i;
    unsigned int port1 = inpw(PCB_BASE+PORT1_LATCH) & 0x00FF;
    if ( state )
        port1 &= ~VPP_BIT;
    else
        port1 |=  VPP_BIT;
    outpw(PCB_BASE+PORT1_LATCH,port1);
    for ( i = 0; i < 1000; ++i )
        ;
    #endif
}

volatile char far *
addLongOffset(volatile char far *pointer, long int offset)
{
    long int lp = (long)pointer;
    long int po = offset & 0x0000000FL;
    offset <<= 12;
    offset &= 0xFFFF0000L;
    lp += offset;
    lp += po;
    return( (volatile char far *)lp );
}
```

```
#include "pcb.hb"
#include "pcb_bits.hb"
#include "basetype.hb"
#include "mem_map.hb"
#include "serial.hb"
#include <conio.h>

extern void _disable( void );
extern void _enable( void );
extern int rxwaiting;
extern byte ser_rpg_port;


// GetSerial doesn't need to know the port number as both interrupt routines
// will set rxwaiting to the received character

unsigned char GetSerial( void )
  {
    char temp;
    while( rxwaiting == 0 )     /* wait until something shows up */
        ;
    _disable();
    temp = (unsigned char)rxwaiting;
    rxwaiting = 0;
    _enable();
    return( temp );
  }

// SendSerial needs to know the port number since we could write to either

void SendSerial( unsigned char tosend )
{
    int base = SERIAL_START+MASC_CMD;     // assume we're using the this one

    switch( ser_rpg_port )
    {
         case 0 :
            outpw( PCB_BASE+SERIAL0_TBUF, tosend );
            while(!(inpw(PCB_BASE+SERIAL0_STATUS)&TX_EMPTY))
                ;
            break;

        case 1 :
            base = SERIAL_START+NON_MASC_CMD; // we're using this one on 8530

        case 2 :
            // stuff for handling the Z85x30
            outp( base+1, tosend );          // stuff out the character
            while( !(inp(base)&4) )          // wait for TXEMPTY on SCC
                ;
            break;
    }
}

void
SerialTxEmpty( void )
{
    int base = SERIAL_START+MASC_CMD;     // assume we're using the this one

    switch( ser_rpg_port )
    {
        case 0 :
            break;

        case 1 :
        case 2 :
            break;
      }
}

void
sendString(char *s)
    {
    byte oport = ser_rpg_port;
    ser_rpg_port = 0;
    while ( *s )
        SendSerial( *s++ );
    ser_rpg_port = oport;
    }

void
setBaud( unsigned int baudrate )
{
    int base = SERIAL_START+MASC_CMD;   // assume we're using the this one
    unsigned int baudclock;

    switch ( ser_rpg_port )
    {
        case 0 :
            outpw( PCB_BASE+SERIAL0_BAUD,
                  INTERNAL_CLOCK|BAUD_INTERNAL_COMPARE((long)baudrate));
            break;

        case 1 :
        case 2 :
            break;
    }
}

int
checkBaud( unsigned int baudrate )
{
    switch ( ser_rpg_port )
    {
        case 0 :
            if ( baudrate != 9600 && baudrate != 19200 )
                // at less than 6 MHz, 19200 is the best we can do!
                return(1);
            break;

        case 1 :
        case 2 :
            return(1);
            break;
```

```
    }
    return(0);
}
```

```
.186
.model SMALL
INCLUDE pcb.inb
INCLUDE interrup.inb
INCLUDE mem_map.inb

.DATA
public _rxwaiting
_rxwaiting label word
    dw 0
extrn _asizds:WORD
extrn _ser_rpg_state:BYTE
extrn _ser_rpg_port:BYTE

.CODE

extrn _RpgStrSrch:near
extrn _Reprogram_Device:near
extrn START_:far

    public _Async_rec_int

    ; the receive interrupt handler
_Async_rec_int proc far
    push bp
    mov  bp, sp
    push dx
    push ax
    push ds
    mov  ax, DGROUP
    mov  ds, ax
    mov  dx, PCB_BASE+SERIAL0_STATUS
    in   ax, dx                         ; get the status

    ; let's keep it
    mov  dx, PCB_BASE+SERIAL0_RBUF      ; get the character
    in   ax, dx

    cmp  _ser_rpg_port, -1
    jne   reprogramming
    push  0                     ; we're port 0
    xor   ah, ah
    push  ax
    call  _RpgStrSrch           ; kick prog enable state machine
    pop   ax
    pop   ax
    cmp   _ser_rpg_state+0, 4
    jne   eoi_receive       ; we're not reprogramming

; scrag the stack, it's reprogramming time!

    mov  ss:4[bp], cs
    mov  ax, offset _myReprogramDevice
    mov  ss:2[bp], ax

    jmp  eoi_receive

reprogramming:
    cmp  _ser_rpg_port, 0
    jne  eoi_receive            ; we are reprogramming - don't bother
    or   ax, 100h               ; so they can detect nulls
    mov  _rxwaiting, ax         ; save the character

; tell the interrupt unit that we're done
eoi_receive:
    mov  dx, PCB_BASE+END_OF_INT
    mov  ax, NSPEC_EOI_ENABLE      ; non-specific EOI
    out  dx, ax
    pop  ds
    pop  ax
    pop  dx
    pop  bp
    iret

_Async_rec_int endp

; we only do character at a time output -> we do nothing here
    public _Async_xmit_int
_Async_xmit_int proc far
    push dx
    push ax

    mov  dx, PCB_BASE+SERIAL0_STATUS
    in   ax, dx                     ; get the status

    ; issue an EOI for the transmit

    mov  dx, PCB_BASE+END_OF_INT
    mov  ax, NSPEC_EOI_ENABLE    ; non-specific EOI
    out  dx, ax

    pop  ax
    pop  dx
    iret

_Async_xmit_int endp

    public _myReprogramDevice
_myReprogramDevice proc
    cli                          ; disable ints for now
    mov  ax, DGROUP
    mov  ds, ax
    mov  es, ax
    mov  ss, ax
    mov  sp, _asizds
    mov   bx, 0
    mov   bl, _ser_rpg_port
    mov   _ser_rpg_state[bx], 5 ; we're busy reprogramming
    mov   _rxwaiting, 0         ; nothing waiting yet
    call  _Reprogram_Device     ; we don't come back from here
_myReprogramDevice endp

    public _ResetDevice
_ResetDevice proc
```

```
    jmp START_
_ResetDevice endp


end
```

```
.186
.model SMALL,C
INCLUDE pcb.inb
INCLUDE interrup.inb
INCLUDE mem_map.inb

.CODE

extrn Async_rec_int:far
extrn Async_xmit_int:far

    public Onboard_async_channel_setup
Onboard_async_channel_setup proc uses bx ds,baudCompare:WORD
                                  ; set up serial channel 0
                                  ; 8 data, no parity, full duplex.
    xor ax, ax
    mov ds, ax                    ; points to interrupt table.

    mov bx, SERIAL0_REC
    mov ax, OFFSET Async_rec_int
    mov [bx], ax
    mov ax, SEG Async_rec_int
    mov [bx+2], ax
    mov bx, SERIAL0_XMIT
    mov ax, OFFSET Async_xmit_int
    mov [bx], ax
    mov ax, SEG Async_xmit_int
    mov [bx+2], ax

    ; now initialize channel 0 options

    mov ax, baudCompare
    mov dx, PCB_BASE+SERIAL0_BAUD
    out dx, ax
    mov ax, 01h                  ; REN*,NOPAR,MODE=1
    mov dx, PCB_BASE+SERIAL0_CONTROL
    out dx, ax

    mov dx, PCB_BASE+SERIAL0_STATUS    ; turf old interrupts
    in  ax, dx

    mov dx, PCB_BASE+SERIAL_CONTROL  ; clear serial int. mask bit
    in  ax, dx
    and ax, 0007h                    ; turn off the mask bit
    out dx, ax                       ; THIS LINE IS MISSING IN THE INTEL EXAMPLE


    mov dx, PCB_BASE+SERIAL0_CONTROL
    in  ax, dx
    or  ax, 0020h                    ; enable the receiver
    out dx, ax

    mov ax, ss                       ; restore the data segment register
    mov ds, ax

    ; Receives are now enabled.  Writing to the transmit buffer will
    ; initiate a transmit.
    ret
Onboard_async_channel_setup endp

end
```

```
/* turn off all the interrupts that the application may have been using.
 * If we don't then one could occur while we're reprogramming.  Odds are
 * that there won't be any usable code where they land and things will
 * Go West very quickly.
 */

#include "basetype.hb"
#include "pcb.hb"
#include "pcb_bits.hb"
#include "interrup.hb"
#include "serial.hb"

#include <conio.h>

extern void Onboard_async_channel_setup( unsigned short int baudCompare );

void
CaptureInts( void )
{
    // disable everything except the onboard serial port, and timer
    outp( PCB_BASE+INTERRUPT_MASK, 0xFD );
    Onboard_async_channel_setup(INTERNAL_CLOCK|BAUD_INTERNAL_COMPARE(9600L));
}
```

File: src\CAPTURE.C

```
.186
.model small, C

.code

extrn application:far

;
; checks if the FlashROM
;     at location base:0 and size*16 bytes long is correct.
;
;     correct is defined as having a 0 checksum (mod 256)
;     AND not being all FFs.
;
; OUTPUT: ax = 1 - FlashROM is correct
;         ax = 0 - FlashROM is incorrect
;
checkFlash proc uses ds si dx cx si, seg_start:WORD, seg_end:WORD
    mov  ah, 00h        ; checksum starts at zero
    mov  dx, seg_start  ; here's where we start
chksloop:
    mov  ds, dx
    mov  cx, 0010h      ; inner loop is on a per segment basis
    mov  si, 0
chkbloop:
    lodsb
    add  ah, al
    loop chkbloop
    inc  dx
    cmp  dx, seg_end
    jne  chksloop

    cmp  ah, 00h        ; did the checksum work?
    jne  incorrect
    mov  ax, 1
    jmp  done

incorrect:
    mov  ax, 0          ; it's not - return 0
done:
    ret
checkFlash endp

callFlash proc
        jmp application
callFlash endp
end
```

File: src\CHECKROM.ASM

```
#include "basetype.hb"

unsigned RAM0size = 0, RAM1size = 0;            /* in segments */
unsigned RAMTop = 0, FlashTop = 0;              /* in segments */

unsigned Top_of_application = -1;               /* in segments */
```

File: src\COMMAREA.C

```
.model small, C
TESTDUMMY segment public para 'TESTDUMMY'
assume cs:TESTDUMMY
application proc
        ret
application endp
TESTDUMMY ends
end
```

```
.186
.model small,C

.data
extrn Top_of_application:WORD
extrn RAMTop:WORD
extrn FlashTop:WORD

.code
extrn myReprogramDevice:NEAR

DumpToApp proc uses es

    mov ax, 0040h
    mov es, ax

    mov ax, RAMTop
    mov es:[00h], ax

    mov ax, FlashTop
    mov es:[02h], ax

    mov ax, Top_of_application
    mov es:[04h], ax

    mov ax, offset myReprogramDevice
    mov es:[08h], ax
    mov ax, seg myReprogramDevice
    mov es:[0Ah], ax

    ret
DumpToApp endp

end
```

File: src\DUMPVARS.ASM

Page 1 16 JUN 93 07:21 PM

```
.186
.model small, C

include mem_map.inb

.data
extrn Top_of_application:WORD

.code

Find_application proc uses es cx bx
        mov     ax, FLASH_START
        mov     es, ax
        mov     ax, es:[4]
        cmp     ax, 0FFFFh
        je      save_it         ; the flash hasn't been programmed
        mov     bx, es:[6]      ; get the size of INITDATA
        mov     cx, 4
        rcr     bx, cl
        and     bx, 0FFFh
        add     ax, bx          ; add in the LAST CODE SEGMENT
        or      ax, 0Fh         ; round up to the next 256 byte boundary
        inc     ax
save_it:
        mov     Top_of_application, ax
        ret
Find_application endp

end
```

File: src\FINDAPP.ASM

Page 1    16 JUN 93  07:21 PM

```
/*
 * MPC flash reprogramming code
 *
 *   Uses DigiSync host reprogramming algorithm (4.0, algorithm 0)
 *
 * Created: Mark Church, Research In Motion, 1991
 *
 *
 */
#include "basetype.hb"
#include "mem_map.hb"
#include "leds.hb"

#include <conio.h>
#include <dos.h>
#include <string.h>

void Reprogram_Device( void );
void DoCommand( char ser_command );
void VersionCommand( void );
void ReadIDCommand( void );
void EraseCommand( void );
void DataCommand( void );
 int ProgramCommand( void );
void EndCommand( void );
void SetBase( void );
void CommandError( void );
void CalcCRC( unsigned char data );
void SendIDstring( void );
void ChangeBaudRate( void );
void DoSN( void );
void SendSerialString( char _far *s );

extern void CaptureInts( void );
extern void SendSerial( unsigned char what );
extern unsigned char GetSerial( void );
extern int checkBaud( unsigned int baud );
extern void setBaud( unsigned int baud );
void SerialTxEmpty( void );

extern int nApplicationOK;

//*********************************************
//
// External function declarations:
//
//*********************************************
//
//
//   Read the Flash ROM ID code & return through the pointers
//
extern void ReadFlashROMid( char *mnn_code, char *device_code);
//
//
// Erase the FlashROM pointed at by the far pointer
//
extern byte EraseFlashROM( volatile char far *device );
```

File: src\FREPROG.C

```
//
//
// Program "length" bytes in "buffer" into
//         the FlashROM starting at location "device"
//
extern byte ProgramFlashROM( volatile char far *device, char far *buffer,
                             unsigned length );
//
//
// Reset the processor by taking a flying leap at the beginning of
// the ROM code.
//
extern void ResetDevice( void );

#define BUG_OUT(x) TurnLEDon( x ); TurnLEDoff(~x)

/* standard definitions to understand what's coming in the serial port */

#define  ACK        0x06    /*command accepted and successful       */
#define  NAK        0x15    /*command refused or failed             */
#define  SOH        0x01    /*command header byte                   */
#define  EOT        0x04    /*command trailer byte                  */
#define  MEM_FULL   0x17    /*memory banks for serial data all full (ETB)*/

#define  OK            0
#define  ERROR        -1

typedef enum {
    STATE0,
    STATE1,
    STATE2,
    STATE3,
    STATE4,
    STATE5 );

#define  FLASH_VERSION   0

typedef volatile char far * F_ROM;

#define FLASHBASE 0xE000        /* default segment start of Flash */
#define PROGBASE  0xE000        /* default segment start of Flash */

#define F_ADDR(X) (F_ROM)((long)FlashBase<<16|(X))

// global variables needed for implementation of reprogramming algorithm

 unsigned int FlashBase = 0;     /* seg base to program flash data*/
 int crc = 0;                    /* global value of CRC */

 // state variable for serial port reprogramming request sequence
 char ser_rpg_state[3] = { STATE0, STATE0, STATE0 };
 char ser_rpg_port = -1; // which port: 0->9 PRINTER, 1->25 HOST, 2->25 RADIO

  /* storage of incoming data packet:
   *   400h bytes of data,
   *     2  byte address,
   *     2  byte data length
```

```
    */
 unsigned char input_buffer[0x400 + 4];

/******************************************************************************/
void
Reprogram_Device( void )
{
    char command, foo= 60;

    CaptureInts();
    FlashBase = PROGBASE;  /* default seg base to program flash data*/
    TurnLEDoff(0xFF);      // turn off all LEDs...
    TurnLEDon(CONTACT);    // ... except for CONTACT
    _enable();
    SendSerial(ACK );      /* ACK reprogramming command */

    for (;;)               /* do command if properly framed. */
    {
        if( (foo=GetSerial()) == SOH )
        {
            command = GetSerial();
            if( GetSerial() == EOT )
            {
                DoCommand(command);
            }
        }
    }
}

/******************************************************************************/
void
DoCommand( char ser_command )
{
    switch (ser_command)
    {
        case '1' :
            VersionCommand();  // replies with flash version number
            break;
        case '2' :
            ReadIDCommand();   // Read Flash manufacturer & device code
            break;
        case '3' :
            EraseCommand();
            break;
        case '4' :
            DataCommand();
            break;
        case '5' :
            if( ProgramCommand() != OK )
                ser_rpg_state[ser_rpg_port] = STATE0;
            break;
        case '6' :
            EndCommand();
            break;
        case '7' :
            SetBase();
            break;
        case '8' :
            SendIDstring();
            break;

        case '9' :
            ChangeBaudRate();
            break;

        case 'S' :
            DoSN();
            break;

        default  :
            CommandError();    /* oops. */
            break;

    } /* end switch ser_command */
}

/******************************************************************************/
void
VersionCommand( void )  // replies with flash version number
{
    SendSerial(FLASH_VERSION );
}

void
SendSerialString( char _far *s )
{
    for ( ; *s; ++s )
        SendSerial( *s );
}

void
SendIDstring( void )
{
    unsigned long int _far *p;
    unsigned char _far *s;

    extern char _far *bootIDstring;

    SendSerialString( bootIDstring );
    SendSerial( 0 );

    if ( nApplicationOK )
    {
        p = (unsigned long int _far *)( ((long)FLASH_START) << 16 );
        s = ( unsigned char _far *)p;
        if ( s[0] == 0xFA && s[1] == 0xEB && s[2] >= 0x0D && s[3] == 0x90 )
        {
            // this code space has a valid Program STARTUP.ASM in it
            // which means it has a pointer to the pointer to a text string
            p = ( unsigned long int _far * ) p[3];
            s = ( unsigned char _far * ) p[0];
            SendSerialString( (char _far *)s );
        }
```

```
        else
            SendSerialString( (char _far *)"Unidentifiable Application" );
    }
    else
        SendSerialString( (char _far *)"Does not contain an Application " );
    SendSerial( 0 );
}

/*****************************************************************************/
void
ReadIDCommand( void )   // Read Flash manufacturer and device code
{
    char man_code,device_code;

    ReadFlashROMid(&man_code,&device_code);

    SendSerial( man_code );
    SendSerial( device_code );
}

/*****************************************************************************/
void
EraseCommand( void )
{
    char status = ACK;

    if( EraseFlashROM( F_ADDR(0) ) )
        status = NAK;

    SendSerial( status );
}

/*****************************************************************************/
void
DataCommand( void )
{
    int i,num_bytes,hostCRC;
    unsigned char data;

    crc = 0;
    i = 4;

    data = GetSerial();
    CalcCRC(data);
    input_buffer[0] = data;         /* reprogramming address low */

    data = GetSerial();
    CalcCRC(data);
    input_buffer[1] = data;             /* reprogramming address high */

    data = GetSerial();
    CalcCRC(data);
    num_bytes  = input_buffer[2] = data;  /* # data bytes low */

    data = GetSerial();
    CalcCRC(data);
    num_bytes += (input_buffer[3] = data)<<8;  /* # data bytes high */
```

```
    while(num_bytes-- > 0)          /* guaranteed at least one byte */
    {
        data = GetSerial();
        CalcCRC(data);
        input_buffer[i++] = data;
    }
    hostCRC =  GetSerial();
    hostCRC += GetSerial()<<8;

    if( crc != hostCRC )
        SendSerial( NAK );
    else
        SendSerial( ACK );
}

/*****************************************************************************/
/* takes data in the input buffer and programs the data to the flash rom */

int ProgramCommand()
{
    unsigned int address;
    unsigned int count,status;

    address = input_buffer[0] + (input_buffer[1] << 8);
    count   = input_buffer[2] + (input_buffer[3] << 8);

    status = ProgramFlashROM( F_ADDR(address), (char far*)(input_buffer+4), coun
t );
    if(status != OK)
    {
        SendSerial( NAK );
        return(NAK);
    }
    else
    {
        SendSerial( ACK );
        return(OK);
    }
}

/*****************************************************************************/
void
EndCommand( void )
{
    SendSerial( ACK );
    SerialTxEmpty();        // wait for the char to leave...
    ResetDevice();
}

/*****************************************************************************/
void
SetBase( void )
{
    FlashBase  = GetSerial()<<8; /* high order byte first */
    FlashBase += GetSerial();
    SendSerial( ACK );
```

```
}

void
ChangeBaudRate( void )
{
    unsigned int newBaudrate;

    SendSerial( EOT );
    newBaudrate  = GetSerial() << 8;
    newBaudrate += GetSerial();

    if ( checkBaud( newBaudrate ) )
        SendSerial( NAK );
    else
    {
        SendSerial( ACK );
        SerialTxEmpty();        // wait for the char to leave...
        setBaud( newBaudrate );
    }
}

/****************************************************************************/
void
CommandError( void )     /* oops. */
{
    SendSerial( NAK ); /* I just can't do this... */
}

/**********************************
 * CalcCRC - takes a buffer and byte count as input and calculates the CRC
 *
 * Returns: the calculated CRC
 */
void
CalcCRC( unsigned char data )
{
    int i;

    crc = crc ^ (int)data << 8;
    for (i = 0; i < 8; i++)
        if (crc & 0x8000)
            crc = crc << 1 ^ 0x1021;
        else
            crc = crc << 1;
}

void
DoSN( void )
    {
    extern char _far serialNumber[];

    unsigned short len = _fstrlen(serialNumber) + 1;
    SendSerial( (unsigned char)(len&0x00FF) );
    SendSerial( (unsigned char)((len>>8)&0x00FF) );
    SendSerialString(serialNumber);
    SendSerial( 0 );
    }
```

```
.186
.model small, C
include mem_map.inb

; basic functions for driving the 4 LEDs on the MPC/r "front panel"
;
; functions are: TurnLEDon, TurnLEDoff, and ToggleLED.
;

.data

ledBits label byte
    db      0

LED_BIT_MASK  equ 0F0h

.code

TurnLEDon proc uses ax, led_mask:byte ; bit(n)==1 -> LED(n) is on.
    mov ah, led_mask
    and ah, LED_BIT_MASK
    pushf
    cli
    or  ledBits, ah
    mov al, ledBits
    out LED_START,al
    popf
    ret
TurnLEDon endp

TurnLEDoff proc uses ax, led_mask:byte ; bit(n)==1 -> LED(n) is off.
    mov ah, led_mask
    and ah, LED_BIT_MASK
    xor ah, LED_BIT_MASK
    pushf
    cli
    and ledBits, ah
    mov al, ledBits
    out LED_START, al
    popf
    ret
TurnLEDoff endp

ToggleLED proc uses ax, led_mask:byte ; bit(n)==1 -> flip LED(n).
    mov ah, led_mask
    and ah, LED_BIT_MASK
    pushf
    cli
    xor ledBits, ah
    mov al, ledBits
    out LED_START, al
    popf
    ret
ToggleLED endp

end
```

File: src\LEDDRIVE.ASM

```
#include "mem_map.hb"
#include "basetype.hb"
#include "pcb.hb"
#include "pcb_bits.hb"
#include "leds.hb"
#include "serial.hb"

#include <conio.h>
#include <dos.h>
#include <memory.h>

extern void initializePCB( void );
extern void callFlash( void );
extern void DumpToApp( void );
extern void autoConfigChips( void );
extern void Onboard_async_channel_setup( unsigned short int baudCompare );
extern unsigned Find_application( void );
extern int checkFlash( unsigned base, unsigned seg_length );
extern void sendString(char *s);

extern void vInitializeTestSystem(void);

extern unsigned RAMTop,FlashTop;
static void vSetRAMandROM(void);

extern unsigned Top_of_application;
static char inCS SoftVer[] = { " MPC Extended Boot ROM"
                              " (c) 1992 Research In Motion Limited,"
                              " Waterloo, Ontario, Canada  (519) 888-7465 "
                            };
static char inCS Version[] = { "MPC/r Boot ROM 1.0 (H/W V1.0 -- 5.5296 MHz clock
)" };
char _far *bootIDstring = Version;

byte ledTranslate[16] = {
    0x00, 0x20, 0x10, 0x30, 0x40, 0x60, 0x50, 0x70,
    0x80, 0xA0, 0x90, 0xB0, 0xC0, 0xE0, 0xD0, 0xF0
    };

#define BUG_OUT( x ) TurnLEDon((x));TurnLEDoff(~(x));
#define SPIN( x ) for( spin = 0; spin < x; ++spin )
#define LEDFIX( x ) ledTranslate[((x>>4)&0x000F)]

int nApplicationOK = 0;

void main()
{
    int temp, spin, leds, mask;

    _disable();          // we don't want any interrupts right now...

    initializePCB();

    vSetRAMandROM();

    BUG_OUT( 0 );            // turn LEDs off while doing setup

    // only need channel 0: Printer Port
    Onboard_async_channel_setup(INTERNAL_CLOCK|BAUD_INTERNAL_COMPARE(9600L));

    if( Find_application() != 0xFFFF &&       // sets Top_of_application
        checkFlash( FLASH_START, Top_of_application ) )
    {
        nApplicationOK = 1;
        DumpToApp();

        _enable();

        leds = mask = 0x10;
        for( temp = 0; temp <= 4; ++temp, mask <<= 1 )
        {
            BUG_OUT( LEDFIX(leds) );
            SPIN( 14000 );
            leds |= mask;
        }

        mask = 0x10;
        for( temp = 0; temp <= 4; ++temp, mask <<= 1  )
        {
            BUG_OUT( LEDFIX(leds) );
            SPIN( 14000 );
            leds &= ~(mask);
        }

        leds = mask = 0x10;
        for( temp = 0; temp <= 4; ++temp, mask <<= 1 )
        {
            BUG_OUT( LEDFIX(leds) );
            SPIN( 14000 );
            leds |= mask;
        }

        mask = 0x10;
        for( temp = 0; temp <= 4; ++temp, mask <<= 1  )
        {
            BUG_OUT( LEDFIX(leds) );
            SPIN( 14000 );
            leds &= ~(mask);
        }

        callFlash();
    }
    else
    {
        _enable();

        temp = 0;
        while(1)                              // wait for reprogramming
        {
            temp+=0x10;
            BUG_OUT( LEDFIX(temp) );
            SPIN( 22000 );
        }
    }
```

```
}

void
vSetRAMandROM(void)
{
    char _far *cfpPointer1 = (char _far *)(0x1FF00000L);
    char _far *cfpPointer2 = (char _far *)(0x3FF00000L);
    int i,status;

    RAMTop = 0x4000;        // assume 256K of RAM is available

    do
    {
        // check for the maximum amount of RAM in the system
        // by looking at a pointer location 256 bytes shy of
        // the TOP of RAM ("cfpPointer2"), and ALSO looking
        // at 1/2 way down in the RAM.  This detects duplicated
        // memory images, suggesting that the RAM is smaller than
        // we first assume.  Keep checking by cutting the RAM
        // size in half, looking for a single contiguous piece of RAM.

        for ( i = 0; i < 256; ++i )
        {
            cfpPointer1[i] = i;
            cfpPointer2[i] = 255-i;
        }

        if ( (status=_fmemcmp(cfpPointer1,cfpPointer2,256)) == 0 )
        {
            // we have a duplicate image of the first 128K
            // in the second 128K i.e. we have at most 128K
            RAMTop >>= 1;

            cfpPointer1 = (char _far *)(((long)cfpPointer1 >> 1) & 0xFFF00000L);

            cfpPointer2 = (char _far *)(((long)cfpPointer2 >> 1) & 0xFFF00000L);

        }
    }
    while ( (status == 0) && (cfpPointer1 != (char _far *)0) );

    if ( cfpPointer1 != (char _far *)0 )
        outpw( PCB_BASE + LCS_STOP, RAMTop | SELECT_ENABLE | IO_MEM_SELECT );

    FlashTop = 0xFFFF;
}
```

```
#include "basetype.hb"

#include "pcb.hb"
#include "pcb_bits.hb"
#include "mem_map.hb"
#include "serial.hb"
#include <conio.h>

/* arrays for the peripheral control block.  This is just arrays of words
 * to be copied to the pcb.  The start up routine does this before calling
 * the C main() function.
 */

static unsigned int inCS misc_init[] =
{
    INTERRUPT_MASK,  0x00FD,  // all interrupts masked off!

    PORT1_LATCH,     0x00DF,  // P1.0 high - DTMF chip select
                              // P1.1 high - no programming on FLASHROM
                              // P1.2 high - Modem chip select
                              // P1.3 high - Don't powerdown
                              // P1.4 high - LED latch enable (don't care)
                              // P1.5 low  - EEPROM c.s. inactive      |
                              // P1.6 high - On-hook Disabled          |
                              // P1.7 high - Radio DTR inactive        |
    PORT1_CONTROL,   0x0015,  // P1.4 is LED latch enable GCS(4) <-+
                              // P1.2 is Modem chip select
                              // P1.0 is DTMF chip select
                              //
    PORT2_DIR,       0x0000,  // P2.6 and P2.7 set to OUTPUT
                              // there are no other control bits here.
                              //
    PORT2_LATCH,     0x00FF,  //
                              // P2.1 low (Printer RTS is active)
                              // All other bits high for low power
                              // consumption in their inactive states.
                              //
    PORT2_CONTROL,   0x000A,  // P2.6,7 LATCH bits drive the pins
                              // All other pins float when latch bits are high
                              //
                              // P2.3, P2.1 are set up for Port 1 serial I/O
                              //
                              // serial port 0 - 9600,8,N,1 enabled
    SERIAL0_BAUD,    INTERNAL_CLOCK|BAUD_INTERNAL_COMPARE(9600L),
    SERIAL0_CONTROL, 0x0031,

                              // serial port 0 - 1200,7,E,1 enabled
    SERIAL1_BAUD,    INTERNAL_CLOCK|BAUD_INTERNAL_COMPARE(1200L),
    SERIAL1_CONTROL, 0x0039,

    GCS_START(0),    DTMF_START, // set the DTMF chip select
    GCS_STOP(0),     DTMF_START+DTMF_SIZE|SELECT_ENABLE,
    GCS_START(2),    MODEM_START,// set the Modem chip select
    GCS_STOP(2),     MODEM_START+MODEM_SIZE|SELECT_ENABLE,
    GCS_START(4),    LED_START,  // set the LED latch chip select
    GCS_STOP(4),     LED_START+LED_SIZE|SELECT_ENABLE,
    0x0000                       // end of table
};

/*
 * NOTE: the internal clock for the serial chips is CLKIN/2 or 16 MHz
 */

void
initializePCB( void )
{
    unsigned int where;
    int inCS *entry;

    for( entry = misc_init; where = *entry++; ++entry )
        outpw( where + PCB_BASE, *entry );
}
```

```
/*
 * MPC flash reprogramming code
 *
 *   Uses DigiSync host reprogramming algorithm (4.0, algorithm 0)
 *
 * Created: Mark Church, Research In Motion, 1991
 *
 *
 */
#include "basetype.hb"
#include "mem_map.hb"
#include <conio.h>

#define BUG_OUT(x) TurnLEDon((x))

typedef enum {
    STATE0,
    STATE1,
    STATE2,
    STATE3,
    STATE4,
    STATE5 };

extern char ser_rpg_state[3]; /* state variable for serial port
                                 reprogramming request sequence */
extern char ser_rpg_port;  // the port in use - 0->9 pin, 1->25 host, 2->25 radi
o


/******************************************************************************
 * This routine should be linked into the serial interrupt.
 * Searches for the pattern #SOH, 0xAA, 0x0F, 0xF0 to initiate programming.
 */

void ReprogStringSearch( unsigned char serialChar, int port );

void
RpgStrSrch( unsigned char serialChar, int port )
{
    _asm
    {
        pusha
        push    ds
        push    es
        mov     ax,port
        push    ax
        mov     al,serialChar
        xor     ah,ah
        push    ax
        call    ReprogStringSearch
        add     sp,+4
        pop     es
        pop     ds
        popa
    }
}
```

```
void
ReprogStringSearch( unsigned char serialChar, int port )
  {
    if( ser_rpg_port != -1 )    // we're already reprogramming - ignore it
        return;
    if( port < 0 || port > 2 )  // bad port (for now)
        return;

    // change states based on the incoming character.
    // If the character is 0x0E, then ALWAYS change to STATE1
    if ( serialChar == 0x0E )
        ser_rpg_state[port] = (char)STATE1;
    else switch (ser_rpg_state[port])
    {
        case STATE0:
            ser_rpg_state[port] = (char)((serialChar == 0x0E) ? STATE1 : STATE0)
;
            break;

        case STATE1:
            ser_rpg_state[port] = (char)((serialChar == 0xAA) ? STATE2 : STATE0
);
            break;

        case STATE2:
            ser_rpg_state[port] = (char)((serialChar == 0x0F) ? STATE3 : STATE0
);
            break;

        case STATE3:
            ser_rpg_state[port] = (char)((serialChar == 0xF0) ? STATE4 : STATE0
);
            break;

        case STATE4: /* fall through if currently reprogramming */
            break;

        default:
            ser_rpg_state[port] = STATE0;
            break;
    }
    if( ser_rpg_state[port] == STATE4 )
        ser_rpg_port = (char)port;
}
```

```
.186    ; for the MPC only!

NAME MSC_START_UP_CODE          ; startup.asm, version 6.0b
include mem_map.inb
;
; Copyright (c) 1987-1990, Systems & Software, Inc. All rights reserved.
;
; This file contains sample start-up code for building a Microsoft C
; application for an embedded environment.
;
; This source file may be used only if your C application does not use
; floating point math.
; Use the start-up file emstup.asm if you are using the floating
; point emulation (compiled with the /FPi option).
; Use the start-up file alstup.asm if you are using the floating
; point alternat math emulation (compiled with the /FPa option).
; Use the start-up file c7stup.asm if you are using an 8087 math
; coprocessor (compiled with the /FPi87 option).
;
; You need to modify this file to adapt it to your embedded environment.
; The places for you to make changes are marked with comment lines filled
; with asterisks (*****).
;
; ****************************************************************************
; You may use this start-up code for any memory model.
; Choose the memory model by setting the constant MODEL_ to an
; appropriate value.
; MODEL_  EQU   1 => small model
; MODEL_  EQU   2 => compact model
; MODEL_  EQU   3 => medium model
; MODEL_  EQU   4 => large model, default setting
; MODEL_  EQU   5 => huge model
; ****************************************************************************
        PUBLIC MODEL_
MODEL_  EQU     1

; ****************************************************************************
; Choose the target CPU
; CPU86 EQU 0 IF target CPU is 80186 or 80188.
; CPU86 EQU 1 IF target CPU is 8086 or 8088.
; CPU86 EQU 2 IF target CPU is 80186EB or 80188EB.
; ****************************************************************************
CPU86   EQU     2       ; Default setting is 1.

; ****************************************************************************
; Specify stack size.
; ****************************************************************************
STACK_SIZE      EQU     100H ; Reserve 2K WORDS of stack or any size you want.

; ****************************************************************************
; Place EXTRN statements for interrupt handling routines outside
; of all SEGMENT/ENDS pairs.
; ****************************************************************************
; For example, suppose you have an interrupt handling routine written in C
; with the function name int_hdlr().
; In order for you to reference the routine in this file, you should declare
; _int_hdlr as an external reference (note that the C compiler prefixes an
; underscore character to the function name).  The declaration should be
; placed outside of all SEGMENT/ENDS pairs as follows:
;       EXTRN _int_hdlr:FAR
; Refer to the sample code below that initializes the interrupt vector table.
;
; ****************************************************************************
;
;
; The primary function of the start-up code is to set up the run-time
; environment before passing control to C function main().
; The start-up code performs the following functions:
; 1) Initialize hardware and check RAM.
; 2) Copy initializers from ROM to RAM to setup initialized program variables
;    to proper initial values.
; 3) Zero all uninitialized program variables.
; 4) Initialize interrupt vector table, if necessary.
; 5) Setup data segment.
; 6) Setup stack segment.
; 7) Pass control to C function main().
;
; This assembly file is called startup.asm.  You should use the Microsoft MASM
; assembler, version 4 and up.  For example,
;       masm /Mx startup,startup,startup,nul
; The /Mx option is needed to preserve lower-case in public and external names.
;
        PUBLIC  __acrtused
__acrtused      EQU     1
; The symbol __acrtused has to be in lower-case.  Starting from version 4,
; when the Microsoft C optimizing compiler compiles a C file, it places an
; external reference to this symbol in the object file.  The public definition
; of __acrtused is contained in an object module called crt0.  This module is
; placed in the Microsoft C run-time library file.  This module contains the
; start-up code for the DOS environment.  So when you link your C object files
; with the run-time library file, the linker will extract the start-up object
; module from the run-time library file to satisfy the external references.
; As a result, the start-up code for DOS environment will be included in the
; linker output.
; If you do not make use of any function supplied in the run-time library
; file, you do not link with the library file at all.  Then you have to
; include a public definition of __acrtused in this file to resolve all the
; external references in the C object files.
; Even though you are building an application for an embedded environment,
; sometimes you may want to link with the run-time library file.  The reason
; is that the run-time library file contains both DOS-dependent functions,
; such as printf(), and DOS-independent functions, such as strcpy().  If you
; want to make use of certain DOS-independent functions that are contained in
; the run-time library file, you would link with the library file.  If the
; link map shows that the linked module contains the crt0 module, you know
; that you have linked in some DOS-dependent functions from the run-time
; library file.
; Make sure you specify this start-up file as the first object file
; in the linker command line, then the other object files and place the
; modified combined run-time library file as the last file.

DGROUP GROUP NULL,_DATA,CONST,MSG,ENDDATA,_BSS,ENDBSS,STACK

; This segment contains 4 bytes of zeros.  If a (DS:0) null pointer assignment
```

```
; occurs, these byte locations will be overwritten.  You may implement your
; own routine to check for null pointer assignment.

NULL SEGMENT PARA PUBLIC 'DATA_BEG'
        PUBLIC _bdata   ; This label marks the beginning of initialized data.
        PUBLIC _efdata, _bfdata
_bdata  LABEL BYTE
_bfdata label byte
_efdata label byte
        DB 4 DUP (0)
NULL ENDS

_DATA SEGMENT WORD PUBLIC 'DATA'
; Segment with class name DATA contains initialized variables.
        PUBLIC _asizds
_asizds label word
        dw 0

        PUBLIC _errno
_errno label word
        dw 0

_DATA ENDS

CONST SEGMENT WORD PUBLIC 'CONST'
; Segment with class name CONST contains constants.
CONST ENDS

MSG SEGMENT WORD PUBLIC 'MSG'
MSG ENDS

ENDDATA SEGMENT PARA PUBLIC 'DATA_END'
        PUBLIC _edata
_edata  LABEL BYTE      ; This label marks the end of initialized data.
ENDDATA ENDS

_BSS    SEGMENT WORD PUBLIC 'BSS'
; Segment with class name BSS contains uninitialized variables.
_BSS    ENDS

ENDBSS  SEGMENT WORD PUBLIC 'BSS_END'
        PUBLIC _end
_end    LABEL BYTE      ; This label marks the end of uninitialized data.
ENDBSS  ENDS

STACK   SEGMENT PARA STACK 'STACK'
        DW STACK_SIZE DUP (?)
        PUBLIC stack_top
stack_top LABEL WORD
STACK   ENDS

_TEXT SEGMENT PARA PUBLIC 'CODE'
        EXTRN   _main:NEAR      ;C main()
ASSUME  CS:_TEXT

        ASSUME DS:DGROUP, SS:DGROUP
        PUBLIC _start_          ;Must be paragraph aligned (i.e. offset is 0)
```

File: src\STARTUP.ASM

```
        PUBLIC _init_begin      ;after our hop

                PUBLIC  _serialNumber
_serialNumber   label   byte
                DB 16   DUP (0)

_start_:                        ;and the address where program code starts.
        CLI
        jmp _init_begin
; ********************************************************************************
; Place code here to do hardware initialization and RAM check
; ********************************************************************************
;
; Perform variable initialization.  Initializers are copied from ROM to RAM.
;
; Your program will contain segments with class names DATA_BEG, DATA and CONST
; which contain initialized variables.  Since these variables may be modified
; at run-time, the segments containing them have to be located in RAM space.
; When the main function of your C program takes control, it expects
; all variables in these classes of segments to be initialized.
; For embedded systems, the initializers for these variables have to be placed
; in ROM space which are copied to the segments in RAM space by the start-up
; routine at power-up.
; When you use PROM86, v5.2 and up, to prepare an output file for burning an
; eprom, you need to specify the INITDATA control.  The INITDATA control
; causes PROM86 to place all initializers at address _etext in the
; output file.  The start-up routine assumes these initializers are placed
; above program code in ROM and copy them to RAM at power-up.

; MPC specific stuff.  The following four words are used by the BIOS to
; determine what the top of Program RAM and ROM are for the memory allocation
; routines.
        dw SEG _etext, OFFSET DGROUP:_edata     ; for the Flash ROM
        dw SEG _bdata, OFFSET DGROUP:STACK_TOP  ; for the RAM

_init_begin:
        CLD
;       Transfer Count
        MOV AX,OFFSET DGROUP:_edata     ; Transfer counter
        CMP AX,0
        JZ no_init_data
        MOV CX,AX
;       Destination
        MOV AX,SEG _bdata
        MOV ES,AX               ; Destination ES:[DI]
        MOV DI,0                ; Start of initialized variable area in RAM
;       Source
        MOV AX,SEG _etext       ; Source DS:[SI]
        MOV DS,AX               ; Start of initializer storage in ROM
        MOV SI,0
;       Begin BYTE transfer
REP     MOVSB                   ; Begin byte transfer from ROM to RAM
no_init_data:
;   Clear uninitialized data area in DGROUP group

        MOV CX,OFFSET DGROUP:_end ; End of 'BSS' class in RAM
        MOV DI,OFFSET DGROUP:_edata ; Start of 'BSS' class in RAM
```

```
        SUB CX,DI           ; Size of 'BSS' class in bytes
        JCXZ no_uninit_data
        MOV AX,0            ; Initialize to 0
REP     STOSB
no_uninit_data:
        PUBLIC _init_done
_init_done:
; ********************************************************************************
; Initialize the interrupt vector table here
; ********************************************************************************
; Interrupt types 0 to 4 are dedicated internal interrupts.
; Type 0 - Divide-error
; Type 1 - Single-step
; Type 2 - Non-maskable interrupt
; Type 3 - 1-byte INT instruction or Breakpoint
; Type 4 - Overflow
; Interrupt types 5 to 31 are reserved internal interrupts.
; Interrupt types 32 to 255 are available for use.
;
; For example:
;   The interrupt handling routine for vector 32 decimal is assumed to
;   be the C function: void interrupt far int_hdlr().
;   The statement declaring code label _int_hdlr as an external far procedure
;   has to be placed outside of all SEGMENT/ENDS pairs.
;   See the sample EXTRN statement above.  It is behind the GROUP statement.
;   Below is the sample code to initialize an entry in the vector table:

; we shouldn't get one of these, but just in case

        NMI EQU 2
        public nmi_hdlr

        MOV AX,0
        MOV ES,AX       ;Reference base of interrupt vector table
        MOV AX,OFFSET nmi_hdlr
        MOV ES:WORD PTR NMI*4,AX   ;Offset portion of vector 32
        MOV AX,SEG nmi_hdlr
        MOV ES:WORD PTR NMI*4+2,AX ;Base portion of vector 32

; Setup data and stack segment here

        MOV AX,DGROUP
        MOV DS,AX           ; Setup data segment
        ASSUME DS:DGROUP
        MOV SS,AX           ; Setup stack pointer
        MOV SP,OFFSET DGROUP:STACK_TOP
        ASSUME SS:DGROUP
        STI                 ; Enable interrupt now

        mov ax, offset DGROUP:STACK_TOP         ; memory allocation init
        dec ax
        mov _asizds, ax

        CALL _main          ; Pass control to C main() function
        HLT

nmi_hdlr:
```

File: src\STARTUP.ASM

```
        IRET            ; just so someone handles it

_TEXT   ENDS

; If you specify the INITDATA control in the PROM86, v5.2 and up, it will
; cause PROM86 to place all initializers in ROM starting at this
; location.  The start-up routine assumes these initializers are placed
; above program code in ROM and copy them to RAM at power-up.
C_ETEXT SEGMENT PARA PUBLIC 'CODE_END'
        PUBLIC _etext
_etext  LABEL BYTE      ; This label marks the end of program code.
        DB 16 DUP(?)    ; Required bytes
C_ETEXT ENDS

  ; some 80188EB specific code to enable the RAMS and to grow the ROMS
  ; ever so slightly (at least make them bigger than the default 1K).
;
INIT_HW SEGMENT 'INIT_HW'
        ASSUME CS:INIT_HW
;
START_LCS       equ     OFFA0h          ; for RAM0
START_UCS       equ     OFFA4h          ; for BOOT_ROM
;
        PUBLIC START_
START_:

; set up the RAM
        mov     dx, START_LCS
        mov     ax, 0           ; RAM starts at 0000:0000, no wait states
        out     dx, ax
        udd     dx, 2
        mov     ax, 400Ah       ; and goes to 3FFF:F(256k), and it's not IO
        out     dx, ax

; make the boot ROM bigger
        mov     dx, START_UCS   ; BOOT_ROM(and application) is from E000-FFFF
        mov     ax, 0E000h      ; and is 0 wait states
        out     dx, ax
        add     dx, 2
        mov     ax, OFFCEh      ; Ignore the upper range
        out     dx, ax

        JMP FAR PTR _start_
; end of the 188EB specific code.  The rest of the initialization takes place
; later.
INIT_HW ENDS

        END START_      ; Make sure you include the START_ symbol here.
```

```
#include "basetype.hb"
#include "mem_map.hb"
#include "pcb.hb"
#include "pcb_bits.hb"
#include "leds.hb"
#include "system.hb"

#include "testing.h"
#include <conio.h>
#include <dos.h>

void _interrupt _far powerdownInterruptHandler( void );

volatile int nPowerOffRequest = 0;

int
nPowerOffRequested(void)
{
    return( nPowerOffRequest );
}

void
vResetPowerdownRequest(void)
{
    nPowerOffRequest = 0;
}

void
vSimulate188reset(void)
{
    _disable();

    // all interrupts disabled.
    outpw(PCB_BASE+INTERRUPT_MASK,0x00FD);

    // set the control to reset conditions.
    outpw(PCB_BASE+INT0_CONTROL,0x000F);
    outpw(PCB_BASE+INT1_CONTROL,0x000F);
    outpw(PCB_BASE+INT2_CONTROL,0x000F);
    outpw(PCB_BASE+INT3_CONTROL,0x000F);
    outpw(PCB_BASE+INT4_CONTROL,0x000F);

    outpw(PCB_BASE+SERIAL_CONTROL,0x000F);
    outpw(PCB_BASE+TIMER_CONTROL,0x000F);

    outpw(PCB_BASE+PORT1_DIR,0x00FF);
    outpw(PCB_BASE+PORT1_LATCH,0x00FF);
    outpw(PCB_BASE+PORT1_CONTROL,0x00FF);

    outpw(PCB_BASE+PORT2_DIR,0x00FF);
    outpw(PCB_BASE+PORT2_LATCH,0x00FF);
    outpw(PCB_BASE+PORT2_CONTROL,0x00FF);

    outpw(PCB_BASE+SERIAL0_CONTROL,0);
    outpw(PCB_BASE+SERIAL0_BAUD,0);
    outpw(PCB_BASE+SERIAL0_COUNT,0);
```

```
    outpw(PCB_BASE+SERIAL1_CONTROL,0);
    outpw(PCB_BASE+SERIAL1_BAUD,0);
    outpw(PCB_BASE+SERIAL1_COUNT,0);

    outpw(PCB_BASE+TIMER0_CONTROL,0);
    outpw(PCB_BASE+TIMER1_CONTROL,0);
    outpw(PCB_BASE+TIMER2_CONTROL,0);

    outpw(PCB_BASE+INT_REQUEST,0);

    _asm
    {
        mov  ax,0FFFFh
        push ax
        mov  ax,00000h
        push ax
        retf
    }
}

void
vPowerDownComplete(void)
{
    long int i;

    outpw(PCB_BASE+INTERRUPT_MASK,0x00F5);  // power-down INT only

    // enable the power-down signal by driving the output (P1.3) low.
    // This drives the C7xx startup pin HIGH.
    outpw(PCB_BASE+PORT1_LATCH,inpw(PCB_BASE+PORT1_LATCH) & 0x00F7);

    // wait briefly so that the radio sees the signal

    for ( i = 0; i < 30000L; ++i )
        ;

    TurnLEDoff(0xFF);

    // disable the power-down signal by driving the output (P1.3) high.
    outpw(PCB_BASE+PORT1_LATCH,inpw(PCB_BASE+PORT1_LATCH)|0x0008);

    nPowerOffRequest = 0;
    while ( 1 )
    {
        if ( nPowerOffRequest )
        {
            // Another interrupt request has occurred!
            //
            // We will try to emulate a hardware reset.
            vSimulate188reset();
        }
    }
}

void _interrupt _far
powerdownInterruptHandler( void )
{
```

```
    // End Of Interrupt for this INT.
    outpw(PCB_BASE+END_OF_INT,17);

    // Signal the application that a power-down is requested.
    nPowerOffRequest = 1;
}

void
vSetupPowerdown(void)
{
    long _far *lfPointer = (long _far *)(0x00000044L);
    short int nFlags = getUPflagsAndCLI();
    long int i;

    *lfPointer = (long)(&powerdownInterruptHandler);

    outpw(PCB_BASE+INT4_CONTROL,0x0000);

    nPowerOffRequest = 0;

    setUPflags(nFlags);      // allow interrupts

    for ( i = 0; i < 500L; ++i )
        ;

    if ( nPowerOffRequest )
    {
        vSendString("\r\nA spurious Power Off Request "
                    "was received and ignored\r\n");
    }

    nPowerOffRequest = 0;    // eliminate the result of a pending int!
}
```

File: src\POWERDN.C

```
// New EEPROM routines for V1.3 MPC hardware

#include "basetype.hb"
#include "mem_map.hb"
#include "pcb.hb"
#include <conio.h>
#include <dos.h>

#include "eeprom.hb"    // MPC/r eeprom locations.
#include "mpc-r-ee.h"

/* The programming opcode, just use the bottom two bits */
typedef enum { PROG_CONTROL, DATA_WRITE, DATA_READ, ERASE_REG } Opcode;

/* PROG_CONTROL has several sub_commands */
typedef enum { DISABLE=0,      WRITE_ALL=0x40,
               ERASE_ALL=0x80, ENABLE=0xC0 } PC_subcode;

/*
pin designations
  SK    P2   bit 7
  CS    P1   bit 5
  DI/DO P2   bit 6

Timing Notes:
DI is sampled on the rising edge of SK.  DI must be valid for at least 100 ns.
DO is valid at most 1 us after the rising edge of SK.
CS must go high at least 100 ns before SK goes high.
 */

extern void _far sendEEcmd( Opcode command, int address );
extern void _far sendEEdata( unsigned int data );
extern unsigned int _far readEEdata( void );
extern int  _far waitForEEready( void );

#define EEPROM_SK_LATCH    PCB_BASE+PORT2_LATCH
#define EEPROM_CS_LATCH    PCB_BASE+PORT1_LATCH

#define SK_BIT          0x0080
#define CS_BIT          0x0020

#define setEESK() outpw( EEPROM_SK_LATCH, (inpw( EEPROM_SK_LATCH ) & ~SK_BIT) |
SK_BIT  ) // Set SK high
#define clrEESK() outpw( EEPROM_SK_LATCH, (inpw( EEPROM_SK_LATCH ) & ~SK_BIT)
        ) // Set SK low
#define clrEECS() outpw( EEPROM_CS_LATCH, (inpw( EEPROM_CS_LATCH ) & ~CS_BIT)
        ) // Set CS low

int waitCounter = 0;

// fake out the MPC LINK layer AutoBauder's EEPROM baud
// rate updating, by translating the RADIO_DEFAULTS addresses
// that it uses in "writeEEPROM"
int
writeEEPROM( int location, unsigned data )
{
    if ( location < RADIO_DEFAULTS || location > (RADIO_DEFAULTS+1) )
```

File: src\EEPROM.C

```
        return( 0 );
    return( nWriteEEPROM( (location-RADIO_DEFAULTS)+MPC_R_RADIO_DEFAULTS, data )
 );
}

unsigned
uReadEEPROM( int location )
{
    unsigned temp;
    _disable();
    sendEEcmd( DATA_READ, location );
    temp = readEEdata();
    _enable();

    return temp;
}

int
nWriteEEPROM( int location, unsigned data )
{
    // don't write the WORD if it is the same as the
    // WORD that is already in the EEPROM
    unsigned uCurrentData;

    uCurrentData = uReadEEPROM( location );
    if ( uCurrentData == data )
        return(0);

    _disable();
    sendEEcmd( PROG_CONTROL, ENABLE );
    clrEECS();
    sendEEcmd( DATA_WRITE, location );
    sendEEdata( data );
    waitCounter = waitForEEready();
    sendEEcmd( PROG_CONTROL, DISABLE );
    clrEECS();
    _enable();
    return( waitCounter );
}

/*
   from the National Semiconductor Corp. Non-volatile Memory Book
Instr.  SB Opcode  Address  Data    comments
WDS      1   00    00XXXXXX         Disables all prog. inst.
WRALL    1   00    01XXXXXX D15-D0  Writes ALL regs.
ERALL    1   00    10XXXXXX         set all registers to all 1's
WEN      1   00    11XXXXXX         WEN must prec. all prog. modes
WRITE    1   01    A7 .. A0 D15-D0  Write reg.
READ     1   10    A7 .. A0         read data, starting at addr.
ERASE    1   11    A7 .. A0         erase register to all 1's.
note: ERASE and ERALL are not needed and are included for backwards
      compatibility only.
*/
```

```
; New EEPROM routines for V1.3 MPC hardware

.model LARGE, C
.186
include pcb.inb
include mem_map.inb

EESK    equ    080h
EECS    equ    020h
EEDATA  equ    040h

EEPROM_CS_LATCH equ PCB_BASE+PORT1_LATCH

EEPROM_LATCH equ PCB_BASE+PORT2_LATCH

EEPROM_PIN   equ PCB_BASE+PORT2_PIN

.CODE

readEElatch macro
    in   al, dx
endm

writeEElatch macro
    mov   ah, 0
    out   dx, al
endm

readEEcs macro
    add  dx, EEPROM_CS_LATCH-EEPROM_LATCH
    in   al, dx
endm

writeEEcs macro
    mov   ah, 0
    out   dx, al
    add   dx, EEPROM_LATCH-EEPROM_CS_LATCH
endm

readEEpin macro
    add   dx, EEPROM_PIN-EEPROM_LATCH
    in    al,dx
    mov   ah, 0
    add   dx, EEPROM_LATCH-EEPROM_PIN
endm

writeEEbit proc ; write a 0 if Zero flag is on, 1 otherwise
    ; assumes that DX is pointing to the EEPROM_LATCH register
    readEElatch     ; doesn't affect the zero flag
    jz    write0
    or    al, EEDATA
    jmp   writeIt
write0:
    and   al, not EEDATA
writeIt:
    writeEElatch
    or    al, EESK          ; bop the clock up...
    writeEElatch

    jmp   $+2

    and   al, not EESK      ; ...and then down again.
    writeEElatch

    readEElatch
    or    al, EEDATA        ; leave DATA bit high
    writeEElatch

    ret
writeEEbit endp

readEEbit proc
    ; assumes that DX is pointing to the PORT2_LATCH register in the PCB
    ; carry is set if a one, reset otherwise

    readEElatch                 ; bop the Serial clock up ...
    or    al, EESK
    writeEElatch

    jmp   $+2

    readEElatch                 ; ... and down, to get the data out
    and   al, not EESK
    writeEElatch

    readEEpin                   ; get the pins now
    rcl   al, 2                 ; bit 6 now in carry
    ret
readEEbit endp

; sendEEdata: write a word to the EEPROM. deselects the EEPROM when done
sendEEdata proc uses dx ax cx bx, value:WORD
    mov   dx, EEPROM_LATCH

    mov   bx, value
    mov   cx, 08000h            ; we send MSBit first
writeword:
    test  bx, cx
    call  writeEEbit
    rcr   cx, 1
    jnc   writeword             ; when carry is set, we've done 16 bits.

    readEEcs
    and   al, not EECS
    writeEEcs                   ; now it's de-selected

    readEElatch
    or    al, EEDATA            ; Zero flag is reset...
    writeEElatch

    call  writeEEbit            ; ...kick the programming, let it float high
    ret
sendEEdata endp
```

```
; readEEdata: read 16 bits from the EEPROM.  Deselects the chip.
readEEdata proc uses dx bx
    mov   dx, EEPROM_LATCH         ; where we'll be writing to

    mov   bx, 1h                   ; a guard bit
readword:
    call  readEEbit                ; get a bit
    rcl   bx, 1
    jnc   readword                 ; until the guard bit falls off

    readEEcs
    and   al, not EECS
    writeEEcs                      ; now it's de-selected

    mov   ax, bx
    ret
readEEdata endp

; sendEEcmd: send a command and "address" to the EEPROM.
; Leaves the EEPROM selected for further data in or out.
sendEEcmd proc uses dx ax cx bx, command:WORD, address:WORD
    mov   dx, EEPROM_LATCH

    readEEcs
    or    al, EECS
    writeEEcs                 ; now it's selected

    mov   bx, command
    or    bl, 04h         ; so we have a start bit
    mov   cx, 04h         ; we start testing here
writecmd:
    test  bl, cl
    call  writeEEbit
    rcr   cl, 1
    jnc   writecmd

    mov   bx, address     ; where we want to read or write
    mov   cl, 080h        ; take the bits from the top
writeaddr:
    test  bl, cl
    call  writeEEbit
    rcr   cl, 1
    jnc   writeaddr

    readEElatch
    or    al, EEDATA      ; let the data float high
    writeEElatch
    ret
sendEEcmd endp

waitForEEready proc uses bx
    mov   bx,0
    mov   dx, EEPROM_LATCH
    readEEcs
    or    al, EECS
    writeEEcs             ; select the chip
spinlow:
    inc   bx
    readEEpin
    and   al, EEDATA
    je spinlow            ; when the line goes high we can return

    readEEcs
    or    al, EECS
    writeEEcs             ; SELECT the chip (NOT deselect!)
    mov   ax,bx
    ret
waitForEEready endp

end
```

```
.186
.model large, C
include mem_map.inb

; basic functions for driving the 4 LEDs on the MPC/r "front panel"
;
; functions are: TurnLEDon, TurnLEDoff, and ToggleLED.
;

.data

ledBits label byte
    db      0

LED_BIT_MASK  equ 0F0h

.code

nGetLEDs proc
    mov al,ledBits
    xor ah,ah
    ret
nGetLEDs endp

TurnLEDon proc uses ax, led_mask:byte ; bit(n)==1 -> LED(n) is on.
    mov ah, led_mask
    and ah, LED_BIT_MASK
    pushf
    cli
    or  ledBits, ah
    mov al, ledBits
    out LED_START,al
    popf
    ret
TurnLEDon endp

TurnLEDoff proc uses ax, led_mask:byte ; bit(n)==1 -> LED(n) is off.
    mov ah, led_mask
    and ah, LED_BIT_MASK
    xor ah, LED_BIT_MASK
    pushf
    cli
    and ledBits, ah
    mov al, ledBits
    out LED_START, al
    popf
    ret
TurnLEDoff endp

ToggleLED proc uses ax, led_mask:byte ; bit(n)==1 -> flip LED(n).
    mov ah, led_mask
    and ah, LED_BIT_MASK
    pushf
    cli
    xor ledBits, ah
    mov al, ledBits
    out LED_START, al
    popf
    ret
ToggleLED endp

end
```

```
#include "basetype.hb"

#include "pcb.hb"
#include "pcb_bits.hb"
#include "mem_map.hb"
#include "serial.hb"
#include <conio.h>

/* arrays for the peripheral control block.  This is just arrays of words
 * to be copied to the pcb.  The start up routine does this before calling
 * the C main() function.
 */

static unsigned int inCS misc_init[] =
{
    INTERRUPT_MASK,  0x00FD,  // all interrupts masked off!

    PORT1_LATCH,     0x00DF,  // P1.0 high - DTMF chip select
                              // P1.1 high - no programming on FLASHROM
                              // P1.2 high - Modem chip select
                              // P1.3 high - Don't powerdown
                              // P1.4 high - LED latch enable (don't care)
                              // P1.5 low  - EEPROM c.s. inactive      |
                              // P1.6 high - On-hook Disabled          |
                              // P1.7 high - Radio DTR inactive        |
    PORT1_CONTROL,   0x0015,  // P1.4 is LED latch enable GCS(4) <-+
                              // P1.2 is Modem chip select
                              // P1.0 is DTMF chip select
                              //
    PORT2_DIR,       0x0000,  // P2.6 and P2.7 set to OUTPUT
                              // there are no other control bits here.
                              //
    PORT2_LATCH,     0x00FF,  //
                              // P2.1 low (Printer RTS is active)
                              // All other bits high for low power
                              // consumption in their inactive states.
                              //
    PORT2_CONTROL,   0x000A,  // P2.6,7 LATCH bits drive the pins
                              // All other pins float when latch bits are high
                              //
                              // P2.3, P2.1 are set up for Port 1 serial I/O
                              //
                              // serial port 0 - 9600,8,N,1 enabled
    SERIAL0_BAUD,    INTERNAL_CLOCK|BAUD_INTERNAL_COMPARE(9600L),
    SERIAL0_CONTROL, 0x0031,

                              // serial port 0 - 1200,7,E,1 enabled
    SERIAL1_BAUD,    INTERNAL_CLOCK|BAUD_INTERNAL_COMPARE(1200L),
    SERIAL1_CONTROL, 0x0039,

    GCS_START(0),    DTMF_START, // set the DTMF chip select
    GCS_STOP(0),     DTMF_START+DTMF_SIZE|SELECT_ENABLE,
    GCS_START(2),    MODEM_START,// set the Modem chip select
    GCS_STOP(2),     MODEM_START+MODEM_SIZE|SELECT_ENABLE,
    GCS_START(4),    LED_START,  // set the LED latch chip select
    GCS_STOP(4),     LED_START+LED_SIZE|SELECT_ENABLE,
    0x0000                       // end of table
};


/*
 * NOTE: the internal clock for the serial chips is CLKIN/2 or 16 MHz
 */

void
initializePCB( void )
{
    unsigned int where;
    int inCS *entry;

    for( entry = misc_init; where = *entry++; ++entry )
        outpw( where + PCB_BASE, *entry );
}
```

```
#include "basetype.hb"

// #define DEFINE_GLOBALS
#include "testing.h"

#define SIGNAL_WAITING_MAX      32
static volatile int nSignal[STATE_MACHINE_MAX][SIGNAL_WAITING_MAX];
static volatile int nSignalIn[STATE_MACHINE_MAX];
static volatile int nSignalOut[STATE_MACHINE_MAX];

#define SIG_EMPTY     (nSignalOut[nStateMachine] == nSignalIn[nStateMachine])
#define SIG_NEXT_IN   ((nSignalIn[nStateMachine] +1) & (SIGNAL_WAITING_MAX-1))
#define SIG_NEXT_OUT  ((nSignalOut[nStateMachine]+1) & (SIGNAL_WAITING_MAX-1))
#define SIG_IN        nSignalIn[nStateMachine]
#define SIG_OUT       nSignalOut[nStateMachine]

void
vSignalInitialize(void)
{
    int i;
    for ( i = 0; i < SIGNAL_WAITING_MAX; ++i )
    {
        nSignalIn[i] = nSignalOut[i] = 0;
    }
}

int
nSendSignal(int nSignalValue, int nStateMachine)
{
    int nNextIn;
    int nUPflags;
    int nReturnValue = nSignalValue;

    // check for a correct state machine number
    if ( nStateMachine < 0 || nStateMachine >= STATE_MACHINE_MAX )
        nReturnValue = BAD_STATE_MACHINE;
    else
    {
        _asm
        {
            pushf
            pop     ax
            mov     nUPflags,ax
            cli
        }

        // check if state machine is full.
        nNextIn = SIG_NEXT_IN;
        if ( nNextIn == SIG_OUT )
            nReturnValue = SIGNALS_FULL;
        else
        {
            nSignal[nStateMachine][SIG_IN] = nSignalValue;
            SIG_IN = nNextIn;
        }

        _asm
        {
            mov     ax, nUPflags
            push    ax
            popf
        }
    }
    return( nReturnValue );
}

int
nGetSignalWaiting( int nStateMachine )
{
    int nUPflags;
    int nReturnSignal = SIGNAL_NONE;

    // check for a correct state machine number
    if ( nStateMachine < 0 || nStateMachine >= STATE_MACHINE_MAX )
        nReturnSignal = BAD_STATE_MACHINE;
    else if ( !SIG_EMPTY )
    {
        nReturnSignal = nSignal[nStateMachine][SIG_OUT];

        _asm
        {
            pushf
            pop     ax
            mov     nUPflags,ax
            cli
        }

        SIG_OUT = SIG_NEXT_OUT;

        _asm
        {
            mov     ax, nUPflags
            push    ax
            popf
        }
    }
    return( nReturnSignal );
}
```

```
        NAME MSC_START_UP_CODE          ; startup.asm, version 6.0b
.186    ; for the MPC only!
;
; Copyright (c) 1987-1990, Systems & Software, Inc. All rights reserved.
;
; This file contains sample start-up code for building a Microsoft C
; application for an embedded environment.
;
; This source file may be used only if your C application does not use
; floating point math.
; Use the start-up file emstup.asm if you are using the floating
; point emulation (compiled with the /FPi option).
; Use the start-up file alstup.asm if you are using the floating
; point alternat math emulation (compiled with the /FPa option).
; Use the start-up file c7stup.asm if you are using an 8087 math
; coprocessor (compiled with the /FPi87 option).
;
; You need to modify this file to adapt it to your embedded environment.
; The places for you to make changes are marked with comment lines filled
; with asterisks (*****).
;
; ******************************************************************************
; You may use this start-up code for any memory model.
; Choose the memory model by setting the constant MODEL_ to an
; appropriate value.
; MODEL_  EQU   1 => small model
; MODEL_  EQU   2 => compact model
; MODEL_  EQU   3 => medium model
; MODEL_  EQU   4 => large model, default setting
; MODEL_  EQU   5 => huge model
; ******************************************************************************
;

include mem_map.inb
include pcb.inb
include pcb_bits.inb

extrn _TurnLEDon:far, _TurnLEDoff:far

        PUBLIC MODEL_
IFDEF MODELS    ; small memory model...
if1
%OUT Assembling for SMALL Model
endif
MODEL_  EQU     1
ENDIF
IFDEF MODELM    ; medium memory model...
if1
%OUT Assembling for MEDIUM Model
endif
MODEL_  EQU     3
ENDIF
IFDEF MODELL    ; large memory model...
if1
%OUT Assembling for LARGE Model
endif
MODEL_  EQU     4
ENDIF
```

File: src\STARTUP.ASM

```
; ******************************************************************************
; Choose the target CPU
; CPU86 EQU 0 IF target CPU is 80186 or 80188.
; CPU86 EQU 1 IF target CPU is 8086 or 8088.
; CPU86 EQU 2 IF target CPU is 80186EB or 80188EB.
; ******************************************************************************
;
CPU86   EQU     2       ; Default setting is 1.

; ******************************************************************************
; Specify stack size.
; ******************************************************************************
;
STACK_SIZE      EQU     0A00H ; Reserve 5K bytes of stack (2.5K WORDS)

; ******************************************************************************
; Place EXTRN statements for interrupt handling routines outside
; of all SEGMENT/ENDS pairs.
; ******************************************************************************
; For example, suppose you have an interrupt handling routine written in C
; with the function name int_hdlr().
; In order for you to reference the routine in this file, you should declare
; _int_hdlr as an external reference (note that the C compiler prefixes an
; underscore character to the function name).  The declaration should be
; placed outside of all SEGMENT/ENDS pairs as follows:
;       EXTRN _int_hdlr:FAR
; Refer to the sample code below that initializes the interrupt vector table.
;
; ******************************************************************************
; For embedded system applications, your application is burned into one
; or more eprom.  In order to boot your system at power-up or reboot at
; hardware reset, you must place an opcode equivalent to a far jump
; instruction at absolute address FFFF0H.  The CPU will execute
; this instruction upon a hardware reset or power-up.  The instruction
; jumps to the system initialization routine.  This piece of code is called
; bootstrap code.
;
; There are two ways to include the bootstrap code in your application:
;
; (1) Specify the BOOTSTRAP control in the locator command line,
;
; If you look at the locator's map file (.MP2 file), a segment named
; UNNAME is generated by the locator at address 0FFFF0H which
; contains the bootstrap code.  The bootstrap code is equivalent to a
; far jump instruction to the label START_.
;
; or
;
; (2) Specify an absolute segment in this source file, such as:
; BOOTSTRAP SEGMENT AT 0FFFFH
;       JMP FAR PTR START_
; BOOTSTRAP ENDS
;
; NOTE:
;       The bootstrap code is not needed when you are debugging with a
;       debugger, such as SoftProbe II/TX target debugger or an in-circuit
;       emulator.  You add this code when you are ready to burn eproms.
;
```

```
; ******************************************************************************
;
;
; The primary function of the start-up code is to set up the run-time
; environment before passing control to C function main().
; The start-up code performs the following functions:
; 1) Initialize hardware and check RAM.
; 2) Copy initializers from ROM to RAM to setup initialized program variables
;    to proper initial values.
; 3) Zero all uninitialized program variables.
; 4) Initialize interrupt vector table, if necessary.
; 5) Setup data segment.
; 6) Setup stack segment.
; 7) Pass control to C function main().
;
; This assembly file is called startup.asm.  You should use the Microsoft MASM
; assembler, version 4 and up.  For example,
;       masm /Mx startup,startup,startup,nul
; The /Mx option is needed to preserve lower-case in public and external names.
;
        PUBLIC  __acrtused
__acrtused      EQU     1
; The symbol __acrtused has to be in lower-case.  Starting from version 4,
; when the Microsoft C optimizing compiler compiles a C file, it places an
; external reference to this symbol in the object file.  The public definition
; of __acrtused is contained in an object module called crt0.  This module is
; placed in the Microsoft C run-time library file.  This module contains the
; start-up code for the DOS environment.  So when you link your C object files
; with the run-time library file, the linker will extract the start-up object
; module from the run-time library file to satisfy the external references.
; As a result, the start-up code for DOS environment will be included in the
; linker output.
; If you do not make use of any function supplied in the run-time library
; file, you do not link with the library file at all.  Then you have to
; include a public definition of __acrtused in this file to resolve all the
; external references in the C object files.
; Even though you are building an application for an embedded environment,
; sometimes you may want to link with the run-time library file.  The reason
; is that the run-time library file contains both DOS-dependent functions,
; such as printf(), and DOS-independent functions, such as strcpy().  If you
; want to make use of certain DOS-independent functions that are contained in
; the run-time library file, you would link with the library file.  If the
; link map shows that the linked module contains the crt0 module, you know
; that you have linked in some DOS-dependent functions from the run-time
; library file.
; Make sure you specify this start-up file as the first object file
; in the linker command line, then the other object files and place the
; modified combined run-time library file as the last file.
;
; The following memory map shows a typical run-time environment of an embedded
; application developed using the Microsoft C optimizing compiler.
; It will help you understand the start-up code presented in this file.
; The naming convention of class names presented here conforms with the
; Microsoft C optimizing compiler, version 4 and up.  The names enclosed in
; single quotes are class names of segments.
;
;  High address
;  -           ----------------
;  |           |              |
;  |  FFFF:0   ---------------- <-- Bootstrap code (JMP FAR PTR START_)
;  |           :              :
;  |           ---------------- <--
;  |           | [FAR_DATA]   |  ^ This area of ROM contains initializers that
;  |           ----------------  | are used by start-up routine to initialize
;  |           | [CONST]      |  | segments with these class names in RAM at
;  |           ----------------  | power-up.
;  |           | [DATA]       |  | (The INITDATA control causes the PROM86
;  R           ----------------  | utility to place initializers between address
;  O           | [DATA_BEG]   |  v labels _bdata and _edata and between _bfdata
;  M           ---------------- <-- and _efdata in this area of ROM)
;  |           | 'CODE_END'   | <---- This class contains only one segment of zero
;  |  _etext   ----------------        length. Initializers are located at _etext.
;  |           | 'CODE'       | <-- Text segments with class name CODE.
;  |  _start_  ----------------
;  -  START_   :              :
;              :              :
;  -           :              :
;  |           ---------------- <---- End of DGROUP (size of DGROUP <= 64K bytes)
;  |           | 'STACK'      | <-- This class contains the stack.
;  |           ----------------
;  |           | 'BSS_END'    |
;  |  _end     ----------------
;  |           | 'BSS'        | <-- This class contains uninitialized data.
;  |           ----------------
;  |           | 'DATA_END'   |
;  |  _edata   ---------------- <----
;  |           | 'CONST'      |  ^ These three classes of segments are to be
;  R           ----------------  | initialized with initializers in ROM
;  A           | 'DATA'       |  | by start-up routine at power-up.
;  M           ----------------  |
;  |           | 'DATA_BEG'   |  v
;  |  _bdata   ---------------- <---- Start of DGROUP
;  |           |'HUGE_BSS_END'|
;  |  _ehbss   ----------------
;  |           | 'HUGE_BSS'   | <-- This class contains uninitialized data.
;  |           ----------------
;  |           |'HUGE_BSS_BEG'|
;  |  _bhbss   ----------------
;  |           | 'FAR_BSS_END'|
;  |  _efbss   ----------------
;  |           | 'FAR_BSS'    | <-- This class contains uninitialized data.
;  |           ----------------
;  |           | 'FAR_BSS_BEG'|
;  |  _bfbss   ----------------
;  |           |'FAR_DATA_END'|
;  |  _efdata  ----------------
;  |           | 'FAR_DATA'   | <-- This class contains initialized data.
;  |           ----------------
;  |           |'FAR_DATA_BEG'|
;  |  _bfdata  ----------------
;  |           :              :
;  |           ----------------
;  |           |              | <-- The interrupt vector table should be
;  -    0:0    ----------------     initialized by start-up routine at power-up.
```

```
;  Low address
;
; NOTE:
;       It is important to maintain the order of SEGMENTS/ENDS pairs as shown
;       below.
;
;       Text segments all have class name CODE.  They contain program code
;       which is machine instructions generated by the compiler.
;
;       Data segments with class names DATA_BEG, DATA, CONST, BSS and STACK
;       belong to a group named DGROUP.  Since these segments belong to
;       a group, it follows that the total memory space occupied by them
;       cannot exceed 64K bytes.
;
;       The object files may contain data segments with class names
;       FAR_DATA, FAR_BSS and HUGE_BSS.
;       These classes of segments are generated by the Microsoft C
;       optimizing compiler to support 'far' and 'huge' data objects.
;       Check your C manual for details.
;
;       Data segments with class names FAR_BSS and HUGE_BSS contain
;       'far' and 'huge' uninitialized data, respectively. These segments
;       do not belong to any group.  They should be located before
;       the group DGROUP in the RAM space of your target system.  The
;       advantage of locating these segments before DGROUP is that you may
;       use the memory space from the end of STACK segment to the end of
;       RAM as heap to implement your own memory allocation scheme.
;
;       For 'huge' data objects, multiple segments may be generated by the
;       C compiler to hold a single data object that is greater than 64K
;       bytes in size.  These segments must be located together in proper
;       order.
;
;       Data segments with class name FAR_DATA contain 'far' and 'huge'
;       initialized data.  They should also be located before the group
;       DGROUP in the RAM space of your target system.
;
;       When you prepare data file for programming eprom, the initializers
;       for segments with class names DATA_BEG, DATA, CONST and FAR_DATA
;       have to be placed in ROM addresses above the CODE_END class.
;       The INITDATA control of PROM86, version 5.2 and up, performs this
;       operation for you.  At power-up, the start-up routine will copy these
;       initializers from ROM to initialize the appropriate variables in RAM.
;
;       In order to make use of the INITDATA control in PROM86, you
;       must preserve the following public labels in this start-up file:
;       _bfdata - beginning of initializers in FAR_DATA class
;       _efdata - end of initializers in FAR_DATA class
;       _bdata  - beginning of initializers in DGROUP group
;       _edata  - end of initializers in DGROUP group
;       _etext  - end of code
;
;       If you want PROM86 to determine the extraction address range,
;       i.e. the ADDRESSES option is not specified in PROM86 v6.0, you must
;       preserve the public label _start_ in this start-up file.
;
;       In addition to the above labels, the routine in this start-up file
;       uses the following public labels:
;       _end    - end of uninitialized data in BSS class
;       _bfbss  - beginning of uninitialized data in FAR_BSS class
;       _efbss  - end of uninitialized data in FAR_BSS class
;       _bhbss  - beginning of uninitialized data in HUGE_BSS class
;       _ehbss  - end of uninitialized data in HUGE_BSS class

BEGFDATA SEGMENT PARA PUBLIC 'FAR_DATA_BEG'
        PUBLIC _bfdata
_bfdata LABEL BYTE          ; This label marks the beginning of initialized data
                            ; in FAR_DATA class.
BEGFDATA ENDS
;
FAR_DATA_START SEGMENT PARA PUBLIC 'FAR_DATA'
FAR_DATA_START ENDS

; By default, the locator places segments with the
; same class name together.
; The purpose of the FAR_DATA_START segment is to cause the locator
; to locate all segments with class name FAR_DATA that contain
; initialized variables between the BEGFDATA and ENDFDATA segments.

ENDFDATA SEGMENT PARA PUBLIC 'FAR_DATA_END'
        PUBLIC _efdata
_efdata LABEL BYTE          ; This label marks the end of initialized data
                            ; in FAR_DATA class.
ENDFDATA ENDS

BEGFBSS SEGMENT PARA PUBLIC 'FAR_BSS_BEG'
        PUBLIC _bfbss
_bfbss LABEL BYTE           ; This label marks the beginning of uninitialized
                            ; data in FAR_BSS class.
BEGFBSS ENDS
;
FAR_BSS_START SEGMENT PARA PUBLIC 'FAR_BSS'
FAR_BSS_START ENDS

; By default, the locator places segments with the same class name
; together.
; The purpose of the FAR_BSS_START segment is to cause the locator to locate
; all segments with class name FAR_BSS between the BEGFBSS and ENDFBSS
; segments.
; Segments with class name FAR_BSS contain uninitialized variables.

ENDFBSS SEGMENT PARA PUBLIC 'FAR_BSS_END'
        PUBLIC _efbss
_efbss LABEL BYTE           ; This label marks the end of uninitialized data
                            ; in FAR_BSS class.
ENDFBSS ENDS

BEGHBSS SEGMENT PARA PUBLIC 'HUGE_BSS_BEG'
        PUBLIC _bhbss
_bhbss LABEL BYTE           ; This label marks the beginning of uninitialized
                            ; data in HUGE_BSS class.
BEGHBSS ENDS

HUGE_BSS_START SEGMENT PARA PUBLIC 'HUGE_BSS'
```

```
HUGE_BSS_START ENDS

; By default, the locator places segments with the same class name
; together.
; The purpose of the HUGE_BSS_START segment is to cause the locator to locate
; all segments with class name HUGE_BSS between the BEGHBSS and ENDHBSS
; segments.
; Segments with class name HUGE_BSS contain uninitialized variables.

ENDHBSS SEGMENT PARA PUBLIC 'HUGE_BSS_END'
        PUBLIC _ehbss
_ehbss LABEL BYTE       ; This label marks the end of uninitialized data
                        ; in HUGE_BSS class.
ENDHBSS ENDS

DGROUP GROUP NULL,_DATA,CONST,ENDDATA,_BSS,ENDBSS,STACK

NULL SEGMENT PARA PUBLIC 'DATA_BEG'
; This segment contains 8 bytes of zeros.  If a (DS:0) null pointer assignment
; occurs, these byte locations will be overwritten.  You may implement your
; own routine to check for null pointer assignment.
        PUBLIC _bdata   ; This label marks the beginning of initialized data.
_bdata  LABEL BYTE
        DB 8 DUP (0)
NULL ENDS

_DATA SEGMENT WORD PUBLIC 'DATA'
; Segment with class name DATA contains initialized variables.

        PUBLIC _asizds
_asizds label word
        dw 0,0

        PUBLIC _errno
_errno label word
        dw 0

_DATA ENDS

CONST SEGMENT WORD PUBLIC 'CONST'
; Segment with class name CONST contains constants.
CONST ENDS

ENDDATA SEGMENT PARA PUBLIC 'DATA_END'
        PUBLIC _edata
_edata  LABEL BYTE      ; This label marks the end of initialized data.
ENDDATA ENDS

_BSS    SEGMENT WORD PUBLIC 'BSS'
; Segment with class name BSS contains uninitialized variables.
_BSS    ENDS

ENDBSS  SEGMENT WORD PUBLIC 'BSS_END'
        PUBLIC _end
_end    LABEL BYTE      ; This label marks the end of uninitialized data.
ENDBSS  ENDS
```

```
STACK   SEGMENT PARA STACK 'STACK'
        DW STACK_SIZE DUP (?)
stack_top LABEL WORD
        PUBLIC _stackTopper
_stackTopper LABEL WORD
STACK   ENDS

IF MODEL_ LE 2  ;SMALL OR COMPACT MODEL
_TEXT SEGMENT PARA PUBLIC 'CODE'
        EXTRN   _main:NEAR      ;C main()
        EXTRN   _SoftwareVersion:DWORD
ASSUME  CS:_TEXT
ENDIF
IF MODEL_ GE 3  ;MEDIUM OR LARGE OR HUGE MODEL
        EXTRN   _main:FAR       ;C main()
        EXTRN   _SoftwareVersion:DWORD
STARTUP_TEXT SEGMENT PARA PUBLIC 'CODE'
ASSUME  CS:STARTUP_TEXT
ENDIF

        ASSUME DS:DGROUP, SS:DGROUP
        PUBLIC START_
START_:
        PUBLIC _start_          ;Must be paragraph aligned (i.e. offset is 0)
        PUBLIC _init_begin      ;after our hop
_start_:                        ;and the address where program code starts.
        CLI
        jmp _init_begin
; ******************************************************************************
; Place code here to do hardware initialization and RAM check
; ******************************************************************************
;
; Perform variable initialization.  Initializers are copied from ROM to RAM.
;
; Your program will contain segments with class names DATA_BEG, DATA and CONST
; which contain initialized variables.  Since these variables may be modified
; at run-time, the segments containing them have to be located in RAM space.
; When the main function of your C program takes control, it expects
; all variables in these classes of segments to be initialized.
; For embedded systems, the initializers for these variables have to be placed
; in ROM space which are copied to the segments in RAM space by the start-up
; routine at power-up.
; When you use PROM86, v5.2 and up, to prepare an output file for burning an
; eprom, you need to specify the INITDATA control.  The INITDATA control
; causes PROM86 to place all initializers at address _etext in the
; output file.  The start-up routine assumes these initializers are placed
; above program code in ROM and copy them to RAM at power-up.

; MPC specific stuff.  The following four words are used by the BIOS to
; determine what the top of Program RAM and ROM are for the memory allocation
; routines.
        dw SEG _etext, OFFSET DGROUP:_edata     ; for the Flash ROM
        dw SEG _bdata, OFFSET DGROUP:STACK_TOP  ; for the RAM
        dw OFFSET _SoftwareVersion, SEG _SoftwareVersion

        PUBLIC _init_begin
_init_begin:
```

```
        CLD

;********************** DEBUG! clear all of DATA RAM to 00's
;       Transfer Count

        mov ax,0040h            ; get CX=PARA of top of RAM
        mov es,ax
        mov cx,es:[0]           ; from 0040:0000 (set by boot rom)

        dec cx                  ; fill RAM with zero's to last para of RAM

        MOV AX,SEG _bfdata
        MOV ES,AX
        SUB CX,AX               ; Compute size in paragraphs
        JCXZ store00end         ; Nothing to FF fill

        MOV DI,0
;       Transfer Count
        MOV AX,CX
z00loop: CMP AX,1000H           ; More than 64K bytes to initialize?
        JBE last00seg           ; No

        MOV CX,8000H            ; Prepare to store 8000H zero words
        SUB AX,1000H            ;
        MOV BX,AX               ; Saves transfer count
        JMP SHORT store00seg

last00seg:
        MOV CL,3
        SHL AX,CL               ; Number of WORDs = paragraph * 8
        MOV CX,AX               ; Set up transfer count in terms of WORDs
        MOV AX,0                ; No more to transfer
        MOV BX,AX               ; Saves transfer count
store00seg:
        MOV AX,0
REP     STOSW                   ; Initialize WORDs to FF
        MOV AX,BX               ; Restore transfer count
        CMP AX,0                ; Any more data to transfer?
        JE store00end           ; No
        ; Adjust Destination pointers
        MOV AX,ES
        ADD AX,1000H
        MOV ES,AX
        MOV DI,0
        MOV AX,BX               ; Restore transfer count
        JMP z00loop
store00end:


;       Transfer Count
        MOV AX,OFFSET DGROUP:_edata     ; Transfer counter
        CMP AX,0
        JZ no_init_data

        MOV CX,AX
;       Destination
        MOV AX,SEG _bdata
        MOV ES,AX               ; Destination ES:[DI]
        MOV DI,0                ; Start of initialized variable area in RAM
;       Source
        MOV AX,SEG _etext       ; Source DS:[SI]
        MOV DS,AX               ; Start of initializer storage in ROM
        MOV SI,0
;       Begin BYTE transfer
REP     MOVSB                   ; Begin byte transfer from ROM to RAM
no_init_data:
;   Clear uninitialized data area in DGROUP group

        MOV AX,SEG DGROUP
        MOV ES,AX
        MOV CX,OFFSET DGROUP:_end ; End of 'BSS' class in RAM
        MOV DI,OFFSET DGROUP:_edata ; Start of 'BSS' class in RAM
        SUB CX,DI               ; Size of 'BSS' class in bytes
        JCXZ no_uninit_data

        MOV AX,0                ; Initialize to 0
REP     STOSB
no_uninit_data:
;   Initialize FAR_DATA data in RAM with initializers stored in ROM

;       Transfer Count
        MOV AX,SEG _bfdata
        MOV CX,SEG _efdata
        SUB CX,AX               ; Compute size of FAR_DATA segments in paragraphs
        JCXZ loopend            ; No FAR_DATA class
        MOV DX,CX               ; Saves transfer count in paragraphs
;       Destination
        MOV ES,AX               ; Destination ES:[DI]
        MOV DI,0                ; Start of FAR_DATA class in RAM
;       Source
        MOV AX,SEG _etext       ; Source DS:[SI]
        MOV DS,AX               ; Start of FAR_DATA initializer storage in ROM
        MOV SI,OFFSET DGROUP:_edata     ; _edata is paragraph aligned
;       Normalize Source Pointer
        MOV AX,SI               ; Process base of source pointer
        MOV CL,4
        SHR AX,CL               ; Divide by 16
        MOV BX,AX
        MOV AX,DS
        ADD AX,BX
        MOV DS,AX               ; Adjust base of source pointer
        MOV SI,0                ; Offset of source pointer is zero
        MOV AX,DX               ; Restore transfer count in paragraphs
loopbegin:
        CMP AX,1000H            ; More than 64K bytes to transfer?
        JBE lastxfer            ; No
        MOV CX,8000H            ; Prepare to transfer 8000H words
        SUB AX,1000H            ;
        JMP SHORT xferbegin
lastxfer:
        MOV CL,3
        SHL AX,CL               ; Number of WORDs = paragraph * 8
        MOV CX,AX               ; Set up transfer count in terms of WORDs
        MOV AX,0                ; No more to transfer
```

```
xferbegin:
REP     MOVSW               ; Transfer WORDs from ROM to RAM
        CMP AX,0            ; Any more data to transfer?
        JE loopend          ; No
        ; Adjust Source and Destination pointers
        MOV BX,AX           ; Saves transfer count
        MOV AX,DS
        ADD AX,1000H
        MOV DS,AX
        MOV AX,ES
        ADD AX,1000H
        MOV ES,AX
        MOV SI,0
        MOV DI,0
        MOV AX,BX           ; Restores transfer count
        JMP loopbegin
loopend:

;   Clear uninitialized data area in FAR_BSS class
;       Transfer Count
        MOV AX,SEG _bfbss
        MOV CX,SEG _efbss
        SUB CX,AX           ; Compute size of FAR_BSS segments in paragraphs
        JCXZ loopfend       ; No FAR_BSS class

;       Destination
        MOV ES,AX           ; Destination ES:[DI]
        MOV DI,0            ; Start of FAR_BSS class in RAM
;       Transfer Count
        MOV AX,CX
loopfbegin:
        CMP AX,1000H        ; More than 64K bytes to initialize?
        JBE lastfxfer       ; No

        MOV CX,8000H        ; Prepare to transfer 8000H words
        SUB AX,1000H        ;
        MOV BX,AX           ; Saves transfer count
        JMP SHORT xferfbegin
lastfxfer:
        MOV CL,3
        SHL AX,CL           ; Number of WORDs = paragraph * 8
        MOV CX,AX           ; Set up transfer count in terms of WORDs
        MOV AX,0            ; No more to transfer
        MOV BX,AX           ; Saves transfer count
xferfbegin:
        MOV AX,0
REP     STOSW               ; Initialize WORDs to zero
        MOV AX,BX           ; Restore transfer count
        CMP AX,0            ; Any more data to transfer?
        JE loopfend         ; No
        ; Adjust Destination pointers
        MOV AX,ES
        ADD AX,1000H
        MOV ES,AX
        MOV DI,0
        MOV AX,BX           ; Restore transfer count
        JMP loopfbegin
loopfend:

;   Clear uninitialized data area in HUGE_BSS class
;       Transfer Count
        MOV AX,SEG _bhbss
        MOV CX,SEG _ehbss
        SUB CX,AX           ; Compute size of HUGE_BSS segments in paragraphs
        JCXZ loophend       ; No HUGE_BSS class

;       Destination
        MOV ES,AX           ; Destination ES:[DI]
        MOV DI,0            ; Start of HUGE_BSS class in RAM
;       Transfer Count
        MOV AX,CX
loophbegin:
        CMP AX,1000H        ; More than 64K bytes to initialize?
        JBE lasthxfer       ; No

        MOV CX,8000H        ; Prepare to transfer 8000H words
        SUB AX,1000H        ;
        MOV BX,AX           ; Saves transfer count
        JMP SHORT xferhbegin
lasthxfer:
        MOV CL,3
        SHL AX,CL           ; Number of WORDs = paragraph * 8
        MOV CX,AX           ; Set up transfer count in terms of WORDs
        MOV AX,0            ; No more to transfer
        MOV BX,AX           ; Saves transfer count
xferhbegin:
        MOV AX,0
REP     STOSW               ; Initialize WORDs to zero
        MOV AX,BX           ; Restore transfer count
        CMP AX,0            ; Any more data to transfer?
        JE loophend         ; No
        ; Adjust Destination pointers
        MOV AX,ES
        ADD AX,1000H
        MOV ES,AX
        MOV DI,0
        MOV AX,BX           ; Restore transfer count
        JMP loophbegin
loophend:

        PUBLIC _init_done
_init_done:
; ****************************************************************************
; Initialize the interrupt vector table here
; ****************************************************************************
; Interrupt types 0 to 4 are dedicated internal interrupts.
; Type 0 - Divide-error
; Type 1 - Single-step
; Type 2 - Non-maskable interrupt
; Type 3 - 1-byte INT instruction or Breakpoint
; Type 4 - Overflow
; Interrupt types 5 to 31 are reserved internal interrupts.
; Interrupt types 32 to 255 are available for use.
;
```

```
; For example:
;   The interrupt handling routine for vector 32 decimal is assumed to
;   be the C function: void interrupt far int_hdlr().
;   The statement declaring code label _int_hdlr as an external far procedure
;   has to be placed outside of all SEGMENT/ENDS pairs.
;   See the sample EXTRN statement above.  It is behind the GROUP statement.
;   Below is the sample code to initialize an entry in the vector table:
;
;       TYPE32 EQU 32
;       MOV AX,0
;       MOV ES,AX       ;Reference base of interrupt vector table
;       MOV AX,OFFSET _int_hdlr
;       MOV ES:WORD PTR TYPE32*4,AX    ;Offset portion of vector 32
;       MOV AX,SEG _int_hdlr
;       MOV ES:WORD PTR TYPE32*4+2,AX ;Base portion of vector 32
;

; Setup data and stack segment here

        MOV AX,DGROUP
        MOV DS,AX               ; Setup data segment
        ASSUME DS:DGROUP
        MOV SS,AX               ; Setup stack pointer
        MOV SP,OFFSET DGROUP:_stackTopper
        ASSUME SS:DGROUP

        mov _asizds+2, ss       ; store memory allocation pointer
        mov _asizds+0, sp

        ; disable all interrupt sources except internal serial port

        mov dx,PCB_BASE+INTERRUPT_MASK
        mov ax,000F9h
        out dx,ax

        ; clear any interrupt conditions
        mov dx,PCB_BASE+END_OF_INT
        mov ax,NSPEC_EOI_ENABLE
        out dx,ax               ; timers ...
        out dx,ax               ; serial ...
        out dx,ax               ; external ...

        STI                     ; Enable interrupt now

        CALL _main              ; Pass control to C main() function

        HLT
IF MODEL_ LE 2  ;SMALL OR COMPACT MODEL
_TEXT   ENDS
ENDIF
IF MODEL_ GE 3  ;MEDIUM OR LARGE OR HUGE MODEL
STARTUP_TEXT    ENDS
ENDIF

C_ETEXT SEGMENT PARA PUBLIC 'CODE_END'
        PUBLIC _etext
_etext  LABEL BYTE      ; This label marks the end of program code.
        DB 16 DUP(?)    ; Required bytes

; If you specify the INITDATA control in the PROM86, v5.2 and up, it will
; cause PROM86 to place all initializers in ROM starting at this
; location.  The start-up routine assumes these initializers are placed
; above program code in ROM and copy them to RAM at power-up.
C_ETEXT ENDS

        END START_      ; Make sure you include the START_ symbol here.
```

```
#include "basetype.hb"
#include "mem_map.hb"
#include "pcb.hb"
#include "pcb_bits.hb"
#include "leds.hb"
#include "system.hb"

#include "testing.h"

#include <conio.h>
#include <dos.h>

#define RADIO

static unsigned char ucWithParity(unsigned char c);

char sDisplayBuf[256];

volatile char ser_rpg_state[3] = { 0, 0, 0 };

volatile char ser_rpg_port = -1; // which port: 0->9 PRINTER, 1->25 HOST, 2->25
RADIO

extern int _far nGetLEDs(void);

void
vBug(int x)
{
    long int li;
    int leds = nGetLEDs();

    TurnLEDoff(0xFF);
    for ( li=0; li < 5000L; ++li )
        ;
    TurnLEDon( LEDFIX( x << 4 ) );
    for ( li=0; li < 40000L; ++li )
        ;
    TurnLEDoff(0xFF);
    for ( li=0; li < 5000L; ++li )
        ;
    TurnLEDon(leds);
}

void
vSetRelay(boolean fEnergize)
{
    int nPortValue = inpw( PCB_BASE + PORT1_LATCH );

    if ( fEnergize )
    {
        nPortValue &= 0x00BF;   // energize the relay.
        TurnLEDon(ON_LINE);
    }
    else
    {
        nPortValue &= 0x00FF;
        nPortValue |= 0x0040;
        TurnLEDoff(ON_LINE);
    }
    outpw( PCB_BASE + PORT1_LATCH, nPortValue );
}

boolean
fTestAndClearBoolean( boolean *pfFlag )
{
    int nUPflags;
    boolean fReturnValue;
    _asm
    {
        pushf
        pop     ax
        mov     nUPflags,ax
        cli
    }
    fReturnValue = *pfFlag;
    *pfFlag = FALSE;
    _asm
    {
        mov     ax, nUPflags
        push    ax
        popf
    }
    return( fReturnValue );
}

static volatile boolean fSending = FALSE;

void
vSendString( char *s )
{
#ifndef RADIO

    int size;

    if ( fSending )
    {
        while ( !(ML1getAccessState() & TX_DONE) )
            ;
        fSending = FALSE;
    }
    else
        ML1getAccessState();

    size = strlen(s);
    if ( size > 0 )
    {
        fSending = TRUE;
        ML1putBlock((char _far *)s, size);
    }
#endif
}

void
vSendBlock( char *sBlock, int nSize )
```

```
{
    if ( fSending )
    {
        while ( !(ML1getAccessState() & TX_DONE) )
            ;
        fSending = FALSE;
    }
    else
        ML1getAccessState();

    if ( nSize > 0 )
    {
        fSending = TRUE;
        ML1putBlock((char _far *)sBlock, nSize);
    }
}

int
nRXserialChar( void )
{
#ifndef RADIO
    extern void vCheckForReprogramming(int c);
    int c = ML1getByte();
    vCheckForReprogramming(c);
    return( c );
#else
    return( -1 );
#endif
}

void
vWaitForTXdone(void)
{
#ifndef RADIO
    if ( fSending )
    {
        while ( !(ML1getAccessState() & TX_DONE) )
            ;
        fSending = FALSE;
    }
#endif
}

void
Reprogram_Device(void)
{
    _disable();
    vMODEMoff();
    vSetRelay(FALSE);
    vSimulate188reset();
}

void
callFlash( void )
{
    while ( 1 )
        ;
}

int checkFlash( unsigned base, unsigned seg_length )
{
    return(0);
}

static unsigned char
ucWithParity(unsigned char c)
{
    unsigned char ucReturn;
    _asm
    {
        mov     al,c
        and     al,07Fh
        jpe     noSet
        or      al,080h
    noSet:
        mov     ucReturn,al
    }
    return(ucReturn);
}


void
vSetParity(unsigned char _far *pBlock, int nSize)
{
    for ( ; nSize > 0; --nSize, ++pBlock )
        *pBlock = ucWithParity(*pBlock);
}
```

```
#include "basetype.hb"
#include "mem_map.hb"
#include "pcb.hb"
#include "pcb_bits.hb"
#include "leds.hb"
#include "system.hb"

#include "testing.h"
#include <conio.h>

void _interrupt _far vTimer0IntHandler(void);
static void vInitializeCountdownTimers(void);

volatile unsigned int uStateMachineTick = 0;

void
vTimerInitialize(void)
{
    long _far *lfPointer = (long _far *)(0x00000020L); // Timer 0 vector

    lfPointer[0] = (long)(&vTimer0IntHandler);

    outpw( PCB_BASE+TIMER0_COMPAREA, TIMER_DURATION );
    outpw( PCB_BASE+TIMER0_COUNT,    TIMER_DURATION );
    outpw( PCB_BASE+TIMER0_CONTROL,  0xE001     );
    outpw( PCB_BASE+TIMER_CONTROL,   0x0000     );
}

void _interrupt _far
vTimer0IntHandler(void)
{
    // Timer 0 Interrupt Handler

    ++uStateMachineTick;

//    if ( (uStateMachineTick & 0x003F) == 0 )
//        ToggleLED(CONTACT);

    vMODEMtiming();
    vDTMFtiming();
    vLINEtiming();
    vMAPPtiming();
    vMOBITEXtiming();

    // End Of Interrupt for this INT.
    outpw(PCB_BASE+END_OF_INT,NSPEC_EOI_ENABLE);
}
```

File: src\TICKER.C

TMM (APPENDIX D)

```
#include "basetype.hb"
#include "testing.h"

#define AUTO_DIAL_THRU_DEFAULT_TIME  1500
#define MODEM_TURN_OFF_TIME          10000

static unsigned int uAutoDialThroughTime = AUTO_DIAL_THRU_DEFAULT_TIME;

enum
{
    OK_READY,
    ERROR_WAITING,
    ERROR_OFF_HOOK,
    OK_DIALING_WAIT,
    OK_CONNECTING,
    OK_DIAL_THRU,
    OK_MAPP_STOP,
    ERROR_MAPP_STOP,
    OK_CONNECTED,
    LINE_STATE_COUNT
};

// #define STATE_NAMES
#ifdef STATE_NAMES
char *sLineStateNames[LINE_STATE_COUNT] =
{
    "OK_READY",
    "ERROR_WAITING",
    "ERROR_OFF_HOOK",
    "OK_DIALING_WAIT",
    "OK_CONNECTING",
    "OK_DIAL_THRU",
    "OK_MAPP_STOP",
    "ERROR_MAPP_STOP",
    "OK_CONNECTED"
};
#endif

static int nLineState = -1;
static int nLineAutoDialThroughTimer = -1;
static int nLineModemTurnOffTimer = -1;

void
vLINEinitialize( void )
{
    // assume a radio error. Relay stays de-energized until connected!
    nSendSignal(SIGNAL_RADIO_ERROR,LINE_STATE_MACHINE);
}

void
vSetAutoDialThrough( unsigned int uNewSetting )
{
    uAutoDialThroughTime = uNewSetting;
}

unsigned int
uGetAutoDialThrough( void )
{
    return( uAutoDialThroughTime );
}

void
vRunLINEstateMachine( void )
{
    int nSignal = nGetSignalWaiting( LINE_STATE_MACHINE );

    #ifdef STATE_NAMES
     int nOldLineState = nLineState;
    #endif

    if ( nLineState >= 0 && nSignal <= SIGNAL_NONE )
      return;

    #ifdef STATE_NAMES
      {
         static char buf[20];
         vSendString("Line  Recv'd Signal -> ");
         mlsprintf(buf,"(%5u) ",uStateMachineTick);
         vSendString(buf);
         vSendString(sSignalNames[nSignal]);
         vSendString("\r\n");
      }
    #endif

    switch ( nLineState )
    {
        default :
            nLineState = OK_READY;

        case OK_READY :
            switch ( nSignal )
            {
                case SIGNAL_RADIO_ERROR :
                    nLineState = ERROR_WAITING;
                    vSetRelay(FALSE);
                    break;

                case SIGNAL_OFF_HOOK :
                    nLineState = OK_DIALING_WAIT;
                    nLineAutoDialThroughTimer =
                        MS_TO_TICKS(uAutoDialThroughTime);
                    nSendSignal(SIGNAL_DTMF_CLEAR,DTMF_STATE_MACHINE);
                    nSendSignal(SIGNAL_START_MODEM_CONNECT,MODEM_STATE_MACHINE);

                    break;

                default :
                    break;
            }
            break;

        case ERROR_WAITING :
            switch ( nSignal )
            {
```

```
            case SIGNAL_RADIO_NO_ERROR :
                nLineState = OK_READY;
                vSetRelay(TRUE);
                break;

            case SIGNAL_OFF_HOOK :
                nLineState = ERROR_OFF_HOOK;
                break;

            default :
                break;
        }
        break;

    case ERROR_OFF_HOOK :
        switch ( nSignal )
        {
            case SIGNAL_RADIO_NO_ERROR :
                nLineState = OK_DIAL_THRU;
                break;

            case SIGNAL_ON_HOOK :
                nLineState = ERROR_WAITING;
                break;

            default :
                break;
        }
        break;

    case OK_DIALING_WAIT :
        switch ( nSignal )
        {
            case SIGNAL_RADIO_ERROR :
                nLineState = ERROR_OFF_HOOK;
                nLineAutoDialThroughTimer = -1;
                vSetRelay(FALSE);
                nSendSignal(SIGNAL_DISCONNECT_MODEM,MODEM_STATE_MACHINE);
                break;

            case SIGNAL_DTMF_DIALING_DETECTED :
                nLineState = OK_CONNECTING;
                nLineAutoDialThroughTimer = -1;
                break;

            case SIGNAL_ON_HOOK :
                nLineState = OK_READY;
                nLineAutoDialThroughTimer = -1;
                nSendSignal(SIGNAL_DISCONNECT_MODEM,MODEM_STATE_MACHINE);
                break;

            case SIGNAL_AUTO_DIAL_THRU_TIMEOUT :
                nLineState = OK_DIAL_THRU;
                vSetRelay(FALSE);
                nSendSignal(SIGNAL_DISCONNECT_MODEM,MODEM_STATE_MACHINE);
                break;
```

```
            default :
                break;
        }
        break;

    case OK_CONNECTING :
        switch ( nSignal )
        {
            case SIGNAL_RADIO_ERROR :
                nLineState = ERROR_MAPP_STOP;

                // change implementation for V1.1: add modem
                // disconnect so that the MODEM won't answer
                nSendSignal(SIGNAL_DISCONNECT_MODEM,MODEM_STATE_MACHINE);
                break;

            case SIGNAL_MODEM_CONNECTED :
                nLineState = OK_CONNECTED;
                nSendSignal(SIGNAL_START_MAPP_PROCESS,MAPP_STATE_MACHINE);
                break;

            case SIGNAL_ON_HOOK :
                nLineState = OK_READY;
                nSendSignal(SIGNAL_DISCONNECT_MODEM,MODEM_STATE_MACHINE);
                break;

            case SIGNAL_DIAL_BACKUP :
                nLineState = OK_MAPP_STOP;

                // change implementation for V1.1: add modem
                // disconnect so that the MODEM won't answer
                nSendSignal(SIGNAL_DISCONNECT_MODEM,MODEM_STATE_MACHINE);
                break;

            default :
                break;
        }
        break;

    case OK_DIAL_THRU :
        switch ( nSignal )
        {
            case SIGNAL_RADIO_ERROR :
                nLineState = ERROR_OFF_HOOK;
                break;

            case SIGNAL_ON_HOOK :
                nLineState = OK_READY;
                vSetRelay(TRUE);
                break;

            default :
                break;
        }
        break;

    case OK_MAPP_STOP :
```

```
        switch ( nSignal )
        {
            case SIGNAL_RADIO_ERROR :
                nLineState = ERROR_MAPP_STOP;
                break;

            case SIGNAL_MODEM_DISCONNECTED :
                nLineModemTurnOffTimer = -1;
                nSendSignal(SIGNAL_CANCEL_MAPP_PROCESS,MAPP_STATE_MACHINE);
                break;

            case SIGNAL_MODEM_CONNECTED :
            case SIGNAL_MAPP_FRAME_RECEIVED :
                nSendSignal(SIGNAL_BREAK_MAPP,MAPP_STATE_MACHINE);
                nLineModemTurnOffTimer = MS_TO_TICKS(MODEM_TURN_OFF_TIME);
                break;

            case SIGNAL_ON_HOOK :
                nLineState = OK_READY;
                nLineModemTurnOffTimer = -1;
                nSendSignal(SIGNAL_CANCEL_MAPP_PROCESS,MAPP_STATE_MACHINE);
                nSendSignal(SIGNAL_DISCONNECT_MODEM,MODEM_STATE_MACHINE);
                break;

            case SIGNAL_MODEM_TURN_OFF_TIMEOUT :
                nSendSignal(SIGNAL_DISCONNECT_MODEM,MODEM_STATE_MACHINE);
                break;

            default :
                break;
        }
        break;

    case ERROR_MAPP_STOP :
        switch ( nSignal )
        {
            case SIGNAL_RADIO_NO_ERROR :
                nLineState = OK_MAPP_STOP;
                break;

            case SIGNAL_MODEM_DISCONNECTED :
                nLineModemTurnOffTimer = -1;
                nSendSignal(SIGNAL_CANCEL_MAPP_PROCESS,MAPP_STATE_MACHINE);
                break;

            case SIGNAL_MODEM_CONNECTED :
            case SIGNAL_MAPP_FRAME_RECEIVED :
                nSendSignal(SIGNAL_BREAK_MAPP,MAPP_STATE_MACHINE);
                nLineModemTurnOffTimer = MS_TO_TICKS(MODEM_TURN_OFF_TIME);
                break;

            case SIGNAL_ON_HOOK :
                nLineState = ERROR_WAITING;
                vSetRelay(FALSE);
                nLineModemTurnOffTimer = -1;
                nSendSignal(SIGNAL_CANCEL_MAPP_PROCESS,MAPP_STATE_MACHINE);
                nSendSignal(SIGNAL_DISCONNECT_MODEM,MODEM_STATE_MACHINE);
                break;

            case SIGNAL_MODEM_TURN_OFF_TIMEOUT :
                nSendSignal(SIGNAL_DISCONNECT_MODEM,MODEM_STATE_MACHINE);
                break;

            default :
                break;
        }
        break;

    case OK_CONNECTED :
        switch ( nSignal )
        {
            case SIGNAL_RADIO_ERROR :
                nLineState = ERROR_MAPP_STOP;
                nLineModemTurnOffTimer = MS_TO_TICKS(MODEM_TURN_OFF_TIME);
                nSendSignal(SIGNAL_CANCEL_MAPP_PROCESS,MAPP_STATE_MACHINE);
                break;

            case SIGNAL_MODEM_DISCONNECTED :
                nLineState = OK_MAPP_STOP;
                nSendSignal(SIGNAL_CANCEL_MAPP_PROCESS,MAPP_STATE_MACHINE);
                break;

            case SIGNAL_ON_HOOK :
                nLineState = OK_READY;
                nSendSignal(SIGNAL_CANCEL_MAPP_PROCESS,MAPP_STATE_MACHINE);
                nSendSignal(SIGNAL_DISCONNECT_MODEM,MODEM_STATE_MACHINE);
                break;

            default :
                break;
        }
        break;
}
#ifdef STATE_NAMES
  if ( nOldLineState != nLineState )
  {
      static char buf[20];
      vSendString("Line  State changed -> ");
      mlsprintf(buf,"(%5u) ",uStateMachineTick);
      vSendString(buf);
      vSendString(sLineStateNames[nLineState]);
      vSendString("\r\n");
  }
#endif
}

void
vLINEtiming(void)
{
    if (   nLineAutoDialThroughTimer > 0 &&
         --nLineAutoDialThroughTimer == 0 )
        nSendSignal(SIGNAL_AUTO_DIAL_THRU_TIMEOUT, LINE_STATE_MACHINE);

    if (   nLineModemTurnOffTimer > 0 &&
```

```
        --nLineModemTurnOffTimer == 0 )
        nSendSignal(SIGNAL_MODEM_TURN_OFF_TIMEOUT, LINE_STATE_MACHINE);
}
```

```
#include "mem_map.hb"
#include "basetype.hb"
#include "pcb.hb"
#include "pcb_bits.hb"
#include "leds.hb"
#include "serial.hb"
#include "testing.h"

#include "eeprom.hb"
#include "mpc-r-ee.h"

#include <conio.h>
#include <dos.h>
#include <memory.h>


char inCS softVer[] = "MPC/r MAPP Converter, V1.4, "__DATE__", "__TIME__;

char _far * inCS SoftwareVersion = (char _far *)softVer;

byte ledTranslate[16] = {
    0x00, 0x20, 0x10, 0x30, 0x40, 0x60, 0x50, 0x70,
    0x80, 0xA0, 0x90, 0xB0, 0xC0, 0xE0, 0xD0, 0xF0
    };

void vRunTestSystem(void);
void vReadEEPROMstorage(void);
long lShutdownTimer(int,int);
static boolean fPowerOffTimeout = FALSE;

void
main(void)
{
    unsigned int _far *pfuRAMtop = (unsigned int far *)0x00400000L;

    _disable();             // we don't want any interrupts right now...

    TurnLEDoff(0xFF);       // turn LEDs off while doing setup

    vInitializeTestSystem();

//    vSendString("\r\n");
//    vSendString(SoftwareVersion);
//    vSendString("; 80C188 EB, Step:");
//    mlsprintf(sDisplayBuf,"%04X.   RAMTop = %04X\r\n",
//              inpw(PCB_BASE+STEP_ID)&0x00FF, *pfuRAMtop);
//    vSendString(sDisplayBuf);
//
//    vWaitForTXdone();

    while ( 1 )
        vRunTestSystem();
}

void
vInitializeTestSystem(void)
{
    vReadEEPROMstorage();

    vSignalInitialize();

    vDTMFinitialize();
    vMODEMinitialize();
    vLINEinitialize();

    vTimerInitialize();

    _enable();

    vSetupPowerdown();

    vMOBITEXinitialize();
}

void
vRunTestSystem(void)
{
    vRunLINEstateMachine();
    vRunDTMFstateMachine();
    vRunMODEMstateMachine();
    vRunMAPPstateMachine();
    vRunMOBITEXstateMachine();

    if ( nPowerOffRequested() )
    {
        vMODEMoff();    // RESET the modem, and release the relay.
        vSetRelay(FALSE);

        TurnLEDon(0xFF);

        if ( IML3shutdownNetworkLayer() )
        {
            int nShutdownTimer;
            fPowerOffTimeout = FALSE;
            nShutdownTimer = MaddTimer(lShutdownTimer,10000L);
            while ( IML3isShutdownDone() && !fPowerOffTimeout )
                ;
        }
        vPowerDownComplete();
    }
}

#define MPC_R_EE_VERSION_NUMBER 1u

void
vReadEEPROMstorage(void)
{
    extern long radioDefaults;

    if ( uReadEEPROM(MPC_R_EE_VERSION_STORAGE) != MPC_R_EE_VERSION_NUMBER )
    {
        nWriteEEPROM(MPC_R_RADIO_DEFAULTS+0,
                     (unsigned int)(radioDefaults>>16));
        nWriteEEPROM(MPC_R_RADIO_DEFAULTS+1,
```

```
                    (unsigned int)(radioDefaults & 0x0000FFFFl));

        vSetDTMFdefaultsInEEPROM();

        nWriteEEPROM(MPC_R_AUTO_DIAL_TIMEOUT, uGetAutoDialThrough() );

        nWriteEEPROM(MPC_R_MODEM_PROTOCOL, uGetMODEMprotocol() );

        nWriteEEPROM(MPC_R_EE_VERSION_STORAGE, MPC_R_EE_VERSION_NUMBER);

    }

    radioDefaults = uReadEEPROM( MPC_R_RADIO_DEFAULTS+0 );
    radioDefaults = radioDefaults << 16 |
                    uReadEEPROM( MPC_R_RADIO_DEFAULTS+1 );

    vSetAutoDialThrough( uReadEEPROM(MPC_R_AUTO_DIAL_TIMEOUT) );

    vSetMODEMprotocol( uReadEEPROM(MPC_R_MODEM_PROTOCOL) );

    vGetDTMFphoneTablesFromEEPROM();
}

long
lShutdownTimer(int handle, int activity )
{
    fPowerOffTimeout = TRUE;
    return(0L);
}
```

```
#include "mem_map.hb"
#include "basetype.hb"
#include "enums.h"
#include "pcb.hb"
#include "pcb_bits.hb"
#include "leds.hb"
#include "serial.hb"
#include "timing.h"
#include "mobilib.h"
#include "network.h"

#include <conio.h>
#include <string.h>

#include "testing.h"
#include "mpc-r-ee.h"

enum
{
    DTMF_IDLE,
    DTMF_STRING_INPUT,
    DTMF_MAN_SEPARATOR,
    DTMF_MAN_INPUT,
    DTMF_DIAL_DONE,
    DTMF_STATE_COUNT
};

// #define STATE_NAMES

#ifdef STATE_NAMES
char *sDTMFstateNames[DTMF_STATE_COUNT] =
{
    "DTMF_IDLE",
    "DTMF_STRING_INPUT",
    "DTMF_MAN_SEPARATOR",
    "DTMF_MAN_INPUT",
    "DTMF_DIAL_DONE"
};
#endif

void _interrupt _far vDTMFavailableIntHandler(void);
void _interrupt _far vDTMFnotAvailableIntHandler(void);
char cBinaryToDTMFchar(unsigned int uValue);

static boolean fGotDTMFcodes = FALSE;

#define DTMF_CODE_MAX   80
#define DTMF_QUIET_TIME 200

#define DTMF_MAN_SEPARATOR      '#'
#define MAN_SEPARATORS_REQUIRED     1

char sDTMFcodes[DTMF_CODE_MAX];
char sDTMFstring[DTMF_CODE_MAX+1];
char sDTMF_MANstring[DTMF_CODE_MAX+1];

char sDTMFtranslate[17] = "D1234567890*#ABC";
```

```
int nDTMFcodeIn = 0, nDTMFcodeOut = 0;
int nDTMFstringIdx = 0;
int nDTMF_MANstringIdx = 0;
int nDTMF_MANseparatorCount = 0;

static int nDTMFquietTimeout = -1;
static int nRxDTMFcode = 0;
static boolean fAccumulateMAN = FALSE;
static int nDTMFstate = -1;
static MAN mDTMFtranslatedMAN = (MAN)-1;

int nGetNewDTMFchar(void);
boolean fTranslateDTMFcharsToMAN(void);
void vSetDefaultPhoneTranslation(void);

extern int mlsscanf(char *,char *,...);

#define PHONE_TABLE_SIZE        25
#define PHONE_NUMBER_SIZE       24

char sPhoneNumbers[PHONE_TABLE_SIZE][PHONE_NUMBER_SIZE+1];
MAN mMANnumbers[PHONE_TABLE_SIZE];
byte bSpecialAction[PHONE_TABLE_SIZE];

void
vClearDTMFsensing(void)
{
    int nFlags = getUPflagsAndCLI();

    nDTMFstate = DTMF_IDLE;

    nDTMFquietTimeout = 0;

    nDTMF_MANseparatorCount = 0;

    fAccumulateMAN = FALSE;

    nDTMFcodeIn = nDTMFcodeOut = 0;

    sDTMFstring[0] = '\0';
    nDTMFstringIdx = 0;

    sDTMF_MANstring[0] = '\0';
    nDTMF_MANstringIdx = 0;

    setUPflags(nFlags);
}

boolean
fTranslateDTMFcharsToMAN(void)
{
    long int lMAN;

    mDTMFtranslatedMAN = (MAN)-1;

    if ( nDTMF_MANstringIdx > 0 )
    {
```

```
        int i;
        for ( i = 0; i < nDTMF_MANstringIdx; ++i )
            if ( sDTMF_MANstring[i] < '0' ||
                 sDTMF_MANstring[i] > '9' )
                return(FALSE);

        if ( mlsscanf(sDTMF_MANstring,"%ld",&lMAN) == 1 )
        {
            if ( lMAN >= MIN_MAN && lMAN <= MAX_MAN )
            {
                mDTMFtranslatedMAN = lMAN;
                return( TRUE );
            }
        }
    }
    else if ( nDTMFstringIdx > 0 )
    {
        int i;
        for ( i = 0; i < PHONE_TABLE_SIZE; ++i )
        {
            if ( strcmp(sPhoneNumbers[i],sDTMFstring) == 0 )
            {
                mDTMFtranslatedMAN = mMANnumbers[i];
                return( TRUE );
            }
        }
    }
    return( FALSE );
}

void
vDTMFtiming(void)
{
   if ( nDTMFquietTimeout > 0 && --nDTMFquietTimeout == 0 )
       nSendSignal(SIGNAL_DTMF_QUIET_TIMEOUT,DTMF_STATE_MACHINE);
}

void
vRunDTMFstateMachine(void)
{
    int nSignal = nGetSignalWaiting( DTMF_STATE_MACHINE );
    int nDTMFchar;

    #ifdef STATE_NAMES
      int nOldState = nDTMFstate;

      if ( nSignal != SIGNAL_NONE )
      {
          static char buf[20];
          vSendString("DTMF  Recv'd Signal -> ");
          mlsprintf(buf,"(%5u) ",uStateMachineTick);
          vSendString(buf);
          vSendString(sSignalNames[nSignal]);
          vSendString("\r\n");
      }
    #endif
```

File: src\DTMF.C

```
    if ( nSignal == SIGNAL_DTMF_CLEAR )
        vClearDTMFsensing();
    else switch ( nDTMFstate )
    {
        default :
            vClearDTMFsensing();
            nDTMFstate = DTMF_IDLE;

        case DTMF_IDLE :        // Idle, waiting for DTMF received.
            if ( nDTMFchar = nGetNewDTMFchar() )
            {
                nDTMF_MANseparatorCount = 0;
                if ( nDTMFchar == DTMF_MAN_SEPARATOR )
                {
                    if ( ++nDTMF_MANseparatorCount < MAN_SEPARATORS_REQUIRED )
                        nDTMFstate = DTMF_MAN_SEPARATOR;
                    else
                    {
                        nDTMFstate = DTMF_MAN_INPUT;
                        sDTMF_MANstring[0] = '\0';
                        nDTMF_MANstringIdx = 0;
                    }
                }
                else if ( nDTMFstringIdx < DTMF_CODE_MAX )
                {
                    sDTMFstring[nDTMFstringIdx++] = (char)nDTMFchar;
                    sDTMFstring[nDTMFstringIdx  ] = '\0';
                    nDTMFstate = DTMF_STRING_INPUT;
                }
                nSendSignal(SIGNAL_DTMF_DIALING_DETECTED,LINE_STATE_MACHINE);
            }
            break;

        case DTMF_STRING_INPUT :
            if ( nSignal == SIGNAL_DTMF_QUIET_TIMEOUT )
            {
                if ( ifTranslateDTMFcharsToMAN() )
                {
                    nSendSignal(SIGNAL_DIAL_BACKUP,LINE_STATE_MACHINE);
                }
                else
                {
                    nSendSignal(SIGNAL_DIAL_DONE,MODEM_STATE_MACHINE);
                }

                nDTMFstate = DTMF_DIAL_DONE;
            }
            else if ( nDTMFchar = nGetNewDTMFchar() )
            {
                if ( nDTMFchar == DTMF_MAN_SEPARATOR )
                {
                    // prepare for MAN number input
                    sDTMF_MANstring[0] = '\0';
                    nDTMF_MANstringIdx = 0;

                    // check if there are more separators required
                    if ( ++nDTMF_MANseparatorCount < MAN_SEPARATORS_REQUIRED )
```

```
                nDTMFstate = DTMF_MAN_SEPARATOR;
            else
                nDTMFstate = DTMF_MAN_INPUT;
        }
        else if ( nDTMFstringIdx < DTMF_CODE_MAX )
        {
            sDTMFstring[nDTMFstringIdx++] = (char)nDTMFchar;
            sDTMFstring[nDTMFstringIdx  ] = '\0';
        }
    }
    break;

  case DTMF_MAN_SEPARATOR :
    if ( nSignal == SIGNAL_DTMF_QUIET_TIMEOUT )
    {
        if ( !fTranslateDTMFcharsToMAN() )
        {
            nSendSignal(SIGNAL_DIAL_BACKUP,LINE_STATE_MACHINE);
        }
        else
        {
            nSendSignal(SIGNAL_DIAL_DONE,MODEM_STATE_MACHINE);
        }
        nDTMFstate = DTMF_DIAL_DONE;
    }
    else if ( nDTMFchar = nGetNewDTMFchar() )
    {
        if ( nDTMFchar == DTMF_MAN_SEPARATOR )
        {
            if ( ++nDTMF_MANseparatorCount >= MAN_SEPARATORS_REQUIRED )
                nDTMFstate = DTMF_MAN_INPUT;
            break;
        }

        // not MAN separator, so resync to phone number string
        // by adding the separators we have seen followed by
        // the new non-separator character.

        nDTMFstate = DTMF_STRING_INPUT;
        while ( nDTMFstringIdx > 0 )
        {
            if ( nDTMFstringIdx < DTMF_CODE_MAX )
            {
                sDTMFstring[nDTMFstringIdx++] = (char)DTMF_MAN_SEPARATOR

                sDTMFstring[nDTMFstringIdx  ] = '\0';
            }
        }
        if ( nDTMFstringIdx < DTMF_CODE_MAX )
        {
            sDTMFstring[nDTMFstringIdx++] = (char)nDTMFchar;
            sDTMFstring[nDTMFstringIdx  ] = '\0';
        }
    }
    break;
```

```
  case DTMF_MAN_INPUT :
    if ( nSignal == SIGNAL_DTMF_QUIET_TIMEOUT )
    {
        if ( !fTranslateDTMFcharsToMAN() )
            nSendSignal(SIGNAL_DIAL_BACKUP,LINE_STATE_MACHINE);
        else
            nSendSignal(SIGNAL_DIAL_DONE,MODEM_STATE_MACHINE);
        nDTMFstate = DTMF_DIAL_DONE;
    }
    else if ( nDTMFchar = nGetNewDTMFchar() )
    {
        if ( nDTMFchar == DTMF_MAN_SEPARATOR )
        {
            if ( !fTranslateDTMFcharsToMAN() )
                nSendSignal(SIGNAL_DIAL_BACKUP,LINE_STATE_MACHINE);
            else
                nSendSignal(SIGNAL_DIAL_DONE,MODEM_STATE_MACHINE);
            nDTMFstate = DTMF_DIAL_DONE;
        }
        else if ( nDTMF_MANstringIdx < DTMF_CODE_MAX )
        {
            sDTMF_MANstring[nDTMF_MANstringIdx++] = (char)nDTMFchar;
            sDTMF_MANstring[nDTMF_MANstringIdx  ] = '\0';
        }
    }
    break;

  case DTMF_DIAL_DONE :   // idle, waiting for DTMF_CLEAR
    break;
}

#ifdef STATE_NAMES
  if ( nOldState != nDTMFstate )
  {
    static char buf[20];
    vSendString("DTMF  State changed -> ");
    mlsprintf(buf,"(%5u) ",uStateMachineTick);
    vSendString(buf);
    vSendString(sDTMFstateNames[nDTMFstate]);
    vSendString("\r\n");
  }
#endif
}

void _interrupt _far
vDTMFavailableIntHandler(void)
{
    // External Interrupt 2

    nRxDTMFcode = inp(DTMF_START) & 0x000F; // get the code.

    fGotDTMFcodes = TRUE;

    // End Of Interrupt for this INT.
    outpw(PCB_BASE+END_OF_INT,NSPEC_EOI_ENABLE);
}
```

```
void _interrupt _far
vDTMFnotAvailableIntHandler(void)
{
    // External Interrupt 3

    if ( nDTMFcodeIn < DTMF_CODE_MAX )
    {
        sDTMFcodes[nDTMFcodeIn++] = (char)nRxDTMFcode;
        nDTMFquietTimeout = DTMF_QUIET_TIME;
    }

    // End Of Interrupt for this INT.
    outpw(PCB_BASE+END_OF_INT,NSPEC_EOI_ENABLE);
}

int
nGetNewDTMFchar(void)
{
    if ( nDTMFcodeOut == nDTMFcodeIn )
        return(0);
    return((int)sDTMFtranslate[sDTMFcodes[nDTMFcodeOut++]&0x000F]);
}

void
vDTMFinitialize(void)
{
    long _far *lfPointer = (long _far *)(0x00000038L); // INT2 vector

    vClearDTMFsensing();

    lfPointer[0] = (long)(&vDTMFavailableIntHandler);
    lfPointer[1] = (long)(&vDTMFnotAvailableIntHandler);
    outpw(PCB_BASE+INT2_CONTROL,0x0000);
    outpw(PCB_BASE+INT3_CONTROL,0x0000);
}

void
vSetDefaultPhoneTranslation(void)
{
    int i,j;

    for ( i = 0; i < PHONE_TABLE_SIZE; ++i )
    {
        mMANnumbers[i] = (MAN)-1;
        bSpecialAction[i] = 0;
        for ( j = 0; j < PHONE_NUMBER_SIZE+1; ++j )
            sPhoneNumbers[i][j] = '\0';
    }
}

MAN
mGetDTMFmanTranslation(void)
{
    return( mDTMFtranslatedMAN );
}

char
cBinaryToDTMFchar(unsigned int uValue)
{
    static char sTranslate[17] = "0123456789*#    \0";
    return( sTranslate[uValue & 0x000F] );
}

//-------------------------------------------------------------
//
//  SPECIFICATION FOR PHONE NUMBER TRANSLATION TABLE
//  ===============================================
//
//  Each Phone Number Table entry is 16 bytes, or 8 EEPROM words.
//
//  The bytes are arranged as follows:
//
//      Bytes 0 to 11 are the Phone number, with one digit in each
//          nybble of each byte.  The phone number is translated
//          for easy use into a character string, left justified.
//
//          The first digit is the MSNybble of Byte 0, the second
//          digit is the LSNybble of Byte 0, the third digit is
//          the MSNybble of byte 1, and so on. There are 12 bytes,
//          or 24 nybbles, for the 24 digit phone number.
//
//          Nybble values are from 0 to 9 for telephone number
//          digits, 10 for '*', 11 for '#', 12 to 14 for blanks
//          (impossible as DTMF codes), and 15 as a NUL character.
//
//          Thus a phone number of all 0xFF bytes is an EMPTY string!
//
//
//      Byte 12 is the "special flags" byte, which is currently unused,
//          and should be set to zero for compatibility with future
//          software upgrades.
//
//      Bytes 13 to 15 are the 24-bit MAN number.
//          The MSByte is byte 13, the LSByte is byte 15.
//          The MAN number is translated and stored in a LONG integer.
//
//-------------------------------------------------------------
void
vGetDTMFphoneTablesFromEEPROM(void)
{
    unsigned int uChecksum,uValue;
    int i,j,k,l;

    vSetDefaultPhoneTranslation();

    for ( uChecksum = 0, i = MPC_R_PHONE_TABLE;
          i < MPC_R_PHONE_TABLE_END; ++i )
        uChecksum ^= uReadEEPROM(i);

    if ( uChecksum != uReadEEPROM(MPC_R_PHONE_CHECKSUM) )
    {
        vSetDTMFdefaultsInEEPROM();
        return;
    }
```

```
    for ( k = 0, i = MPC_R_PHONE_TABLE;
          k < PHONE_TABLE_SIZE;
          i += 8, k++ )
    {
        // the EEPROM words were written as a BYTE stream.
        // BYTE 2X+0 and BYTE 2X+1 are written together as
        // WORD X, with BYTE 2X+0 as the LSByte.
        //
        // See the full description for insight into how we
        // are decoding the EEPROM storage here.

        for ( l = 0, j = i; l < PHONE_NUMBER_SIZE; ++j, l += 4 )
        {
            uValue = uReadEEPROM(j);
            sPhoneNumbers[k][l+0] = cBinaryToDTMFchar(uValue>> 4);
            sPhoneNumbers[k][l+1] = cBinaryToDTMFchar(uValue    );
            sPhoneNumbers[k][l+2] = cBinaryToDTMFchar(uValue>>12);
            sPhoneNumbers[k][l+3] = cBinaryToDTMFchar(uValue>> 8);
        }

        uValue = uReadEEPROM(j);

        bSpecialAction[k] = (byte)(uValue     );
        mMANnumbers[k]    = (MAN)((uValue >> 8) & 0x00FF);
        mMANnumbers[k]  <<= 8;

        uValue = uReadEEPROM(j+1);

        mMANnumbers[k]   += (MAN)((uValue   )&0x00FF);
        mMANnumbers[k]  <<= 8;
        mMANnumbers[k]   += (MAN)((uValue>>8)&0x00FF);
    }
}

void
vSetDTMFdefaultsInEEPROM(void)
{
    int i,j;
    unsigned int uChecksum = 0;
    vSetDefaultPhoneTranslation();
    for ( i = MPC_R_PHONE_TABLE; i < MPC_R_PHONE_TABLE_END; i += 8 )
    {
        for ( j = i; j < (i+6); ++j )
        {
            nWriteEEPROM(j,0xFFFF);
            uChecksum ^= 0xFFFF;
        }
        nWriteEEPROM(j+0,0);
        uChecksum ^= 0;
        nWriteEEPROM(j+1,0);
        uChecksum ^= 0;
    }
    nWriteEEPROM(MPC_R_PHONE_CHECKSUM,uChecksum);
}
```

```
void vShowMODEMstate(int nState);
void vRunBELL212A(int nSignal);
void vRunBELL103 (int nSignal);
void vRunCCITTv21(int nSignal);
void vRunCCITTv22(int nSignal);
void vRunBELLautobauding (int nSignal);
void vRunCCITTautobauding(int nSignal);

void vMODEMon( boolean fAutobaudSpeedup );

enum
{
    RESETTING_MODEM,
    RESET_MODEM,
    WENT_ON_HOOK,
    WAIT_FOR_OFF_HOOK,
    WAIT_FOR_MPC_DIALING,
    WAIT_FOR_CARRIER_DETECT,
    WAIT_FOR_MARKS_300B,
    CARRIER_DETECT_DEBOUNCE_300B,
    TRANSMIT_SCRAMBLED_ONES,
    MODEM_CONNECTED,
    MODEM_CONNECT_CD_DEBOUNCE,
    SEND_CCITT_2100_TONE,
    WAIT_CCITT_2100_OFF,
    WAIT_FOR_CARRIER_V21,
    WAIT_FOR_CARRIER_V22,
    CCITT_RETRY,
    WAIT_FOR_MARKS_1200B,
    CARRIER_DETECT_DEBOUNCE_1200B
};

// #define STATE_NAMES
#ifdef STATE_NAMES
char *sMODEMstateNames[] =
{
    "RESETTING_MODEM",
    "RESET_MODEM",
    "WENT_ON_HOOK",
    "WAIT_FOR_OFF_HOOK",
    "WAIT_FOR_MPC_DIALING",
    "WAIT_FOR_CARRIER_DETECT",
    "WAIT_FOR_MARKS_300B",
    "CARRIER_DETECT_DEBOUNCE_300B",
    "TRANSMIT_SCRAMBLED_ONES",
    "MODEM_CONNECTED",
    "MODEM_CONNECT_CD_DEBOUNCE",
    "SEND_CCITT_2100_TONE",
    "WAIT_CCITT_2100_OFF",
    "WAIT_FOR_CARRIER_V21",
    "WAIT_FOR_CARRIER_V22",
    "CCITT_RETRY",
    "WAIT_FOR_MARKS_1200B",
    "CARRIER_DETECT_DEBOUNCE_1200B"
};
#endif
```

```
void
vShowMODEMstate(int nState)
{
    #ifdef STATE_NAMES

      static char buf[20];
      vSendString("\rModem State changed -> ");
      mlsprintf(buf,"(%5u) ",uStateMachineTick);
      vSendString(buf);
      vSendString(sMODEMstateNames[nState]);
      vSendString("\r\n");

    #endif
}

unsigned int
uGetMODEMprotocol( void )
{
    return( uMODEMprotocol );
}

void
vSetMODEMprotocol( unsigned int uNewProtocol )
{
    // set the protocol & change the 188's baud rate to
    // match the modem baud rate....
    //
    switch ( uMODEMprotocol = uNewProtocol )
    {
        case MODEM_BELL_212A :
            outpw(PCB_BASE+SERIAL1_BAUD,INTERNAL_CLOCK|BAUD_INTERNAL_COMPARE(120
0L));
            outpw(PCB_BASE+SERIAL1_CONTROL, 0x0039);
            break;

        case MODEM_BELL_103 :
            outpw(PCB_BASE+SERIAL1_BAUD,INTERNAL_CLOCK|BAUD_INTERNAL_COMPARE(300
L));
            outpw(PCB_BASE+SERIAL1_CONTROL, 0x0039);
            break;

        case MODEM_CCITT_V22 :
            outpw(PCB_BASE+SERIAL1_BAUD,INTERNAL_CLOCK|BAUD_INTERNAL_COMPARE(120
0L));
            outpw(PCB_BASE+SERIAL1_CONTROL, 0x0039);
            break;

        case MODEM_CCITT_V21 :
            outpw(PCB_BASE+SERIAL1_BAUD,INTERNAL_CLOCK|BAUD_INTERNAL_COMPARE(300
L));
            outpw(PCB_BASE+SERIAL1_CONTROL, 0x0039);
            break;

        case MODEM_BELL_AUTOBAUD :
            outpw(PCB_BASE+SERIAL1_BAUD,INTERNAL_CLOCK|BAUD_INTERNAL_COMPARE(300
L));
            outpw(PCB_BASE+SERIAL1_CONTROL, 0x0039);
```

```
            break;

        case MODEM_CCITT_AUTOBAUD :
            outpw(PCB_BASE+SERIAL1_BAUD,INTERNAL_CLOCK|BAUD_INTERNAL_COMPARE(300
L));
            outpw(PCB_BASE+SERIAL1_CONTROL, 0x0039);
            break;
    }
}


void
vRunMODEMstateMachine(void)
{
    #ifdef STATE_NAMES
      int oState = nMODEMstate;
    #endif

    int nSignal;

    nSignal = nGetSignalWaiting( MODEM_STATE_MACHINE );

    #ifdef STATE_NAMES
      if ( nSignal != SIGNAL_NONE )
      {
          static char buf[20];
          vSendString("Modem Recv'd Signal -> ");
          mlsprintf(buf,"(%5u) ",uStateMachineTick);
          vSendString(buf);
          vSendString(sSignalNames[nSignal]);
          vSendString("\r\n");
      }
    #endif

    switch ( uMODEMprotocol )
    {
        case MODEM_BELL_212A :
            vRunBELL212A(nSignal);
            break;

        case MODEM_BELL_103 :
            vRunBELL103 (nSignal);
            break;

        case MODEM_CCITT_V22 :
            vRunCCITTv22(nSignal);
            break;

        case MODEM_CCITT_V21 :
            vRunCCITTv21(nSignal);
            break;

        case MODEM_BELL_AUTOBAUD :
            vRunBELLautobauding (nSignal);
            break;

        case MODEM_CCITT_AUTOBAUD :
            vRunCCITTautobauding(nSignal);
            break;

    }

    #ifdef STATE_NAMES
      if ( oState != nMODEMstate )
         vShowMODEMstate(nMODEMstate);
    #endif
}

void
vMODEMinitialize(void)
{
    long _far *lfPointer = (long _far *)(0x00000034L); // INT1 vector

    vMODEMoff();

    lfPointer[0] = (long)(&vMODEMserialIntHandler);
    outpw( PCB_BASE+INT1_CONTROL, 0x0000 );
}

int
nCharTimeX10(void)
{
    return( nCharTiming );
}

void
vMODEMon( boolean fAutobaudSpeedup )
{
    outp(MODEM_START+CONTROL_REG_1,RESET_MODEM_CHIP);

    switch ( uMODEMprotocol )
    {
        case MODEM_BELL_212A :
            outp(MODEM_START+CONTROL_REG_0,MODEM_DPSK_TX_MODE|DISABLE_TX);
            outp(MODEM_START+TONE_CTRL_REG,
                 RXD_TRISTATE|TRANSMIT_ANSWER_TONE|BELL_TONES);
            outp(MODEM_START+CONTROL_REG_1,TX_MARK);
            nCharTiming = 83;       // 1200 baud 8.3 mSec/char.
            break;

        case MODEM_BELL_103 :
            outp(MODEM_START+CONTROL_REG_0,MODEM_FSK_TX_MODE|DISABLE_TX);
            outp(MODEM_START+TONE_CTRL_REG,RXD_TRISTATE|BELL_TONES);
            outp(MODEM_START+CONTROL_REG_1,TX_MARK);
            nCharTiming = 333;      // 300 baud 33.3 mSec/char.
            break;

        case MODEM_CCITT_V22 :
            outp(MODEM_START+CONTROL_REG_0,MODEM_DPSK_TX_MODE|DISABLE_TX);
            outp(MODEM_START+TONE_CTRL_REG,RXD_TRISTATE|CCITT_TONES);
            outp(MODEM_START+CONTROL_REG_1,TX_MARK|BYPASS_SCRAMBLER);
            nCharTiming = 83;       // 1200 baud 8.3 mSec/char.
            break;
```

```
        case MODEM_CCITT_V21 :
            outp(MODEM_START+CONTROL_REG_0,MODEM_FSK_TX_MODE|V21_FSK|DISABLE_TX)
;
            outp(MODEM_START+TONE_CTRL_REG,RXD_TRISTATE|CCITT_TONES);
            outp(MODEM_START+CONTROL_REG_1,TX_MARK);
            nCharTiming = 333;        // 300 baud 33.3 mSec/char.
            break;

        case MODEM_BELL_AUTOBAUD :
            if ( !fAutobaudSpeedup )
            {
                outpw(PCB_BASE+SERIAL1_BAUD,INTERNAL_CLOCK|BAUD_INTERNAL_COMPARE
(300L));
                outpw(PCB_BASE+SERIAL1_CONTROL, 0x0039);

                nCharTiming = 333;        // 300 baud 33.3 mSec/char.

                outp(MODEM_START+CONTROL_REG_0,MODEM_FSK_TX_MODE|DISABLE_TX);
                outp(MODEM_START+TONE_CTRL_REG,RXD_TRISTATE|BELL_TONES);
                outp(MODEM_START+CONTROL_REG_1,TX_MARK);
            }
            else
            {
                outp(MODEM_START+CONTROL_REG_0,MODEM_DPSK_TX_MODE|DISABLE_TX);
                outp(MODEM_START+TONE_CTRL_REG,
                    RXD_TRISTATE|TRANSMIT_ANSWER_TONE|BELL_TONES);
                outp(MODEM_START+CONTROL_REG_1,TX_MARK);

                outpw(PCB_BASE+SERIAL1_BAUD,INTERNAL_CLOCK|BAUD_INTERNAL_COMPARE
(1200L));
                outpw(PCB_BASE+SERIAL1_CONTROL, 0x0039);

                nCharTiming = 83;        // 1200 baud 8.3 mSec/char.

                outp(MODEM_START+CONTROL_REG_0,MODEM_DPSK_TX_MODE|ENABLE_TX);
            }
            break;
        case MODEM_CCITT_AUTOBAUD :
            if ( !fAutobaudSpeedup )
            {
                outpw(PCB_BASE+SERIAL1_BAUD,INTERNAL_CLOCK|BAUD_INTERNAL_COMPARE
(300L));
                outpw(PCB_BASE+SERIAL1_CONTROL, 0x0039);

                nCharTiming = 333;        // 300 baud 33.3 mSec/char.

                outp(MODEM_START+CONTROL_REG_0,MODEM_FSK_TX_MODE|V21_FSK|DISABLE
_TX);
                outp(MODEM_START+TONE_CTRL_REG,RXD_TRISTATE|CCITT_TONES);
                outp(MODEM_START+CONTROL_REG_1,TX_MARK);
            }
            else
            {
                outpw(PCB_BASE+SERIAL1_BAUD,INTERNAL_CLOCK|BAUD_INTERNAL_COMPARE
(1200L));
                outpw(PCB_BASE+SERIAL1_CONTROL, 0x0039);

                nCharTiming = 83;        // 1200 baud 8.3 mSec/char.

                outp(MODEM_START+CONTROL_REG_0,MODEM_DPSK_TX_MODE|DISABLE_TX);
                outp(MODEM_START+TONE_CTRL_REG,RXD_TRISTATE|CCITT_TONES);
                outp(MODEM_START+CONTROL_REG_1,TX_MARK|BYPASS_SCRAMBLER);
            }
            break;
    }
}

void
vMODEMoff(void)
{
    outp( MODEM_START+CONTROL_REG_1,RESET_MODEM_CHIP);
}

void
vMODEMtiming(void)
{
    static boolean fONhook = TRUE;

    bMODEMstatus = (byte)inp(MODEM_START+DETECT_REG);

    if ( F_RECEIVE_DATA )
        ++nMODEMdataBits;

    if ( nMODEMcountdown > 0 && --nMODEMcountdown == 0 )
        nSendSignal(SIGNAL_MODEM_COUNTDOWN,MODEM_STATE_MACHINE);

    if ( nMODEMdebouncer > 0 && --nMODEMdebouncer == 0 )
        nSendSignal(SIGNAL_MODEM_DEBOUNCER,MODEM_STATE_MACHINE);

    if ( fONhook )
    {
        if ( !(inpw(PCB_BASE+PORT2_PIN) & 0x0004) )
        {
            fONhook = FALSE;
            nSendSignal(SIGNAL_OFF_HOOK,LINE_STATE_MACHINE);
            nSendSignal(SIGNAL_DTMF_CLEAR,DTMF_STATE_MACHINE);
        }
    }
    else
    {
        if ( inpw(PCB_BASE+PORT2_PIN) & 0x0004 )
        {
            fONhook = TRUE;
            nSendSignal(SIGNAL_ON_HOOK,LINE_STATE_MACHINE);
        }
    }


}

void _interrupt _far
vMODEMserialIntHandler(void)
{
```

```
    // External Interrupt 1

    int nStatus = inpw(PCB_BASE+SERIAL1_STATUS);

    if ( nStatus & REC_INT_REQ )
    {
        int c;
        c = inpw(PCB_BASE+SERIAL1_RBUF) & 0x00FF;

        if ( inpw(PCB_BASE+SERIAL1_CONTROL) & USE_PARITY )
            c &= 0x007F;

        if ( nStatus & (PARITY_ERROR|FRAMING_ERROR|OVERRUN_ERROR) )
            c ^= 0x00FF;    // signal an error by deliberately
                            // mucking up the received character.

        if ( ((nMODEMreceiveIn+1)&(RX_RING_SIZE-1)) != nMODEMreceiveOut )
        {
            sMODEMrxRing[nMODEMreceiveIn++] = (char)c;
            nMODEMreceiveIn &= RX_RING_SIZE-1;
        }
    }
    if ( nStatus & TX_INT_REQ )
    {
        if ( nMODEMblockLength == 0 )
            nSendSignal(SIGNAL_MAPP_TX_DONE,MAPP_STATE_MACHINE);
        else if ( sMODEMtxBlock != NULL )
        {
            outpw(PCB_BASE+SERIAL1_TBUF, ((int)(*sMODEMtxBlock++)) & 0x00FF);
            --nMODEMblockLength;
        }
    }

    // End Of Interrupt for this INT.
    outpw(PCB_BASE+END_OF_INT,NSPEC_EOI_ENABLE);
}

void
vSendMODEMblock(unsigned char *sBlock, int nBlockSize)
{
    int nFlags = getUPflagsAndCLI();
    sMODEMtxBlock = sBlock;
    nMODEMblockLength = nBlockSize;
    if ( sMODEMtxBlock != NULL && nMODEMblockLength > 0 )
    {
        outpw(PCB_BASE+SERIAL1_TBUF, ((int)(*sMODEMtxBlock++)) & 0x00FF);
        --nMODEMblockLength;
    }
    setUPflags(nFlags);
}

int
nGetMODEMchar( void )
{
    int nFlags,nReturnValue;

    if ( nMODEMreceiveOut == nMODEMreceiveIn )
        return(-1);
    nFlags = getUPflagsAndCLI();

    nReturnValue = ((int)(sMODEMrxRing[nMODEMreceiveOut++])) & 0x00FF;
    nMODEMreceiveOut &= RX_RING_SIZE-1;

    setUPflags(nFlags);

    return( nReturnValue );
}

void
vRunBELL212A(int nSignal)
{
    switch ( nSignal )
    {
        case SIGNAL_DISCONNECT_MODEM :
            nMODEMstate = RESETTING_MODEM;
            nMODEMcountdown = DISCONNECT_TIMEOUT;
            vShowMODEMstate(nMODEMstate);
            break;

        case SIGNAL_START_MODEM_CONNECT :

            vMODEMoff();    // disable the MODEM chip if not off already.

            nMODEMstate = WAIT_FOR_MPC_DIALING;

            break;
    }

    switch ( nMODEMstate )
    {
        default :
            nMODEMstate = WAIT_FOR_OFF_HOOK;

        case WAIT_FOR_OFF_HOOK :
            // just wait around for LINE state machine to activate us.
            break;

        case WAIT_FOR_MPC_DIALING :
            if ( nSignal == SIGNAL_DIAL_DONE )
            {
                vMODEMon(FALSE);
                nMODEMstate = WAIT_FOR_CARRIER_DETECT;
                outp(MODEM_START+CONTROL_REG_0,MODEM_DPSK_TX_MODE|ENABLE_TX);
                nMODEMcountdown = MS_TO_TICKS(CARRIER_DETECT_TIMEOUT);
            }
            break;

        case WAIT_FOR_CARRIER_DETECT :  // Waiting for Carrier Detect
            if ( nSignal == SIGNAL_MODEM_COUNTDOWN )
                nMODEMstate = RESET_MODEM;
            else if ( F_CARRIER_DETECT )
            {
                nMODEMstate = WAIT_FOR_MARKS_1200B;
                nMODEMdataBits = 0;
```

```
            nMODEMcountdown = MS_TO_TICKS(SCRAMBLED_MARK_RECEIVE_TIMEOUT);
        }
        break;

    case WAIT_FOR_MARKS_1200B :   // Wait for "Enough" ones on RX data
        if ( IF_CARRIER_DETECT )
        {
            nMODEMstate = CARRIER_DETECT_DEBOUNCE_1200B;
            nMODEMdebouncer = MS_TO_TICKS(CARRIER_DETECT_DEBOUNCE_TIMEOUT);
        }
        else if ( nSignal == SIGNAL_MODEM_COUNTDOWN )
        {
            int nTickMinimum =
                PERCENTAGE( MS_TO_TICKS(SCRAMBLED_MARK_RECEIVE_TIMEOUT),
                            MODEM_DATA_SENSE_PERCENTAGE
                          );

            if ( nMODEMdataBits > nTickMinimum )
            {
                nMODEMstate = TRANSMIT_SCRAMBLED_ONES;
                nMODEMcountdown = MS_TO_TICKS(TRANSMIT_SCRAMBLED_ONES_TIMEOU
T);

                outp(MODEM_START+TONE_CTRL_REG,RXD_TRISTATE|BELL_TONES);
            }
            else
            {
                nMODEMstate = RESET_MODEM;
            }
        }
        break;

    case CARRIER_DETECT_DEBOUNCE_1200B :  // Debouncing for Carrier Detect
        if ( F_CARRIER_DETECT )
            nMODEMstate = WAIT_FOR_MARKS_1200B;
        else if ( nSignal == SIGNAL_MODEM_COUNTDOWN )
            nMODEMstate = RESET_MODEM;
        else if ( nSignal == SIGNAL_MODEM_DEBOUNCER )
        {
            nMODEMstate = WAIT_FOR_CARRIER_DETECT;
            nMODEMcountdown = MS_TO_TICKS(CARRIER_DETECT_TIMEOUT);
            nMODEMdataBits = 0;
        }
        break;

    case TRANSMIT_SCRAMBLED_ONES :  // Scrambled Ones Tranmitting
        if ( IF_CARRIER_DETECT )
            nMODEMstate = RESET_MODEM;
        else if ( nSignal == SIGNAL_MODEM_COUNTDOWN )
        {
            outp(MODEM_START+TONE_CTRL_REG,CONNECT_NORMAL|BELL_TONES);
            outp(MODEM_START+CONTROL_REG_1,TX_DATA);
            nMODEMstate = MODEM_CONNECTED;
            nSendSignal(SIGNAL_MODEM_CONNECTED,LINE_STATE_MACHINE);
        }
        break;

    case MODEM_CONNECTED :          // Connection Complete, RX & TX
        if ( IF_CARRIER_DETECT )
        {
            // allow some temporary carrier loss. (~20 ms?)
            nMODEMstate = MODEM_CONNECT_CD_DEBOUNCE;
            nMODEMdebouncer = MS_TO_TICKS(CARRIER_DETECT_DEBOUNCE_TIMEOUT);
        }
        break;

    case MODEM_CONNECT_CD_DEBOUNCE :
        if ( F_CARRIER_DETECT )
            nMODEMstate = MODEM_CONNECTED;
        else if ( nSignal == SIGNAL_MODEM_DEBOUNCER )
            nMODEMstate = RESET_MODEM;
        break;

    case WENT_ON_HOOK :
        nMODEMstate = RESET_MODEM;
        break;

    case RESETTING_MODEM :          // reset MODEM chip
        if ( nSignal == SIGNAL_MODEM_COUNTDOWN )
            nMODEMstate = RESET_MODEM;
        break;

    case RESET_MODEM :      // reset MODEM chip
        vMODEMoff();          // disable the MODEM chip
        nMODEMstate = WAIT_FOR_OFF_HOOK;

        nSendSignal(SIGNAL_MODEM_DISCONNECTED,LINE_STATE_MACHINE);
        break;
    }
}

void
vRunBELL103(int nSignal)
{
    switch ( nSignal )
    {
        case SIGNAL_DISCONNECT_MODEM :
            nMODEMstate = RESETTING_MODEM;
            nMODEMcountdown = DISCONNECT_TIMEOUT;
            vShowMODEMstate(nMODEMstate);
            break;

        case SIGNAL_START_MODEM_CONNECT :

            vMODEMoff();    // disable the MODEM chip if not off already.

            nMODEMstate = WAIT_FOR_MPC_DIALING;

            break;
    }

    switch ( nMODEMstate )
    {
        default :
            nMODEMstate = WAIT_FOR_OFF_HOOK;
```

```
        case WAIT_FOR_OFF_HOOK :
            // just wait around for LINE state machine to activate us.
            break;

        case WAIT_FOR_MPC_DIALING :
            if ( nSignal == SIGNAL_DIAL_DONE )
            {
                vMODEMon(FALSE);
                nMODEMstate = WAIT_FOR_CARRIER_DETECT;
                outp(MODEM_START+CONTROL_REG_0,MODEM_FSK_TX_MODE|ENABLE_TX);
                nMODEMcountdown = MS_TO_TICKS(CARRIER_DETECT_TIMEOUT);
            }
            break;

        case WAIT_FOR_CARRIER_DETECT :  // Waiting for Carrier Detect
            if ( nSignal == SIGNAL_MODEM_COUNTDOWN )
                nMODEMstate = RESET_MODEM;
            else if ( F_CARRIER_DETECT )
            {
                nMODEMstate = WAIT_FOR_MARKS_300B;
                nMODEMdataBits = 0;
                nMODEMcountdown = MS_TO_TICKS(ONES_RECEIVE_TIMEOUT);
            }
            break;

        case WAIT_FOR_MARKS_300B :   // Wait for "Enough" ones on RX data
            if ( !F_CARRIER_DETECT )
            {
                nMODEMstate = CARRIER_DETECT_DEBOUNCE_300B;
                nMODEMdebouncer = MS_TO_TICKS(CARRIER_DETECT_DEBOUNCE_TIMEOUT);
            }
            else if ( nSignal == SIGNAL_MODEM_COUNTDOWN )
            {
                int nTickMinimum =
                    PERCENTAGE( MS_TO_TICKS(ONES_RECEIVE_TIMEOUT),
                                MODEM_DATA_SENSE_PERCENTAGE
                              );

                if ( nMODEMdataBits > nTickMinimum )
                {
                    nMODEMstate = MODEM_CONNECTED;
                    outp(MODEM_START+TONE_CTRL_REG,CONNECT_NORMAL|BELL_TONES);
                    outp(MODEM_START+CONTROL_REG_1,TX_DATA);
                    nSendSignal(SIGNAL_MODEM_CONNECTED,LINE_STATE_MACHINE);
                }
                else
                {
                    nMODEMstate = RESET_MODEM;
                }
            }
            break;

        case CARRIER_DETECT_DEBOUNCE_300B :  // Debouncing for Carrier Detect
            if ( F_CARRIER_DETECT )
                nMODEMstate = WAIT_FOR_MARKS_300B;
            else if ( nSignal == SIGNAL_MODEM_COUNTDOWN )
                nMODEMstate = RESET_MODEM;
            else if ( nSignal == SIGNAL_MODEM_DEBOUNCER )
            {
                nMODEMstate = WAIT_FOR_CARRIER_DETECT;
                nMODEMcountdown = MS_TO_TICKS(CARRIER_DETECT_TIMEOUT);
                nMODEMdataBits = 0;
            }
            break;

        case MODEM_CONNECTED :          // Connection Complete, RX & TX
            if ( !F_CARRIER_DETECT )
            {
                // allow some temporary carrier loss. (~20 ms?)
                nMODEMstate = MODEM_CONNECT_CD_DEBOUNCE;
                nMODEMdebouncer = MS_TO_TICKS(CARRIER_DETECT_DEBOUNCE_TIMEOUT);
            }
            break;

        case MODEM_CONNECT_CD_DEBOUNCE :
            if ( F_CARRIER_DETECT )
                nMODEMstate = MODEM_CONNECTED;
            else if ( nSignal == SIGNAL_MODEM_DEBOUNCER )
                nMODEMstate = RESET_MODEM;
            break;

        case WENT_ON_HOOK :
            nMODEMstate = RESET_MODEM;
            break;

        case RESETTING_MODEM :          // reset MODEM chip
            if ( nSignal == SIGNAL_MODEM_COUNTDOWN )
                nMODEMstate = RESET_MODEM;
            break;

        case RESET_MODEM :      // reset MODEM chip
            vMODEMoff();            // disable the MODEM chip
            nMODEMstate = WAIT_FOR_OFF_HOOK;

            nSendSignal(SIGNAL_MODEM_DISCONNECTED,LINE_STATE_MACHINE);
            break;
    }
}

void
vRunCCITTv22(int nSignal)
{
    switch ( nSignal )
    {
        case SIGNAL_DISCONNECT_MODEM :
            nMODEMstate = RESETTING_MODEM;
            nMODEMcountdown = DISCONNECT_TIMEOUT;
            vShowMODEMstate(nMODEMstate);
            break;

        case SIGNAL_START_MODEM_CONNECT :

            vMODEMoff();    // disable the MODEM chip if not off already.
```

```
            nMODEMstate = WAIT_FOR_MPC_DIALING;

            break;
    }

    switch ( nMODEMstate )
    {`
        default :
            nMODEMstate = WAIT_FOR_OFF_HOOK;

        case WAIT_FOR_OFF_HOOK :
            // just wait around for LINE state machine to activate us.
            break;

        #ifndef USE_V25

          case WAIT_FOR_MPC_DIALING :
              if ( nSignal == SIGNAL_DIAL_DONE )
              {
                  vMODEMon(FALSE);
                  nMODEMstate = WAIT_FOR_CARRIER_DETECT;
                  outp(MODEM_START+CONTROL_REG_0,MODEM_DPSK_TX_MODE|ENABLE_TX);
                  nMODEMcountdown = MS_TO_TICKS(CARRIER_DETECT_TIMEOUT);
              }
              break;

        #else

          case WAIT_FOR_MPC_DIALING :
              if ( nSignal == SIGNAL_DIAL_DONE )
              {
                  vMODEMon(FALSE);
                  nMODEMstate = SEND_CCITT_2100_TONE;
                  outp(MODEM_START+TONE_CTRL_REG,RXD_TRISTATE|TRANSMIT_ANSWER_TO
NE|CCITT_TONES);
                  outp(MODEM_START+CONTROL_REG_0,MODEM_DPSK_TX_MODE|ENABLE_TX);
                  nMODEMcountdown = MS_TO_TICKS(CCITT_2100_ON_TIME);
              }
              break;

          case SEND_CCITT_2100_TONE :
              if ( nSignal == SIGNAL_MODEM_COUNTDOWN )
              {
                  nMODEMstate = WAIT_CCITT_2100_OFF;
                  outp(MODEM_START+CONTROL_REG_0,MODEM_DPSK_TX_MODE|DISABLE_TX);

                  outp(MODEM_START+TONE_CTRL_REG,RXD_TRISTATE|CCITT_TONES);
                  nMODEMcountdown = MS_TO_TICKS(CCITT_2100_OFF_TIME);
              }
//              else if ( F_CARRIER_DETECT )
//              {
//                  nMODEMstate = WAIT_FOR_MARKS_1200B;
//                  nMODEMdataBits = 0;
//                  outp(MODEM_START+TONE_CTRL_REG,RXD_TRISTATE|CCITT_TONES);
//                  nMODEMcountdown = MS_TO_TICKS(SCRAMBLED_MARK_RECEIVE_TIMEOUT
);
//              }
              break;

          case WAIT_CCITT_2100_OFF :
              if ( nSignal == SIGNAL_MODEM_COUNTDOWN )
              {
                  nMODEMstate = WAIT_FOR_CARRIER_DETECT;
                  outp(MODEM_START+CONTROL_REG_0,MODEM_DPSK_TX_MODE|ENABLE_TX);
                  nMODEMcountdown = MS_TO_TICKS(CARRIER_DETECT_TIMEOUT);
              }
              break;
        #endif

        case WAIT_FOR_CARRIER_DETECT :  // Waiting for Carrier Detect
            if ( nSignal == SIGNAL_MODEM_COUNTDOWN )
                nMODEMstate = RESET_MODEM;
            else if ( F_CARRIER_DETECT )
            {
                nMODEMstate = WAIT_FOR_MARKS_1200B;
                nMODEMdataBits = 0;
                nMODEMcountdown = MS_TO_TICKS(SCRAMBLED_MARK_RECEIVE_TIMEOUT);
            }
            break;

        case WAIT_FOR_MARKS_1200B :   // Wait for "Enough" ones on RX data
            if ( !F_CARRIER_DETECT )
            {
                nMODEMstate = CARRIER_DETECT_DEBOUNCE_1200B;
                nMODEMdebouncer = MS_TO_TICKS(CARRIER_DETECT_DEBOUNCE_TIMEOUT);
            }
            else if ( nSignal == SIGNAL_MODEM_COUNTDOWN )
            {
                int nTickMinimum =
                    PERCENTAGE( MS_TO_TICKS(SCRAMBLED_MARK_RECEIVE_TIMEOUT),
                                MODEM_DATA_SENSE_PERCENTAGE
                              );

                if ( nMODEMdataBits > nTickMinimum )
                {
                    nMODEMstate = TRANSMIT_SCRAMBLED_ONES;
                    nMODEMcountdown = MS_TO_TICKS(TRANSMIT_SCRAMBLED_ONES_TIMEOU
T);
                    outp(MODEM_START+TONE_CTRL_REG,RXD_TRISTATE|CCITT_TONES);
                    outp(MODEM_START+CONTROL_REG_1,TX_MARK);
                }
                else
                {
                    nMODEMstate = RESET_MODEM;
                }
            }
            break;

        case CARRIER_DETECT_DEBOUNCE_1200B :  // Debouncing for Carrier Detect
            if ( F_CARRIER_DETECT )
                nMODEMstate = WAIT_FOR_MARKS_1200B;
            else if ( nSignal == SIGNAL_MODEM_COUNTDOWN )
                nMODEMstate = RESET_MODEM;
```

```
        else if ( nSignal == SIGNAL_MODEM_DEBOUNCER )
        {
            nMODEMstate = WAIT_FOR_CARRIER_DETECT;
            nMODEMcountdown = MS_TO_TICKS(CARRIER_DETECT_TIMEOUT);
            nMODEMdataBits = 0;
        }
        break;

    case TRANSMIT_SCRAMBLED_ONES :  // Scrambled Ones Tranmitting
        if ( !F_CARRIER_DETECT )
            nMODEMstate = RESET_MODEM;
        else if ( nSignal == SIGNAL_MODEM_COUNTDOWN )
        {
            outp(MODEM_START+TONE_CTRL_REG,CONNECT_NORMAL|CCITT_TONES);
            outp(MODEM_START+CONTROL_REG_1,TX_DATA);
            nMODEMstate = MODEM_CONNECTED;
            nSendSignal(SIGNAL_MODEM_CONNECTED,LINE_STATE_MACHINE);
        }
        break;

    case MODEM_CONNECTED :          // Connection Complete, RX & TX
        if ( !F_CARRIER_DETECT )
        {
            // allow some temporary carrier loss. (~20 ms?)
            nMODEMstate = MODEM_CONNECT_CD_DEBOUNCE;
            nMODEMdebouncer = MS_TO_TICKS(CARRIER_DETECT_DEBOUNCE_TIMEOUT);
        }
        break;

    case MODEM_CONNECT_CD_DEBOUNCE :
        if ( F_CARRIER_DETECT )
            nMODEMstate = MODEM_CONNECTED;
        else if ( nSignal == SIGNAL_MODEM_DEBOUNCER )
            nMODEMstate = RESET_MODEM;
        break;

    case WENT_ON_HOOK :
        nMODEMstate = RESET_MODEM;
        break;

    case RESETTING_MODEM :          // reset MODEM chip
        if ( nSignal == SIGNAL_MODEM_COUNTDOWN )
            nMODEMstate = RESET_MODEM;
        break;

    case RESET_MODEM :      // reset MODEM chip
        vMODEMoff();            // disable the MODEM chip
        nMODEMstate = WAIT_FOR_OFF_HOOK;

        nSendSignal(SIGNAL_MODEM_DISCONNECTED,LINE_STATE_MACHINE);
        break;
    }
}

void
vRunCCITTv21(int nSignal)
{
    switch ( nSignal )
    {
        case SIGNAL_DISCONNECT_MODEM :
            nMODEMstate = RESETTING_MODEM;
            nMODEMcountdown = DISCONNECT_TIMEOUT;
            vShowMODEMstate(nMODEMstate);
            break;

        case SIGNAL_START_MODEM_CONNECT :

            vMODEMoff();    // disable the MODEM chip if not off already.

            nMODEMstate = WAIT_FOR_MPC_DIALING;

            break;
    }

    switch ( nMODEMstate )
    {
        default :
            nMODEMstate = WAIT_FOR_OFF_HOOK;

        case WAIT_FOR_OFF_HOOK :
            // just wait around for LINE state machine to activate us.
            break;

        #ifndef USE_V25
          case WAIT_FOR_MPC_DIALING :
              if ( nSignal == SIGNAL_DIAL_DONE )
              {
                  vMODEMon(FALSE);
                  nMODEMstate = WAIT_FOR_CARRIER_DETECT;
                  outp(MODEM_START+CONTROL_REG_0,MODEM_FSK_TX_MODE|V21_FSK|ENABL
E_TX);
                  nMODEMcountdown = MS_TO_TICKS(CARRIER_DETECT_TIMEOUT);
              }
              break;

        #else

          case WAIT_FOR_MPC_DIALING :
              if ( nSignal == SIGNAL_DIAL_DONE )
              {
                  vMODEMon(FALSE);
                  nMODEMstate = SEND_CCITT_2100_TONE;
                  outp(MODEM_START+CONTROL_REG_0,MODEM_DPSK_TX_MODE|DISABLE_TX);

                  outp(MODEM_START+TONE_CTRL_REG,RXD_TRISTATE|TRANSMIT_ANSWER_TO
NE|CCITT_TONES);
                  outp(MODEM_START+CONTROL_REG_0,MODEM_DPSK_TX_MODE|ENABLE_TX);
                  nMODEMcountdown = MS_TO_TICKS(CCITT_2100_ON_TIME);
              }
              break;

          case SEND_CCITT_2100_TONE :
              if ( nSignal == SIGNAL_MODEM_COUNTDOWN )
              {
```

```
                nMODEMstate = WAIT_CCITT_2100_OFF;
                outp(MODEM_START+CONTROL_REG_0,MODEM_FSK_TX_MODE|V21_FSK|DISAB
LE_TX);
                outp(MODEM_START+TONE_CTRL_REG,RXD_TRISTATE|CCITT_TONES);
                nMODEMcountdown = MS_TO_TICKS(CCITT_2100_OFF_TIME);
            }
            break;

        case WAIT_CCITT_2100_OFF :
            if ( nSignal == SIGNAL_MODEM_COUNTDOWN )
            {
                nMODEMstate = WAIT_FOR_CARRIER_DETECT;
                outp(MODEM_START+CONTROL_REG_0,MODEM_FSK_TX_MODE|V21_FSK|ENABL
E_TX);
                nMODEMcountdown = MS_TO_TICKS(CARRIER_DETECT_TIMEOUT);
            }
            break;

      #endif

      case WAIT_FOR_CARRIER_DETECT :  // Waiting for Carrier Detect
          if ( nSignal == SIGNAL_MODEM_COUNTDOWN )
              nMODEMstate = RESET_MODEM;
          #ifdef USE_V25
            else if ( F_CARRIER_DETECT )
          #else
            else if ( (nMODEMcountdown <
                       MS_TO_TICKS(CARRIER_DETECT_TIMEOUT-V21_CARRIER_DELAY))
                      && F_CARRIER_DETECT )   // let signal go for 100 mSec!
          #endif
          {
              nMODEMstate = WAIT_FOR_MARKS_300B;
              nMODEMdataBits = 0;
              nMODEMcountdown = MS_TO_TICKS(ONES_RECEIVE_TIMEOUT);
          }
          break;

      case WAIT_FOR_MARKS_300B :   // Wait for "Enough" ones on RX data
          if ( !F_CARRIER_DETECT )
          {
              nMODEMstate = CARRIER_DETECT_DEBOUNCE_300B;
              nMODEMdebouncer = MS_TO_TICKS(CARRIER_DETECT_DEBOUNCE_TIMEOUT);
          }
          else if ( nSignal == SIGNAL_MODEM_COUNTDOWN )
          {
              int nTickMinimum =
                  PERCENTAGE( MS_TO_TICKS(ONES_RECEIVE_TIMEOUT),
                              MODEM_DATA_SENSE_PERCENTAGE
                            );

              if ( nMODEMdataBits > nTickMinimum )
              {
                  nMODEMstate = MODEM_CONNECTED;
                  outp(MODEM_START+TONE_CTRL_REG,CONNECT_NORMAL|CCITT_TONES);
                  outp(MODEM_START+CONTROL_REG_1,TX_DATA);
                  nSendSignal(SIGNAL_MODEM_CONNECTED,LINE_STATE_MACHINE);
              }
              else
              {
                  nMODEMstate = RESET_MODEM;
              }
          }
          break;

      case CARRIER_DETECT_DEBOUNCE_300B :  // Debouncing for Carrier Detect
          if ( F_CARRIER_DETECT )
              nMODEMstate = WAIT_FOR_MARKS_300B;
          else if ( nSignal == SIGNAL_MODEM_COUNTDOWN )
              nMODEMstate = RESET_MODEM;
          else if ( nSignal == SIGNAL_MODEM_DEBOUNCER )
          {
              nMODEMstate = WAIT_FOR_CARRIER_DETECT;
              nMODEMcountdown = MS_TO_TICKS(CARRIER_DETECT_TIMEOUT);
              nMODEMdataBits = 0;
          }
          break;

      case MODEM_CONNECTED :          // Connection Complete, RX & TX
          if ( !F_CARRIER_DETECT )
          {
              // allow some temporary carrier loss. (~20 ms?)
              nMODEMstate = MODEM_CONNECT_CD_DEBOUNCE;
              nMODEMdebouncer = MS_TO_TICKS(CARRIER_DETECT_DEBOUNCE_TIMEOUT);
          }
          break;

      case MODEM_CONNECT_CD_DEBOUNCE :
          if ( F_CARRIER_DETECT )
              nMODEMstate = MODEM_CONNECTED;
          else if ( nSignal == SIGNAL_MODEM_DEBOUNCER )
              nMODEMstate = RESET_MODEM;
          break;

      case WENT_ON_HOOK :
          nMODEMstate = RESET_MODEM;
          break;

      case RESETTING_MODEM :          // reset MODEM chip
          if ( nSignal == SIGNAL_MODEM_COUNTDOWN )
              nMODEMstate = RESET_MODEM;
          break;

      case RESET_MODEM :      // reset MODEM chip
          vMODEMoff();            // disable the MODEM chip
          nMODEMstate = WAIT_FOR_OFF_HOOK;

          nSendSignal(SIGNAL_MODEM_DISCONNECTED,LINE_STATE_MACHINE);
          break;
    }
}

void
vRunBELLautobauding(int nSignal)
{
```

```
switch ( nSignal )
{
    case SIGNAL_DISCONNECT_MODEM :
        nMODEMstate = RESETTING_MODEM;
        nMODEMcountdown = DISCONNECT_TIMEOUT;
        vShowMODEMstate(nMODEMstate);
        break;

    case SIGNAL_START_MODEM_CONNECT :

        vMODEMoff();    // disable the MODEM chip if not off already.

        nMODEMstate = WAIT_FOR_MPC_DIALING;

        break;
}

switch ( nMODEMstate )
{
    default :
        nMODEMstate = WAIT_FOR_OFF_HOOK;

    case WAIT_FOR_OFF_HOOK :
        // just wait around for LINE state machine to activate us.
        break;

    case WAIT_FOR_MPC_DIALING :
        if ( nSignal == SIGNAL_DIAL_DONE )
        {
            vMODEMon(FALSE);
            nMODEMstate = WAIT_FOR_CARRIER_DETECT;
            outp(MODEM_START+CONTROL_REG_0,MODEM_FSK_TX_MODE|ENABLE_TX);
            nMODEMcountdown = MS_TO_TICKS(CARRIER_DETECT_TIMEOUT);
        }
        break;

    case WAIT_FOR_CARRIER_DETECT :  // Waiting for Carrier Detect
        if ( nSignal == SIGNAL_MODEM_COUNTDOWN )
            nMODEMstate = RESET_MODEM;
        else if ( F_CARRIER_DETECT )
        {
            nMODEMstate = WAIT_FOR_MARKS_300B;
            nMODEMdataBits = 0;
            nMODEMcountdown = MS_TO_TICKS(ONES_RECEIVE_TIMEOUT);
        }
        break;

    case WAIT_FOR_MARKS_300B :   // Wait for "Enough" ones on RX data
        if ( !F_CARRIER_DETECT )
        {
            nMODEMstate = CARRIER_DETECT_DEBOUNCE_300B;
            nMODEMdebouncer = MS_TO_TICKS(CARRIER_DETECT_DEBOUNCE_TIMEOUT);
        }
        else if ( nSignal == SIGNAL_MODEM_COUNTDOWN )
        {
            int nTickMinimum =
                PERCENTAGE( MS_TO_TICKS(ONES_RECEIVE_TIMEOUT),
                            MODEM_DATA_SENSE_PERCENTAGE
                          );

            if ( nMODEMdataBits > nTickMinimum )
            {
                nMODEMstate = MODEM_CONNECTED;
                outp(MODEM_START+TONE_CTRL_REG,CONNECT_NORMAL|BELL_TONES);
                outp(MODEM_START+CONTROL_REG_1,TX_DATA);
                nSendSignal(SIGNAL_MODEM_CONNECTED,LINE_STATE_MACHINE);
            }
            else
            {
                // it's not a correct 300 baud connection, so now
                // we try to see if it is a 1200 baud connection...
                nMODEMstate = WAIT_FOR_MARKS_1200B;
                vMODEMon(TRUE);
                nMODEMdataBits = 0;
                nMODEMcountdown = MS_TO_TICKS(SCRAMBLED_MARK_RECEIVE_TIMEOUT
                                              ONES_RECEIVE_TIMEOUT);
            }
        }
        break;

    case CARRIER_DETECT_DEBOUNCE_300B :  // Debouncing for Carrier Detect
        if ( F_CARRIER_DETECT )
            nMODEMstate = WAIT_FOR_MARKS_300B;
        else if ( nSignal == SIGNAL_MODEM_COUNTDOWN )
            nMODEMstate = RESET_MODEM;
        else if ( nSignal == SIGNAL_MODEM_DEBOUNCER )
        {
            nMODEMstate = WAIT_FOR_CARRIER_DETECT;
            nMODEMcountdown = MS_TO_TICKS(CARRIER_DETECT_TIMEOUT);
            nMODEMdataBits = 0;
        }
        break;

    case WAIT_FOR_MARKS_1200B :   // Wait for "Enough" ones on RX data
        if ( !F_CARRIER_DETECT )
        {
            nMODEMstate = CARRIER_DETECT_DEBOUNCE_1200B;
            nMODEMdebouncer = MS_TO_TICKS(CARRIER_DETECT_DEBOUNCE_TIMEOUT);
        }
        else if ( nSignal == SIGNAL_MODEM_COUNTDOWN )
        {
            int nTickMinimum =
                PERCENTAGE( MS_TO_TICKS(SCRAMBLED_MARK_RECEIVE_TIMEOUT-
                                        ONES_RECEIVE_TIMEOUT),
                            MODEM_DATA_SENSE_PERCENTAGE
                          );

            if ( nMODEMdataBits > nTickMinimum )
            {
                nMODEMstate = TRANSMIT_SCRAMBLED_ONES;
                nMODEMcountdown = MS_TO_TICKS(TRANSMIT_SCRAMBLED_ONES_TIMEOU
T);
                outp(MODEM_START+TONE_CTRL_REG,RXD_TRISTATE|BELL_TONES);
```

```
            }
            else
            {
                nMODEMstate = RESET_MODEM;
            }
        }
        break;

    case CARRIER_DETECT_DEBOUNCE_1200B :  // Debouncing for Carrier Detect
        if ( F_CARRIER_DETECT )
            nMODEMstate = WAIT_FOR_MARKS_1200B;
        else if ( nSignal == SIGNAL_MODEM_COUNTDOWN )
            nMODEMstate = RESET_MODEM;
        else if ( nSignal == SIGNAL_MODEM_DEBOUNCER )
        {
            nMODEMstate = WAIT_FOR_CARRIER_DETECT;
            nMODEMcountdown = MS_TO_TICKS(CARRIER_DETECT_TIMEOUT);
            vMODEMon(FALSE);
            outp(MODEM_START+CONTROL_REG_0,MODEM_FSK_TX_MODE|ENABLE_TX);
        }
        break;

    case TRANSMIT_SCRAMBLED_ONES :  // Scrambled Ones Tranmitting
        if ( !F_CARRIER_DETECT )
            nMODEMstate = RESET_MODEM;
        else if ( nSignal == SIGNAL_MODEM_COUNTDOWN )
        {
            outp(MODEM_START+TONE_CTRL_REG,CONNECT_NORMAL|BELL_TONES);
            outp(MODEM_START+CONTROL_REG_1,TX_DATA);
            nMODEMstate = MODEM_CONNECTED;
            nSendSignal(SIGNAL_MODEM_CONNECTED,LINE_STATE_MACHINE);
        }
        break;

    case MODEM_CONNECTED :          // Connection Complete, RX & TX
        if ( !F_CARRIER_DETECT )
        {
            // allow some temporary carrier loss. (~20 ms?)
            nMODEMstate = MODEM_CONNECT_CD_DEBOUNCE;
            nMODEMdebouncer = MS_TO_TICKS(CARRIER_DETECT_DEBOUNCE_TIMEOUT);
        }
        break;

    case MODEM_CONNECT_CD_DEBOUNCE :
        if ( F_CARRIER_DETECT )
            nMODEMstate = MODEM_CONNECTED;
        else if ( nSignal == SIGNAL_MODEM_DEBOUNCER )
            nMODEMstate = RESET_MODEM;
        break;

    case WENT_ON_HOOK :
        nMODEMstate = RESET_MODEM;
        break;

    case RESETTING_MODEM :          // reset MODEM chip
        if ( nSignal == SIGNAL_MODEM_COUNTDOWN )
            nMODEMstate = RESET_MODEM;
```

File: src\MODEM.C

```
            break;

        case RESET_MODEM :      // reset MODEM chip
            vMODEMoff();            // disable the MODEM chip
            nMODEMstate = WAIT_FOR_OFF_HOOK;

            nSendSignal(SIGNAL_MODEM_DISCONNECTED,LINE_STATE_MACHINE);
            break;
    }
}

void
vRunCCITTautobauding(int nSignal)
{
    static nCCITTautoTry;

    switch ( nSignal )
    {
        case SIGNAL_DISCONNECT_MODEM :
            nMODEMstate = RESETTING_MODEM;
            nMODEMcountdown = DISCONNECT_TIMEOUT;
            vShowMODEMstate(nMODEMstate);
            break;

        case SIGNAL_START_MODEM_CONNECT :

            vMODEMoff();    // disable the MODEM chip if not off already.

            nMODEMstate = WAIT_FOR_MPC_DIALING;
            nCCITTautoTry = 0;

            break;
    }

    switch ( nMODEMstate )
    {
        default :
            nMODEMstate = WAIT_FOR_OFF_HOOK;

        case WAIT_FOR_OFF_HOOK :
            // just wait around for LINE state machine to activate us.
            break;

        #ifndef USE_V25

          case WAIT_FOR_MPC_DIALING :
              if ( nSignal == SIGNAL_DIAL_DONE )
              {
                  vMODEMon(FALSE); // start by assuming V.21
                  nMODEMstate = WAIT_FOR_CARRIER_V21;
                  nMODEMcountdown = MS_TO_TICKS(CCITT_TRY_V21_TIME);
                  outp(MODEM_START+CONTROL_REG_0,MODEM_FSK_TX_MODE|V21_FSK|ENABL
E_TX);
              }
              break;

        #else
```

```
        case WAIT_FOR_MPC_DIALING :
            if ( nSignal == SIGNAL_DIAL_DONE )
            {
                vMODEMon(TRUE); // start by assuming V.22
                nMODEMstate = SEND_CCITT_2100_TONE;
                outp(MODEM_START+TONE_CTRL_REG,RXD_TRISTATE|TRANSMIT_ANSWER_TO
NE|CCITT_TONES);
                outp(MODEM_START+CONTROL_REG_0,MODEM_DPSK_TX_MODE|ENABLE_TX);
                nMODEMcountdown = MS_TO_TICKS(CCITT_2100_ON_TIME);
            }
            break;

        case SEND_CCITT_2100_TONE :
            if ( nSignal == SIGNAL_MODEM_COUNTDOWN )
            {
                nMODEMstate = WAIT_CCITT_2100_OFF;
                vMODEMon(FALSE);        // switch to assuming V.21
                nMODEMcountdown = MS_TO_TICKS(CCITT_2100_OFF_TIME);
            }
//              else if ( F_CARRIER_DETECT )
//              {
//                  nMODEMstate = WAIT_FOR_MARKS_1200B;
//                  nMODEMdataBits = 0;
//                  outp(MODEM_START+TONE_CTRL_REG,RXD_TRISTATE|CCITT_TONES);
//                  nMODEMcountdown = MS_TO_TICKS(SCRAMBLED_MARK_RECEIVE_TIMEOUT
);
//              }
            break;

        case WAIT_CCITT_2100_OFF :
            if ( nSignal == SIGNAL_MODEM_COUNTDOWN )
            {
                nMODEMstate = WAIT_FOR_CARRIER_V21;
                outp(MODEM_START+CONTROL_REG_0,MODEM_FSK_TX_MODE|V21_FSK|ENABL
E_TX);
                nMODEMcountdown = MS_TO_TICKS(CCITT_TRY_V21_TIME);
            }
            break;
        #endif

        case WAIT_FOR_CARRIER_V21 :     // Waiting for Carrier Detect
            if ( nSignal == SIGNAL_MODEM_COUNTDOWN )
            {
                nMODEMstate = WAIT_FOR_CARRIER_V22;

                vMODEMon(TRUE); // switch to V.22
                outp(MODEM_START+CONTROL_REG_0,MODEM_DPSK_TX_MODE|ENABLE_TX);
                nMODEMcountdown = MS_TO_TICKS(CCITT_TRY_V22_TIME);
            }
            #ifdef USE_V25
              else if ( F_CARRIER_DETECT )
            #else
              else if ( (nMODEMcountdown <
                        MS_TO_TICKS(CCITT_TRY_V21_TIME-V21_CARRIER_DELAY))
                       && F_CARRIER_DETECT )   // let signal go for 100 mSecl
            #endif
                {
                    nMODEMstate = WAIT_FOR_MARKS_300B;
                    nMODEMdataBits = 0;
                    nMODEMcountdown = MS_TO_TICKS(ONES_RECEIVE_TIMEOUT);
                }
                break;

        case WAIT_FOR_MARKS_300B :   // Wait for "Enough" ones on RX data
            if ( !F_CARRIER_DETECT )
            {
                nMODEMstate = CARRIER_DETECT_DEBOUNCE_300B;
                nMODEMdebouncer = MS_TO_TICKS(CARRIER_DETECT_DEBOUNCE_TIMEOUT);
            }
            else if ( nSignal == SIGNAL_MODEM_COUNTDOWN )
            {
                int nTickMinimum =
                    PERCENTAGE( MS_TO_TICKS(ONES_RECEIVE_TIMEOUT),
                                MODEM_DATA_SENSE_PERCENTAGE
                              );

                if ( nMODEMdataBits > nTickMinimum )
                {
                    nMODEMstate = MODEM_CONNECTED;
                    outp(MODEM_START+TONE_CTRL_REG,CONNECT_NORMAL|CCITT_TONES);
                    outp(MODEM_START+CONTROL_REG_1,TX_DATA);
                    nSendSignal(SIGNAL_MODEM_CONNECTED,LINE_STATE_MACHINE);
                }
                else
                {
                    // it's not a V.21 connection, so try V.22
                    nMODEMstate = WAIT_FOR_CARRIER_V22;

                    vMODEMon(TRUE); // switch to V.22
                    outp(MODEM_START+CONTROL_REG_0,MODEM_DPSK_TX_MODE|ENABLE_TX)
;
                    nMODEMcountdown = MS_TO_TICKS(CCITT_TRY_V22_TIME);
                }
            }
            break;

        case CARRIER_DETECT_DEBOUNCE_300B :  // Debouncing for Carrier Detect
            if ( F_CARRIER_DETECT )
                nMODEMstate = WAIT_FOR_MARKS_300B;
            else if ( nSignal == SIGNAL_MODEM_COUNTDOWN )
            {
                nMODEMstate = CCITT_RETRY;
                vMODEMoff();    // disable the MODEM chip if not off already.
                nMODEMcountdown = MS_TO_TICKS(CCITT_TRY_SILENCE_TIME);
            }
            else if ( nSignal == SIGNAL_MODEM_DEBOUNCER )
            {
                // it's not a stable V.21 connection, so try V.22
                nMODEMstate = WAIT_FOR_CARRIER_V22;

                vMODEMon(TRUE); // switch to V.22
                outp(MODEM_START+CONTROL_REG_0,MODEM_DPSK_TX_MODE|ENABLE_TX);
                nMODEMcountdown = MS_TO_TICKS(CCITT_TRY_V22_TIME);
```

```
        }
        break;

    case WAIT_FOR_CARRIER_V22 :     // Waiting for Carrier Detect
        if ( nSignal == SIGNAL_MODEM_COUNTDOWN )
        {
            nMODEMstate = CCITT_RETRY;
            vMODEMoff();    // disable the MODEM chip if not off already.
            nMODEMcountdown = MS_TO_TICKS(CCITT_TRY_SILENCE_TIME);
        }
        else if ( F_CARRIER_DETECT )
        {
            nMODEMstate = WAIT_FOR_MARKS_1200B;
            nMODEMdataBits = 0;
            nMODEMcountdown = MS_TO_TICKS(SCRAMBLED_MARK_RECEIVE_TIMEOUT);
        }
        break;

    case WAIT_FOR_MARKS_1200B :   // Wait for "Enough" ones on RX data
        if ( !F_CARRIER_DETECT )
        {
            nMODEMstate = CARRIER_DETECT_DEBOUNCE_1200B;
            nMODEMdebouncer = MS_TO_TICKS(CARRIER_DETECT_DEBOUNCE_TIMEOUT);
        }
        else if ( nSignal == SIGNAL_MODEM_COUNTDOWN )
        {
            int nTickMinimum =
                PERCENTAGE( MS_TO_TICKS(SCRAMBLED_MARK_RECEIVE_TIMEOUT-
                                        ONES_RECEIVE_TIMEOUT),
                            MODEM_DATA_SENSE_PERCENTAGE
                          );

            if ( nMODEMdataBits > nTickMinimum )
            {
                nMODEMstate = TRANSMIT_SCRAMBLED_ONES;
                nMODEMcountdown = MS_TO_TICKS(TRANSMIT_SCRAMBLED_ONES_TIMEOU
T);

                outp(MODEM_START+TONE_CTRL_REG,RXD_TRISTATE|CCITT_TONES);
                outp(MODEM_START+CONTROL_REG_1,TX_MARK);
            }
            else
            {
                // it's not a V.22 connection, so retry...
                nMODEMstate = CCITT_RETRY;
                vMODEMoff();    // disable the MODEM chip if not off already

                nMODEMcountdown = MS_TO_TICKS(CCITT_TRY_SILENCE_TIME);
            }
        }
        break;

    case CARRIER_DETECT_DEBOUNCE_1200B :  // Debouncing for Carrier Detect
        if ( F_CARRIER_DETECT )
            nMODEMstate = WAIT_FOR_MARKS_1200B;
        else if ( nSignal == SIGNAL_MODEM_COUNTDOWN )
        {
            nMODEMstate = RESET_MODEM;
            vMODEMoff();    // disable the MODEM chip if not off already.
            nMODEMcountdown = MS_TO_TICKS(CCITT_TRY_SILENCE_TIME);
        }
        else if ( nSignal == SIGNAL_MODEM_DEBOUNCER )
        {
            nMODEMstate = CCITT_RETRY;
            vMODEMoff();    // disable the MODEM chip if not off already.
            nMODEMcountdown = MS_TO_TICKS(CCITT_TRY_SILENCE_TIME);
        }
        break;

    case TRANSMIT_SCRAMBLED_ONES :  // Scrambled Ones Tranmitting
        if ( !F_CARRIER_DETECT )
            nMODEMstate = RESET_MODEM;
        else if ( nSignal == SIGNAL_MODEM_COUNTDOWN )
        {
            outp(MODEM_START+TONE_CTRL_REG,CONNECT_NORMAL|CCITT_TONES);
            outp(MODEM_START+CONTROL_REG_1,TX_DATA);
            nMODEMstate = MODEM_CONNECTED;
            nSendSignal(SIGNAL_MODEM_CONNECTED,LINE_STATE_MACHINE);
        }
        break;

    case MODEM_CONNECTED :          // Connection Complete, RX & TX
        if ( !F_CARRIER_DETECT )
        {
            // allow some temporary carrier loss. (~20 ms?)
            nMODEMstate = MODEM_CONNECT_CD_DEBOUNCE;
            nMODEMdebouncer = MS_TO_TICKS(CARRIER_DETECT_DEBOUNCE_TIMEOUT);
        }
        break;

    case MODEM_CONNECT_CD_DEBOUNCE :
        if ( F_CARRIER_DETECT )
            nMODEMstate = MODEM_CONNECTED;
        else if ( nSignal == SIGNAL_MODEM_DEBOUNCER )
            nMODEMstate = RESET_MODEM;
        break;

    case CCITT_RETRY :
        if ( nSignal == SIGNAL_MODEM_COUNTDOWN )
        {
            if ( ++nCCITTautoTry >= CCITT_AUTOBAUD_RETRIES )
                nMODEMstate = RESET_MODEM;
            else
            {
                #ifdef USE_V25

                nMODEMstate = SEND_CCITT_2100_TONE;
                vMODEMon(FALSE);        // start at V.21 again
                outp(MODEM_START+TONE_CTRL_REG,RXD_TRISTATE|TRANSMIT_ANSWE
R_TONE|CCITT_TONES);

                outp(MODEM_START+CONTROL_REG_0,MODEM_DPSK_TX_MODE|ENABLE_T
X);

                nMODEMcountdown = MS_TO_TICKS(CCITT_2100_ON_TIME);
                #else
                nMODEMstate = WAIT_FOR_CARRIER_V21;
```

```
                        vMODEMon(FALSE);        // start at V.21 again
                        outp(MODEM_START+CONTROL_REG_0,MODEM_FSK_TX_MODE|V21_FSK|E
NABLE_TX);
                        nMODEMcountdown = MS_TO_TICKS(CCITT_TRY_V21_TIME);
                      #endif
                }
            }
            break;

        case WENT_ON_HOOK :
            nMODEMstate = RESET_MODEM;
            break;

        case RESETTING_MODEM :          // reset MODEM chip
            if ( nSignal == SIGNAL_MODEM_COUNTDOWN )
                nMODEMstate = RESET_MODEM;
            break;

        case RESET_MODEM :      // reset MODEM chip
            vMODEMoff();            // disable the MODEM chip
            nMODEMstate = WAIT_FOR_OFF_HOOK;

            nSendSignal(SIGNAL_MODEM_DISCONNECTED,LINE_STATE_MACHINE);
            break;
    }
}
```

```
    page    60,132
;*****************************************************************
;
; This code (c) Copyright 1992 by
;          and designed by
;              Research In Motion Limited
;              Unit 1111, 180 Columbia Street West
;              Waterloo, Ontario, Canada
;              N2L 3L3
;       Phone: (519) 888-7465
;         FAX: (519) 888-6906
;
; Author:      Michael A. Barnstijn
;
; Date created: 1 April 1990
;
; Description: Installs an interrupt handler on the PC's
;              USER TICK (interrupt 1Ch).  Chains to the
;              previous handler when completed.
;
;              The interrupt handler calls a 'C' function for
;              high-level processing.
;
; Change History:
;      30 April 1992    changes for MPC/v compatibility.
;
;         July 1991     Changes for MPC compatibility.
;
;      19 February 1991 changes for MS C runtime library stack
;                       consistency checks from timer functions
;
;       5 June 1990     Cleaned up for V2.0 release
;
;*****************************************************************
;
; set up the MSC C segment interface
.186
.MODEL LARGE, C

include interrup.inb
include pcb.inb
include pcb_bits.inb
include system.inc
include mem_map.inb
include leds.inb

extrn   MtimingHandler:proc      ; MobiLib timing scheduler in 'C'

.DATA

    public  globalClock

globalClock label dword         ; this is incremented at each user tick
    dd      0

inTimer label byte              ; flag set to 1 if in timer handler
    db      0
```

File: src\TIMING_A.ASM

```
.CODE

;*****************************************************************
;
;      MinstallClock    install User Tick (1Ch) interrupt handler
;
; Usage:        void MinstallClock((void far *)stack, unsigned size);
;
; Description:
;      A pointer to the 'C' code's local stack area is
;      passed to this initialization function.
;
;*****************************************************************
MinstallClock proc far uses ds ax bx cx dx es; stack:dword, ssize:WORD

    mov  ax,seg DGROUP   ; get local data segment
    mov  ds,ax

    mov  inTimer,0       ; reset the "IN-FUNCTION" flag

    ; install the interrupt handler
    mov ax, 0
    mov es, ax
    mov bx, TIMER_2
    mov word ptr es:[bx], offset userTickHandler
    mov word ptr es:2[bx], seg userTickHandler

    ; start timer 2 on the 80c188EB

    mov  dx, PCB_BASE+TIMER2_COMPAREA
    mov  ax, FIVE_MSEC               ; one clock tick every 5 ms.
    out  dx, al                      ; writes 16 bits to PCB
    mov  dx, PCB_BASE+TIMER2_COUNT
    mov  ax, 0
    out  dx, al                      ; reset the counter
    mov  dx, PCB_BASE+TIMER2_CONTROL
    mov  ax, 0E001h
    out  dx, al    ; enable the counter
    mov  dx, PCB_BASE+TIMER_CONTROL
    mov  ax, PRIORITY and SYS_CLOCK ; set the priority
    out  dx, al
    ret

MinstallClock   endp

;*****************************************************************
;
;      MremoveClock     restore the User Tick (1Ch) interrupt handler
;
; Usage:        void MremoveClock();
;
; Description:
;      Restores the old User Tick interrupt handler.
;
;*****************************************************************
MremoveClock proc far uses ax dx
```

```
    mov     dx, PCB_BASE+TIMER2_CONTROL
    mov     ax, 06001h
    out     dx, al  ; disable timer 2
    ret
MremoveClock   endp

;*************************************************************
;
;
;       getUPflags     get the processor status flags
;
; Usage:        oldflags = getUPflags();
;               short int oldflags;
;
; Description:
;       gets the processor's status flags and disables interrupts
;
;*************************************************************
getUPflags proc    far     ; return flags
    pushf
    pop     ax
    ret
getUPflags endp

;*************************************************************
;
;
;       setUPflags     set the processor status flags
;
; Usage:        setUPflags(oldflags);
;               short int oldflags;
;
; Description:
;       sets the processor's status flags
;
;*************************************************************
setUPflags  proc    far, flags:WORD     ; set flags
    push    flags
    popf
    ret
setUPflags endp

;*************************************************************
;
;
;       getUPflagsAndCLI     get the processor status flags/disable interrupts
;
; Usage:        oldflags = getUPflagsAndCLI();
;               short int oldflags;
;
; Description:
;       gets the processor's status flags and disables interrupts
;
;*************************************************************
getUPflagsAndCLI proc    far     ; return flags & disable interrupts
    pushf
    pop     ax
    cli
    ret
getUPflagsAndCLI endp
```

```
;*************************************************************
;
;
;       userTickHandler        (internal routine)
;
; Usage:        n/a
;
; Description:
;       This internal procedure is the new user tick interrupt handler.
;       It increments a globally available unsigned integer timer.
;       It also calls a 'C' function that should be dispatching
;       timing procedures (unless the 'C' function is still active,
;       as determined by the "inTimer" flag).
;
;*************************************************************
userTickHandler proc    far
    sti                         ; re-enable interrupts for X.25 serial servicing!

    push    ds                  ; save modified registers
    push    ax

    mov     ax, seg DGROUP   ; get local data segment
    mov     ds, ax

    add     word ptr globalClock+0,1 ; keep the global clock running
    adc     word ptr globalClock+2,0

    push    dx

    mov     dx, PCB_BASE+END_OF_INT
    mov     ax, NSPEC_EOI_ENABLE

    cli                         ; begin short critical section

    out     dx, al

    mov     al, 1
    xchg    al, inTimer     ; test & set the "inTimer" flag
    cmp     al, 1
    je      uthExit

    sti                         ; re-enable interrupts for 'C' code
    cld                         ; for memcpy and friends

    push    bx                  ; save all registers on the stack
    push    cx

    push    si
    push    di
    push    bp
    push    es

    mov     ax, ds              ; set the ES register for C
    mov     es, ax

    call    MtimingHandler  ; call the C function
```

```
    pop     es              ; restore registers from local stack
    pop     bp
    pop     di
    pop     si
    pop     cx
    pop     bx              ; restore register

    mov     ax, seg DGROUP  ; get local data segment
    mov     ds, ax

    cli                     ; INTs OFF again for critical section

    mov     inTimer, 0      ; clear the "in-function" flag

uthExit:

    sti

    push    RADIORX or RADIOTX
    call    TurnLEDoff      ; the serial handlers turn them on
    add     sp,+2           ; clear up the stack

    pop     dx
    pop     ax
    pop     ds
    iret

userTickHandler endp


    end
```

```
/*****************************************************************

  This code (c) Copyright 1992  by
           . and designed by
                Research In Motion Limited
                Technology Business Park
                180 Columbia Street West
                Waterloo, Ontario
                N2L 3L3
         Phone: (519) 888-7465
           FAX: (519) 888-6906
           BBS: (519) 888-7815
      Internet: info@rmotion.on.ca

  Author:       Michael A. Barnstijn

  Date created: December 7, 1992

  Description:
        Mobitex timing function scheduling system for MobiLib-Plus V2.x

  Change History:

*****************************************************************/
#include <stdio.h>
#include <stdlib.h>
#include <dos.h>

#include "basetype.hb"
#include "enums.h"
#include "timing.h"
#include "utils.hpc"
SET_MEM_REF_FILE;

/*******************************************************
 *                                                     *
 *      Local Constants and Macro Definitions          *
 *                                                     *
 *******************************************************/

#define RESOLUTION       5      /* number of milliseconds in a clock tick */

/* define the possible states of a timing function */
#define TS_FREE         0       /* this entry is not used */
#define TS_RUNNING      1       /* this timer is running */
#define TS_STOPPED      2       /* this timer has been stopped */
#define TS_IDLE         3       /* this timer is now idle */

/* define the maximum number of timers and the timing function array */
#define MAX_TIMERS      24

/* pointer to the top of of the ASM timing stack area. */

/*******************************************************
 *                                                     *
 *           Local Type Definitions                    *
 *                                                     *
 *******************************************************/

/* for timing function storage, counter and state */
typedef struct _MtimingStruct {
    byte state;                                      /* current state of timer */
    unsigned long counter;                           /* internal counter */
    long (*function)(int handle, int activity ); /* the timing function */
    } MtimingStruct;

/*******************************************************
 *                                                     *
 *               Local Variables                       *
 *                                                     *
 *******************************************************/

/* the timing function array */
MtimingStruct timers[MAX_TIMERS];

static int MTinstalled = FALSE; /* nothing has been installed yet */
static int lastCalled = MAX_TIMERS-1;  /* index of last function called */
static int delayHandle = -1;    /* a handle for the "Mdelay()" function */
static int delayDone = TRUE;    /* set TRUE by "delayer" timing function */
static int Top_used = 1;        /* all timers have indices less than this */

volatile int MblockTimingHandler = 0; // increment to block timing handlers

/*******************************************************
 *                                                     *
 *                Local Prototypes                     *
 *                                                     *
 *******************************************************/

static long     delayer(int handle,int action);
extern void far MinstallClock(void);
extern void far MremoveClock(void);
static  long    MtimeConvert(long timingValue);
       void far MtimingHandler(void);

/* ========================================================= */
/* =                                                       = */
/* =                  Module Code Begins                   = */
/* =                                                       = */
/* ========================================================= */

/***************************************

       MinstallTimingSystem    install the Mobitex Timing Dispatch System

  USAGE:          MinstallTimingSystem();

  DESCRIPTION:    installs the Mobitex Timing Dispatch System

  INPUTS:         NONE

  OUTPUTS:        NONE

  SIDE-EFFECTS:   User tick handler is installed, delay timer is added.
```

```
  WARNINGS:       100% BIOS/hardware compatible PC clone is required for
                  "MinstallClock()" to function properly.

*****************************************/
void
MinstallTimingSystem()
{
    int i;
    if ( MTinstalled )      /* ignore everything if already installed */
        return;

    /* clear the local structures to a known state */
    for ( i = 0; i < MAX_TIMERS; ++i ) {
        timers[i].state    = TS_FREE;
        timers[i].counter  = 0;
        timers[i].function = (int (*)()) NULL;
        }

    /* install an "atexit()" function to remove the timing system
     * in case of any "exit()" out of the application.  If it has
     * already been installed, do nothing.
     */

    lastCalled = MAX_TIMERS-1;  /* index of last function called */
    Top_used = 1;               /* all timers have indices less than this */

    /* install the assembly language interface */

    MinstallClock();
    MTinstalled = TRUE;

    /* install the "Mdelay()" timing handler */
    delayHandle = MaddTimer(delayer,0l);
    delayDone = TRUE;
}
/*****************************************

       MremoveTimingSystem    remove the Mobitex Timing Dispatch System

  USAGE:          MremoveTimingSystem();

  DESCRIPTION:    removes the Mobitex Timing Dispatch System

  INPUTS:         NONE

  OUTPUTS:        NONE

  SIDE-EFFECTS:   All timing functions are "deleted"
                  and the User tick handler is removed.

  WARNINGS:       100% BIOS/hardware compatible PC clone is required for
                  "MremoveClock()" to function properly.

*****************************************/
void
MremoveTimingSystem()
{
    int i;
    if ( !MTinstalled )     /* if removed, or not installed, do nothing */
        return;
    MremoveClock();         /* remove the interrupt handler */

    /* send "delete" signal to all active timing functions */
    for ( i = 0; i < MAX_TIMERS; ++i )
        MdelTimer(i,T_DELETED);
    MTinstalled = FALSE;

    lastCalled = MAX_TIMERS-1;  /* index of last function called */
}

/*****************************************

       Mdelay     pause for a given number of milliseconds

  USAGE:          Mdelay(milliseconds);
                  unsigned int milliseconds;

  DESCRIPTION:    pauses for the given number of milliseconds

  INPUTS:         timingValue:    number of milliseconds to pause

  OUTPUTS:        NONE

  SIDE-EFFECTS:   NONE

  WARNINGS:       NONE

*****************************************/
void
Mdelay(long timingValue)
{
    delayDone = FALSE;       /* clear the flag */
    MsetTimer(delayHandle,timingValue);     /* set the timer running */
    while ( !delayDone )     /* wait until "delayer()" sets the flag */
        ;
}

/*****************************************

       MaddTimer   install a new timing function

  USAGE:          handle = MaddTimer(function,milliseconds);
                  int handle,(*function)(); long milliseconds;

  DESCRIPTION:    Tries to install the indicated function, with an
                  initial timing value.  If the value is zero, the
                  timer is set idle, otherwise it is set running.
                  If there is no empty slot available, return -1,
                  otherwise return the timer handle number.

  INPUTS:         function:       pointer to an integer function taking
                                  two parameters ("handle","activity").
```

```
                timingValue:    number of milliseconds to run before
                                expiring.

 OUTPUTS:       returns the timing handle number, or -1.
                -1 indicates that there is no room in the timing system.

 SIDE-EFFECTS:  starts a timing count down for the function if the
                input timing value is not zero.

 WARNINGS:      NONE

*****************************************/
int
MaddTimer(long (*function)(int, int ),long timingValue)
{
    int i;
    short int flags;
    if ( IMTinstalled )
        return(-1);

    /* look for an empty slot */
    for ( i = 0; i < MAX_TIMERS; ++i )
    {
        flags = getUPflagsAndCLI();     // start critical section

        if ( timers[i].state == TS_FREE )       // is the slot free?
        {
            /* we've found a free slot, fill it in! */
            timers[i].counter  = MtimeConvert(timingValue);
            timers[i].function = function;
            timers[i].state    = (byte) ((timers[i].counter!=0) ? TS_RUNNING : T
S_IDLE);
            if( Top_used == i )  // update the highest index number
                Top_used++;

            setUPflags(flags);          // stop critical section

            return(i);
        }

        setUPflags(flags);              // stop critical section
    }
    return(-1);     /* no timer handle available */
}

/*****************************************

       MdelTimer   remove an existing timing function

 USAGE:         status = MdelTimer(handle,activity);
                int status,handle,activity;

 DESCRIPTION:   Tries to remove the indicated timing function.
                If the handle is out of range or the activity is
                not in range, an error status is returned.
                If the handle does not reference an existing
                function, another error status is returned.

                Otherwise, the function is called with the passed
                "activity" value (which can be the standard
                "T_DELETED" value or a user-defined activity),
                and the function's entry in the timing system is then
                erased.

 INPUTS:        handle:         timing function handle number.

                activity:       activity number to be passed to the
                                timing function when it is called
                                prior to being deleted.

 OUTPUTS:       Status value:
                0               successfully deleted the timing function
                1               handle or activity out of range
                2               handle is not in use

 SIDE-EFFECTS:  calls the timing function, removes the timing function
                from the timing system.

 WARNINGS:      NONE

*****************************************/
int
MdelTimer(int timerHandle,int activity)
{
    short int flags;
    /* check the arguments for in-range values */
    if ( timerHandle < 0 ||
         timerHandle > Top_used ||
         activity < T_DELETED )
        return(1);      /* bad parameter */

    /* start the critical section */
    flags = getUPflagsAndCLI();
    /* is the timer actually allocated? */
    if ( timers[timerHandle].state == TS_FREE )
    {
        setUPflags(flags);
        return(2);      /* timer is not allocated! */
    }

    /* send "deleted" or user-defined signal to function */
    setUPflags(flags);      // THIS WAS AN "_enable()"
    (*timers[timerHandle].function)(timerHandle,activity);
    _disable();
    timers[timerHandle].counter = 0;        /* clear the counter */
    timers[timerHandle].state    = TS_FREE; /* free the timer entry */
    timers[timerHandle].function = (int (*)()) NULL;
    while( timers[Top_used-1].state == TS_FREE && Top_used != 1 )
        --Top_used;     // we can move the upper limit down

    setUPflags(flags);
    return(0);
}
```

```
/****************************************

     MclrTimer   stop a running timing function

  USAGE:        status = MclrTimer(handle,activity);
                int status,handle,activity;

  DESCRIPTION:  Tries to stop an active timing function.
                If the handle is out of range or the activity is
                not in range, an error status is returned.
                If the handle does not reference an existing
                function, another error status is returned.

                Otherwise, the function is called with the passed
                "activity" value (which can be the standard
                "T_CLEARED" value or a user-defined activity).

  INPUTS:       handle:         timing function handle number.

                activity:       activity number to be passed to the
                                timing function when it is called
                                prior to being deleted.

  OUTPUTS:      Status value:
                0               successfully cleared the timing function
                1               handle or activity out of range
                2               handle is not in use

  SIDE-EFFECTS: calls the timing function

  WARNINGS:     NONE

****************************************/
int
MclrTimer(int timerHandle,int activity)
{
    short int flags;
    /* check the arguments for in-range values */
    if ( timerHandle < 0 ||
         timerHandle > Top_used ||
         (activity <= T_DELETED && activity != T_CLEARED) )
        return(1);      /* bad parameter */

    /* start the critical section */
    flags = getUPflagsAndCLI();
    /* is the timer actually allocated? */
    if ( timers[timerHandle].state == TS_FREE )
    {
        setUPflags(flags);
        return(2);      /* timer is not allocated or is busy */
    }

    // send "cleared" or user-defined signal to function

    setUPflags(flags);      // THIS WAS AN "_enable()"
```

File: src\TIMING_C.C

```
    (*timers[timerHandle].function)(timerHandle,activity);
    _disable();
    if (timers[timerHandle].state != TS_IDLE )
    {
        timers[timerHandle].counter = 0;
        timers[timerHandle].state   = TS_IDLE;
    }

    setUPflags(flags);
    return(0);
    }

/****************************************

     MsetTimer   make a timing function start timing

  USAGE:        status = MsetTimer(handle,milliseconds);
                int status,handle;
                long milliseconds;

  DESCRIPTION:  Tries to start a timing function running.
                If the handle is out of range or the activity is
                not in range, an error status is returned.
                If the handle does not reference an existing
                function, another error status is returned.

                Otherwise, the function's countdown timer is set
                appropriately and the timer is set "RUNNING".

  INPUTS:       handle:         timing function handle number.

                milliseconds:   how long the timer should run before
                                expiring.

  OUTPUTS:      Status value:
                0               started the timing function running
                1               handle or activity out of range
                2               handle is not in use

  SIDE-EFFECTS: starts the timing function running

  WARNINGS:     NONE

****************************************/
int
MsetTimer(int timerHandle,long timerValue)
{
    short int flags;
    /* check the arguments for in-range values */
    if ( timerHandle < 0 ||
         timerHandle > Top_used ||
         timerValue == 0 )
        return(1);      /* bad parameter */

    /* start the critical section */
    flags = getUPflagsAndCLI();
    /* is the timer actually allocated? */
```

```
    if ( timers[timerHandle].state == TS_FREE )
    {
        setUPflags(flags);
        return(2);      /* timer is not allocated or is busy */
    }

    /* make the timer run */
    timers[timerHandle].counter = MtimeConvert(timerValue);
    timers[timerHandle].state   = TS_RUNNING;
    setUPflags(flags);
    return(0);
}

/****************************************

      MisTimerIdle    check for timing function "IDLE"

  USAGE:          int handle;
                  if ( MisTimerIdle(handle) )
                      printf("the timer is idle\n");

  DESCRIPTION:    checks the "IDLE" state of the timer.
                  If the handle is out of range or the activity is
                  not in range, or if the handle does not reference
                  an existing function, FALSE is returned.

                  Otherwise, TRUE is returned.

  INPUTS:         handle:         timing function handle number.

  OUTPUTS:        Status value:   FALSE (0) indicates the function is NOT idle
                                  TRUE (10) indicates the function IS idle.

  SIDE-EFFECTS:   NONE

  WARNINGS:       NONE

****************************************/
int
MisTimerIdle(int timerHandle)
{
    if ( timerHandle < 0 ||
         timerHandle > Top_used ||
         timers[timerHandle].state != TS_IDLE )
        return(FALSE);
    return(TRUE);
}

long
MgetTimerValue(int timerHandle)
{
    if ( timerHandle < 0 ||
         timerHandle > Top_used )
        return(-1);
    return(timers[timerHandle].counter);
}
```

```
/****************************************

      MsetLock        set a lock value, return the old value

  USAGE:          oldValue = MsetLock(&lock,newValue);
                  int oldValue,newValue,lock;

  DESCRIPTION:    Indivisibly sets the "int" pointed at by "pLock"
                  to "value", while saving the old value as the
                  return value.

  INPUTS:         pLock:  pointer to an integer lock value
                  value:  value to set

  OUTPUTS:        returns old value of "*pLock".

  SIDE-EFFECTS:   NONE

  WARNINGS:       NONE

****************************************/
int
MsetLock(volatile int *pLock,int value) // use only if you know what you're doin
g
{
    short int flags;
    int returnValue;
    flags = getUPflagsAndCLI();     /* start critical section */
    returnValue = *pLock;
    *pLock = value;
    setUPflags(flags);              /* end critical section */
    return(returnValue);
}

/****************************************

      MincLock        increment a lock value, return the old value

  USAGE:          oldValue = MincLock(&lock);
                  int oldValue,lock;

  DESCRIPTION:    Indivisibly increments the "int" pointed at by "pLock"
                  while saving the old value as the return value.

  INPUTS:         pLock:  pointer to an integer lock value

  OUTPUTS:        returns old value of "*pLock".

  SIDE-EFFECTS:   NONE

  WARNINGS:       NONE

****************************************/
int
MincLock(volatile int *pLock)   // use with conjunction with "MdecLock()"
{
    short int flags;
```

```
    int returnValue;
    flags = getUPflagsAndCLI();     /* start critical section */
    returnValue = *pLock;
    ++(*pLock);
    setUPflags(flags);              /* end critical section */
    return(returnValue);
}

/****************************************

      MdecLock       decrement a lock value, return the old value

  USAGE:         oldValue = MdecLock(&lock);
                 int oldValue,lock;

  DESCRIPTION:   Indivisibly decrements the "int" pointed at by "pLock"
                 while saving the old value as the return value.

  INPUTS:        pLock:  pointer to an integer lock value

  OUTPUTS:       returns old value of "*pLock".

  SIDE-EFFECTS:  NONE

  WARNINGS:      NONE

****************************************/
int
MdecLock(volatile int *pLock)   // use with conjunction with "MincLock()"
{
    short int flags;
    int returnValue;
    flags = getUPflagsAndCLI();     /* start critical section */
    returnValue = *pLock;
    --(*pLock);
    setUPflags(flags);              /* end critical section */
    return(returnValue);
}

/****************************************

      MgrabLock      set a lock value to 1, return the old value

  USAGE:         oldValue = MgrabLock(&lock);
                 int oldValue,lock;

  DESCRIPTION:   Indivisibly sets the "int" pointed at by "pLock" to 1,
                 while saving the old value as the return value.

  INPUTS:        pLock:  pointer to an integer lock value

  OUTPUTS:       returns old value of "*pLock".

  SIDE-EFFECTS:  NONE

  WARNINGS:      NONE

****************************************/
int
MgrabLock(volatile int *pLock)  // use only with "MfreeLock()"
{
    short int flags;
    int returnValue;
    flags = getUPflagsAndCLI();     /* start critical section */
    returnValue = *pLock;
    *pLock = 1;
    setUPflags(flags);              /* end critical section */
    return(returnValue);            /* if ret == 1, someone else has it */
}

/****************************************

      MfreeLock      set a lock value to 0

  USAGE:         MfreeLock(&lock);
                 int lock;

  DESCRIPTION:   Indivisibly sets the "int" pointed at by "pLock" to 0.

  INPUTS:        pLock:  pointer to an integer lock value

  OUTPUTS:       NONE

  SIDE-EFFECTS:  NONE

  WARNINGS:      NONE

****************************************/
void
MfreeLock(volatile int *pLock)  // use only with "MgrabLock()"
{
    short int flags;
    flags = getUPflagsAndCLI();     /* start critical section */
    *pLock = 0;
    setUPflags(flags);              /* end critical section */
    return;
}

/****************************************

      MtimeConvert   convert a millisecond count into local tick counts

  USAGE:         tickCount = MtimeConvert(milliseconds);
                 long tickCount; long milliseconds;

  DESCRIPTION:   pauses for the given number of milliseconds

  INPUTS:        timingValue:   number of milliseconds to pause

  OUTPUTS:       NONE

  SIDE-EFFECTS:  NONE

  WARNINGS:      NONE
```

```
****************************************/
static long
MtimeConvert( long timingValue )
{
    if( timingValue > 0 )              /* leave 0 as 0 */
    {
        timingValue += RESOLUTION/2;   /* add for rounding */
        timingValue /= RESOLUTION;     /* truncate to resolution available */
        if ( timingValue == 0 )        /* no zero is allowed for !0 input */
            ++timingValue;
    }
    return(timingValue);
}

unsigned long
MulTicksToMilliseconds( unsigned long lTicks )
{
    return( lTicks * RESOLUTION );
}

/****************************************

       delayer    internal timing function used by "Mdelay()"

  USAGE:          N/A

  DESCRIPTION:    This function is triggered by a timer expiry.
                  It sets the "delayDone" internal flag and
                  returns 0 (meaning that the timer should be
                  made "idle").

  INPUTS:         handle: timer handle number
                  activity: one of three possible values:
                        T_EXPIRED     0         the timer has expired
                        T_CLEARED     1         the timer was cleared
                        T_DELETED     2         the timer has been deleted

  OUTPUTS:        returns 0.

  SIDE-EFFECTS:   sets "delayDone" to TRUE.

  WARNINGS:       NONE

****************************************/
static long
delayer(int handle, int action)
{
    delayDone = TRUE;
    return(0L);
}

/****************************************

       MtimingHandler    called by the "ASM" User Tick interrupt handler

  USAGE:          N/A

  DESCRIPTION:    Update all timer countdown counters where appropriate.
                  If any has stopped, call the function with the
                  "T_EXPIRED" activity indicator.  The return value
                  from the timing function indicates the # of milliseconds
                  that it will run for before expiring again.  If the
                  value is zero, then the timer has become IDLE.

  INPUTS:         NONE

  OUTPUTS:        NONE

  SIDE-EFFECTS:   May change the timing system state.

  WARNINGS:       NONE

****************************************/
void far
MtimingHandler()
    {
    short int flags;
    int i, start, wrap;
    long timingValue;
    unsigned long int clockDiff;
    static unsigned long int lastClock = 0L;

    if ( !MTinstalled )
    {
        // paranoid programming
        lastClock = globalClock;
        return;
    }

    // get difference between last clock seen and this one.
    flags = getUPflagsAndCLI();
    clockDiff = globalClock - lastClock;
    lastClock = globalClock;
    setUPflags(flags);

    /* update ALL timers! */
    for ( i = 0; i <= Top_used; ++i )
    {
        if ( timers[i].state == TS_RUNNING )
        {
            if ( timers[i].counter > clockDiff )
                timers[i].counter -= clockDiff;
            else
            {
                timers[i].counter = 0L;
                timers[i].state = TS_STOPPED;   // stopped timer
            }
        }
    }

    // if timing handlers are blocked, do nothing...
    if ( MincLock(&MblockTimingHandler) )
    {
```

```
        MdecLock(&MblockTimingHandler);
        return;
    }

    start = (lastCalled+1)%Top_used;
    for ( i = start, wrap = 0;    // start with the one after the last called
          !(i == start && wrap);  // continue til we've checked them all once
          i = (i+1==Top_used) ? (wrap=1), 0 : i+1 )
    {
        if ( timers[i].state != TS_STOPPED )
            continue;       // ignore everything but STOPPED timers

        /* functions must preserve the interrupt enable condition */

        // flags = getUPflags();
        timingValue = (*timers[i].function)(i,T_EXPIRED);
        // _disable();
        lastCalled = i;
        if ( timers[i].state == TS_STOPPED )
        {
            /* the test is just in case something has managed,
             * due to an interrupt service, to have done something
             * to the timer while IT was being serviced.
             */
            if ( timingValue != 0L )
            {
                timers[i].counter = MtimeConvert(timingValue);
                timers[i].state = TS_RUNNING;
            }
            else
                timers[i].state = TS_IDLE;      /* idle */
        }
        // setUPflags(flags);
        break;  /* do only one function call per tick! */
    }
    MdecLock(&MblockTimingHandler);
}
```

PRSM (APPENDIX F)

```
#include "basetype.hb"
#include "testing.h"
#include "leds.hb"

#define MAPP_PACKET_LIMIT         512     // characters
#define ENQ_TIMEOUT               2000
#define ESC_TIMEOUT               2000
#define ACK_TIMEOUT               2000
#define RECEIVE_LIMIT_TIMEOUT     (((nCharTimeX10() * MAPP_PACKET_LIMIT)+5)/10)
#define RESPONSE_TIMEOUT          30000

#define MAX_ENQ_ATTEMPTS          3
#define MAX_ACK_TRIES             3
#define MAX_NAK_RETRIES           3

//#define DEBUG_REPLY

#ifdef DEBUG_REPLY
  #define V_SEND_EOT(X,Y,Z) vSendEOT(X,Y,Z)
#else
  #define V_SEND_EOT(X,Y,Z) vSendEOT(NULL,Y,Z)
#endif

enum
{
    MAPP_START,
    MAPP_WAIT_FOR_STX,
    MAPP_ESC_DCL,
    GET_MAPP_PACKET,
    GET_MAPP_LRC,
    MAPP_REPLY_WAIT,
    MAPP_ACK_WAIT,
    #ifdef DEBUG_REPLY
      , MAPP_DEBUG_WAIT,
    #endif
    MAPP_RCV_ERROR,
    MAPP_STATE_COUNT
};

// #define STATE_NAMES
#ifdef STATE_NAMES
char *sMAPPstateNames[MAPP_STATE_COUNT] =
{
    "MAPP_START",
    "MAPP_WAIT_FOR_STX",
    "MAPP_ESC_DCL",
    "GET_MAPP_PACKET",
    "GET_MAPP_LRC",
    "MAPP_REPLY_WAIT",
    "MAPP_ACK_WAIT"
    #ifdef DEBUG_REPLY
      "MAPP_DEBUG_WAIT",
    #endif
    "MAPP_RCV_ERROR"
};
#endif
```

File: src\MAPP.C

```
static int nMAPPstate = -1;
static int nMAPPdebugState = -1;

static int nENQcounter = 0;
static int nACKcounter = 0;
static int nNAKcounter = 0;

static int nENQtimer = 0;
static int nACKtimer = 0;
static int nRXlimitTimer = 0;
static int nResponseTimer = 0;

#define C_ENQ     (char)5
#define C_ETX     (char)3
#define C_STX     (char)2
#define C_FS      (char)28
#define C_ACK     (char)6
#define C_NAK     (char)21
#define C_EOT     (char)4

#define C_ESC     (char)27
#define C_DCL     (char)17

static char sMAPPenq[1] = { C_ENQ };
static char sMAPPeot[1] = { C_EOT };
static char sMAPPnak[1] = { C_NAK };
static char sMAPPesc_dcl[2] = { C_ESC, C_DCL };

char sMAPPrequest[MAPP_PACKET_LIMIT+1];
char sMAPPresponse[MAPP_PACKET_LIMIT+1];

static int nMAPPrequestSize = 0;
static int nMAPPresponseSize = 0;

boolean fTransactionSupported( char *sPacket, int nLength);
void vSendEOT(char *sMessage,int nNextState, int nLED);

void
vRunMAPPstateMachine( void )
{
    int nSignal = nGetSignalWaiting( MAPP_STATE_MACHINE );
    static char cLRCcalculated = 0;

    #ifdef STATE_NAMES
      int nOldMAPPstate = nMAPPstate;
    #endif

    int nMAPPchar;

    switch ( nMAPPstate )
    {
        default :
            nMAPPstate = MAPP_START;
            break;

        case MAPP_START :
            switch ( nSignal )
```

Page 1    16 JUN 93  07:58 PM

```
    {
        case SIGNAL_BREAK_MAPP :
        case SIGNAL_CANCEL_MAPP_PROCESS :
            V_SEND_EOT("START_CANCEL",MAPP_START,1);
            break;

        case SIGNAL_START_MAPP_PROCESS :
            nENQtimer = 0;
            nMAPPstate = MAPP_WAIT_FOR_STX;
            vSendMODEMblock(sMAPPenq,sizeof(sMAPPenq));
            nENQcounter = 1;
            nNAKcounter = 1;
            break;

        case SIGNAL_MAPP_TX_DONE :
            nSendSignal(SIGNAL_DISCONNECT_MODEM, MODEM_STATE_MACHINE );
            break;

        default :
            nGetMODEMchar();        // discard received characters
            break;
    }
    break;

#ifdef DEBUG_REPLY

  case MAPP_DEBUG_WAIT :
      switch ( nSignal )
      {
          case SIGNAL_MAPP_TX_DONE :
              vSendMODEMblock(sMAPPeot,sizeof(sMAPPeot));
              nMAPPstate = nMAPPdebugState;
              break;

          default :
              nGetMODEMchar();        // discard received characters
              break;
      }
      break;

#endif

case MAPP_WAIT_FOR_STX :
    switch ( nSignal )
    {
        case SIGNAL_CANCEL_MAPP_PROCESS :
            nENQtimer = 0;
            V_SEND_EOT("WFS-CANCEL",MAPP_START,1);
            break;

        case SIGNAL_MAPP_ENQ_TIMEOUT :
            if ( nENQcounter < MAX_ENQ_ATTEMPTS )
            {
                vSendMODEMblock(sMAPPenq,sizeof(sMAPPenq));
                ++nENQcounter;
            }
            else
            {
                vSendMODEMblock(sMAPPesc_dcl,sizeof(sMAPPesc_dcl));
                nMAPPstate = MAPP_ESC_DCL;
            }
            break;

        case SIGNAL_MAPP_TX_DONE :
            nENQtimer = MS_TO_TICKS(ENQ_TIMEOUT);
            break;

        default :
            if ( (nMAPPchar = nGetMODEMchar()) == C_STX )
            {
                nENQtimer = 0;
                nRXlimitTimer = RECEIVE_LIMIT_TIMEOUT;
                nMAPPrequestSize = 0;
                cLRCcalculated = 0;
                sMAPPrequest[nMAPPrequestSize++] = (char)nMAPPchar;
                nMAPPstate = GET_MAPP_PACKET;
            }
            break;
    }
    break;

case MAPP_ESC_DCL :
    switch ( nSignal )
    {
        case SIGNAL_CANCEL_MAPP_PROCESS :
            nENQtimer = 0;
            V_SEND_EOT("ESC-DCL-CAN",MAPP_START,2);
            break;

        case SIGNAL_MAPP_ENQ_TIMEOUT :
            nENQtimer = 0;
            V_SEND_EOT("ESC-DCL-TO",MAPP_START,3);
            break;

        case SIGNAL_MAPP_TX_DONE :
            nENQtimer = MS_TO_TICKS(ESC_TIMEOUT);
            break;

        default :
            nGetMODEMchar();        // discard received characters
            break;
    }
    break;

case MAPP_RCV_ERROR :
    switch ( nSignal )
    {
        case SIGNAL_CANCEL_MAPP_PROCESS :
            V_SEND_EOT("RCV_ERROR-CAN",MAPP_START,2);
            break;

        case SIGNAL_MAPP_TX_DONE :
            V_SEND_EOT("RCV_ERROR-EOT",MAPP_START,2);
            break;
```

```
            default :
                nGetMODEMchar();        // discard received characters
                break;
        }
        break;

    case GET_MAPP_PACKET :
        switch ( nSignal )
        {
            case SIGNAL_CANCEL_MAPP_PROCESS :
                nRXlimitTimer = 0;
                V_SEND_EOT("GET-PKT-CAN",MAPP_START,4);
                break;

            case SIGNAL_MAPP_RX_LIMIT_TIMEOUT :
                nRXlimitTimer = 0;
                V_SEND_EOT("GET-PKT-TO",MAPP_START,5);
                break;

            default :
                if ( (nMAPPchar = nGetMODEMchar()) >= 0 )
                {
                    cLRCcalculated ^= (char)nMAPPchar;
                    if ( nMAPPrequestSize < MAPP_PACKET_LIMIT )
                        sMAPPrequest[nMAPPrequestSize++] =
                            (char)nMAPPchar;
                    if ( nMAPPchar == C_ETX )
                        nMAPPstate = GET_MAPP_LRC;
                }
                break;
        }
        break;

    case GET_MAPP_LRC :
        switch ( nSignal )
        {
            case SIGNAL_CANCEL_MAPP_PROCESS :
                nRXlimitTimer = 0;
                V_SEND_EOT("GET-LRC-CAN",MAPP_START,6);
                break;

            case SIGNAL_MAPP_RX_LIMIT_TIMEOUT :
                nRXlimitTimer = 0;
                V_SEND_EOT("GET-LRC-TO",MAPP_START,7);
                break;

            default :
                if ( (nMAPPchar = nGetMODEMchar()) >= 0 )
                {
                    cLRCcalculated ^= (char)nMAPPchar;
                    sMAPPrequest[nMAPPrequestSize++] = (char)nMAPPchar;
                    if ( cLRCcalculated != (char)0 )
                    {
                        vSendMODEMblock(sMAPPnak,sizeof(sMAPPnak));

                        if ( nNAKcounter < MAX_NAK_RETRIES )
                        {
                            nENQtimer = 0;
                            nMAPPstate = MAPP_WAIT_FOR_STX;
                            ++nNAKcounter;
                        }
                        else
                            nMAPPstate = MAPP_RCV_ERROR;
                    }
                    else if ( nMAPPrequestSize >= MAPP_PACKET_LIMIT ||
                              ifTransactionSupported(sMAPPrequest,
                                                     nMAPPrequestSize) )
                    {
                        nRXlimitTimer = 0;
                        V_SEND_EOT("GET-LRC-ERROR",MAPP_START,8);
                    }
                    else
                    {
                        nRXlimitTimer = 0;
                        nResponseTimer = RESPONSE_TIMEOUT;
                        nMAPPstate = MAPP_REPLY_WAIT;
                        vSendMOBITEXdata(sMAPPrequest,nMAPPrequestSize);
                    }
                }
                break;
        }
        break;

    case MAPP_REPLY_WAIT :
        switch ( nSignal )
        {
            case SIGNAL_CANCEL_MAPP_PROCESS :
                nResponseTimer = 0;
                nSendSignal(SIGNAL_MOBITEX_CANCEL,MOBITEX_STATE_MACHINE);
                V_SEND_EOT("REPLY-WAIT-CAN",MAPP_START,11);
                break;

            case SIGNAL_MAPP_RESPONSE_TIMEOUT :
                nResponseTimer = 0;
                nSendSignal(SIGNAL_MOBITEX_CANCEL,MOBITEX_STATE_MACHINE);
                V_SEND_EOT("REPLY-WAIT-TO",MAPP_START,12);
                break;

            case SIGNAL_MAPP_TX_FAILED :
                nResponseTimer = 0;
                nSendSignal(SIGNAL_MOBITEX_CANCEL,MOBITEX_STATE_MACHINE);
                V_SEND_EOT("REPLY-WAIT-FAIL",MAPP_START,13);
                break;

            case SIGNAL_MAPP_TX_UNDELIVERABLE :
                nResponseTimer = 0;
                nSendSignal(SIGNAL_MOBITEX_CANCEL,MOBITEX_STATE_MACHINE);
                V_SEND_EOT("REPLY-WAIT-UNDL",MAPP_START,14);
                break;

            case SIGNAL_MAPP_RX_REPLY :
                nMAPPstate = MAPP_ACK_WAIT;
                nResponseTimer = 0;
```

```
            nNAKcounter = 0;
            nACKcounter = 0;
            nACKtimer = 0;
            nMAPPresponseSize = nGetMOBITEXrxPacket(sMAPPresponse);
            vSendMODEMblock(sMAPPresponse,nMAPPresponseSize);
            break;

        default :
            nGetMODEMchar();        // throw away incoming data
            break;
    }
    break;

case MAPP_ACK_WAIT :
    switch ( nSignal )
    {
        case SIGNAL_MAPP_ACK_TIMEOUT :
            if ( nACKcounter < MAX_ACK_TRIES )
            {
                ++nACKcounter;
                vSendMODEMblock(sMAPPresponse,nMAPPresponseSize);
                break;
            }

            // too many retries.
            // drop through and cancel the process.

        case SIGNAL_CANCEL_MAPP_PROCESS :
            nACKtimer = 0;
            V_SEND_EOT("ACK-WAIT-CAN",MAPP_START,15);
            break;

        case SIGNAL_MAPP_TX_DONE :
            nACKtimer = MS_TO_TICKS(ACK_TIMEOUT);
            break;

        default :
            nMAPPchar = nGetMODEMchar();
            if ( nMAPPchar == C_ACK )
            {
                nACKtimer = 0;
                vSendMODEMblock(sMAPPeot,sizeof(sMAPPeot));
                nMAPPstate = MAPP_START;
            }
            else if ( nMAPPchar == C_NAK )
            {
                if ( nNAKcounter < MAX_NAK_RETRIES )
                {
                    nACKtimer = 0;
                    ++nNAKcounter;
                    vSendMODEMblock(sMAPPresponse,nMAPPresponseSize);
                }
                else
                {
                    nACKtimer = 0;
                    nMAPPstate = MAPP_START;
                    vSendMODEMblock(sMAPPeot,sizeof(sMAPPeot));
                    }
                }
                break;
            }
            break;

    }
    #ifdef STATE_NAMES
      if ( nOldMAPPstate != nMAPPstate )
      {
          static char buf[20];
          vSendString("MAPP  State changed -> ");
          mlsprintf(buf,"(%5u) ",uStateMachineTick);
          vSendString(buf);
          vSendString(sMAPPstateNames[nMAPPstate]);
          vSendString("\r\n");
      }
    #endif
}

void
vMAPPtiming(void)
{
    if ( nENQtimer > 0 && --nENQtimer == 0 )
        nSendSignal(SIGNAL_MAPP_ENQ_TIMEOUT,MAPP_STATE_MACHINE);

    if ( nACKtimer > 0 && --nACKtimer == 0 )
        nSendSignal(SIGNAL_MAPP_ACK_TIMEOUT,MAPP_STATE_MACHINE);

    if ( nRXlimitTimer > 0 && --nRXlimitTimer == 0 )
        nSendSignal(SIGNAL_MAPP_RX_LIMIT_TIMEOUT,MAPP_STATE_MACHINE);
}

boolean
fTransactionSupported( char *sPacket, int nLength)
{
    return(TRUE);
}

#define PARITY_OFF(X)   ((X)&((char)0x7F))

int
nIsMAPPframe( char *sPacket, int nLength )
{
    char cLRCcalculated = (char)0;
    int i,nSize;

    // we must test the packet IN PLACE, but ignoring PARITY!

    if ( nLength < 3 || PARITY_OFF(sPacket[0]) != C_STX )
        return(0);

    // check from past the STX to just before the (required) ETX
    // ANYTHING AFTER THE ETX is IGNORED!!!!
    // We must add our own LRC

    for ( i = 1; i < nLength; ++i )
```

```
    {
        if ( PARITY_OFF(sPacket[i]) == C_ETX )  // ETX found, end of MAPP frame
            break;
        cLRCcalculated ^= PARITY_OFF(sPacket[i]);
    }

    if ( i >= nLength )     // no ETX found, not a MAPP frame
        return(0);

    cLRCcalculated ^= PARITY_OFF(sPacket[i]);   // XOR in the ETX
    i++;
    sPacket[i++] = cLRCcalculated;              // store the newly created LRC

    nLength = i;    // adjust the length, since we added the LRC here

    // we have a correct MAPP packet, trim off the parity PERMANENTLY!
    for ( i = 0; i < nLength; ++i )
        sPacket[i] &= 0x7F;

    return( nLength ); // packet is a MAPP frame, return adjusted length
}

int
nTextToMAPPpacket( char *sText, char *sMAPP )
{
    int i;
    char cLRC = 0;

    *sMAPP++ = C_STX;
    for ( i = 0; i < 16 ; ++i )
    {
        if ( *sText )
            sMAPP[i] = *sText++;
        else
            sMAPP[i] = ' ';
        cLRC ^= sMAPP[i];
    }
    sMAPP[i++] = C_ETX;
    sMAPP[i++] = cLRC;
    return(i);
}

void
vSendEOT(char *sMessage,int nNextState, int nLED)
{
    #ifndef DEBUG_REPLY

     vSendMODEMblock(sMAPPeot,sizeof(sMAPPeot));
     nMAPPstate = nNextState;

    #else

     static char sMAPP[20];
     int nSize = nTextToMAPPpacket(sMessage,sMAPP);
     vSendMODEMblock(sMAPP,nSize);
     nMAPPdebugState = nNextState;
     nMAPPstate = MAPP_DEBUG_WAIT;

    #endif
}
```

```
/*****************************************************************

  This code (c) Copyright 1992  by
                Research In Motion Limited
                Technology Business Park
                180 Columbia Street West
                Waterloo, Ontario
                N2L 3L3
         Phone: (519) 888-7465
           FAX: (519) 888-6906
           BBS: (519) 888-7815
      Internet: info@rmotion.on.ca

  Author:       Michael A. Barnstijn

  Date created: November 25, 1992

  Description:
        MASC Access Layer 'C' interface for MPC/r

  Change History:

*****************************************************************/
#include <stdio.h>
#include <stdlib.h>

#include "basetype.hb"
#include "mobilib.h"
#include "access.h"
#include "timing.h"
#include "a_protos.h"
#include "conio.h"
#include "pcb.hb"
#include "pcb_bits.hb"
#include "mem_map.hb"
#include "baud.h"
#include "serial.hb"

#include "testing.h"

void    assertRI( int port, long int milliseconds );
boolean fGetRadioDSR( void );
boolean fHasRadioDSRchanged( void );
int     ML1getBaudRate( int serPort );
long    ML1getCommSettings( int port );
int     ML1installAccessLayer( void );
void    ML1removeAccessLayer( void );
int     ML1setAccessLayerParameters( char *string );
int     ML1setBaudRate( int serPort, int serBaud, int port );
void    ML1setBreak( int channel, boolean onoff );
long    ML1setCommSettings( int port, long settings );
void    ML1setParity( int serPort, int bits, int stop, int parity );
void    setCTS( int port, boolean status );
void    setDCD( int port, boolean status );
void    setDSR( int port, boolean status );
void    vDebounceRadioDSR( void );
void    vSetATflowControl( void );
```

```
long hostDefaults  = BUILD_COM( 1200, 7, EVEN, 1, FALSE ); /* 1200,7E1 */
long radioDefaults = BUILD_COM( 9600, 7, EVEN, 1, TRUE  ); /* 9600,8N1 */

byte hostMASK = 0x7F, radioMASK = 0x7F;

extern int  _far ML1installSerial( void );

#define N_CHNLS 2
/* serial port parameters, initialized */

int ML1serPort   = -1;   /* channel A or channel B */
int ML1serParity  = 1;   /* default even parity */
int ML1serBits   = 7;    /* one of 7 or 8 */
int ML1stopBits  = 2;    /* one of 1 or 2 */
unsigned long ML1settings[N_CHNLS] = { 0L, 0L };
int ML1initialized = FALSE;

/*
 *  various things having to do with serial timing.  For the main
 *  clock.  Assumes a 4.9152 MHz clock for the PC or a 12.288 MHz (system)
 *  clock for the MPC. - running CLK/16
 */

static int Baud_rates[] =
{
    300,   600,  1200, 2400,  4800,  9600, 19200, 0
};

static int Time_const[] =
{
    BAUD_INTERNAL_COMPARE(300),
    BAUD_INTERNAL_COMPARE(600),
    BAUD_INTERNAL_COMPARE(1200),
    BAUD_INTERNAL_COMPARE(2400),
    BAUD_INTERNAL_COMPARE(4800),
    BAUD_INTERNAL_COMPARE(9600),
    BAUD_INTERNAL_COMPARE(19200)
};

/***************************************

       ML1installAccessLayer

  USAGE:  status = ML1installAccessLayer();
          int status;

  DESCRIPTION:  Installs the access layer.  A status value is
        returned which indicates success or failure.

  INPUTS:         NONE

  OUTPUTS:         integer status value: (from "ACCESS.H")
                A_OK            access layer is properly installed.
                A_ALREADY_INIT  access layer was already initialized
                A_SET_PARMS     parameters have not been set with the
                                "ML1setAccessLayerParameters()" call.
```

```
              A_NOT_AVAILABLE requested serial port is not available,
                              most likely because it doesn't exist.
              A_BAD_HARDWARE  baud rate setting was attempted, and
                              the system didn't recognize the hardware.
              A_BAD_EXIT      unable to install "atexit()" exit handler.

  SIDE-EFFECTS:   installs serial port interrupt handler, enables
      serial port interrupts, installs "atexit()" exit handler.

  WARNINGS:       NONE

***************************************/

#if 0
void
vTxString(char *s)
{
    for ( ; *s; ++s )
    {
        while ( !(inpw(PCB_BASE+SERIAL0_STATUS) & TX_EMPTY) )
            ;
        outpw(PCB_BASE+SERIAL0_TBUF,((int)(*s))&0x00FF);
    }
}

void
vTxLongHex(unsigned long int ulValue)
{
    char buf[10];
    mlsprintf(buf,"%08lX",ulValue);
    vTxString(buf);
}

void
vTxIntHex(unsigned int uValue)
{
    char buf[10];
    mlsprintf(buf,"%04X",uValue);
    vTxString(buf);
}
#endif

int
ML1installAccessLayer( void )
{
    if( ML1initialized )
    {
        return(A_ALREADY_INIT);
    }

    if( ML1installSerial() )
    {
        return(A_NOT_AVAILABLE);
    }

    if( ML1setCommSettings(RADIO,radioDefaults) == 0L )
    {
        return(A_BAD_HARDWARE);
    }

    ML1initialized = TRUE;

    return(A_OK);
}

void
ML1removeAccessLayer( void )
{
    ML1initialized = FALSE;
}

/***************************************

      ML1getBaudRate        return baud rate for the current port

  USAGE:  baudrate = ML1getBaudRate(serPort);
          int baudrate,serPort;

  DESCRIPTION:
      Returns the baud rate for the selected port.

  INPUTS:         serPort: port for which the baud rate is required
                  serPort=ML1serPort to check the MASC,
                 the other one for the PC side of things

  OUTPUTS:        baud rate (1200, 2400, 4800, 9600)
                  -1 -> the port has not been configured

  SIDE-EFFECTS:   NONE

  WARNINGS:       NONE

***************************************/
int ML1getBaudRate( int serPort )
{
    return( BAUD_RATE( ML1settings[serPort] ) );
}

/***************************************

      ML1setBaudRate     set baud rate

  USAGE:  status = ML1setBaudRate(port,baudrate, port );
          int status,port,baudrate;

  DESCRIPTION:    INTERNAL FUNCTION

      Sets the baud rate for the specified port (0 or 1) (radio or host).

  INPUTS:         serPort:        serial port number (0 or 1)
                  serBaud:        desired baud rate value
                  port:           the port base (not used on 8530 version)
```

```
 OUTPUTS:        status value:
                 0      baud rate was set properly
                 1      weird hardware error has occurred or bad baud rate!

****************************************/
int
ML1setBaudRate( int serPort, int serBaud, int port )
{
    int index;
    unsigned short int flags;

    for( index = 0; Baud_rates[index] && Baud_rates[index] != serBaud; ++index )

        ;

    if( Baud_rates[index] )
    {
        flags = getUPflagsAndCLI();
        if ( serPort == RADIO )
        {
            outpw(PCB_BASE+SERIAL0_BAUD,0x8000|Time_const[index]); // set baud r
ate
            inpw(PCB_BASE+SERIAL0_STATUS);  // turf old interrupts
        }
        else
        {
            outpw(PCB_BASE+SERIAL1_BAUD,0x8000|Time_const[index]); // set baud r
ate
            inpw(PCB_BASE+SERIAL1_STATUS);  // turf old interrupts
        }
        setUPflags(flags);

        ML1settings[serPort] = (long)BAUD_CHOP(serBaud) << 16 |
                               ( ML1settings[serPort] & 0xFFFFu );
        return(0);
    }
    return(1);
}

void
ML1setParity( int serPort, int bits, int stop, int parity )
{
    unsigned short int serControl;

    if ( serPort == RADIO )
        serControl = inpw(PCB_BASE+SERIAL0_CONTROL);
    else
        serControl = inpw(PCB_BASE+SERIAL1_CONTROL);

    serControl &= 0x0067;

    if (      parity  == 0 ) serControl  |= 0;
    else if ( parity  == 1 ) serControl  |= EVEN_PARITY | USE_PARITY;
    else if ( parity  == 2 ) serControl  |= USE_PARITY;
    else
        return;
    if ( (bits == 7 && parity == 0) ||
         (bits == 8 && parity != 0) )
        return;

    if ( stop != 1 && stop != 2 )
        return;

    if( serPort == RADIO )
    {
        outpw( PCB_BASE+SERIAL0_CONTROL, serControl );   // set parity/wordsize
        radioMASK = (byte) ((bits==7) ? 0x7Fu : 0xFFu);
    }
    else
    {
        outpw( PCB_BASE+SERIAL1_CONTROL, serControl );   // set parity/wordsize
        hostMASK = (byte) ((bits==7) ? 0x7Fu : 0xFFu);
    }

    ML1settings[serPort] = ( ML1settings[serPort] & 0xFFFF0000u) |
                             bits   << __BITS_SHIFT |
                             parity << __PARITY_SHIFT |
                             stop   << __STOP_SHIFT;
}

long
ML1setCommSettings( int port, long settings )
{
    if( port != HOST && port != RADIO )
        return(0L);
    if( ML1setBaudRate( port, BAUD_RATE(settings), 0 )  )
        return(0L);
    ML1setParity( port, DATA_BITS(settings),
                        STOP_BITS(settings),
                        PARITY(settings) );
    return(settings);
}

long
ML1getCommSettings( int port )
{
    if( port != HOST && port != RADIO )
        return(0L);
    return(ML1settings[port]);
}

/****************************************

      ML1setAccessLayerParameters

 USAGE:  status = ML1setAccessLayerParameters();
         int status;

 INPUTS:         none

 OUTPUTS:        status value:
                 0     A_OK          successful setting of parameters
```

```
                1     A_BAD_PARMS      parameters were out of range or
                                       not appropriate for this layer
                3     A_NOT_AVAILABLE  serial port specified doesn't exist
                4     A_WRONG_SETTING  interrupt line specified is incorrect

 SIDE-EFFECTS:  may test the specified serial port, and if correctly
                set, will change global variables used during the
                "ML1installAccessLayer()" function call.

 WARNINGS:      NONE

****************************************/

int
ML1setAccessLayerParameters( char * string )
{
    ML1serPort    = RADIO;
    ML1serBits    = DATA_BITS(radioDefaults);
    ML1serParity  = PARITY(radioDefaults);
    ML1stopBits   = STOP_BITS(radioDefaults);
    if ( ML1stopBits > 2 )
        ML1stopBits = 2;
    ML1settings[RADIO] = radioDefaults;
    ML1settings[HOST] = hostDefaults;
    return(A_OK);
}

/****************************************
;
;       ML1setBreak   turns the BREAK output on or off
;
; USAGE:        ML1setBreak(value);
;               int value;
;
; DESCRIPTION:
;       Starts or stops transmitting a break signal.
;
; INPUTS:       value:          0 means stop BREAK, 10 means send BREAK
;
; OUTPUTS:      NONE
;
; SIDE-EFFECTS: transmits a BREAK on the serial port.
;
; WARNINGS:     NONE
;
;****************************************/

void
ML1setBreak( int channel, boolean onoff )
{
    unsigned short int portval;
    unsigned short int flags = getUPflagsAndCLI();
    if ( channel == HOST )
    {
        portval = inpw(PCB_BASE+SERIAL0_CONTROL);
        portval &= 0x01FF;
        if ( onoff )
            portval |=  SEND_BREAK;
        else
            portval &= ~SEND_BREAK;
        outpw(PCB_BASE+SERIAL0_CONTROL,portval);
    }
    else
    {
        portval = inpw(PCB_BASE+SERIAL1_CONTROL);
        portval &= 0x01FF;
        if ( onoff )
            portval |=  SEND_BREAK;
        else
            portval &= ~SEND_BREAK;
        outpw(PCB_BASE+SERIAL1_CONTROL,portval);
    }
    setUPflags(flags);
}

void
setCTS( int port, boolean status )
{
}

void
setDSR( int port, boolean status )
{
}

void
setDCD( int port, boolean status )
{
}

void
assertRI( int port, long int milliseconds )
{
}

#define DSR_DEBOUNCE_TIME    MS_TO_TICKS(2000)  // two seconds

static boolean fDSRchanged = FALSE;
static boolean fDSR        = TRUE;      // assume it is asserted

boolean
fHasRadioDSRchanged( void )
{
    boolean fReturn = fDSRchanged;
    fDSRchanged = FALSE;
    return( fReturn );
}

boolean
fGetRadioDSR( void )
{
    return( fDSR );
}
```

```
void
vDebounceRadioDSR( void )
{
    static int nDSRsenseState = -1;
    static unsigned int uDSRstartTime;
    extern volatile unsigned int uStateMachineTick;

    boolean fDSRsense,fDSRset;

    // test the modem status bits for the DSR value
    fDSRsense = (inpw(PCB_BASE+SERIAL0_STATUS)&CTS_VALUE) ? TRUE : FALSE;

    switch ( nDSRsenseState )
    {
        default :
        case -1 :       // initialization
            fDSR = fDSRset = TRUE;  // assume DSR active
            fDSRchanged = TRUE;
            nDSRsenseState = 0;
            break;

        case 0 :        // DSR is active
            fDSRset = TRUE;    // return ACTIVE until debounced.
            if ( !fDSRsense )
            {
                // We're not seeing DSR active anymore.
                // We now switch to state 1 to debounce it.
                uDSRstartTime = uStateMachineTick;
                nDSRsenseState = 1;
            }
            break;

        case 1 :        // DSR went inactive; we're debouncing
            fDSRset = TRUE;    // DSR active until debounce is done
            if ( fDSRsense )
                nDSRsenseState = 0; // didn't stay inactive long enough
            else if ( (uStateMachineTick-uDSRstartTime) > DSR_DEBOUNCE_TIME )
            {
                nDSRsenseState = 2;     // DSR is inactive!
                fDSRset = FALSE;
                fDSRchanged = TRUE;
            }
            break;

        case 2 :        // DSR is inactive
            fDSRset = FALSE;   // return INACTIVE until debounced
            if ( fDSRsense )
            {
                // We're not seeing DSR inactive anymore.
                // We now switch to state 3 to debounce it.
                uDSRstartTime = uStateMachineTick;
                nDSRsenseState = 3;
            }
            break;

        case 3 :        // DSR went active; we're debouncing
            fDSRset = FALSE;    // DSR inactive until debounce is done
            if ( !fDSRsense )
                nDSRsenseState = 2; // didn't stay active long enough
            else if ( (uStateMachineTick-uDSRstartTime) > DSR_DEBOUNCE_TIME )
            {
                nDSRsenseState = 0;     // DSR is active!
                fDSRset = TRUE;
                fDSRchanged = TRUE;
            }
            break;
    }
    fDSR = fDSRset; // set the externally announced DSR value
}

void
vSetATflowControl( void )
{
}
```

```
.186
.model LARGE, C
INCLUDE pcb.inb
INCLUDE interrup.inb
INCLUDE mem_map.inb
INCLUDE leds.inb

.DATA
extrn radioMASK:BYTE

RX_OVERFLOW     equu    1       ; return value bit masks
TX_DONE         equ     2
RX_GOT_CHAR     equ     4

MASC_BUF_SIZE   equ     2048


bVisibleRecBuffer label word
    public bVisibleRecBuffer
recBuffer label word
    db      MASC_BUF_SIZE dup (?)

bVisibleRecPut label word
    public bVisibleRecPut
recPut label word
    dw      0

recGet label word
    dw      0

sendCounter label word
    dw      0

sendPointer label dword
    dd      0

mascStatus label byte
    db      0

.CODE
    extrn   TurnLEDon:far

;
;
;
;
;
ML1installSerial proc far uses ds es di dx
    public ML1installSerial

    mov     ax, seg DGROUP
    mov     ds, ax

    pushf
    cli                             ; critical section begins

    xor     ax, ax
    mov     recPut, ax              ; initialize the ring buffer indices
    mov     recGet, ax
    mov     sendCounter, ax         ; and counters
    mov     mascStatus, al          ; and status values.

    mov     es, ax                  ; set up the segment for INT vectors
    mov     di, 00050h              ; set up for INT 14h (Serial 0 RX)

    ; set the interrupt vectors

    mov     word ptr es:[di+0], offset internalSerRXhandler
    mov     word ptr es:[di+2], seg    internalSerRXhandler
    mov     word ptr es:[di+4], offset internalSerTXhandler
    mov     word ptr es:[di+6], seg    internalSerTXhandler

    mov     dx, PCB_BASE+SERIAL_CONTROL     ; enable the serial 0 interrupt
    mov     ax, SERIAL_ONBOARD              ; with proper priority
    out     dx, ax

    mov     dx, PCB_BASE+PORT1_LATCH
    in      al, dx
    xor     ah, ah
    and     al, 07Fh        ; turn on DTR
    out     dx, al

    xor     ax, ax          ; return "OK" status

    popf                            ; critical section ends
    ret
ML1installSerial endp


;
;
; ML1putBlock
;
ML1putBlock proc far uses ds es ax dx di, blockPointer:dword, blockSize:word
    public ML1putBlock
    mov     ax, seg DGROUP
    mov     ds, ax

    les     di, blockPointer                ; load pointer & size
    mov     ax, blockSize                   ; into registers.

    cmp     ax, 0                           ; check for NULL size
    je      mpbNoSend                       ; if so, nothing to do

    pushf
    cli                                     ; critical section begins

    mov     word ptr sendPointer+0, di      ; store pointer & size
    mov     word ptr sendPointer+2, es      ; locally
    mov     sendCounter, ax

    mov     al, es:[di]                     ; get the first byte
    inc     di                              ; move the pointer
```

```
    mov     word ptr sendPointer+0,di
    dec     sendCounter                     ; and subtract it from the count

    xor     ah, ah                          ; prepare to send 16 bits
    mov     dx, PCB_BASE + SERIAL0_TBUF
    out     dx, ax                          ; and send it to port 0!

    popf                                ; critical section ends


mpbNoSend:

    ret

ML1putBlock endp

;
; ML1getByte
;
ML1getByte proc far uses ds si
    public ML1getByte

    mov     ax, seg DGROUP
    mov     ds, ax

    pushf
    cli                                 ; critical section begins

    mov     si, recGet                      ; get the GET offset
    cmp     si, recPut                      ; compare to the PUT offset
    je      mgbEmpty                        ; if equal, the ring is EMPTY

    mov     ax, ds:recBuffer[si]            ; get the received byte & status
    add     si, 2                           ; move the GET offset
    and     si, MASC_BUF_SIZE-1             ; around the RING
    mov     recGet, si                      ; and save the result

mgbExit:
    popf                                ; critical section ends

    ret

mgbEmpty:
    mov     ax, -1
    jmp     mgbExit
ML1getByte endp

;
; ML1getAccessState
;
ML1getAccessState proc far uses ds
    public ML1getAccessState

    mov     ax, seg DGROUP
    mov     ds, ax
    xor     ax, ax
    xchg    al, mascStatus
```

```
    ret
ML1getAccessState endp

;
; the receive interrupt handler
;
internalSerRXhandler proc far
    public internalSerRXhandler
    push dx
    push ax
    push bx
    push ds
    push di
    mov  ax, seg DGROUP
    mov  ds, ax

    push RADIORX
    call TurnLEDon
    add  sp,+2

    mov  dx, PCB_BASE+SERIAL0_STATUS
    in   ax, dx                         ; get the status
    mov  bx, ax                         ; and keep it for later
    shr  bx, 2                          ; move it into a byte
    and  bx, 0E5h                       ; keep only the BREAK,Parity Error,
                                        ; Framing Error and Overrun Error bits.

    ; let's keep the character regardless of error status...

    mov  dx, PCB_BASE+SERIAL0_RBUF  ; get the character
    in   ax, dx

    and  al, radioMASK                  ; clear parity bit if necessary

    mov  di, recPut                     ; get the ring buffer PUT offset
    mov  dx, di                         ; get it into DX so we can PRE-increment
    add  dx, 2                          ; move by 2 since we're storing words
    and  dx, MASC_BUF_SIZE - 1          ; and force it into the ring
    cmp  dx, recGet                     ; check against the GET offset
    je   isrhFull                       ; if equal, the ring is FULL.

    mov  ah, bl                         ; get the status bits into AH
    mov  ds:recBuffer[di], ax           ; so we store the character & status

    mov  recPut, dx                     ; save the new PUT offset

    or   mascStatus, RX_GOT_CHAR        ; signal a newly received character

isrhExit:
    mov  dx, PCB_BASE+END_OF_INT
    mov  ax, NSPEC_EOI_ENABLE           ; non-specific EOI
    out  dx, ax

    pop  di                             ; restore registers
    pop  ds
    pop  bx
```

```
    pop  ax
    pop  dx
    iret

isrhFull:
    or   mascStatus, RX_OVERFLOW    ; signal a receive overflow.
    jmp  isrhExit

internalSerRXhandler endp

    public internalSerTXhandler
    ; the transmit interrupt handler
internalSerTXhandler proc far
    push dx
    push ax
    push ds
    push es
    push di
    mov  ax, seg DGROUP
    mov  ds, ax

    push RADIOTX
    call TurnLEDon
    add  sp,+2

    cmp  sendCounter,0              ; any more to send?
    jne  isthDoMore                 ; if not, we're done, drop through!

    or   mascStatus,TX_DONE
    jmp  isthDone

isthDoMore:
    dec  sendCounter
    les  di,sendPointer
    mov  al,es:[di]
    inc  di
    mov  word ptr sendPointer,di
    xor  ah,ah
    mov  dx, PCB_BASE+SERIAL0_TBUF
    out  dx,al

isthDone:
    ; issue an EOI for the transmit
    mov  dx, PCB_BASE+END_OF_INT
    mov  ax, NSPEC_EOI_ENABLE    ; non-specific EOI
    out  dx, ax

    pop  di
    pop  es
    pop  ds
    pop  ax
    pop  dx
    iret
internalSerTXhandler endp

end
```

Mobilib.PRT

```
/*****************************************************************

  This code (c) Copyright 1992  by
     and designed by
             Research In Motion Limited
             Technology Business Park
             180 Columbia Street West
             Waterloo, Ontario
             N2L 3L3
        Phone: (519) 888-7465
          FAX: (519) 888-6906

  Author:       Michael A. Barnstijn

  Date created:   September 1990

  Description:
        Global definitions for the MobiLib-Plus Access Layer Interface

  Change History:
        14 May 1992            Release cleanup

*****************************************************************
**      Changes made to this file should also be reflected in the MobiPlus.h
**      file in the p:\mobiplus directory (Developer's Kit).
*****************************************************************/

int        ML1chgAccessLayerParameters(char *string);
int        ML1getAccessLayerParameters(char *string);
int        ML1installAccessLayer(void);
int        ML1setAccessLayerParameters(char *string);
int        ML1autoBaudRadio(int command);
void       ML1autoBaudHandler( int flags );
void       ML1getAccessLayerVersionInfo(MLinfoStruct *info);
void       ML1removeAccessLayer( void );

extern void         _far ML1putBlock( byte _far * string, int length );
extern          int _far ML1getByte(void);
extern unsigned int _far ML1getAccessState(void);

typedef enum
  {
    A_OK = 0,          A_BAD_PARMS,        A_SET_PARMS,
    A_NOT_AVAILABLE,   A_WRONG_SETTING,    A_BAD_HARDWARE,
    A_NOT_INITIALIZED, A_ALREADY_INIT,     A_BAD_EXIT,
  } Access_status;

#define A_RX_OVERFLOW     1
#define A_TX_DONE         2
#define A_RX_GOT_CHAR     4
```

```
extern volatile int Error;   /* global interpreter Error indication */

#define PRODUCT_CODE   222   /* number of the beast by 3 */

/* The response codes for the text see errors.c */

#define OKCODE     0
#define CONN300    1
#define RINGCODE   2
#define NOCARRIER  3
#define ERRCODE    4
#define CONN1200   5
#define NODTCODE   6
#define BUSYCODE   7
#define NANSCODE   8
#define CONNECT    9   /* used as generic connect, not CONNECT 600 */
#define CONN2400   10
#define OKCODE2    11    /* sometimes you need a non-zero NO PROBLEM code */
#define PROTERROR  12

#define NUL '\0'
#define SPC '\040'
#define CONNMSG "CONNECT "
#define RELMSG "/REL"
#define RETRY 4

#define MAXTRYS 3


/* Hayes Specific Reason Code for closing or refusing sessions */
#define REASON_CODE 512
```

File: include\AT.H

```
/*********************************************************
 *                                                       *
 *                  Local Prototypes                     *
 *                                                       *
 *********************************************************/

                int     ML1checkBaudRate(int *serBaud);
                int     ML1checkPort(int serPort,int *serInt);

#define NUM_BAUDS       4       /* number of different baud rates supported */

/* serial port parameters, initialized */
extern int ML1serParity;
extern int ML1serBits;
extern int ML1stopBits;
extern int ML1serPort;
extern int ML1serInt;
extern int ML1baudRate[];
extern int ML1initialized;

/* Baud rates supported: 1200, 2400, 4800, 9600 */
extern int baudinits[NUM_BAUDS];
extern int baudtimes[NUM_BAUDS];
extern int baudvalue[NUM_BAUDS];
extern int ML1lastPort;

/* interrupt handler stack area */
extern unsigned char ML1stack[2048];

/*********************************************************
 *                                                       *
 *      Information Structure for this Layer             *
 *                                                       *
 *********************************************************/
extern MLinfoStruct ML1info;
```

```
/*
**  BaseType.H
**      Changes made to this file should also be reflected in the MobiPlus.h
**      file in the p:\mobiplus directory (Developer's Kit).
*/


typedef unsigned int    Uint;
typedef unsigned char   Uchar;
typedef unsigned char   byte;
typedef signed char     boolean;
typedef signed char     tristate;
typedef long int        MAN;

typedef int             DataHandle;
typedef int             SessionHandle;
typedef int             TransportHandle;
typedef int             TransportDataHandle;
typedef int             TimerHandle;
typedef int             TransportType;
typedef int             SessionType;
typedef int             Protocol;
typedef long            Timestamp;
typedef int             TransmissionHandle;
typedef int             PipeIdentifier;

typedef char           *SessionParameterString;
typedef byte far        UDAT;

typedef void *          PVOID;

typedef byte *          PBYTE;

typedef char *          PCHAR;
typedef char *          PSTR;

typedef int *           PINT;

typedef long *          PLONG;
typedef MAN *           PMAN;

#define MAX_SIGNED_INT      32767
#define MAX_UNSIGNED_INT    65535

#define inCS            _based(_segname("_CODE"))

#ifndef NULL
#define NULL        (char *) 0
#endif
#define FNULL (char far *) 0L

#define FALSE           0
#define TRUE            1
#define FLOATING       -1

#define MAX_MAN_LIST    8
#define MAX_ADDR_LIST   8
```

File: include\BASETYPE.H

```
#define MAX_PSSW_LEN     8
```

```
typedef long commsetting;

#define __BAUD_SHIFT  16
#define __ABAUD_SHIFT 14
#define __BITS_SHIFT   8
#define __PARITY_SHIFT 4
#define __STOP_SHIFT   0

#define __BAUD_MASK    0x3FFF
#define __ABAUD_MASK     0x01
#define __BITS_MASK      0x0F
#define __PARITY_MASK    0x07
#define __STOP_MASK      0x03

typedef enum { NONE, EVEN, ODD } Parity;

#define BAUD_FILL(X)    ( ( (X) == 2816 ) ? 19200 : (X) )
#define BAUD_CHOP(X)    ( (X) & __BAUD_MASK )

#define BAUD_RATE(x) BAUD_FILL((int)((x>>__BAUD_SHIFT)  &__BAUD_MASK))
#define AUTOBAUD(x)  (int)((x>>__ABAUD_SHIFT) &__ABAUD_MASK)
#define DATA_BITS(x) (int)((x>>__BITS_SHIFT)  &__BITS_MASK)
#define PARITY(x)    (int)((x>>__PARITY_SHIFT)&__PARITY_MASK)
#define STOP_BITS(x) (int)((x>>__STOP_SHIFT)  &__STOP_MASK)

#define BUILD_COM(baud,dbits,parity,stop,abaud)          \
        ((long)((baud) &__BAUD_MASK)<<__BAUD_SHIFT |      \
               ((dbits)&__BITS_MASK)<<__BITS_SHIFT |      \
               ((parity)&__PARITY_MASK)<<__PARITY_SHIFT | \
               ((stop)&__STOP_MASK)<<__STOP_SHIFT |       \
               ((abaud)&__ABAUD_MASK)<<__ABAUD_SHIFT)
```

File: include\BAUD.H

Page 1    16 JUN 93  08:40 PM

```
#ifdef NO_DEBUG

#define DEBUG_PRINTF(x)
#define DEBUG_NOTIFY(x)
#define DEBUG_STRING(x)
#define DEBUGS(x)
#define DEBUGP(x)
#define DEBUGQ(x)
#define DEBUG_CURSOR(x,y)
#define ALLOW_DEBUG(x)
#define DEBUG_AT(posl,prt)
#define DEBUG_DELAY(X)
#define DEBUG_KEY(X)
#define DEBUG_BEEP(X)
#define DEBUG_FLUSH
#define DEBUG_HEXDUMP(X,Y,Z)

#define IS_ALLOW_DEBUG  FALSE

#ifdef MPC
  #define DEBUG_BUFF_SIZE      4095    /* 2^n-1*/
#else
  #define DEBUG_BUFF_SIZE         3    /* 2^n-1, bigger than 2*/
#endif

#else

#ifndef CSchar
#define CSchar
#endif
#ifndef CSstr
#define CSstr
#endif

extern void vDebugHexDump(void *title, byte _far * buf,int length);
extern void vFlushDebug(void);
extern void Dbg_printf( void *, ... );
extern void Dbg_string( char * );
extern boolean Dbg_cursor( int x, int y.);
extern boolean Allow_debug;
extern void Dbg_at( int x, int y, int clearLength );
extern void Dbg_delay( long int timeDelay );
extern void Dbg_beep( long int timeDelay );
extern void Dbg_keywait( char mask );

#define DEBUG_PRINTF(x)      Dbg_printf x
#define DEBUG_NOTIFY(x)      Dbg_printf x
#define DEBUG_STRING(x)      Dbg_string x
#define DEBUGS(x)           /*DEBUG_PRINTF(x)*/
#define DEBUGP(x)            DEBUG_PRINTF(x)
#define DEBUGQ(x)           /*DEBUG_PRINTF(x)*/
#define DEBUG_CURSOR(x,y)    Dbg_cursor(x,y)
#define ALLOW_DEBUG(x)       Allow_debug = x

#define DEBUG_AT(posl,prt)   {Dbg_at posl; Dbg_printf prt; Dbg_at(-1,-1,-1);}
#define DEBUG_DELAY(X)       Dbg_delay(X)
#define DEBUG_KEY(X)         Dbg_keywait(X)
#define DEBUG_BEEP(X)        Dbg_beep(X)
#define DEBUG_FLUSH          vFlushDebug()
#define DEBUG_HEXDUMP(TITLE,BUF,SIZE) vDebugHexDump(TITLE,(byte _far *)(BUF),SIZ
E)

#define IS_ALLOW_DEBUG       Allow_debug

#ifdef MPC
  #define DEBUG_BUFF_SIZE      4095    /* 2^n-1*/
#else
  #define DEBUG_BUFF_SIZE      2047    /* 2^n-1*/
#endif

#endif

#define DERROR       0x0C
#define DNORMAL      0x0F
#define DRED         0x0C
#define DGREEN       0x0A
#define DBLUE        0x09

#define DKEY_ALT     0x08
#define DKEY_CTRL    0x04
#define DKEY_LSHIFT  0x02
#define DKEY_RSHIFT  0x01
#define DKEY_ALL     0x0F
```

```
/* constants for the Hayes related objects in that are stored in the EEPROM
 * on the MPC.  Note that they are with repect to 16 bit entries in the EEPROM,
 * i.e. they are two bytes wide each.
 */

#define BOOTPROFILE        0
#define MGP_PROFILE        1 /* 14 characters plus NULL and checksum */
#define END_MGP_PROFILE    9 /* 14 characters plus NULL and checksum */
#define PROFILE0          10 // 18 words: 36 bytes -- 35 regs & a checksum!
#define END_PROFILE0      27
#define PROFILE1          28 // 18 words: 36 bytes -- 35 regs & a checksum!
#define END_PROFILE1      37
#define PHONENUMBER0      38 /* maximum of 9 characters - MANs need 8 */
#define PHONENUMBER1      43 /* maximum of 9 characters - MANs need 8 */
#define PHONENUMBER2      48 /* maximum of 9 characters - MANs need 8 */
#define PHONENUMBER3      53 /* maximum of 9 characters - MANs need 8 */
#define RADIO_DEFAULTS    58
#define HOST_DEFAULTS     60
#define STLP_PRES_STRING 62
#define END_STLP_PRES_STRING 95
#define NEXT_AVAILABLE    96
#define START_OF_X25     128 /* goes from here to 254 as needed */
#define X25_CHECKSUM     255

#define MGP_PROFILE_SIZE  ((END_MGP_PROFILE-MGP_PROFILE)*2)
#define STLP_PRES_SIZE    ((END_STLP_PRES_STRING-STLP_PRES_STRING)*2)
```

File: include\EEPROM.H

```
/* enums.h */

typedef enum(   P_REGULAR,      P_TEXT,         P_DATA,
                P_HPDATA,       P_STATUS,       P_EMERGENCY } PacketType;

/* access to link */
typedef enum {  RX_OVERFLOW = 1,        TX_DONE = 2,
                RX_GOT_CHAR = 4 } Lcallback;

/* Notice that in the next few sets manifests with the "same" function have
 * the same value.  The Explicit assignments force the overlap.
 */

/* link to network */
typedef enum {  MPAK_RECEIVED=-20,      PACKET_SENT,            // -20
                NETWORK_CONNECTED,      NETWORK_DISCONNECTED, // -18
                BAD_PACKET,             RECEIVED_B_FRAME,       // -16
                LINK_DISCONNECTED,      NEW_X25_PARMS,          // -14
                PACKET_RETURNED                                 // -12
                } Ncallback;

/* network to transport */
typedef enum {  RECEIVED_MPAK=-20,      SENT_TO_NETWORK,        // -20
                CONNECTION_ESTABLISHED, CONNECTION_LOST,        // -18
                SEND_ERROR,             SEND_TIMED_OUT,         // -16
                RESTART_NETWORK,        FAILED_NETWORK,         // -14
                STOP_TRANSMIT,          START_TRANSMIT,         // -12
                STARTED_NETWORK                                 // -10
                } Tcallback;

/* memory allocator "ml_malloc" memory pool specifier */
typedef enum {
        APP_POOL,
        COMPRESS_POOL,
        TX_POOL,
        RX_POOL,
        SESSDEF_POOL,
        TRANSDEF_POOL,
        FIXED_POOL
        } Tmempool;

enum {
   START_COMPRESS = 1,
   STOP_COMPRESS,
   START_DECOMPRESS,
   STOP_DECOMPRESS
   };

#ifndef NO_DEBUG
  extern void * ml_malloc_ref( unsigned int size, Tmempool pool, char * filename
, int linenum );
  extern void ml_free_ref( void * pointer, char * filename, int linenum );
  #ifndef ML4MALLOC
    #define ML_MALLOC(X,Y)  ml_malloc_ref( X, Y, myFileForMemCalls, __LINE__ )
  #endif
  #ifndef ML4FREE
    #define ML_FREE(X)      ml_free_ref( X, myFileForMemCalls, __LINE__ )
  #endif
  #ifndef SET_MEM_REF_FILE
    #define SET_MEM_REF_FILE static char _based(_segname("_CODE")) myFileForMemC
alls[] = __FILE__
  #endif
#else
  #ifndef ML4MALLOC
    #define ML_MALLOC(X,Y)  ml_malloc( X, Y )
  #endif
  #ifndef ML4FREE
    #define ML_FREE(X)      ml_free( X )
  #endif
  #ifndef SET_MEM_REF_FILE
    #define SET_MEM_REF_FILE  //
  #endif
#endif

enum
{
    NO_POWER_OFF_REQUESTED,
    POWER_DOWN_SESSION,
    POWER_DOWN_RADIO,
    POWER_OFF_NOW
};
```

```
/* valid ACK sequence numbers */
#define ACK_0           '0'
#define ACK_1           '1'
#define ACK_NONE        '-'

/* Control frame type identifiers */
#define TYPE_NACK   '?'
#define TYPE_ACK    '*'
#define TYPE_RACK   '!'
#define TYPE_SENS   '#'
#define TYPE_SACK   '&'
#define TYPE_IF     '|'
#define TYPE_NONE   0

/* definitions of machine-frame delimiters */
#define START_FRAME 0x5E     /* '^' */
#define START_DATA  0x3A     /* ':' */
#define END_FRAME   0x0D     /* '\n' */

/* total number of IF bytes: start, length,
   data separator, checksum, terminator
*/
#define IF_FIXED_LENGTH 9

/* definitions of maximums and minimums for frame size */
#define MIN_FRAME_LENGTH     10
#define MAX_FRAME_LENGTH     1150
#define MAX_TEXT_LENGTH      256
#define MAX_DATA_LENGTH      560
#define MAX_DATA_TEXT_LENGTH  (MAX_DATA_LENGTH*2)
#define IF_FIXED_LENGTH      9

/* HEXASCII to binary and vice-versa */
#define XDIGIT(X)     (((X)>'9')?((X)-'0'-7):((X)-'0'))
#define DIGITX(X)     (((X)>9)?((X)+'0'+7):((X)+'0'))

#define UNUSED       -1

enum {
    LINK_OPEN_TRYING,
    LINK_INOPERATIVE,
    LINK_IS_LOOPED_BACK,
    LINK_RESTART_REQUESTED,
    LINK_OPEN_COMPLETED
    };

enum {
    TX_IF_NONE,
    TX_IF_WAITING,
    TX_IF_QUEUED,
    TX_IF_SENDING,
    TX_IF_DONE,
    TX_IF_FAILED,
    TX_NET_RETURNED,
    TX_NET_DONE,
    TX_FRAME_SENT,
    TX_FRAME_FAILED,
    TX_BAD_PARMS,
    TX_PARMS_OK
    };

enum {
    NO_DATA_PROCESSED = -1,
    DATA_WAS_PROCESSED,
    FRAME_COMPLETED,
    FRAME_WITH_ERRORS_COMPLETED
    };


typedef enum
  {
    PRE_INIT=-1,            // -1
    DO_AUTOBAUD,            //  0
    SEND_SENS,              //  1
    CHECK_SENS,             //  2
    SEND_BFRAME,            //  3
    INOPERATIVE,            //  4
    LOOPBACK,               //  5
    CHECK_BFRAME,           //  6
    SENDING_FP,             //  7
    RESTART_REQ,            //  8
    WAITING_FP_SENT,        //  9
    WAITING_MAN,            // 10
    WAITING_FQ,             // 11
    CONNECTED,              // 12
    WAITING_B_SENT,         // 13
    WAITING_FP,             // 14
    WAITING_FQ_SENT,        // 15
    WAITING_FB_SENT,        // 16
    RETRY_PAUSE,            // 17
    LINK_IDLE_CLOSED        // 18
  } InitState;

typedef enum {
    RESTART,
    START,
    RUN,
    WHATSTATE,
    LASTSTATUS
    } Init_command;

/* FIFO definitions */
typedef struct _controlFrameStruct {
    byte bFrameType;
    byte bSequence;
    void (*pfCallback)(int nStatus);
    } controlFrameStruct;

typedef struct _informationFrameStruct {
    byte bFrameType;
    int nTextLength, nDataLength, nQueueIdx;
    char sText[MAX_TEXT_LENGTH+1];
    byte sData[MAX_DATA_LENGTH];
    void (*pfCallback)(int nStatus);
```

```
    } informationFrameStruct;

typedef struct {
    byte bFrameCode;
    byte sNetData[MAX_DATA_LENGTH];
    int nNetDataLength;
    } netFrameStruct;

typedef struct {
    byte sFrame[MAX_DATA_TEXT_LENGTH+MAX_TEXT_LENGTH+IF_FIXED_LENGTH+2];
    int nFrameLength;
    } sendFrameStruct;

typedef struct {
    boolean fDebug;
        int nMaxIFlength;

    } linkDefs;

typedef struct {
    int nRXstate;
    int nRXlength;
    byte bRXcfType;
    byte bRXchecksum;
    byte bRXchecksumInFrame;
    byte bRXdataSepCounter;
    byte bRXsequenceNumber;
    int nRXdataCount;
    int nRXdataLength;
    int nRXifLength;
    int nRXtextLength;
    byte sRXdataArea[MAX_DATA_LENGTH];
    char sRXtextArea[MAX_TEXT_LENGTH+1];
    } linkFrame;
```

File: include\LDEFINES.H

```
/* function (or non-function) definitions */
#ifdef MPC
extern void far TurnLEDon( byte mask );
extern void far TurnLEDoff( byte mask );
extern void far ToggleLED( byte mask );
extern void far HalfBright( byte mask );
#else
#define TurnLEDon( mask )
#define TurnLEDoff( mask )
#define ToggleLED( mask )
#define HalfBright( mask )
#endif

/* and the actual LEDs as well */
#ifdef MMPC
  #define ERROR   0x00
  #define HOSTRX  0x00
  #define HOSTTX  0x00
  #define HP      0x00
  #define COMP    0x00
  #if MMPC < 2
    #define RADIORX 0x40
    #define RADIOTX 0x20
    #define CONTACT 0x80
    #define ON_LINE 0x00
  #else
    #define RADIORX 0x20
    #define RADIOTX 0x10
    #define CONTACT 0x40
    #define ON_LINE 0x80
  #endif
#else
  #define ERROR   0x01
  #define HOSTRX  0x02
  #define HOSTTX  0x04
  #define HP      0x08
  #define COMP    0x10
  #define RADIORX 0x20
  #define RADIOTX 0x40
  #define CONTACT 0x80
  #define ON_LINE 0x00
#endif
```

File: include\LEDS.H

```
#define L_NO_NETPACKS    0
#define L_NEW_NETPACK    1
#define L_UNSENT_NETPACK 2
#define L_BAD_NETPACK    3
#define L_ERROR_NETPACK  4

#define L_BAD_PARMS     -1
#define L_OK             0

void ML2vCloseLinkLayer(void);
 int ML2nBlockNetworkNotify( void );
void ML2vUnblockNetworkNotify( int nKey );
void ML2vOpenLinkLayer(void);

int ML2putNetworkPacket(volatile byte *pbData,int nDataLength,boolean fNetDone);


int ML2getNetworkPacket(byte * pbNETPACK,int * pnNETPACKlength);

void ML2cancelNetworkPacket(void);

void ML2doneNetworkPacketSend(void);

void ML2flushReceiver(void);

int ML2installLinkLayer(void);
int ML2removeLinkLayer(void);
int ML2getLinkLayerParameters(char *string);
int ML2setLinkLayerParameters(char *string);

void ML2vGetFXframe(int *pnLength, byte *pbFrame);

typedef enum {
    NFY_LINK_TXDONE,            // 0
    NFY_LINK_TXFAILED,          // 1
    NFY_LINK_RXMPAK,            // 2
    NFY_LINK_OPENED,            // 3
    NFY_LINK_CONNECTED,         // 4
    NFY_LINK_DISCONNECTED,      // 5
    NFY_LINK_NET_CONNECTED,     // 6
    NFY_LINK_NET_DISCONNECTED,  // 7
    NFY_LINK_CLOSED,            // 8
    NFY_LINK_SET_MAN_NUMBER,    // 9
    NFY_LINK_NEW_X25_PARMS      // 10
    } netNotifyType;
```

File: include\LINK.H

```
int MlockLayer(void *filename,int fileline);
int MlockEverything(void *filename,int fileline);

int MunlockLayer(int key,void *filename,int fileline);
int MunlockEverything(int key,void *filename,int fileline);

int MlockLayerProduction(void);
int MlockEverythingProduction(void);

int MunlockLayerProduction(int key);
int MunlockEverythingProduction(int key);

#ifdef NO_DEBUG
    #define SET_LOCK_REF_FILE

    #define LOCK_LAYER(X)    X=MlockLayerProduction()
    #define UNLOCK_LAYER(X)  MunlockLayerProduction(X)

    #define LOCK_EVERYTHING(X)    X=MlockEverythingProduction()
    #define UNLOCK_EVERYTHING(X)  MunlockEverythingProduction(X)
#else
    #define SET_LOCK_REF_FILE static char _based(_segname("_CODE")) myFileForLoc
kCalls[] = __FILE__

    #define LOCK_LAYER(X)    X=MlockLayer(myFileForLockCalls,__LINE__)
    #define UNLOCK_LAYER(X)  MunlockLayer(X,myFileForLockCalls,__LINE__)

    #define LOCK_EVERYTHING(X)    X=MlockEverything(myFileForLockCalls,__LINE__)

    #define UNLOCK_EVERYTHING(X)  MunlockEverything(X,myFileForLockCalls,__LINE_
_)
#endif
```

File: include\LOCKS.H

```
/*****************************************************************

  This code (c) Copyright 1992  by
        and designed by
                Research In Motion Limited
                Technology Business Park
                180 Columbia Street West
                Waterloo, Ontario
                N2L 3L3
         Phone: (519) 888-7465
           FAX: (519) 888-6906

  Author:       Michael A. Barnstijn

  Date created:   September 1990

  Description:
        Local declarations for use within "NETWORK.C", MobiLib-Plus

  Change History:
        14 May 1992             Release cleanup

*****************************************************************/


#define SUBSCR_MASK     0xF4 /* subscription bits that are not allowed */
#define TRAFFIC_MASK    0xE0 // Bits allowed for the traffic state.
#define SENDLIST_F      0x04 /* bit to set indicating addressee list */


/* structures to impose on raw MPAK byte array */

typedef struct {
    byte    cbMan[3];
} MpakHeaderMAN;
typedef MpakHeaderMAN *     PMpakHeaderMAN;

/*
**  MPAK with no addressee list
*/
typedef struct {
    MpakHeaderMAN   mhmSender;
    MpakHeaderMAN   mhmAddressee;
    byte            bStateAndFlags;
    byte            bMpakCommand;
} MpakNoListHeader;
typedef MpakNoListHeader *  PMpakNoListHeader;

/*
**  MPAK with addressee list
*/
typedef struct {
    MpakHeaderMAN   mhmSender;
    MpakHeaderMAN   mhmNetwork;
    byte            bStateAndFlags;
    byte            bMpakCommand;
    byte            bNumberOfAddressees;
    MpakHeaderMAN   cmhmAddressees[7];
} MpakListHeader;
typedef MpakListHeader *    PMpakListHeader;



/* MPAK command classes; not really used anywhere yet */
#define PSUBCOM         0x00
#define PSOSCOM         0x40
#define CSUBCOM         0x80
#define DTESERV         0xC0

#define TF      0x0001          /* time field available        */
#define FX      0x0002          /* fixed terminal TX  command  */
#define MB      0x0004          /* mobile terminal TX command  */
#define DIE     0x0008          /* blocked by DIE reception    */
```

```
boolean fInstallLinkACKmodule(void);
boolean fRemoveLinkACKmodule(void);

boolean fInstallLinkQueueModule(void);
boolean fRemoveLinkQueueModule(void);

boolean fInstallLinkIFmodule(void);
boolean fRemoveLinkIFmodule(void);

boolean fInstallLinkNetRXTXmodule(void);
boolean fRemoveLinkNetRXTXmodule(void);

boolean fInstallLinkIdleModule(void);
boolean fRemoveLinkIdleModule(void);

boolean fInstallLinkSENSmodule(void);
boolean fRemoveLinkSENSmodule(void);

boolean fInstallLinkInterpModule(void);
boolean fRemoveLinkInterpModule(void);

void vStartLinkIdler(void);
void vSetIdlerRunning(boolean fRunning);
void vPauseIdler(void);
void vRestartIdler(void);

boolean ML2fSetAllowAllOpenNotifies(boolean set);

void vSetDSRsensing(boolean fEnableDSRsense);

void vCloseWasACKed(void);

void vSetSENSenable(boolean fNewSetting);

boolean fIsTXpending(void);
```

File: include\LPROTOS.H

```
#define     N_INTERNAL      -1   /* special internal status entry in Q */
#define     N_BUSY          -2
#define     MAN_NOENTRY     -1L

#define PACKET_OK           -100
#define PACKET_ERROR        -2
#define PACKET_LATER        -1
#define PACKET_INTERNAL     0
#define PACKET_EXTERNAL     1

#define STATE_BUSY          -1
#define STATE_INACTIVE      0
#define STATE_FAILED        0
#define STATE_ACTIVE        1
#define STATE_SUCCESS       1

#define SNC_RESTART_BFRAME  -2
#define SNC_START           -1
#define SNC_RUN             0
#define SNC_GET_STATE       1
#define SNC_GET_LAST_RETURN 2

// Private routine for ML3returnMPAKasUnknown in net_ret.c ...
int     ML3pvtReturnMPAKasUnknown ( PVOID pvBuffer, int nBufferSize );

// Private routine for ML3sendData in net_data.c ...
int     ML3pvtSendData ( PCHAR pszData, int nDataLength, MAN mSource,
            int nSubscriptionFlags, int nNumberOfMans,
            PMAN pmDestinationMans );

// Private routine for ML3sendFlexList in net_flex.c ...
int     ML3pvtSendFlexlist ( PMAN pmFlexList, int nNumberOfFlexEntries,
            MAN mSource, MAN mDestination );

// Private routine for ML3sendHPData in net_hp.c ...
int     ML3pvtSendHPData ( PVOID pvData, int nLength, MAN mSource,
            int nSubscriptionFlags, int nNumberOfDestinationMans,
            PMAN pmDestinationMans, int nProtocol);
int     ML3pvtFormatHPData ( PVOID pvData, int nLength, MAN mSource,
            int nSubscriptionFlags, int nNumberOfDestinationMans,
            PMAN pmDestinationMans, int nProtocol, PVOID pvDestBuffer,
            PINT piDestSize );

// Private routine for ML3sendLogin in net_lgin.c ...
int         ML3pvtSendLogin ( MAN mLogin, PSTR pszPassword, MAN mSource );

// Private routine for ML3sendRoam in net_roam.c ...
int         ML3pvtSendRoam ( void );

// Private routine for ML3sendStatus in net_stat.c ...
int     ML3pvtSendStatus ( int nStatusValue, MAN mSource,
            int nSubscriptionFlags, int nNumberOfDestinationMans,
            PMAN pmDestinationMans);

// Private routine for ML3sendMode in net_mode.c ...
int     ML3pvtSendMode ( int nModeValue, MAN mSource );

/*
**  Functions to help build network packets.
*/
    int         ML3nSetPacketByte ( PVOID pvPacketBuffer,
                    int nPacketBufferSize, byte bInputData );
    int         ML3nSetPacketInt  ( PVOID pvPacketBuffer,
                    int nPacketBufferSize, int nInputData );
    int         ML3nSetPacketTriByte ( PVOID pvPacketBuffer,
                    int nPacketBufferSize, long lInputData );
    int         ML3nSetPacketLong ( PVOID pvPacketBuffer,
                    int nPacketBufferSize, long lInputData );
    int         ML3nSetPacketData ( PVOID pvPacketBuffer,
                    int nPacketBufferSize, PVOID pvDataBuffer,
                    int nDataBufferSize, int nFillSize, char cFillChar );

/*
**  MAN number functions.
*/
    boolean     ML3fIsValidManNumber ( MAN mManNumber );
    int         ML3nGetPacketMan ( PVOID pvPacketBuffer,
                    int nPacketBufferSize, PMAN pmManNumber );
    int         ML3nSetPacketMan ( PVOID pvPacketBuffer,
                    int nPacketBufferSize, MAN mManNumber );

    void        ML3vSetLocalManNumber ( MAN mNewValue );
    boolean     ML3fHaveLocalManNumber ( void );

/*
**  Functions to take information out of network packets.
*/
    int         ML3nGetPacketTriByte ( PVOID pvPacketBuffer,
                    int nPacketBufferSize, PLONG plData );

/*
**  Misc functions to help build packets.
*/
    int         ML3nClearTimeStamp ( PVOID pvBuffer, int nBufferSize );
    int         ML3nSetPacketFlexList ( PVOID pvPacketBuffer,
                    int nPacketBufferSize, int nNumberOfMansInList,
                    PMAN pmFlexList );
    int         ML3nFillMpakHeader ( PVOID pvMpakBuffer, int nMpakCommand,
                    PINT piOffset, int nSubscrFlags, int nNumberOfMans,
                    MAN mSource, PMAN pmDestination );
    int         ML3nSetPacketAddressee ( PVOID pvMpakBuffer, MAN mSource,
                    MAN mDestination, int nSubscrFlags, int nMpakCommand );
    int         ML3nSetPacketAddresseeList ( PVOID pvMpakBuffer, MAN mSource,
                    int nNumberOfMans, PMAN pmDestination, int nSubscrFlags,
                    int nMpakCommand );

/*
**  Net8.c
```

```
boolean ATwaiting( void );
boolean NETwaiting( void );
boolean StopCallLater( int sig );
char GetATchar( void );
int GetNETchar( void );
int AllocateCallLater( void (*his_routine)() );
int StartCallLater( int sig,int howlong,... );
int StateCallLater( int sig );
int find_signature( void );
int getdecimal( int low,int high );
int getdigit( int low,int high );
int mlsprintf( char *str, char *fmt, ... );
int mlslprintf( char *str, int maxsize, char *fmt, ... );
long CallLaterTimer( int handle,int activity );
short PauseCallLater( int sig );
short RestartCallLater( int sig );
short ResumeCallLater( int sig );
void *ml_malloc( unsigned int size, Tmempool pool );
void Dbg_printf( void *format,... );
boolean FlushBuff( void );
void FreeCallLater( int sig );
void PauseSysCallLater( void );
void PutATchar( char outgoing );
boolean PutNETbuff( char outgoing );
void ResumeSysCallLater( void );
void autobaud( void );
void dbg_dec( unsigned long int_num );
void dbg_hex( unsigned long hex_num );
void getATbuff( int nMaxSize );
void ml_free( void *pointer );
void put_s( char _far *str );
void putcrlf( void );
void putdec( unsigned int numb );
void puthex( unsigned char numb );
void sendResultCode( int error_code );
void sendText( char *string );
boolean fNETbuffFull(void);
int nPowerOffRequested(void);
```

File: include\UTILS.HPC

```
#define MAXSTR 256

static char *xstr = "0123456789ABCDEF";

    void
citoa( unsigned num, int base, char *str )
  {
    char    temp[MAXSTR];
    char    *cp = temp;
    int     sign = num;
    int     i;
    if( base < 0 )
      {
        base = -base;
        if( ((int)num) < 0 )
            num = -num;
        if( sign < 0 )
            *str++ = '-';
      }
    for( i=0; i<MAXSTR; ++i )
      {
        *cp++ = xstr[(num % base)];
        if( !(num /= base) )
            break;
      }
    for( ; i>=0; --i )
        *str++ = *--cp;
    *str = '\0';
  }

    void
cltoa( long num, int base, char *str )
  {
    char    temp[MAXSTR];
    char    *cp = temp;
    long    sign = num;
    unsigned ret;
    int     i;

    if( base < 0 ).
      {
        base = -base;
        if(num < 0L)
            num = -num;
        if(sign < 0L)
            *str++ = '-';
      }
    if( num < 0L )
      {
        num &= 0x7fffffffL;
        ret = (unsigned)((num % base)-(0x80000000L % base));
        *cp++ = xstr[ret % base];
        num = ((num >> 1) | 0x40000000L) / (base >> 1);
        for( i=1; i<MAXSTR; ++i )
          {
            *cp++ = xstr[num % base];
            if( !(num /= base) )
                break;
          }
      }
    else
      {
        for( i=0; i<MAXSTR; ++i )
          {
            *cp++ = xstr[num % base];
            if( !(num /= base) )
                break;
          }
      }
    for( ; i>=0; --i )
        *str++ = *--cp;
    *str = '\0';
  }
```

```
// sprintf for MobiLib-Plus
extern int mlsprintf(char *buf,char *pat,...);
extern int mlslprintf(char *buf,int maxstr,char *pat,...);

// autobauding functions
extern int nAutoBaudRadio(int command);
extern void vAutoBaudHandler(unsigned int uAccessFlags);
extern boolean fAreWeAutoBauding(void);

// external protos for DCE/DTECLOSE.C

void vSetLinkNotClosed(void);
void vReceivedLinkClose(void);
boolean fIsLinkClosing(void);
void vRunLinkClose(void);


// external protos for control frame transmission

int nSendNACK( void );
int nSendNewACK(void (*pfCallback)(void));
int nSendOldACK(void);
void vReceivedSACK( void );
int nSendSENS(void (*pfCallback)(int nStatus));
void vClearRACK(void);
int nSendRACK( void (*pfCallback)(int nStatus) );
int nSendSACK(void);


// external protos for information frame transmission
int sendCmdB(void (*pfCallback)(int nStatus), int nLength, int nInterval, boolea
n fUseRacks);
int sendCmdFx(void (*pfCallback)(int nStatus), char cSubCommand);
int sendCmdFQ( void (*pfCallback)(int nStatus), char *sDeviceID);
int sendCmdFP( void (*pfCallback)(int nStatus), MAN man );

int nCheckInfoFrameParameters(char * sText, int nDataLength, byte *pbData);
int nSendInfoFrame(void (*pfCallback)(int nStatus),
                    char * sText, int nDataLength, byte *pbData,
                    boolean fUseRacks);

void vReceivedNACK(void);
void vIFtransmitFailed(void);
void vReceivedACK(byte bSequence);
void * pvGetIFstructurePointer(void);
void vCheckForWaitingIFtransmit(void);
boolean fOKtoTransmitIF(void);
void vNowSendingIF(void);


void vGetBframeValues(int *pnLength, int *pnInterval);
int nInterpretIncomingInfoFrame(linkFrame *plfFrameData);

void vNetworkNotify(netNotifyType nntNotify);

void vFlushNetworkNotifies( void );
```

```
void vSetDebug(boolean fDebug);
void vSetMaxIFlength(int nIFlength);

int nAssembleIncomingLinkFrame(linkFrame * plfFrameData, linkDefs *pldLink);
boolean fIsTextStringOK(unsigned char *string);

void vCreateTXlinkFrame(void *pvFrameComponents, sendFrameStruct *psfsFrame);

void vSetLinkNotOpen(void);

boolean fIsNetAvailable(void);
void vSetLinkNotOpen(void);
void vDeviceIDreceived(char *sID);
boolean fIsLinkRadio(void);
void vRadioConnect(boolean fSendFB);
void vRadioDisconnect(void);
boolean fIsLinkOpen(void);
boolean fIsLinkOpening(void);
void vSetLinkMANnumber(MAN MANnumber);
void vMANrequestReceived(void);
void vSetAllowAutobaud(boolean fAllowAutobaud);
void vSetDelayAutobaud(boolean fDelayAutobaud);

MAN mGetLinkMANnumber(void);
void vReceivedRestartRequest(void);
void vLinkBroken( void );
boolean fRunLinkStartup(void);

void vStartIdleTimer(void);

boolean fIsNetSendRequested(void);
void vQueueNetSend(void);
void vPacketSentToNetwork(void);
void vErrorNetworkPacket(linkFrame *plfFrameData);
void vUnsentNetworkPacket(linkFrame *plfFrameData);
void vNewNetworkPacket(linkFrame *plfFrameData);

int nAddToTXframeQueue(void (*pfCallback)(int nStatus), byte bFrameType, byte bS
equence);
void vClearTXqueueEntry(int nIdx);
void vSetTransmitSpacingTime( long int lSpacing );
void vTransmitFrameDone(void);

int nGetMaxIFlength(void);

boolean fInstallLinkOpenModule(void);
boolean fRemoveLinkOpenModule(void);

boolean fInstallLinkCloseModule(void);
boolean fRemoveLinkCloseModule(void);

boolean fInstallLinkDriverModule(void);
boolean fRemoveLinkDriverModule(void);

boolean fInstallLinkNetNotifyModule(void);
boolean fRemoveLinkNetNotifyModule(void);
```

```
/*****************************************************************

  This code (c) Copyright 1992  by
      and designed by
            Research In Motion Limited
            Technology Business Park
            180 Columbia Street West
            Waterloo, Ontario
            N2L 3L3
       Phone: (519) 888-7465
         FAX: (519) 888-6906

  Author:       Michael A. Barnstijn

  Date created:   September 1990

  Description:
        Definitions and Function Prototypes for MobiLib-Plus

  Change History:
        14 May 1992             Release cleanup

*****************************************************************/

int MinitializeMobilib(char *storageName,int doStartup);
int MremoveMobilib(int doShutdown,int doStoreParameters);
int MshutdownSequence(void);
int MstartupSequence(int command);
int MstoreParameters(char *storageName,int doShutdown);

/* layer version/information structure (65 bytes):
        Version (0-99):         1 byte
        Revision (0-9):         1 byte
        Update (0-00):          1 byte
        DateStamp:              4 bytes:
                                    byte 0:   day of month (1-31)
                                    byte 1:   month (1-12)
                                    byte 2-3: AD year 16 bits,
                                              MSByte first

        information          58 bytes:       character string, includes
                                              the null terminator.
            required text is:
            1) Manufacturer's name, ends with a semicolon (;)
            2) description of the layer
*/

typedef struct _MLinfoStruct {
    unsigned char version;
    unsigned char revision;
    unsigned char update;
    unsigned char idHigh;
    unsigned char idLow;
    unsigned char day;
    unsigned char month;
    unsigned char yearHigh;
    unsigned char yearLow;
    char informationString[56];
    } MLinfoStruct;
typedef MLinfoStruct *      PMlInfoStruct;

typedef long int MAN;

#define ML_EXITH_FAIL  -2    /* cannot install exit function  */
#define ML_BRKH_FAIL   -1    /* cannot install break handler  */
#define ML_OK           0    /* everything succeeded          */
#define ML_STOR_FAIL    1    /* couldn't open storage file    */
#define ML_STOR_EOF     2    /* EOF/err reading from storage  */
#define ML_APARM_ERR    3    /* error in ACCESS layer parms   */
#define ML_AINST_ERR    4    /* error installing ACCESS layer */
#define ML_LPARM_ERR    5    /* error in LINK layer parms     */
#define ML_LINST_ERR    6    /* error installing LINK layer   */
#define ML_NPARM_ERR    7    /* error in NETWORK layer parms  */
#define ML_NINST_ERR    8    /* error installing NETWORK layer*/
#define ML_NSEND_ERR    9    /* unable to send net startup    */
#define ML_NRESP_ERR   10    /* no network response to startup*/
#define ML_N_TRYING    11    /* network startup in progress   */
#define ML_NO_RADIO    12    /* autobaud could not find radio */
#define ML_NO_MEMORY   13    /* memory allocator failed */
```

```
*/
    boolean     ML3fIsNetworkLive ( void );
    void        ML3vSetNetworkLive ( boolean fIsLive );

/*
**  Net11.c
*/
    boolean     ML3fInitTimers ( void );
    void        ML3vRemoveTimers ( void );

    void        ML3fSetTransmitTimerActive ( boolean fActive );
    void        ML3vClearNetHandlerTimer ( void );
    void        ML3vSetNetHandlerTimer ( long lTimeout );

    boolean     ML3fGetDoNetPrivate ( void );
    boolean     ML3fDoNetPrivateHandler ( void );
    void        ML3vSetDoNetPrivate ( boolean fNewValue );
    int         ML3nGetPrivateTimerFlag ( void );
    void        ML3vSetPrivateTimerFlag ( int nNewValue );

    void        ML3vClearTransmitTimer ( void );
    void        ML3vSetTransmitTimer ( long lTimeout );

    void        ML3vStartTransmitTimer ( void );
    void        ML3vStopTransmitTimer ( void );
    boolean     ML3fIsTransmitTimerDone ( void );

    int         ML3getTransmitTimeout ( void );
    int         ML3setTransmitTimeout ( int nSeconds );
    void        ML3vResetTransmitTimeout ( void );

    boolean     ML3fAddInitTimer ( long lInitialTimeout );
    void        ML3vSetInitTimer ( int nMilliseconds );
    tristate    ML3tHasInitTimedOut ( void );
    tristate    ML3tGetInitTimeout ( void );
    boolean     ML3fIsInitTimerActive ( void );
    void        ML3vSetInitTimeout ( tristate tNewState );

//  Net12.c
int         ML3nIsMpakAvailable ( boolean fInternal );

/*
**  Net13.c
*/
    int         ML3nStartRxQueues ( boolean fAllocBuffers );
    void        ML3vRemoveRxQueues ( void );

    boolean     ML3fIsRxQueueFull ( void );
    boolean     ML3fIsRxQueueEmpty ( void );
    void        ML3vGetRxQueueData ( PVOID pvMpakBuffer, PINT piMpakSize );
    void        ML3vDiscardRxQueueHead ( void );
    boolean     ML3fQueueIncomingMpaks ( boolean fIsInternal );
    boolean     ML3fReceivedNewMpak ( void );
    void        ML3vScanRxQueueForInternalMpaks ( void );
    void        ML3flushReceiver ( void );
    int         ML3nGetRxQueueHeadStatus ( void );

//  Net14.c
int         ML3nCheckIncomingMpak ( PVOID pvPacketBuffer, int nPacketLength );
int         ML3nCheckForReturnedMpaks ( int nTrafficState, int nCommand );

//  Net15.c
boolean     ML3fSetFifoPackets ( boolean fNewState );
boolean     ML3fGetFifoPackets ( void );

//  Net16.c
boolean     ML3fSetStartupDone ( boolean fNewState );
boolean     ML3fGetStartupDone ( void );

boolean     ML3fSetShutdownDone ( boolean fNewState );
boolean     ML3fGetShutdownDone ( void );

boolean     ML3fSetNetworkLayerInitialized ( boolean fNewState );
boolean     ML3fGetNetworkLayerInitialized ( void );

boolean     ML3fSetNetworkConnected ( boolean fNewState );
boolean     ML3fGetNetworkConnected ( void );

//  Net17.c
boolean     ML3fIsLoggedIn ( void );
boolean     ML3fIsBusyDoingLogin ( void );
int         ML3nSetDoingLogin ( int nNewState );

int         ML3nSetDoingConreq ( int nNewState );
boolean     ML3fIsBusyDoingConreq ( void );
boolean     ML3fIsLoggedOk ( void );

boolean     ML3fSetRestartingNetwork ( boolean fNewState );
boolean     ML3fGetRestartingNetwork ( void );

//  Net18.c
boolean     ML3fSetMpakPassThrough ( boolean fNewState );
boolean     ML3fGetMpakPassThrough ( void );

boolean     ML3fSetNetworkBorn ( boolean fNewState );
boolean     ML3fGetNetworkBorn ( void );

//  Net19.c
int         ML3nScanFlexListForMan ( MAN mNumber );
boolean     ML3fStoreManInFlexList ( MAN mNumber );
boolean     ML3fRemoveManFromFlexList ( MAN mNumber );
boolean     ML3fIsFlexListFull ( void );
void        ML3vCompressFlexList ( void );
int         ML3nSendFlexList ( void );
void        ML3vClearFlexList ( void );
void        ML3vSetFlexList ( PVOID pvPacketBuffer );
int         ML3nAddFlexListToString ( PSTR pszString );

MAN         ML3mSetFlexRequestSource ( MAN mNewValue );
MAN         ML3mGetFlexRequestSource ( void );

boolean     ML3fSetReceivedFlexList ( boolean fNewState );
```

```
boolean     ML3fGetReceivedFlexList ( void );

boolean     ML3fSetReceivedFlexListRequest ( boolean fNewState );
boolean     ML3fGetReceivedFlexListRequest ( void );


//  Net20.c
int         ML3nScanGroupListForMan ( MAN mNumber );
boolean     ML3fStoreManInGroupList ( MAN mNumber );
boolean     ML3fRemoveManFromGroupList ( MAN mNumber );
boolean     ML3fIsGroupListFull ( void );
void        ML3vClearGroupList ( void );
void        ML3vSetGroupList ( PVOID pvPacketBuffer );
int         ML3nAddGroupListToString ( PSTR pszString );

boolean     ML3fSetReceivedGroupList ( boolean fNewState );
boolean     ML3fGetReceivedGroupList ( void );


//  Net21.c
int         ML3nPutMpak ( int nWaitForSentToNetwork, PVOID pvPacketBuffer,
                int nPacketSize );
boolean     ML3fCanTransmit ( void );


//  Net22.c
boolean     ML3fSetDiscardTimePackets ( boolean fNewValue );
boolean     ML3fGetDiscardTimePackets ( void );

//  Net23.c
void        ML3vFlushNetworkNotifies ( void );
void        ML3vRestartNetwork ( void );
void        ML3vStartupNetwork ( void );
void        ML3vNetworkConnected ( void );
void        ML3vNetworkDisconnected ( void );
void        ML3vReceivedMpak ( void );
void        ML3vSentToNetwork ( void );
void        ML3vSendError ( void );
void        ML3vNetworkFailed ( void );


//  Network Notify And Associated Utilities ( net25.c )
boolean     ML3fDecTxDone ( void );
boolean     ML3fAnyTxDone ( void );
boolean     ML3fDecTxFailed ( void );
boolean     ML3fAnyTxFailed ( void );
boolean     ML3fIsLinkActive ( void );
boolean     ML3fDecRxMpak ( void );
boolean     ML3fAnyRxMpak ( void );
boolean     ML3fIsLinkInitFinished ( void );
void        ML3vResetLinkInitFinished ( void );
void        ML3vResetLinkShutdownFinished ( void );
boolean     ML3fIsLinkShutdownFinished ( void );
void        ML3fIncTxDone ( void );
void        ML3fIncTxFailed ( void );
//boolean     ML3fWasTxInternal ( void );
boolean     ML3fIsSentToNetwork ( void );
```

```
void        ML3vResetSentToNetwork ( void );


//  Net27.c
int         ML3nCheckSendStatus ( int nAction );


//  Net28.c
int         ML3nCheckPacketAddress ( PVOID pvPacketBuffer, int nPacketLength,
                MAN mAddressee );
int         ML3nProcessIncomingCommand ( int nCommand, PVOID pvPacketBuffer,
                int nPacketLength, MAN mPacketSource );


//  Net30.c

//  Net31.c
int         ML3nSubmitPacket ( boolean fWaitForSentToNetwork, PVOID pvPacket,
                int nPacketLength, boolean fExternalPacket );
int         ML3nCheckForSubmittedPacket ( void );
boolean     ML3fCheckForPacket ( void );
boolean     ML3fSetPacketSubmittedToLink ( boolean fNewFlag );
boolean     ML3fIsPacketSubmittedToLink ( void );
boolean     ML3fIsInternalPacket ( void );

//  Net32.c
boolean     ML3fStartNetInternalTimer ( void );
void        ML3vStopNetInternalTimer ( void );
void        ML3vClearNetInternalTimer ( void );
void        ML3vSetNetInternalTimer ( long lTimeout );

void        ML3vUpdateSendStatus ( void );
int         ML3nGetSendStatus ( void );
```

```
/*****************************************************************

  This code (c) Copyright 1992  by
     and designed by
             Research In Motion Limited
             Technology Business Park
             180 Columbia Street West
             Waterloo, Ontario
             N2L 3L3
       Phone: (519) 888-7465
         FAX: (519) 888-6906

  Author:       Michael A. Barnstijn

  Date created:   September 1990

  Description:
        Definitions and Function Prototypes for MobiLib-Plus Network Layer

  Change History:
        14 May 1992             Release cleanup

*****************************************************************
**      Changes made to this file should also be reflected in the MobiPlus.h
**      file in the p:\mobiplus directory (Developer's Kit).
*****************************************************************/

/* maximum values for MPAK limits */
#define MAX_MPAK_SIZE    560
#define MAX_MPAK_DATA    512
#define MAX_MPAK_COMMANDS 41
#define MAX_ADDRESSEES   7
#define MIN_MPAK_SIZE    8

/* subscription flags */
#define NONE_F          0x00
#define MAILBOX_F       0x01
#define DIGITAL_F       0x02
#define UNKNOWN_F       0x08
#define EXTERN_F        0x20

/* MPAK command values */
#define N_TEXT          0
#define N_DATA          1
#define N_STATUS        2
#define N_HPDATA        3
#define N_EXTPAK        4
#define N_SOS           5
#define N_SOSINFO       6
#define N_SOSACK        7
#define N_CONREQ        8
#define N_ADDCONREQ     9
#define N_CONGRA        10
#define N_CONORD        11
#define N_CONREA        12
#define N_DISCON        13
#define N_CLOOPON       14
#define N_CLOOPOFF      15
#define N_LINEON        16
#define N_LINEOFF       17
#define N_SOSCONREQ     18
#define N_EXTCONREQ     19
#define N_LOGINREQ      20
#define N_LOGINGRA      21
#define N_LOGINREF      22
#define N_LOGOUT        23
#define N_LOGOUTORD     24
#define N_BORN          25
#define N_ACTIVE        26
#define N_INACTIVE      27
#define N_DIE           28
#define N_LIVE          29
#define N_ROAMORD       30
#define N_ROAM          31
#define N_VICESOSRX     32
#define N_SOSRX         33
#define N_GROUPLIST     34
#define N_FLEXREQ       35
#define N_FLEXLIST      36
#define N_INFOREQ       37
#define N_INFO          38
#define N_TIME          39
#define N_MODE          40

/* pre-defined MAN numbers */
#define MAN_MOBITEX      1L
#define MAN_TELEX        2L
#define MAN_PUBLIC_X21   3L
#define MAN_TELEPHONE    4L
#define MAN_PUBLIC_X25   5L
#define MAN_MSG_HANDLER  6L
#define MAN_ALL_TERMS    7L
#define MAN_NET_CUST_SERV 1000000L

/* traffic state values */
#define S_OK            0x00
#define S_FROM_MAIL     0x01
#define S_IN_MAIL       0x02
#define S_NO_TRANSFER   0x03
#define S_ILLEGAL       0x04
#define S_CONGEST       0x05
#define S_ERROR         0x06
#define S_BUSY          0x07

#define N_OK            0
#define N_ALREADY_INIT  1
#define N_BAD_EXIT      2
#define N_NO_MEMORY     3

#define N_BAD_PARMS      -3
#define N_TIMEOUT        -2
#define N_LINK_ERROR     -1
#define N_NO_MPAK_SENDING 0
#define N_MPAK_SENDING    1
```

```
#define N_MPAK_SENT       2
#define N_MPAK_DONE       3
#define N_MPAK_REFUSED    4
#define N_MPAK_BLOCKED    5
#define N_MPAK_GONE       6
#define N_MPAK_SEND_ERROR 7
#define N_TRYING          8
#define N_FAILED          9
#define N_DONE_MOX        10
#define N_DONE_8K         11
#define N_DONE_1200       12
#define N_RUNNING         13
#define N_STARTUP         14
#define N_NO_INIT         15

#define N_NO_MPAKS      0
#define N_NEW_MPAK      1
#define N_UNSENT_MPAK   2
#define N_BAD_MPAK      3
#define N_ERROR_MPAK    4

#define MIN_MPAK_LENGTH 8
#define MAX_MPAK_LENGTH 560

#define TRANSMIT        0       /* for use as "flag" in "sendCmdK()" */
#define RECEIVE         1

#define MIN_HPDATA_PROTOCOL     0
#define MAX_HPDATA_PROTOCOL     255

/* maximums according to Mobitex specifications in section 9 */
#define MAX_FREQUENCY   0x617
/* valid MANs are between 0 and 16 million and change */
#define MAX_MAN         0xFFFFFFL
#define MIN_MAN         0
#define MIN_NET_MAN     100000
#define MAX_D_UTG       9
#define MAX_S_UTG       15
#define MAX_TYP         8
#define PASSWORD_LEN    8
#define MAX_TFN         20

#define MAX_SOS_DATA    256
#define MAXFLEX 7       /* maximum number of transferred subscriptions */
#define MAXGROUP 15     /* maximum number of defined local groups */

enum { IDLE, APP_SEND, NET_STARTING, APP_SEND_AND_NET_START_REQ };
enum { APP_SEND_DONE = -1, RESTART_CHECK, APP_SEND_CHECK, RESTART_DONE };
enum { CANT_SEND_NOW, OK_TO_SEND };

#define AS_STATUS_OFFSET 25

//  Network Activity States
//  0 if inactive, 1 if active accepted, -1 if requesting active (changing).
#define     NETWORK_ACT_BUSY        -1
#define     NETWORK_ACT_INACTIVE    0
#define     NETWORK_ACT_ACTIVE      1
```

```
#define     NETWORK_ACT_MIN     NETWORK_ACT_BUSY
#define     NETWORK_ACT_MAX     NETWORK_ACT_ACTIVE

#define     NUM_TIMESTAMP_BYTES     3

/* definition of MPAK time structure */
typedef struct _MPAKtime
{
    int nYear, nMonth, nDay, nHour, nMinute;
} MpakTime;
typedef MpakTime *      PMpakTime;

/*
** function prototypes
*/

/*
**  Network activity state management routines.
*/
    int         ML3isNetworkActive ( void );

/*
**  MAN number functions.
*/
    MAN         ML3getLocalMANnumber ( void );

/*
**  Functions to take information out of network packets.
*/
    int         ML3decodeTime ( PVOID pvPacketBuffer,
                    PMpakTime pmtPacketTime );


/*
**  Net7.c.
*/
    MAN         ML3getSenderMAN ( PVOID pvPacketBuffer );
    int         ML3numAddressees ( PVOID pvPacketBuffer );
    MAN         ML3getAddresseeMAN ( PVOID pvPacketBuffer );
    void        ML3getAddresseeList ( PVOID pvPacketBuffer,
                    PMAN pmAddressees );
    int         ML3getSubscriptionFlags ( PVOID pvPacketBuffer );
    int         ML3getTrafficState ( PVOID pvPacketBuffer );
    int         ML3getDataAreaOffset ( PVOID pvPacketBuffer );

/*
**  Net9.c
*/
    int         ML3getCommand ( PVOID pvPacketBuffer );
    PCHAR       ML3getCommandName ( int nCommand );
    int         ML3getCommandValue ( int nCommand );
    int         ML3getCommandFlags ( int nCommand );
    int         ML3hasDie ( int nCommand );
    int         ML3hasTime ( int nCommand );
    int         ML3convertCommandName ( PCHAR pszCommandString );
```

```
/*
**  Net10.c
*/
    boolean     ML3getBlockingSend ( void );
    boolean     ML3setBlockingSend ( boolean fNewValue );
    void        ML3startupNetwork(void);
    int         ML3sendActive ( MAN mSource );
    int         ML3sendInactive ( MAN mSource );
    int         ML2isLinkRadio ( void );

/*
**  Net12.c
*/
    int         ML3getMPAK ( PVOID pvMpakBuffer, PINT piMpakSize );
    int         ML3isMPAKavailable ( void );

/*
**  Net13.c
*/
    void        ML3flushReceiver ( void );

/*
**  Net18.c
*/
    int         ML3setNetworkPassthru ( int nSetValue );
    int         ML3getNetworkPassthru ( void );


/*
**  Net21.c
*/
    int         ML3okToTransmit ( void );
    int         ML3getSendStatus ( void );
    void        ML3flushTransmitter ( void );

/*
**  Notification for the LINK layer only (net25)...
*/
    void _far   ML3networkNotify ( Ncallback nMessageType, ... );

/*
**  net26.c
*/
    void        ML3getNetworkLayerVersionInfo ( PMlInfoStruct pmisFill );
    int         ML3getNetworkLayerParameters ( PSTR pszString );
    int         ML3setNetworkLayerParameters ( PSTR pszString );

/*
**  Net27.c
*/
    void        ML3startupNetwork ( void );


/*
**  Net29.c
*/
    void        ML3removeNetworkLayer ( void );
    int         ML3shutdownNetworkLayer ( void );
    int         ML3isShutdownDone ( void );

/*
**  Network.c
*/
    int         ML3installNetworkLayer ( void );

/*
**  Routines to send packets of given types.
*/
    int         ML3returnMPAKasUnknown ( PVOID pvBuffer, int nBufferSize );

    int         ML3sendActive ( MAN mSource );
    int         ML3sendData ( PCHAR pszData, int nDataLength, MAN mSource,
                    int nSubscriptionFlags, int nNumberOfMans,
                    PMAN pmDestinationMans );
    int         ML3sendFlexList ( PMAN pmFlexList,int nNumberOfFlexEntries,
                    MAN mSource, MAN mDestination );
    int         ML3sendHPData ( PVOID pvData, int nLength, MAN mSource,
                    int nSubscriptionFlags, int nNumberOfDestinationMans,
                    PMAN pmDestinationMans, int nProtocol );
    int         ML3sendLogin ( MAN mLogin, PSTR pszPassword, MAN mSource );
    int         ML3sendRoam ( void );
    int         ML3sendStatus ( int nStatusValue, MAN mSource,
                    int nSubscriptionFlags, int nNumberOfDestinationMans,
                    PMAN pmDestinationMans );

/*
**  Unused MPAK packet generators.
*/
        int ML3sendInactive(MAN);
        int ML3sendBorn(void);
        int ML3sendText(char *,MAN,int,int,MAN *);
        int ML3sendEXTPAK(char *,int,MAN,MAN);
        int ML3sendLogout(MAN,MAN);
        int ML3sendSOSACK(int,MAN,MAN);
        int ML3sendSOS(char *text,int length,MAN MANfrom,MAN MANto);

        int ML3sendVICESOSRX(MAN MANfrom);
        int ML3sendSOSRX(MAN MANfrom);
        int ML3sendCONREQ( MAN MANfrom, MAN MANto, int lineNumber,
            int connectID, int subscriptionFlags );
        int ML3sendCONREA(MAN MANfrom,MAN MANto,int lineNumber,int connectID);
        int ML3sendDISCON(MAN MANfrom,MAN MANto,int lineNumber,int connectID);
        int ML3sendSOSCONREQ(MAN MANfrom,MAN MANto,int lineNumber,int connectID
);
        int ML3sendADDCONREQ(byte *data,int dataLength,MAN MANfrom,MAN MANto,in
t lineNumber,int connectID,int subscriptionFlags);
        int ML3sendEXTCONREQ(char *dest,MAN MANfrom,MAN MANto,int lineNumber,in
t connectID,int subscriptionFlags);
        int ML3sendLINEON(MAN MANfrom,int lineNumber);
        int ML3sendLINEOFF(MAN MANfrom,int lineNumber);
```

```
boolean ML3getBlockingSend(void);
boolean ML3setBlockingSend(boolean flag);
boolean gotNewMPAK( void );
int ML3appSend(int sending);
int ML3checkIncomingMPAK(unsigned volatile char *MPAK,int MPAKlength);
int ML3fillMPAKheader(unsigned volatile char *MPAK,int command,int *offset,int s
ubscriptionFlags,int numMANs,long MANfrom,long *pMANto);
int ML3getNetworkLayerParameters(char *string);
int ML3getNetworkPassthru(void);
int ML3getSendStatus(void);
int ML3getTransmitTimeout(void);
int ML3hasTime(int command);
int ML3installNetworkLayer(void);
int ML3isFlexlistFull(void);
int ML3isMANinFlexlist(long man);
int ML3isMPAKavailable(void);
int ML3isNetworkActive(void);
int ML3isShutdownDone(void);
int ML3isTXtimerDone(void);
int ML3networkState(void);
int ML3okToTransmit(void);
int ML3pvtSendADDCONREQ(unsigned char *data,int dataLength,long MANfrom,long MAN
to,int lineNumber,int connectID,int subscriptionFlags);
int ML3pvtSendActive(long MANfrom);
int ML3pvtSendBorn(void);
int ML3pvtSendCONREA(long MANfrom,long MANto,int lineNumber,int connectID);
int ML3pvtSendCONREQ(long MANfrom,long MANto,int lineNumber,int connectID,int su
bscriptionFlags);
int ML3pvtSendDISCON(long MANfrom,long MANto,int lineNumber,int connectID);
int ML3pvtSendData(char *data,int length,long MANfrom,int subscriptionFlags,int
numMANs,long *pMANto);
int ML3pvtSendEXTCONREQ(char *dest,long MANfrom,long MANto,int lineNumber,int co
nnectID,int subscriptionFlags);
int ML3pvtSendEXTPAK(char *data,int length,long MANfrom,long MANto);
int ML3pvtSendFlexlist(long *pFlexlist,int numflex,long MANfrom,long MANto);
int ML3pvtSendInactive(long MANfrom);
int ML3pvtSendLINEOFF(long MANfrom,int lineNumber);
int ML3pvtSendLINEON(long MANfrom,int lineNumber);
int ML3pvtSendLogin(long loginMAN,char *password,long MANfrom);
int ML3pvtSendLogout(long logoutMAN,long MANfrom);
int ML3pvtSendRoam(void);
int ML3pvtSendSOS(char *text,int length,long MANfrom,long MANto);
int ML3pvtSendSOSACK(int statusValue,long MANfrom,long MANto);
int ML3pvtSendSOSCONREQ(long MANfrom,long MANto,int lineNumber,int connectID);
int ML3pvtSendSOSRX(long MANfrom);
int ML3pvtSendStatus(int statusValue,long MANfrom,int subscriptionFlags,int numM
ANs,long *pMANto);
int ML3pvtSendText(char *text,long MANfrom,int subscriptionFlags,int numMANs,lon
g *pMANto);
int ML3pvtSendVICESOSRX(long MANfrom);
int ML3queueIncomingMPAKs(int internalCall);
int ML3sendADDCONREQ(unsigned char *data,int dataLength,long MANfrom,long MANto,
int lineNumber,int connectID,int subscriptionFlags);
int ML3sendActive(long MANfrom);
int ML3sendBorn(void);
int ML3sendCONREA(long MANfrom,long MANto,int lineNumber,int connectID);
int ML3sendCONREQ(long MANfrom,long MANto,int lineNumber,int connectID,int subsc
riptionFlags);
int ML3sendDISCON(long MANfrom,long MANto,int lineNumber,int connectID);
int ML3sendData(char *data,int length,long MANfrom,int subscriptionFlags,int num
MANs,long *pMANto);
int ML3sendEXTCONREQ(char *dest,long MANfrom,long MANto,int lineNumber,int conne
ctID,int subscriptionFlags);
int ML3sendEXTPAK(char *data,int length,long MANfrom,long MANto);
int ML3sendHPData(PVOID data,int length,long MANfrom,int subscriptionFlags,int n
umMANs,PMAN pMANto,int protocol);
int ML3sendInactive(long MANfrom);
int ML3sendLINEOFF(long MANfrom,int lineNumber);
int ML3sendLINEON(long MANfrom,int lineNumber);
int ML3sendLogin(long loginMAN,char *password,long MANfrom);
int ML3sendLogout(long logoutMAN,long MANfrom);
int ML3sendRoam(void);
int ML3sendSOS(char *text,int length,long MANfrom,long MANto);
int ML3sendSOSACK(int statusValue,long MANfrom,long MANto);
int ML3sendSOSCONREQ(long MANfrom,long MANto,int lineNumber,int connectID);
int ML3sendSOSRX(long MANfrom);
int ML3sendStatus(int statusValue,long MANfrom,int subscriptionFlags,int numMANs
,long *pMANto);
int ML3sendText(char *text,long MANfrom,int subscriptionFlags,int numMANs,long *
pMANto);
int ML3sendVICESOSRX(long MANfrom);
int ML3setNetworkLayerParameters(char *string);
int ML3setNetworkPassthru(int set);
int ML3setTransmitTimeout(int seconds);
int ML3shutdownNetworkLayer(void);
int ML3startNetConnection(int command);
int ML3startTXtimer(void);
int ML3waitForTXcomplete(int retcode,int waitcode);
int isMPAKavailable(int internalCall);
int isRXqEmpty(void);
int isRXqFull(void);
long ML3getLocalMANnumber(void);
long ML3netPrivateTimer(int handle,int activity);
long delayTimer(int handle,int activity);
void ML3changePipelineDepth(int value);
void ML3getNetworkLayerVersionInfo(struct _MLinfoStruct *info);
void ML3kickPrivate(void);
void ML3removeMANfromFlexlist(long man);
void ML3removeNetworkLayer(void);
void ML3scanQueuedMPAKs(void);
void ML3setInitTimer(int time);
void ML3startupNetwork(void);
void ML3stopTXtimer(void);
void _far ML3netPrivateHandler(int init,int command);
void addToFreeQ(struct rxp *entry);
void addToUsedQ(struct rxp *entry);
void delFromFreeQ(struct rxp *entry);
void delFromUsedQ(struct rxp *entry);
void sendInitActive( void );


int        ML3convertCommandName ( PCHAR pszCommandString );
int        ML3decodeTime ( PVOID pvPacketBuffer, PMpakTime pmtPacketTime );
int        ML3getCommand ( PVOID pvPacketBuffer );
```

```
int         ML3getCommandFlags ( int nCommand );
int         ML3getCommandValue ( int nCommand );
int         ML3getDataAreaOffset ( PVOID pvPacketBuffer );
int         ML3getMPAK ( PVOID pvMpakBuffer, PINT piMpakSize );
int         ML3getSubscriptionFlags ( PVOID pvPacketBuffer );
int         ML3getTrafficState ( PVOID pvPacketBuffer );
int         ML3hasDie ( int nCommand );
int         ML3hasTime ( int nCommand );
int         ML3numAddressees ( PVOID pvPacketBuffer );
int         ML3putMPAK ( int nWaitForSentToNetwork, PVOID pvPacketBuffer,
                    int nPacketSize );

MAN         ML3getAddresseeMAN ( PVOID pvPacketBuffer );
MAN         ML3getSenderMAN ( PVOID pvPacketBuffer );

PCHAR       ML3getCommandName ( int nCommand );

void        ML3getAddresseeList ( PVOID pvPacketBuffer,
                PMAN pmAddressees );

int         ML3sendFlexList ( PMAN pmFlexList,int nNumberOfFlexEntries,
                MAN mSource, MAN mDestination );
int         ML3pvtSendHPData ( PVOID pvData, int nLength, MAN mSource,
                int nSubscriptionFlags, int nNumberOfDestinationMans,
                PMAN pmDestinationMans, int nProtocol);
int         ML3pvtReturnMPAKasUnknown ( PVOID pvBuffer, int nBufferSize );


void _far   ML3networkNotify ( Ncallback nMessageType, ... );
```

```
#include <stdio.h>
#include <stdlib.h>
#include <memory.h>
#include <string.h>

#include "basetype.h"
#include "mobilib.h"
#include "enums.h"
#include "access.h"
#include "link.h"
#include "network.h"
#include "mpakxlat.h"
#include "timing.h"
#include "netint.h"

#include "debug.h"


//  Transmit buffer
extern byte     ML3cbMpakBuffer [ MAX_MPAK_SIZE ];
```

File: include\NPACKETS.H

```
/* conditional definitions are at the bottom */
#define RADIO           0
#define HOST            1
/* defines for the Serial Communications Controller */

#define EXTERNAL_CONTROL     4     /* for the LP2C only */

/* channel definitions */

/* first the write channels */
#define COMMAND_REG      0
#define TXRX_INT         1
#define INT_VECTOR       2
#define REC_CONTROL      3
#define TXRX_MISC        4
#define XMIT_CONTROL     5
#define SDLC_ADDRESS     6
#define SDLC_FLAG        7
#define XMIT_BUFFER      8
#define MASTER_INT       9
#define MISC_TXRX_BITS   10
#define CLOCK_CTRL_MODE  11
#define BAUD_RATE_LOW    12
#define BAUD_RATE_HIGH   13
#define MISC_CTRL_BITS   14
#define INT_CONTROL      15

/* now the read registers */
#define BUFFER_STATUS    0
#define REC_COND_STATUS  1
#define INT_VECTOR       2
#define INT_PENDING      3
#define RECEIVE_BUFFER   8
#define LOOP_CLK_STATUS 10
/* registers 12 and 13 are the same as the write registers */
#define EXT_STAT_INT_EN 15

/* these two are channel independant */
#define IPENDPORT        SERIAL_START+A_CMD
#define IVEC_PORT        SERIAL_START+B_CMD

/* Now some of the little bits inside those registers */

/* Interrupt enable bits (WR1) */
#define NO_RX_INT          0x00
#define RX_INT_1ST_SPEC    0x08
#define RX_INT_ALL_CHAR    0x10
#define RX_INT_SPEC_ONLY   0x18
#define PARITY_INT         0x04
#define TX_INT             0x02
#define EXT_INT            0x01

/* Interrupt pending bits (RR3) */
#define CHNL_A_SPECIAL     0x80
#define CHNL_B_SPECIAL     0x40
#define CHNL_A_RX_P        0x20
#define CHNL_A_TX_P        0x10
#define CHNL_A_STAT_P      0x08
#define CHNL_B_RX_P        0x04
#define CHNL_B_TX_P        0x02
#define CHNL_B_STAT_P      0x01

#define CHNL_A_INT         (CHNL_A_RX_P|CHNL_A_TX_P|CHNL_A_STAT_P)
#define CHNL_B_INT         (CHNL_B_RX_P|CHNL_B_TX_P|CHNL_B_STAT_P)

#define TALK_INTS          (CHNL_A_INT|CHNL_B_INT)

#ifdef MPC
  #ifdef MX25
    #define MASC_SPECIAL       CHNL_A_SPECIAL       //MPC X25
    #define MASC_RX            CHNL_A_RX_P
    #define MASC_TX            CHNL_A_TX_P
    #define MASC_STAT          CHNL_A_STAT_P
    #define X25_RX             CHNL_B_RX_P
    #define X25_TX             CHNL_B_TX_P
    #define X25_STAT           CHNL_B_STAT_P
  #else
    #define TERMINAL_SPECIAL   CHNL_A_SPECIAL       //MPC Hayes
    #define TERMINAL_RX        CHNL_A_RX_P
    #define TERMINAL_TX        CHNL_A_TX_P
    #define TERMINAL_STAT      CHNL_A_STAT_P
    #define MASC_RX            CHNL_B_RX_P
    #define MASC_TX            CHNL_B_TX_P
    #define MASC_STAT          CHNL_B_STAT_P
  #endif
#else
  #ifdef MX25
    #define MASC_SPECIAL       CHNL_B_SPECIAL       // PC X25
    #define MASC_RX            CHNL_B_RX_P
    #define MASC_TX            CHNL_B_TX_P
    #define MASC_STAT          CHNL_B_STAT_P
    #define X25_RX             CHNL_A_RX_P
    #define X25_TX             CHNL_A_TX_P
    #define X25_STAT           CHNL_A_STAT_P
  #else
    #define TERMINAL_SPECIAL   CHNL_B_SPECIAL       // PC Hayes
    #define TERMINAL_RX    CHNL_B_RX_P
    #define TERMINAL_TX        CHNL_B_TX_P
    #define TERMINAL_STAT      CHNL_B_STAT_P
    #define MASC_RX            CHNL_A_RX_P
    #define MASC_TX            CHNL_A_TX_P
    #define MASC_STAT          CHNL_A_STAT_P
  #endif
#endif

#ifdef        MPC
  #define A_CMD        2
  #define A_DATA       3
  #define B_CMD        0
  #define B_DATA       1
  #ifdef MX25
    #define MASC_CMD     A_CMD
    #define X25_CMD      B_CMD
    #define NON_MASC_CMD B_CMD
```

```
#else
  #define MASC_CMD      B_CMD
  #define TERMINAL_CMD A_CMD
  #define NON_MASC_CMD A_CMD
 #endif
#else       // we're on a PC
 #define A_CMD        0
 #define A_DATA       1
 #define B_CMD        2
 #define B_DATA       3
 #ifdef MX25
  #define MASC_CMD      B_CMD
  #define X25_CMD       A_CMD
  #define NON_MASC_CMD A_CMD
 #else
  #define MASC_CMD      A_CMD
  #define TERMINAL_CMD B_CMD
  #define NON_MASC_CMD B_CMD
 #endif
#endif        //MPC
```

File: include\SCC.H

```
#define BAUD_INTERNAL_COMPARE(X) ((unsigned short int)((CPU_CLOCK/(8L*(X)))-1L))

#define S16450_COMPARE  3L
#define S16450_CLOCK    ((CPU_CLOCK)/(8L*S16450_COMPARE))

#define BAUD_16450_DIVISOR(X) ((unsigned short int)(S16450_CLOCK/(16L*(X))))

/*
 * offsets from the Serial port base register to the various
 * function registers.
 */

#define DLL 0      /* Divisor Latch Lsb                 */
#define DLM 1      /* Divisor Latch Msb                 */
#define RBR 0      /* Receive Buffer Register           */
#define THR 0      /* Transmitter Holding Register      */
#define IER 1      /* Interrupt Enable Reg              */
#define IIR 2      /* Interrupt Identification Reg      */
#define LCR 3      /* Line Control Reg                  */
#define MCR 4      /* Modem Control Reg                 */
#define LSR 5      /* Line Status Reg                   */
#define MSR 6      /* Modem Status Reg                  */

#ifdef NUM_BAUDS
#undef NUM_BAUDS
#endif

#define NUM_BAUDS    5       /* number of different baud rates supported */

#define P_EVEN    0x18    /* serial port control bits */
#define P_ODD     0x08
#define P_NONE    0x00
#define P_MARK    0x28
#define P_SPACE   0x38
#define P_MASK    0x38

#define STOP_1    0x00
#define STOP_2    0x04
#define STOP_MASK 0x04

#define BITS_7    0x02
#define BITS_8    0x03
#define BITS_MASK 0x03

#define BREAK_ON  0x40
```

File: include\SERIAL.H

```
/*****************************************************************

  This code (c) Copyright 1992  by
      and designed by
              Research In Motion Limited
              Technology Business Park
              180 Columbia Street West
              Waterloo, Ontario
              N2L 3L3
        Phone: (519) 888-7465
          FAX: (519) 888-6906

  Author:      Michael A. Barnstijn

  Date created:   September 1990

  Description:
        Definitions for the Mobitex timing function scheduling
        system for MobiLib-Plus

  Change History:
        14 May 1992            Release cleanup

*****************************************************************/

/* the three possible "activities" passed to an activated timing
 * function.  The value is passed as the second argument to the
 * timing function, the first being the timer's handle number.
 */
#define T_EXPIRED     0
#define T_CLEARED     1
#define T_DELETED     2

/* function prototypes */

/* install/remove */
void MinstallTimingSystem(void);
void MremoveTimingSystem(void);

/* add/delete/clear and set timers */
int MaddTimer(long (*function)(int,int),long timingValue);
int MdelTimer(int timerHandle,int activity);
int MclrTimer(int timerHandle,int activity);
int MsetTimer(int timerHandle,long timerValue);
int MsetTimerUserWord(int timerHandle, int newValue);

void Mdelay(long millisecondDelayValue);

/* timer activity check */
int MisTimerIdle(int timerHandle);

/* system functions: get and set microprocessor flags,
 * and get-flags+clear-interrupts
 */
short int far getUPflags(void);
     void far setUPflags(unsigned short int flags);
short int far getUPflagsAndCLI(void);

/* low-level locking/unlocking functions for the PC MS-DOS environment */
 int MsetLock(volatile int *pLock,int value);
 int MincLock(volatile int *pLock);
 int MdecLock(volatile int *pLock);
 int MgrabLock(volatile int *pLock);
void MfreeLock(volatile int *pLock);

/* this is incremented at each timer tick */
extern volatile unsigned long int far globalClock;
```

```
        case LINK_OPEN_TRYING :
            if ( nOpenLinkConnection(WHATSTATE) == RETRY_PAUSE )
            {
                if ( nLinkOpenTimeout == TRUE )
                {
                    nOpenLinkConnection(START);
                }
            }
            break;

        case LINK_RESTART_REQUESTED :
            nOpenLinkConnection(RESTART);
            break;

        case LINK_OPEN_COMPLETED :
            fReturnValue = TRUE;
            break;
        }
    return( fReturnValue );
    }


/****************************************

        nOpenLinkConnection     Run the LINK layer initialization state machine

  USAGE:        status = nOpenLinkConnection(Init_command command)
                int status;

  DESCRIPTION:  Starts/runs/restarts the LINK layer initialization
                state machine.  Returns a completion/error/in-progress
                status value.

  INPUTS:       command:
                RESTART         start without autobaud
                START           start with autobaud
                RUN             run link open system
                WHATSTATE       determine current state
                LASTSTATUS      determine last return status

  OUTPUTS:      status value:
                LINK_OPEN_TRYING        The initialization is not yet done.
                LINK_INOPERATIVE        Unable to establish a link.
                LINK_IS_LOOPED_BACK     We seem to be talking to ourselves.
                LINK_RESTART_REQUESTED  The link wants to restart the init.
                LINK_OPEN_COMPLETED     The link has been established.

  SIDE-EFFECTS:   Many

  WARNINGS:       NONE

****************************************/
static int
nOpenLinkConnection(Init_command command)
    {
    static int nReturnValue = LINK_OPEN_TRYING;
    static int nSize,nInterval,nAvailable;

    switch ( command ) {
        case RESTART :
        case START :
            vSetInitTimer(TIMER_RESET);
            nAutoBaudRadio( -2 );   // turn off AutoBauding, if it was active
            fLinkConnected = FALSE;
            nTransmitStatus = TX_IF_NONE;
            if ( fAllowRadioAutobauding && command == START )
            {
                nAutoBaudRadio(-1);             // start the auto baud system
                nLinkOpenState = DO_AUTOBAUD;
            }
            else if ( command == RESTART )
            {
                nLinkOpenState = SENDING_FP;
                //nLinkOpenTimeout = TRUE;        // force "F P" transmit
            }
            else
            {
                nLinkOpenState = SEND_BFRAME;
            }
            fGotFPframe = FALSE;
            fGotFQframe = FALSE;
            MsetLock(&nNetAvailable,0);    // set the "F F"/"F G" counter
            break;

        case RUN :
            break;

        case WHATSTATE :
            return( nLinkOpenState );

        case LASTSTATUS :
        default:
            return( nReturnValue );
        }

    nReturnValue = LINK_OPEN_TRYING;      // assume we're still trying!

    switch ( nLinkOpenState ) {
        case LINK_IDLE_CLOSED :
        case RETRY_PAUSE :
            break;

        default :
            nLinkOpenState = DO_AUTOBAUD;

        case DO_AUTOBAUD :
            switch ( nAutoBaudRadio( 0 ) ) {
                default :       /* some weird kind of error */
                    DEBUG_PRINTF((CSstr"LINK autobaud returned bad value.\n"));
                    break;
                case -2 :       /* no timer handles... try the normal way   */
                    DEBUG_PRINTF((CSstr"LINK autobaud no timer handles.\n"));
                    break;
                case -1 :       /* couldn't autobaud, try original settings */
```

```
                DEBUG_PRINTF((CSstr"LINK autobaud failed.\n"));
                break;
            case 0 :        /* still trying to autobaud */
                return( nReturnValue );       /* keep trying */
            case 1 :        /* original settings were correct */
                DEBUG_PRINTF((CSstr"LINK autobaud at original settings.\n"))
;
                break;
            case 2 :        /* we've got new settings        */
                DEBUG_PRINTF((CSstr"LINK autobaud with new settings.\n"));
                break;
            }
        nLinkOpenState = SEND_BFRAME;
        break;

    case SEND_BFRAME :
        vGetBframeValues(&nSize, &nInterval);
        nTransmitStatus = TX_IF_NONE;
        if ( sendCmdB(vIFtransmitCallback,nSize,nInterval,TRUE) != TX_IF_WAI
TING ) {
            DEBUG_PRINTF((CSstr"LINK B frame failed to send.\n"));
            nLinkOpenState = INOPERATIVE;
            vOpenFailed();
            }
        else {
            DEBUG_PRINTF((CSstr"LINK B frame is sending.\n"));
            nLinkOpenState = CHECK_BFRAME;
            }
        break;

    case INOPERATIVE :
        nReturnValue = LINK_INOPERATIVE;
        break;

    case LOOPBACK :
        nReturnValue = LINK_IS_LOOPED_BACK;
        break;

    case CHECK_BFRAME :
        switch ( nTransmitStatus ) {
            case TX_IF_FAILED :
                DEBUG_PRINTF((CSstr"LINK B frame send error.\n"));
                nLinkOpenState = INOPERATIVE;
                vOpenFailed();
                break;

            default :
                break;

            case TX_IF_DONE :
                DEBUG_PRINTF((CSstr"LINK B frame sent.\n"));
                nLinkOpenState = SENDING_FP;
                vSetInitTimer(TIMER_RESET);
                break;
            }
        break;

    case SENDING_FP :
        if ( fGotFPframe ) {
            DEBUG_PRINTF((CSstr"Already received FP frame, not requesting ag
ain.\n"));
            nLinkOpenState = WAITING_MAN;
            break;
            }

        if ( nLinkOpenTimeout == UNUSED ) {
            DEBUG_PRINTF((CSstr"LINK Sending FP: started 3 second timer.\n")
);
            vSetInitTimer(PRESEND_DELAY);
            break;
            }
        if ( nLinkOpenTimeout == FALSE )
            break;

        // ask for our MAN number
        nTransmitStatus = TX_IF_NONE;
        if ( sendCmdFx(vIFtransmitCallback,'P') != TX_IF_WAITING ) {
            DEBUG_PRINTF((CSstr"LINK failed to send FP frame.\n"));
            nLinkOpenState = INOPERATIVE;
            vOpenFailed();
            break;
            }
        nLinkOpenState = WAITING_FP_SENT;
        break;

    case RESTART_REQ :
        nReturnValue = LINK_RESTART_REQUESTED;
        break;

    case WAITING_FP_SENT :
        switch ( nTransmitStatus ) {
            case TX_IF_FAILED :
                DEBUG_PRINTF((CSstr"LINK FP frame send error.\n"));
                nLinkOpenState = INOPERATIVE;
                vOpenFailed();
                break;

            default:
                break;

            case TX_IF_DONE :
                DEBUG_PRINTF((CSstr"LINK sent FP frame.\n"));
                nLinkOpenState = WAITING_MAN;
                vSetInitTimer(MAN_REPLY_WAIT_TIME);
                break;
            }
        break;

    case WAITING_MAN :
        if ( fGotFPframe ) {
            vSetInitTimer(DEVICE_ID_WAIT_TIME);
            nLinkOpenState = WAITING_FQ;
            DEBUG_PRINTF((CSstr"LINK got FP response frame.\n"));
            }
```

```
#include "basetype.h"
#include "enums.h"
#include "mobilib.h"
#include "timing.h"
#include <stdlib.h>
#include <memory.h>
#include "debug.h"

extern void *our_malloc( unsigned int size, Tmempool pool );
extern void our_free( void *pointer );
extern int nMLgetMemoryPool(void *pointer);
extern void vMobiMemFree (unsigned long * pdwTotal, unsigned long * pdwUsed);

static int ml_malloc_count = 0;
static long int lTXpool, lTXusedLimit;

void
vMLpoolInit(char *sMemoryInitString)
{
    lTXpool = lTXusedLimit = 0L;
}

void *
ml_malloc( unsigned int size, Tmempool pool )
{
    char *temp;
    long int lValue;

    if ( lTXusedLimit == 0L )
    {
        vMobiMemFree(&lValue,NULL);
        lTXusedLimit = (lValue * 9L)/10L;
    }
    if ( pool == TX_POOL )
    {
        vMobiMemFree(NULL,&lValue);
        if ( lValue > lTXusedLimit )
            return( (void *)NULL );

    }
    temp = our_malloc( size, pool );

    return( (void *)temp );
}

void
ml_free( void *pointer )
{
    our_free( pointer );
}

static boolean fRefDisplay = FALSE;
static char *sLastMallocSource = "NONE";
static int nLastMallocLine = -1;
static char *sLastFreeSource = "NONE";
static int nLastFreeLine = -1;

boolean
fSetMemRefDisplay(int nSet)
{
    boolean retval = fRefDisplay;
    if ( nSet >= 0 )
        fRefDisplay = (boolean)nSet;
    return( retval );
}

void
vShowLastMemRefs(void)
{
    DEBUG_PRINTF(("Last MMalR: %s/%d\n",sLastMallocSource,nLastMallocLine));
    DEBUG_PRINTF(("Last MFrR:  %s/%d\n",sLastFreeSource,nLastFreeLine));
}

void *
ml_malloc_ref( unsigned int size, Tmempool pool, char * source, int linenum )
{
    if ( fRefDisplay )
        DEBUG_PRINTF(("MMalR: %s/%d\n",source,linenum));
    sLastMallocSource = source;
    nLastMallocLine = linenum;
    return ( ml_malloc( size, pool ) );
}

void
ml_free_ref( void * pointer, char * source, int linenum )
{
    if ( fRefDisplay )
        DEBUG_PRINTF(("MFrR: %s/%d\n",source,linenum));
    sLastFreeSource = source;
    nLastFreeLine = linenum;
    ml_free( pointer );
}
```

```
#include <stdio.h>
#include <stdlib.h>
#include <dos.h>

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

#include "basetype.h"
#include "mobilib.h"
#include "access.h"
#include "a_protos.h"
#include "at.h"
#include "scc.h"
#include "baud.h"
#include "conio.h"
#include "eeprom.h"
#include "debug.h"
#include "timing.h"

#define AUTOBAUD_DELAY_TIME     5000L   // 5 seconds


// this is a reasonable search list.
// look at parities in the order none-even-odd.
//     (with the exception of 9600-7-e-1, which is the
//      most favoured Ericsson Factory Default.)
//
// Assume that if we send 8-bit then it is always NO parity.
//                  send 7-bit then it is always EVEN or ODD parity
//
// We allow for 19200 baud before switching to lower speeds from
// 9600 down to 1200.

static commsetting aut[] =
  {
    BUILD_COM(  9600, 7, EVEN, 1, TRUE ),   // This is the most common setting!
    BUILD_COM(  9600, 8, NONE, 1, TRUE ),
    BUILD_COM(  9600, 7, ODD,  1, TRUE ),
    BUILD_COM( 19200, 8, NONE, 1, TRUE ),
    BUILD_COM( 19200, 7, EVEN, 1, TRUE ),
    BUILD_COM( 19200, 7, ODD,  1, TRUE ),
    BUILD_COM(  4800, 8, NONE, 1, TRUE ),
    BUILD_COM(  4800, 7, EVEN, 1, TRUE ),
    BUILD_COM(  4800, 7, ODD,  1, TRUE ),
    BUILD_COM(  2400, 8, NONE, 1, TRUE ),
    BUILD_COM(  2400, 7, EVEN, 1, TRUE ),
    BUILD_COM(  2400, 7, ODD,  1, TRUE ),
    BUILD_COM(  1200, 8, NONE, 1, TRUE ),
    BUILD_COM(  1200, 7, EVEN, 1, TRUE ),
    BUILD_COM(  1200, 7, ODD,  1, TRUE ),
    BUILD_COM(  9600, 8, NONE, 2, TRUE ),
    BUILD_COM(  9600, 7, EVEN, 2, TRUE ),
    BUILD_COM(  9600, 7, ODD,  2, TRUE ),
    BUILD_COM( 19200, 8, NONE, 2, TRUE ),
    BUILD_COM( 19200, 7, EVEN, 2, TRUE ),
    BUILD_COM( 19200, 7, ODD,  2, TRUE ),
    BUILD_COM(  4800, 8, NONE, 2, TRUE ),
    BUILD_COM(  4800, 7, EVEN, 2, TRUE ),
    BUILD_COM(  4800, 7, ODD,  2, TRUE ),
    BUILD_COM(  2400, 8, NONE, 2, TRUE ),
    BUILD_COM(  2400, 7, EVEN, 2, TRUE ),
    BUILD_COM(  2400, 7, ODD,  2, TRUE ),
    BUILD_COM(  1200, 8, NONE, 2, TRUE ),
    BUILD_COM(  1200, 7, EVEN, 2, TRUE ),
    BUILD_COM(  1200, 7, ODD,  2, TRUE ),
  };

int volatile fAutobaudTimeout = FALSE;
int volatile nAutobaudRXstate = 0;
int volatile fAutobaudTXdone  = FALSE;
static int thTest = -1;

#ifndef COM
extern long radioDefaults;
extern void writeEEPROM( int loc, unsigned data );
#else
extern int ML1serPort;
#endif

extern void Mdelay( long mseconds );
extern long ML1setCommSettings( int port, long settings);
extern long ML1getCommSettings( int port );
extern boolean fDelayAutobaud(void);
extern void vSetDelayAutobaud( boolean fDelayAutobaud );
extern void vSendDebugString( char *s );

static long lAutoBaudTimer( int handle, int action);
static int  nTestBaudrate(int command);

static boolean fAutoBauding = FALSE;
static boolean fDelayOurAutobauding = FALSE;

boolean
fAreWeAutoBauding(void)
{
    if ( fDelayOurAutobauding )
        return( FALSE );
    return( fAutoBauding );
}
```

```
/**************************************************************

      nAutoBaudRadio          autobaud the radio link

 USAGE:          int status, command;
                 status = nAutoBaudRadio(command);

 DESCRIPTION:

      This function tests the baud rate, parity,
      data bits and stop bit settings for the
      link to the radio.  It does so by transmitting
      a RACK MASC frame to the radio, and then waiting
      for a ACK response.

 INPUTS: command:
             -1      start the state machine
              0      run the state machine
              1      return the state machine state value.
              2,     return the last return value

 OUTPUTS:        Returns an integer status value:

             -2 Unable to install timer for baud rate test function.

             -1 Radio never responded properly to any of the attempts.

              0 Still attempting to communicate with the radio

              1 Radio responded with ACK at original settings

              2 Radio responded with ACK at new settings


 SIDE EFFECTS:

      Transmits data to the RADIO link.

 WARNINGS:

      If the radio is not responding, we should not
      initialize LINK and NETWORK at all.  This implies
      that we should be able to RESTART the initialization.

**************************************************************/
int
nAutoBaudRadio(int command)
{
    static int state = -1;
    static int retval = 0;
    static int testSelect;

    static long oldSettings = -1L;
    static long newSettings, newSet;

    switch ( command )
    {
```

```
        case -2 :       // reset (stop) autobauding.
            fAutoBauding = FALSE;
            nTestBaudrate(-2);    /* remove the timer */
            state = 1;
            return( retval = -1 );
            break;

        case -1 :
#ifndef COM
            oldSettings = ML1getCommSettings( RADIO );
#else
            oldSettings = ML1getCommSettings( ML1serPort );
#endif

            fDelayOurAutobauding = FALSE;   // set the default condition

            newSettings = oldSettings;   // for use below

            DEBUG_NOTIFY((CSstr "ABcomm %x, %d ", oldSettings ));

            testSelect = -1;

            state = 0;

            fDelayOurAutobauding = fDelayAutobaud();

            if ( nTestBaudrate(-1) < 0 )
            {
                fAutoBauding = FALSE;
                fDelayOurAutobauding = FALSE;
                V_SEND_DEBUG_STRING("AutoBaud: no timer.\r\n");
                return( retval = -2 );
            }

            fAutoBauding = TRUE;

            V_SEND_DEBUG_STRING("AutoBaud: started. Old =");
#ifdef VDEBUG
            {
                char buf[20];
                mlsprintf(buf,"%08lX\r\n",oldSettings);
                V_SEND_DEBUG_STRING(buf);
            }
#endif

            if ( fDelayOurAutobauding )
            {
                // we delay autobauding ONLY on the first try!
                V_SEND_DEBUG_STRING("AutoBaud: delay 5 seconds.\r\n");
                if ( thTest < 0 )
                {
                    V_SEND_DEBUG_STRING("         bad timer!\r\n");
                }
                else
                {
                    V_SEND_DEBUG_STRING("         timer OK\r\n");
                }
```

```
                vSetDelayAutobaud( FALSE );     // turn off delay from now on
                // use our local timer, which has just been cleared...
                MsetTimer(thTest,AUTOBAUD_DELAY_TIME);
                fAutobaudTimeout = FALSE;
            }
            else
            {
                V_SEND_DEBUG_STRING("AutoBaud: no 5 second delay.\r\n");
            }
            break;

        case 0 :
            break;

        case 1 :
            return( state );

        default :
        case 2 :
            return( retval );
    }

    retval = 0;     /* default return value */


    if ( fDelayOurAutobauding )
    {
        if ( fAutobaudTimeout )
        {
            V_SEND_DEBUG_STRING("AutoBaud: 5 second delay timeout.\r\n");
            MclrTimer( thTest, T_CLEARED );
            fAutobaudTimeout = FALSE;
            fDelayOurAutobauding = FALSE;
        }
        else
            return( retval );
    }

    switch ( state )
    {
        default :
            state = -1;
        case -1 :
            return( retval );

        case 0 :
            switch ( nTestBaudrate(0) )
            {
                default :
                case -1 :
                    break;          /* failed, try next setting */

                case 0 :
                    return( retval );     /* still trying */

                case 1 :
#ifndef COM
                    if( testSelect >= 0 ) /* we're not using the original */
                    {
#ifndef HMPC
                        writeEEPROM( RADIO_DEFAULTS, BAUD_RATE(aut[testSelect])
);
                        writeEEPROM( RADIO_DEFAULTS+1, (int)newSettings );
#endif
                    }
#endif
                    nTestBaudrate(-2);    /* remove the timer */

                    fAutoBauding = FALSE;

                    state = 1;
                    if ( testSelect < 0 )
                        return( retval = 1 ); /* success at original settings */


                    #ifdef VDEBUG
                    {
                        char buf[40];
                        mlsprintf(buf,"AutoBaud: new settings = %08lX\r\n",
                                newSettings);
                        V_SEND_DEBUG_STRING(buf);
                    }
                    #endif

                    return( retval = 2 );     /* success at new settings */
                }
                break;

            case 1 :
                if ( testSelect < 0 )
                    return( retval = 1 ); /* success at original settings */
                return( retval = 2 );     /* success at new settings */

            case 2 :
                return( retval = -1 );
        }

        ++testSelect;    /* try the next setting */

        DEBUG_NOTIFY((CSstr "ABR%d ", testSelect ));

        if ( testSelect >= sizeof(aut)/sizeof(commsetting) )
        {
            /* failed to communicate with the radio, restore settings */
#ifndef COM
            newSet=ML1setCommSettings( RADIO, oldSettings );
#else
            newSet=ML1setCommSettings( ML1serPort, oldSettings );
#endif

            DEBUG_NOTIFY((CSstr"ABnone:%x, %d ", newSet ));

            fAutoBauding = FALSE;
```

```
        state = 2;      /* done, return error value */
        nTestBaudrate(-2);    /* remove the timer */
        return( retval = -1 );
    }

    state = 0;      /* reset local state machine to keep trying */

    /* generate new settings */
    newSettings = aut[testSelect];

    /* change ACCESS layer settings */
#ifndef COM
    newSet=ML1setCommSettings( RADIO, newSettings );
#else
    newSet=ML1setCommSettings( ML1serPort, newSettings );
#endif

    DEBUG_NOTIFY((CSstr"ABtry:%x,%d ", newSet ));

    nTestBaudrate(-1);    /* reset the test state machine */

    return( retval );
}

/*
**
** Called by LINK LAYER System Driver if the locally
** declared function "fAreWeAutoBauding()" returns TRUE
**
*/

void
vAutoBaudHandler(unsigned int uAccessFlags)
{
    int c;
    static unsigned int uOldFlags = 0;

    DEBUG_NOTIFY((CSstr"~"));

    if ( fDelayOurAutobauding )     // don't do anything until not delayed
    {                               // but remember the access flags that
        uOldFlags |= uAccessFlags;  // were passed into us.
        V_SEND_DEBUG_STRING(".");
        return;
    }
    else if ( uOldFlags )
    {
        uAccessFlags |= uOldFlags;
        uOldFlags = 0;
    }

    V_SEND_DEBUG_STRING(",");

    do
    {
        /* has a block completed transmitting?  If so, handle it */
        if ( uAccessFlags & A_TX_DONE )
```

```
        {
            uAccessFlags &= ~A_TX_DONE;
            nAutobaudRXstate = 1;
            fAutobaudTXdone  = TRUE;
            fAutobaudTimeout = FALSE;
            V_SEND_DEBUG_STRING("ABH: 1/3\r\n");
            MsetTimer(thTest,333L); /* 1/3 second timer for response */

            DEBUG_NOTIFY((CSstr "ABwait " ));

        }

        /* did we receive a byte?  If so, handle it */
        if ( uAccessFlags & A_RX_GOT_CHAR )
        {
            uAccessFlags &= ~A_RX_GOT_CHAR;

            DEBUG_NOTIFY((CSstr "ABrec " ));

            while ( ( c = ML1getByte() ) >= 0 )
            {
                switch ( nAutobaudRXstate )
                {
                    default :
                        nAutobaudRXstate = 0;
                    case 0 :
                        break;
                    case 1 :
                        if ( c == '^' ) /* first char of a ACK */
                            nAutobaudRXstate = 2;
                        break;
                    case 2 :
                        if ( c == '*' ) /* second char of ACK  */
                            nAutobaudRXstate = 3;
                        else
                            nAutobaudRXstate = 1;  /* try again */
                        break;
                    case 3 :
                        if ( c == '0' || c == '1' || c == '-' )
                            nAutobaudRXstate = 4;       /* third char of ACK */
                        else
                            nAutobaudRXstate = 1;  /* try again */
                        break;
                    case 4 :
                        if ( c == '\r' )        /* we got a complete ACK! */
                        {
                            V_SEND_DEBUG_STRING("ABH: clr\r\n");
                            MclrTimer( thTest, T_CLEARED );
                            fAutobaudTimeout = FALSE;
                            nAutobaudRXstate = 5;
                        }
                        else
                            nAutobaudRXstate = 1;  /* try again */
                        break;
                    case 5 :
                        break;
                }
```

```
            }
        }

        // if there was a receive overflow, set the local flag

        if ( uAccessFlags & A_RX_OVERFLOW )
        {
            uAccessFlags &= ~A_RX_OVERFLOW;
            DEBUG_NOTIFY((CSstr "ABrxo " ));
            nAutobaudRXstate = 0;
        }
    }
    while ( (uAccessFlags |= ML1getAccessState()) != 0 );
}
```

```
/*********************************************************

      nTestBaudrate         check the radio link

  USAGE:          int status,command;
                  status = nTestBaudrate(command);

  DESCRIPTION:

      This function is a state machine which sends
      a RACK to the RADIO link and waits for an ACK
      (up to a 1/4 second timeout).

  INPUTS: command:
              -1      start the state machine
               0      run the state machine
               1      return the state machine state value.
               2      return the last return value

  OUTPUTS:        Returns an integer status value:

              -1:     no response received
               0:     state machine is running
               1:     received a proper ACK response
  SIDE EFFECTS:

      May transmit data to the RADIO link.

*********************************************************/
static int
nTestBaudrate(int command)
{
    static int state = -1;
    static int retval = 0;

    switch ( command )
    {
        case -2 :       /* reset the timer */
            if ( thTest >= 0 )
            {
                V_SEND_DEBUG_STRING("TBR: del\r\n");
                MdelTimer(thTest,T_DELETED);
                DEBUG_NOTIFY((CSstr"ABdel " ));
            }
            thTest = -1;
            return( 0 );

        case -1 :
            state = 0;
            if ( thTest < 0 )
            {
                thTest = MaddTimer(lAutoBaudTimer,0L);
                DEBUG_NOTIFY((CSstr "AB%d ", thTest ));
                if ( thTest < 0 )
                {
                    V_SEND_DEBUG_STRING("TBR: add\r\n");
                    return( retval = -1 );
```

```
            }
            else
            {
                V_SEND_DEBUG_STRING("TBR: add\r\n");
            }
        }
        MclrTimer(thTest,T_CLEARED);
        fAutobaudTimeout = FALSE;
        DEBUG_NOTIFY((CSstr "ABc\n" ));
        break;

    case 0 :
        break;

    case 1 :
        return( state );

    default :
    case 2 :
        return( retval );
}

retval = 0;     /* state machine is still running */

if ( fDelayOurAutobauding )
    return( retval );       // don't do anything until not delayed

if ( fAutobaudTimeout )
{
    state = -1;
    nAutobaudRXstate = 0;
    V_SEND_DEBUG_STRING("TBR: failed\r\n");
    return( retval = -1 );   /* failed to transmit */
}

V_SEND_DEBUG_STRING("+");

switch ( state )
{
    default :
        state = -1;
        V_SEND_DEBUG_STRING("TBR: -> -1\r\n");

    case -1 :
        return( retval = -1 );

    case 0 :
        fAutobaudTXdone = FALSE;
        DEBUG_NOTIFY((CSstr"ABsend " ));
        V_SEND_DEBUG_STRING("TBR: tx\r\n");
        ML1putBlock((void far *)"\000^!\r",4);
        state = 1;
        break;

    case 1 :
        if ( !fAutobaudTXdone )
            break;
```

```
        state = 2;

    case 2 :
        if ( nAutobaudRXstate == 0 )
        {
            state = -1;
            retval = -1;    /* failed to receive properly */
            break;
        }

        if ( nAutobaudRXstate != 5 )
            break;

        state = 3;

    case 3 :
        retval = 1;     /* state machine done; proper reply received */
        break;
    }
    return( retval );
}
```

```
static long
lAutoBaudTimer(int handle, int activity)
{
    DEBUG_NOTIFY((CSstr "ABto " ));
    if( activity == T_CLEARED || activity == T_DELETED )
    {
        V_SEND_DEBUG_STRING("ABT: clr or del\r\n");
        fAutobaudTimeout = FALSE;
    }
    else if( activity == T_EXPIRED )
    {
        V_SEND_DEBUG_STRING("ABT: expy\r\n");
        fAutobaudTimeout = TRUE;
    }
    return( 0L );
}
```

File: src\AUTOBAUD.C

```
#include "basetype.h"
#include "link.h"
#include "ldefines.h"
#include "lprotos.h"

enum {
    START_LINK_CLOSE,
    RUN_LINK_CLOSE,
    CHECK_LINK_CLOSE_STATUS
    };

enum {
    LINK_NOT_CLOSED,
    LINK_CLOSE_FAILED,
    LINK_CLOSED,
    LINK_CLOSE_SEND_FO,
    LINK_CLOSE_WAIT_FOR_FO_DONE,
    LINK_CLOSE_WAIT_FOR_RX_FO,
    LINK_CLOSE_WAIT_FOR_RX_FO_ACK
    };

static volatile boolean fRequestClose = FALSE;
static volatile boolean fReceivedFO = FALSE;
static volatile int nCloseTransmitStatus;
static volatile int nCloseState = LINK_CLOSED;
static volatile boolean fSentCloseACK = FALSE;

static void vCloseCallback(int nTransmitStatus);
static int nHandleLinkClose(int nCommand);

boolean
fInstallLinkCloseModule(void)
    {
    fRequestClose = FALSE;
    fReceivedFO = FALSE;
    nCloseTransmitStatus;
    nCloseState = LINK_CLOSED;
    fSentCloseACK = FALSE;
    return(TRUE);
    }

boolean
fRemoveLinkCloseModule(void)
    {
    fRequestClose = FALSE;
    fReceivedFO = FALSE;
    nCloseTransmitStatus;
    nCloseState = LINK_CLOSED;
    fSentCloseACK = FALSE;
    return(TRUE);
    }

/****************************************

       ML2vCloseLinkLayer   sends the machine-interface shutdown sequence

  USAGE:          ML2vCloseLinkLayer();

  DESCRIPTION:

  INPUTS:         NONE

  OUTPUTS:        NONE

  SIDE-EFFECTS:   Many

  WARNINGS:       NONE

****************************************/
void
ML2vCloseLinkLayer(void)
    {
    if ( nCloseState == LINK_CLOSED ) {
        vNetworkNotify(NFY_LINK_CLOSED);
        return;
        }
    fRequestClose = TRUE;
    }

void
vReceivedLinkClose(void)
    {
    fReceivedFO = TRUE;
    vSetLinkNotOpen();

    if ( fIsLinkClosing() )
        return;
    }

boolean
fIsLinkClosing(void)
    {
    if ( fRequestClose ) {
        nHandleLinkClose(START_LINK_CLOSE);
        fRequestClose = FALSE;
        }

    if ( nCloseState == LINK_NOT_CLOSED ||
         nCloseState == LINK_CLOSED ||
         nCloseState == LINK_CLOSE_FAILED )
        return(FALSE);
    return( TRUE );
    }

void
vRunLinkClose(void)
    {
    nHandleLinkClose(RUN_LINK_CLOSE);
    }

void
vSetLinkNotClosed()
    {
    fRequestClose = FALSE;
```

```
    nCloseState = LINK_NOT_CLOSED;
    }

static void
vCloseCallback(int nTransmitStatus)
    {
    nCloseTransmitStatus = nTransmitStatus;
    }

void
vCloseWasACKed(void)
{
    fSentCloseACK = TRUE;
}

static int
nHandleLinkClose(int nCommand)
    {
    switch ( nCommand ) {
        case START_LINK_CLOSE :
            nCloseState = LINK_CLOSE_SEND_FO;
            fRequestClose = FALSE;
            nCloseTransmitStatus = TX_IF_NONE;
            fReceivedFO = FALSE;
            break;

        default :
        case RUN_LINK_CLOSE :
            break;

        case CHECK_LINK_CLOSE_STATUS :
            return(nCloseState);

        }
    switch ( nCloseState ) {
        case LINK_NOT_CLOSED :
            break;

        case LINK_CLOSE_FAILED :
            break;

        case LINK_CLOSED :
            break;

        case LINK_CLOSE_SEND_FO :
            if ( !fIsLinkOpen() ) {
                nCloseState = LINK_CLOSED;
                vNetworkNotify(NFY_LINK_CLOSED);
                break;
                }

            nCloseTransmitStatus = TX_IF_NONE;
            // send a shutdown command
            if ( sendCmdFx(vCloseCallback,'O') != TX_IF_WAITING ) {
                nCloseState = LINK_CLOSE_FAILED;
                vNetworkNotify(NFY_LINK_CLOSED);
                break;
                }
            nCloseState = LINK_CLOSE_WAIT_FOR_FO_DONE;
            fSentCloseACK = FALSE;
            break;

        case LINK_CLOSE_WAIT_FOR_FO_DONE :
            switch ( nCloseTransmitStatus ) {
                default :
                    break;

                case TX_IF_DONE :
                    nCloseState = LINK_CLOSE_WAIT_FOR_RX_FO;
                    break;

                case TX_IF_FAILED :
                    nCloseState = LINK_CLOSE_FAILED;
                    vNetworkNotify(NFY_LINK_CLOSED);
                    break;
                }
            break;

        case LINK_CLOSE_WAIT_FOR_RX_FO :
            if ( fReceivedFO || !fIsLinkRadio() )
                nCloseState = LINK_CLOSE_WAIT_FOR_RX_FO_ACK;
            break;

        case LINK_CLOSE_WAIT_FOR_RX_FO_ACK :
            if ( fSentCloseACK )
            {
                nCloseState = LINK_CLOSED;
                vSetLinkNotOpen();
                vNetworkNotify(NFY_LINK_CLOSED);
            }
            break;
        }
    return( nCloseState );
    }
```

```
#include <string.h>

#include "basetype.h"
#include "link.h"
#include "ldefines.h"
#include "lprotos.h"
#include "timing.h"
#include "debug.h"

static volatile int fGotFPframe            = FALSE;
static volatile int fGotFQframe            = FALSE;
static volatile MAN mLinkMANnumber         = -1L;
static volatile int nNetAvailable          = 0;
static volatile InitState nLinkOpenState   = INOPERATIVE;
static volatile int nLinkOpenTimeout       = UNUSED;
static volatile int thLinkOpenTimer        = -1;
static volatile int nTransmitStatus        = TX_IF_NONE;
static char sConnectionType[11]            = "???";
static volatile boolean fLinkRadio         = TRUE;
static volatile boolean fLinkOpenRequested = FALSE;
static boolean fSendOpenNotify             = FALSE;
static boolean fLinkConnected              = FALSE;
static boolean fAllowRadioAutobauding      = FALSE;
static boolean fDelayRadioAutobauding      = FALSE;
static boolean fSendFBrequested            = FALSE;
static boolean fJustDidOpen                = FALSE;

#define LINK_OPEN_RETRY         5000L
#define MAN_REPLY_WAIT_TIME     5000L
#define TIMER_RESET               -1L
#define PRESEND_DELAY           3000L
#define DEVICE_ID_WAIT_TIME     5000L

static int nOpenLinkConnection(Init_command command);
static void vSetInitTimer(long int lMilliseconds);
static long int lInitTimerHandler(int handle,int action);
static void vIFtransmitCallback(int nStatus);
static void vOpenFailed(void);
static void vOpenSucceeded(void);

//
// these are the install/remove function pointers for
// "LINKINST.C" and the ML2installLinkLayer() and
// ML2removeLinkLayer() functions.
//
// They are defined here so that they can
// be different for DTE and DCE libraries,
// and so can include/exclude modules as
// is appropriate for DTE/DCE.
//
boolean (*apffInstallFunctions[])(void) =
{
    fInstallLinkACKmodule,
    fInstallLinkCloseModule,
    fInstallLinkIFmodule,
    fInstallLinkNetNotifyModule,
    fInstallLinkNetRXTXmodule,
    fInstallLinkInterpModule,
    fInstallLinkOpenModule,
    fInstallLinkQueueModule,
    fInstallLinkIdleModule,
    fInstallLinkSENSmodule,
    fInstallLinkDriverModule,
    NULL
};

boolean (*apffRemoveFunctions[])(void) =
{
    fRemoveLinkACKmodule,
    fRemoveLinkCloseModule,
    fRemoveLinkIFmodule,
    fRemoveLinkNetNotifyModule,
    fRemoveLinkNetRXTXmodule,
    fRemoveLinkInterpModule,
    fRemoveLinkOpenModule,
    fRemoveLinkQueueModule,
    fRemoveLinkIdleModule,
    fRemoveLinkSENSmodule,
    fRemoveLinkDriverModule,
    NULL
};

boolean
fInstallLinkOpenModule(void)
{
    if ( thLinkOpenTimer < 0 )
    {
        thLinkOpenTimer = MaddTimer(lInitTimerHandler,0L);
        if ( thLinkOpenTimer < 0 )
            return(FALSE);
        DEBUG_PRINTF((CSstr"Link Open timer installed, handle %d.\n",thLinkOpenT
imer));
    }
    fGotFPframe = FALSE;
    fGotFQframe = FALSE;

    nNetAvailable = 0;
    nLinkOpenState = INOPERATIVE;
    nLinkOpenTimeout = UNUSED;
    nTransmitStatus = TX_IF_NONE;
    strcpy(sConnectionType,"???");
    fLinkRadio = TRUE;
    fLinkOpenRequested = FALSE;
    fSendOpenNotify = FALSE;
    fLinkConnected = FALSE;
    fSendFBrequested = FALSE;
    return(TRUE);
}

boolean
fRemoveLinkOpenModule(void)
{
    if ( thLinkOpenTimer >= 0 )
        MdelTimer(thLinkOpenTimer,T_DELETED);
```

```
    nNetAvailable = 0;
    nLinkOpenState = INOPERATIVE;
    nTransmitStatus = TX_IF_NONE;
    fLinkOpenRequested = FALSE;
    fSendOpenNotify = FALSE;
    fLinkConnected = FALSE;
    fSendFBrequested = FALSE;
    return(TRUE);
}

void
ML2vOpenLinkLayer(void)
{
    if ( !fIsLinkOpening() )
    {
        fSendOpenNotify = TRUE;
        fLinkConnected = FALSE;
        fLinkOpenRequested = TRUE;
    }
    if ( mLinkMANnumber != -1L )
        vNetworkNotify(NFY_LINK_SET_MAN_NUMBER);
}

boolean
fIsLinkOpening(void)
{
    if ( fLinkOpenRequested )
    {
        fLinkOpenRequested = FALSE;
        nOpenLinkConnection(START);
    }
    if ( nLinkOpenState != CONNECTED        &&
         nLinkOpenState != INOPERATIVE      &&
         nLinkOpenState != LINK_IDLE_CLOSED &&
         nLinkOpenState != LOOPBACK )
        return(TRUE);
    return(FALSE);
}

void
vSetLinkNotOpen(void)
{
    vOpenFailed();
    nLinkOpenState = LINK_IDLE_CLOSED;
}

void
vStartLinkIdler(void)
{
    vStartIdleTimer();
}

void
vSetIdlerRunning(boolean fRunning)
{
    if ( fRunning )
        vRestartIdler();
    else
        vPauseIdler();
}

char *
sML2getDeviceID(void)
{
    return( sConnectionType );
}

void
vDeviceIDreceived(char *sID)
{
    strncpy( (char *) sConnectionType, sID, 10 );
    sConnectionType[10] = '\0';
    if ( strcmp(sConnectionType,"MCU") == 0 )
        fLinkRadio = TRUE;
    else
        fLinkRadio = FALSE;
    fGotFQframe = TRUE;
}

void
vSetLinkDeviceIdentifier(char *sDeviceID)
{
}

void
vSetLinkMANnumber(MAN MANnumber)
{
    if ( MANnumber != -1L )
    {
        mLinkMANnumber = MANnumber;
        vNetworkNotify(NFY_LINK_SET_MAN_NUMBER);
        DEBUG_PRINTF((CSstr" vSetLinkMANnumber = %lx ",MANnumber));
        fGotFPframe = TRUE;
    }
}

void
vSetAllowAutobaud(boolean fAllowAutobaud)
{
    fAllowRadioAutobauding = fAllowAutobaud;
}

void
vSetDelayAutobaud(boolean fDelayAutobaud)
{
    fDelayRadioAutobauding = fDelayAutobaud;
}

boolean
fDelayAutobaud(void)
{
    return( fDelayRadioAutobauding );
}
```

```
boolean
fIsLinkRadio(void)
{
    return( fLinkRadio );
}

void
vRadioConnect(boolean fSendFB)
{
    if ( nLinkOpenState == CONNECTED )
    {
        if ( MsetLock(&nNetAvailable,1) == 0 )
        {
            vNetworkNotify(NFY_LINK_NET_CONNECTED );
            if ( fSendFB && fJustDidOpen )
                fSendFBrequested = TRUE;
        }
    }
    else
        MincLock(&nNetAvailable);
}

boolean
fIsNetAvailable(void)
{
    if ( nNetAvailable )
        return(fIsLinkOpen());
    return(FALSE);
}

void
vRadioDisconnect(void)
{
    fSendFBrequested = FALSE;
    if ( nLinkOpenState == CONNECTED )
    {
        if ( MsetLock(&nNetAvailable,0) > 0 )
            vNetworkNotify(NFY_LINK_NET_DISCONNECTED );
    }
    else
        MdecLock(&nNetAvailable);
}

boolean
fIsLinkOpen(void)
{
    if ( nLinkOpenState == CONNECTED &&
         fSendFBrequested && fOKtoTransmitIF() )
    {
        fSendFBrequested = FALSE;
        fJustDidOpen = FALSE;
        sendCmdFx(NULL,'B'); //  send an "F B" to go ACTIVE, ignore failure
    }
    return(fLinkConnected);
}
```

File: src\DTE_OPEN.C

```
void
vMANrequestReceived(void)
{
}

boolean
ML2fSetAllowAllOpenNotifies(boolean set)
{
    return(FALSE);
}

MAN
mGetLinkMANnumber(void)
{
    return(mLinkMANnumber);
}

void
vReceivedRestartRequest(void)
{
    vIFtransmitFailed();
    vSetInitTimer(TIMER_RESET);     // turn off the timer
    vOpenFailed();
    nLinkOpenState = RESTART_REQ;
}

void
vLinkBroken( void )
{
    vOpenFailed();
    nLinkOpenState = RETRY_PAUSE;
    nAutoBaudRadio( -2 );   // turn off AutoBauding, if it was active

    vSetInitTimer(LINK_OPEN_RETRY);  // retry the link connection
}

void
vRequestLinkRestart( void )
    {
    vOpenFailed();
    nLinkOpenState = RETRY_PAUSE;
    nAutoBaudRadio( -2 );   // turn off AutoBauding, if it was active
    vSetInitTimer(500L);  // retry the link connection in 0.5 seconds
    }

boolean
fRunLinkStartup(void)
    {
    boolean fReturnValue = FALSE;

    switch ( nOpenLinkConnection(RUN) ) {
        case LINK_INOPERATIVE :
        case LINK_IS_LOOPED_BACK :
            vLinkBroken();
            break;
```

```
            else if ( nLinkOpenTimeout != FALSE ) {
                DEBUG_PRINTF((CSstr"LINK FP request timeout.\n"));
                nLinkOpenState = INOPERATIVE;
                vOpenFailed();
                }
            break;

        case WAITING_FQ :
            if ( fGotFQframe ) {
                DEBUG_PRINTF((CSstr"LINK got FQ frame: is %sradio\n",fLinkRadio?
"":"not "));
                if ( fLinkRadio ) {
                    nTransmitStatus = TX_IF_NONE;
                    if ( sendCmdFx(vIFtransmitCallback,'B') != TX_IF_WAITING ) {

                        DEBUGP(("LINK failed to send FB frame.\n"));
                        nLinkOpenState = INOPERATIVE;
                        vOpenFailed();
                        break;
                        }
                    nLinkOpenState = WAITING_FB_SENT;
                    break;
                    }

                // not a radio -- probably a MOX or MX25
                nLinkOpenState = CONNECTED;
                DEBUG_PRINTF((CSstr"LINK connected.\n"));
                vSetLinkNotClosed();
                vOpenSucceeded();
                nAvailable = MsetLock(&nNetAvailable,0);


                if ( nAvailable >= 0 )  // no "F G",  zero or more "F F"
                {
                    vRadioConnect(FALSE);   // network connect, no "F B"
                }

                nReturnValue = LINK_OPEN_COMPLETED;
                }
            else if ( nLinkOpenTimeout != FALSE ) {
                DEBUG_PRINTF((CSstr"LINK 9 timeout.\n"));
                nLinkOpenState = INOPERATIVE;
                vOpenFailed();
                }
            break;

        case WAITING_FB_SENT :
            switch( nTransmitStatus ) {
                case TX_IF_FAILED :
                    DEBUGP(("LINK failed to send FB frame.\n"));
                    nLinkOpenState = INOPERATIVE;
                    vOpenFailed();
                    break;

                default :
                    break;
```

```
                case TX_IF_DONE :
                    DEBUGP(("LINK sent FB frame; Connected!\n"));
                    nLinkOpenState = CONNECTED;
                    vSetLinkNotClosed();
                    vOpenSucceeded();
                    nAvailable = MsetLock(&nNetAvailable,0);
                    if ( nAvailable >= 0 )    // no "F G",  zero or more "F F"
                    {
                        vRadioConnect(FALSE); // network connect, no "F B"
                    }
                    nReturnValue = LINK_OPEN_COMPLETED;
                    break;
                }
            break;

        case CONNECTED :
            nReturnValue = LINK_OPEN_COMPLETED;
            break;
        }
    return( nReturnValue );
    }

/****************************************

        vSetInitTimer()

  USAGE:  vSetInitTimer(-1); or vSetInitTimer(msecTimeValue);

  DESCRIPTION:    clears the "thLinkOpenTimer" timer and sets "nLinkOpenTimeout"

                  to -1 if the incoming value is less than 0.
                  Otherwise, it starts "thLinkOpenTimer" timer running with
                  the value passed in as the timeout value, and sets
                  "nLinkOpenTimeout" to FALSE.

  INPUTS:         msec:   timeout in milliseconds, or "clear"
                          value if less than zero.

  OUTPUTS:        NONE

  SIDE-EFFECTS:   sets the timeout flag "nLinkOpenTimeout", and
                  affects the timer "thLinkOpenTimer"

  WARNINGS:       NONE

****************************************/
static void
vSetInitTimer(long int lMilliseconds)
    {
    if ( lMilliseconds == TIMER_RESET ) {
        MclrTimer(thLinkOpenTimer,T_CLEARED);
        nLinkOpenTimeout = UNUSED;
        }
    else {
        MsetTimer(thLinkOpenTimer,lMilliseconds);
        nLinkOpenTimeout = FALSE;
```

```
        }
    }
/****************************************

        LInitTimerHandler()

  USAGE:  [timing handler, called by timing system]


  DESCRIPTION:    sets the timeout flag when called with a
                  "T_EXPIRED" status.

  INPUTS:         NONE

  OUTPUTS:        returns 0

  SIDE-EFFECTS:   sets the timeout flag "nLinkOpenTimeout"

  WARNINGS:       NONE

****************************************/
static long int
LInitTimerHandler(int handle,int action)
    {
    if ( action == T_EXPIRED )
        nLinkOpenTimeout = TRUE;
    return(0l);
    }

static void
vIFtransmitCallback(int nStatus)
    {
    nTransmitStatus = nStatus;
    }


static void
vOpenFailed(void)
    {
    vIFtransmitFailed();
    if ( fLinkConnected )
        vNetworkNotify(NFY_LINK_NET_DISCONNECTED);
    vNetworkNotify(NFY_LINK_DISCONNECTED);
    fLinkConnected = FALSE;
    fJustDidOpen = FALSE;
    }

static void
vOpenSucceeded(void)
    {
    if ( fSendOpenNotify ) {
        vNetworkNotify(NFY_LINK_OPENED);
        fSendOpenNotify = FALSE;
        }
    fLinkConnected = TRUE;
    fJustDidOpen = TRUE;
    vNetworkNotify(NFY_LINK_CONNECTED);
    }
```

```
#include "basetype.h"
#include "link.h"
#include "ldefines.h"
#include "lprotos.h"
#include "timing.h"

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

static int thIDLEtimer = -1;
static boolean fIdlerPaused = FALSE;

#define LINK_IDLE_TIMEOUT      12000L  // check the link after 12 seconds
#define LINK_IDLE_RETRY        250L    // retry the check after 1/4 second

static void vIdleCallback( int nStatus );
static long int lIdleLinkTimerHandler(int nHandle, int nAction);
static boolean fSENSenabled = TRUE;

boolean
fInstallLinkIdleModule(void)
    {
    fIdlerPaused = FALSE;
    if ( thIDLEtimer < 0 )
        thIDLEtimer = MaddTimer(lIdleLinkTimerHandler,0L);
    if ( thIDLEtimer < 0 )
        return(FALSE);
    return(TRUE);
    }

boolean
fRemoveLinkIdleModule(void)
    {
    fIdlerPaused = TRUE;
    if ( thIDLEtimer >= 0 )
        MdelTimer(thIDLEtimer,T_DELETED);
    return(TRUE);
    }

void
vSetSENSenable(boolean fNewSetting)
{
    fSENSenabled = fNewSetting;
    if ( !fSENSenabled && thIDLEtimer >= 0 )
    {
        MdelTimer(thIDLEtimer,T_DELETED);
        thIDLEtimer = -1;
    }
}

void
vStartIdleTimer(void)
    {
    if ( !fSENSenabled )
        return;
    MsetTimer(thIDLEtimer,LINK_IDLE_TIMEOUT);
    }

void
vPauseIdler(void)
{
    if ( !fSENSenabled )
        return;
    fIdlerPaused = TRUE;
}

void
vRestartIdler(void)
{
    if ( !fSENSenabled )
        return;
    fIdlerPaused = FALSE;
}

static void
vIdleCallback( int nStatus )
    {
    if ( nStatus == TX_FRAME_FAILED )
         vLinkBroken();  // the link has been broken

    if ( nStatus == TX_FRAME_SENT )
        vStartIdleTimer();      // start it up again
    }

static long int
lIdleLinkTimerHandler(int nHandle, int nAction)
    {
    if ( nAction != T_EXPIRED )
        return(0L);
    V_SEND_DEBUG_STRING("{G");
    if ( fIdlerPaused || !fIsLinkOpen() )
    {
        V_SEND_DEBUG_STRING("G0}");
        return(LINK_IDLE_RETRY);
    }
    if ( nSendSENS(vIdleCallback) < 0 )
    {
        V_SEND_DEBUG_STRING("G1}");
        return(LINK_IDLE_RETRY);
    }
    V_SEND_DEBUG_STRING("G2}");
    return(0L);
    }
```

```
#include "basetype.h"
#include "link.h"
#include "ldefines.h"
#include "lprotos.h"
#include "locks.h"
#include "mobilib.h"
#include "access.h"
#include "debug.h"

SET_LOCK_REF_FILE;

extern boolean (*apffInstallFunctions[])(void);
extern boolean (*apffRemoveFunctions[])(void);

//
//      Return 0 on success,
//             1 to NUM_FUNCS on failure of a particular install
//

int
ML2installLinkLayer(void)
{
    int i,nStatus,nReturnValue = 0;

    int nKey;

    ALLOW_DEBUG(TRUE);
    DEBUG_PRINTF((CSstr"Installing Access Layer\r\n"));
    DEBUG_FLUSH;

    LOCK_EVERYTHING(nKey);

    if( (nStatus=ML1installAccessLayer()) )
    {
        UNLOCK_EVERYTHING(nKey);

        ALLOW_DEBUG(TRUE);
        DEBUG_PRINTF((CSstr"Unable to install access layer, status %d!\n",nStatu
s));
        DEBUG_FLUSH;
        return(-1);
    }

    ALLOW_DEBUG(TRUE);
    DEBUG_PRINTF((CSstr"Access Layer Installed!\r\n"));
    DEBUG_FLUSH;

    for ( i = 0; apffInstallFunctions[i] != NULL; ++i )
        if ( !(*apffInstallFunctions[i])() )
        {
            for ( nReturnValue = i+1, --i; i >= 0; --i )
                (*apffRemoveFunctions[i])();
            break;
        }

    UNLOCK_EVERYTHING(nKey);
    return(nReturnValue);
}

int
ML2removeLinkLayer(void)
{
    int i;
    int nKey;
    LOCK_EVERYTHING(nKey);

    // first find the end of the list
    for ( i = 0; apffInstallFunctions[i] != NULL; ++i )
        ;

    // then remove in reverse order...
    for ( --i; i >= 0; --i )
        (*apffRemoveFunctions[i])();

    ML1removeAccessLayer();

    UNLOCK_EVERYTHING(nKey);
    return(0);
}
```

File: src\LINKINST.C

Page 1    16 JUN 93   08:40 PM

```
#include <string.h>

#include "basetype.h"
#include "link.h"
#include "ldefines.h"
#include "lprotos.h"

static boolean fAllowAutobaud = TRUE;
static boolean fDelayAutobaud = FALSE;
static boolean fDSRsense = FALSE;
static boolean fSENSingEnabled = TRUE;

extern long mlstrtol(char *, char * *, int);

/****************************************

       ML2getLinkLayerParameters

  USAGE:  maxLength = ML2getLinkLayerParameters(NULL);
          ML2getLinkLayerParameters(parms=malloc(maxLength));
          int maxLength; char *parms;

  DESCRIPTION:  Access mechanism for Layer parameter string.
       Can be called to get the maximum length of the parameter
       string, or to get a copy of the string.

       The parameter string has the format:

       "MAN %8ld %s [AUTOBAUD[ OFF| DELAY]]"

       e.g.:   MAN 5000202 MCU               Radio; autobauding enabled
               MAN 1645874 MOX AUTOBAUD OFF  Mox; autobauding disabled
               MAN -1 MCU AUTOBAUD DELAY     Radio; autobauding enabled
                                                    only after the first
                                                    connection attempt
               MAN 5000202 MCU AUTOBAUD      Radio, autobauding enabled

       The MAN number will be -1 if not initialized or if no
       LINK "startup" contact has yet been done.  The string
       value is the link type, which is either "MCU" or "MOX",
       (or "???" if no "startup").  The autobauding setting
       defaults to "ON" unless the string "AUTOBAUD OFF" appears
       somewhere after the MAN number.


  INPUTS:        string: character string pointer.  If NULL,
                         this is a request for the maximum string length.

  OUTPUTS:       0, or   the maximum string length.

  SIDE-EFFECTS:  may "sprintf" into the string area pointed at by "string"

  WARNINGS:      NONE

****************************************/
int
ML2getLinkLayerParameters(char *string)
   {
   if ( string == NULL )
      return(50);

   mlslprintf(string,50,"MAN %8ld %-10s AUTOBAUD %s",
           mGetLinkMANnumber(),
           fIsLinkRadio() ? "MCU" : "MOX",
           (fAllowAutobaud && fIsLinkRadio()) ?
              (fDelayAutobaud ?
                   "DELAY" :
                   "ON"
              ) :
              "OFF"
         );
   return(L_OK);
   }

/****************************************

      ML2setLinkLayerParameters

  USAGE:  status = ML2setLinkLayerParameters(parmString);
          int status; char *parmString;

  DESCRIPTION:  Access mechanism for Layer parameter string.
       Is used to set the link layer parameters PRIOR to
       calling the initialization function "ML2installLinkLayer()".

       The parameter string has the format:
              (see "ML2getLinkLayerParameters()")

       "MAN %8ld %s [AUTOBAUD[ OFF]]"

       e.g.:  MAN 5000202 MCU               Radio; autobauding enabled
              MAN 1645874 MOX AUTOBAUD OFF  Mox; autobauding disabled
              MAN 5000202 MCU AUTOBAUD      Radio, autobauding enabled

       MAN can be -1 to indicate that the layer must fill in
       the value itself during normal operation.  Otherwise,
       it should be the value obtained by the link layer during
       a previous session, and written to a storage device using
       the string obtained from "ML2getLinkLayerParameters()".

       The autobauding setting defaults to "ON" unless the string
       "AUTOBAUD OFF" appears somewhere after the MAN number.

       Anything after the MAN number and before the "AUTOBAUD"
       string is ignored, because it is automatically determined
       by the link initialization.

  INPUTS:       string: character string pointer.


  OUTPUTS:      status value:
                 0    L_OK          successful setting of parameters
                -1    L_BAD_PARMS   incorrect parameter string
```

```
  SIDE-EFFECTS:   sets local variables

  WARNINGS:       NONE

*****************************************/
int
ML2setLinkLayerParameters(char *string)
{
    int nReturnValue = L_OK;
    char *rescan = string;

    MAN man;
    fDelayAutobaud = FALSE; // default values...
    fAllowAutobaud = TRUE;
    fDSRsense = FALSE;

    if ( string != NULL && *string != '\0' )
    {
        if ( strncmp(string,"MAN",3) != 0 )
            nReturnValue = L_BAD_PARMS;
        else
        {
            man = mlstrtol(string+4, NULL, 10);
            if ( man == 0L )
                nReturnValue = L_BAD_PARMS;
            else
            {
                vSetLinkMANnumber(man);

                for ( ; *string; ++string )
                {
                    for ( ; *string && *string != 'a' && *string != 'A'; ++strin
g )
                        ;
                    if ( *string )
                    {
                        if ( strnicmp(string,"AUTOBAUD",8) == 0 )
                        {
                            if ( strnicmp(string+8," OFF",4) == 0 )
                                fAllowAutobaud = FALSE;
                            else if ( strnicmp(string+8," DELAY",6) == 0 )
                                fDelayAutobaud = TRUE;
                            break;
                        }
                    }
                }

                for ( string = rescan; *string; ++string )
                {
                    for ( ; *string && *string != 'd' && *string != 'D'; ++strin
g )
                        ;
                    if ( *string )
                    {
                        if ( strnicmp(string,"DSR_SENSE",9) == 0 )
                        {
                            if ( strnicmp(string+9," ON",3) == 0 )
                                fDSRsense = TRUE;
                            break;
                        }
                    }
                }

                for ( string = rescan; *string; ++string )
                {
                    for ( ; *string && *string != 's' && *string != 'S'; ++strin
g )
                        ;
                    if ( *string )
                    {
                        if ( strnicmp(string,"SENS",4) == 0 )
                        {
                            if ( strnicmp(string+4," OFF",3) == 0 )
                                fSENSingEnabled = FALSE;
                            break;
                        }
                    }
                }

                for ( string = rescan; *string; ++string )
                {
                    for ( ; *string && *string != 'd' && *string != 'D'; ++strin
g )
                        ;
                    if ( *string )
                    {
                        if ( strnicmp(string,"DEVICE_ID ",10) == 0 )
                        {
                            extern void vSetLinkDeviceIdentifier(char *sDeviceID
);

                            vSetLinkDeviceIdentifier(string+10);
                            break;
                        }
                    }
                }
            }
        }
    }
    vSetAllowAutobaud(fAllowAutobaud);
    vSetDelayAutobaud(fDelayAutobaud);
    vSetDSRsensing(fDSRsense);
    vSetSENSenable(fSENSingEnabled);

    return(nReturnValue);
    }
```

```
#include "basetype.h"
#include "link.h"
#include "ldefines.h"
#include "lprotos.h"
#include "timing.h"
#include "debug.h"
#include "mobilib.h"
#include "access.h"

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif


static linkFrame lfFrameData = { -1, 0 };
static linkDefs ldLink = {
    FALSE,
    MAX_FRAME_LENGTH
    };

static volatile int thLinkDriver = -1;
static volatile int nSENScount = 0;
static boolean fDSRsenseEnabled = FALSE;

#define LINK_DRIVE_INTERVAL     50L     // wake up every 50 milliseconds

static long int lLinkSystemDriver(int handle, int activity);
static void vLinkNormalActions(unsigned int uFlags);
static void vProcessFrames( unsigned int *puAccessFlags  );
static void vRunLinkLayer(void);
static void vReceivedFrame( void );

extern boolean fHasRadioDSRchanged( void );
extern boolean fGetRadioDSR( void );
extern void   .vDebounceRadioDSR( void );

boolean
fInstallLinkDriverModule(void)
{
    lfFrameData.nRXstate = -1;
    if ( thLinkDriver < 0 )
    {
        thLinkDriver = MaddTimer(lLinkSystemDriver,LINK_DRIVE_INTERVAL);
        if ( thLinkDriver < 0 )
            return(FALSE);
    }
    else
        MsetTimer(thLinkDriver,LINK_DRIVE_INTERVAL);

    ldLink.fDebug = FALSE;
    ldLink.nMaxIFlength = MAX_FRAME_LENGTH;
    return(TRUE);
}

boolean
fRemoveLinkDriverModule(void)
    {
    if ( thLinkDriver >= 0 )
        MdelTimer(thLinkDriver,T_DELETED);
    thLinkDriver = -1;
    return(TRUE);
    }

void
vSetDebug(boolean fDebug)
    {
    ldLink.fDebug = fDebug;
    }

void
vSetMaxIFlength(int nIFlength)
    {
    ldLink.nMaxIFlength = nIFlength;
    }

void
vSetDSRsensing(boolean fEnableDSRsense)
{
    fDSRsenseEnabled = fEnableDSRsense;
}

boolean
fIsMASCactive(void)
{
    if ( lfFrameData.nRXstate != -1 )
        return( TRUE );
    if ( fIsTXpending() )
        return ( TRUE );
    return( FALSE );
}

int
nGetMaxIFlength(void)
    {
    return(ldLink.nMaxIFlength);
    }

/****************************************

      lLinkSystemDriver       called as a timing handler

  USAGE:  n/a

  DESCRIPTION:

  INPUTS:        NONE

  OUTPUTS:       NONE
```

```
  SIDE-EFFECTS:   too many to list.

  WARNINGS:       internal function only!

*****************************************/
static long int
lLinkSystemDriver(int handle, int activity)
{
    static int blockLinkDriver = 0;
    static int nBug=0;

    unsigned int uFlags;

    if ( activity != T_EXPIRED )
       return(LINK_DRIVE_INTERVAL);

    //V_SEND_DEBUG_STRING("{A");
    if ( MincLock(&blockLinkDriver) )
    {
        MdecLock(&blockLinkDriver);
        V_SEND_DEBUG_STRING("{AB}");
        return(LINK_DRIVE_INTERVAL);
    }

    uFlags = ML1getAccessState();   // get the state & clear it

    vFlushNetworkNotifies();

    if ( fAreWeAutoBauding() )
    {
        V_SEND_DEBUG_STRING("{Aa");
        vAutoBaudHandler(uFlags);
        fRunLinkStartup();
        V_SEND_DEBUG_STRING("A}");
    }
    else
    {
        vLinkNormalActions(uFlags);
        //V_SEND_DEBUG_STRING("A}");
    }
    MdecLock(&blockLinkDriver);
    return(LINK_DRIVE_INTERVAL);
}

static void
vLinkNormalActions(unsigned int uFlags)
    {
    static unsigned int uAccessFlags = 0;

    uAccessFlags |= uFlags;         // add the flags to what we had...

    //
    // check the state.  If no activity, return
    //

    /* has a block completed transmitting?  If so, handle it */
    if ( uAccessFlags & A_TX_DONE ) {
        uAccessFlags &= ~A_TX_DONE;
        DEBUG_STRING((CSstr "@" ));
        vTransmitFrameDone();
        }

    /* if there was a receive overflow, set the local flag */
    if ( uAccessFlags & A_RX_OVERFLOW )
    {
        uAccessFlags &= ~A_RX_OVERFLOW;
        DEBUG_STRING((CSstr "#" ));
        V_SEND_DEBUG_STRING("!");
    }

    /* did we receive a byte?  If so, handle it */
    if ( uAccessFlags & A_RX_GOT_CHAR )
        vProcessFrames(&uAccessFlags);

    vRunLinkLayer();     // take LINK actions based on timeouts, TX, RX
    }

static void
vProcessFrames( unsigned int *puAccessFlags  )
    {
    int nStatus;
    /* keep getting bytes until no more are available */
    do {
        nStatus = nAssembleIncomingLinkFrame(&lfFrameData, &ldLink);

        switch ( nStatus ) {
            case DATA_WAS_PROCESSED:
                // continue processing
//                DEBUG_STRING((CSstr "." ));
                break;

            case NO_DATA_PROCESSED:
                // stop processing, clear the flag bit
                *puAccessFlags &= ~A_RX_GOT_CHAR;
                break;

            case FRAME_COMPLETED:
                DEBUG_STRING((CSstr "$" ));
                V_SEND_DEBUG_STRING("&");
                vReceivedFrame();
                break;

            case FRAME_WITH_ERRORS_COMPLETED:
                if ( nSendNACK() < 0  )
                    DEBUG_STRING((CSstr"RX error NACK failed\n"));
                else
                    DEBUG_STRING((CSstr"RX error NACK OK\n"));
                break;
            }
        }
    while ( nStatus == DATA_WAS_PROCESSED );
    }

static void
```

```
vRunLinkLayer(void)
{
    boolean fOpen;
    static int nBug = 0;
    static int nLine = 0;

    if ( fDSRsenseEnabled )
    {
        vDebounceRadioDSR();

        // find out if DSR has changed. this CLEARs the indication,
        // so don't call it more than once!
        if ( fHasRadioDSRchanged() )
        {
            // determine the current state of the DSR line.
            if ( !fGetRadioDSR() )
                vLinkBroken();  // DSR is inactive, the link is GONE!
        }
        if ( !fGetRadioDSR() )
            return; // do not OPEN/CLOSE or transmit if DSR is not asserted
    }

    if ( fIsLinkClosing() )
    {
        if ( ++nBug > 10 )
        {
            DEBUG_STRING((CSstr" C "));
            nBug = 0;
            if ( ++nLine > 10 )
            {
                DEBUG_STRING((CSstr"\n"));
                nLine = 0;
            }
        }
        vRunLinkClose();
        vCheckForWaitingIFtransmit();
        return;
    }

    fIsLinkOpening();       // check for request, start open if requested

    if ( !(fOpen = fIsLinkOpen()) )
    {
        if ( ++nBug > 10 )
        {
            DEBUG_STRING((CSstr" OT "));
            nBug = 0;
            if ( ++nLine > 10 )
            {
                DEBUG_STRING((CSstr"\n"));
                nLine = 0;
            }
        }
        if ( fOpen = fRunLinkStartup() )
        {
            DEBUG_STRING((CSstr"open completed\n"));
            vStartLinkIdler();
        }
    }
    if ( fOpen )
    {
        if ( ++nBug > 10 )
        {
            DEBUG_STRING((CSstr" O"));
            nBug = 0;
        }
        if ( fOKtoTransmitIF() )
        {
            if ( nBug == 0 )
                DEBUG_STRING((CSstr"K "));

            if ( fIsNetSendRequested() )
            {
                DEBUG_STRING((CSstr" Queuing send\n"));
                vQueueNetSend();
            }
//          else if ( fIsSpecialFrameSendRequested() )
//              vQueueSpecialSend();
        }
        else
            if ( nBug == 0 )
                DEBUG_STRING((CSstr"X "));
        if ( nBug == 0 )
        {
            if ( ++nLine > 10 )
            {
                DEBUG_STRING((CSstr"\n"));
                nLine = 0;
            }
        }
    }
    vCheckForWaitingIFtransmit();
}

static void
vReceivedFrame( void )
    {
    int nStatus;

    switch ( lfFrameData.bRXcfType ) {
        case TYPE_IF :
            DEBUG_PRINTF((CSstr"RX if: %s\n",lfFrameData.sRXtextArea));
            V_SEND_DEBUG_STRING("(");
            V_SEND_DEBUG_STRING(lfFrameData.sRXtextArea);
            V_SEND_DEBUG_STRING(")");
            if ( nInterpretIncomingInfoFrame(&lfFrameData) )
            {
                V_SEND_DEBUG_STRING(">");
                nStatus = nSendNewACK(NULL);
                DEBUG_PRINTF((CSstr"Sending New ACK status %d\n",nStatus));
            }
            else
            {
                DEBUG_STRING((CSstr"Not sending New ACK\n"));
```

```
            V_SEND_DEBUG_STRING("<");
        }
        break;

    case TYPE_ACK :
        DEBUG_STRING((CSstr"RX ack "));
        V_SEND_DEBUG_STRING("]");
        vReceivedACK(lfFrameData.bRXsequenceNumber);
        break;

    case TYPE_NACK :
        DEBUG_STRING((CSstr"RX nack "));
        V_SEND_DEBUG_STRING("[");
        vReceivedNACK();
        break;

    case TYPE_SACK :
        DEBUG_STRING((CSstr"RX sack "));
        V_SEND_DEBUG_STRING("\\");
        vReceivedSACK();
        break;

    case TYPE_RACK :
        DEBUG_STRING((CSstr"RX rack "));
        V_SEND_DEBUG_STRING("~");
        nStatus = nSendOldACK();
        DEBUG_PRINTF((CSstr"Sending Old ACK status %d\n",nStatus));
        break;

    case TYPE_SENS :
        DEBUG_STRING((CSstr"RX sens "));
        ++nSENScount;
        nStatus = nSendSACK();
        DEBUG_PRINTF((CSstr"Sending SACK(%d) status %d\n",nSENScount,nStatus
));
        break;
    }
  vStartLinkIdler();      // start the Link IDLE timer if it wasn't running
  }
```

File: src\LINK_DRV.C

```
#include "basetype.h"
#include "timing.h"
#include "debug.h"
#include "locks.h"

static char __based(_segname("_CODE")) myFileForLockCalls[] = __FILE__;

extern volatile int MblockTimingHandler; // non-0 blocks timing handlers

static char *sLockLast = "LNONE";
static char *sUnlockLast = "ULNONE";
static int nLockLast = -1;
static int nUnlockLast = -1;
static boolean fLockDisplay = FALSE;

void
vDisplayLockStatus(void)
{
    DEBUG_PRINTF(("Lock Status %d, Lock %s/%d, Unlock %s/%d\n",
                  MblockTimingHandler, sLockLast,nLockLast,
                  sUnlockLast, nUnlockLast));
    DEBUG_FLUSH;
}

boolean
fSetLockDisplay(int nSet)
{
    boolean retval = fLockDisplay;
    if ( nSet >= 0 )
        fLockDisplay = (boolean)nSet;
    return( retval );
}

int
errorDisplayForLocks(char *title,int key,int lock,char *filename,int fileline)
    {
    boolean oldbug = IS_ALLOW_DEBUG;

    DEBUG_PRINTF((CSstr"%s bad key %d/lock %d from file %s line %d",title,key,lo
ck,filename,fileline));
    vDisplayLockStatus();
    DEBUG_FLUSH;
    return(0);
    }

int
MlockTimingHandler(char *filename,int fileline)
    {
    int key = MincLock(&MblockTimingHandler);
    sLockLast = filename;
    nLockLast = fileline;
    if ( fLockDisplay )
    {
        DEBUG_PRINTF(("Lock   %s/%d, Lock Status %d\n",
                      sLockLast,nLockLast,MblockTimingHandler));
        DEBUG_FLUSH;
    }
    return(key);
    }

int
MunlockTimingHandler(int key,char *filename,int fileline)
    {
    int lock = MdecLock(&MblockTimingHandler);
    --lock;
    sUnlockLast = filename;
    nUnlockLast = fileline;
    if ( fLockDisplay )
    {
        DEBUG_PRINTF(("Unlock %s/%d, Lock Status %d\n",
                      sUnlockLast,nUnlockLast,MblockTimingHandler));
        DEBUG_FLUSH;
    }
    if ( lock != key || lock < 0 )
        return(errorDisplayForLocks("MunlockTimingHandler: ",key,lock,filename,f
ileline));
    return(1);
    }

int
MlockLayer(char *filename,int fileline)
    {
    int retval = MlockTimingHandler(filename,fileline);
    return(retval);
    }

int
MunlockLayer(int key,char *filename,int fileline)
    {
    return(MunlockTimingHandler(key,filename,fileline));
    }

int
MlockEverything(char *filename,int fileline)
    {
    int retval = MlockTimingHandler(filename,fileline);
    return(retval);
    }

int
MunlockEverything(int key,char *filename,int fileline)
    {
    return(MunlockTimingHandler(key,filename,fileline));
    }

int
MlockLayerProduction(void)
    {
    int retval = MlockTimingHandler(myFileForLockCalls,__LINE__);
    return(retval);
    }

int
MunlockLayerProduction(int key)
```

Page 2 16 JUN 93 08:40 PM

```
    {
    return(MunlockTimingHandler(key,myFileForLockCalls,__LINE__));
    }

int
MlockEverythingProduction(void)
    {
    int retval = MlockTimingHandler(myFileForLockCalls,__LINE__);
    return(retval);
    }

int
MunlockEverythingProduction(int key)
    {
    return(MunlockTimingHandler(key,myFileForLockCalls,__LINE__));
    }
```

File: src\LOCK.C

```
#include "basetype.h"
#include "enums.h"
#include "debug.h"
#include "leds.h"
#include <stdio.h>
#include <malloc.h>
#include <dos.h>

#include <string.h>
#include "utils.hpc"
#include "locks.h"
SET_LOCK_REF_FILE;

#ifdef PARANORMIA
boolean fWalkAllocedList ( boolean fDump, char *sTitle );
boolean fWalkFreeList ( boolean fDump );
extern void vSpin(void);
#define vSegCheck(X,Y)  vSegmentCheck(X,Y)
#define vSbrkChk(X,Y)   vSbrkCheck(X,Y)
#define vSpinner        vSpin
#else
#define vSegCheck(X,Y)
#define vSbrkChk(X,Y)
#define vSpinner
#endif


#ifdef CLIPPER
extern void *_xalloc( unsigned nbytes );
#endif

typedef long Align;     /* for alignment to long boundary */

#ifdef M_I86LM
#define PTRSIZE _huge
#define MEM_FILL(dest,c,count)  _fmemset((void _far *)dest,c,count)
#else
#define PTRSIZE
#define MEM_FILL(dest,c,count)  memset((void *)dest,c,count)
#endif


union header {  /* block header: */
    struct {
        union header PTRSIZE *ptr;// next block on alloced/free list
        unsigned size;          // size of the memory block in "headers"
        unsigned uReqSize;      // for debug, this is the user area size
        unsigned uSignature;    // for debug, this indicates free/alloced

        unsigned uPool;         // indicates memory pool membership
        unsigned dummy1;        // these take up space so that
        unsigned dummy2;        // the header is 16 bytes long
    } s;
    Align x;                /* force alignment of blocks */
};

typedef union header Header;

unsigned long   dwTotalMem = 0l, dwUsedMem = 0l;

void    vMobiMemFree (unsigned long * pdwTotal, unsigned long * pdwUsed);

int totalMemoryParagraphs = 0;   // force these all to be in the _DATA seg
long int MEMleft = -1L;          // force these all to be in the _DATA seg

#define DEFAULT_SIZE    (24576)
#define NALLOC 1024     /* minimum #units to request */

#ifdef CLIPPER
  #define ALLOCATOR(X)    _xalloc((unsigned int)(X))
  #define TOOBIG(X)       ( (X) > 65535L )
#else
  #ifdef M_I86LM
    #define ALLOCATOR(X) halloc(X,sizeof(char))
    #define TOOBIG(X)       ( 0 )
  #else
    #define ALLOCATOR(X) malloc((size_t)(X))
    #define TOOBIG(X)       ( (X) > 65535L )
  #endif
#endif

typedef char PTRSIZE * memPoolPointer;

memPoolPointer nextMemory = 0; // force these all to be in the _DATA seg

static Header base;     /* empty list to get started - our_free */
static Header base2;    /* empty list to get started - alloc */
static Header *freep = NULL;    /* start of our_free list */
static Header *alloced = NULL;    /* start of allocated list */

char PTRSIZE *our_sbrk(int size);
static Header PTRSIZE *our_morecore(unsigned nu);
static void PTRSIZE * Canonical(void PTRSIZE *pointer);

void *our_malloc( unsigned nInNBytes, Tmempool pool );
void our_free(void *ap);

#define HCANONICAL(X)   ((Header PTRSIZE *)Canonical((void PTRSIZE *)(X)))

static boolean fSameSegment( Header PTRSIZE *first, Header PTRSIZE *second);

#ifdef PARANORMIA
void vSegmentCheck(Header PTRSIZE *p, int n);
void vSbrkCheck(char PTRSIZE *p, unsigned long dwSize);
#endif

static boolean fMallocDisplay = FALSE;
boolean
fSetMallocDisplay(int nSet)
{
    boolean retval = fMallocDisplay;
    if ( nSet >= 0 )
        fMallocDisplay = (boolean)nSet;
    return( retval );
```

```
}


/* Canonical - convert an arbitrary far pointer to the form segment:x
 * where x is less than 0x0010.  This allows us to easily check for
 * pointer equality.
 */
static void PTRSIZE *
Canonical(void PTRSIZE *pointer)
  {
#ifdef M_I86LM
    void _far *newpointer;
    _asm {
        mov ax, WORD PTR pointer      ; get the offset
        mov dx, WORD PTR pointer+2    ; and the segment
        push ax
        and ax, 0x000F                ; now 0 <= offset <= 0x000F
        mov WORD PTR newpointer, ax
        pop ax
        shr ax, 1                     ; convert the rest to a segment
        shr ax, 1                     ; (make it 8088 compatible!)
        shr ax, 1
        shr ax, 1
        add ax, dx                    ; add it in with the segment
        mov WORD PTR newpointer+2, ax
    }
    return( newpointer);
#else
    return(pointer);
#endif
  }


#ifdef MPC

void *
malloc( unsigned int uNbytes )
    {
    return( ml_malloc(uNbytes,APP_POOL) );
    }

void
free( void * pvMemory )
    {
    ml_free( pvMemory );
    }

#endif

int
mlMallocInit(char *psInit)
{
    int retval = 0;
    long int bytes;
    extern void vMLpoolInit(char *sMemoryInitString);
#ifdef MPC
    unsigned int myDS,nextMemDS,RAMtop;
    extern int totalMemoryParagraphs;
    extern char *asizds;
#else
    int status;
#endif

    DEBUG_PRINTF((CSstr"mlMallocInit(%s)\n",psInit));

    vMLpoolInit(psInit);

#ifndef MPC     // this is a PC -- NOT an MPC or MPC/v

        if ( strnicmp(psInit,"memory ",7) != 0 )
        {
            bytes = DEFAULT_SIZE;
            retval = 1;
        }
        else if ( (status=mlsscanf(psInit+7,"%ld",&bytes)) != 1 )
        {
            return(-1);
        }
        if ( bytes <= 0L || TOOBIG(bytes) )
        {
            return(-2);
        }

    // ******************************************************
    //
    // !!!!!!!!!!!!!!!!!!!!!!!!!!!!!!!!!!!!!!!!!!!!!!!!!!!!!!
    //
    // !!!!!!!!!!!!!!!!!!!!!!!!!!!!!!!!!!!!!!!!!!!!!!!!!!!!!!
    //
    //      We should check to see if we've still got
    //      a memory pointer from a previous call to
    //      mlMallocInit, and re-use it if we do.
    //      Or, we can add a "mlMallocRemove()" function
    //      call to remove the memory pool before exiting
    //      MobiLib-Plus
    //
    // !!!!!!!!!!!!!!!!!!!!!!!!!!!!!!!!!!!!!!!!!!!!!!!!!!!!!!
    //
    // !!!!!!!!!!!!!!!!!!!!!!!!!!!!!!!!!!!!!!!!!!!!!!!!!!!!!!
    //
    // ******************************************************

        nextMemory =
            (memPoolPointer)Canonical((void PTRSIZE *)ALLOCATOR(bytes));

#else   // this is an MPC or MPC/v

        // set the memory pool pointer, push it two paras. beyond for safety...
        nextMemory = (memPoolPointer)Canonical((void PTRSIZE *)(asizds+32));
        // ... and then ensure that the offset is busted back to zero.
        nextMemory = (memPoolPointer)((unsigned long int)nextMemory & 0xFFFF0000
L);

        DEBUG_PRINTF((CSstr"asizds = %p, next memory = %p\n",
```

```
                    (void _far *) asizds, (void _far *) nextMemory));

        // now calculate the size of the RAM memory area
        // that is available on the MPC or MPC/v

    #ifdef MMPC  // MPC/v boot ROM does not set 0040:0000 to the RAM size!
        _asm
        {
            push es                     ; MMPC has 32k or 64k RAM
            mov  ax, 0                  ; check if there is RAM at 64k-1
            mov  es, ax                 ; if not then there is 32k memory
            mov  ax, es:[0FFFEh]        ; read in the top word of memory
            neg  ax
            mov  es:[0FFFEh], ax        ; complement the bits and stuff it back
            cmp  es:[0FFFEh], ax        ; did it stay complemented?
            pushf
            neg  ax
            mov  es:[0FFFEh], ax
            popf
            jne  only_32
            mov  ax, 4096               ; 10000h/16 since we want it in paragrap
hs
            jmp  stuffit
    only_32:
            mov  ax, 2048               ; 8000h/16 since we want it in paragraph
s
    stuffit:
            pop  es
            mov  RAMtop, ax
            mov ax, ds
            mov myDS, ax
        }
    #else
        _asm
        {
            push es
            mov ax, 0x0040
            mov es, ax
            mov ax, es:[0]
            pop es
            mov RAMtop, ax
            mov ax, ds
            mov myDS, ax
        }
    #endif

    {
        extern byte far bfdata,efdata,bfbss,efbss;
        extern byte far bhbss,ehbss,bdata,edata,end,stackTopper;
        char _far *p = &(bfdata);
        DEBUG_PRINTF((CSstr"&_bfdata = %p ", p));
        p = &(efdata);
        DEBUG_PRINTF((CSstr"&_efdata = %p ", p));
        p = &(bfbss);
        DEBUG_PRINTF((CSstr"&_bfbss = %p ", p));
        p = &(efbss);
        DEBUG_PRINTF((CSstr"&_efbss = %p\n", p));
        p = &(bhbss);
        DEBUG_PRINTF((CSstr"&_bhbss = %p ", p));
        p = &(ehbss);
        DEBUG_PRINTF((CSstr"&_ehbss = %p ", p));
        p = &(bdata);
        DEBUG_PRINTF((CSstr"&_bdata = %p ", p));
        p = &(edata);
        DEBUG_PRINTF((CSstr"&_edata = %p\n", p));
        p = &(end);
        DEBUG_PRINTF((CSstr"&_end = %p ", p));
        p = &(stackTopper);
        DEBUG_PRINTF((CSstr"&_stackTopper = %p\n", p));
        DEBUG_PRINTF((CSstr"local stack = %p\n", (void _far *)&retval));
    }

    DEBUG_PRINTF((CSstr"RAMtop = %04x, myDS = %04x\n", RAMtop,myDS));
    DEBUG_HEXDUMP("Low memory starting at 0040:0000 :",0x00400000L,0x80);

    // "bytes" will first get set to the number of paragraphs
    // available from the "nextMemory" pointer to the top of RAM.
    // we subtract a paragraph to be safe!

    nextMemDS = (unsigned int)FP_SEG(nextMemory);  // segment of Available RAM

    bytes = (long)(RAMtop-(nextMemDS+1));   // paragraphs of RAM above DS

    DEBUG_PRINTF((CSstr"bytes = %ld, nextMemDS = %04x\n", bytes, nextMemDS));

    bytes *= 16L;                              // size of RAM in BYTES
    dwTotalMem = 0L;

    DEBUG_PRINTF((CSstr"bytes = %ld, dwTotalMem = %ld\n",bytes, dwTotalMem));

#endif

    if ( nextMemory != NULL )
    {
        MEMleft = bytes;
        dwTotalMem += bytes;

        DEBUG_PRINTF((CSstr"Memleft = %ld, dwTotalMem = %ld\n",
                     MEMleft, dwTotalMem));

        return(retval);
    }
    return(-3);
}

char PTRSIZE *our_sbrk(int size)
{
    char PTRSIZE *ret;

    DEBUG_PRINTF((CSstr"\r\nour_sbrk: size=%d, MEMleft=%ld\n",size,MEMleft));

    if( size <= 0 || MEMleft < (long) size )
        return( (char PTRSIZE *) -1 );
```

```
    DEBUG_PRINTF((CSstr"\n          return = %p\n",(void _far *)nextMemory));

    ret = (char PTRSIZE *)nextMemory;       // "nextMemory" is Canonical

    vSbrkChk(ret,size);

    nextMemory += size;
    nextMemory = (memPoolPointer)Canonical((void PTRSIZE*)nextMemory);

    MEMleft -= (long)size;

    DEBUG_PRINTF((CSstr"\n          nextMemory = %p, MEMleft = %ld\n",
                (void _far *)nextMemory,MEMleft));

    return( ret );
}


/* the following code is direct
 * from "The C Programming Language" 2nd Ed.
 * pages 186 to 189
 * Well, it was.  Paranoia code added August 2, 1991
 * Much modification May-June 1992 for large model bug fixing
 */

int
nMLgetMemoryPool(void *ap)
    {
    Header PTRSIZE *bp;

    bp = (Header PTRSIZE *)ap - 1;  /* point to block header */
    if ( ap == NULL || bp->s.uSignature != 0x5555 ) {
        return(-1);
        }
    return( (int)(bp->s.uPool) );
    }

/* malloc: general-purpose storage allocator */
void *our_malloc( unsigned nInNBytes, Tmempool pool )
{
    Header PTRSIZE *p, PTRSIZE *prevp;
    unsigned nunits;
    unsigned nbytes = nInNBytes;
    int key;

#if 1
    unsigned wantedNbytes;
    char PTRSIZE *  psTemp;

    if (nbytes & 3)
        nbytes = (nbytes & (~3)) + 4;

    wantedNbytes = nbytes;

    nbytes += 8;
#endif
```

File: src\MALLOC.C

```
    nunits = (nbytes+sizeof(Header)-1)/sizeof(Header) + 1;

    LOCK_EVERYTHING(key);

    if( (prevp = freep) == NULL ) {        /* no our_free list yet */
        base.s.ptr = freep = prevp = HCANONICAL(&base);
        base.s.size = 0;
        alloced = HCANONICAL(&base2);
        base2.s.ptr = (Header PTRSIZE *)0;
        base2.s.size = 0;
    }
    for( p = prevp->s.ptr; ; prevp = p, p = p->s.ptr ) {
        if( p->s.size >= nunits )     /* big enough */
        {
            #ifdef PARANORMIA
                if ( p == NULL )
                {
                    printf ( "p(malloc-start) --->\n" );
                    fWalkAllocedList ( TRUE, "our_malloc 'p' became NULL [1]!" )
;
                    fWalkFreeList ( TRUE );
                    vSpinner();
                }
                if ( prevp == NULL )
                {
                    printf ( "prevp(malloc-start) --->\n" );
                    fWalkAllocedList ( TRUE, "our_malloc 'prevp' became NULL [1]
!" );
                    fWalkFreeList ( TRUE );
                    vSpinner();
                }
            #endif

            vSegCheck(p,1);
            if( p->s.size == nunits )      /* exactly */
            {
                prevp->s.ptr = p->s.ptr;
            }
            else    /* allocate tail end */
            {
                p->s.size -= nunits;
                p += p->s.size;
                p = HCANONICAL(p);
                p->s.size = nunits;
                vSegCheck(p,2);
            }

            #if 1
                p->s.uReqSize   = wantedNbytes;
                p->s.uSignature = 0x5555;
                p->s.uPool      = (unsigned int)pool;

                nbytes = (((p->s.size)-1) * sizeof(Header)) - p->s.uReqSize;
                psTemp = (char PTRSIZE *)(&p[1]);

                #ifdef PARANORMIA
```

```
                if ( psTemp == NULL )
                {
                    printf ( "psTemp(malloc) --->\n" );
                    fWalkAllocedList ( TRUE, "our_malloc 'psTemp' became NUL
L!" );

                    fWalkFreeList ( TRUE );
                    vSpinner();
                }
                if ( p == NULL )
                {
                    printf ( "p(malloc) --->\n" );
                    fWalkAllocedList ( TRUE, "our_malloc 'p' became NULL [2]
!" );

                    fWalkFreeList ( TRUE );
                    vSpinner();
                }
                if ( alloced == NULL )
                {
                    printf ( "alloced(malloc) --->\n" );
                    fWalkAllocedList ( TRUE, "our_malloc 'alloced' is NULL [
1]!" );

                    fWalkFreeList ( TRUE );
                    vSpinner();
                }
            #endif

            MEM_FILL(psTemp,0x00,p->s.uReqSize);
            psTemp += p->s.uReqSize;
            MEM_FILL(psTemp,0xAA,nbytes);
        #endif

        freep = prevp;

        p->s.ptr = alloced->s.ptr;      /* remember that we alloc'ed it */
        alloced->s.ptr = p;             /* now it's on the list */

        if ( fMallocDisplay )
            DEBUG_PRINTF((CSstr"our_malloc(%d,%d) ret(%p)\n",
                    nInNBytes,pool,(void _far *)(p+1)));

        dwUsedMem += (p->s.size * sizeof(Header));
        UNLOCK_EVERYTHING(key);
        return (void *)(p+1);
    }
    if ( p == freep )       /* wrapped around our_free list */
        if ( (p = our_morecore(nunits)) == NULL )
        {
            DEBUG_PRINTF((CSstr "our_malloc(%d,%d): NOMEM\n",
                        nInNBytes,pool));
            UNLOCK_EVERYTHING(key);
            return NULL;    /* none left */
        }
    }
    UNLOCK_EVERYTHING(key);
    return NULL;    /* none left */
}
```

```
#if 1
void
vBadSignature(int i, void *ap)
    {
    static int  j;
    Header PTRSIZE *bp;

    bp = (Header PTRSIZE *)ap - 1;  /* point to block header */
    bp = HCANONICAL(bp);
    DEBUG_PRINTF((CSstr"\nvBadSignature(%d): %p [%p,%x]\n",
                i,
                (void _far *)(ap),
                (void _far *)(bp),
                bp->s.uSignature));
    DEBUG_FLUSH;

    if ( i == 0 )
        j += 2;
    else if ( i == 1)
        j += 3;
    }

#endif

/* fSameSegment: check if two pointers are in the same data segment */
static boolean
fSameSegment( Header PTRSIZE *first, Header PTRSIZE *second)
    {
    unsigned short int wFirst  = FP_SEG(first);
    unsigned short int wSecond = FP_SEG(second);
    return( (boolean)(wFirst == wSecond) );
    }

/* our_free: put block ap in our_free list */
void
our_free(void *ap)
    {
    Header PTRSIZE *bp, PTRSIZE *p, PTRSIZE *cmp1, PTRSIZE *cmp2;
    int key;

    bp = (Header PTRSIZE *)ap - 1;  /* point to block header */
    bp = HCANONICAL(bp);

    if ( fMallocDisplay )
        DEBUG_PRINTF((CSstr"our_free(%p [%p,%x])\n",
                    (void _far *)(ap),
                    (void _far *)(bp),bp->s.uSignature));

#if 1
    if ( bp->s.uSignature == 0x6556 ) {
        ; // don't do anything, it's from our_morecore()
        }
    else if ( ap == NULL || bp->s.uSignature != 0x5555 ) {
#ifdef PARANORMIA
        fWalkAllocedList ( TRUE, "Free with NULL input or bad signature!" );
        fWalkFreeList ( TRUE );
#endif
```

```
                ? "QF empty!\n"
                : "QF not full\n" )));

    /*
    ** If we're not discarding packets, then just return a status to say
    ** if we're full or not.
    */
    if ( ML3fGetFifoPackets ())
        fRetCode = (boolean)( numRXentries >= RX_Q_SIZE );
    else
    {
        /* If we're full, discard a packet if there is another waiting
        **     at the link level.
        */
        if ( numRXentries < RX_Q_SIZE )
            fRetCode = FALSE;
        else
        {
            /*
            ** if no packet is waiting, then it is safe to say we're full.
            */
            if ( !ML3fAnyRxMpak ())
                fRetCode = TRUE;
            else
            {
                /*
                ** There's a packet waiting, so we discard the head of the
                **     queue and we will move the new packet from the link
                **     layer to the end of the queue.
                */
                ML3vDiscardRxQueueHead();
                fRetCode = FALSE;
            }
        }
    }

    return( fRetCode );
}



/*
** @doc     INTERNAL NETWORK
** @api     void | ML3vDiscardRxQueueHead | Discard the buffer at the head
**              of the used list and place it in the discard list.
*/
void        ML3vDiscardRxQueueHead ( void )
{
PRxQueueEntry   prqeEntry;

    prqeEntry = rxQhead;
    ML3vDeleteEntryFromUsedQueue ( prqeEntry );
    ML3vAddEntryToFreeQueue ( prqeEntry );
    DEBUGQ(("QF (discarded MPAK): %s\n",qStr(prqeEntry)));
}
```

```
/*
** @doc     INTERNAL NETWORK
** @api     void | ML3vGetRxQueueData | Copy the data from the head of the
**              receive queue to the specified buffer.
** @parm    PVOID | pvMpakBuffer | Pointer to a buffer where the MPAK will
**              be stored.
** @parm    PINT | piMpakSize | Pointer to an integer for the size of the
**              MPAK stored in <p pvMpakBuffer>.
*/
void    ML3vGetRxQueueData ( PVOID pvMpakBuffer, PINT piMpakSize )
{
    memcpy ( pvMpakBuffer, rxQhead->cbMpakRxBuffer, rxQhead->nLength );
    *piMpakSize = rxQhead->nLength;
}



/*
** @doc     INTERNAL NETWORK
** @api     boolean | ML3fIsRxQueueEmpty | Check to see if the used queue
**              is empty.
** @rdesc   This function returns TRUE if the used queue is empty.
** @comm    What else is done in here?
*/
boolean     ML3fIsRxQueueEmpty ( void )
{
boolean         fIsFull,fIsEmpty;
static boolean  fWasFull  = TRUE, fWasEmpty = FALSE;

    /*
    ** Start at the last remembered states.
    */
    fIsFull = fWasFull; fIsEmpty = fWasEmpty;

    /*
    ** Toggle the remembered states.
    */
    if ( fWasFull && numRXentries <  RX_Q_SIZE ||
        !fWasFull && numRXentries >= RX_Q_SIZE )
        fWasFull = (boolean)!fWasFull;

    if ( fWasEmpty && numRXentries > 0 ||
        !fWasEmpty && numRXentries <= 0 )
        fWasEmpty = (boolean)!fWasEmpty;

    /*
    ** Things have changed...
    */
    if ( fWasFull != fIsFull || fWasEmpty != fIsEmpty )
        DEBUGQ ((( numRXentries <= 0)
            ? "QE empty!\n"
            : (( numRXentries >= RX_Q_SIZE )
                ? "QE full!\n"
                : "QE not empty\n" )));
```

```
    return ( (boolean)( numRXentries <= 0 ));
}


/*
**  @doc     INTERNAL NETWORK
**  @api     boolean | ML3fQueueIncomingMpaks | Check the link layer for
**               incoming MPAKs.
**  @parm    boolean | fIsInternal | Are we calling internally?
**  @rdesc   This function returns TRUE if a MPAK was queued to the used list.
**  @comm    Original: If the local used queue is NOT full, then check the
**               link layer for an incoming network packet (MPAK).  If
**               a link restart has occurred, restart the network layer,
**               which clears the flag, and thus runs the init until
**               it succeeds or fails.
*/
boolean      ML3fQueueIncomingMpaks ( boolean fIsInternal )
{
int              nStatus;
static int       nLockLevel = 0;
boolean          fRetCode = FALSE, fTransferPacket = FALSE;
PRxQueueEntry    prqeFreeHead;

    /*
    **  Is this an internal call and has the startup cycle finished?
    */
    if ( ! ( !fIsInternal && !ML3fGetNetworkLayerInitialized ()))
    {
        /*
        **  If we are already locked, then unlock and blow....
        */
        if ( !MIncLock ( &nLockLevel ))
        {
            /*
            **  Debug info that we are here and check to see if the queue is
            **      full.  If so, call ML3vScanRxQueueForInternalMpaks to
            **      process any that can be processed.
            */
            DEBUGS((">ML3queueIncomingMPAKs\n"));

            if ( ML3fIsRxQueueFull ())
            {   /* don't bother queueing; it's full! */
                DEBUGS((">ML3queueIncomingMPAKs (queue full)\n"));

                /*
                **  scan & remove internal MPAKs
                */
                ML3vScanRxQueueForInternalMpaks ();
            }

            else
            {
                /*
                **  Check for an MPAK; if one is available it will be copied
                */
                ML3fDecRxMpak ();
                switch ( nStatus = ML2getNetworkPacket (
                    (byte *)(rxQfreeHead->cbMpakRxBuffer),
                    &(rxQfreeHead->nLength)) )
                {
                case L_NO_NETPACKS :
                    DEBUGS(("<ML3queueIncomingMPAKs (no MPAKs)\n"));
                    break;

                /* store the status value and queue the critter */
                default :
//                case L_LINK_ERROR :
                    rxQfreeHead->nStatus = N_LINK_ERROR;
                    fTransferPacket = TRUE;
                    break;

                case L_NEW_NETPACK :
                    rxQfreeHead->nStatus = N_NEW_MPAK;
                    fTransferPacket = TRUE;
                    break;

                case L_UNSENT_NETPACK :
                    ML3getSendStatus();
                    rxQfreeHead->nStatus = N_UNSENT_MPAK;
                    fTransferPacket = TRUE;
                    break;

                case L_BAD_NETPACK:
                case L_ERROR_NETPACK:
                    ML3getSendStatus();
                    if ( nStatus == L_BAD_NETPACK )
                        rxQfreeHead->nStatus = N_BAD_MPAK;
                    else
                        rxQfreeHead->nStatus = N_ERROR_MPAK;
                    break;

//                case L_RESTART :
//                    break;
                }
            }

            /*
            **  If the fTransferPacket flag is set, then we have a packet at
            **      the head of the free queue that can be placed
            */
            if ( fTransferPacket )
            {
                /*
                **  we filled in the "head" of the "free" queue remove it
                **  from the "free" queue and stick it in the "used" queue.
                */
                prqeFreeHead = rxQfreeHead;
                ML3vDeleteEntryFromFreeQueue ( prqeFreeHead );
                ML3vAddEntryToUsedQueue ( prqeFreeHead );

                /*
                **  scan & remove internal MPAKs
                */
                ML3vScanRxQueueForInternalMpaks ();
```

```
        vBadSignature(0,ap);
        return;
        }
    else {
        unsigned char PTRSIZE *psTemp;
        unsigned nbytes;

        nbytes = (((bp->s.size)-1) * sizeof(Header)) - bp->s.uReqSize;

        psTemp = (unsigned char PTRSIZE *)(&bp[1]);
        psTemp += bp->s.uReqSize;

        while ( nbytes-- != 0 ) {
            if ( *psTemp++ != 0xAA ) {
#ifdef PARANORMIA
                fWalkAllocedList ( TRUE, "Free with check area!" );
                fWalkFreeList ( TRUE );
#endif
                vBadSignature(1,ap);
// Should almost exit out of the program if we get here!!!!!!!
                break;
                }
            }
        }
#endif

    LOCK_EVERYTHING(key);
    for( p = alloced;  p != NULL && p->s.ptr != bp; p = p->s.ptr )
        ;

    if( p == NULL || p->s.ptr != bp ) {
#ifdef PARANORMIA
        fWalkAllocedList ( TRUE, "Free with unallocated memory!" );
        fWalkFreeList ( TRUE );
#endif
        DEBUG_PRINTF((CSstr "our_free Error(%p)!\n", bp )); /* it wasn't allocat
ed */
        TurnLEDon( ERROR );
        UNLOCK_EVERYTHING(key);
        return;
        }
    else {
        dwUsedMem -= (bp->s.size * sizeof(Header));
#ifdef PARANORMIA
    if ( bp == NULL )
    {
        printf ( "bp(free) --->\n" );
        fWalkAllocedList ( TRUE, "Free with 'bp' NULL [1]!" );
        fWalkFreeList ( TRUE );
        vSpinner();
    }
    if ( p == NULL )
    {
        printf ( "p(free) --->\n" );
        fWalkAllocedList ( TRUE, "Free with 'p' NULL [1]!" );
        fWalkFreeList ( TRUE );
        vSpinner();
    }
#endif
        bp->s.uSignature = 0x6666;
        p->s.ptr = bp->s.ptr;           /* it isn't allocated anymore */
        }

    for( p = freep; !(bp > p && bp < p->s.ptr); p = p->s.ptr )
        if ( p >= p->s.ptr && (bp > p || bp < p->s.ptr))
            break;  /* freed block at start or end of arena */

#ifdef PARANORMIA
    if ( p == NULL )
    {
        printf ( "p(free-join) --->\n" );
        fWalkAllocedList ( TRUE, "Free with 'p' NULL [2]!" );
        fWalkFreeList ( TRUE );
        vSpinner();
    }
    if ( bp == NULL )
    {
        printf ( "bp(free-join) --->\n" );
        fWalkAllocedList ( TRUE, "Free with 'bp' NULL [2]!" );
        fWalkFreeList ( TRUE );
        vSpinner();
    }
#endif
    cmp1 = HCANONICAL(bp+bp->s.size);
    cmp2 = HCANONICAL(p+p->s.size);

//    if( fSameSegment( bp, p->s.ptr ) &&
    if( cmp1 == p->s.ptr) {       /* join to upper nbr */
        bp->s.size += p->s.ptr->s.size;
        vSegCheck(bp,3);
        bp->s.ptr = p->s.ptr->s.ptr;
    } else
        bp->s.ptr = p->s.ptr;
//    if( fSameSegment( bp, p ) &&
    if( cmp2 == bp) {               /* join to lower nbr */
        p->s.size += bp->s.size;
        vSegCheck(p,4);
        p->s.ptr = bp->s.ptr;
    } else
        p->s.ptr = bp;
    freep = p;


    UNLOCK_EVERYTHING(key);
    }

#define NALLOC 1024     /* minimum #units to request */

/* our_morecore:    ask system for more memory */
static Header PTRSIZE *
our_morecore(unsigned nu)
    {
    char PTRSIZE *cp;
    Header PTRSIZE *up;
```

```
    if( nu < NALLOC )
        nu = NALLOC;

    cp = our_sbrk(nu * sizeof(Header));
    if( cp == (char PTRSIZE *)-1 )
    (   /* no space for max(nu,NALLOC), try the exact (smaller!) size */
        nu = (unsigned int)(MEMleft / sizeof(Header));
        if( nu == 0 ||
             (cp = our_sbrk(nu * sizeof(Header))) == (char PTRSIZE *)-1 )
            return NULL;
    }

    up = (Header PTRSIZE *)cp;
#ifdef PARANORMIA
    if ( up == NULL )
    {
        printf ( "up --->\n" );
        fWalkAllocedList ( TRUE, "our_morecore with 'up' NULL!" );
        fWalkFreeList ( TRUE );
        vSpinner();
    }

    if ( alloced == NULL )
    {
        printf ( "alloced --->\n" );
        vSpinner();
    }
    printf("\n\n!! our_morecore: %09lp size %5d !!\n\n",
          (void _far *)up,nu*sizeof(Header));
#endif
    up->s.size = nu;
    vSegCheck(up,5);
    up->s.ptr = alloced->s.ptr;         /* no! really! we did allocate it */
    alloced->s.ptr = up;                /* this keeps our_free happy */

#if 1
    up->s.uSignature = 0x6556;
#endif

    our_free( (void PTRSIZE *)(up+1) );
    dwUsedMem += (up->s.size * sizeof(Header));

    return freep;
    }

long
biggestFree(void)
    {
    Header PTRSIZE * ptr = freep;
    unsigned largest = freep->s.size;
    while( (ptr=ptr->s.ptr) != freep )
        if( ptr->s.size > largest )
            largest = ptr->s.size;
    return( ((long)largest) * sizeof(Header) + MEMleft );
    }
```

```
void
vMobiMemFree (unsigned long * pdwTotal, unsigned long * pdwUsed)
{
    if (pdwTotal != NULL)
        *pdwTotal = dwTotalMem;
    if (pdwUsed != NULL)
        *pdwUsed = dwUsedMem;
}


#ifdef PARANORMIA

int
iCheckIfInAllocedMemory(void *ap)
    {
    Header PTRSIZE *p;
    unsigned long int apl = (unsigned long int)ap;
    unsigned long int pl,plimit,pend;

    for( p = alloced;  p != NULL; p = p->s.ptr ) {
        pl = (unsigned long int)p;
        if ( apl < pl )
            continue;
        if ( apl < (pl +sizeof(Header)) ) {
            vBadSignature(5,ap);
            return(5);
            }

        pend = pl + (p->s.size) * sizeof(Header);

        if ( apl >= pend )
            continue;

        plimit = pl + sizeof(Header) + p->s.uReqSize;

        if ( apl >= plimit ) {
            vBadSignature(6,ap);
            return(6);
            }

        return(0);
        }
    vBadSignature(7,ap);
    return(7);
    }

#define DUMP_BUFFER_SIZE    10000

int     nDumpMemoryPools ( char * pszFilename, boolean fAppend )
{
FILE *              fpFile;
Header PTRSIZE * pvCurFree = freep->s.ptr;
Header PTRSIZE * pvCurAlloc = alloced->s.ptr;
char PTRSIZE    * pszBuffer;
char PTRSIZE    * pszParse;
int               nRetCode = 0;
int               nDataLength = 0;
```

```
boolean         fDoAlloced;
int             key;

    pszBuffer = malloc ( DUMP_BUFFER_SIZE );
    if ( pszBuffer == NULL )
        nRetCode = 1;
    else
    {
        LOCK_EVERYTHING(key);
        pszParse = pszBuffer;

        while ((( pvCurFree != NULL ) || ( pvCurAlloc != NULL ))
            && (nDataLength < (DUMP_BUFFER_SIZE - 30)))
        {
            if ( pvCurFree == NULL )
                fDoAlloced = TRUE;
            else if ( pvCurAlloc == NULL )
                fDoAlloced = FALSE;
            else
                fDoAlloced = (boolean)((( pvCurFree < pvCurAlloc ) &&
                    ( pvCurFree != NULL )) ? FALSE : TRUE );

            if ( fDoAlloced )
            {
                mlsprintf ( pszParse, "Alloc: %lx, Size=%04x, Next =%lx\n",
                    pvCurAlloc, pvCurAlloc->s.size, pvCurAlloc->s.ptr );
                pvCurAlloc = pvCurAlloc->s.ptr;
            }
            else
            {
                mlsprintf ( pszParse, "our_free : %lx, Size=%04x, Next =%lx\n",
                    pvCurFree, pvCurFree->s.size, pvCurFree->s.ptr );
                pvCurFree = pvCurFree->s.ptr;
                if (pvCurFree <= freep)
                    pvCurFree = NULL;
            }

            while (*pszParse)
            {
                pszParse++;
                nDataLength++;
            }
        }

        if ((pvCurFree == NULL) && (pvCurAlloc == NULL))
            mlsprintf ( pszParse, "End of list." );
        else
            mlsprintf ( pszParse, "End of output buffer." );
        while (*pszParse)
        {
            pszParse++;
            nDataLength++;
        }
        UNLOCK_EVERYTHING(key);

        if ( fAppend )
            fpFile = fopen ( pszFilename, "a");
        else
            fpFile = fopen ( pszFilename, "w");

        if (fpFile == NULL )
            nRetCode = 2;
        else
        {
            if ( (int)fwrite ( pszBuffer, 1, nDataLength, fpFile ) !=
                nDataLength )
                nRetCode = 3;

            if ( fclose ( fpFile ) )
                nRetCode = 4;
        }
        our_free ( pszBuffer );
    }
    return ( nRetCode );
}

char *
sLookupCheckString( int nCheck )
    {
    static char sReturn[40];
    static char *sStrings[9] = {
        "OK.",
        "Unknown (1)!",
        "Bad Alloc signature",
        "Bad Alloc check area",
        "Memory not in Alloced list",
        "Alloced list pointer is -1!",
        "Bad Free signature",
        "Free list pointer is -1!",
        "Memory not in Free list"
        };
    if ( nCheck >= 9 || nCheck < 0 )
        sprintf(sReturn,"Unknown (%d)",nCheck);
    else
        strcpy(sReturn,sStrings[nCheck]);
    return(sReturn);
    }

int
iCheckAlloc( Header PTRSIZE *ap )
    {
    Header PTRSIZE *p;

    if ( ap == NULL || ap->s.uSignature != 0x5555 ) {
        vBadSignature(2,ap);
        return(2);
        }
    else {
        unsigned char PTRSIZE *psTemp;
        unsigned nbytes;

        nbytes = (((ap->s.size)-1) * sizeof(Header)) - ap->s.uReqSize;
        psTemp = (unsigned char PTRSIZE *)(&ap[1]);
        psTemp += ap->s.uReqSize;
```

```
    while ( nbytes-- != 0 ) {
        if ( *psTemp++ != 0xAA ) {
            vBadSignature(3,ap);
            return(3);
            }
        }
    }

    for( p = alloced;
         p != NULL && p != (Header PTRSIZE*)-1 && p->s.ptr != ap;
         p = p->s.ptr )
        ;

    if ( p == (Header PTRSIZE*)-1 ) {
        vBadSignature(4,ap);
        return(4);
        }

    if( p == NULL || p->s.ptr != ap ) {
        vBadSignature(5,ap);
        return(5);
        }

    return(0);
    }

int
iCheckFree( Header PTRSIZE *ap )
    {
    Header PTRSIZE *p;

    if ( ap == NULL || ap->s.uSignature != 0x6666 ) {
        vBadSignature(6,ap);
        return(6);
        }

    if ( freep != NULL && freep == ap )
        return(0);

    for( p = freep->s.ptr;
           p != freep
         &&
           p != NULL
         &&
           p != (Header PTRSIZE*)-1
         &&
           p != ap;
         p = p->s.ptr )
        ;

    if ( p == (Header PTRSIZE*)-1 ) {
        vBadSignature(7,ap);
        return(7);
        }

    if ( p == freep || p == NULL || p != ap ) {
        vBadSignature(8,ap);
        return(8);
        }

    return(0);
    }

boolean fWalkAllocedList ( boolean fDump, char *sTitle )
{
Header PTRSIZE * pvCurAlloc;
boolean fRetCode = TRUE;
FILE *pfFile = NULL;
int nStatus,nCount;
unsigned long dwSize;

    if (!fDump )
        pfFile = fopen("MEMTEST.DMP","a");

    if ( pfFile != NULL )
        fprintf(pfFile,"\n\n%s\n\n"
                       "Alloc List Walk: total    %8ld, used  %8ld\n"
                       "                 alloced %09lp, next %09lp\n\n",
                       sTitle,
                       dwTotalMem,
                       dwUsedMem,
                       (void _far *)alloced,
                       (void _far *)alloced->s.ptr);

    for ( nCount = 0, pvCurAlloc = alloced->s.ptr, dwSize = 0L;
          pvCurAlloc != NULL && fRetCode;
          pvCurAlloc = pvCurAlloc->s.ptr, ++nCount )
    {
        nStatus=iCheckAlloc(pvCurAlloc);
        if ( pfFile != NULL )
            fprintf(pfFile,"Alloc %08lp->%08lp[%5lu/%5lu] "
                           "sig=%04X %s\n",
                           (void _far *)pvCurAlloc,
                           (void _far *)pvCurAlloc->s.ptr,
                           (unsigned long)(pvCurAlloc->s.size) * sizeof(Header),

                           (unsigned long)pvCurAlloc->s.uReqSize,
                           pvCurAlloc->s.uSignature,
                           sLookupCheckString( nStatus ) );

        if ( nStatus )
            fRetCode = FALSE;
        else
            dwSize += (unsigned long)(pvCurAlloc->s.size) * sizeof(Header);
    }

    if ( pfFile != NULL )
    {
        fprintf(pfFile,"\nEnd of Alloc List Walk, %d node%s, used %ld\n",
                       nCount, (nCount>1)?"s":"", dwSize);
        fclose(pfFile);
    }
    return ( fRetCode );
}
```

```
boolean fWalkFreeList ( boolean fDump  )
{
Header PTRSIZE * pvCurFree;
boolean fRetCode = TRUE;
FILE *pfFile = NULL;
int nStatus,nCount;
unsigned long dwSize;

    if ( fDump )
        pfFile = fopen("MEMTEST.DMP","a");

    if ( pfFile != NULL )
        fprintf(pfFile,"\n\n"
                       "Free List Walk: total  %8ld, used  %8ld\n"
                       "                freep %09lp, next %09lp\n\n",
                       dwTotalMem,
                       dwUsedMem,
                       (void _far *)freep,
                       (void _far *)freep->s.ptr);

    for ( nCount = 0, pvCurFree = freep, dwSize = 0L;
          pvCurFree != NULL && fRetCode;
          ++nCount )
    {
        nStatus=iCheckFree(pvCurFree);
        if ( pfFile != NULL )
            fprintf(pfFile,"Free  %09lp->%09lp[%5lu/%5lu] "
                           "sig=%04X %s\n",
                           (void _far *)pvCurFree,
                           (void _far *)pvCurFree->s.ptr,
                           (unsigned long)(pvCurFree->s.size)*sizeof(Header),
                           (unsigned long)pvCurFree->s.uReqSize,
                           pvCurFree->s.uSignature,
                           (pvCurFree != HCANONICAL(&base))
                           ?
                               sLookupCheckString( nStatus )
                           :
                               "Base dummy block"
                           );

        if ( nStatus && pvCurFree != HCANONICAL(&base) )
        {
            fRetCode = FALSE;
            break;
        }
        else
            dwSize += (unsigned long)(pvCurFree->s.size) * sizeof(Header);

        pvCurFree = pvCurFree->s.ptr;
        if ( pvCurFree == freep )
            pvCurFree = NULL;
    }

    if ( pfFile != NULL )
    {
        fprintf(pfFile,"\nEnd of Free List Walk, %d node%s, free %ld\n",
                           nCount, (nCount>1)?"s":"", dwSize);
        fclose(pfFile);
    }

    return ( fRetCode );
}

void
vSbrkCheck(char PTRSIZE *p, unsigned long dwSize)
    {
    /*
    unsigned long dw = (unsigned long)p & 0x0000FFFFL;
    if ( (dw + dwSize) > 0x00010000L ) {
        printf("\n\nOoops! SBRK area at %09lp(%ld) is too big for the segment!\n
",
                (void _far *)p, dwSize );
        fWalkAllocedList ( TRUE, "SBRK area too big for the segment!" );
        fWalkFreeList ( TRUE );
        vSpinner();
        }
    */
    }

void
vSegmentCheck(Header PTRSIZE *p, int n)
    {
    /*
    unsigned long dw = (unsigned long)p & 0x0000FFFFL;
    if ( (dw + ((unsigned long)(p->s.size))*sizeof(Header)) > 0x00010000L ) {
        printf("\n\nOoops! Memory area at %09lp is too big for the segment!\n",
                (void _far *)p);
        fWalkAllocedList ( TRUE, "Memory area too big for the segment!" );
        fWalkFreeList ( TRUE );
        vSpinner();
        }
    */
    }


#endif
```

```
#include    <stdlib.h>
#include    <string.h>
#include    <memory.h>

#include    "basetype.h"
#include    "mobilib.h"
#include    "enums.h"
#include    "timing.h"
#include    "mpakxlat.h"

#include    "network.h"
#include    "netint.h"


static int  ML3nPostStubPacketSent ( void );


boolean     ML3getBlockingSend ( void )
{
    return ( FALSE );
}

boolean     ML3setBlockingSend ( boolean fNewValue )
{
    return ( FALSE );
}

void        ML3startupNetwork ( void )
{
}


int         ML3sendActive ( MAN mSource )
{
    return ( ML3nPostStubPacketSent ());
}

int         ML3sendInactive ( MAN mSource )
{
    return ( ML3nPostStubPacketSent ());
}


static int  ML3nPostStubPacketSent ( void )
{
    ML3vReceivedMpak ();
    return ( N_OK );
}

int         ML2isLinkRadio ( void )
{
    return ( FALSE );
}
```

```
//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif


#include    <stdlib.h>
#include    <string.h>
#include    <memory.h>

#include    "basetype.h"
#include    "mobilib.h"
#include    "enums.h"

#include    "network.h"
#include    "netint.h"
#include    "timing.h"
#include    "mpakxlat.h"

static long ML3lTransmitTimerHandler ( int handle, int activity );

static int  thTransmitTimer = -1;
static int  nTimeoutCounter = -1;
static int  nTimeoutSeconds = 120;
static boolean  fTransmitActive = FALSE;

/*
**  @doc    INTERNAL NETWORK
**  @api    boolean | ML3fInitTimers | Intialize the network layer timers.
**  @rdesc  This function returns TRUE if the network timers were installed
**              properly.
*/
boolean ML3fInitTimers ( void )
{
boolean     fStartedInternal;

    thTransmitTimer = MaddTimer ( ML3lTransmitTimerHandler, 0L );
    fStartedInternal = ML3fStartNetInternalTimer ();

    return ( (boolean)( thTransmitTimer && fStartedInternal ));
}

/*
**  @doc    INTERNAL NETWORK
**  @api    void | ML3vRemoveTimers | Remove the network layer timers.
*/
void    ML3vRemoveTimers ( void )
{
    if ( thTransmitTimer >= 0 )
    {
        MdelTimer ( thTransmitTimer, T_DELETED );
        thTransmitTimer = -1;
    }
    ML3vStopNetInternalTimer ();
}


/*
**  @doc    INTERNAL NETWORK
**  @api    void | ML3fSetTransmitTimerActive | Set the 'active' state of
**              the timer.
**  @parm   boolean | fActive | The new state of the timer.
*/
void        ML3fSetTransmitTimerActive ( boolean fActive )
{
    fTransmitActive = fActive;
}


/*
**  @doc    INTERNAL NETWORK
**  @api    void | ML3vClearTransmitTimer | Clear the transmit timer.
*/
void    ML3vClearTransmitTimer ( void )
{
    MclrTimer ( thTransmitTimer, T_CLEARED );
}


/*
**  @doc    INTERNAL NETWORK
**  @api    void | ML3vSetTransmitTimer | Reset the transmit timer.
**  @parm   long | lTimeout | New timeout value for the timer.
*/
void    ML3vSetTransmitTimer ( long lTimeout )
{
    MsetTimer ( thTransmitTimer, lTimeout );
}


/*
**  @doc    INTERNAL NETWORK
**  @api    void | ML3vStartTransmitTimer | Start the transmit timer.
*/
void    ML3vStartTransmitTimer ( void )
{
    ML3vClearTransmitTimer ();
    nTimeoutCounter = nTimeoutSeconds;
    ML3vSetTransmitTimer ( 1000L );
}

/*
**  @doc    INTERNAL NETWORK
**  @api    void | ML3vStopTransmitTimer | Stop the transmit timer.
*/
void    ML3vStopTransmitTimer ( void )
{
    ML3vClearTransmitTimer ();
}
```

```
/*
**  @doc    INTERNAL NETWORK
**  @api    boolean | ML3fIsTransmitTimerDone | Has the transmit timer
**              counted down to (or below) zero and thus expired?
*/
boolean ML3fIsTransmitTimerDone ( void )
{
boolean fRetCode = FALSE;

    if ( nTimeoutCounter <= 0 && fTransmitActive )
        fRetCode = TRUE;

    return ( fRetCode );
}

/*
**  @doc    INTERNAL NETWORK
**  @api    int | ML3nGetTransmitTimeout | Get the network layer transmit
**              timeout value (in seconds).
**  @rdesc  This function returns the number of seconds that need to elapse
**              before a transmit will timeout.
**  @comm   Original: Return the network packet transmit timeout value.
**              This value represents the number of seconds to wait before
**              terminating an attempt to send a network packet (which then
**              causes an "unable to send" to the application layers).
*/
int     ML3getTransmitTimeout ( void )
{
    return ( nTimeoutSeconds );
}

/*
**  @doc    INTERNAL NETWORK
**  @api    int | ML3fSetTransmitTimeout | Set the network layer transmit
**              timeout value (in seconds).
**  @parm   int | nSeconds | New transmit timeout value (in seconds).
**  @rdesc  If <p nSeconds> was less than 5, then this function returns a
**              value of 1 and the transmit timer is not set with the new
**              value.  Otherwise, this function returns the old value of
**              the timer and the transmit timer is set to <p nSeconds>.
*/
int     ML3setTransmitTimeout ( int nSeconds )
{
int     nRetCode = 1;

    if ( nSeconds >= 5 )
    {
        nRetCode = nTimeoutSeconds;
        nTimeoutSeconds = nSeconds;
    }

    return(nRetCode);
}


/*
**  @doc    INTERNAL NETWORK
**  @api    void | ML3vResetTransmitTimeout | Reset the transmit timer.
*/
void    ML3vResetTransmitTimeout ( void )
{
    nTimeoutCounter = 0;
    ML3vSetTransmitTimer ( 1L );
}

/*
**  @doc    INTERNAL NETWORK
**  @api    long | ML3lTransmitTimerHandler | Timer function for the
**              transmit timer.
**  @parm   int | thTimer | Handle to the timer.
**  @parm   int | nActivity | Activity being performed by the timer.
**  @rdesc  This return value specifies the new timeout value.
*/
long    ML3lTransmitTimerHandler ( int thTimer, int nActivity )
{
long    lNewTimeout = 0L;

    if ( nActivity != T_EXPIRED )
        nTimeoutCounter = -1;
    else
    {
        V_SEND_DEBUG_STRING("(C");
        if ( nTimeoutCounter > 0 )
            --nTimeoutCounter;

        /*
        **  If we have timed out, then force a send timeout detection,
        **      otherwise, set the new timeout to occur 1 second from now.
        */
        if ( nTimeoutCounter <= 0 )
            ML3getSendStatus();
        else
            lNewTimeout = 1000L;
        V_SEND_DEBUG_STRING("C)");
    }

    return ( lNewTimeout );
}
```

```
#include    <stdlib.h>
#include    <string.h>
#include    <memory.h>

#include    "basetype.h"
#include    "mobilib.h"
#include    "enums.h"

#include    "network.h"
#include    "netint.h"
#include    "timing.h"
#include    "locks.h"
#include    "mpakxlat.h"

#include    "debug.h"

SET_LOCK_REF_FILE;

/*
**  @doc    INTERNAL NETWORK
**  @api    int | ML3getMPAK | Check to see if an MPAK has arrived.
**  @parm   PVOID | pvMpakBuffer | Pointer to a buffer where the MPAK will
**              be stored.
**  @parm   PINT | piMpakSize | Pointer to an integer for the size of the
**              MPAK stored in <p pvMpakBuffer>.
**  @rdesc  The return value from this function is the value that is returned
**              to it by <a ML3isMPAKavailable>.  This value is one of the
**              following flags:
**  @flag   N_NO_MPAKS      | No MPAK is waiting for the application.
**  @flag   N_NEW_MPAK      | New MPAK is waiting.
**  @flag   N_UNSENT_MPAK   | An unsent MPAK has been returned.
**  @flag   N_BAD_MPAK      | A badly formatted MPAK has been returned.
**  @flag   N_INTERNAL      | An internal error has occured in the network
**                            layer.
**  @flag   N_LINK_ERROR  | An internal error has occured in the link layer.
**  @comm   If this routine can perform any automatic responses to the MPAK,
**              it does so unless the the passthrough flag is set.  If neither
**              of these conditions apply, then the MPAK is returned to the
**              application.
**
**          If the <f N_NO_MPAKS> flag or the <f N_INTERNAL> flag is returned,
**              the objects referenced by the pointers are not touched.  If
**              the <f N_LINK_ERROR> flag is returned, then the integer
**              pointed to by <p piMpakSize> is set to 0.  In all other cases,
**              the MPAK is copied to the buffer specified by <p pvMpakBuffer>
**              and the size is set to the length of the incoming packet.
*/
int         ML3getMPAK ( PVOID pvMpakBuffer, PINT piMpakSize )
{
int         nStatus,nKey;

    DEBUGS (( ">ML3getMPAK\n" ));
    LOCK_LAYER ( nKey );

    nStatus = ML3isMPAKavailable ();
    if ( nStatus == N_NO_MPAKS || nStatus == N_INTERNAL )
        DEBUGS(("<ML3getMPAK (no MPAKs)\n"));
    else
    {
        if ( nStatus == N_LINK_ERROR )
            *piMpakSize = 0;
        else
            ML3vGetRxQueueData ( pvMpakBuffer, piMpakSize );

        ML3vDiscardRxQueueHead ();
        DEBUGS(("<ML3getMPAK (got MPAK)\n"));
    }

    UNLOCK_LAYER(nKey);
    return(nStatus);
}

/*
**  @doc    INTERNAL NETWORK PUBLIC
**  @api    int | ML3isMPAKavailable | See if any MPAKs have arrived.
**  @rdesc  This function returns a value specifying the state of the
**              receiving queues.  It can return the following values:
**  @flag   N_NO_MPAKS      | No MPAK is waiting for the application.
**  @flag   N_NEW_MPAK      | New MPAK is waiting.
**  @flag   N_UNSENT_MPAK   | An unsent MPAK has been returned.
**  @flag   N_BAD_MPAK      | A badly formatted MPAK has been returned.
**  @flag   N_INTERNAL      | An internal error has occured in the network
**                            layer.
**  @flag   N_LINK_ERROR  | An internal error has occured in the link layer.
**  @comm   Original: determines if an MPAK has arrived.  Checks if it can
**              perform any automatic responses: if so, don't indicate TRUE
**              unless PASSTHROUGH is set.  Return TRUE or FALSE to indicate
**              if an MPAK is available to the application.
*/
int     ML3isMPAKavailable ( void )
{
    /*
    **  call internal function with "not internalCall" flag parameter
    */
    return ( ML3nIsMpakAvailable ( FALSE ));
}


/*
**  @doc    INTERNAL NETWORK
**  @api    int | ML3nIsMpakAvailable | See if any MPAKs have arrived.
**              INTERNAL VERSION.
**  @rdesc  This function returns a value specifying the state of the
**              receiving queues.  It can return the following values:
**  @flag   N_NO_MPAKS      | No MPAK is waiting for the application.
**  @flag   N_NEW_MPAK      | New MPAK is waiting.
**  @flag   N_UNSENT_MPAK   | An unsent MPAK has been returned.
**  @flag   N_BAD_MPAK      | A badly formatted MPAK has been returned.
**  @flag   N_INTERNAL      | An internal error has occured in the network
**                            layer.
**  @flag   N_LINK_ERROR  | An internal error has occured in the link layer.
**  @comm   Simply check the receiving queues to see if there is at least one
```

```
**              entry in the queue.  If it is internal, then return back that
**              there are no MPAKs waiting.
**
**         Original: determines if an MPAK has arrived.  Checks if it can
**              perform any automatic responses: if so, don't indicate TRUE
**              unless PASSTHROUGH is set.  Return TRUE or FALSE to indicate
**              if an MPAK is available to the application.
*/
int     ML3nIsMpakAvailable ( void )
{
int     nRetCode = N_NO_MPAKS, nKey;

    LOCK_LAYER ( nKey );

    /*
    **  If the receive queue isn't empty, get the status of the packet at
    **      the head of the queue.
    */
    if ( !ML3fIsRxQueueEmpty ())
    {
        /*
        **  Get the status and translate a status of N_INTERNAL to N_NO_MPAKS.
        */
        if (( nRetCode = ML3nGetRxQueueHeadStatus ()) == N_INTERNAL )
            nRetCode = N_NO_MPAKS;
    }

    UNLOCK_LAYER ( nKey );
    return ( nRetCode );
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;
SET_MEM_REF_FILE;

/*
**  number of receive MPAKs that can be pending
*/
#define RX_Q_SIZE   4


/*
**  receive queue structure
*/
typedef struct rxp
{
    struct rxp  *prqeNext, *prqePrev;              /* doubly-linked queue */
    int         nStatus;                           /* internal status indr */
    int         nLength;                           /* length of MPAK */
    byte        cbMpakRxBuffer [ MAX_MPAK_SIZE ];  /* MPAK storage */
} rxQentry;
typedef rxQentry *      PRxQueueEntry;

/*
**  We allocate a fixed size queue but the free/used queues
**  are built out of the array using pointer mechanisms.
*/
static PRxQueueEntry    rxQ[RX_Q_SIZE];
static PRxQueueEntry    rxQhead = NULL;
static PRxQueueEntry    rxQtail = NULL;
static PRxQueueEntry    rxQfreeHead = NULL;
static PRxQueueEntry    rxQfreeTail = NULL;
static PRxQueueEntry    rxQscanner = NULL;
static boolean          fHaveSetRxQueues = FALSE;

/*
**  counter of the number of "used" entries
*/
static int              numRXentries = 0;
```

```
/*
**  prototypes.
*/
    void        ML3vAddEntryToUsedQueue ( PRxQueueEntry prqeEntry );
    void        ML3vAddEntryToFreeQueue ( PRxQueueEntry prqeEntry );
    void        ML3vDeleteEntryFromUsedQueue ( PRxQueueEntry prqeEntry );
    void        ML3vDeleteEntryFromFreeQueue ( PRxQueueEntry prqeEntry );


/*
**  @doc    INTERNAL NETWORK
**  @api    int | ML3nStartRxQueues | Start the receiving queues.
**  @parm   boolean | fAllocBuffers | Allocate the initial buffers.
**  @rdesc  This function will return one of the two following values:
**  @flag   N_OK | Everything was ok.
**  @flag   N_NO_MEMORY | The function couldn't allocate memory for
**              the queues.
*/
int     ML3nStartRxQueues ( boolean fAllocBuffers )
{
int     nRetCode = N_OK, nLoop;

    /*
    **  initialize the MPAK receive queue: set up the pointers
    **      and counters first, then initialize the free Queue
    */
    rxQhead = NULL;
    rxQtail = NULL;
    rxQfreeHead = NULL;
    rxQfreeTail = NULL;
    rxQscanner = NULL;
    numRXentries = 0;


    /*
    **  Allocate the buffers ONLY IF we are told to.
    */
    if ( fAllocBuffers )
    {
        /*
        **  Clean the list up, paranoia.
        */
        for ( nLoop = 0; nLoop < RX_Q_SIZE; ++nLoop )
            rxQ [ nLoop ] = NULL;
        fHaveSetRxQueues = TRUE;

        /*
        **  allocate & pop all the array entries onto the "free" queue
        */
        for ( nLoop = 0; nLoop < RX_Q_SIZE && nRetCode == N_OK; ++nLoop )
        {
            /*
            **  Try and allocate the buffer, if it fails, set the return code.
            */
            rxQ [ nLoop ] = ML_MALLOC ( sizeof ( rxQentry ), RX_POOL );
            if ( rxQ [ nLoop ] == NULL )
                nRetCode = N_NO_MEMORY;
```

```
            else
                ML3vAddEntryToFreeQueue ( rxQ [ nLoop ] );
        }

        /*
        ** If we didn't start the queues properly, then delete the existing
        **     queues.
        */
        if ( nRetCode != N_OK )
        {
            while ( --nLoop >= 0 )
            {
                ML_FREE ( rxQ [ nLoop ] );
                rxQ [ nLoop ] = NULL;
            }
        }
    }

    return ( nRetCode );
}



/*
**  @doc    INTERNAL NETWORK
**  @api    void | ML3vRemoveRxQueues | Remove the receiving queues.
*/
void    ML3vRemoveRxQueues ( void )
{
int     nLoop;

    /*
    **  Reverse the process done in ML3nStartRxQueues.
    */
    rxQhead = NULL;
    rxQtail = NULL;
    rxQfreeHead = NULL;
    rxQfreeTail = NULL;
    rxQscanner = NULL;
    numRXentries = 0;

    /*
    **  Check before deleting... paranormia....
    */
    if ( fHaveSetRxQueues )
        for ( nLoop = 0; nLoop < RX_Q_SIZE; ++nLoop )
        {
            if ( rxQ [ nLoop ] != NULL )
                ML_FREE ( rxQ [ nLoop ] );
        }
}



/*
**  @doc    INTERNAL NETWORK
**  @api    void | ML3vAddEntryToUsedQueue | Add an entry to the used queue.
**  @parm   PRxQueueEntry | prqeEntry | Entry to add to the used queue.
**  @comm   This function adds the entry <p prqeEntry> to the doubly-linked
**              list of used entries and increments the counter for the
**              number of used entries.  This also sets rxQscanner to the
**              current entry if it was NULL.
*/
void        ML3vAddEntryToUsedQueue ( PRxQueueEntry prqeEntry )
{
    /*
    **  Place the new entry at the end of the queue.
    */
    prqeEntry->prqeNext   = NULL;
    prqeEntry->prqePrev   = rxQtail;

    /*
    **  Set the new tail of the queue.
    */
    if ( rxQtail != NULL )
        rxQtail->prqeNext = prqeEntry;
    rxQtail = prqeEntry;

    /*
    **  If nothing there, set the new head of the queue.
    */
    if ( rxQhead == NULL )
        rxQhead = prqeEntry;

    /*
    **  Set the scanner to point at the new entry and increment the number
    **      of entries in the queue.
    */
    if ( rxQscanner == NULL )
        rxQscanner = prqeEntry;
    ++numRXentries;

    ALLOW_DEBUG(TRUE);
    DEBUG_PRINTF((CSstr" +Q, used(%d) ",numRXentries));
}



/*
**  @doc    INTERNAL NETWORK
**  @api    void | ML3vDeleteEntryFromUsedQueue | Delete an entry from the
**              free queue.
**  @parm   PRxQueueEntry | prqeEntry | Entry to delete from the used queue.
**  @comm   This function deletes the entry <p prqeEntry> from the
**              doubly-linked list of used entries and decrement the number
**              of entries in the used queue.
*/
void        ML3vDeleteEntryFromUsedQueue ( PRxQueueEntry prqeEntry )
{
    /*
    **  Reset the tail and header pointers for the queue.
    */
    if ( rxQhead == prqeEntry )
        rxQhead = prqeEntry->prqeNext;
    if ( rxQtail == prqeEntry )
```

```
        rxQtail = prqeEntry->prqePrev;

    /*
    **, Adjust the previous entry, the next entry, and finally the count.
    */
    if ( prqeEntry->prqeNext != NULL )
        prqeEntry->prqeNext->prqePrev = prqeEntry->prqePrev;
    if ( prqeEntry->prqePrev != NULL )
        prqeEntry->prqePrev->prqeNext = prqeEntry->prqeNext;
    --numRXentries;
    ALLOW_DEBUG(TRUE);
    DEBUG_PRINTF((CSstr" -Q, used(%d) ",numRXentries));
}


/*
**  @doc    INTERNAL NETWORK
**  @api    void | ML3vAddEntryToFreeQueue | Add an entry to the free queue.
**  @parm   PRxQueueEntry | prqeEntry | Entry to add to the free queue.
**  @comm   This function adds the entry <p prqeEntry> to the doubly-linked
**              list of free entries.
*/
void        ML3vAddEntryToFreeQueue ( PRxQueueEntry prqeEntry )
{
    /*
    **  Place the new entry at the end of the queue.
    */
    prqeEntry->prqeNext   = NULL;
    prqeEntry->prqePrev   = rxQfreeTail;

    /*
    **  Set the new tail of the queue.
    */
    if ( rxQfreeTail != NULL )
        rxQfreeTail->prqeNext = prqeEntry;
    rxQfreeTail = prqeEntry;

    /*
    **  If nothing there, set the new head of the queue. .
    */
    if ( rxQfreeHead == NULL )
        rxQfreeHead = prqeEntry;
    DEBUGS(("+Q, free\n"));
}


/*
**  @doc    INTERNAL NETWORK
**  @api    void | ML3vDeleteEntryFromFreeQueue | Delete an entry from the
**              free queue.
**  @parm   PRxQueueEntry | prqeEntry | Entry to delete from the free queue.
**  @comm   This function deletes the entry <p prqeEntry> from the
**              doubly-linked list of free entries.
*/
void        ML3vDeleteEntryFromFreeQueue ( PRxQueueEntry prqeEntry )
{
    /*
    **  Reset the tail and header pointers for the queue.
    */
    if ( rxQfreeHead == prqeEntry )
        rxQfreeHead = prqeEntry->prqeNext;
    if ( rxQfreeTail == prqeEntry )
        rxQfreeTail = prqeEntry->prqePrev;

    /*
    **  Adjust the previous entry, and the next entry.
    */
    if ( prqeEntry->prqeNext != NULL )
        prqeEntry->prqeNext->prqePrev = prqeEntry->prqePrev;
    if ( prqeEntry->prqePrev != NULL )
        prqeEntry->prqePrev->prqeNext = prqeEntry->prqeNext;
    DEBUGS(("-Q, free\n"));
}


/*
**  @doc    INTERNAL NETWORK
**  @api    boolean | ML3fIsRxQueueFull | Check to see if the used queue
**              is full.
**  @rdesc  This function returns TRUE if the used queue is full.
**  @comm   What else is done in here?
*/
boolean     ML3fIsRxQueueFull ( void )
{
boolean         fIsFull, fIsEmpty, fRetCode;
static boolean  fWasFull = TRUE, fWasEmpty = FALSE;

    /*
    **  Start at the last remembered states.
    */
    fIsFull = fWasFull;
    fIsEmpty = fWasEmpty;

    /*
    **  Toggle the remembered states.
    */
    if ( fWasFull && numRXentries <  RX_Q_SIZE ||
        !fWasFull && numRXentries >= RX_Q_SIZE )
        fWasFull = (boolean)!fWasFull;

    if ( fWasEmpty && numRXentries > 0 ||
        !fWasEmpty && numRXentries <= 0 )
        fWasEmpty = (boolean)!fWasEmpty;

    /*
    **  Things have changed...
    */
    if ( fWasFull != fIsFull || fWasEmpty != fIsEmpty )
        DEBUGQ ((( numRXentries>=RX_Q_SIZE )
            ? "QF full!\n"
            : (( numRXentries <= 0 )
```

```
            DEBUGS (( "<ML3queueIncomingMPAKs (queued MPAK)\n" ));

            if ( ML3nIsMpakAvailable ( TRUE ))
                ML3vReceivedMpak ();

        }
        MdecLock(&nLockLevel);
    }
    return ( fRetCode );
}


/*
**  @doc    INTERNAL NETWORK
**  @api    boolean | ML3fReceivedNewMpak | Have we received a new MPAK
**              since we last checked?
**  @comm   This function will tell if a new MPAK has arrived since it last
**              checked the queues itself.
*/
boolean     ML3fReceivedNewMpak ( void )
{
static rxQentry *   lastTail = NULL;

    if ( lastTail == rxQtail )
        return( FALSE );
    lastTail = rxQtail;
    return( TRUE );
}



/*
**  @doc    INTERNAL NETWORK
**  @api    int | ML3nGetRxQueueHeadStatus | Get the status of the first
**              packet in the receive queue.
*/
int         ML3nGetRxQueueHeadStatus ( void )
{
#ifndef NO_DEBUG
    if ( rxQhead == NULL )
    {
        DEBUG_PRINTF((CSstr" %A\x0cNET Q Stat(%d) following NUL pointer!\007 ",
                    rxQhead->nStatus));
    }
#endif
    return ( rxQhead->nStatus );
}



/*
**  @doc    INTERNAL NETWORK
**  @api    void | ML3vScanRxQueueForInternalMpaks | Scan the receiving queues
**              for MPAKs that can be handled internally.
**  @comm   Original: examine the MPAK receive queue for commands which
**              should be handled locally (e.g. FLEXREQ).  Uses the local
**              variable "rxQscanner" to track the next queue slot to be
**              scanned.
*/
void        ML3vScanRxQueueForInternalMpaks ( void )
{
int             nStatus;
PRxQueueEntry   prqeScanEntry;

    /* scan through the queue, processing internally handled MPAKs,
     * and removing MPAKs that should not be passed through to the
     * application.
     */

    DEBUGS(("->ML3vScanRxQueueForInternalMpaks\n"));

    for ( prqeScanEntry = rxQscanner;
            !ML3fIsRxQueueEmpty () && rxQscanner != NULL;
            prqeScanEntry = rxQscanner )
    {
        /*
        **  Make sure we know what the next entry is and set the scanner
        **      to that entry.
        */
        rxQscanner = prqeScanEntry->prqeNext;

        /*
        **  Only look at the packet if it is an internal error or if it is
        **      new.
        */
        if ( prqeScanEntry->nStatus == N_NEW_MPAK ||
            prqeScanEntry->nStatus == N_INTERNAL )
        {
            /*
            **  otherwise, check it out.  if handled internally,
            **  remove from the queue and keep going
            */
            if (( nStatus = ML3nCheckIncomingMpak (
                prqeScanEntry->cbMpakRxBuffer, prqeScanEntry->nLength ))
                == 0 )

            switch ( nStatus )
            {

            /*
            **  Processed internally, so remove from queue.
            */
            case PACKET_INTERNAL:
                ML3vDeleteEntryFromUsedQueue ( prqeScanEntry );
                ML3vAddEntryToFreeQueue ( prqeScanEntry );
                break;

            /*
            **  Reset the scanner pointer to look at the current entry later.
            */
            case PACKET_LATER:
                rxQscanner = prqeScanEntry;
                rxQscanner->nStatus = N_INTERNAL;
```

```
            return;
            break;

        /*
        **  If we get this code, then we cannot respond properly, so
        **      pass it up as an error.
        */
        case PACKET_ERROR:
            /*
            **  BADLY addressed MPAK, or FLEXREQ or ROAMORD
            **      to which we cannot at this time respond.
            */
            prqeScanEntry->nStatus = N_ERROR_MPAK;
            return;
            break;

        /*
        **  In this case, check to make sure an external MPAK with a
        **      N_INTERNAL flag gets set to N_NEW_MPAK???????
        */
        case PACKET_EXTERNAL:
            /*
            **  unable to handle an MPAK that is supposed to be
            **      handled internally, or that is being passed
            **      back due to setting the "pass-thru" flag.
            */
            if ( prqeScanEntry->nStatus == N_INTERNAL )
                prqeScanEntry->nStatus = N_NEW_MPAK;
            break;
        }
      }
    }
    DEBUGS(("<ML3vScanRxQueueForInternalMpaks\n"));
}


/*
**  @doc     INTERNAL NETWORK
**  @api     void | ML3flushReceiver | Flush the receiver.  Shouldn't need
**              this.
**  @comm    Eventually want to get rid of this.
*/
void        ML3flushReceiver ( void )
{
int         nLoop, nKey;

    LOCK_EVERYTHING(nKey);

    /*
    **  Tell the link layer to flush...
    */
    ML2flushReceiver();

    /*
    **  initialize the MPAK receive queue: set up the pointers
    **      and counters first, then initialize the free Queue
    */
    ML3nStartRxQueues ( FALSE );

    /*
    **  pop all the array entries onto the "free" queue
    */
    for ( nLoop = 0; nLoop < RX_Q_SIZE; ++nLoop )
    {
        memset ( rxQ [ nLoop ], 0, sizeof ( rxQentry ));
        ML3vAddEntryToFreeQueue ( rxQ [ nLoop ] );
    }

    UNLOCK_EVERYTHING(nKey);
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;


/*
**  @doc     INTERNAL NETWORK
**  @api     int | ML3nCheckIncomingMpak | Check an incoming Mpak for an
**               internally handled MPAK and handle it properly.
**  @parm    PVOID | pvPacketBuffer | Buffer for the MPAK.
**  @parm    int | nPacketLength | Size of the buffer.
**  @rdesc   This routine returns one of the following flags:
**  @flag    1 | Ok to pass through to application.
**  @flag    0 | Handled locally, drop from the queue.
**  @flag    -1 | must be handled later, stop checking.
**  @flag    -2 | Error.
**  @comm    Original: Look for an incoming B-frame, LOGIN accept,
**               LOGOUT accept or request, FLEXREQ MPAK or GROUPLIST MPAK.
**               Handle these requests locally, but the frame is also passed
**               on to the application.
*/
int     ML3nCheckIncomingMpak ( PVOID pvPacketBuffer, int nPacketLength )
{
MAN     mAddressee, mPacketSource;
int     nTrafficState, nOffset, nCommand, nDataLength, nRetCode;

    DEBUGS (( "ML3checkIncoming ...\n" ));

    /*
    **  Get the traffic state and the command number.
    */
    nTrafficState = ML3getTrafficState ( pvPacketBuffer );
    nCommand = ML3getCommand ( pvPacketBuffer );

    if (( nRetCode = ML3nCheckForReturnedMpaks ( nTrafficState, nCommand ))
        == PACKET_OK )
    {
        /*
        **  Find out who it is addressed to, who it is from, and who we are.
        */
        mAddressee = ML3getAddresseeMAN ( pvPacketBuffer );
        mPacketSource  = ML3getSenderMAN ( (PVOID)pvPacketBuffer );

        /*
        **  Try and see if we can find the Addressee within our realm of
        **      knowledge.
        */
        if (( nRetCode = ML3nCheckPacketAddress ( pvPacketBuffer,
            nPacketLength, mAddressee )) == PACKET_OK )
        {
            /*
            **  Figure out the size of the data area and skip over it to the
            **      information within the packet.
            */
            nOffset = ML3getDataAreaOffset(pvPacketBuffer);
            nDataLength -= nOffset;
            pvPacketBuffer = (PBYTE)pvPacketBuffer + nOffset;

            nRetCode = ML3nProcessIncomingCommand ( nCommand, pvPacketBuffer,
                nPacketLength, mPacketSource );
        }
    }

    return ( nRetCode );
}



/*
**  @doc     INTERNAL NETWORK
**  @api     int | ML3nCheckForReturnedMpaks | Check to see if an MPAK
**               has been returned.
**  @parm    int | nTrafficState | Traffic state of the current packet.
**  @parm    int | nCommand | Command of the current packet.
**  @rdesc   This function returns one of the following values:
**  @flag    PACKET_OK | Packet has not been returned.
**  @flag    PACKET_EXTERNAL | ????
**  @flag    PACKET_INTERNAL | ????
*/
int     ML3nCheckForReturnedMpaks ( int nTrafficState, int nCommand )
{
int     nRetCode = PACKET_OK;

    /*
    **  Ignore returned packets.
    */
    switch ( nTrafficState )
    {
    case S_IN_MAIL :
    case S_NO_TRANSFER :
    case S_ILLEGAL :
    case S_CONGEST :
    case S_ERROR :
    case S_BUSY :
        /*
        **  If doing a login, this means it has failed...
```

```
        */
        if ( nCommand == N_LOGINREQ )
        {
            ML3nSetDoingLogin ( STATE_FAILED );
            nRetCode = ML3fGetMpakPassThrough ();
        }

        /*
        **  If doing a CONREQ, then it has failed...
        */
        if ( nCommand == N_CONREQ ||
             nCommand == N_SOSCONREQ ||
             nCommand == N_ADDCONREQ )
        {
            ML3nSetDoingConreq ( STATE_FAILED );
            nRetCode = ML3fGetMpakPassThrough ();
        }

        /*
        **  Make sure we get marked to be processed by the application.
        */
        nRetCode = PACKET_EXTERNAL;
    }
    return ( nRetCode );
}
```

```
#include    <stdlib.h>
#include    <string.h>
#include    <memory.h>

#include    "basetype.h"
#include    "mobilib.h"
#include    "enums.h"

#include    "network.h"
#include    "netint.h"
#include    "timing.h"
#include    "locks.h"
#include    "mpakxlat.h"

#include    "debug.h"

SET_LOCK_REF_FILE;

static boolean fUseFifoPackets = TRUE;


/*
**  @doc     INTERNAL NETWORK
**  @api     boolean | ML3fSetFifoPackets | Set the state of the fifo packets.
**  @rdesc   Returns the previous state of the flag.
*/
boolean     ML3fSetFifoPackets ( boolean fNewState )
{
boolean     fRetCode = fUseFifoPackets;

    fUseFifoPackets = fNewState;
    return ( fRetCode );
}


/*
**  @doc     INTERNAL NETWORK
**  @api     boolean | ML3fGetFifoPackets | Get the current state of the fifo
**               packets.
*/
boolean     ML3fGetFifoPackets ( void )
{
    return ( fUseFifoPackets );
}
```

File: src\NET15.C

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;

static boolean  fIsStartupDone = FALSE;
static boolean  fIsShutdownDone = FALSE;
static boolean  fAreDoingShutdown = FALSE;
static boolean  fNetworkLayerInitialized = FALSE;
static boolean  fNetworkConnection = FALSE;


/*
**  @doc    INTERNAL NETWORK
**  @api    boolean | ML3fSetStartupDone | Set the state of the network
**              startup.
**  @parm   boolean | fNewState | The new state for the startup.
**  @rdesc  This function returns the previous state of the flag.
*/
boolean     ML3fSetStartupDone ( boolean fNewState )
{
boolean     fRetCode = fIsStartupDone;

    fIsStartupDone = fNewState;
    return ( fRetCode );
}


/*
**  @doc    INTERNAL NETWORK
**  @api    boolean | ML3fGetStartupDone | Has the network layer finished
**              startup?
**  @rdesc  This function returns the current state of the flag.
*/
boolean     ML3fGetStartupDone ( void )
{
    return ( fIsStartupDone );
}

/*
**  @doc    INTERNAL NETWORK
**  @api    booolean | ML3fSetShutdownDone | Set the state for the network
**              shutdown.
**  @parm   boolean | fNewState | The new state for the shutdown.
**  @rdesc  This function returns the previous state of the flag.
*/
boolean     ML3fSetShutdownDone ( boolean fNewState )
{
boolean     fRetCode = fIsShutdownDone;

    fIsShutdownDone = fNewState;
    return ( fRetCode );
}


/*
**  @doc    INTERNAL NETWORK
**  @api    boolean | ML3fGetShutdownDone | Has the network layer finished
**              shutdown?
**  @rdesc  This function returns the current state of the flag.
*/
boolean     ML3fGetShutdownDone ( void )
{
    return ( fIsShutdownDone );
}


/*
**  @doc    INTERNAL NETWORK
**  @api    boolean | ML3fSetNetworkLayerInitialized | Set the state of the
**              network layer being installed.
**  @parm   boolean | fNewState | The new state for the initialization.
**  @rdesc  This function returns the previous state of the flag.
*/
boolean     ML3fSetNetworkLayerInitialized ( boolean fNewState )
{
boolean     fRetCode = fNetworkLayerInitialized;

    fNetworkLayerInitialized = fNewState;
    return ( fRetCode );
}


/*
**  @doc    INTERNAL NETWORK
**  @api    boolean | ML3fGetNetworkLayerInitialized | Is the network layer
**              currently initialized?
**  @rdesc  This function returns the current state of the flag.
*/
boolean     ML3fGetNetworkLayerInitialized ( void )
{
    return ( fNetworkLayerInitialized );
```

```
}

/*
**  @doc     INTERNAL NETWORK
**  @api     boolean | ML3fSetNetworkConnected | Set the state of the
**               network layer being connected.
**  @parm    boolean | fNewState | The new state for the connection.
**  @rdesc   This function returns the previous state of the flag.
*/
boolean      ML3fSetNetworkConnected ( boolean fNewState )
{
boolean      fRetCode = fNetworkConnection;

    fNetworkConnection = fNewState;
    return ( fRetCode );
}


/*
**  @doc     INTERNAL NETWORK
**  @api     boolean | ML3fGetNetworkConnected | Is the network layer
**               currently connected?
**  @rdesc   This function returns the current state of the flag.
*/
boolean      ML3fGetNetworkConnected ( void )
{
    return ( fNetworkConnection );
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;

static int      nLoginState = 0;
static int      nConreqState = 0;
static boolean  fIsRestartingNetwork = FALSE;



/*
**  @doc    INTERNAL NETWORK
**  @api    int | ML3nSetDoingLogin | Set the state of doing a login.
**  @parm   int | nNewState | The new state for doing a login.
**  @rdesc  This function returns the previous state of the flag.
*/
int         ML3nSetDoingLogin ( int nNewState )
{
int         nRetCode = nLoginState;

    nLoginState = nNewState;
    return ( nRetCode );
}


/*
**  @doc    INTERNAL NETWORK
**  @api    boolean | ML3fIsBusyDoingLogin | Is the network layer doing
**              a login?
**  @rdesc  This function returns the current state of the flag.
*/
boolean     ML3fIsBusyDoingLogin ( void )
{
    return ( (boolean)( nLoginState == STATE_BUSY ));
}

/*
**  @doc    INTERNAL NETWORK
**  @api    boolean | ML3fIsLoggedIn | Did the network layer do the login?
**  @rdesc  This function returns the current state of the flag.
*/
boolean     ML3fIsLoggedIn ( void )
{
    return ( (boolean)( nLoginState == STATE_ACTIVE ));
}


/*
**  @doc    INTERNAL NETWORK
**  @api    int | ML3nSetDoingConreq | Set the state of doing a conreq.
**  @parm   int | nNewState | The new state for doing a conreq.
**  @rdesc  This function returns the previous state of the flag.
*/
int         ML3nSetDoingConreq ( int nNewState )
{
int         nRetCode = nConreqState;

    nConreqState = nNewState;
    return ( nRetCode );
}


/*
**  @doc    INTERNAL NETWORK
**  @api    boolean | ML3fIsBusyDoingConreq | Is the network layer doing
**              a conreq?
**  @rdesc  This function returns the current state of the flag.
*/
boolean     ML3fIsBusyDoingConreq ( void )
{
    return ( (boolean)( nConreqState == STATE_BUSY ));
}


/*
**  @doc    INTERNAL NETWORK
**  @api    boolean | ML3fIsConreqOk | Did the network layer do the conreq?
**  @rdesc  This function returns the current state of the flag.
*/
boolean     ML3fIsLoggedOk ( void )
{
    return ( (boolean)( nConreqState == STATE_ACTIVE ));
}


/*
**  @doc    INTERNAL NETWORK
**  @api    boolean | ML3fSetRestartingNetwork | Set the state of the network
**              restarting.
```

```
**  @parm   boolean | fNewState | The new state for the restarting.
**  @rdesc  This function returns the previous state of the flag.
*/
boolean     ML3fSetRestartingNetwork ( boolean fNewState )
{
boolean     fRetCode = fIsRestartingNetwork;

    fIsRestartingNetwork = fNewState;
    return ( fRetCode );
}



/*
**  @doc    INTERNAL NETWORK
**  @api    boolean | ML3fGetRestartingNetwork | Has the network layer
**              restarted?
**  @rdesc  This function returns the current state of the flag.
*/
boolean     ML3fGetRestartingNetwork ( void )
{
    return ( fIsRestartingNetwork );
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;


static boolean  fPassAllMpaksThrough = FALSE;
static boolean  ML3networkBorn = 0;           /* -1 if requesting born, 0 if n
ot born, 1 if born accepted */


/*
**  @doc    INTERNAL NETWORK
**  @api    boolean | ML3fSetMpakPassThrough | Set the state of the MPAK
**              pass through.
**  @parm   boolean | fNewState | The new state for the MPAK passthrough.
**  @rdesc  This function returns the previous state of the flag.
*/
boolean     ML3fSetMpakPassThrough ( boolean fNewState )
{
boolean     fRetCode = fPassAllMpaksThrough;

    fPassAllMpaksThrough = fNewState;
    return ( fRetCode );
}


/*
**  @doc    INTERNAL NETWORK
**  @api    boolean | ML3fGetMpakPassThrough | Does the network layer pass
**              all MPAKs to the application?
**  @rdesc  This function returns the current state of the flag.
*/
boolean     ML3fGetMpakPassThrough ( void )
{
    return ( fPassAllMpaksThrough );
}
```

```
/*
**  @doc    INTERNAL NETWORK
**  @api    boolean | ML3fSetNetworkBorn | Set the state of the birth of the
**              network.
**  @parm   boolean | fNewState | The new state for the network birth.
**  @rdesc  This function returns the previous state of the flag.
*/
boolean     ML3fSetNetworkBorn ( boolean fNewState )
{
boolean     fRetCode = ML3networkBorn;

    ML3networkBorn = fNewState;
    return ( fRetCode );
}


/*
**  @doc    INTERNAL NETWORK
**  @api    boolean | ML3fGetNetworkBorn | Has the network been born?
**  @rdesc  This function returns the current state of the flag.
*/
boolean     ML3fGetNetworkBorn ( void )
{
    return ( ML3networkBorn );
}


/*
**  @doc    INTERNAL NETWORK PUBLIC
**  @api    int | ML3getNetworkPassthru | Outside version of
**              <a ML3fGetMpakPassThrough>.
**  @rdesc  This function returns the current state of the flag.
**  @comm   This function is provided for backwards compatibility.
*/
int         ML3getNetworkPassthru ( void )
{
    return ( ML3fGetMpakPassThrough ());
}


/*
**  @doc    INTERNAL NETWORK PUBLIC
**  @api    int | ML3setNetworkPassthru | Outside version of the function
**              <a ML3fSetMpakPassThrough>.
**  @parm   int | nSetValue | The new state for the MPAK passthrough.
**  @rdesc  This function returns the previous state of the flag.
**  @comm   This function is provided for backwards compatibility.
*/
int         ML3setNetworkPassthru ( int nSetValue )
{
    return ( (int)ML3fSetMpakPassThrough ( (boolean)nSetValue ));
}
```

Page 2 16 JUN 93 08:40 PM

File: src\NET1B.C

```
#include    <stdio.h>
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;

/*
**  current transferred subscription list, -1L means no entry
*/
static MAN      mFlexList[MAXFLEX] = {
                    MAN_NOENTRY, MAN_NOENTRY, MAN_NOENTRY, MAN_NOENTRY,
                    MAN_NOENTRY, MAN_NOENTRY, MAN_NOENTRY
                    };
static int      nLastFlexListEntry = 0;

static MAN      mFlexListRequestSource = MAN_NOENTRY;
static boolean  fGotFlexList  = FALSE;
static boolean  fGotFlexRequest   = FALSE;



/*
**  @doc    INTERNAL NETWORK
**  @api    int | ML3nScanFlexListForMan | Scan the flex list for a given MAN
**              number.
**  @parm   MAN | mNumber | Man number to scan the flexlist for.
**  @rdesc  The return value is -1 if the MAN number was not found, or an
**              index if it was found.
*/
int         ML3nScanFlexListForMan ( MAN mNumber )
{
int         nLoop;

    for ( nLoop=0; nLoop < MAXFLEX; ++nLoop )
        if ( mNumber == mFlexList [ nLoop ] )
            break;

    if ( nLoop >= MAXFLEX )
        nLoop = -1;
    return ( nLoop );
}



/*
**  @doc    INTERNAL NETWORK
**  @api    boolean | ML3fStoreManInFlexList | Store a man number in the flex
**              list.
**  @parm   MAN | mNumber | Man number to put in the flexlist.
**  @rdesc  The return value specifies the success of the operation.
*/
boolean     ML3fStoreManInFlexList ( MAN mNumber )
{
boolean     fRetCode = FALSE;
int         nMatch;

    if (( nMatch = ML3nScanFlexListForMan ( MAN_NOENTRY )) != MAN_NOENTRY )
    {
        mFlexList [ nMatch ] = mNumber;
        fRetCode = TRUE;
    }

    return ( fRetCode );
}



/*
**  @doc    INTERNAL NETWORK
**  @api    boolean | ML3fRemoveManFromFlexList | Remove a MAN number from
**              the flex list.
**  @parm   MAN | mNumber | Man number to remove from the flexlist.
**  @rdesc  The return value specifies the success of the operation.
*/
boolean     ML3fRemoveManFromFlexList ( MAN mNumber )
{
boolean     fRetCode = FALSE;
int         nMatch;

    if (( nMatch = ML3nScanFlexListForMan ( mNumber )) != MAN_NOENTRY )
    {
        mFlexList [ nMatch ] = MAN_NOENTRY;
        fRetCode = TRUE;
    }

    return ( fRetCode );
}



/*
**  @doc    INTERNAL NETWORK
**  @api    boolean | ML3fIsFlexListFull | Is the flex list full?
**  @rdesc  This function returns TRUE if the flex list is full.
*/
boolean     ML3fIsFlexListFull ( void )
{
```

```
boolean     fRetCode = FALSE;

    if ( ML3nScanFlexListForMan ( MAN_NOENTRY ) == MAN_NOENTRY )
        fRetCode = TRUE;

    return ( fRetCode );
}



/*
**  @doc    INTERNAL NETWORK
**  @api    void | ML3vCompressFlexList | Compress the flex list.
**  @comm   This function compresses the flex list such that all of the
**              empty entries are at the end of the list.
*/
void        ML3vCompressFlexList ( void )
{
int     nLoop, nCopy;

    for ( nLoop = nCopy = 0; nLoop < MAXFLEX; ++nLoop )
    {
        if ( mFlexList [ nLoop ] != MAN_NOENTRY )
            mFlexList [ nCopy++ ] = mFlexList [ nLoop ];
    }

    for ( nLoop = nCopy; nLoop < MAXFLEX; ++nLoop )
        mFlexList [ nLoop ] = MAN_NOENTRY;

    nLastFlexListEntry = nCopy;
}



/*
**  @doc    INTERNAL NETWORK
**  @api    int | ML3nSendFlexList | Send the flex list out to the radio.
**  @rdesc  This function returns the value passed back from
**              <a ML3pvtSendFlexList>.
*/
int         ML3nSendFlexList ( void )
{
    DEBUG_PRINTF((CSstr"Sending FLEXLIST: number %d, src %ld, dest %ld. ",
        nLastFlexListEntry, ML3getLocalMANnumber (), mFlexListRequestSource ));

    return ( ML3pvtSendFlexList ( mFlexList, nLastFlexListEntry,
        ML3getLocalMANnumber (), mFlexListRequestSource ));
}



/*
**  @doc    INTERNAL NETWORK
**  @api    void | ML3vClearFlexList | Set all of the entries in the flex
**              list to the default.
*/
void        ML3vClearFlexList ( void )
{
int         nLoop;

    for ( nLoop=0; nLoop < MAXFLEX; ++nLoop )
        mFlexList [ nLoop ] = MAN_NOENTRY;
}



/*
**  @doc    INTERNAL NETWORK
**  @api    void | ML3vSetFlexList | Set the flex list to the given packet.
**  @parm   PVOID | pvPacketBuffer | Pointer to the buffer to extract the
**              new flex list from.
*/
void        ML3vSetFlexList ( PVOID pvPacketBuffer )
{
int             nLoop;
int             nCount = *((PBYTE)pvPacketBuffer);
PMpakHeaderMAN  pmhmList = (PMpakHeaderMAN)(((PBYTE)pvPacketBuffer) + sizeof ( b
yte ));

    ML3vClearFlexList ();

    for ( nLoop = 0; nLoop < nCount && nLoop < MAXFLEX; nLoop++ )
    {
        ML3nGetPacketMan ( pmhmList, sizeof ( MpakHeaderMAN ),
            mFlexList + nLoop );
        pmhmList++;
    }
}



/*
**  @doc    INTERNAL NETWORK
**  @api    int | ML3nAddFlexListToString | Add the flex list to the given
**              string.
**  @parm   PSTR | pszString | String to add the list to.
**  @rdesc  This function returns the number of characters added to the
**              given string <p pszString>.
*/
int         ML3nAddFlexListToString ( PSTR pszString )
{
int         nLoop, nCount = 0, nMasterCount = 0;

    for ( nLoop = 0; nLoop < MAXFLEX; ++nLoop )
    {
        mlsprintf ( pszString, "%ld ", mFlexList [ nLoop ] );
        nCount += strlen ( pszString );
        nMasterCount += nCount;
        pszString += nCount;
    }
    return ( nMasterCount );
}
```

```
/*
**  @doc     INTERNAL NETWORK
**  @api     MAN | ML3mSetFlexRequestSource | Set the source of the flex
**               list request.
**  @parm    MAN | mNewValue | The new value for the source.
**  @rdesc   This function returns the previous source of the request.
*/
MAN          ML3mSetFlexRequestSource ( MAN mNewValue )
{
MAN          mRetCode = mFlexListRequestSource;

    mFlexListRequestSource = mNewValue;
    return ( mRetCode );
}


/*
**  @doc     INTERNAL NETWORK
**  @api     MAN | ML3mGetFlexRequestSource | What is the current source of
**               the flex request?
**  @rdesc   This function returns the current source of the request.
*/
MAN          ML3mGetFlexRequestSource ( void )
{
    return ( mFlexListRequestSource );
}


/*
**  @doc     INTERNAL NETWORK
**  @api     boolean | ML3fSetReceivedFlexList | Set the state of the received
**               a flexlist.
**  @parm    boolean | fNewState | The new state for the flexlist.
**  @rdesc   This function returns the previous state of the flag.
*/
boolean      ML3fSetReceivedFlexList ( boolean fNewState )
{
boolean      fRetCode = fGotFlexList;

    fGotFlexList = fNewState;
    return ( fRetCode );
}


/*
**  @doc     INTERNAL NETWORK
**  @api     boolean | ML3fGetReceivedFlexList | Have we received a flex list?
**  @rdesc   This function returns the current state of the flag.
*/
boolean      ML3fGetReceivedFlexList ( void )
{
    return ( fGotFlexList );
}

/*
**  @doc     INTERNAL NETWORK
**  @api     boolean | ML3fSetReceivedFlexListRequest | Set the state of the
**               received a flexlist request flag.
**  @parm    boolean | fNewState | The new state for the flexlist request.
**  @rdesc   This function returns the previous state of the flag.
*/
boolean      ML3fSetReceivedFlexListRequest ( boolean fNewState )
{
boolean      fRetCode = fGotFlexRequest;

    fGotFlexRequest = fNewState;
    return ( fRetCode );
}


/*
**  @doc     INTERNAL NETWORK
**  @api     boolean | ML3fGetReceivedFlexListRequest | Have we received a flex l
ist
**               request?
**  @rdesc   This function returns the current state of the flag.
*/
boolean      ML3fGetReceivedFlexListRequest ( void )
{
    return ( fGotFlexRequest );
}
```

```
#include    <stdio.h>
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;

/*
**  current local group MANs
*/
static MAN      mGroupList[MAXGROUP] = {
                    7L, /*ALL*/  MAN_NOENTRY, MAN_NOENTRY, MAN_NOENTRY,
                    MAN_NOENTRY, MAN_NOENTRY, MAN_NOENTRY, MAN_NOENTRY,
                    MAN_NOENTRY, MAN_NOENTRY, MAN_NOENTRY, MAN_NOENTRY,
                    MAN_NOENTRY, MAN_NOENTRY, MAN_NOENTRY
                    };
static boolean  fGotGroupList = FALSE;


/*
**  @doc    INTERNAL NETWORK
**  @api    int | ML3nScanGroupListForMan | Scan the group list for a given
**              MAN number.
**  @parm   MAN | mNumber | Man number to scan the mGroupList for.
**  @rdesc  The return value is -1 if the MAN number was not found, or an
**              index if it was found.
*/
int         ML3nScanGroupListForMan ( MAN mNumber )
{
int         nLoop;

    for ( nLoop=0; nLoop < MAXGROUP; ++nLoop )
        if ( mNumber == mGroupList [ nLoop ] )
            break;

    if ( nLoop >= MAXGROUP )
        nLoop = -1;
    return ( nLoop );
}

/*
**  @doc    INTERNAL NETWORK
**  @api    boolean | ML3fStoreManInGroupList | Store a man number in the group
**              list.
**  @parm   MAN | mNumber | Man number to put in the mGroupList.
**  @rdesc  The return value specifies the success of the operation.
*/
boolean     ML3fStoreManInGroupList ( MAN mNumber )
{
boolean     fRetCode = FALSE;
int         nMatch;

    if (( nMatch = ML3nScanGroupListForMan ( MAN_NOENTRY )) != MAN_NOENTRY )
    {
        mGroupList [ nMatch ] = mNumber;
        fRetCode = TRUE;
    }

    return ( fRetCode );
}


/*
**  @doc    INTERNAL NETWORK
**  @api    boolean | ML3fRemoveManFromGroupList | Remove a MAN number from
**              the group list.
**  @parm   MAN | mNumber | Man number to remove from the mGroupList.
**  @rdesc  The return value specifies the success of the operation.
*/
boolean     ML3fRemoveManFromGroupList ( MAN mNumber )
{
boolean     fRetCode = FALSE;
int         nMatch;

    if (( nMatch = ML3nScanGroupListForMan ( mNumber )) != MAN_NOENTRY )
    {
        mGroupList [ nMatch ] = MAN_NOENTRY;
        fRetCode = TRUE;
    }

    return ( fRetCode );
}


/*
**  @doc    INTERNAL NETWORK
**  @api    boolean | ML3fIsGroupListFull | Is the group list full?
**  @rdesc  This function returns TRUE if the group list is full.
*/
boolean     ML3fIsGroupListFull ( void )
{
boolean     fRetCode = FALSE;

    if ( ML3nScanGroupListForMan ( MAN_NOENTRY ) == MAN_NOENTRY )
```

```
        fRetCode = TRUE;

    return ( fRetCode );
}



/*
**  @doc     INTERNAL NETWORK
**  @api     void | ML3vClearGroupList | Set all of the entries in the group
**               list to the default.
*/
void        ML3vClearGroupList ( void )
{
int         nLoop;

    for ( nLoop=1; nLoop < MAXGROUP; ++nLoop )
        mGroupList [ nLoop ] = MAN_NOENTRY;
    mGroupList[0] = (MAN)7L;     // The "All-Terminals" group
}



/*
**  @doc     INTERNAL NETWORK
**  @api     void | ML3vSetGroupList | Set the group list to the given packet.
**  @parm    PVOID | pvPacketBuffer | Pointer to the buffer to extract the
**               new group list from.
*/
void        ML3vSetGroupList ( PVOID pvPacketBuffer )
{
int             nLoop;
int             nCount = *((PBYTE)pvPacketBuffer);
PMpakHeaderMAN  pmhmList = (PMpakHeaderMAN)(((PBYTE)pvPacketBuffer) + sizeof ( b
yte ));

    ML3vClearGroupList ();

    for ( nLoop = 0; nLoop < nCount && nLoop < MAXGROUP; nLoop++ )
    {
        ML3nGetPacketMan ( pmhmList, sizeof ( MpakHeaderMAN ),
            mGroupList + nLoop );
        pmhmList++;
    }
}



/*
**  @doc     INTERNAL NETWORK
**  @api     int | ML3nAddGroupListToString | Add the group list to the given
**               string.
**  @parm    PSTR | pszString | String to add the list to.
**  @rdesc   This function returns the number of characters added to the
**               given string <p pszString>.
*/
int         ML3nAddGroupListToString ( PSTR pszString )
{
int         nLoop, nCount = 0, nMasterCount = 0;

    for ( nLoop = 0; nLoop < MAXGROUP; ++nLoop )
    {
        nCount += mlsprintf ( pszString, "%ld ", mGroupList [ nLoop ]);
        pszString += nCount;
        nMasterCount += nCount;
    }

    return ( nMasterCount );
}



/*
**  @doc     INTERNAL NETWORK
**  @api     boolean | ML3fSetReceivedGroupList | Set the state of the received
**               a grouplist.
**  @parm    boolean | fNewState | The new state for the grouplist.
**  @rdesc   This function returns the previous state of the flag.
*/
boolean     ML3fSetReceivedGroupList ( boolean fNewState )
{
boolean     fRetCode = fGotGroupList;

    fGotGroupList = fNewState;
    return ( fRetCode );
}



/*
**  @doc     INTERNAL NETWORK
**  @api     boolean | ML3fGetReceivedGroupList | Have we received a
**               group list?
**  @rdesc   This function returns the current state of the flag.
*/
boolean     ML3fGetReceivedGroupList ( void )
{
    return ( fGotGroupList );
}
```

```
#include    <stdlib.h>
#include    <string.h>
#include    <memory.h>

#include    "basetype.h"
#include    "mobilib.h"
#include    "enums.h"
#include    "timing.h"
#include    "utils.hpc"
#include    "mpakxlat.h"
#include    "debug.h"
#include    "locks.h"
SET_LOCK_REF_FILE;

#include    "link.h"
#include    "network.h"
#include    "netint.h"



/*
**  @doc     INTERNAL NETWORK PUBLIC
**  @api     int | ML3okToTransmit | Is it okay to transmit now?
**  @rdesc   The return value specifies if it is okay to transmit a packet.
**  @comm    If the transmit status at the link layer indicates that
**               nothing is sending, then return TRUE, otherwise FALSE.
*/
int      ML3okToTransmit ( void )
{
    return ( !ML3fCheckForPacket ());
}



/*
**  @doc     INTERNAL NETWORK PUBLIC
**  @api     int | ML3nPutMpak | Try to transmit an MPAK.
**  @parm    int | nWaitForSentToNetwork | If non-zero, waits for a
**               sent-to-network.  Otherwise, just waits for a link transmit.
**  @parm    PVOID | pvPacketBuffer | Pointer to the buffer to send.
**  @parm    int | nPacketSize | Size of the buffer to send.
**  @rdesc   The return value specifies the result of the transmit:
**  @flag    N_MPAK_DONE | Successful transmit.
**  @flag    N_LINK_ERROR | LINK queue full.
**  @flag    N_BAD_PARMS | MPAK too small or too big.
**  @flag    N_TIMEOUT | Failed to transmit within timeout limits.
**  @flag    N_MPAK_SEND_ERROR | Radio returned packet as unsent or incorrect
**               MPAK.
**  @comm    Original: Try to transmit an MPAK through the LINK layer.  If the
**               packet is too short, signal a parameter error.  Otherwise,
**               try to transmit the packet through the link layer.  Time out
**               if we can't transmit due to a full LINK queue.  Otherwise
**               check the status and return our own status value if there
**               is something wrong with the packet.
**
**           Wait for completion, depending on the state of the
**               <p nWaitForSentToNetwork> flag.  If TRUE, we will wait for a
**               "sent to network" indication from the LINK layer.
**
**           Warning: Don't forget to turn off the LINK layer transmit
**               before returning ("ML2doneNetworkPacketSend()").
*/
int          ML3nPutMpak ( int nWaitForSentToNetwork, PVOID pvPacketBuffer,
                 int nPacketSize )
{
int     nRetCode;
boolean fTransmitTimerDone = FALSE;

    ALLOW_DEBUG ( TRUE );
    if ( !ML3fCanTransmit ())
    {
        nRetCode = N_LINK_ERROR;
        DEBUG_PRINTF((CSstr" Failed ML3nPutMpak: can't transmit "));
    }
    else
    {
        /*
        **  Set the timer, send the packet to link, and wait for the packet to
        **      be sent or for a timeout and kill the timer.
        */
        ML3fSetPacketSubmittedToLink ( FALSE );

        /*
        **  Submit the packet to the link layer.
        */
        nRetCode = ML2putNetworkPacket ( pvPacketBuffer, nPacketSize,
                                 (boolean)nWaitForSentToNetwork );
        ML3fSetPacketSubmittedToLink ( TRUE );
        DEBUG_PRINTF((CSstr" ML3nPutMpak: ML2pnp %s (%d)",
                         nRetCode?"OK":"Failed",nRetCode ));

        /*
        **  Act on the result of the transmission.
        **  Used to have ML2doneNetworkPacketSend, but removed cause in
        **      timer code.
        */
        if ( nRetCode )
        {   /*
            **  Always start the timer.  If blocking and the app needs
            **      to wait for a response ( not internal ), then wait.
            */
            ML3vStartTransmitTimer ();
            ML3fSetTransmitTimerActive ( TRUE );
            nRetCode = ML3nGetSendStatus();
        }
        else
        {
            nRetCode = N_BAD_PARMS;
            ML3fIncTxFailed ();
        }
    }
    ALLOW_DEBUG ( FALSE );
    return ( nRetCode );
}
```

```
/*
**  @doc    INTERNAL NETWORK
**  @api    boolean | ML3fCanTransmit | Is it okay to transport?
**              INTERNAL.
**  @rdesc  This function returns TRUE if it is okay to transmit.
**  @comm   It is okay to transmit if the network has finished startup and
**              the link layer is active and talking to us.
*/
boolean     ML3fCanTransmit ( void )
{
    return ( (boolean)( ML3fIsLinkActive () &&
        ML3fGetNetworkLayerInitialized ()));
}



/*
**  @doc    INTERNAL NETWORK PUBLIC
**  @api    int | ML3getSendStatus | Get the send status of a pending MPAK
**              transmission.
**  @rdesc  This function returns one of the following values:
**  @flag   N_MPAK_DONE | Successful transmit.
**  @flag   N_MPAK_SENDING | Still trying to send.
**  @flag   N_MPAK_GONE | Radio has it, but not STN yet.
**  @flag   N_TIMEOUT | No network response before timeout.
**  @flag   N_MPAK_SEND_ERROR | Radio returned MPAK.
**  @comm   Original: Checks the status of a pending MPAK transmission.
*/
int         ML3getSendStatus ( void )
{
    return ( ML3nGetSendStatus ());
}


/*
**  @doc    INTERNAL NETWORK PUBLIC
**  @api    void | ML3flushTransmitter | Flush the transmitter.
*/
void        ML3flushTransmitter ( void )
{
int     nStatus = ML3getSendStatus ();

    switch ( nStatus )
    {
    case N_MPAK_DONE :
    case N_TIMEOUT :
    case N_MPAK_SEND_ERROR :
        break;

    case N_MPAK_GONE :
    case N_MPAK_SENDING :
        /*
        **  cancel if it was not done
        */
        ML3vStopTransmitTimer ();
        ML3fSetTransmitTimerActive ( FALSE );
        ML2cancelNetworkPacket ();
        ML2doneNetworkPacketSend ();
        ML3nCheckSendStatus ( APP_SEND_DONE );
        break;
    }
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;


static boolean  fDiscardTimePackets = TRUE;



/*
**  @doc    INTERNAL NETWORK
**  @api    boolean | ML3fSetDiscardTimePackets | Set the state of the flag
**              that controls the discarding of time packets.
**  @parm   boolean | fNewState | The new state for the flag.
**  @rdesc  This function returns the previous state of the flag.
*/
boolean     ML3fSetDiscardTimePackets ( boolean fNewValue )
{
boolean     fOldValue = fDiscardTimePackets;

    fDiscardTimePackets = fNewValue;
    return ( fOldValue );
}



/*
**  @doc    INTERNAL NETWORK
**  @api    boolean | ML3fGetDiscardTimePackets | Does the network layer
**              discard any time packets that arrive for it?
**  @rdesc  This function returns the current state of the flag.
*/
boolean     ML3fGetDiscardTimePackets ( void )
{
    return ( fDiscardTimePackets );
}
```

```
#include    <stdlib.h>
#include    <string.h>
#include    <memory.h>
#include    <stdarg.h>

#include    "basetype.h"
#include    "mobilib.h"
#include    "enums.h"
#include    "timing.h"
#include    "mpakxlat.h"
#include    "debug.h"
#include    "locks.h"
SET_LOCK_REF_FILE;

#include    "link.h"
#include    "network.h"
#include    "netint.h"


#define QUEUE_SIZE        64

#define QUEUE_FULL      (((nQueueIn+1)%QUEUE_SIZE) == nQueueOut)
#define QUEUE_EMPTY     (nQueueOut == nQueueIn)
#define NEXT_QUEUE_IN   nQueueIn = (nQueueIn+1)%QUEUE_SIZE
#define NEXT_QUEUE_OUT  nQueueOut = (nQueueOut+1)%QUEUE_SIZE

static volatile int nNotifyQueue[QUEUE_SIZE];
static volatile int nQueueIn = 0;
static volatile int nQueueOut = 0;
static volatile int nNetNotifyBlocked = 0;

void        ML3vTransportNotify ( int nNotify );

extern void _far ML4transportNotify(int);
static void (_far * pfvTransportNotify)( int ) = ML4transportNotify;

/*
**  @doc    INTERNAL NETWORK
**  @api    void | ML3vTransportNotify | Network to transport notify mechanism.
**  @parm   int | nNotify | Notification code to pass up to the tranport
**              layer.
**  @comm   Queue up all notification requests that need to go up using
**              this function.
*/
void        ML3vTransportNotify ( int nNotify )
{
int         nKey;

    LOCK_EVERYTHING ( nKey );

    if ( !QUEUE_FULL )
    {
        nNotifyQueue[nQueueIn] = nNotify;
        NEXT_QUEUE_IN;
    }
    UNLOCK_EVERYTHING ( nKey );
}

/*
**  @doc    INTERNAL NETWORK
**  @api    void | ML3vSetTransportNotifyFunction | Set transport notify functio
n pointer.
**  @parm   void far (*pfvNotifyFunction)(int nNotify) | pfvNotifyFunction | poi
nter to transport
**                notification function
**  @comm   Use this for MPC to intercept the transport notify and re-route
**                based on the user's protocol selection.
*/
void
ML3vSetTransportNotifyFunction ( void (_far *pfvNotifyFunction)(int nNotify) )
{
    if ( pfvNotifyFunction != NULL )
        pfvTransportNotify = pfvNotifyFunction;
}


/*
**  @doc    INTERNAL NETWORK
**  @api    void | ML3vFlushNetworkNotifies | Flush all of the notifies up to
**              the transport layer.
**  @comm   This routine should be called as a complement to
**              <a vTransportNotify> from the timer routine.
*/
void        ML3vFlushNetworkNotifies ( void )
{
int         nKey;

    if ( nNetNotifyBlocked > 0 )
        return;

    LOCK_EVERYTHING ( nKey );

    while ( !QUEUE_EMPTY && nNetNotifyBlocked == 0 )
    {
        (*pfvTransportNotify)( nNotifyQueue[nQueueOut] );
        NEXT_QUEUE_OUT;
    }

    UNLOCK_EVERYTHING ( nKey );
}

int         ML3blockNetworkNotify( void )
{
    return( MincLock(&nNetNotifyBlocked) );
}

void        ML3unblockNetworkNotify( int key )
{
    int lock = MdecLock(&nNetNotifyBlocked) - 1;
    if ( key != lock )
        ;
    if ( nNetNotifyBlocked < 0 )
```

```
        nNetNotifyBlocked = 0;
}



/*
**  @doc     INTERNAL NETWORK
**  @api     void | ML3vRestartNetwork | Restart the network layer.
*/
void         ML3vRestartNetwork ( void )
{
    /*
    **  Try to start everything going.
    */
    ALLOW_DEBUG(TRUE);
    DEBUG_NOTIFY((CSstr"[NetRestart] "));
    ML3vTransportNotify ( RESTART_NETWORK );
}



/*
**  @doc     INTERNAL NETWORK
**  @api     void | ML3vStartupNetwork | Startup the network layer as a result
**               of initialization or a restart command.
*/
void         ML3vStartupNetwork ( void )
{
    /*
    **  Try to start everything going.
    */
    ALLOW_DEBUG(TRUE);
    DEBUG_NOTIFY((CSstr"[NetStartup] "));
    ML3vTransportNotify ( STARTED_NETWORK );
}



/*
**  @doc     INTERNAL NETWORK
**  @api     void | ML3vNetworkConnected | The network connection is active.
*/
void         ML3vNetworkConnected ( void )
{
    /*
    **  Try to start everything going.
    */
    ALLOW_DEBUG(TRUE);
    DEBUG_NOTIFY((CSstr"[NetConn] "));
    ML3vTransportNotify ( CONNECTION_ESTABLISHED );
    ML3vTransportNotify ( START_TRANSMIT );
}



/*
**  @doc     INTERNAL NETWORK
**  @api     void | ML3vNetworkDisconnected | The network connection is not
**               active.
*/
void         ML3vNetworkDisconnected ( void )
{
    /*
    **  Try to start everything going.
    */
    ALLOW_DEBUG(TRUE);
    DEBUG_NOTIFY((CSstr"[NetDisconn] "));
    ML3vTransportNotify ( STOP_TRANSMIT );
    ML3vTransportNotify ( CONNECTION_LOST );
}



void         ML3vReceivedMpak ( void )
{
    ALLOW_DEBUG(TRUE);
    DEBUG_NOTIFY((CSstr"[RecMpak] "));
    ML3vTransportNotify ( RECEIVED_MPAK );
}


void         ML3vSentToNetwork ( void )
{
    ALLOW_DEBUG(TRUE);
    DEBUG_NOTIFY((CSstr"[SentToNet] "));
    ML3vTransportNotify ( SENT_TO_NETWORK );
}

void         ML3vSendError ( void )
{
    ALLOW_DEBUG(TRUE);
    DEBUG_NOTIFY((CSstr"[SendError] "));
    ML3vTransportNotify ( SEND_ERROR );
}

void         ML3vNetworkFailed ( void )
{
    ALLOW_DEBUG(TRUE);
    DEBUG_NOTIFY((CSstr"[NetFailed] "));
    ML3vTransportNotify ( FAILED_NETWORK );
}
```

```
#include    <stdlib.h>
#include    <string.h>
#include    <memory.h>
#include    <stdarg.h>

#include    "basetype.h"
#include    "mobilib.h"
#include    "enums.h"
#include    "timing.h"
#include    "mpakxlat.h"
#include    "debug.h"
#include    "locks.h"
SET_LOCK_REF_FILE;

#include    "link.h"
#include    "network.h"
#include    "netint.h"


static int      nTxDone = 0, nTxFailed = 0;
static int      nRxMpak = 0;
static boolean  fIsLinkActive = FALSE;
static boolean  fInitFinished = FALSE;
static boolean  fShutdownFinished = FALSE;
//static boolean  fInternal;
static boolean  fSentToNetwork = TRUE;


/*
**  @doc    INTERNAL NETWORK PUBLIC
**  @api    void _far | ML3networkNotify | Callback routine for the notify
**              level.
**  @parm   Ncallback | nMessageType | Type of message passed up.
**  @comm   This routine should only be called by the link layer.
*/
void _far   ML3networkNotify ( Ncallback nMessageType, ... )
{
va_list     vlWalker;
MAN         mLinkManNumber;
boolean     fOldState;

    /*
    **  Debug information...
    */
    if ( !ML3fGetStartupDone () &&
        nMessageType != NFY_LINK_OPENED &&
        nMessageType != NFY_LINK_SET_MAN_NUMBER &&
        nMessageType != NFY_LINK_RXMPAK &&
        nMessageType != NFY_LINK_CLOSED )
    {
        if ( nMessageType == NFY_LINK_DISCONNECTED )
            ML3vNetworkFailed();

        #ifndef NO_DEBUG
            ALLOW_DEBUG(TRUE);
            DEBUG_NOTIFY((CSstr "[NetNfy %d ignored: startup %d, init %d,"
                    " connected %d] ", nMessageType,ML3fGetStartupDone (),
                    ML3fGetNetworkLayerInitialized (),
                    ML3fGetNetworkConnected () ));
        #endif
        return;
    }

    /*
    **  Start walking the pointer...
    */
    va_start ( vlWalker, nMessageType );

    switch( nMessageType )
    {
    case NFY_LINK_RXMPAK:
        ALLOW_DEBUG(TRUE);
        DEBUG_PRINTF((CSstr" NetNty: RXMPAK "));
        nRxMpak++;
        break;

    case NFY_LINK_TXDONE:
        ALLOW_DEBUG(TRUE);
        DEBUG_PRINTF((CSstr" NetNty: TXDONE "));
        nTxDone++;
//          fInternal = TRUE;

        /*
        **  By definition, if the transmission is done, then it has been sent
        **      to the network.
        */
        fSentToNetwork = TRUE;
        break;

    case NFY_LINK_TXFAILED:
        ALLOW_DEBUG(TRUE);
        DEBUG_PRINTF((CSstr" NetNty: TXFAILED "));
        nTxFailed++;
//          fInternal = TRUE;
        break;

    case NFY_LINK_OPENED:
        ALLOW_DEBUG(TRUE);
        DEBUG_PRINTF((CSstr" NetNty: OPENED "));

        ML3vResetLinkShutdownFinished ();
        ML3vResetLinkInitFinished ();
        ML3fSetNetworkLayerInitialized ( TRUE );
        ML3fSetStartupDone ( TRUE );
        ML3fSetShutdownDone ( TRUE );
        fInitFinished = TRUE;
        break;

    case NFY_LINK_CLOSED:
        ALLOW_DEBUG(TRUE);
        DEBUG_PRINTF((CSstr" NetNty: CLOSED "));

        ML3vResetLinkShutdownFinished ();
```

```
        ML3vResetLinkInitFinished ();
        ML3fSetNetworkLayerInitialized ( FALSE );
        ML3fSetShutdownDone ( TRUE );
        ML3fSetStartupDone ( TRUE );
        fShutdownFinished = TRUE;
        break;

    case NFY_LINK_NET_CONNECTED:
        ALLOW_DEBUG(TRUE);
        DEBUG_PRINTF((CSstr" NetNty: NET_CONN "));

        ML3vNetworkConnected();
        fIsLinkActive = TRUE;
        break;

    case NFY_LINK_NET_DISCONNECTED:
        ALLOW_DEBUG(TRUE);
        DEBUG_PRINTF((CSstr" NetNty: NET_DISC "));

        ML3vNetworkDisconnected ();
        fIsLinkActive = FALSE;
        break;

    case NFY_LINK_SET_MAN_NUMBER:
        ALLOW_DEBUG(TRUE);
        DEBUG_PRINTF((CSstr" NetNty: SET_MAN "));

        mLinkManNumber = va_arg ( vlWalker, MAN );
        DEBUG_PRINTF((CSstr"MAN = %lx ",mLinkManNumber));
        ML3vSetLocalManNumber ( mLinkManNumber );
        break;

    case NFY_LINK_CONNECTED:
        ALLOW_DEBUG(TRUE);
        DEBUG_PRINTF((CSstr" NetNty: CONN "));

        mLinkManNumber = va_arg ( vlWalker, MAN );
        DEBUG_PRINTF((CSstr"MAN = %lx ",mLinkManNumber));
        ML3vSetLocalManNumber ( mLinkManNumber );

        ML3fSetRestartingNetwork ( FALSE );
        ML3fSetNetworkConnected ( TRUE );

        ML3vStartupNetwork ();
        break;

    case NFY_LINK_DISCONNECTED:
        ALLOW_DEBUG(TRUE);
        DEBUG_PRINTF((CSstr" NetNty: DISC "));

        fOldState = ML3fGetRestartingNetwork();

        ML3fSetRestartingNetwork ( TRUE );
        ML3fSetNetworkConnected ( FALSE );
        ML3vResetTransmitTimeout ();

        ALLOW_DEBUG(TRUE);
        if ( fOldState )
        {
            DEBUG_PRINTF((CSstr" -->failed "));
            ML3vNetworkFailed();
        }
        else
        {
            DEBUG_PRINTF((CSstr" -->restart "));
            ML3vRestartNetwork ();
        }
        break;

    default:
        DEBUG_PRINTF((CSstr" NetNty: %d ", nMessageType ));
        break;
    }

    va_end ( vlWalker );
}


/*
**  @doc    INTERNAL NETWORK
**  @api    boolean | ML3fDecTxDone | Has network received a LINK_TXDONE?
**  @rdesc  The return value is TRUE if we have received a LINK_TXDONE from
**              the link layer.
**  @comm   This function checks the state of a counter that tells network
**              how many LINK_TXDONE's have been received and decrements it
**              if it is non-zero.
*/
boolean     ML3fDecTxDone ( void )
{
int     nKey;
boolean fRetCode = FALSE;

    LOCK_EVERYTHING ( nKey );
    if ( nTxDone )
    {
        nTxDone--;
        fRetCode = TRUE;
    }
    UNLOCK_EVERYTHING ( nKey );
    return ( fRetCode );
}


void        ML3fIncTxDone ( void )
{
    nTxDone++;
//    fInternal = FALSE;
}


void        ML3fIncTxFailed ( void )
```

```
{
    nTxFailed++;
//    fInternal = FALSE;
}


//boolean     ML3fWasTxInternal ( void )
//{
//    return ( fInternal );
//}


/*
**  @doc    INTERNAL NETWORK
**  @api    boolean | ML3fAnyTxDone | Has network received a LINK_TXDONE?
**  @rdesc  The return value is TRUE if we have received a LINK_TXDONE from
**              the link layer.
*/
boolean     ML3fAnyTxDone ( void )
{
    return ( (boolean)( nTxDone > 0 ));
}


/*
**  @doc    INTERNAL NETWORK
**  @api    boolean | ML3fDecTxFailed | Has network received a LINK_TXFAILED?
**  @rdesc  The return value is TRUE if we have received a LINK_TXFAILED from
**              the link layer.
**  @comm   This function checks the state of a counter that tells network
**              how many LINK_TXFAILED's have been received and decrements it
**              if it is non-zero.
*/
boolean     ML3fDecTxFailed ( void )
{
int     nKey;
boolean fRetCode = FALSE;

    LOCK_EVERYTHING ( nKey );
    if ( nTxFailed )
    {
        nTxFailed--;
        fRetCode = TRUE;
    }
    UNLOCK_EVERYTHING ( nKey );
    return ( fRetCode );
}


/*
**  @doc    INTERNAL NETWORK
**  @api    boolean | ML3fAnyTxFailed | Has network received a LINK_TXFAILED?
**  @rdesc  The return value is TRUE if we have received a LINK_TXFAILED from
**              the link layer.
*/
boolean     ML3fAnyTxFailed ( void )
{
    return ( (boolean)( nTxFailed > 0 ));
}


/*
**  @doc    INTERNAL NETWORK
**  @api    boolean | ML3fIsLinkActive | Has the link layer told us it's
**              active.
**  @rdesc  This function returns TRUE if the link layer has told us that it
**              is active.
*/
boolean     ML3fIsLinkActive ( void )
{
    return ( fIsLinkActive );
}


/*
**  @doc    INTERNAL NETWORK
**  @api    boolean | ML3fDecRxMpak | Has network received a LINK_MPAK?
**  @rdesc  The return value is TRUE if we have received a LINK_MPAK from
**              the link layer.
**  @comm   This function checks the state of a counter that tells network
**              how many LINK_MPAK's have been received and decrements it
**              if it is non-zero.
*/
boolean     ML3fDecRxMpak ( void )
{
int     nKey;
boolean fRetCode = FALSE;

    LOCK_EVERYTHING ( nKey );
    if ( nRxMpak )
    {
        nRxMpak--;
        fRetCode = TRUE;
    }
    UNLOCK_EVERYTHING ( nKey );
    return ( fRetCode );
}


/*
**  @doc    INTERNAL NETWORK
**  @api    boolean | ML3fAnyRxMpak | Has network received a LINK_MPAK?
**  @rdesc  The return value is TRUE if we have received a LINK_MPAK from
**              the link layer.
*/
boolean     ML3fAnyRxMpak ( void )
{
```

```
    return ( (boolean)( nRxMpak > 0 ));
}


/*
**  @doc    INTERNAL NETWORK
**  @api    boolean | ML3fIsInitFinished | Has the link layer finished
**              doing the shutdown procedure?
**  @rdesc  This function returns TRUE if the link layer has finished.
*/
boolean     ML3fIsLinkInitFinished ( void )
{
    return ( fInitFinished );
}


/*
**  @doc    INTERNAL NETWORK
**  @api    void | ML3vResetInitFinished | Reset the shutdown finished
**              flag.
*/
void        ML3vResetLinkInitFinished ( void )
{
    fInitFinished = FALSE;
}


/*
**  @doc    INTERNAL NETWORK
**  @api    boolean | ML3fIsShutdownFinished | Has the link layer finished
**              doing the shutdown procedure?
**  @rdesc  This function returns TRUE if the link layer has finished.
*/
boolean     ML3fIsLinkShutdownFinished ( void )
{
    return ( fShutdownFinished );
}


/*
**  @doc    INTERNAL NETWORK
**  @api    void | ML3vResetShutdownFinished | Reset the shutdown finished
**              flag.
*/
void        ML3vResetLinkShutdownFinished ( void )
{
    fShutdownFinished = FALSE;
}


/*
**  @doc    INTERNAL NETWORK
**  @api    boolean | ML3fIsSentToNetwork | Has the link layer finished
**              sending the packet to the network?
**  @rdesc  This function returns TRUE if the link layer has finished.
*/
boolean     ML3fIsSentToNetwork ( void )
{
    return ( fSentToNetwork );
}


/*
**  @doc    INTERNAL NETWORK
**  @api    void | ML3vResetSentToNetwork | Reset the sent to network flag.
*/
void        ML3vResetSentToNetwork ( void )
{
    fSentToNetwork = FALSE;
}
```

```
#include    <stdio.h>
#include    <stdlib.h>
#include    <string.h>
#include    <memory.h>
#include    <ctype.h>

#include    "basetype.h"
#include    "mobilib.h"
#include    "enums.h"

#include    "link.h"
#include    "network.h"
#include    "netint.h"
#include    "timing.h"
#include    "mpakxlat.h"


/**********************************************************
 *                                                        *
 *     Information Structure for this Layer               *
 *                                                        *
 **********************************************************/

static MLInfoStruct misNetworkLayer = {
    0x03,                   /* Version  */
    0x00,                   /* Revision */
    0x00,                   /* Update   */
    0x00,                   /* ID high  */
    0x00,                   /* ID low   */
    21,12,0x07,0xC7,        /* Day, Month, Year (1991 = 0x07C7) */
    "Research in Motion;Network Layer drivers"
    };


/*
** @doc     INTERNAL NETWORK PUBLIC
** @api     void | ML3getNetworkLayerVersionInfo | Get information about the
**              network layer currently in use.
** @parm    MLInfoStruct | pmisFill | Pointer to a structure to fill with
**              information about the network layer.
** @comm    WARNING: The destination structure should be at least
**              sizeof(MLInfoStruct) bytes long.
*/
void        ML3getNetworkLayerVersionInfo ( PMLInfoStruct pmisFill )
{
    *pmisFill = misNetworkLayer;
}



/*
** @doc     INTERNAL NETWORK PUBLIC
** @api     int | ML3getNetworkLayerParameters | Generate the layer
**              parameter string.
** @parm    PSTR | pszString | String to dump the info to. If this is NULL,
**              the maximum length of the string is returned.
** @rdesc   This function returns 0 or the maximum string length.
** @comm    Original: Access mechanism for Layer parameter string.
**              Can be called to get the maximum length of the parameter
**              string, or to get a copy of the string.
**
**          The parameter string has the format:
**
**              "FLEXLIST %ld %ld %ld %ld %ld %ld %ld GROUPLIST \
**              %ld %ld %ld %ld %ld %ld %ld %ld %ld %ld %ld %ld %ld %ld %ld \
**
**          The MAN numbers will be -1 not used or if no network startup
**              has yet occurred.
*/
int     ML3getNetworkLayerParameters ( PSTR pszString )
{
    if ( pszString == NULL )
        return(245);

    pszString += mlsprintf ( pszString, "FLEXLIST " );
    pszString += ML3nAddGroupListToString ( pszString );
    pszString += mlsprintf ( pszString, " GROUPLIST " );
    pszString += ML3nAddFlexListToString ( pszString );

    return(N_OK);
}



/*
** @doc     INTERNAL NETWORK PUBLIC
** @api     int | ML3setNetworkLayerParameters | Set the network parms.
** @parm    PSTR | pszString | Pointer to a string to set the parameters from.
**              If it is NULL, then the flex list and group list are reset
**              and the local MAN number is fetched from the link layer.
** @rdesc   The return code specifies the status of the operation.
** @flag    N_OK | Success.
** @flag    N_BAD_PARMS | Bad parameter string.
** @comm    Original: Access mechanism for Layer parameter string.
**              Is used to set the network layer parameters PRIOR to
**              calling the initialization function
**              <a ML3installNetworkLayer>.
**
**          The parameter string has the same format that is used for
**              <a ML3getNetworkLayerParameters>.  These values should be
**              the values obtained by the network layer during a previous
**              session, and written to a storage device using the string
**              obtained from <a ML3getNetworkLayerParameters>.
*/
int         ML3setNetworkLayerParameters ( PSTR pszString )
{
PSTR        pszEnd;
MAN         cmTempFlexList [ MAXFLEX ];
MAN         cmTempGroupList [ MAXGROUP ];
int         nLoop;
extern long int mlstrtol( char *s, char **ret, int base );

    /*
```

```
**  Clear the lists.
*/
ML3vClearFlexList ();
ML3vClearGroupList ();

/*
**  If a null string, then just clear the lists, set the man number and
**      exit successfully.
*/
if ( pszString == NULL || *pszString == '\0' )
    return( N_OK );

/*
**  parse the FLEXLIST portion of the line; first skip the
**      header, then skip whitespace & get the number, then
**      skip to next whitespace.
*/
if ( strncmp(pszString,"FLEXLIST ",9) != 0 )
    return(N_BAD_PARMS);

for ( nLoop = 0, pszString += 9; *pszString && nLoop < 7; ++nLoop )
{
    while ( isspace(*pszString) )
        ++pszString;
    if ( !*pszString )
        return(N_BAD_PARMS);
    cmTempFlexList[nLoop] = mlstrtol(pszString, &pszEnd, 16);
    if ( cmTempFlexList[nLoop] == 0L )
        return( N_BAD_PARMS );
    pszString = pszEnd;
}

/*
**  skip over trailing whitespace
*/
while ( *pszString && isspace(*pszString) )
    ++pszString;

/*
**  parse the GROUPLIST portion of. the line; first skip the
**      header, then skip whitespace & get the number, then
**      skip to next whitespace
*/
if ( strncmp(pszString,"GROUPLIST ",10) != 0 )
    return(N_BAD_PARMS);
for ( nLoop = 0, pszString += 10; *pszString && nLoop < 15; ++nLoop )
{
    while ( isspace(*pszString) )
        ++pszString;
    if ( !*pszString )
        return(N_BAD_PARMS);
    cmTempGroupList[nLoop] = mlstrtol(pszString, &pszEnd, 16);
    pszString = pszEnd;
    if ( cmTempGroupList[nLoop] == 0L )
        return( N_BAD_PARMS );
}

/*
**  skip over trailing whitespace
*/
while ( *pszString && isspace(*pszString) )
    ++pszString;

/*
**  Store the local lists in their proper locations.
*/
for ( nLoop = 0; nLoop < MAXFLEX; ++nLoop )
    ML3fStoreManInFlexList ( cmTempFlexList [ nLoop ] );

for ( nLoop = 0; nLoop < MAXGROUP; ++nLoop )
    ML3fStoreManInGroupList ( cmTempGroupList [ nLoop ] );

return( N_OK );
}
```

```
#include    <stdlib.h>
#include    <string.h>
#include    <memory.h>

#include    "basetype.h"
#include    "mobilib.h"
#include    "enums.h"
#include    "timing.h"
#include    "mpakxlat.h"
#include    "debug.h"

#include    "network.h"
#include    "netint.h"


/*
**  @doc    INTERNAL NETWORK
**  @api    int | ML3nCheckSendStatus | Can we send a packet now?
**  @parm   int | nAction | Action to check for.
**  @rdesc  The return value is one of the following:
**  @flag   OK_TO_SEND | It is okay to send now.
**  @flag   CANT_SEND_NOW | Is is not okay to send now.
*/
int         ML3nCheckSendStatus ( int nAction )
{
static int  nInGetPacketStatus = 0;
static int  nTransmitState = IDLE;
int         nRetCode = OK_TO_SEND;

    /*
    **  If we can't get in with a 0 count, block the transmit.
    */

    ALLOW_DEBUG(TRUE);
    DEBUG_PRINTF((CSstr" CSS: A:%d, ST:%d->",nAction,nTransmitState));

    if ( MgrabLock ( &nInGetPacketStatus ))
    {
        DEBUG_STRING((CSstr"!"));
        nRetCode = CANT_SEND_NOW;
    }
    else
    {
        switch ( nTransmitState )
        {

        /*
        **  Transmitter is currently idle.
        */
        case IDLE:
            switch ( nAction )
            {
            /*
            **  Ok to send for these four, the last two changing states.
            */
            case APP_SEND_DONE:
            case RESTART_DONE:
                break;

            case RESTART_CHECK:
                nTransmitState = NET_STARTING;
                break;

            case APP_SEND_CHECK:
                nTransmitState = APP_SEND;
                break;

            default:
                break;  // shouldn't happen!
            }
            break;

        /*
        **  Have an app send and a net start request.
        */
        case APP_SEND_AND_NET_START_REQ:
            switch ( nAction )
            {
            case APP_SEND_DONE :
                // NET_START was pending on APP send!
                nTransmitState = NET_STARTING;
                break;

            case RESTART_DONE :
                nTransmitState = IDLE;
                break;  // it is OK to send again.

            case RESTART_CHECK :
            case APP_SEND_CHECK :
                nRetCode = CANT_SEND_NOW;  // NOT ok to send
                break;

            default :
                nAction -= AS_STATUS_OFFSET;
                switch ( nAction ) {
                    case N_BAD_PARMS :
                    case N_MPAK_BLOCKED :
                    case N_MPAK_REFUSED :
                    case N_LINK_ERROR :
                    case N_MPAK_DONE :
                    default :
                        // NET_START was pending on APP send!
                        nTransmitState = NET_STARTING;
                        break;

                    case N_MPAK_GONE :
                    case N_MPAK_SENDING :
                        break;
                }
                break;
            }
            break;
```

```
    /*
    **  Have an app send pending...
    */
    case APP_SEND:
        switch ( nAction )
        {
            case APP_SEND_DONE :
            case RESTART_DONE :
                nTransmitState = IDLE;
                break;  // it is OK to send again.

            case RESTART_CHECK :
                // change states to cause auto-switch to NET_STARTING...
                nTransmitState = APP_SEND_AND_NET_START_REQ;

            case APP_SEND_CHECK :
                nRetCode = CANT_SEND_NOW;  // NOT ok to send
                break;

            default :
                nAction -= AS_STATUS_OFFSET;
                switch ( nAction )
                {
                    case N_BAD_PARMS :
                    case N_MPAK_BLOCKED :
                    case N_MPAK_REFUSED :
                    case N_LINK_ERROR :
                    case N_MPAK_DONE :
                    default :
                        nTransmitState = IDLE;
                        break;

                    case N_MPAK_GONE :
                    case N_MPAK_SENDING :
                        break;
                }
                break;
            }
        break;

    /*
    **  Have the network starting...
    */
    case NET_STARTING :
        switch ( nAction )
        {
            case APP_SEND_DONE :
                break;  // shouldn't happen!

            case RESTART_DONE :
                nTransmitState = IDLE;
                break;  // it is OK for APP to send again.

            case RESTART_CHECK :
                break;  // it is OK for restart to transmit

            case APP_SEND_CHECK :
                nRetCode = CANT_SEND_NOW;  // NOT ok for APP to send
                break;

            default :
                break;  // shouldn't happen!
        }
        break;

    /*
    **  Paranoia, shouldn't get here.
    */
    default :
        nTransmitState = IDLE;
        break;
    }
  }

  /*
  **  Free the lock and return the status.
  */
  MfreeLock(&nInGetPacketStatus);
  DEBUG_PRINTF((CSstr"ST:%d, ret %s ",nTransmitState,nRetCode==OK_TO_SEND?"OK"
:"NOSEND"));
  return( nRetCode );
}
```

```
#include    <stdlib.h>
#include    <string.h>
#include    <memory.h>

#include    "basetype.h"
#include    "mobilib.h"
#include    "enums.h"

#include    "link.h"
#include    "network.h"
#include    "netint.h"

#include    "timing.h"
#include    "utils.hpc"
#include    "mpakxlat.h"
#include    "locks.h"

#include    "debug.h"

SET_LOCK_REF_FILE;



/*
**  @api     int | ML3nCheckPacketAddress | Check for a valid packet address.
**  @parm    PVOID | pvPacketBuffer | Pointer to the buffer for the packet.
**  @parm    int | nPacketLength | Length of <p pvPacketBuffer>.
**  @parm    MAN | mAddressee | Who the packet is addressed to.
**  @rdesc   The function returns one of the following code:
**  @flag    PACKET_OK | Packet has a valid address.
**  @flag    PACKET_INTERNAL | ???
**  @flag    PACKET_EXTERNAL | ???
**  @flag    PACKET_ERROR | ???
*/
int     ML3nCheckPacketAddress ( PVOID pvPacketBuffer, int nPacketLength,
            MAN mAddressee )
{
int     nStatus, nRetCode = PACKET_OK;

    /*
    **  check for correct addressee.  If not for us, ignore it!
    */
    if ( mAddressee != ML3getLocalMANnumber ())
    {
        DEBUG_PRINTF((CSstr" <ML3ciMPAK: addressed to %lx, I'm %lx ",
                      mAddressee, ML3getLocalMANnumber () ));

        /*
        **  Try to find the addressee in the flex list, then the group list.
        */
        if ( ML3nScanFlexListForMan ( mAddressee ) == -1 )
        {
            if ( ML3nScanGroupListForMan ( mAddressee ) == -1 )
            {
                /*
                **  error! not an allowed MAN number
                */
                DEBUG_PRINTF((CSstr" is not me, ",mAddressee));

                /*
                **  Already marked as UNKNOWN.  Discard the packet!
                */
                if ( ML3getSubscriptionFlags(pvPacketBuffer) & UNKNOWN_F )
                {
                    DEBUG_PRINTF((CSstr " already UNKNOWN, discarding> ",
                        mAddressee ));
                    nRetCode = PACKET_INTERNAL;
                }

                /*
                **  See if we can transmit now, if not wait.
                */
                else if ( !ML3okToTransmit ())
                {
                    DEBUG_PRINTF((CSstr" can't return it now...> "));
                    nRetCode = PACKET_ERROR;
                }

                /*
                **  Try and return the packet.
                */
                else if (( nStatus = ML3returnMPAKasUnknown ( pvPacketBuffer,
                    nPacketLength )) != N_MPAK_DONE )
                {
                    DEBUG_PRINTF((CSstr " tried to return it, nStatus=%d, "
                        "ML3fGetMpakPassThrough =%d> ",
                        nStatus, ML3fGetMpakPassThrough () ));
                    nRetCode = ML3fGetMpakPassThrough ();
                }
                DEBUG_PRINTF((CSstr" returned the packet> "));
            }
        }
    }

    return ( nRetCode );
}



int     ML3nProcessIncomingCommand ( int nCommand, PVOID pvPacketBuffer,
            int nPacketLength, MAN mPacketSource )
{
int     nRetCode = PACKET_OK;

    /*
    **  Respond to any incoming MPAKs.
    */
    DEBUG_PRINTF((CSstr " scanning the packet, nCommand %d> ", nCommand ));
    switch ( nCommand )
    {

    /*
    **  Update our local group list.
```

```
*/
case N_GROUPLIST:
    ML3vSetGroupList ( pvPacketBuffer );

    /*
    **  we're trying to send an ACTIVE packet; cancel it
    **      since the radio has restarted for some reason
    */
    if ( !ML3fIsLinkActive ())
        ML2cancelNetworkPacket();

    /*
    **  If startup isn't done, absorb the grouplist.
    */
    ML3fSetReceivedGroupList ( TRUE );
    nRetCode = PACKET_INTERNAL;
    break;

/*
**  Send our local flex list...
*/
case N_FLEXREQ:
    /*
    **  Set the flags and compress the list.
    */
    ML3mSetFlexRequestSource ( mPacketSource );
    ML3vCompressFlexList ();
    ML3fSetReceivedFlexListRequest ( TRUE );

    /*
    **  Check to see if we can transmit...
    */
    if ( !ML3okToTransmit ())
    {
        /*
        **  we're trying to send an ACTIVE packet; cancel it
        **      since the radio has restarted for some reason
        */
        if ( !ML3fIsLinkActive ())
        {
            if ( ML3fAnyRxMpak ())
                ML2cancelNetworkPacket();
        }
        nRetCode = PACKET_ERROR;
    }
    else
    {
        /*
        **  If we haven't finished startup, absorb the FLEXREQ..
        */
        if ( !ML3fGetStartupDone ())
            nRetCode = PACKET_INTERNAL;
        else
        {
            DEBUGS(("   Sending FLEXLIST\n"));

            /*
            **  Try and send the FLEXLIST...
            */
            if ( ML3nSendFlexList () != N_MPAK_DONE )
            {
                DEBUGS(("   Couldn't send FLEXLIST\n"));
            }
            else
            {
                DEBUGS(("   Sent FLEXLIST\n"));
            }
            nRetCode = ML3fGetMpakPassThrough ();
        }
    }
    break;

/*
**  Update the local flex list.
*/
case N_FLEXLIST:
    ML3fSetReceivedFlexList ( TRUE );
    ML3vSetFlexList ( pvPacketBuffer );

    /*
    **  If we haven't finished, startup, absorb the packet.
    */
    nRetCode = PACKET_INTERNAL;
    break;

/*
**  Need to send a roam to the radio as this is a ROAM order(?)
*/
case N_ROAMORD:
    if ( !ML3okToTransmit ())
        nRetCode = PACKET_ERROR;
    else
    {
        ML3pvtSendRoam();
        nRetCode = ML3fGetMpakPassThrough ();
    }
    break;

/*
**  Ignore this request...
*/
case N_INFOREQ:
    nRetCode = ML3fGetMpakPassThrough ();
    break;

/*
**  LOGIN granted, store in flex list.
**
**  Should really do a notify at this point to tell the user the result
**      of the login.
*/
case N_LOGINGRA:
    ML3fStoreManInFlexList ( mPacketSource );
    ML3nSetDoingLogin ( STATE_SUCCESS );
```

```
        nRetCode = ML3fGetMpakPassThrough ();
        break;

    /*
    ** LOGIN refused or returned
    **
    ** Should really do a notify at this point to tell the user the result
    **     of the login.
    */
    case N_LOGINREQ :       /* LOGIN returned */
    case N_LOGINREF :       /* LOGIN refused  */
        ML3nSetDoingLogin ( STATE_FAILED );
        nRetCode = ML3fGetMpakPassThrough ();
        break;

    /*
    ** Network has died.
    */
    case N_DIE :
        ML3vSetNetworkLive ( FALSE );
        nRetCode = ML3fGetMpakPassThrough ();
        break;

    /*
    ** Network is live again.
    */
    case N_LIVE :
        ML3vSetNetworkLive ( TRUE );
        nRetCode = ML3fGetMpakPassThrough ();
        break;

    /*
    ** Logout order, remove from flex list.
    */
    case N_LOGOUTORD : /* LOGOUT by Network, remove from flex list */
        ML3fRemoveManFromFlexList ( mPacketSource );
        nRetCode = ML3fGetMpakPassThrough ();
        break;

    /*
    ** Network time packet.
    */
    case N_TIME:
        nRetCode = (int)(!ML3fGetDiscardTimePackets ());
        break;

    /*
    ** All other cases should be returned to the application.
    */
    default:
        nRetCode = PACKET_EXTERNAL;
        break;
    }

    return ( nRetCode );
}
```

```
#include    <stdlib.h>
#include    <string.h>
#include    <memory.h>

#include    "basetype.h"
#include    "mobilib.h"
#include    "enums.h"
#include    "timing.h"
#include    "utils.hpc"
#include    "mpakxlat.h"
#include    "debug.h"
#include    "locks.h"
SET_LOCK_REF_FILE;

#include    "link.h"
#include    "network.h"
#include    "netint.h"



/*
**  @doc    INTERNAL NETWORK PUBLIC
**  @api    void | ML3removeNetworkLayer | Remove the network layer.
**  @comm   Original: De-installs the network layer & below.
*/
void        ML3removeNetworkLayer ( void )
{
    /*
    **  don't do this more than once
    */
    if ( !ML3fGetNetworkLayerInitialized ())
        return;

    ML2removeLinkLayer();

    ML3vRemoveTimers();

    /*
    **  clear everything local to prevent a possible restart
    */
    ML3vClearFlexList ();
    ML3vClearGroupList ();

    ML3fSetStartupDone ( FALSE );

    ML3fSetShutdownDone ( FALSE );

    ML3nSetDoingLogin ( STATE_INACTIVE );
    ML3fSetNetworkBorn ( 0 );

    ML3vSetLocalManNumber ( -1L );

    ML3vRemoveRxQueues();

    ML3fSetNetworkConnected ( FALSE );

    ML3fSetNetworkLayerInitialized ( FALSE );
}


/*
**  @doc    INTERNAL NETWORK PUBLIC
**  @api    int | ML3shutdownNetworkLayer | Shutdown the network connection.
**  @rdesc  The return value for this function is one of the following:
**  @flag   N_OK | Shutdown has begun.
**  @flag   N_LINK_ERROR | No response from the link layer.
**  @flag   N_FAILED | Network is not running.
**  @comm   Original: First, set the local connection to "inactive".  Then,
**              call the link layer function <a ML2shutdownLinkLayer>
**              to terminate the link connection.
**
**          Returns OK only if the network layer shutdown HAS BEGUN.  You
**              must call "ML3isShutdownDone()" to determine if it has
**              completed.
**
**          The network layer must be kept running by calling
**              <a ML3isMPAKavailable> frequently to allow the low-level
**              network MPAKs and LINK layer frames to be queued and
**              handled locally.
*/
int         ML3shutdownNetworkLayer ( void )
{
int     nRetCode = N_OK;

    if( !ML3fGetNetworkLayerInitialized ())
        nRetCode = N_FAILED;
    else
    {
        ML3fSetShutdownDone ( FALSE );
        ML3vResetLinkShutdownFinished ();
        ML2vCloseLinkLayer ();
    }

    return ( nRetCode );
}


/*
**  @doc    INTERNAL NETWORK PUBLIC
**  @api    int | ML3isShutdownDone | Has the shutdown finished?
**  @rdesc  This function returns TRUE if shutdown has completed.
*/
int         ML3isShutdownDone ( void )
{
    if ( !ML3fGetNetworkLayerInitialized ())
        return( TRUE );

    return ( ML3fGetShutdownDone ());
}
```

```
#include    <stdlib.h>
#include    <string.h>
#include    <memory.h>

#include    "basetype.h"
#include    "mobilib.h"
#include    "enums.h"

#include    "network.h"
#include    "mpakxlat.h"



/*
**  @doc    INTERNAL NETWORK
**  @api    int | ML3nSetPacketByte | Set the data in a buffer to a specified
**              byte value.
**  @parm   PVOID | pvPacketBuffer | Pointer to a buffer to place the
**              byte in.
**  @parm   int | nPacketBufferSize | Size of buffer <p pvPacketBuffer>.
**  @parm   byte | bInputData | Byte of information to place into the buffer.
**  @rdesc  This function returns the number of bytes placed within the
**              buffer <p pvPacketBuffer>.
*/
int     ML3nSetPacketByte ( PVOID pvPacketBuffer, int nPacketBufferSize,
            byte bInputData )
{
PBYTE   pbBuffer = pvPacketBuffer;

    *pbBuffer = bInputData;
    return ( sizeof ( byte ));
}



/*
**  @doc    INTERNAL NETWORK
**  @api    int | ML3nSetPacketInt | Set the data in a buffer to a specified
**              integer value.
**  @parm   PVOID | pvPacketBuffer | Pointer to a buffer to place the
**              integer in.
**  @parm   int | nPacketBufferSize | Size of buffer <p pvPacketBuffer>.
**  @parm   int | nInputData | Integer of information to place into the
**              buffer.
**  @rdesc  This function returns the number of bytes placed within the
**              buffer <p pvPacketBuffer>.
**  @comm   This function places the data into the buffer starting with
**              the most significant byte first.
*/
int     ML3nSetPacketInt ( PVOID pvPacketBuffer, int nPacketBufferSize,
            int nInputData )
{
PBYTE   pbBuffer = pvPacketBuffer;

    *pbBuffer++ = (byte)(nInputData >>  8);
    *pbBuffer++ = (byte) nInputData;
    return ( sizeof ( byte ) * 2 );
}


/*
**  @doc    INTERNAL NETWORK
**  @api    int | ML3nSetPacketTriByte | Set the data in a buffer to the
**              3 least significant bytes of a specified long value.
**  @parm   PVOID | pvPacketBuffer | Pointer to a buffer to place the
**              tri-byte in.
**  @parm   int | nPacketBufferSize | Size of buffer <p pvPacketBuffer>.
**  @parm   long | lInputData | Long word of information to place into the
**              buffer.
**  @rdesc  This function returns the number of bytes placed within the
**              buffer <p pvPacketBuffer>.
**  @comm   This function places the data into the buffer starting with
**              the most significant byte first.
*/
int     ML3nSetPacketTriByte ( PVOID pvPacketBuffer, int nPacketBufferSize,
            long lInputData )
{
PBYTE   pbBuffer = pvPacketBuffer;

    *pbBuffer++ = (byte)(lInputData >> 16L);
    *pbBuffer++ = (byte)(lInputData >>  8L);
    *pbBuffer++ = (byte) lInputData;
    return ( sizeof ( byte ) * 3 );
}


/*
**  @doc    INTERNAL NETWORK
**  @api    int | ML3nSetPacketLong | Set the data in a buffer to a specified
**              long value.
**  @parm   PVOID | pvPacketBuffer | Pointer to a buffer to place the
**              long word in.
**  @parm   int | nPacketBufferSize | Size of buffer <p pvPacketBuffer>.
**  @parm   long | lInputData | Long word of information to place into the
**              buffer.
**  @rdesc  This function returns the number of bytes placed within the
**              buffer <p pvPacketBuffer>.
**  @comm   This function places the data into the buffer starting with
**              the most significant byte first.
*/
int     ML3nSetPacketLong ( PVOID pvPacketBuffer, int nPacketBufferSize,
            long lInputData )
{
PBYTE   pbBuffer = pvPacketBuffer;

    *pbBuffer++ = (byte)(lInputData >> 24L);
    *pbBuffer++ = (byte)(lInputData >> 16L);
    *pbBuffer++ = (byte)(lInputData >>  8L);
    *pbBuffer++ = (byte) lInputData;
    return ( sizeof ( byte ) * 4 );
}
```

```
/*
**  @doc    INTERNAL NETWORK
**  @api    int | ML3nSetPacketData | Set the information in a buffer to
**               an arbitrary set of data.
**  @parm   PVOID | pvPacketBuffer | Pointer to a buffer to place the
**               information from <p pvDataBuffer> in.
**  @parm   int | nPacketBufferSize | Size of buffer <p pvPacketBuffer>.
**  @parm   PVOID | pvDataBuffer | Point to a buffer of data to place within
**               the packet buffer <p pvPacketBuffer>.
**  @parm   int | nDataBufferSize | Number of bytes to transfer from
**               <p pvDataBuffer>.
**  @parm   int | nFillSize | Specifies the amount of data to fill the
**               buffer up until.
**  @flag   0 | Do not fill the buffer up at all.
**  @flag   > 0 | Fill the buffer up to this size will <p cFillChar>.
**  @parm   char | cFillChar | Character to fill with.
**  @rdesc  This function returns the number of bytes placed within the
**               buffer <p pvPacketBuffer>.
*/
int     ML3nSetPacketData ( PVOID pvPacketBuffer, int nPacketBufferSize,
            PVOID pvDataBuffer, int nDataBufferSize, int nFillSize,
            char cFillChar )
{
PBYTE   pbBuffer = pvPacketBuffer;
int     nLength;

    if ( nDataBufferSize > nPacketBufferSize )
        nDataBufferSize = nPacketBufferSize;
    if ( nFillSize > nPacketBufferSize )
        nFillSize = nPacketBufferSize;

    if ( nDataBufferSize > 0 )
    {
        memcpy ( pbBuffer, pvDataBuffer, nDataBufferSize );
        pbBuffer += nDataBufferSize;
        nPacketBufferSize -= nDataBufferSize;
    }
    else
        nDataBufferSize = 0;
    nLength = nDataBufferSize;

    nFillSize -= nDataBufferSize;
    if ( nFillSize > 0)
    {
        memset ( pbBuffer, cFillChar, nFillSize );
        nLength += nFillSize;
    }

    return ( nLength );
}
```

```
#include    <stdlib.h>
#include    <string.h>
#include    <memory.h>

#include    "basetype.h"
#include    "mobilib.h"
#include    "enums.h"
#include    "timing.h"
#include    "utils.hpc"
#include    "mpakxlat.h"
#include    "debug.h"
#include    "locks.h"
SET_LOCK_REF_FILE;

#include    "link.h"
#include    "network.h"
#include    "netint.h"


static boolean  fSubmitBusy = FALSE;
static boolean  fSubmitFlag;
static char     ccSubmitBuffer [ MAX_MPAK_SIZE ];
static int      nSubmitLength;

static boolean  fIntSubmitBusy = FALSE;
static boolean  fIntSubmitFlag;
static char     ccIntSubmitBuffer [ MAX_MPAK_SIZE ];
static int      nIntSubmitLength;

static boolean  fInternalSubmission;
static boolean  fSubmittedToLink = FALSE;

/*
**  @doc    INTERNAL NETWORK
**  @api    int | ML3nSubmitPacket | Submit a packet to the network layer.
**  @parm   boolean | fWaitForSentToNetwork | Wait for a sent to network.
**  @parm   PVOID | pvPacket | Pointer to a buffer containing the packet.
**  @parm   int | nPacketLength | Length of the information in the buffer.
**  @rdesc  This function returns one of the following values:
**  @flag   N_OK | The packet has been submitted for transmission.
**  @flag   N_BUSY | A submission is already pending.
**  @flag   N_BAD_PARMS | The submitted packet was too short or too long.
**  @comm   This routine sets the local variable <p fSubmitBusy>.  The
**              routine <a ML3nCheckForSubmittedPacket> should be used to
**              reset this flag after sending the information down to the
**              link layer.
*/
int         ML3nSubmitPacket ( boolean fWaitForSentToNetwork, PVOID pvPacket,
                int nPacketLength, boolean fExternalPacket )
{
int     nRetCode = N_MPAK_SENDING, nKey;

    if ( nPacketLength < MIN_MPAK_LENGTH || nPacketLength > MAX_MPAK_SIZE )
        nRetCode = N_BAD_PARMS;

    ALLOW_DEBUG ( TRUE );

    LOCK_EVERYTHING ( nKey );

    if ( fExternalPacket )
    {
        if ( fSubmitBusy )
        {
            nRetCode = N_BUSY;
            DEBUG_PRINTF((CSstr "[Ext Packet Sub Failed]\n" ));
        }
        else
        {
            fSubmitFlag = fWaitForSentToNetwork;
            memcpy ( ccSubmitBuffer, pvPacket, nPacketLength );
            nSubmitLength = nPacketLength;
            fSubmitBusy = TRUE;

            DEBUG_PRINTF((CSstr "[Ext Packet Sub OK]\n" ));
        }
    }
    else
    {
        if ( fIntSubmitBusy )
        {
            nRetCode = N_BUSY;
            DEBUG_PRINTF((CSstr "[Int Packet Sub Failed]\n" ));
        }
        else
        {
            fIntSubmitFlag = fWaitForSentToNetwork;
            memcpy ( ccIntSubmitBuffer, pvPacket, nPacketLength );
            nIntSubmitLength = nPacketLength;
            fIntSubmitBusy = TRUE;
            DEBUG_PRINTF((CSstr "[Int Packet Sub OK]\n" ));
        }
    }

    UNLOCK_EVERYTHING ( nKey );

    ALLOW_DEBUG ( FALSE );
    return( nRetCode );
}



/*
**  @doc    INTERNAL NETWORK
**  @api    int | ML3nCheckForSubmittedPacket | Check for a submitted MPAK.
**              If one has been submitted, then send it.
**  @rdesc  This function returns one of the following values:
**  @comm   This function is the complement to <a ML3nSubmitPacket>.  This
**              routine should only be called from the timer.  If called
**              when there is an outstanding submission, this routine will
**              send it forth to the link layer.
*/
int     ML3nCheckForSubmittedPacket ( void )
{
int     nKey, nRetCode = N_OK;
```

```
    ALLOW_DEBUG ( TRUE );
    if ( ML3fCanTransmit())
    {
        LOCK_EVERYTHING ( nKey );
        if ( fIntSubmitBusy )
        {
            fInternalSubmission = TRUE;
            nRetCode = ML3nPutMpak ( fIntSubmitFlag, ccIntSubmitBuffer,
                nIntSubmitLength );
            fIntSubmitBusy = FALSE;

            if ( nRetCode == N_BAD_PARMS )
                DEBUG_PRINTF((CSstr"[Int TX failure]"));
            else
                DEBUG_PRINTF((CSstr"[Int TX going]"));
        }
        else if ( fSubmitBusy )
        {
            DEBUG_PRINTF((CSstr "[Packet Sending]\n" ));

            fInternalSubmission = FALSE;
            nRetCode = ML3nPutMpak ( fSubmitFlag, ccSubmitBuffer,
                nSubmitLength );
            fSubmitBusy = FALSE;

            if ( nRetCode == N_BAD_PARMS )
                DEBUG_PRINTF((CSstr"[Ext TX failure]"));
            else
                DEBUG_PRINTF((CSstr"[Ext TX going]"));
        }
        UNLOCK_EVERYTHING ( nKey );
    }

    ALLOW_DEBUG ( FALSE );
    return ( nRetCode );
}



/*
**  @doc    INTERNAL NETWORK
**  @api    boolean | ML3fCheckForPacket | Has a packet been submitted
**              already?
**  @rdesc  This function returns TRUE if a function has already been
**              submitted using the <a ML3nSubmitPacket> function.
*/
boolean     ML3fCheckForPacket ( void )
{
    return ( fSubmitBusy );
}



/*
**  @doc    INTERNAL NETWORK
**  @api    boolean | ML3fSetPacketSubmittedToLink | Set the flag that says
**              we have sent a packet to the link layer.
**  @parm   boolean | fNewFlag | New state for the flag.
**  @rdesc  The return value from this function is the old value of the flag.
*/
boolean     ML3fSetPacketSubmittedToLink ( boolean fNewFlag )
{
boolean     fRetCode;
int         nKey;

    LOCK_EVERYTHING ( nKey );

    fRetCode = fSubmittedToLink;
    fSubmittedToLink = fNewFlag;

    UNLOCK_EVERYTHING ( nKey );
    return ( fRetCode );
}



/*
**  @doc    INTERNAL NETWORK
**  @api    boolean | ML3fIsPacketSubmittedToLink | Has a packet been
**              submitted to the link layer?
**  @rdesc  This function returns TRUE if a packet has been sent forth to
**              the link layer.
*/
boolean     ML3fIsPacketSubmittedToLink ( void )
{
    return ( fSubmittedToLink );
}



/*
**  @doc    INTERNAL NETWORK
**  @api    boolean | ML3fIsInternalPacket | Are we currently working on an
**              internal packet?
**  @rdesc  This function returns TRUE if we are currently working on sending
**              an internal packet.
*/
boolean     ML3fIsInternalPacket ( void )
{
    return ( fInternalSubmission );
}
```

```
//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

#include    <stdlib.h>
#include    <string.h>
#include    <memory.h>

#include    "basetype.h"
#include    "mobilib.h"
#include    "enums.h"
#include    "timing.h"
#include    "mpakxlat.h"
#include    "debug.h"

#include    "link.h"
#include    "network.h"
#include    "netint.h"


#define     NET_INTERNAL_TIMER_DELAY    50L

static long ML3lNetInternalTimer ( int thTimer, int nActivity );

static int      thNetInternal = -1;

static int      nSendStatus = N_MPAK_DONE;


boolean     ML3fProcessSubmission ( PINT piResult );
void        ML3vProcessInternalFlags ( void );


boolean     ML3fStartNetInternalTimer ( void )
{
    thNetInternal  = MaddTimer ( ML3lNetInternalTimer,
        NET_INTERNAL_TIMER_DELAY );
    return ( (boolean)( thNetInternal != 0 ));
}

void        ML3vStopNetInternalTimer ( void )
{
    if ( thNetInternal >= 0 )
        MdelTimer ( thNetInternal, T_DELETED );
}


/*
**  @doc    INTERNAL NETWORK
**  @api    void | ML3vClearNetInternalTimer | Clear the network layer handler
**               timer.
*/
void    ML3vClearNetInternalTimer ( void )
{
   MclrTimer ( thNetInternal, T_CLEARED );
}


/*
**  @doc    INTERNAL NETWORK
**  @api    void | ML3vSetNetInternalTimer | Reset the network layer handler
**               timer.
**  @parm   long | lTimeout | New timeout value for the timer.
*/
void    ML3vSetNetInternalTimer ( long lTimeout )
{
   MsetTimer ( thNetInternal, lTimeout );
}



/*
**  @doc    INTERNAL NETWORK
**  @api    long | ML3lNetInternalTimer | Timer function for the network
**               handler.
**  @parm   int | thTimer | Handle to the timer.
**  @parm   int | nActivity | Activity being performed by the timer.
**  @rdesc  This return value specifies the new timeout value.
*/
long    ML3lNetInternalTimer ( int thTimer, int nActivity )
{
long    lNewExpire = 0l;

   switch ( nActivity )
   {
   case T_EXPIRED :
       /*
       ** *
       */
//       V_SEND_DEBUG_STRING("(B");
       ML3vProcessInternalFlags();

       /*
       **  Loop until we can't process any more packets.
       */
       if ( ML3fAnyRxMpak ())
       {
           while ( ML3fQueueIncomingMpaks ( TRUE ))
               ;
       }

       /*
       **  Process any outgoing MPaks...
       */
       ML3nCheckForSubmittedPacket ();
```

```
        /*
        **  Update the status...
        */
        ML3vUpdateSendStatus();

        /*
        **  Send all of the notifies up to the tranport layer.
        */
        ML3vFlushNetworkNotifies ();

        lNewExpire = NET_INTERNAL_TIMER_DELAY;
//        V_SEND_DEBUG_STRING("B)");
        break;
    }
    return ( lNewExpire );
}



/*
**  @doc     INTERNAL NETWORK
**  @api     void | ML3vUpdateSendStatus | Update the internal transmission
**               status.
*/
void         ML3vUpdateSendStatus ( void )
{
int          nTempStatus;
boolean      fResult;

    /*
    **  If we are processing an internal packet, don't update the send status
    **      with the result of the call.  Otherwise, the packet is to be
    **      handled externally so update the send status.
    */
    fResult = ML3fProcessSubmission ( &nTempStatus );
    if ( fResult && ML3fIsInternalPacket ())
        nSendStatus = nTempStatus;
}



/*
**  @doc     INTERNAL NETWORK
**  @api     boolean | ML3fProcessSubmission | Process any outstanding
**               submissions.
**  @parm    PINT | piResult | Pointer to a status variable.  This status
**               variable can be set to one of the following values:
**  @flag    N_MPAK_SENDING | The Mpak has been submitted to the network layer
**               and possibly the link layer, but has not been sent to the
**               network.
**  @flag    N_MPAK_GONE | The Mpak has been sent to the network.
**  @flag    N_TIMEOUT | Transmission timeout has occured.
**  @flag    N_MAPK_SEND_ERROR | An error has occured sending the MPAK.
**  @flag    N_MPAK_DONE | The MPAK has been received by the network.
**  @rdesc   The result is TRUE if the status pointed to by <p piResult>
**               changed.
*/
```

```
boolean      ML3fProcessSubmission ( PINT piResult )
{
boolean      fPacketSubmitted = ML3fCheckForPacket ();
boolean      fPacketSentToLink = ML3fIsPacketSubmittedToLink ();
boolean      fTxOkay;
boolean      fTxFailed;
//boolean      fInternal;
boolean      fStatusFinished = FALSE, fStatusError;
boolean      fRetCode = FALSE;

    if ( fPacketSubmitted )
    {
        *piResult = N_MPAK_SENDING;
        fRetCode = TRUE;
    }
    else
    {
        if ( fPacketSentToLink )
        {
            fTxOkay = ML3fDecTxDone ();
            fTxFailed = ML3fDecTxFailed ();
//            fInternal = ML3fWasTxInternal ();

            if ( fTxOkay )
            {
                *piResult = N_MPAK_DONE;
                fRetCode = TRUE;

                ALLOW_DEBUG(TRUE);
                DEBUG_PRINTF((CSstr " [ML3 Packet STN] " ));
                ALLOW_DEBUG(FALSE);

                fStatusFinished = TRUE;
                fStatusError = FALSE;
            }
            else if ( fTxFailed )
            {
                *piResult = N_MPAK_SEND_ERROR;
                fRetCode = TRUE;
                ALLOW_DEBUG(TRUE);
                DEBUG_PRINTF((CSstr " [ML3 Packet Error] " ));
                ALLOW_DEBUG(FALSE);

                fStatusFinished = TRUE;
                fStatusError = TRUE;
            }
            else
            {
                if ( ML3fIsTransmitTimerDone ())
                {
                    ML3vStopTransmitTimer ();
                    ML3fSetTransmitTimerActive ( FALSE );

                    *piResult = N_TIMEOUT;
                    fRetCode = TRUE;

                    /*
```

```
            ** Make sure the link layer cancels the packet if there
            **     was a timeout stop sending info.  Therefore,
            **     cancel the packet and wait for a TXDONE or a
            **     TXFAILED from the link layer.
            */
            ML2cancelNetworkPacket ();
            ALLOW_DEBUG(TRUE);
            DEBUG_PRINTF((CSstr " [ML3 Packet Timeout] " ));
            ALLOW_DEBUG(FALSE);
        }

        /*
        ** Return the current transmission status.
        */
        if ( ML3fCanTransmit ())
        {
            if ( ML3fIsSentToNetwork ())
                *piResult = N_MPAK_GONE;
            else
                *piResult = N_MPAK_SENDING;
            fRetCode = TRUE;
        }
    }

    /*
    ** If the flag is set, then we've either timed out, sent it,
    **     or got an error!
    */
    if ( fStatusFinished )
    {
        /*
        ** We now have legit status, so turn the STL off and stop
        **     the timer as well.
        */
        ML3fSetPacketSubmittedToLink ( FALSE );
        ML3vStopTransmitTimer ();
        ML3fSetTransmitTimerActive ( FALSE );
        ML2doneNetworkPacketSend ();

        /*
        ** Make sure that we update the sending status.
        */
        ML3nCheckSendStatus ( APP_SEND_DONE );

        /*
        ** Let the transport layer know that we have an error.
        */
        ALLOW_DEBUG(TRUE);
        DEBUG_PRINTF((CSstr " [ML3 Packet FIN] " ));
        ALLOW_DEBUG(FALSE);
        if ( !ML3fIsInternalPacket () )
        {
            if ( fStatusError ) {
                DEBUG_PRINTF((CSstr " [ML3 Packet Error: %d] ", fStatusE
rror ));

                ML3vSendError ();
                }
```

File: src\NET32.C

```
                else {
                    ML3vSentToNetwork ();
                    DEBUG_PRINTF((CSstr " [ML3 Packet STN] " ));
                    }
                }
            }
        }
    }

    return ( fRetCode );
}



/*
** @doc    INTERNAL NETWORK
** @api    int | ML3nGetSendStatus | Get the status of the current
**             transmission.
** @rdesc  This function returns one of the following values:
** @flag   N_MPAK_SENDING | The Mpak has been submitted to the network layer
**             and possibly the link layer, but has not been sent to the
**             network.
** @flag   N_MPAK_GONE | The Mpak has been sent to the network.
** @flag   N_TIMEOUT | Transmission timeout has occured.
** @flag   N_MAPK_SEND_ERROR | An error has occured sending the MPAK.
** @flag   N_MPAK_DONE | The MPAK has been received by the network.
*/
int         ML3nGetSendStatus ( void )
{
    return ( nSendStatus );
}



/*
** @doc    INTERNAL NETWORK
** @api    void | ML3vProcessInternalFlags | Process any of the internal
**             flags that have been set by many a routine.
*/
void        ML3vProcessInternalFlags ( void )
{
    return;
    /*
    ** Check for initialization finished.
    */
    if ( ML3fIsLinkInitFinished ())
    {
        ML3vResetLinkInitFinished ();
        ML3fSetNetworkLayerInitialized ( TRUE );
        ML3fSetStartupDone ( TRUE );
    }

    /*
    ** Check for shutdown finished.
    */
    if ( ML3fIsLinkShutdownFinished ())
    {
```

```
        ML3vResetLinkShutdownFinished ();
        ML3fSetNetworkLayerInitialized ( FALSE );
        ML3fSetShutdownDone ( TRUE );
    }
}
```

```
#include    "basetype.h"
#include    "mobilib.h"
#include    "enums.h"
#include    "mpakxlat.h"
#include    "debug.h"
#include    "network.h"
#include    "netint.h"

static MAN  mLocalManNumber = -1L;

/*
**  @doc     INTERNAL NETWORK
**  @api     boolean | ML3fIsValidManNumber | Is this a valid Man number.
**  @parm    MAN | mManNumber | Man number to check for validity.
**  @rdesc   This function returns TRUE if the Man number is valid.
*/
boolean      ML3fIsValidManNumber ( MAN mManNumber )
{
boolean      fRetCode;

    fRetCode = (boolean)( mManNumber >= MIN_MAN && mManNumber <= MAX_MAN );
    return ( fRetCode );
}


/*
**  @doc     INTERNAL NETWORK
**  @api     int | ML3nSetPacketMan | Set the data in a buffer to the
**                a given Man number.
**                long value.
**  @parm    PVOID | pvPacketBuffer | Pointer to a buffer to place the
**                Man number in.
**  @parm    int | nPacketBufferSize | Size of buffer <p pvPacketBuffer>.
**  @parm    MAN | mManNumber | Man number to place into the buffer.
**  @rdesc   This function returns the number of bytes placed within the
**                buffer <p pvPacketBuffer>.
**  @comm    This function places the data into the buffer starting with
**                the most significant byte first.
*/
int      ML3nSetPacketMan ( PVOID pvPacketBuffer, int nPacketBufferSize,
                MAN mManNumber )
{
    return ( ML3nSetPacketTriByte ( pvPacketBuffer, nPacketBufferSize,
        mManNumber ));
}


/*
**  @doc     INTERNAL NETWORK
**  @api     int | ML3nGetPacketMan | Get a given MAN number from the
**                specified buffer.
**  @parm    PVOID | pvPacketBuffer | Pointer to a buffer to place the
**                Man number in.
**  @parm    int | nPacketBufferSize | Size of buffer <p pvPacketBuffer>.
**  @parm    PMAN | pmManNumber | Pointer to the destination for the
**                Man number.
**  @rdesc   This function returns the number of bytes translated from the
**                buffer <p pvPacketBuffer>.
**  @comm    This function extracts the data from the buffer starting with
**                the most significant byte first.
*/
int      ML3nGetPacketMan ( PVOID pvPacketBuffer, int nPacketBufferSize,
            PMAN pmManNumber )
{
    return ( ML3nGetPacketTriByte ( pvPacketBuffer, nPacketBufferSize,
        pmManNumber ));
}


/*
**  @doc     INTERNAL NETWORK PUBLIC
**  @api     MAN | ML3getLocalMANnumber | Get the MAN number of the device
**                that we are attatched to.
**  @rdesc   If this function returns a value of -1L, then the link layer
**                has not yet been initialized and we are unable to obtain
**                the current MAN number.
**  @comm    This routine will not reflect the correct MAN number until after
**                the Network and Link initialization have been completed.
**
**           Original: get the currently known MAN number that is
**                associated with the current LINK connection.  This is
**                NOT a transferred subscription number.
**
**           If the value is -1, then the link has not yet been started.
**                Otherwise, the value is the local MAN number determined by
**                the link type.
*/
MAN      ML3getLocalMANnumber ( void )
{
   DEBUG_PRINTF((CSstr" ML3glmn = %lx ",mLocalManNumber));
   return( mLocalManNumber );
}


/*
**  @doc     INTERNAL NETWORK PUBLIC
**  @api     void | ML3vSetLocalManNumber | Set the local MAN number.
**  @parm    MAN | mNewValue | The new value for the local MAN number.
**  @comm    This routine does not check for the validity of the MAN number
**                before setting its internal value.
*/
void     ML3vSetLocalManNumber ( MAN mNewValue )
{
   mLocalManNumber = mNewValue;
   DEBUG_PRINTF((CSstr" ML3slmn = %lx ",mLocalManNumber));
}


/*
**  @doc     INTERNAL NETWORK
**  @api     boolean | ML3fHaveLocalManNumber | Have we received the local
**                MAN number from the link Layer?
```

```
**  @rdesc  The return value specifies TRUE if we have a local MAN number.
*/
boolean ML3fHaveLocalManNumber ( void )
{
    return ( (boolean)( mLocalManNumber != -1L ));
}
```

```
#include    <stdlib.h>
#include    <string.h>
#include    <memory.h>

#include    "basetype.h"
#include    "mobilib.h"
#include    "enums.h"

#include    "network.h"
#include    "mpakxlat.h"


/*
**  @doc    INTERNAL NETWORK
**  @api    int | ML3nGetPacketTriByte | Get a tri-byte value from the
**              specified buffer.
**  @parm   PVOID | pvPacketBuffer | Pointer to a buffer to place the
**              Man number in.
**  @parm   int | nPacketBufferSize | Size of buffer <p pvPacketBuffer>.
**  @parm   PLONG | plValue | Pointer to the destination for the value.
**  @rdesc  This function returns the number of bytes translated from the
**              buffer <p pvPacketBuffer>.
**  @comm   This function extracts the data from the buffer starting with
**              the most significant byte first.
*/
int     ML3nGetPacketTriByte ( PVOID pvPacketBuffer, int nPacketBufferSize,
            PLONG plData )
{
PBYTE   pbBuffer = pvPacketBuffer;

    *plData =  (long)( *pbBuffer++ ) << 16L;
    *plData += (long)( *pbBuffer++ ) << 8L;
    *plData += (long)( *pbBuffer++ );
    return ( sizeof ( byte ) * 3 );
}


/*
**  @doc .  INTERNAL NETWORK PUBLIC
**  @api    void | ML3decodeTime | Convert the data from the specified pointer
**              into Mobilib-Plus's internal time structure.
**  @parm   PVOID | pvPacketBuffer | Pointer to a buffer to place the
**              Man number in.
**  @parm   PMpakTime | pmtPacketTime | Pointer to a MpakTime structure to
**              put the time information in.
**  @rdesc  This function returns the number of bytes translated from the
**              buffer <p pvPacketBuffer>.
*/
int         ML3decodeTime ( PVOID pvPacketBuffer, PMpakTime pmtPacketTime )
{
long    lTimeValue;
long    nHour, nMinute, nMD, nMT, nYear, nMonth, nDay;

    /*
    **  calculate MPAK time value
    */
    ML3nGetPacketTriByte ( pvPacketBuffer, 4, &lTimeValue );

    /*
    **  convert according to Mobitex time conversion algorithm
    */
    nHour   = (lTimeValue % 1440L) / 60L;
    nMinute = (lTimeValue % 1440L) % 60L;   /** BUG FIX: used to be "/ 60L" **/
    nMD     =  lTimeValue / 1440L;
    nMT     = (4291L + 10L*(nMD - (36525*((100L*nMD+30690L)/36525))/100L))/10L;
    nYear   = 1984L + (100L * nMD + 30690L) / 36525L + nMT/429L;
    nMonth  = (100L * nMT) / 3061L - 1L - 12L * (nMT/429L);
    nDay    = nMT - (((100L * nMT) / 3061L) * 3061L) / 100L;

    /*
    **  store values in structure
    */
    pmtPacketTime->nYear   = (int) nYear;
    pmtPacketTime->nMonth  = (int) nMonth;
    pmtPacketTime->nDay    = (int) nDay;
    pmtPacketTime->nHour   = (int) nHour;
    pmtPacketTime->nMinute = (int) nMinute;

    return ( sizeof ( byte ) * 3 );
}
```

```
#include    <stdlib.h>
#include    <string.h>
#include    <memory.h>

#include    "basetype.h"
#include    "mobilib.h"
#include    "enums.h"
#include    "mpakxlat.h"

#include    "network.h"
#include    "netint.h"

/*
**  @doc    INTERNAL NETWORK
**  @api    int | ML3nClearTimeStamp | Place a clear time stamp in the
**              specified buffer.
**  @parm   PVOID | pvBuffer | Pointer to a buffer to place the information
**              in.
**  @parm   int | nBufferSize | Size of buffer <p pvBuffer>.
**  @rdesc  This function returns the number of bytes placed within the
**              buffer <p pvBuffer>.
*/
int     ML3nClearTimeStamp ( PVOID pvBuffer, int nBufferSize )
{
    return ( ML3nSetPacketTriByte ( pvBuffer, nBufferSize, 0 ));
}


/*
**  @doc    INTERNAL NETWORK
**  @api    int | ML3nSetPacketFlexList | Set the information in a buffer to
**              a specified FlexList.
**  @parm   PVOID | pvPacketBuffer | Pointer to a buffer to place the
**              information from <p pvDataBuffer> in.
**  @parm   int | nPacketBufferSize | Size of buffer <p pvPacketBuffer>.
**  @parm   int | nNumberOfMansInList | Number of Man numbers in
**              <p pmFlexList>.
**  @parm   PMAN | pmFlexList | Pointer to a list of MAN numbers.
**  @rdesc  This function returns the number of bytes placed within the
**              buffer <p pvPacketBuffer>.
*/
int     ML3nSetPacketFlexList ( PVOID pvPacketBuffer, int nPacketBufferSize,
            int nNumberOfMansInList, PMAN pmFlexList )
{
PBYTE   pbBuffer = pvPacketBuffer;
int     nOffset = 0, nLoop;

    nOffset += ML3nSetPacketByte ( pbBuffer + nOffset,
        nPacketBufferSize - nOffset, (byte)nNumberOfMansInList );

    for ( nLoop = 0; nLoop < nNumberOfMansInList; nLoop++ )
        nOffset += ML3nSetPacketTriByte ( pbBuffer + nOffset,
            nPacketBufferSize - nOffset, pmFlexList[nLoop] );

    for ( ; nLoop < MAXFLEX; nLoop++ )
        nOffset += ML3nSetPacketTriByte ( pbBuffer + nOffset,
            nPacketBufferSize - nOffset, 0 );

    return ( nOffset );
}


/*
**  @doc    INTERNAL NETWORK
**  @api    int | ML3nFillMpakHeader | Fill in the MPAK type independant
**              header.
**  @parm   PVOID | pvMpakBuffer | Pointer to MPAK storage area which will be
**              filled in by this function.
**  @parm   int | nMpakCommand | MPAK command byte.
**  @parm   PINT | piOffset | Pointer to integer where we will store the
**              byte offset to type-dependent area of this MPAK.
**  @parm   int | nSubscrFlags | One of the following flags.
**  @flag   NONE_F | No subscription flags.
**  @flag   UNKNOWN_F | ???
**  @flag   EXTERN_F | ???
**  @flag   MAILBOX_F | Mailbox the information.
**  @flag   DIGITAL_F | establish a direct radio link.
**  @parm   int | nNumberOfMans | number of destination MANs in <p pMANto>.
**  @parm   MAN | mSource | source MAN of the MPAK.
**  @parm   PMAN | pmDestination | pointer to array of destination MANs.
**  @rdesc  This function returns one of the following statuses:
**  @flag   N_BAD_PARMS |   One or more of the parameters passed to the
**                          function are illegal.
**  @flag   N_OK |          Successful completion.
**  @comm   Create a MPAK header in the specified buffer.
**          The use of the MAILBOX_F flag or the DIGITAL_F flag will cause
**              the function to return <f N_BAD_PARMS>.
**
**          Original: check for correct MANs in the array pointed at by
**          <p pmDestination>.  Check for correct subscription flags.  Check
**          for correct <p nNumberOfMans> value.  If all is well, fill in the
**          addressee list if there are more than one addressee MANs.
**          Otherwise just fill in the addressee MAN value.  Also, set
**          the flags and the command byte.
**
**          Side-Effects: changes MPAK array bytes, integer
**          pointed at by <p piOffset>.
*/
int     ML3nFillMpakHeader ( PVOID pvMpakBuffer, int nMpakCommand,
            PINT piOffset, int nSubscrFlags, int nNumberOfMans,
            MAN mSource, PMAN pmDestination )
{
int             nLoop;

    /*
    **  check the addressee list & number of addressees
    */
    if ( nNumberOfMans < 1 || nNumberOfMans > 7 )
        return(N_BAD_PARMS);
    for ( nLoop = 0; nLoop < nNumberOfMans; nLoop++ )
    {
        if ( !ML3fIsValidManNumber ( pmDestination[nLoop] ))
            return(N_BAD_PARMS);
```

```
    }

    /*
    **  restrict the subscription flags
    */
    if ( nSubscrFlags & !(MAILBOX_F|DIGITAL_F) )
        return(N_BAD_PARMS);

    /*
    **  block MPAK transmit if not LIVE & PSUBCOM, PSOSCOM or CSUBCOM
    */
    if ( !ML3fIsNetworkLive () && ML3hasDie ( nMpakCommand ))
        return(N_MPAK_BLOCKED);

    /*
    **  if only one addressee, no list required
    */
    if ( nNumberOfMans == 1 )
    {
        *piOffset = ML3nSetPacketAddressee ( pvMpakBuffer, mSource,
            *pmDestination, nSubscrFlags, nMpakCommand );
    }
    else
    {
        *piOffset = ML3nSetPacketAddresseeList ( pvMpakBuffer, mSource,
            nNumberOfMans, pmDestination, nSubscrFlags, nMpakCommand );
    }

    return ( N_OK );
}


/*
**  @doc    INTERNAL NETWORK
**  @api    int | ML3nSetPacketAddressee | Set the header for a packet to
**              reflect only one addressee.
**  @parm   PVOID | pvMpakBuffer | Pointer to MPAK storage area which will be
**              filled in by this function.
**  @parm   MAN | mSource | source MAN of the MPAK.
**  @parm   MAN | mDestination | Destination MANs.
**  @parm   int | nSubscrFlags | One of the following flags.
**  @flag   NONE_F | No subscription flags.
**  @flag   UNKNOWN_F | ???
**  @flag   EXTERN_F | ???
**  @flag   MAILBOX_F | Mailbox the information.
**  @flag   DIGITAL_F | establish a direct radio link.
**  @parm   int | nMpakCommand | MPAK command byte.
**  @rdesc  This function returns the number of bytes placed into
**              <p pvMpakBuffer>.
*/
int     ML3nSetPacketAddressee ( PVOID pvMpakBuffer, MAN mSource,
            MAN mDestination, int nSubscrFlags, int nMpakCommand )
{
PMpakNoListHeader   pmnlhBufferHeader = pvMpakBuffer;

    ML3nSetPacketMan ( pmnlhBufferHeader->mhmSender.cbMan,
        sizeof(MpakHeaderMAN), mSource );
    ML3nSetPacketMan ( pmnlhBufferHeader->mhmAddressee.cbMan,
        sizeof(MpakHeaderMAN), mDestination );

    ML3nSetPacketByte( &pmnlhBufferHeader->bStateAndFlags, sizeof(byte),
        (byte)nSubscrFlags );
    ML3nSetPacketByte( &pmnlhBufferHeader->bMpakCommand, sizeof(byte),
        (byte)ML3getCommandValue ( nMpakCommand ));

    return ( sizeof ( MpakNoListHeader ));
}


/*
**  @doc    INTERNAL NETWORK
**  @api    int | ML3nSetPacketAddresseeList | Set the header for a packet to
**              reflect multiple addressees.
**  @parm   PVOID | pvMpakBuffer | Pointer to MPAK storage area which will be
**              filled in by this function.
**  @parm   MAN | mSource | source MAN of the MPAK.
**  @parm   int | nNumberOfMans | number of destination MANs in <p pMANto>.
**  @parm   PMAN | pmDestination | pointer to array of destination MANs.
**  @parm   int | nSubscrFlags | One of the following flags.
**  @flag   NONE_F | No subscription flags.
**  @flag   UNKNOWN_F | ???
**  @flag   EXTERN_F | ???
**  @flag   MAILBOX_F | Mailbox the information.
**  @flag   DIGITAL_F | establish a direct radio link.
**  @parm   int | nMpakCommand | MPAK command byte.
**  @rdesc  This function returns the number of bytes placed into
**              <p pvMpakBuffer>.
*/
int     ML3nSetPacketAddresseeList ( PVOID pvMpakBuffer, MAN mSource,
            int nNumberOfMans, PMAN pmDestination, int nSubscrFlags,
            int nMpakCommand )
{
PMpakListHeader     pmlhBufferHeader = pvMpakBuffer;
int                 nLoop;

    nSubscrFlags |= SENDLIST_F;

    ML3nSetPacketMan ( pmlhBufferHeader->mhmSender.cbMan,
        sizeof(MpakHeaderMAN), mSource );
    ML3nSetPacketMan ( pmlhBufferHeader->mhmNetwork.cbMan,
        sizeof(MpakHeaderMAN), MAN_MOBITEX );

    ML3nSetPacketByte( &pmlhBufferHeader->bStateAndFlags,
        sizeof ( byte ), (byte)nSubscrFlags );
    ML3nSetPacketByte( &pmlhBufferHeader->bMpakCommand,
        sizeof ( byte ), (byte)ML3getCommandValue ( nMpakCommand ));
    ML3nSetPacketByte( &pmlhBufferHeader->bNumberOfAddressees,
        sizeof ( byte ), (byte)nNumberOfMans );

    for ( nLoop = 0; nLoop < nNumberOfMans; nLoop++ )
        ML3nSetPacketMan ( pmlhBufferHeader->cmhmAddressees[nLoop].cbMan,
            sizeof(MpakHeaderMAN), pmDestination[nLoop] );
```

```
    for ( ; nLoop < 7; nLoop++ )
        ML3nSetPacketMan ( pmlhBufferHeader->cmhmAddressees[nLoop].cbMan,
            sizeof(MpakHeaderMAN), 0 );

    return ( sizeof ( MpakListHeader ));
}
```

```
#include    "basetype.h"
#include    "mobilib.h"
#include    "enums.h"
#include    "mpakxlat.h"

#include    "network.h"
#include    "netint.h"



/*
**  @doc    INTERNAL NETWORK PUBLIC
**  @api    MAN | ML3getSenderMAN | Get the source MAN from a Mpak.
**  @parm   PVOID | pvPacketBuffer | Pointer to a MPAK packet buffer.
**  @rdesc  This function returns the source MAN extracted from the packet
**              buffer.
*/
MAN     ML3getSenderMAN ( PVOID pvPacketBuffer )
{
MAN                 mSender;
PMpakNoListHeader   pmnlhPacket = pvPacketBuffer;

    ML3nGetPacketMan ( pmnlhPacket->mhmSender.cbMan,
        sizeof ( MpakHeaderMAN ), &mSender );
    return ( mSender );
}




/*
**  @doc    INTERNAL NETWORK PUBLIC
**  @api    int | ML3numAddressees | Determine if a given MPAK packet has an
**              addressee list and, if so, how many entries are in that list.
**  @parm   PVOID | pvPacketBuffer | Pointer to a MPAK packet buffer.
**  @rdesc  This function returns the number of entries in the list.  If this
**              number is zero, then there is only one destination MAN and
**              the MAN number can be retreived using <a ML3getAddresseeMAN>.
**              Otherwise, <a ML3getAddresseeList> can be used to grab the
**              list of destination MAN numbers, also called addressees.
*/
int     ML3numAddressees ( PVOID pvPacketBuffer )
{
PMpakListHeader     pmlhPacket = pvPacketBuffer;
int                 nRetCode = 0;

    if ( pmlhPacket->bStateAndFlags & SENDLIST_F )
        nRetCode = pmlhPacket->bNumberOfAddressees;
    return ( nRetCode );
}



/*
**  @doc    INTERNAL NETWORK PUBLIC
**  @api    MAN | ML3getAddresseeMAN | Get the destination MAN from a Mpak.
**  @parm   PVOID | pvPacketBuffer | Pointer to a MPAK packet buffer.
**  @rdesc  This function returns the source MAN extracted from the packet
**              buffer.
**  @comm   Original: Converts the MAN stored in the MPAK into a
**              "long int" MAN number for use by the application.
**
**          Warning: check first how many addressees there are using
**              <a ML3numAddressees>.  If that function returns
**              zero, then there is no list, and this function will
**              return a sensible value.  If there is an addressee
**              list, this function will return a nonsense value,
**              which is usually the MOBITEX NETWORK MAN number.
*/
MAN     ML3getAddresseeMAN ( PVOID pvPacketBuffer )
{
MAN                 mDestination;
PMpakNoListHeader   pmnlhPacket = pvPacketBuffer;

    ML3nGetPacketMan ( pmnlhPacket->mhmAddressee.cbMan,
        sizeof ( MpakHeaderMAN ), &mDestination );
    return ( mDestination );
}



/*
**  @doc    INTERNAL NETWORK PUBLIC
**  @api    void | ML3getAddresseeList | Copy the addressee list from a
**              MPAK packet to a given buffer.
**  @parm   PVOID | pvPacketBuffer | Pointer to a MPAK packet buffer.
**  @parm   PMAN | pmAddressees | Pointer to an array of MAN numbers with
**              at least 7 entries.
**  @comm   This function will will the array specified by <p pmAddressees>
**              with entries from the packet specified by <p pvPacketBuffer>.
*/
void        ML3getAddresseeList ( PVOID pvPacketBuffer, PMAN pmAddressees )
{
PMpakListHeader     pmlhPacket = pvPacketBuffer;
int                 nLoop;

    for ( nLoop = 0; nLoop < 7; nLoop++ )
        ML3nGetPacketMan ( pmlhPacket->cmhmAddressees[nLoop].cbMan,
            sizeof ( MpakHeaderMAN ), pmAddressees + nLoop );
}



/*
**  @doc    INTERNAL NETWORK PUBLIC
**  @api    int | ML3getSubscriptionFlags | Get the subscription flags from
**              a MPAK packet buffer.
**  @parm   PVOID | pvPacketBuffer | Pointer to a MPAK packet buffer.
**  @rdesc  This function returns the subscription flags set in the specified
**              packet.  The valid flags are the following:
**  @flag   NONE_F | No subscription flags.
**  @flag   UNKNOWN_F | ???
**  @flag   EXTERN_F | Coming from an external network.
**  @flag   MAILBOX_F | Mailbox the information.
```

```
**  @flag   DIGITAL_F | Establish a direct radio link.
*/
int         ML3getSubscriptionFlags ( PVOID pvPacketBuffer )
{
PMpakNoListHeader   pmnlhPacket = pvPacketBuffer;

    return ( pmnlhPacket->bStateAndFlags & ~SUBSCR_MASK );
}

/*
**  @doc    INTERNAL NETWORK PUBLIC
**  @api    int | ML3getTrafficState | Get the traffic state flags from
**              a MPAK packet buffer.
**  @parm   PVOID | pvPacketBuffer | Pointer to a MPAK packet buffer.
**  @rdesc  This function returns the subscription flags set in the specified
**              packet.  The valid flags are the following:
*/
int         ML3getTrafficState ( PVOID pvPacketBuffer )
{
PMpakNoListHeader   pmnlhPacket = pvPacketBuffer;

    return (( pmnlhPacket->bStateAndFlags & TRAFFIC_MASK ) >> 5 );
}

/*
**  @doc    INTERNAL NETWORK PUBLIC
**  @api    int | ML3getDataAreaOffset | Get the offset in bytes to the
**              part of the packet buffer that contains MPAK type dependant
**              data.
**  @parm   PVOID | pvPacketBuffer | Pointer to a MPAK packet buffer.
**  @rdesc  This function returns the number of bytes to the beginning of the
**              type dependant data for the packet.
*/
int         ML3getDataAreaOffset ( PVOID pvPacketBuffer )
{
PMpakNoListHeader   pmnlhPacket = pvPacketBuffer;
int                 nHeaderSize;

    if ( pmnlhPacket->bStateAndFlags & SENDLIST_F )
        nHeaderSize = sizeof ( MpakListHeader );
    else
        nHeaderSize = sizeof ( MpakNoListHeader );

    return ( nHeaderSize );
}
```

```
#include    "basetype.h"
#include    "mobilib.h"
#include    "enums.h"

#include    "link.h"
#include    "network.h"
#include    "netint.h"

#include    "mpakxlat.h"


static boolean  fIsNetworkLive = TRUE;
static int      nNetworkPacketStatus, nNetworkPacketStatusWanted;



/*
**  @doc    INTERNAL NETWORK
**  @api    boolean | ML3fIsNetworkLive | Is the network currently live?
**  @rdesc  The return code specifies if the network is alive or not.
*/
boolean     ML3fIsNetworkLive ( void )
{
    return ( fIsNetworkLive );
}



/*
**  @doc    INTERNAL NETWORK
**  @api    void | ML3vSetNetworkLive | Set the liveliness of the network.
**  @parm   boolean | fIsLive | Is the network live?
**  @comm   Once set, the state of the network can be retrieved using
**              <a ML3fIsNetworkLive>.
*/
void        ML3vSetNetworkLive ( boolean fIsLive )
{
    fIsNetworkLive = fIsLive;
}



/*
**  @doc    INTERNAL NETWORK PUBLIC
**  @api    int | ML3isNetworkActive | Is the network currently active?
**  @rdesc  This function returns the current activity state of the network.
**              This is one of the following states:
**  @flag   NETWORK_ACT_BUSY | Network state is currently changing.
**  @flag   NETWORK_ACT_INACTIVE | Network state is inactive.
**  @flag   NETWORK_ACT_INACTIVE | Network state is inactive.
*/
int     ML3isNetworkActive ( void )
{
    return ( ML3fIsLinkActive ());
}
```

```
#include    <string.h>

#include    "basetype.h"
#include    "mobilib.h"
#include    "enums.h"

#include    "network.h"
#include    "mpakxlat.h"


/*
**  list of true MPAK command values to aid conversion to
**      application format
*/
static byte inCS MPAKcommands[MAX_MPAK_COMMANDS] = (
        (0x01 | PSUBCOM),
        (0x02 | PSUBCOM),
        (0x03 | PSUBCOM),
        (0x04 | PSUBCOM),
        (0x01 | PSUBCOM | EXTERN_F),
        (0x01 | PSOSCOM),
        (0x02 | PSOSCOM),
        (0x03 | PSOSCOM),
        (0x01 | CSUBCOM),
        (0x02 | CSUBCOM),
        (0x03 | CSUBCOM),
        (0x04 | CSUBCOM),
        (0x05 | CSUBCOM),
        (0x06 | CSUBCOM),
        (0x07 | CSUBCOM),
        (0x08 | CSUBCOM),
        (0x09 | CSUBCOM),
        (0x0A | CSUBCOM),
        (0x11 | CSUBCOM),
        (0x02 | PSUBCOM | EXTERN_F),
        (0x01 | DTESERV),
        (0x02 | DTESERV),
        (0x03 | DTESERV),
        (0x04 | DTESERV),
        (0x05 | DTESERV),
        (0x06 | DTESERV),
        (0x07 | DTESERV),
        (0x08 | DTESERV),
        (0x09 | DTESERV),
        (0x0A | DTESERV),
        (0x0B | DTESERV),
        (0x0C | DTESERV),
        (0x0D | DTESERV),
        (0x0E | DTESERV),
        (0x0F | DTESERV),
        (0x10 | DTESERV),
        (0x11 | DTESERV),
        (0x12 | DTESERV),
        (0x13 | DTESERV),
        (0x14 | DTESERV),
        (0x18 | DTESERV),
        );
```

```
/*
**  table, set for future expansion, which currently just
**      indicates if the MPAK command has a time field
*/
static int inCS MPAKcommandFlags[MAX_MPAK_COMMANDS] = (
        /* N_TEXT       */ TF|FX|MB|DIE,
        /* N_DATA       */ TF|FX|MB|DIE,
        /* N_STATUS     */ TF|FX|MB|DIE,
        /* N_HPDATA     */ TF|FX|MB|DIE,
        /* N_EXTPAK     */ TF|FX|MB|DIE,
        /* N_SOS        */ TF|MB|DIE,
        /* N_SOSINFO    */ TF,
        /* N_SOSACK     */ TF|FX|MB|DIE,
        /* N_CONREQ     */ FX|MB|DIE,
        /* N_ADDCONREQ  */ FX|MB|DIE,
        /* N_CONGRA     */ 0,
        /* N_CONORD     */ 0,
        /* N_CONREA     */ FX|MB|DIE,
        /* N_DISCON     */ FX|MB|DIE,
        /* N_CLOOPON    */ 0,
        /* N_CLOOPOFF   */ 0,
        /* N_LINEON     */ FX|DIE,
        /* N_LINEOFF    */ FX|DIE,
        /* N_SOSCONREQ  */ MB|DIE,
        /* N_EXTCONREQ  */ FX|MB|DIE,
        /* N_LOGINREQ   */ FX|MB,
        /* N_LOGINGRA   */ 0,
        /* N_LOGINREF   */ 0,
        /* N_LOGOUT     */ FX|MB,
        /* N_LOGOUTORD  */ 0,
        /* N_BORN       */ MB,
        /* N_ACTIVE     */ FX|MB,
        /* N_INACTIVE   */ FX|MB,
        /* N_DIE        */ 0,
        /* N_LIVE       */ 0,
        /* N_ROAMORD    */ 0,
        /* N_ROAM       */ MB,
        /* N_VICESORSRX */ FX,
        /* N_SOSRX      */ FX,
        /* N_GROUPLIST  */ 0,
        /* N_FLEXREQ    */ 0,
        /* N_FLEXLIST   */ FX|MB,
        /* N_INFOREQ    */ 0,
        /* N_INFO       */ MB,
        /* N_TIME       */ TF,
        /* N_MODE       */ 0,
        );

/*
**  @doc     INTERNAL NETWORK PUBLIC
**  @api     int | ML3getCommand | Determine the Network-internal command
**               number for an MPAK.
**  @parm    PVOID | pvPacketBuffer | Pointer to a MPAK packet buffer.
**  @rdesc   This function returns an integer index representing the
**               Network-internal command number (byte) or a -1 if
**               the command was not found.
```

```
*/
int         ML3getCommand ( PVOID pvPacketBuffer )
{
int                 nLoop, nRetCode = -1;
PMpakNoListHeader   pmnlhPacket = pvPacketBuffer;

    for ( nLoop = 0; nLoop < MAX_MPAK_COMMANDS && nRetCode == -1; ++nLoop )
    {
        if ( pmnlhPacket->bMpakCommand == MPAKcommands [ nLoop ] )
            nRetCode = nLoop;
    }
    return ( nRetCode );
}


/*
**  @doc    INTERNAL NETWORK PUBLIC
**  @api    int | ML3getCommandValue | Determine the Mobitex MPAK command
**              byte for a given Network-internal MPAK command number.
**  @parm   int | nCommand | Network-internal command number. This is
**              returned by <a ML3getCommand>.
**  @rdesc  This function returns the value associated with a given
**              Network-internal MPAK command number.
**              If the command number is invalid, then the value -1 is
**              returned.
*/
int         ML3getCommandValue ( int nCommand )
{
int     nRetCode;

    if ( nCommand >= 0 && nCommand < MAX_MPAK_COMMANDS )
        nRetCode = MPAKcommands [ nCommand ];
    else
        nRetCode = -1;

    return ( nRetCode );
}


/*
**  @doc    INTERNAL NETWORK PUBLIC
**  @api    int | ML3getCommandFlags | Determine the flags for a given
**              Network-internal MPAK command number.
**  @parm   int | nCommand | Network-internal MPAK command number.  This
**              number is returned by <a ML3getCommand>.
**  @rdesc  This function returns the flags associated with a given
**              Network-internal MPAK command number.
**              If the command number is invalid, then the value 0 is returned.
*/
int         ML3getCommandFlags ( int nCommand )
{
int     nRetCode;

    if ( nCommand >= 0 && nCommand < MAX_MPAK_COMMANDS )
        nRetCode = MPAKcommandFlags [ nCommand ];
    else
        nRetCode = 0;

    return ( nRetCode );
}


/*
**  @doc    INTERNAL NETWORK PUBLIC
**  @api    int | ML3hasTime | Given a Network-internal command number,
**              determine if that MPAK has a type-dependant area that
**              starts with a Mobitex time value.
**  @parm   int | nCommand | Command number to check for time area.
**              This number is returned by <a ML3getCommand>.
**  @rdesc  This function returns TRUE if the Command has a time-value
**              at the beginning of the type-dependant area.
*/
int         ML3hasTime ( int nCommand )
{
int     nRetCode;

    if ( nCommand >= 0 && nCommand < MAX_MPAK_COMMANDS )
        nRetCode = MPAKcommandFlags [ nCommand ] & TF;
    else
        nRetCode = FALSE;

    return ( nRetCode );
}


/*
**  @doc    INTERNAL NETWORK PUBLIC
**  @api    int | ML3hasDie | Given a Network-internal command number,
**              determine if that MPAK has a DIE flag associated with it.
**  @parm   int | nCommand | Command number to check.  This number is
**              returned by <a ML3getCommand>.
**  @rdesc  This function returns TRUE if the Command number has a DIE flag
**              associated with it.
*/
int         ML3hasDie ( int nCommand )
{
int     nRetCode;

    if ( nCommand >= 0 && nCommand < MAX_MPAK_COMMANDS )
        nRetCode = MPAKcommandFlags [ nCommand ] & DIE;
    else
        nRetCode = FALSE;

    return ( nRetCode );
}
```

```
/*****************************************************************

 This code (c) Copyright 1990  by
             RAM Mobile Data, Inc. and Rogers Cantel Mobile Inc.
        designed by
             Research In Motion Limited
             Suite 6, 465 Phillip Street
             Waterloo, Ontario
             N2L 6C7
             (519) 888-7465

 Author:     Michael A. Barnstijn

 Date created: 4 April 1990

 Description:
      Mobitex NETWORK layer for MobiLib V2.x

 Change History:

      24 September, 1991      New release with R12 fix/ MOX connect fix

      27 August, 1991         Change to initialization - get MANnumber
                              from the Link layer when we connect to a
                              MOX.

      19 May, 1991            Default is now non-blocking sends.

      4 April 1991            Changes to kick the transport level via
                              ML4transportNotify();

      27 February 1991        Changed ML3checkIncomingMPAK() to set
                              nstartupDone flag to TRUE if we receive
                              a FLEXLIST during startup. The 8k network
                              does not send a FLEXREQ like the 1200 network
                              does.

       7 February 1991        Changed ML3getSendStatus() to return
                              N_MPAK_SEND_ERROR if the radio returns a
                              packet as unsent or as an incorrect MPAK.

      13 November 1990        Added update field in information structure.
                              Fixed if statement syntax in
                              ML3checkIncomingMPAK().
                              Changed the logic in ML3startupNetworkLayer()
                              and ML3isStartupDone() that sets up the
                              nstartupDone flag.

      9 October 1990          Changed startup sequence so that it
                              doesn't wait for GROUPLIST/FLEXREQ.

      28 September 1990       Added new return value from
                              ML3getSendStatus so that we can tell
                              when a packet has reached the radio.

      23 September 1990       Release V2.2  Bug fixes for packets
                              received during startup and incoming
                              "dropped in recipient's mailbox"
                              packets returned by network.

      28 July 1990            Added all remaining 1200 baud MPAK
                              transmit commands.  Put in blocking of
                              transmits based on mobile/fixed terminal,
                              put in blocking of transmit based on
                              LIVE/DIE incoming packets.

      23 July 1990            Fixed bug in password of LOGIN.

      5 June 1990             Cleaned up for V2.0 release.

      4 May 1990              This comment was added to indicate that
                              changes were made to fix a Queuing
                              problem in earlier Beta releases.  The
                              fix was put in on 3 May.  Problem was
                              found at MCC offices on 2 May.

                              Also added code to "checkIncomingMPAK"
                              to terminate an ACTIVE transmission if
                              a GROUPLIST or FLEXREQ arrives.

                              Finally, the default timeout setting
                              for MPAK transmits was increased to
                              60 seconds from 30, since experiments
                              showed that the radio can take up to
                              45 seconds to actually transmit out.

                              The timeout can be modified using the
                              "ML3setTransmitTimeout()" function,
                              which takes a single argument that is
                              the number of seconds to wait before
                              deciding that the transmit failed.

      10 April 1990           Modified "ML3isMPAKavailable()" to
                              call "ML3queueIncomingMPAKs()" even if
                              the queue is NOT empty.

*****************************************************************/
#include <stdio.h>
#include <stdlib.h>
#include <memory.h>
#include <string.h>

#include "basetype.h"
#include "mobilib.h"
#include "enums.h"
#include "access.h"
#include "link.h"
#include "network.h"
#include "netint.h"
#include "mpakxlat.h"   /* macros for MPAK encode/decode */
#include "timing.h"
#include "network.hpc"
#include "netint.h"
#include "utils.hpc"
```

```
#include "locks.h"
SET_LOCK_REF_FILE;

#include "debug.h"

/*********************************************************
 *                                                       *
 *       Local Constants and Macro Definitions           *
 *                                                       *
 *********************************************************/

/*      DEBUGGING OFF (otherwise we keep sending "F H" frames)
#define DEBUGNET        1
*/


/*********************************************************
 *                                                       *
 *                Local Variables                        *
 *                                                       *
 *********************************************************/

/*
**  Variables shared through all of the net_*.c files.
*/
//  Transmit buffer.
byte    ML3cbMpakBuffer [ MAX_MPAK_SIZE ];



/* ========================================================= */
/* =                                                       = */
/* =                  Module Code Begins                   = */
/* =                                                       = */
/* ========================================================= */



/*
**  @doc    INTERNAL NETWORK PUBLIC
**  @api    int | ML3installNetworkLayer | Install the network layer.
**  @rdesc  This function returns one of the following values:
**  @flag   N_OK | Success.
**  @flag   N_ALREADY_INIT | Network layer was already initialized.
**  @flag   N_NO_MEMORY | Unable to allocate receive storage.
**  @comm   Original: Installs the Mobitex Network layer & below.
**              A status value is returned which indicates success or failure.
*/
int         ML3installNetworkLayer ( void )
{
int     nStatus;

    /*
    **  don't do this more than once!
    */
    if ( ML3fGetNetworkLayerInitialized ())
    {
        ALLOW_DEBUG(TRUE);
        DEBUG_PRINTF((CSstr"ML3: already initialized\r\n"));
        return ( N_ALREADY_INIT );
    }

    if (( nStatus = ML2installLinkLayer ()) != 0 )
    {
        ALLOW_DEBUG(TRUE);
        DEBUG_PRINTF((CSstr"ML3: Link install failure: %d\r\n",nStatus));
        return ( nStatus );
    }

    /*
    **  Start the link layer going...
    */
    ML3fSetStartupDone ( FALSE );
    ML3fSetNetworkLayerInitialized ( FALSE );
    ML3vResetLinkInitFinished ();

    /*
    **  Start the timers.
    */
    ML3fInitTimers();

    /* initialize all the local flags */
    ML3fSetShutdownDone ( FALSE );

    ML3nSetDoingLogin ( STATE_INACTIVE );
    ML3fSetNetworkBorn ( FALSE );

    /*
    **  no successful startup yet
    */
    ML3fSetNetworkConnected ( FALSE );

    ML3fSetFifoPackets ( TRUE );
    ML3fSetDiscardTimePackets ( TRUE );
    ML3fSetReceivedGroupList ( FALSE );
    ML3fSetReceivedFlexList ( FALSE );
    ML3fSetReceivedFlexListRequest ( FALSE );
    ML3mSetFlexRequestSource ( MAN_NOENTRY );

    /*
    **  Start the queues.  If successful, we're up.
    */
    nStatus = ML3nStartRxQueues ( TRUE );
    if ( nStatus == N_OK )
        ML3fSetNetworkLayerInitialized ( TRUE );
    else
    {
        ALLOW_DEBUG(TRUE);
        DEBUG_PRINTF((CSstr"ML3: rx Q start failure: %d\r\n",nStatus));
    }

    ML2vOpenLinkLayer ();
```

```
    return ( nStatus );
}
```

```
/*****************************************************************

 This code (c) Copyright 1991  by
          and designed by
              Research In Motion Limited
              Suite 6, 465 Phillip Street
              Waterloo, Ontario
              N2L 6C7
              (519) 888-7465

 Author:        Michael A. Barnstijn

 Date created: 27 November 1991

 Description:
       Mobitex NETWORK layer transmit for TEXT MPAKs

 Change History:

*****************************************************************/
#include "npackets.h"



/*
**  @doc     INTERNAL PUBLIC NETWORK
**  @api     int | ML3sendData | Format and send a data packet
**           checking to see if it is okay to send the packet.
**  @parm    PVOID | pvData | pointer to the data to be sent.
**  @parm    int | nDataLength | number of bytes in data array.
**  @parm    MAN | mSource | source MAN of the MPAK.
**  @parm    int | nSubscriptionFlags  MAILBOX_F/DIGITAL_F or 0.
**  @parm    int | nNumberOfDestinationMans | Number of destination MANs
**              in <p pmDestinationMans>.
**  @parm    PMAN | pmDestinationMans | pointer to array of destination MANs.
**  @rdesc   This function returns the following return values:
**  @flag    N_BAD_PARMS            | Network layer rejection due to parameters
**                                      out of range or too long.
**  @flag    N_TIMEOUT              | Not sent to the network within timeout
**                                      period.
**  @flag    N_LINK_ERROR           | Link layer couldn't send the packet.
**  @flag    N_MPAK_DONE            | Packet was sent to the network.
**  @flag    N_MPAK_REFUSED         | Network refused the command (LOGIN,CONREQs).
**  @flag    N_MPAK_BLOCKED         | Network has sent a DIE; no sends until
**                                      LIVE received.
**  @flag    N_MPAK_SEND_ERROR      | Packet was returned by radio as unsent or
**                                      illegal MPAK.
**  @comm    After making sure it is okay to send the data packet, this
**           function will call <a ML3pvtSendData> to send the packet,
**           updating the transmission status after the packet has been sent
**           using the <a ML3nCheckSendStatus> function.
**
**           Original: formats an MPAK and transmits it.  If the parameters
**           are incorrect, it returns a status value.  Otherwise it
**           formats the MPAK and attempts to send it.  (During normal
**           operation there should be no problem transmitting the MPAK
**           since the transmit FIFO should not be full.)
**
**           Side Effects: affects transmitter and transmit FIFO, copies
**           resulting MPAK into application buffer & sets length value.
**  @mod     91Nov27 | MAB | Original.
**  @mod     92May20 | JDW | Added documentation.
*/
int     ML3sendData ( PCHAR pszData, int nDataLength, MAN mSource,
            int nSubscriptionFlags, int nNumberOfMans,
            PMAN pmDestinationMans )
{
int     nStatus = N_MPAK_BLOCKED;

    if ( ML3nCheckSendStatus ( APP_SEND_CHECK ) == OK_TO_SEND )
    {
        nStatus = ML3pvtSendData ( pszData, nDataLength, mSource,
            nSubscriptionFlags, nNumberOfMans, pmDestinationMans );
        ML3nCheckSendStatus ( nStatus + AS_STATUS_OFFSET );
    }
    return(nStatus);
}

/*
**  @doc     INTERNAL NETWORK
**  @api     int | ML3pvtSendData | Format and send a data packet without
**           checking to see if it is okay to send the packet.
**  @parm    PVOID | pvData | pointer to array of data to be sent.
**  @parm    int | nLength | number of bytes in data array.
**  @parm    MAN | mSource | source MAN of the MPAK.
**  @parm    int | nSubscriptionFlags  MAILBOX_F/DIGITAL_F or 0.
**  @parm    int | nNumberOfDestinationMans | number of destination MANs in
**               <p pmDestinationMans>.
**  @parm    PMAN | pmDestinationMans | pointer to array of destination MANs.
**  @rdesc   This function returns the same information as <a ML3sendData>
**           except for the <f N_MPAK_BLOCKED> flag.
**  @comm    This function does not incorporate the check to see if we can
**           send the packet that <a ML3sendData> does.  Otherwise, it is
**           identical.
**  @mod     91Nov27 | MAB | Original.
**  @mod     92May20 | JDW | Added documentation.
*/
int     ML3pvtSendData ( PCHAR pszData, int nDataLength, MAN mSource,
            int nSubscriptionFlags, int nNumberOfMans,
            PMAN pmDestinationMans )
{
int     nStatus = N_BAD_PARMS, nOffset;

    if ( nDataLength <= MAX_MPAK_DATA )
    {
        /*
        **  fill the MPAK header
        */
        nStatus = ML3nFillMpakHeader ( ML3cbMpakBuffer, N_DATA, &nOffset,
            nSubscriptionFlags, nNumberOfMans, mSource, pmDestinationMans );
        if ( nStatus == N_OK )
        {
            nOffset += ML3nClearTimeStamp ( (PBYTE)ML3cbMpakBuffer + nOffset,
```

```
            sizeof ( ML3cbMpakBuffer ) - nOffset );
        nOffset += ML3nSetPacketData ( (PBYTE)ML3cbMpakBuffer + nOffset,
            sizeof ( ML3cbMpakBuffer ) - nOffset, pszData, nDataLength,
            0, 0 );

        nStatus = ML3nSubmitPacket ( TRUE, ML3cbMpakBuffer, nOffset,
            TRUE );
      }
    }

    return ( nStatus );
}
```

```
/*******************************************************************

  This code (c) Copyright 1991  by
          and designed by
              Research In Motion Limited
              Suite 6, 465 Phillip Street
              Waterloo, Ontario
              N2L 6C7
              (519) 888-7465

  Author:     Michael A. Barnstijn

  Date created: 27 November 1991

  Description:
        Mobitex NETWORK layer transmit for TEXT MPAKs

  Change History:

*******************************************************************/
#include "npackets.h"



/*
**  @doc    INTERNAL NETWORK
**  @api    int | ML3sendFlexlist | Format and transmit a FLEXLIST packet.
**  @parm   PMAN | pmFlexList | Pointer to the flexlist to send.
**  @parm   int | nNumberOfFlexEntries | Number of valid entries in the
**              flexlist.
**  @parm   MAN | mSource | MAN number that the list is from.
**  @parm   MAN | mDestination | MAN number that the list is to.
**  @rdesc  The return value is one of the following:
**  @flag   N_BAD_PARMS         | Network layer rejection due to parameters
**                                out of range or too long.
**  @flag   N_TIMEOUT           | Not sent to the network within timeout
**                                period.
**  @flag   N_LINK_ERROR        | Link layer couldn't send the packet.
**  @flag   N_MPAK_DONE         | Packet was sent to the network.
**  @flag   N_MPAK_REFUSED      | Network refused the command (LOGIN,CONREQs).
**  @flag   N_MPAK_BLOCKED      | Network has sent a DIE; no sends until
**                                LIVE received.
**  @flag   N_MPAK_SEND_ERROR   | Packet was returned by radio as unsent or
**                                illegal MPAK.
**  @comm   Original: formats an MPAK and transmits it.  If the parameters
**              are incorrect, it returns a status value.  Otherwise it
**              formats the MPAK and attempts to send it.  (During normal
**              operation there should be no problem transmitting the MPAK
**              since the transmit FIFO should not be full.)
*/
int     ML3sendFlexlist ( PMAN pmFlexList,int nNumberOfFlexEntries,
            MAN mSource, MAN mDestination )
{
int     nStatus = N_MPAK_BLOCKED;

    if ( ML3nCheckSendStatus ( APP_SEND_CHECK ) == OK_TO_SEND )
```

```
    {
        nStatus = ML3pvtSendFlexlist ( pmFlexList, nNumberOfFlexEntries,
            mSource, mDestination);
        ML3nCheckSendStatus ( nStatus + AS_STATUS_OFFSET );
    }
    return ( nStatus );
}


/*
**  @doc    INTERNAL NETWORK
**  @api    int | ML3pvtSendFlexlist | Format and transmit a FLEXLIST packet.
**  @parm   PMAN | pmFlexList | Pointer to the flexlist to send.
**  @parm   int | nNumberOfFlexEntries | Number of valid entries in the
**              flexlist.
**  @parm   MAN | mSource | MAN number that the list is from.
**  @parm   MAN | mDestination | MAN number that the list is to.
**  @rdesc  The return value is one of the following:
**  @flag   N_BAD_PARMS         | Network layer rejection due to parameters
**                                out of range or too long.
**  @flag   N_TIMEOUT           | Not sent to the network within timeout
**                                period.
**  @flag   N_LINK_ERROR        | Link layer couldn't send the packet.
**  @flag   N_MPAK_DONE         | Packet was sent to the network.
**  @flag   N_MPAK_REFUSED      | Network refused the command (LOGIN,CONREQs).
**  @flag   N_MPAK_BLOCKED      | Network has sent a DIE; no sends until
**                                LIVE received.
**  @flag   N_MPAK_SEND_ERROR   | Packet was returned by radio as unsent or
**                                illegal MPAK.
**  @comm   Original: formats an MPAK and transmits it.  If the parameters
**              are incorrect, it returns a status value.  Otherwise it
**              formats the MPAK and attempts to send it.  (During normal
**              operation there should be no problem transmitting the MPAK
**              since the transmit FIFO should not be full.)
*/
int     ML3pvtSendFlexlist ( PMAN pmFlexList, int nNumberOfFlexEntries,
            MAN mSource, MAN mDestination )
{
int     nStatus,nOffset;

    /*
    ** fill in the MPAK header
    */
    nStatus = ML3nFillMpakHeader ( ML3cbMpakBuffer, N_FLEXLIST, &nOffset,
        0, 1, mSource, &mDestination );
    if ( nStatus == N_OK )
    {
        nOffset += ML3nSetPacketFlexList ( (PBYTE)ML3cbMpakBuffer + nOffset,
            sizeof ( ML3cbMpakBuffer ) - nOffset, nNumberOfFlexEntries,
            pmFlexList );

        nStatus = ML3nSubmitPacket ( FALSE, ML3cbMpakBuffer, nOffset, FALSE );
    }

    return ( nStatus );
}
```

```
/****************************************************************

  This code (c) Copyright 1991  by
            and designed by
                Research In Motion Limited
                Suite 6, 465 Phillip Street
                Waterloo, Ontario
                N2L 6C7
                (519) 888-7465

  Author:       Michael A. Barnstijn

  Date created: 27 November 1991

  Description:
        Mobitex NETWORK layer transmit for TEXT MPAKs

  Change History:


*****************************************************************/
#include "npackets.h"


/*
**  @doc     INTERNAL PUBLIC NETWORK
**  @api     int | ML3sendHPData | Format and send a HPData packet without
**           checking to see if it is okay to send the packet.
**  @parm    PVOID | pvData | pointer to the data to be sent.
**  @parm    int | nLength | number of bytes in data array.
**  @parm    MAN | mSource | source MAN of the MPAK.
**  @parm    int | nSubscriptionFlags  MAILBOX_F/DIGITAL_F or 0.
**  @parm    int | nNumberOfDestinationMans | Number of destination MANs
**               in <p pmDestinationMans>.
**  @parm    PMAN | pmDestinationMans | pointer to array of destination MANs.
**  @parm    int | nProtocol | High-level Protocol identification so that the
**               receiving application can decode the contents
**               of the data area.
**  @rdesc   This function returns the following return values:
**  @flag    N_BAD_PARMS          | Network layer rejection due to parameters
**                                    out of range or too long.
**  @flag    N_TIMEOUT            | Not sent to the network within timeout
**                                    period.
**  @flag    N_LINK_ERROR         | Link layer couldn't send the packet.
**  @flag    N_MPAK_DONE          | Packet was sent to the network.
**  @flag    N_MPAK_REFUSED       | Network refused the command (LOGIN,CONREQs).
**  @flag    N_MPAK_BLOCKED       | Network has sent a DIE; no sends until
**                                    LIVE received.
**  @flag    N_MPAK_SEND_ERROR    | Packet was returned by radio as unsent or
**                                    illegal MPAK.
**  @comm    After making sure it is okay to send the HPData packet, this
**           function will call <a ML3pvtSendHPData> to send the packet,
**           updating the transmission status after the packet has been sent
**           using the <a ML3nCheckSendStatus> function.
**
**           Original: formats an MPAK and transmits it.  If the parameters
**           are incorrect, it returns a status value.  Otherwise it
**           formats the MPAK and attempts to send it.  (During normal
**           operation there should be no problem transmitting the MPAK
**           since the transmit FIFO should not be full.)
**
**           Side Effects: affects transmitter and transmit FIFO, copies
**           resulting MPAK into application buffer & sets length value.
**  @mod     91Nov27 | MAB | Original.
**  @mod     92May20 | JDW | Added documentation.
*/
int          ML3sendHPData ( PVOID pvData, int nLength, MAN mSource,
                 int nSubscriptionFlags, int nNumberOfDestinationMans,
                 PMAN pmDestinationMans, int nProtocol )
{
int     nStatus = N_MPAK_BLOCKED;

    if ( ML3nCheckSendStatus ( APP_SEND_CHECK ) == OK_TO_SEND )
    {
        nStatus = ML3pvtSendHPData ( pvData, nLength, mSource,
            nSubscriptionFlags, nNumberOfDestinationMans, pmDestinationMans,
            nProtocol );
        ML3nCheckSendStatus ( nStatus + AS_STATUS_OFFSET );
    }

    return ( nStatus );
}


/*
**  @doc     INTERNAL NETWORK
**  @api     int | ML3pvtSendHPData | Format and send a HPData packet without
**           checking to see if it is okay to send the packet.
**  @parm    PVOID | pvData | pointer to array of data to be sent.
**  @parm    int | nLength | number of bytes in data array.
**  @parm    MAN | mSource | source MAN of the MPAK.
**  @parm    int | nSubscriptionFlags  MAILBOX_F/DIGITAL_F or 0.
**  @parm    int | nNumberOfDestinationMans | number of destination MANs in
**               <p pmDestinationMans>.
**  @parm    PMAN | pmDestinationMans | pointer to array of destination MANs.
**  @parm    int | nProtocol | High-level Protocol identification so that the
**               receiving application can decode the contents
**               of the data area.
**  @rdesc   This function returns the same information as <a ML3sendHPData>
**           except for the <f N_MPAK_BLOCKED> flag.
**  @comm    This function does not incorporate the check to see if we can
**           send the packet that <a ML3sendHPData> does.  Otherwise, it is
**           identical.
**  @mod     91Nov27 | MAB | Original.
**  @mod     92May20 | JDW | Added documentation.
*/
int          ML3pvtSendHPData ( PVOID pvData, int nLength, MAN mSource,
                 int nSubscriptionFlags, int nNumberOfDestinationMans,
                 PMAN pmDestinationMans, int nProtocol )
{
int     nStatus = N_BAD_PARMS, nOffset;
```

```
    /*
    **  Is it to under the maximum size of the data?  Is the protocol OK?
    */
    if (( nLength <= MAX_MPAK_DATA ) &&
        ( nProtocol >= MIN_HPDATA_PROTOCOL &&
          nProtocol <= MAX_HPDATA_PROTOCOL ))
    {
        /*
        **  fill in MPAK header
        */
        nStatus = ML3nFillMpakHeader ( ML3cbMpakBuffer, N_HPDATA, &nOffset,
            nSubscriptionFlags, nNumberOfDestinationMans, mSource,
            pmDestinationMans );

        /*
        **  If successful, fill in the rest of the packet and send.
        */
        if ( nStatus == N_OK )
        {
            /*
            **  Clear the time area, set the protocal, copy data into
            **      MPAK area.
            */
            nOffset += ML3nClearTimeStamp ( ML3cbMpakBuffer + nOffset,
                sizeof ( ML3cbMpakBuffer ) - nOffset );
            nOffset += ML3nSetPacketByte ( ML3cbMpakBuffer + nOffset,
                sizeof ( ML3cbMpakBuffer ) - nOffset, (byte)nProtocol );
            nOffset += ML3nSetPacketData ( ML3cbMpakBuffer + nOffset,
                sizeof ( ML3cbMpakBuffer ) - nOffset, pvData, nLength, 0, 0 );

            /*
            **  Send the packet with the offset being the length.
            */
            nStatus = ML3nSubmitPacket ( TRUE, ML3cbMpakBuffer, nOffset,
                TRUE );
        }
    }

    return ( nStatus );
}

/*
**  @doc    INTERNAL NETWORK
**  @api    int | ML3pvtFormatHPData | Format and send a HPData packet without
**          checking to see if it is okay to send the packet.
**  @parm   PVOID | pvData | pointer to array of data to be sent.
**  @parm   int | nLength | number of bytes in data array.
**  @parm   MAN | mSource | source MAN of the MPAK.
**  @parm   int | nSubscriptionFlags  MAILBOX_F/DIGITAL_F or 0.
**  @parm   int | nNumberOfDestinationMans | number of destination MANs in
**              <p pmDestinationMans>.
**  @parm   PMAN | pmDestinationMans | pointer to array of destination MANs.
**  @parm   int | nProtocol | High-level Protocol identification so that the
**              receiving application can decode the contents
**              of the data area.
**  @rdesc  This function returns the same information as <a ML3sendHPData>
**          except for the <f N_MPAK_BLOCKED> flag.
**  @comm   This function does not incorporate the check to see if we can
**          send the packet that <n ML3sendHPData> does.  Otherwise, it is
**          identical.
**  @mod    91Nov27 | MAB | Original.
**  @mod    92May20 | JDW | Added documentation.
*/
int         ML3pvtFormatHPData ( PVOID pvData, int nLength, MAN mSource,
                int nSubscriptionFlags, int nNumberOfDestinationMans,
                PMAN pmDestinationMans, int nProtocol, PVOID pvDestBuffer,
                PINT piDestSize )
{
int     nStatus = N_BAD_PARMS, nOffset;

    /*
    **  Is it to under the maximum size of the data?  Is the protocol OK?
    */
    if (( nLength <= MAX_MPAK_DATA ) &&
        ( nProtocol >= MIN_HPDATA_PROTOCOL &&
          nProtocol <= MAX_HPDATA_PROTOCOL ))
    {
        /*
        **  fill in MPAK header
        */
        nStatus = ML3nFillMpakHeader ( ML3cbMpakBuffer, N_HPDATA, &nOffset,
            nSubscriptionFlags, nNumberOfDestinationMans, mSource,
            pmDestinationMans );

        /*
        **  If successful, fill in the rest of the packet and send.
        */
        if ( nStatus == N_OK )
        {
            /*
            **  Clear the time area, set the protocal, copy data into
            **      MPAK area.
            */
            nOffset += ML3nClearTimeStamp ( ML3cbMpakBuffer + nOffset,
                sizeof ( ML3cbMpakBuffer ) - nOffset );
            nOffset += ML3nSetPacketByte ( ML3cbMpakBuffer + nOffset,
                sizeof ( ML3cbMpakBuffer ) - nOffset, (byte)nProtocol );
            nOffset += ML3nSetPacketData ( ML3cbMpakBuffer + nOffset,
                sizeof ( ML3cbMpakBuffer ) - nOffset, pvData, nLength, 0, 0 );

            /*
            **  Send the packet with the offset being the length.
            */
            if ( nOffset > *piDestSize )
                nOffset = *piDestSize;
            memcpy ( pvDestBuffer, ML3cbMpakBuffer, nOffset );
            *piDestSize = nOffset;
        }
    }

    return ( nStatus );
}
```

Page 3 16 JUN 93 08:40 PM

File: src\NET_HP.C

```
#include "basetype.h"
#include "link.h"
#include "ldefines.h"
#include "lprotos.h"
#include "timing.h"
#include "locks.h"
#include "debug.h"

SET_LOCK_REF_FILE;

#define QUEUE_SIZE        32

#define QUEUE_FULL      (((nQueueIn+1)%QUEUE_SIZE) == nQueueOut)
#define QUEUE_EMPTY     (nQueueOut == nQueueIn)
#define NEXT_QUEUE_IN   nQueueIn = (nQueueIn+1)%QUEUE_SIZE
#define NEXT_QUEUE_OUT  nQueueOut = (nQueueOut+1)%QUEUE_SIZE

static volatile netNotifyType nntNotifyQueue[QUEUE_SIZE];
static volatile int nQueueIn = 0;
static volatile int nQueueOut = 0;
static volatile int nNetNotifyBlocked = 0;
static volatile int nNewMpaks = 0;

extern void _far ML3networkNotify(int nNotifyType,...);


boolean
fInstallLinkNetNotifyModule(void)
{
    nQueueIn = 0;
    nQueueOut = 0;
    nNetNotifyBlocked = 0;
    nNewMpaks = 0;
    return(TRUE);
}

boolean
fRemoveLinkNetNotifyModule(void)
{
    nNewMpaks = 0;
    return(TRUE);
}

void
vNetworkNotify(netNotifyType nntNotify)
{
    int nKey;
    LOCK_EVERYTHING(nKey);
    if ( !QUEUE_FULL )
    {
        nntNotifyQueue[nQueueIn] = nntNotify;
        NEXT_QUEUE_IN;
    }
    UNLOCK_EVERYTHING(nKey);
}

void
vFlushNetworkNotifies( void )
{
    int nKey;
    LOCK_EVERYTHING(nKey);

    ALLOW_DEBUG(TRUE);

    if ( nNetNotifyBlocked <= 0 )
    {
        while ( !QUEUE_EMPTY && nNetNotifyBlocked == 0 ) {
            switch ( nntNotifyQueue[nQueueOut] )
            {
                case NFY_LINK_TXDONE :
                    DEBUG_STRING((CSstr" NET_NFY txdone "));
                    ML3networkNotify((int)nntNotifyQueue[nQueueOut]);
                    break;

                case NFY_LINK_TXFAILED :
                    DEBUG_STRING((CSstr" NET_NFY txfail "));
                    ML3networkNotify((int)nntNotifyQueue[nQueueOut]);
                    break;

                case NFY_LINK_RXMPAK :
                    if ( mGetLinkMANnumber() == -1L )
                        ++nNewMpaks;
                    else
                    {
                        DEBUG_STRING((CSstr"NET_NFY RXmpak "));
                        ML3networkNotify((int)NFY_LINK_RXMPAK);
                    }
                    break;

                case NFY_LINK_OPENED :
                    DEBUG_STRING((CSstr" NET_NFY opened "));
                    ML3networkNotify((int)nntNotifyQueue[nQueueOut]);
                    break;

                case NFY_LINK_CONNECTED :
                    DEBUG_PRINTF((CSstr" NET_NFY link connect+MAN=%lx ",
                              mGetLinkMANnumber()));
                    ML3networkNotify((int)NFY_LINK_CONNECTED,
                                 mGetLinkMANnumber());
                    break;

                case NFY_LINK_DISCONNECTED :
                    DEBUG_STRING((CSstr" NET_NFY link disc. "));
                    ML3networkNotify((int)nntNotifyQueue[nQueueOut]);
                    break;

                case NFY_LINK_NET_CONNECTED :
                    DEBUG_STRING((CSstr" NET_NFY net con. "));
                    ML3networkNotify((int)nntNotifyQueue[nQueueOut]);
                    break;

                case NFY_LINK_NET_DISCONNECTED :
                    DEBUG_STRING((CSstr" NET_NFY net disc. "));
                    ML3networkNotify((int)nntNotifyQueue[nQueueOut]);
```

```
                    break;

                case NFY_LINK_CLOSED :
                    DEBUG_STRING((CSstr" NET_NFY closed "));
                    ML3networkNotify((int)nntNotifyQueue[nQueueOut]);
                    break;

                case NFY_LINK_SET_MAN_NUMBER :
                    DEBUG_PRINTF((CSstr" NET_NFY set MAN=%lx ",
                                mGetLinkMANnumber()));
                    ML3networkNotify((int)NFY_LINK_SET_MAN_NUMBER,
                                    mGetLinkMANnumber());
                    break;

                case NFY_LINK_NEW_X25_PARMS :
                    DEBUG_STRING((CSstr" NET_NFY x25 parms "));
                    ML3networkNotify((int)nntNotifyQueue[nQueueOut]);
                    break;

                default:
                    DEBUG_PRINTF((CSstr" NET_NFY %d? ",(int)nntNotifyQueue[nQueu
eOut]));
                    ML3networkNotify((int)nntNotifyQueue[nQueueOut]);
                    break;
            }
            NEXT_QUEUE_OUT;
        }
        if ( nNewMpaks > 0 && mGetLinkMANnumber() != -1L )
            for ( ; nNewMpaks > 0; --nNewMpaks )
            {
                DEBUG_STRING((CSstr"NET_NFY delayed RXmpak "));
                ML3networkNotify((int)NFY_LINK_RXMPAK);
            }
    }

    UNLOCK_EVERYTHING(nKey);
}

int
ML2nBlockNetworkNotify( void )
{
    return( MincLock(&nNetNotifyBlocked) );
}

void
ML2vUnblockNetworkNotify( int nKey )
{
    int lock = MdecLock(&nNetNotifyBlocked) - 1;
    if ( nKey != lock )
        ;
    if ( nNetNotifyBlocked < 0 )
        nNetNotifyBlocked = 0;
}
```

```
/****************************************************************

  This code (c) Copyright 1991  by
          and designed by
              Research In Motion Limited
              Suite 6, 465 Phillip Street
              Waterloo, Ontario
              N2L 6C7
              (519) 888-7465

  Author:     Michael A. Barnstijn

  Date created: 27 November 1991

  Description:
      Mobitex NETWORK layer transmit for TEXT MPAKs

  Change History:

****************************************************************/
#include "npackets.h"



/*
**  @doc    INTERNAL PUBLIC NETWORK
**  @api    int | ML3returnMPAKasUnknown | Return an MPAK as unknown.
**  @parm   PVOID | pvBuffer | Pointer to a buffer to return as unknown.
**  @parm   int | nBufferSize | Size of the buffer to return.
**  @rdesc  The return code specifies the result returned from
**              <a ML3nSubmitPacket>.
**  @comm   Original: Sets the MPAK "UNKNOWN_F" flag and ships the whole
**              MPAK back to the radio.  Alter the command to a disconnect
**              if it is one of the connection request commands, as per the
**              Mobitex specification 9-4.5.5 (page 35).
*/
int         ML3returnMPAKasUnknown ( PVOID pvBuffer, int nBufferSize )
{
int     nStatus = N_MPAK_BLOCKED;

    if ( ML3nCheckSendStatus ( APP_SEND_CHECK ) == OK_TO_SEND )
    {
        nStatus = ML3pvtReturnMPAKasUnknown ( pvBuffer, nBufferSize );
        ML3nCheckSendStatus ( nStatus + AS_STATUS_OFFSET );
    }
    return ( nStatus );
}



/*
**  @doc    INTERNAL NETWORK
**  @api    int | ML3pvtReturnMPAKasUnknown | Return an MPAK as unknown.
**  @parm   PVOID | pvBuffer | Pointer to a buffer to return as unknown.
**  @parm   int | nBufferSize | Size of the buffer to return.
**  @rdesc  The return code specifies the result returned from
**              <a ML3nSubmitPacket>.
**  @comm   Original: Sets the MPAK <f UNKNOWN_F> flag and ships the whole
**              MPAK back to the radio.  Alter the command to a disconnect
**              if it is one of the connection request commands, as per the
**              Mobitex specification 9-4.5.5 (page 35).
*/
int         ML3pvtReturnMPAKasUnknown ( PVOID pvBuffer, int nBufferSize )
{
    /*
    **  set the "unknown" flag
    */
    ((PMpakNoListHeader)pvBuffer)->bStateAndFlags |= UNKNOWN_F;

    /*
    **  change the command if it is a connection request
    */
    switch ( ((PMpakNoListHeader)pvBuffer)->bMpakCommand )
    {
    case N_CONREQ :
    case N_SOSCONREQ :
    case N_ADDCONREQ :
    case N_EXTCONREQ :
        ((PMpakNoListHeader)pvBuffer)->bMpakCommand = N_DISCON;
        nBufferSize = 10;
        break;
    }

    /*
    **  send the MPAK
    */
    return ( ML3nSubmitPacket ( TRUE, pvBuffer, nBufferSize, FALSE ));
}
```

```
/*****************************************************************

  This code (c) Copyright 1991  by
             and designed by
                 Research In Motion Limited
                 Suite 6, 465 Phillip Street
                 Waterloo, Ontario
                 N2L 6C7
                 (519) 888-7465

  Author:        Michael A. Barnstijn

  Date created: 27 November 1991

  Description:
        Mobitex NETWORK layer transmit for TEXT MPAKs

  Change History:

*****************************************************************/
#include "npackets.h"


/*
**  @doc    INTERNAL PUBLIC NETWORK
**  @api    int | ML3sendRoam | Send a roam packet out to the network.
**  @rdesc  The return code specifies the result of the <a ML3nSubmitPacket>
**              call.
**  @comm   Original: Formats an MPAK and transmits it.  If the parameters
**              are incorrect, it returns a status value.  Otherwise it
**              formats the MPAK and attempts to send it.  (During normal
**              operation there should be no problem transmitting the MPAK
**              since the transmit FIFO should not be full.)
*/
int         ML3sendRoam ( void )
{
int     nStatus = N_MPAK_BLOCKED;

    if ( ML3nCheckSendStatus ( APP_SEND_CHECK ) == OK_TO_SEND )
    {
        nStatus = ML3pvtSendRoam();
        ML3nCheckSendStatus ( nStatus + AS_STATUS_OFFSET );
    }
    return ( nStatus );
}


/*
**  @doc    INTERNAL NETWORK
**  @api    int | ML3pvtSendRoam | Send a roam packet out to the network.
**  @rdesc  The return code specifies the result of the <a ML3nSubmitPacket>
**              call.
**  @comm   Original: Formats an MPAK and transmits it.  If the parameters
**              are incorrect, it returns a status value.  Otherwise it
**              formats the MPAK and attempts to send it.  (During normal
**              operation there should be no problem transmitting the MPAK
**              since the transmit FIFO should not be full.)
*/
int         ML3pvtSendRoam ( void )
{
int     nStatus,nOffset;
MAN     mDestination;

    /*
    **  Set the destination MAN to the network address.
    */
    mDestination = MAN_MOBITEX;

    /*
    **  fill in the MPAK header
    */
    nStatus = ML3nFillMpakHeader ( ML3cbMpakBuffer, N_ROAM, &nOffset, 0, 1,
        ML3getLocalMANnumber (), &mDestination );

    /*
    **  If the header was OK, send the MPAK.
    */
    if ( nStatus == N_OK )
        nStatus = ML3nSubmitPacket ( TRUE, ML3cbMpakBuffer, nOffset, TRUE );
    return(nStatus);
}
```

```
#include "basetype.h"
#include "link.h"
#include "ldefines.h"
#include "lprotos.h"
#include "mobilib.h"
#include "access.h"
#include "debug.h"

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

#define IS_RX_ERROR(X)  (X & 0xFF00)
#define RX_ERROR_RESET  {                                               \
                          V_SEND_DEBUG_STRING(" *RERR=");              \
                          plfFrameData->nRXstate &= 0x0F;              \
                          plfFrameData->nRXstate += (int)'A';          \
                          V_SEND_DEBUG_STRING(&plfFrameData->nRXstate); \
                          V_SEND_DEBUG_STRING("* ");                   \
                          plfFrameData->nRXstate =                     \
                          WAIT_FOR_EOF_AFTER_ERROR;                    \
                          DEBUG_STRING((CSstr"?"));                    \
                          return(DATA_WAS_PROCESSED);                  \
                        }

#define OK_BYTE     0   /* status values */
#define BAD_BYTE    0x7F
#define TYPE_BYTE   0x7E
#define OK_TEXT     0x00
#define BAD_TEXT    0x80

#define GET_HEX_VALUE(X)        (xlatASCIItable[X]&BAD_BYTE)
#define TEST_TEXT(X)            (xlatASCIItable[X]&BAD_TEXT)

// lookup to get binary nybble value of ASCII, and test if TEXT is ok.
static byte _based(_segname("_CODE")) xlatASCIItable[128] = {
     BAD_BYTE|BAD_TEXT, BAD_BYTE|BAD_TEXT,
     BAD_BYTE|BAD_TEXT, BAD_BYTE|BAD_TEXT, // NUL  SOH  STX  ETX
     BAD_BYTE|BAD_TEXT, BAD_BYTE|BAD_TEXT,
     BAD_BYTE|BAD_TEXT, BAD_BYTE|BAD_TEXT, // EOT  ENQ  ACK  BEL
     BAD_BYTE|BAD_TEXT, BAD_BYTE|BAD_TEXT,
     BAD_BYTE|BAD_TEXT, BAD_BYTE|BAD_TEXT, // BS   HT   LF   VT
     BAD_BYTE|BAD_TEXT, BAD_BYTE|BAD_TEXT,
     BAD_BYTE|BAD_TEXT, BAD_BYTE|BAD_TEXT, // FF   CR   SO   SI

     BAD_BYTE|BAD_TEXT, BAD_BYTE|BAD_TEXT,
     BAD_BYTE|BAD_TEXT, BAD_BYTE|BAD_TEXT, // DLE  DC1  DC2  DC3
     BAD_BYTE|BAD_TEXT, BAD_BYTE|BAD_TEXT,
     BAD_BYTE|BAD_TEXT, BAD_BYTE|BAD_TEXT, // DC4  NAK  SYN  ETB
     BAD_BYTE|BAD_TEXT, BAD_BYTE|BAD_TEXT,
     BAD_BYTE|BAD_TEXT, BAD_BYTE|BAD_TEXT, // CAN  EM   SUB  ESC
     BAD_BYTE|BAD_TEXT, BAD_BYTE|BAD_TEXT,
```

File: src\RXASSMBL.C

```
     BAD_BYTE|BAD_TEXT, BAD_BYTE|BAD_TEXT, // FS   GS   RS   VS

     BAD_BYTE| OK_TEXT,TYPE_BYTE|BAD_TEXT,
     BAD_BYTE| OK_TEXT,TYPE_BYTE| OK_TEXT, // ' '  !    "    #
     BAD_BYTE| OK_TEXT, BAD_BYTE| OK_TEXT,
    TYPE_BYTE|BAD_TEXT, BAD_BYTE| OK_TEXT, // $    %    &    '
     BAD_BYTE| OK_TEXT, BAD_BYTE| OK_TEXT,
    TYPE_BYTE|BAD_TEXT, BAD_BYTE| OK_TEXT, // (    )    *    +
     BAD_BYTE| OK_TEXT, BAD_BYTE| OK_TEXT,
     BAD_BYTE| OK_TEXT, BAD_BYTE| OK_TEXT, // ,    -    .    /

            0| OK_TEXT,        1| OK_TEXT,
            2| OK_TEXT,        3| OK_TEXT, // 0    1    2    3
            4| OK_TEXT,        5| OK_TEXT,
            6| OK_TEXT,        7| OK_TEXT, // 4    5    6    7
            8| OK_TEXT,        9| OK_TEXT,
     BAD_BYTE| OK_TEXT, BAD_BYTE| OK_TEXT, // 8    9    :    ;
     BAD_BYTE| OK_TEXT, BAD_BYTE| OK_TEXT,
     BAD_BYTE| OK_TEXT,TYPE_BYTE|BAD_TEXT, // <    =    >    ?

     BAD_BYTE| OK_TEXT,       10| OK_TEXT,
           11| OK_TEXT,       12| OK_TEXT, // @    A    B    C
           13| OK_TEXT,       14| OK_TEXT,
           15| OK_TEXT, BAD_BYTE| OK_TEXT, // D    E    F    G
     BAD_BYTE| OK_TEXT, BAD_BYTE| OK_TEXT,
     BAD_BYTE| OK_TEXT, BAD_BYTE| OK_TEXT, // H    I    J    K
     BAD_BYTE| OK_TEXT, BAD_BYTE| OK_TEXT,
     BAD_BYTE| OK_TEXT, BAD_BYTE| OK_TEXT, // L    M    N    O

     BAD_BYTE| OK_TEXT, BAD_BYTE| OK_TEXT,
     BAD_BYTE| OK_TEXT, BAD_BYTE| OK_TEXT, // P    Q    R    S
     BAD_BYTE| OK_TEXT, BAD_BYTE| OK_TEXT,
     BAD_BYTE| OK_TEXT, BAD_BYTE| OK_TEXT, // T    U    V    W
     BAD_BYTE| OK_TEXT, BAD_BYTE| OK_TEXT,
     BAD_BYTE| OK_TEXT, BAD_BYTE| OK_TEXT, // X    Y    Z    [
     BAD_BYTE| OK_TEXT, BAD_BYTE| OK_TEXT,
     BAD_BYTE|BAD_TEXT, BAD_BYTE| OK_TEXT, // \    ]    ^    _

     BAD_BYTE| OK_TEXT, BAD_BYTE| OK_TEXT,
     BAD_BYTE| OK_TEXT, BAD_BYTE| OK_TEXT, // `    a    b    c
     BAD_BYTE| OK_TEXT, BAD_BYTE| OK_TEXT,
     BAD_BYTE| OK_TEXT, BAD_BYTE| OK_TEXT, // d    e    f    g
     BAD_BYTE| OK_TEXT, BAD_BYTE| OK_TEXT,
     BAD_BYTE| OK_TEXT, BAD_BYTE| OK_TEXT, // h    i    j    k
     BAD_BYTE| OK_TEXT, BAD_BYTE| OK_TEXT,
     BAD_BYTE| OK_TEXT, BAD_BYTE| OK_TEXT, // l    m    n    o

     BAD_BYTE| OK_TEXT, BAD_BYTE| OK_TEXT,
     BAD_BYTE| OK_TEXT, BAD_BYTE| OK_TEXT, // p    q    r    s
     BAD_BYTE| OK_TEXT, BAD_BYTE| OK_TEXT,
     BAD_BYTE| OK_TEXT, BAD_BYTE| OK_TEXT, // t    u    v    w
     BAD_BYTE| OK_TEXT, BAD_BYTE| OK_TEXT,
     BAD_BYTE| OK_TEXT, BAD_BYTE| OK_TEXT, // x    y    z    {
     BAD_BYTE| OK_TEXT, BAD_BYTE| OK_TEXT,
     BAD_BYTE|BAD_TEXT, BAD_BYTE|BAD_TEXT  // |    }    ~    DEL
};
```

```
/* lookup determines if ASCII is valid TEXT
byte TEXTtable[128] = {
    BAD_BYTE,BAD_BYTE,BAD_BYTE,BAD_BYTE,
    BAD_BYTE,BAD_BYTE,BAD_BYTE,BAD_BYTE,
    BAD_BYTE,BAD_BYTE,BAD_BYTE,BAD_BYTE,
    BAD_BYTE,BAD_BYTE,BAD_BYTE,BAD_BYTE,

    BAD_BYTE,BAD_BYTE,BAD_BYTE,BAD_BYTE,
    BAD_BYTE,BAD_BYTE,BAD_BYTE,BAD_BYTE,
    BAD_BYTE,BAD_BYTE,BAD_BYTE,BAD_BYTE,
    BAD_BYTE,BAD_BYTE,BAD_BYTE,BAD_BYTE,

     OK_BYTE,BAD_BYTE, OK_BYTE, OK_BYTE,
     OK_BYTE, OK_BYTE,BAD_BYTE, OK_BYTE,
     OK_BYTE, OK_BYTE,BAD_BYTE, OK_BYTE,
     OK_BYTE, OK_BYTE, OK_BYTE, OK_BYTE,

     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE,BAD_BYTE,

     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,

     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,
     OK_BYTE, OK_BYTE,BAD_BYTE, OK_BYTE,

     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,

     OK_BYTE, OK_BYTE, OK_BYTE, OK_BYTE,
     OK_BYTE, OK_BYTE, OK_BYTE, OK_BYTE,
     OK_BYTE, OK_BYTE, OK_BYTE, OK_BYTE,
     OK_BYTE, OK_BYTE,BAD_BYTE,BAD_BYTE
    };
*/

enum {
    WAIT_FOR_START_OF_FRAME = -1,
    WAIT_FOR_EOF_AFTER_ERROR,
    IF_OR_CF_CHECK,
    IF_LENGTH_DIGIT_2,
    IF_LENGTH_DIGIT_3,
    IF_LENGTH_DIGIT_4,
    IF_TEXT_ACCUMULATE,
    IF_DATA_ACCUMULATE_MSNYBBLE,
    IF_DATA_ACCUMULATE_LSNYBBLE,
    IF_CHECKSUM_ACCUMULATE_MSNYBBLE,
    IF_CHECKSUM_ACCUMULATE_LSNYBBLE,
    IF_END_OF_FRAME_TEST,
    CF_TYPE_TEST,
    CF_END_OF_FRAME_TEST
    };

boolean
fIsTextStringOK(unsigned char *string)
    {
    for ( ; *string; ++string )
        if ( *string > 127 || TEST_TEXT(*string) != OK_TEXT )
            return(FALSE);
    return(TRUE);
    }

/****************************************
 *
        nAssembleIncomingLinkFrame:    called to assemble MASC RX frames

  USAGE:  N/A

  DESCRIPTION:    assemble incoming Control or Information frames.
        Check for over-length and other errors.  This is a state machine
        driven by the incoming data.

  INPUTS:         NONE

  OUTPUTS:        -1       No data received
                   0       Data received and parsed
                   1       Complete frame received and parsed

  SIDE-EFFECTS:   state machine variables, data is converted and stored,
                  lengths and counters are updated.

  WARNINGS:       internal function

****************************************/
int
nAssembleIncomingLinkFrame(linkFrame * plfFrameData, linkDefs *pldLink)
    {
    int nIncomingCharacter,nCharCheckValue;

    /* go get the byte.  If nothing is available, return an exit code */
    if ( (nIncomingCharacter = MLigetByte()) == -1 )
        return(NO_DATA_PROCESSED);

    DEBUG_PRINTF((CSstr"%c(%x)",nIncomingCharacter,nIncomingCharacter));

    if ( plfFrameData->nRXstate == WAIT_FOR_START_OF_FRAME &&
         nIncomingCharacter != START_FRAME )
    {
//        if ( nIncomingCharacter == START_FRAME )
//            DEBUG_STRING((CSstr" start?! "));
//        else if ( (nIncomingCharacter&0x7F) == START_FRAME )
//            DEBUG_STRING((CSstr" strip start! "));
//        else
//            DEBUG_STRING((CSstr" ! "));
        return(DATA_WAS_PROCESSED);
    }
```

```
    if ( IS_RX_ERROR(nIncomingCharacter) )
    {
//       DEBUG_PRINTF((CSstr"?%02x",(nIncomingCharacter>>8)&0x00FF));
        RX_ERROR_RESET; // reset the state on a receive error
    }

    if ( nIncomingCharacter == START_FRAME ) {
        // start fresh with each START
        plfFrameData->bRXchecksum       = START_FRAME;
        plfFrameData->nRXlength         = 1;
        plfFrameData->bRXcfType         = 0;
        plfFrameData->bRXsequenceNumber = 0;
        plfFrameData->nRXstate          = IF_OR_CF_CHECK;
        plfFrameData->bRXdataSepCounter = 0;
//         DEBUG_STRING((CSstr" Start! "));
        return(DATA_WAS_PROCESSED);
        }
    else if ( ++plfFrameData->nRXlength > pldLink->nMaxIFlength )
    {
//         DEBUG_STRING((CSstr" ?big "));
        RX_ERROR_RESET;
    }
    switch ( plfFrameData->nRXstate ) {

        case WAIT_FOR_START_OF_FRAME:   // waiting for start of frame
            break;

        default:        // waiting for end of frame after an error
        case WAIT_FOR_EOF_AFTER_ERROR:
            plfFrameData->nRXstate = WAIT_FOR_EOF_AFTER_ERROR;
            if ( nIncomingCharacter == START_DATA )
                ++plfFrameData->bRXdataSepCounter;
            if ( nIncomingCharacter == END_FRAME ) {
                // re-synchronize at END of FRAME
                plfFrameData->nRXstate = WAIT_FOR_START_OF_FRAME;
                if ( plfFrameData->bRXdataSepCounter == 1 &&
                     plfFrameData->nRXlength >= MIN_FRAME_LENGTH ) {
                    plfFrameData->bRXcfType = 0;
                    plfFrameData->nRXlength = 0;
                    // signal a complete frame with errors
                    return(FRAME_WITH_ERRORS_COMPLETED);
                    }
                plfFrameData->nRXlength = 0;
                }
            break;

        case IF_OR_CF_CHECK:    // first byte after start.  Check if IF or CF

            plfFrameData->bRXchecksum ^= (byte)nIncomingCharacter;
            if ( (nCharCheckValue=GET_HEX_VALUE(nIncomingCharacter)) == BAD_BYTE
 )
                RX_ERROR_RESET;

            if ( nCharCheckValue == TYPE_BYTE ) {     /* control frame? */
                plfFrameData->nRXstate = CF_TYPE_TEST;
                plfFrameData->bRXcfType = (byte) nIncomingCharacter;
```

```
                break;
                }

            // first nybble of IF length
            plfFrameData->bRXcfType = TYPE_IF;

            // info. frame data length MSN
            plfFrameData->nRXifLength = nCharCheckValue << 12;

            ++plfFrameData->nRXstate;
            break;

//*******************************
// INFORMATION FRAME HANDLING
//*******************************

        case IF_LENGTH_DIGIT_2: // second nybble of IF length
            plfFrameData->bRXchecksum ^= (byte)nIncomingCharacter;
            if ( (nCharCheckValue=GET_HEX_VALUE(nIncomingCharacter)) > 15 )
                RX_ERROR_RESET;

            // 2nd nybble in IF data length
            plfFrameData->nRXifLength += nCharCheckValue << 8;
            ++plfFrameData->nRXstate;
            break;

        case IF_LENGTH_DIGIT_3: // third nybble of IF length
            plfFrameData->bRXchecksum ^= (byte)nIncomingCharacter;
            if ( (nCharCheckValue=GET_HEX_VALUE(nIncomingCharacter)) > 15 )
                RX_ERROR_RESET;

            // 3rd nybble in IF data length
            plfFrameData->nRXifLength += (byte)nCharCheckValue << 4;
            ++plfFrameData->nRXstate;
            break;

        case IF_LENGTH_DIGIT_4: // fourth and final nybble of IF length
            plfFrameData->bRXchecksum ^= (byte)nIncomingCharacter;
            if ( (nCharCheckValue=GET_HEX_VALUE(nIncomingCharacter)) > 15 )
                RX_ERROR_RESET;

            // 4th,final nybble in IF data length
            plfFrameData->nRXifLength += nCharCheckValue;
            if ( plfFrameData->nRXifLength > pldLink->nMaxIFlength )
                RX_ERROR_RESET;       // the specified MASC frame size is too bi
g!

            ++plfFrameData->nRXstate;
            // reset the length of the TEXT area of the incoming IF
            plfFrameData->nRXtextLength = 0;
            break;

        case IF_TEXT_ACCUMULATE:        // assemble the text area.
                                        // If the length is not at least 1,
                                        // ignore the frame!

            plfFrameData->bRXchecksum ^= (byte)nIncomingCharacter;
```

```
        if ( nIncomingCharacter == START_DATA ) {
            // starting the data section
            if ( plfFrameData->nRXtextLength < 1 )
                // there is no TEXT area, so this is an
                // incomplete link command
                RX_ERROR_RESET;

            plfFrameData->nRXdataLength = 0;

            plfFrameData->sRXtextArea[plfFrameData->nRXtextLength] = '\0';

            /* calculate data area length based on input length value,
             * received TEXT length, and the fixed area lengths.
             * This length is the number of HEX ASCII characters,
             * or double the ACTUAL number of BINARY bytes being
             * received.
             */

            plfFrameData->nRXdataCount  =
                plfFrameData->nRXifLength -
                IF_FIXED_LENGTH -
                plfFrameData->nRXtextLength;

            /* check if the size is too big, or not an even number --
             *
             *      HEX ASCII transmission of bytes means that
             *      2 characters are sent for each byte being
             *      transmitted: i.e. an even number of characters
             *      MUST be sent!
             */
            if ( plfFrameData->nRXdataCount > MAX_DATA_TEXT_LENGTH ||
                 plfFrameData->nRXdataCount & 0x0001 )
                RX_ERROR_RESET;

            ++plfFrameData->nRXstate;   // "receive data" state
            if ( plfFrameData->nRXdataCount == 0 )  // no data area?
                plfFrameData->nRXstate += 2;   // "receive checksum" state
            plfFrameData->nRXdataCount >>= 1;  // divide for byte count
            break;
            }

        if ( TEST_TEXT(nIncomingCharacter) != OK_TEXT )
            RX_ERROR_RESET;

        plfFrameData->sRXtextArea[plfFrameData->nRXtextLength++] = (byte) nI
ncomingCharacter;
        break;

    case IF_DATA_ACCUMULATE_MSNYBBLE:
        plfFrameData->bRXchecksum ^= (byte)nIncomingCharacter;
        if ( (nIncomingCharacter = GET_HEX_VALUE(nIncomingCharacter)) > 15 )

             RX_ERROR_RESET;

        // MSNybble
        plfFrameData->sRXdataArea[plfFrameData->nRXdataLength] = (byte) (nIn
comingCharacter << 4);
```

```
            ++plfFrameData->nRXstate;
            break;

        case IF_DATA_ACCUMULATE_LSNYBBLE:
            plfFrameData->bRXchecksum ^= (byte)nIncomingCharacter;
            if ( (nIncomingCharacter = GET_HEX_VALUE(nIncomingCharacter)) > 15 )

                 RX_ERROR_RESET;

            // LSNybble
            plfFrameData->sRXdataArea[plfFrameData->nRXdataLength++] += (byte)nI
ncomingCharacter;
            if ( --plfFrameData->nRXdataCount == 0 )
                ++plfFrameData->nRXstate;   // go to the checksum input state
            else
                --plfFrameData->nRXstate;   // go back for the next data byte
            break;

        case IF_CHECKSUM_ACCUMULATE_MSNYBBLE:
            if ( (nIncomingCharacter = GET_HEX_VALUE(nIncomingCharacter)) > 15 )

                 RX_ERROR_RESET;

            // MSNybble of received checksum
            plfFrameData->bRXchecksumInFrame = (byte) (nIncomingCharacter<<4);
            ++plfFrameData->nRXstate;   // go to the next state
            break;

        case IF_CHECKSUM_ACCUMULATE_LSNYBBLE:
            if ( (nIncomingCharacter = GET_HEX_VALUE(nIncomingCharacter)) > 15 )

                 RX_ERROR_RESET;

            // LSNybble of received checksum
            plfFrameData->bRXchecksumInFrame += (byte)nIncomingCharacter;
            if ( plfFrameData->bRXchecksumInFrame !=
                 plfFrameData->bRXchecksum )
                RX_ERROR_RESET;

            ++plfFrameData->nRXstate;   // go to the next state
            break;

        case IF_END_OF_FRAME_TEST:      // we must get the end of frame next,
                                        // otherwise this is an error!
            if ( nIncomingCharacter != END_FRAME ||
                 plfFrameData->nRXlength != plfFrameData->nRXifLength )
                 RX_ERROR_RESET;

            // go back to waiting for a START_FRAME!
            plfFrameData->nRXstate = WAIT_FOR_START_OF_FRAME;
            return(FRAME_COMPLETED);


    /****************************/
    /* CONTROL FRAME HANDLING */
    /****************************/
```

```
        case CF_TYPE_TEST:      // check for the control frame type
            if ( nIncomingCharacter == END_FRAME &&
                 plfFrameData->bRXcfType == TYPE_ACK  )
                RX_ERROR_RESET;

            if ( nIncomingCharacter != END_FRAME ) {
                if ( plfFrameData->bRXcfType != TYPE_ACK ||
                     (nIncomingCharacter != ACK_0 &&
                      nIncomingCharacter != ACK_1 &&
                      nIncomingCharacter != ACK_NONE) )
                    RX_ERROR_RESET;

                plfFrameData->bRXsequenceNumber = (byte) nIncomingCharacter;
                ++plfFrameData->nRXstate;
                break;
                }

            // drop through if this is a three-character Control Frame
            // e.g. SENS/SACK/RACK/NACK

        case CF_END_OF_FRAME_TEST:
            if ( nIncomingCharacter != END_FRAME )
                RX_ERROR_RESET;

            // go back to waiting for a START_FRAME!
            plfFrameData->nRXstate = WAIT_FOR_START_OF_FRAME;
            return(FRAME_COMPLETED);

        }

    return(DATA_WAS_PROCESSED);
    }
```

File: src\RXASSMBL.C

```
#include <string.h>

#include "basetype.h"
#include "enums.h"
#include "link.h"
#include "ldefines.h"
#include "lprotos.h"
#include "utils.hpc"
#include "debug.h"
SET_MEM_REF_FILE;

extern long mlstrtol(char *, char * *, int);

static volatile int nBframeReceivedLength = MAX_FRAME_LENGTH;
static volatile int nBframeReceivedInterval = 0;

static byte * sFXframe = NULL;
static int nFXlength = 0;

boolean
fInstallLinkInterpModule(void)
{
    if ( (sFXframe = ML_MALLOC(MAX_DATA_LENGTH+1,RX_POOL)) == NULL )
        return(FALSE);
    return(TRUE);
}

boolean
fRemoveLinkInterpModule(void)
{
    ML_FREE(sFXframe);
    return(TRUE);
}

void
ML2vGetFXframe(int *pnLength, byte *pbFrame)
    {
    if ( pnLength != NULL )
    {
        if ( sFXframe == NULL )
            *pnLength = 0;
        else
            *pnLength = nFXlength;
    }
    if ( pbFrame != NULL && sFXframe != NULL )
        memcpy(pbFrame,sFXframe,nFXlength);
    }

void
vGetBframeValues(int *pnLength, int *pnInterval)
    {
    *pnLength = nBframeReceivedLength;
    *pnInterval = nBframeReceivedInterval;
    }

int
nInterpretIncomingInfoFrame(linkFrame *plfFrameData)
{
MAN man;
int nLength, nReturnValue, nInterval;

char *sText = plfFrameData->sRXtextArea;

nReturnValue = 1;

switch ( sText[0] ) {
    case 'B' :
        // change current settings in response to received "B" frame

        // preset the values
        nLength = nBframeReceivedLength;
        nInterval = nBframeReceivedInterval;

        // get the length value from the frame
        nLength = (int) mlstrtol(&sText[2], NULL, 16);
        if ( nLength <= 0 )     // error check the value
            nLength = nBframeReceivedLength;

        // skip over the length to the next parameter
        // we don't want to use another string pointer
        // in the "strtol()" function call, since we are
        // using /MXw memory model, and the pointer would
        // be local, but the stack segment might not be
        // the same as the data segment in small data models.
        for ( sText += 2; *sText != ',' && *sText; ++sText )
            ;
        if( *sText == ',' ) {
            ++sText;
            nInterval = (int)mlstrtol( sText, NULL, 10 );
            if ( nInterval < 0 )   // error checking
                nInterval = 0;
            }

        nBframeReceivedLength   = nLength;
        vSetMaxIFlength(nLength);
        vSetTransmitSpacingTime(nInterval * 10L);
        nBframeReceivedInterval = nInterval;

        vReceivedRestartRequest();
        break;

    case 'N' :
        vUnsentNetworkPacket(plfFrameData);
        break;

    case 'R' :
        vErrorNetworkPacket(plfFrameData);
        break;

    case 'M' :
        vNewNetworkPacket(plfFrameData);
        nReturnValue = 0;
        break;
```

```
    /* ignore the following: */
    case 'E' :      /* error description */
    case 'P' :      /* link testing      */
    case 'T' :      /* SOS sText         */
        break;

    case 'F' :
        if ( sText[1] != ' ' || sText[2] == '\0' )
            break;  // link error!

        switch ( sText[2] ) {
            case 'F' :
                vRadioConnect(TRUE);
                break;

            case 'G' :
                vRadioDisconnect();
                break;

            case 'H' :
                vPacketSentToNetwork();
                break;

            case 'O' :
                vReceivedLinkClose();
                nSendNewACK(vCloseWasACKed); // cause callback!
                nReturnValue = 0;
                break;

            case 'P' :
                if( sText[3] == '\0' ) {
                    DEBUG_STRING((CSstr"got MAN request\n"));
                    vMANrequestReceived();
                    break;
                    }
                man = mlstrtol(&sText[3],NULL, 16) & 0x00FFFFFFL;
                vSetLinkMANnumber(man);
                DEBUG_PRINTF((CSstr"got MAN Number %ld\n",man));
                break;

            case 'Q' :
                if( sText[3] == '\0' )
                    nReturnValue = 1; // no Device ID -- shouldn't happen
                else
                    vDeviceIDreceived(&sText[3]);
                break;

            case 'K' : // error messages from the radio
                // add error code processing here
                break;

            case 'A' : // reporting on power save mode
                // add code to report to upper levels
                break;

            case 'S' : // change of traffic area
                // add change of traffic area processing here
                break;

            case 'T' : // change temp default list
                // add change temp default list processing here
                break;

            case 'X' : // change communication parms
                nFXlength = plfFrameData->nRXdataLength;
                if ( sFXframe != NULL )
                    memcpy(sFXframe,plfFrameData->sRXdataArea,nFXlength);
                vNetworkNotify(NFY_LINK_NEW_X25_PARMS);
                // add change communication parms processing here
                break;

            case 'Z' : // product information
                // add product information processing here
                break;

            case '#' :
                break;          // ignore the short list
            }
        break;
    }
return(nReturnValue);
}
```

```
/****************************************************************

  This code (c) Copyright 1992  by
          and designed by
              Research In Motion Limited
              180 Columbia Street West
              Waterloo, Ontario, Canada
              N2L 3L3
       Phone: (519) 888-7465
         FAX: (519) 888-6906

  Author:     Michael A. Barnstijn

  Date created: June 2, 1992

  Description:
        Network send and receive interface module
        for MobiLib-Plus -- LINK layer.

  Change History:

***************************************************************/

#include <memory.h>

#include "basetype.h"
#include "enums.h"
#include "link.h"
#include "ldefines.h"
#include "lprotos.h"
#include "debug.h"
#include "locks.h"
#include "utils.hpc"

SET_LOCK_REF_FILE;
SET_MEM_REF_FILE;

static boolean fNetSendRequested = FALSE;
static int nNetSendStatus = TX_IF_NONE;
static boolean fNetDoneWanted = FALSE;
static int nNetRXfifoIn = 0;
static int nNetRXfifoOut = 0;
static netFrameStruct *pnfsTXmpak = NULL;
static netFrameStruct *pnfsRXmpaks = NULL;
static boolean fRequestNetPacketReturn = FALSE;

#define MAX_RX_MPAKS    8

/* macros for changing FIFO pointers and determining their status */

#define NET_FIFO_FULL      (((nNetRXfifoIn+1)%MAX_RX_MPAKS) == nNetRXfifoOut)
#define NET_FIFO_EMPTY     (nNetRXfifoOut == nNetRXfifoIn)
#define NEXT_NET_FIFO_IN  nNetRXfifoIn = (nNetRXfifoIn+1)%MAX_RX_MPAKS
#define NEXT_NET_FIFO_OUT nNetRXfifoOut = (nNetRXfifoOut+1)%MAX_RX_MPAKS

static void vNetSendCallback(int nStatus);

int
ML2putNetworkPacket(volatile byte *pbData,int nDataLength,boolean fNetDone)
    {
    int nStatus;
    nStatus = nCheckInfoFrameParameters("M",nDataLength,(byte *)pbData);
    if ( nStatus != TX_PARMS_OK )
        return( FALSE );

    DEBUG_PRINTF((CSstr"Req TX net, size %d ",nDataLength));

    memcpy(pnfsTXmpak->sNetData,(void *)pbData,nDataLength);
    fRequestNetPacketReturn = FALSE;
    pnfsTXmpak->nNetDataLength = nDataLength;
    fNetSendRequested = TRUE;
    fNetDoneWanted = fNetDone;
    return( TRUE );
    }

void
ML2cancelNetworkPacket(void)
    {
    int nKey;

    LOCK_EVERYTHING(nKey);
    if ( fNetSendRequested ) {
        fNetSendRequested = FALSE;
        nNetSendStatus = TX_IF_NONE;
//        ALLOW_DEBUG(TRUE);
//        DEBUG_PRINTF((CSstr" TX FAILED: CANCELLED! "));
        vNetworkNotify( NFY_LINK_TXFAILED );
        UNLOCK_EVERYTHING(nKey);
        return;
        }

    switch ( nNetSendStatus ) {
        case TX_IF_NONE :
        case TX_NET_RETURNED :
        case TX_NET_DONE :
        case TX_IF_FAILED :
            nNetSendStatus = TX_IF_NONE;
            break;

        case TX_IF_WAITING :
        case TX_IF_QUEUED :
            vIFtransmitFailed();
            nNetSendStatus = TX_IF_NONE;
            break;

        case TX_IF_SENDING :
            if ( fIsLinkRadio() && fNetDoneWanted )
                fRequestNetPacketReturn = TRUE;
            break;

        case TX_IF_DONE :
            sendCmdFx(NULL,'I');
            break;
        }
```

```
    UNLOCK_EVERYTHING(nKey);
    }

void
ML2doneNetworkPacketSend(void)
    {
    if ( nNetSendStatus == TX_NET_RETURNED ||
         nNetSendStatus == TX_NET_DONE ||
         nNetSendStatus == TX_IF_FAILED )
        nNetSendStatus = TX_IF_NONE;
    }

int
ML2getNetworkPacket(byte * pbNETPACK,int * pnNETPACKlength)
    {
    int nKey,nReturnValue = L_NO_NETPACKS;
    LOCK_EVERYTHING(nKey);

    if ( !NET_FIFO_EMPTY ) {
        // copy into the caller's data areas */

        if ( pbNETPACK != NULL ) {
            memcpy((void *)pbNETPACK,
                   pnfsRXmpaks[nNetRXfifoOut].sNetData,
                   pnfsRXmpaks[nNetRXfifoOut].nNetDataLength);

            if ( pnNETPACKlength != NULL )
                *pnNETPACKlength = pnfsRXmpaks[nNetRXfifoOut].nNetDataLength;

            NEXT_NET_FIFO_OUT;
            }

        ALLOW_DEBUG(TRUE);
//        if ( pbNETPACK == NULL )
//            DEBUG_STRING((CSstr"\nNet packet available request "));
        DEBUG_PRINTF((CSstr" ML2getNetworkPacket(size %d/packets waiting %d):",
            *pnNETPACKlength,
            ((nNetRXfifoIn+MAX_RX_MPAKS)-nNetRXfifoOut)%MAX_RX_MPAKS ));
//        if ( pbNETPACK != NULL )
//            DEBUG_HEXDUMP("",pbNETPACK,*pnNETPACKlength);
        nReturnValue = L_NEW_NETPACK;
        }

    UNLOCK_EVERYTHING(nKey);

    return( nReturnValue );
    }

void
ML2flushReceiver(void)
    {
    int nKey;
    LOCK_EVERYTHING(nKey);
    while ( !NET_FIFO_EMPTY )
        NEXT_NET_FIFO_OUT;
    UNLOCK_EVERYTHING(nKey);
    }
```

```
boolean
fInstallLinkNetRXTXmodule(void)
    {
    pnfsRXmpaks = ML_MALLOC(sizeof(netFrameStruct) * MAX_RX_MPAKS, RX_POOL );
    if ( pnfsRXmpaks == NULL )
        return(FALSE);
    pnfsTXmpak = ML_MALLOC(sizeof(netFrameStruct), TX_POOL );
    if ( pnfsTXmpak == NULL ) {
        ML_FREE(pnfsRXmpaks);
        pnfsRXmpaks = NULL;
        return(FALSE);
        }
    fNetSendRequested = FALSE;
    nNetSendStatus = TX_IF_NONE;
    pnfsTXmpak->nNetDataLength = 0;
    fNetDoneWanted = FALSE;
    nNetRXfifoIn = 0;
    nNetRXfifoOut = 0;
    return(TRUE);
    }

boolean
fRemoveLinkNetRXTXmodule(void)
    {
    fNetSendRequested = FALSE;
    nNetSendStatus = TX_IF_NONE;
    fNetDoneWanted = FALSE;
    nNetRXfifoIn = 0;
    nNetRXfifoOut = 0;
    ML_FREE(pnfsTXmpak);
    pnfsTXmpak = NULL;
    ML_FREE(pnfsRXmpaks);
    pnfsRXmpaks = NULL;
    return(TRUE);
    }

boolean
fIsNetSendRequested(void)
    {
    if ( fIsNetAvailable() )
        return( fNetSendRequested );
    return( FALSE );
    }

void
vQueueNetSend(void)
    {
    nNetSendStatus = nSendInfoFrame(vNetSendCallback,"M",
                                    pnfsTXmpak->nNetDataLength,
                                    pnfsTXmpak->sNetData, TRUE);

    fNetSendRequested = FALSE;

    DEBUG_PRINTF((CSstr"Q net(%d) send = %d ",pnfsTXmpak->nNetDataLength,nNetSen
dStatus));
    }
```

```
void
vPacketSentToNetwork(void)
    {
    if ( nNetSendStatus == TX_IF_DONE ) {
        nNetSendStatus = TX_NET_DONE;
        fRequestNetPacketReturn = FALSE;
        ALLOW_DEBUG(TRUE);
        DEBUG_PRINTF((CSstr" TXnet Done "));
        vNetworkNotify( NFY_LINK_TXDONE );
        }
    }

void
vErrorNetworkPacket(linkFrame *plfFrameData)
    {
    if ( nNetSendStatus == TX_IF_DONE &&
         pnfsTXmpak->nNetDataLength == plfFrameData->nRXdataLength &&
         memcmp(pnfsTXmpak->sNetData, plfFrameData->sRXdataArea,
                pnfsTXmpak->nNetDataLength) == 0 ) {
        nNetSendStatus = TX_NET_RETURNED;
        fRequestNetPacketReturn = FALSE;
        ALLOW_DEBUG(TRUE);
        DEBUG_PRINTF((CSstr" TXnet FAILED: ERROR "));
        vNetworkNotify( NFY_LINK_TXFAILED );
        }
    }

void
vUnsentNetworkPacket(linkFrame *plfFrameData)
    {
    if ( nNetSendStatus == TX_IF_DONE &&
         pnfsTXmpak->nNetDataLength == plfFrameData->nRXdataLength &&
         memcmp(pnfsTXmpak->sNetData, plfFrameData->sRXdataArea,
                pnfsTXmpak->nNetDataLength) == 0 ) {
        nNetSendStatus = TX_NET_RETURNED;
        fRequestNetPacketReturn = FALSE;
        ALLOW_DEBUG(TRUE);
        DEBUG_PRINTF((CSstr" TXnet FAILED: UNSENT "));
        vNetworkNotify( NFY_LINK_TXFAILED );
        }
    }

void
vNewNetworkPacket(linkFrame *plfFrameData)
    {
    int nKey,nStatus;

    LOCK_EVERYTHING(nKey);
    ALLOW_DEBUG(TRUE);
    DEBUG_PRINTF((CSstr" vNewNetworkPacket: "));
    if ( NET_FIFO_FULL ) {
        if ( fIsLinkOpen() ) {
            DEBUG_PRINTF((CSstr" discarded, not ACKed "));
            }
        else {
            DEBUG_PRINTF((CSstr" discarded, but ACKed "));
            nSendNewACK(NULL);
            }
        UNLOCK_EVERYTHING(nKey);
        return;
        }

    pnfsRXmpaks[nNetRXfifoIn].bFrameCode = 'M';
    memcpy(pnfsRXmpaks[nNetRXfifoIn].sNetData,
           plfFrameData->sRXdataArea, plfFrameData->nRXdataLength);
    pnfsRXmpaks[nNetRXfifoIn].nNetDataLength = plfFrameData->nRXdataLength;
    NEXT_NET_FIFO_IN;
    UNLOCK_EVERYTHING(nKey);
    DEBUG_PRINTF((CSstr" queued (%d)",
        ((nNetRXfifoIn+MAX_RX_MPAKS)-nNetRXfifoOut)%MAX_RX_MPAKS ));
    vNetworkNotify( NFY_LINK_RXMPAK );

    nStatus = nSendNewACK(NULL);

    if ( nStatus < 0 )
        DEBUG_STRING((CSstr" failed ACK! "));
    else
        DEBUG_PRINTF((CSstr" done ACK %d ",nStatus));
    }

static void
vNetSendCallback(int nStatus)
    {
    switch ( nStatus ) {
        case TX_IF_FAILED :
            ALLOW_DEBUG(TRUE);
            DEBUG_PRINTF((CSstr" TX FAILED: BAD LINK! "));
            vNetworkNotify( NFY_LINK_TXFAILED);
            fRequestNotPacketReturn = FALSE;
            break;

        case TX_IF_SENDING :
            nNetSendStatus = nStatus;
            break;

        case TX_IF_DONE :
            if ( fRequestNetPacketReturn ) {
                nNetSendStatus = TX_IF_DONE;
                sendCmdFx(NULL,'I');
                }
            else if ( fIsLinkRadio() && fNetDoneWanted )
                nNetSendStatus = nStatus;
            else {
                nNetSendStatus = TX_NET_DONE;
                vNetworkNotify( NFY_LINK_TXDONE );
                }
            fRequestNetPacketReturn = FALSE;
            break;
        }
    }
```

```
#include "stdio.h"
#include <string.h>

union alltypes
  {
    char     *c;
    short    *h;
    int      *i;
    unsigned *u;
    char     *s;
  };

typedef struct _pfile
  {
    char *string;
    int   count;
  } pfile;

static int xscanf(pfile *fp, union alltypes *argp);
static long fgetnum(pfile *fp, int base, int width, int *got);
static int skipws( pfile *fp );

long int
mlstrtol(char *s, char * *ret, int base)
{   static char xlat[17] = "0123456789ABCDEF";
    int negative = 0;
    long int l;
    char *p;
    while ( *s && (*s == ' ' || *s == '\t') )
        ++s;
    if ( *s == '-' )
    {
        negative = 1;
        ++s;
    }
    else if ( *s == '+' )
        ++s;

    while ( *s && (*s == ' ' || *s == '\t') )
        ++s;

    for ( l = 0L; *s; ++s )
    {
        if ( (p=strchr( xlat, (int)*s )) == NULL )
        {
            if ( ret != NULL )
                *ret = s;
            break;
        }
        l *= (long)base;
        l += (long int)(p-xlat);
    }
    return( (negative)?-l:l );
}

    static void
_stropen( char *str1, int len, pfile *descr )
  {
    descr->count = -len;
    descr->string = str1;
  }

    static int
sgetc( pfile *file )
  {
    if( ++(file->count) == 1 )
      {
        --(file->count);
        return( EOF );
      }
    else
        return( *(file->string)++ );
  }

    static void
sungetc( char unskip, pfile *file )
  {
    --(file->count);
    *(--file->string) = unskip;
  }

/*
 * scan given string by handcrafting file structure for getc
 */

    int
mlsscanf( char *sp, union alltypes args )
  {
    pfile file;

    _stropen( sp, strlen(sp), &file );
    return( xscanf(&file, &args) );
  }


   static int
xscanf( pfile *fp, union alltypes *argp )
  {
    register int fc, gc;
    int          base, width, gotany, supprf, longf, shortf, retval = 0;
    char         *fmt;
    extern char *strchr();

    fmt = *(char **)argp++;
    for (;;)
      {
        switch (fc = *fmt++)
          {
            case '\0':
                break;
            case '\t':
            case '\n':
            case ' ':
                gc=skipws( fp );
```

```
            if( gc != EOF )
              {
                sungetc( (char)gc, fp );
                continue;
              }
            else
                break;
        default:
        matchin:
            if( (gc=sgetc(fp)) != fc)
              {
                if( gc != EOF )
                    sungetc( (char)gc, fp );
                break;
              }
            else
                continue;
        case '%':
            supprf = (fc = *fmt++) == '*';
            if( supprf )
                fc = *fmt++;
            for( width = 0; '0'<=fc && fc<='9'; fc = *fmt++ )
                width = width*10 + fc - '0';
            longf = fc=='l';
            shortf = fc=='h';
            if( longf || shortf )
                fc = *fmt++;
            switch( fc )
              {
                default: // fputs("Bad format in scanf\n", stderr);
                         //abort();
                case '\0': break;

                case '%':
                    goto matchin;
                case 'D': longf++;
                case 'd': base = 10;
                    goto fixed;
                case 'O': longf++;
                case 'o': base = 8;
                    goto fixed;
                case 'N': longf++;
                case 'n': base = 0;
                    goto fixed;
                case 'X': longf++;
                case 'x': base = 16;
            fixed:
                  {
                    long longn, fgetnum();

                    longn = fgetnum( fp, base, width, &gotany );
                    if( !gotany )
                        break;
                    if( supprf )
                        continue;
                    if( longf )
                        **(long **)argp++ = longn;
                    else if( shortf )
                        **(short **)argp++ = (short)longn;
                    else
                        **(int **)argp++ = (int)longn;
                    retval++;
                    continue;
                  }

                case '[':
                  {
                    char ss[64], *s = ss;
                    int  breakf;
                    register char *cp;

                    breakf = (fc = *fmt++) == '^';
                    if( breakf )
                        fc = (int)(*fmt++);
                    while( fc!='\0' && fc!=']' )
                      {
                        *s++ = (char)fc;
                        fc = *fmt++;
                      }
                    *s = '\0';
                    s = ss;
                    gc = sgetc( fp );
                    goto scanin;

                case 'c':
                    if( width==0 )
                        width = 1;
                    gc = sgetc(fp);
                    s = "";
                    breakf = 1;
                    goto scanin;

                case 's':
                    gc = skipws(fp);
                    s = "\t\n ";
                    breakf = 1;
                scanin:
                    if( !supprf )
                        cp = *(char **)argp++;
                    gotany = 0;
                    while( gc!=EOF && (strchr(s, gc)==NULL)==breakf )
                      {
                        gotany++;
                        if( !supprf )
                            *cp++ = (char)gc;
                        if( --width==0 )
                            gc = EOF;
                        else
                            gc = sgetc(fp);
                      }
                    if( gc!=EOF )
                        sungetc( (char)gc, fp );
                    if( !gotany )
                        break;
```

```
                    if( supprf )
                        continue;
                    if (fc!='c')
                        *cp = '\0';
                    retval++;
                    continue;
                    }
                  }
              break;
            }
          break;
        }
    return (retval==0 ? EOF : retval);
  }

/*
 * Read a long integer from file fp
 */
    static long
fgetnum( pfile *fp, int base, int width, int *got )
  {
    long        val = 0;
    register int c, i;
    int         neg;

    if( width <= 0 || 32 < width )
        width = 32;
    *got = 0;
    c = skipws(fp);
    if( (neg=c=='-') || c=='+' )
        c = sgetc(fp), ++*got;
    if( *got>width )
        ;
    else if( base!=0 )
        ;
    else if( c!='0' )
        base = 10;
    else if( c=sgetc(fp), ++*got>width )
        ;
    else if( c!='x' )
        base = 8;
    else
      {
        base = 16;
        c = sgetc(fp), ++*got;
      }
    for( ; *got < width; ++*got )
      {
        if( (10<=(i=c-('a'-10) ) || 10<=(i=c-('A'-10)) || 0<=(i=c-'0') && i<=9)
          && i<base
          || base==16 && val==0L && (i=c-'x')==0 )
          {
            val = val*base - i;
            c = sgetc(fp);
          }
        else
            break;
      }
    if( c!=EOF )
        sungetc( (char)c, fp );
    return (neg ? val : -val);
  }

static int
skipws( pfile *fp )
  {
    register int c;

    while( (c=sgetc(fp))==' ' || c=='\n' || c=='\t' )
        ;
    return (c);
  }
```

```
#include <string.h>

#include "basetype.h"
#include "link.h"
#include "ldefines.h"
#include "lprotos.h"

/****************************************

      sendCmdB        local "B" frame transmit function

  USAGE:    int length,interval,status;
            status = sendCmdB(length,interval);

  DESCRIPTION:    send a "B" frame.  (maximum IF length & interval timing).

  INPUTS:         length:    maximum IF length known by this layer.
                  interval:  minimum delay (in 10ms units) between,
                             transmitted frames.

  OUTPUTS:        status value:
                  TX_IF_WAITING:  successfully queued the frame
                  TX_BAD_PARMS:   something wrong with the frame

  SIDE-EFFECTS:   transmits an IF.

  WARNINGS:       NONE

****************************************/
int
sendCmdB(void (*pfCallback)(int nStatus), int nLength, int nInterval, boolean fU
seRacks)
    {
    char sSendBuffer[15];
    // check parameters
    if ( nLength < 0 || nLength > MAX_FRAME_LENGTH || nInterval < 0 )
        return(TX_BAD_PARMS);

    /* create local IF */
    mlslprintf(sSendBuffer,15,"B %03X,%d",nLength,nInterval);

    return( nSendInfoFrame(pfCallback,sSendBuffer,0,"",fUseRacks) );
    }

/****************************************

      sendCmdFx       local "F" frame transmit function

  USAGE:    int status;
            status = sendCmdFx("O");

  DESCRIPTION:    send an "F x" radio control IF frame.

  INPUTS:         x:       a character which is the "F" sub-function.

  OUTPUTS:        status value:
                  TX_IF_WAITING:  successfully queued the frame
                  TX_BAD_PARMS:   something wrong with the frame

  SIDE-EFFECTS:   transmits an IF.

  WARNINGS:       NONE

****************************************/
int
sendCmdFx(void (*pfCallback)(int nStatus), char cSubCommand)
    {
    static char buf[5];
    /* check if it is an allowed single-character "F" command */
    if ( strchr("BEFGIJLNOP#",cSubCommand) == NULL )
        return(TX_BAD_PARMS);
    mlslprintf(buf,5,"F %c",(int)cSubCommand);
    return(nSendInfoFrame(pfCallback,buf,0,"",TRUE));
    }
```

```
#include <ctype.h>
#include <stdlib.h>
#include <string.h>
#include <dos.h>
#include "basetype.h"

#define MAXSTR 256
#define SHORT (sizeof(int))
#define LONG  (sizeof(long))
extern void citoa( unsigned number, int width, char *buffer );
extern void cltoa( long number, int width, char *buffer );
static void vBinInt( char * s, unsigned int binval );
static void vBinLong( char *s, unsigned long int binval );

typedef union
{
    char    *u;
    char    **cp;
    long    *lp;
    int     *ip;
} sprintfArg;

static int xslprintf( char *str, int maxsize, char *fmt, sprintfArg arg );

int
mlsprintf( char *str, char *fmt, unsigned stkp )
{
    sprintfArg arg;
    arg.u = (char *)&stkp;  // point to the parameters in the stack frame
    return( xslprintf( str, 32767, fmt, arg ) );
}

int
mlslprintf( char *str, int maxsize, char *fmt, unsigned stkp )
{
    sprintfArg arg;
    arg.u = (char *)&stkp;  // point to the parameters in the stack frame
    return( xslprintf( str, maxsize, fmt, arg ) );
}

int
xslprintf( char *str, int maxsize, char *fmt, sprintfArg arg  )
{
    char    *strp = str;
    int     max, width;
    int     right, fill;
    int     size = SHORT;
    int     c, i, k;
    char    s[MAXSTR+16];
    char    *p =s;
    unsigned short int offset,segment,addon;
    char    *q;

    --maxsize;  // account for the terminating NUL

    if ( maxsize <= 0 )
        return(0);
```

```
    while( *fmt )
    {
        if ( maxsize <= 0 )
            break;

        if( *fmt != '%' )
        {
            *strp++ = *fmt++;
            if ( --maxsize <= 0 )
                continue;
        }
        else
        {
            fmt++;
            max = MAXSTR;
            fill = ' ';
            right = TRUE;
            if( *fmt == '-' )
            {
                fmt++;
                right = FALSE;
            }
            if( *fmt == '0' )
            {
                fmt++;
                fill = '0';
            }
            for( width = 0 ; isdigit(*fmt) ; )
                width = width*10 + *fmt++ - '0';
            if( *fmt == '.' )
            {
                fmt++;
                for( max = 0 ; isdigit(*fmt) ; )
                    max = max*10 + *fmt++ - '0';
            }
            if( *fmt == 'l' )
            {
                fmt++;
                size = LONG;
            }
            else
            {
                size = SHORT;
            }
            switch( c = *fmt++ )
            {
                case 0:
                    continue;
                case 'O':
                    size = LONG;
                case 'p' :
                    offset = FP_OFF(*arg.cp);
                    segment = FP_SEG(*arg.cp);
                    *arg.cp++;
                    addon = 0;
                    if ( segment < 0x1000 )
```

```
                ++addon;
            if ( segment < 0x100 )
                ++addon;
            if ( segment < 0x10 )
                ++addon;
            cltoa(segment,16,s+addon);
            for ( q=s; addon-- > 0; ++q )
                *q = '0';
            q = s+4;
            *q++ = ':';
            addon = 0;
            if ( offset < 0x1000 )
                ++addon;
            if ( offset < 0x100 )
                ++addon;
            if ( offset < 0x10 )
                ++addon;
            cltoa(offset,16,q+addon);
            for ( q=s+5; addon-- > 0; ++q )
                *q = '0';
            break;
        case 'o':
            if(size == LONG)
                cltoa(*arg.lp++,8,s);
            else
                citoa(*arg.ip++,8,s);
            break;
        case 'U':
            size = LONG;
        case 'u':
            if(size == LONG)
                cltoa(*arg.lp++,10,s);
            else
                citoa(*arg.ip++,10,s);
            break;
        case 'X':
        case 'x':
            if(size == LONG)
                cltoa(*arg.lp++,16,s);
            else
                citoa(*arg.ip++,16,s);
            break;
        case 'D':
            size = LONG;
        case 'd':
            if(size == LONG)
                cltoa(*arg.lp++,-10,s);
            else
                citoa(*arg.ip++,-10,s);
            break;
        case 's':
            strncpy(s,*arg.cp++,MAXSTR+15);
            s[MAXSTR+15] = '\0';
            break;
        case 'c':
            s[0] = (char)(*arg.ip++);
            s[1] = '\0';
```

File: src\SPRINTF.C

```
                break;
            case 'b':
                if(size == LONG)
                    vBinLong(s, *arg.lp++ );
                else
                    vBinInt( s, *arg.ip++ );
                break;
            case 'B':
                vBinLong(s, *arg.lp++ );
                break;
            default:
                *strp++ = (char)c;
                --maxsize;
                continue;
        }
        i = strlen(s);
        p = s;
        if( i > max )
            i = max;

        if( right )
        {
            while( width-- > i )
            {
                *strp++ = (char)fill;
                if ( --maxsize <= 0 )
                    break;
            }
            if ( maxsize <= 0 )
                continue;
        }

        if ( maxsize <= 0 )
            break;

        for( k = 0 ; *p && k < max ; ++k )
        {
            *strp++ = *p++;
            if ( --maxsize <= 0 )
                break;
        }

        if ( maxsize <= 0 )
            continue;

        if( !right )
        {
            while( width-- > i )
            {
                *strp++ = ' ';
                if ( --maxsize <= 0 )
                    break;
            }
        }
    }
}
*strp = '\0';
```

```
    return(strp - str);
}

static void
vBinInt( char * s, unsigned int binval )
{
    unsigned int mask;
    for ( mask = 0x8000; mask > 0x0800; mask >>= 1 )
        *s++ = (char)( (mask & binval) ? '1' : '0' );
    *s++ = '-';
    for (              ; mask > 0x0080; mask >>= 1 )
        *s++ = (char)( (mask & binval) ? '1' : '0' );
    *s++ = '-';
    for (              ; mask > 0x0008; mask >>= 1 )
        *s++ = (char)( (mask & binval) ? '1' : '0' );
    *s++ = '-';
    for (              ; mask        ; mask >>= 1 )
        *s++ = (char)( (mask & binval) ? '1' : '0' );
    *s = '\0';
}

static void
vBinLong( char *s, unsigned long int binval )
{
    unsigned long int mask;
    for ( mask = 0x80000000L; mask > 0x08000000L; mask >>= 1 )
        *s++ = (char)( (mask & binval) ? '1' : '0' );
    *s++ = '-';
    for (                   ; mask > 0x00800000L; mask >>= 1 )
        *s++ = (char)( (mask & binval) ? '1' : '0' );
    *s++ = '-';
    for (                   ; mask > 0x00080000L; mask >>= 1 )
        *s++ = (char)( (mask & binval) ? '1' : '0' );
    *s++ = '-';
    for (                   ; mask > 0x00008000L; mask >>= 1 )
        *s++ = (char)( (mask & binval) ? '1' : '0' );
    *s++ = '-';
    for (                   ; mask > 0x00000800L; mask >>= 1 )
        *s++ = (char)( (mask & binval) ? '1' : '0' );
    *s++ = '-';
    for (                   ; mask > 0x00000080L; mask >>= 1 )
        *s++ = (char)( (mask & binval) ? '1' : '0' );
    *s++ = '-';
    for (                   ; mask > 0x00000008L; mask >>= 1 )
        *s++ = (char)( (mask & binval) ? '1' : '0' );
    *s++ = '-';
    for (                   ; mask             ; mask >>= 1 )
        *s++ = (char)( (mask & binval) ? '1' : '0' );
    *s = '\0';
}
```

```c
#include "basetype.h"
#include "link.h"
#include "ldefines.h"
#include "lprotos.h"

void
vCreateTXlinkFrame(void *pvFrameComponents, sendFrameStruct *psfsFrame)
    {
    byte bCheckSum;
    int i, nCheckLength;
    controlFrameStruct *pcfsCF =
        (controlFrameStruct *)pvFrameComponents;
    informationFrameStruct *pifsIF =
        (informationFrameStruct *)pvFrameComponents;
    byte * pbCheck, * pbData;

    // set the appropriate structure values

    psfsFrame->nFrameLength = 0;

    pbData = psfsFrame->sFrame;     // use a moveable pointer.

    if ( pcfsCF->bFrameType == TYPE_IF ) {

        // figure out the length of the data that is to be checksummed.
        // this is the entire frame minus the checksum and END-OF-FRAME
        nCheckLength = pifsIF->nTextLength +
                       (pifsIF->nDataLength*2) +
                       IF_FIXED_LENGTH - 3;

        pbCheck = pbData;       // remember the beginning of the buffer


        // store the start of frame and the length of the frame

        pbData[0] = START_FRAME;
        pbData[1] = (byte) DIGITX(((nCheckLength+3)>>12)& 0x000F);
        pbData[2] = (byte) DIGITX(((nCheckLength+3)>>8) & 0x000F);
        pbData[3] = (byte) DIGITX(((nCheckLength+3)>>4) & 0x000F);
        pbData[4] = (byte) DIGITX( (nCheckLength+3)     & 0x000F);


        // store the text area of the IF

        for ( pbData += 5, i = 0; pifsIF->sText[i]; ++i, ++pbData )
            *pbData = pifsIF->sText[i];

        pbData[0] = ':';        // data area separator

        // store the data area of the IF
        // convert binary data to HEX ASCII

        for ( ++pbData, i = 0; i < pifsIF->nDataLength; ++i, pbData += 2 ) {
            pbData[0] = (byte) DIGITX((pifsIF->sData[i]>>4) & 0x000F);
            pbData[1] = (byte) DIGITX(pifsIF->sData[i] & 0x000F);
            }

        // calculate the checksum

        for ( i = 0, bCheckSum = 0; i < nCheckLength; ++i )
            bCheckSum ^= pbCheck[i];

        pbData[0] = (byte) DIGITX((bCheckSum>>4) & 0x000F);
        pbData[1] = (byte) DIGITX(bCheckSum & 0x000F);
        pbData[2] = END_FRAME;
        pbData[3] = 0;  // NUL for debug printing
        psfsFrame->nFrameLength += nCheckLength + 3;
        }
    else if ( pcfsCF->bFrameType == TYPE_ACK ) {
        pbData[0] = START_FRAME;
        pbData[1] = TYPE_ACK;
        pbData[2] = pcfsCF->bSequence;
        pbData[3] = END_FRAME;
        pbData[4] = 0;  // NUL for debug printing
        psfsFrame->nFrameLength += 4;
        }
    else {  // SENS,SACK,RACK,NACK
        pbData[0] = START_FRAME;
        pbData[1] = pcfsCF->bFrameType;
        pbData[2] = END_FRAME;
        pbData[3] = 0;  // NUL for debug printing
        psfsFrame->nFrameLength += 3;
        }
}
```

```
#include "basetype.h"
#include "link.h"
#include "ldefines.h"
#include "lprotos.h"

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

// ACK transmit

static volatile byte bLastACKsequence = ACK_NONE;
static volatile byte bNewACKsequence = ACK_NONE;

static void (*pfACKcallback)(void) = NULL;
static int nACKcallback = -1;

static void vNewAckCallback(int nStatus,int nFrameIdx);

boolean
fInstallLinkACKmodule(void)
    {
    bLastACKsequence = ACK_NONE;
    bNewACKsequence = ACK_NONE;
    return(TRUE);
    }

boolean
fRemoveLinkACKmodule(void)
    {
    return(TRUE);
    }

static void
vNewAckCallback(int nStatus,int nFrameIdx)
{
    void (*pfCallback)(void);
    bLastACKsequence = bNewACKsequence;
    V_SEND_DEBUG_STRING("$");
    if ( pfACKcallback != NULL )
    {
        if ( nFrameIdx == nACKcallback )
        {
            nFrameIdx = -1;
            pfCallback = pfACKcallback;
            pfACKcallback = NULL;
            (*pfCallback)();
        }
    }
}

int
nSendNewACK(void (*pfCallback)(void))
{
    int nReturnValue;
    byte bACKsequence = (byte) ((bLastACKsequence==ACK_0) ? ACK_1 : ACK_0);
    if ( (nReturnValue =
          nAddToTXframeQueue(vNewAckCallback,TYPE_ACK,bACKsequence)) < 0 )
    {
        V_SEND_DEBUG_STRING("^");
        return(nReturnValue);
    }
    bNewACKsequence = bACKsequence;
    if ( pfCallback != NULL )
    {
        pfACKcallback = pfCallback;
        nACKcallback = nReturnValue;
    }
    return(nReturnValue);
}

int
nSendOldACK(void)
    {
    return( nAddToTXframeQueue(NULL,TYPE_ACK,bLastACKsequence) );
    }
```

```
#include <string.h>
#include <memory.h>

//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

#include "basetype.h"
#include "link.h"
#include "ldefines.h"
#include "lprotos.h"
#include "timing.h"
#include "debug.h"

informationFrameStruct ifsTXinfoFrame;

static volatile boolean fIFwaitingForACK = FALSE;
static volatile int thIFtimer = -1;
static volatile int nRACKcount = 0;
static volatile byte bLastRXsequence = '-';
static volatile int nIFnackRepeats = 0;
static volatile int nIFtransmitIndex = -1;
static volatile byte bTXifState = TX_IF_NONE;

#define RACK_SPACING    10000L  // ten second spacing between RACKs
#define RACK_SEND_RETRY    50L  // 50 msec to retry a failed transmit
#define IF_NACK_MAX          2
#define MAX_RACKS            3

static void vRACKcallback(int nStatus);
static long int lIFtimerHandler( int nHandle, int nAction );
static void vIFtransmitCallback(int nStatus);
static void vResendIF(void);
static void vPreventRACK(void);
static boolean fSendRackOnTimeout = TRUE;

boolean
fInstallLinkIFmodule(void)
    {
    fIFwaitingForACK = FALSE;
    fSendRackOnTimeout = TRUE;
    nRACKcount = 0;
    bLastRXsequence = '-';
    nIFnackRepeats = 0;
    nIFtransmitIndex = -1;
    bTXifState = TX_IF_NONE;
    if ( thIFtimer < 0 )
        thIFtimer = MaddTimer(lIFtimerHandler,0L);
    if ( thIFtimer < 0 )
        return(FALSE);
    return(TRUE);
    }
```

```
boolean
fRemoveLinkIFmodule(void)
    {
    fIFwaitingForACK = FALSE;
    thIFtimer = -1;
    nRACKcount = 0;
    bLastRXsequence = '-';
    nIFnackRepeats = 0;
    nIFtransmitIndex = -1;
    bTXifState = TX_IF_NONE;
    return(TRUE);
    }


int
nCheckInfoFrameParameters(char * sText, int nDataLength, byte *pbData)
    {
    int nTextLength;

    // check the text length

    ALLOW_DEBUG ( TRUE );

    nTextLength = strlen(sText);
    if ( nTextLength == 0 || nTextLength > MAX_TEXT_LENGTH )
    {
        DEBUG_PRINTF((CSstr " CIFP: BadTexLen (%d) ", nTextLength ));
        return(TX_BAD_PARMS);
    }


    // check the data length

    if ( nDataLength < 0 || nDataLength > MAX_DATA_LENGTH )
    {
        DEBUG_PRINTF((CSstr " CIFP: BadDatLen (%d) ", nDataLength ));
        return(TX_BAD_PARMS);
    }

    // check the combined length for correctness
    // don't forget the CHECKSUM and the data separator


    if ( (nDataLength*2+nTextLength+IF_FIXED_LENGTH) > nGetMaxIFlength() )
    {
        DEBUG_PRINTF((CSstr " CIFP: BadDatLen (%d,%d-->%d) ",
            nDataLength, nTextLength, nGetMaxIFlength() ));
        return(TX_BAD_PARMS);
    }

    // check the text area, testing for correctness of the
    // characters (only a 7-bit ASCII sub-set is allowed)

    if ( !fIsTextStringOK(sText) )
    {
        DEBUG_PRINTF((CSstr " CIFP: BadTextString (%s) ", sText ));
```

```
        return(TX_BAD_PARMS);
    }

    return(TX_PARMS_OK);
    }

int
nSendInfoFrame(void (*pfCallback)(int nStatus),
            char * sText, int nDataLength, byte *pbData,
            boolean fUseRacks)
    {
    int nStatus;

    nStatus = nCheckInfoFrameParameters(sText,nDataLength,pbData);
    if ( nStatus != TX_PARMS_OK )
        return(nStatus);

    // set the lengths, copy over the text string and the data area

    ifsTXinfoFrame.bFrameType  = TYPE_IF;
    ifsTXinfoFrame.nDataLength = nDataLength;
    ifsTXinfoFrame.nTextLength = strlen(sText);
    ifsTXinfoFrame.pfCallback  = pfCallback;
    ifsTXinfoFrame.nQueueIdx   = -1;

    // copy the text area
    strcpy(ifsTXinfoFrame.sText,sText);

    // copy the data area
    if ( nDataLength > 0 )
        memcpy(ifsTXinfoFrame.sData,pbData,nDataLength);

    fSendRackOnTimeout = fUseRacks;
    bTXifState = TX_IF_WAITING;

    DEBUG_PRINTF((CSstr"Req IF send '%s' ",sText));

    return(TX_IF_WAITING);
    }

void
vReceivedNACK(void)
    {
    if ( !fIFwaitingForACK )
        return;
    if ( ++nIFnackRepeats > IF_NACK_MAX ) {
        vIFtransmitFailed();
        vLinkBroken();
        return;
        }
    vResendIF();
    }

void
vIFtransmitFailed(void)
    {
    void (*pfCallback)(int nStatus);

    if ( bTXifState == TX_IF_NONE )
        return;

    pfCallback = ifsTXinfoFrame.pfCallback;

    MclrTimer(thIFtimer,T_CLEARED);
    vPreventRACK();
    fIFwaitingForACK = FALSE;

    bTXifState = TX_IF_NONE;
    vClearTXqueueEntry(ifsTXinfoFrame.nQueueIdx);

    ifsTXinfoFrame.nQueueIdx  = -1;
    ifsTXinfoFrame.pfCallback = NULL;

    vSetIdlerRunning(TRUE); // IDLE SENS is allowed again

    if ( pfCallback != NULL )
        (*pfCallback)(TX_IF_FAILED);
    DEBUG_STRING((CSstr"TXif Failed "));
    }

void
vReceivedACK(byte bSequence)
    {
    void (*pfCallback)(int nStatus);

    if ( !fIFwaitingForACK )
        return;

    vPreventRACK();
    if ( bSequence != ACK_0 && bSequence != ACK_1 ) {
        vResendIF();
        return;
        }
    if ( bSequence == bLastRXsequence ) {
        // wrong sequence number.. retransmit
        vResendIF();
        return;
        }

    pfCallback = ifsTXinfoFrame.pfCallback;

    bLastRXsequence = bSequence;
    fIFwaitingForACK = FALSE;
    bTXifState = TX_IF_NONE;
    ifsTXinfoFrame.nQueueIdx  = -1;
    ifsTXinfoFrame.pfCallback = NULL;

    vSetIdlerRunning(TRUE); // IDLE SENS is allowed again

    if ( pfCallback != NULL )
        (*pfCallback)(TX_IF_DONE);
    DEBUG_STRING((CSstr"TXif Done "));
    }
```

```
void *
pvGetIFstructurePointer(void)
    {
    return((void *)&ifsTXinfoFrame);
    }

void
vNowSendingIF(void)
    {
    if ( ifsTXinfoFrame.pfCallback != NULL )
        (*ifsTXinfoFrame.pfCallback)(TX_IF_SENDING);
    vSetIdlerRunning(FALSE);        // make sure no IDLE SENS goes out!
    }

void
vCheckForWaitingIFtransmit(void)
    {
    if ( bTXifState != TX_IF_WAITING )
        return;

    nIFnackRepeats = 0;       // hasn't been NACKed yet...
    fIFwaitingForACK = FALSE;

    bTXifState = TX_IF_QUEUED;
    ifsTXinfoFrame.nQueueIdx = nAddToTXframeQueue(vIFtransmitCallback,TYPE_IF,0)
;
    if ( ifsTXinfoFrame.nQueueIdx < 0 )
        bTXifState = TX_IF_WAITING;
    else
        DEBUG_PRINTF((CSstr"Q IF send '%s' ",ifsTXinfoFrame.sText));
    }

boolean
fOKtoTransmitIF(void)
    {
    if ( bTXifState == TX_IF_NONE )
        return(TRUE);
    return(FALSE);
    }


static void
vRACKcallback(int nStatus)
    {
    if ( nStatus == TX_FRAME_SENT )
        MsetTimer(thIFtimer,RACK_SPACING);
    }

static long int
lIFtimerHandler( int nHandle, int nAction )
    {
    static boolean fRetryFlag = FALSE;

    if ( nAction != T_EXPIRED ) {
        fRetryFlag = FALSE;
        return(0L);
        }

    V_SEND_DEBUG_STRING("(F");
    if ( !fRetryFlag && ++nRACKcount > MAX_RACKS ) {
        vIFtransmitFailed();
        vLinkBroken();
        V_SEND_DEBUG_STRING("F0)");
        return(0L);
        }

    if ( !fSendRackOnTimeout )
    {
        // this is ONLY used when sending a B-Frame on a DCE!
        vResendIF();
        V_SEND_DEBUG_STRING("F1)");
        return(0L);
    }

    if ( nSendRACK( vRACKcallback ) < 0 ) {
        fRetryFlag = TRUE;
        V_SEND_DEBUG_STRING("F2)");
        return(RACK_SEND_RETRY);
        }

    V_SEND_DEBUG_STRING("F3)");
    return(0L);
    }

static void
vIFtransmitCallback(int nStatus)
    {
    if ( nStatus != TX_FRAME_SENT )
        return;
    fIFwaitingForACK = TRUE;
    nRACKcount = 0;
    MsetTimer(thIFtimer,RACK_SPACING);
    }

static void
vResendIF(void)
    {
    fIFwaitingForACK = FALSE;
    bTXifState = TX_IF_WAITING;
    }

static void
vPreventRACK(void)
    {
    MclrTimer(thIFtimer,T_CLEARED);
    vClearRACK();
    }
```

```
#include "basetype.h"
#include "link.h"
#include "ldefines.h"
#include "lprotos.h"

// NAK transmit

int
nSendNACK( void )
    {
    return ( nAddToTXframeQueue(NULL,TYPE_NACK,0) );
    }
```

File: src\TX_NACK.C

```
//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif

#include "basetype.h"
#include "link.h"
#include "ldefines.h"
#include "lprotos.h"
#include "timing.h"
#include "locks.h"
#include "mobilib.h"
#include "access.h"

SET_LOCK_REF_FILE;

#define TX_FIFO_SIZE     32

#define TX_FIFO_FULL     (((nTXfifoIn+1)%TX_FIFO_SIZE) == nTXfifoOut)
#define TX_FIFO_EMPTY    (nTXfifoOut == nTXfifoIn)
#define NEXT_TX_FIFO_IN  nTXfifoIn = (nTXfifoIn+1)%TX_FIFO_SIZE
#define NEXT_TX_FIFO_OUT nTXfifoOut = (nTXfifoOut+1)%TX_FIFO_SIZE

controlFrameStruct cfsTXfifo[TX_FIFO_SIZE];

sendFrameStruct sfsTransmittingFrame;

static long int lTXspacingTime = 0L;
static int thTransmitSpacingTimer = -1;
static boolean fNowTransmitting = FALSE;
static int nTXfifoIn = 0;
static int nTXfifoOut = 0;

static long int lTXspacingTimerHandler(int nHandle,int nActivity);
static void vStartTransmitter(void);

boolean
fInstallLinkQueueModule(void)
    {
    int i;
    lTXspacingTime = 0L;
    fNowTransmitting = FALSE;
    nTXfifoIn = 0;
    nTXfifoOut = 0;

    for ( i = 0; i < TX_FIFO_SIZE; ++i ) {
        cfsTXfifo[i].bFrameType = TYPE_NONE;
        cfsTXfifo[i].bSequence  = 0;
        cfsTXfifo[i].pfCallback = NULL;
        }

    if ( thTransmitSpacingTimer < 0 ) {
        thTransmitSpacingTimer = MaddTimer(lTXspacingTimerHandler,0L);
        if ( thTransmitSpacingTimer < 0 )
            return(FALSE);
        }
    return(TRUE);
    }

boolean
fRemoveLinkQueueModule(void)
    {
    int i;
    if ( thTransmitSpacingTimer >= 0 ) {
        MdelTimer(thTransmitSpacingTimer,T_DELETED);

    for ( i = 0; i < TX_FIFO_SIZE; ++i )
        cfsTXfifo[i].bFrameType = TYPE_NONE;
        cfsTXfifo[i].bSequence  = 0;
        cfsTXfifo[i].pfCallback = NULL;
        }
    lTXspacingTime = 0L;
    fNowTransmitting = FALSE;
    nTXfifoIn = 0;
    nTXfifoOut = 0;
    return(TRUE);
    }

int
nAddToTXframeQueue(void (*pfCallback)(int nStatus),
                   byte bFrameType, byte bSequence)
{
    int nReturnIdx, nKey;

    LOCK_EVERYTHING(nKey);      // start critical section
    if ( !TX_FIFO_FULL )
    {
        nReturnIdx = nTXfifoIn;
        cfsTXfifo[nTXfifoIn].bFrameType = bFrameType;
        cfsTXfifo[nTXfifoIn].bSequence  = bSequence;
        cfsTXfifo[nTXfifoIn].pfCallback = pfCallback;

        NEXT_TX_FIFO_IN;        // move for next input
        V_SEND_DEBUG_STRING(".");
    }
    else
    {
        V_SEND_DEBUG_STRING("!");
        nReturnIdx = -1;
    }

    UNLOCK_EVERYTHING(nKey);    // end critical section

    vStartTransmitter();        // always try to start the transmitter.

    return(nReturnIdx);
}

static void
vStartTransmitter(void)
```

```
{
    int nKey;
    LOCK_EVERYTHING(nKey);
    V_SEND_DEBUG_STRING("%");
    if ( !fNowTransmitting )
    {
        V_SEND_DEBUG_STRING("=");
        if ( MisTimerIdle(thTransmitSpacingTimer) )
        {
            V_SEND_DEBUG_STRING("+");
            // if it is not going already, set the spacing timer
            // to expire & start a transmit
            MsetTimer(thTransmitSpacingTimer,1L);
        }
    }
    UNLOCK_EVERYTHING(nKey);
}

void
vClearTXqueueEntry(int nIdx)
    {
    int nKey;

    if ( nIdx < 0 || nIdx >= TX_FIFO_SIZE )
        return;

    LOCK_EVERYTHING(nKey);  // start critical section

    V_SEND_DEBUG_STRING("@");
    if ( cfsTXfifo[nIdx].bFrameType == TYPE_IF )
    {
       V_SEND_DEBUG_STRING("i");
    }
    else
    {
       V_SEND_DEBUG_STRING("c");
    }

    cfsTXfifo[nIdx].bFrameType = TYPE_NONE;
    cfsTXfifo[nIdx].bSequence  = 0;
    cfsTXfifo[nIdx].pfCallback = NULL;

    UNLOCK_EVERYTHING(nKey);// end critical section
    }

void
vSetTransmitSpacingTime( long int lSpacing )
    {
    lTXspacingTime = lSpacing;
    }

void
vTransmitFrameDone(void)
    {
    int nKey,nIdx;
    void (*pfCallback)(int nStatus) = NULL;

    LOCK_EVERYTHING(nKey);   // start critical section

    fNowTransmitting = FALSE;
    if ( lTXspacingTime > 0L )
        MsetTimer(thTransmitSpacingTimer,lTXspacingTime);

    nIdx = nTXfifoOut;

    V_SEND_DEBUG_STRING("#");

    if ( cfsTXfifo[nTXfifoOut].bFrameType != TYPE_NONE ) {
        V_SEND_DEBUG_STRING("-");
        pfCallback = cfsTXfifo[nTXfifoOut].pfCallback;
        cfsTXfifo[nTXfifoOut].bFrameType = TYPE_NONE;
        cfsTXfifo[nTXfifoOut].bSequence  = 0;
        cfsTXfifo[nTXfifoOut].pfCallback = NULL;
        }

    NEXT_TX_FIFO_OUT;

    if ( pfCallback != NULL )
        (*pfCallback)(TX_FRAME_SENT,nIdx);

    if ( !TX_FIFO_EMPTY )
        vStartTransmitter();

    UNLOCK_EVERYTHING(nKey);// end critical section
    }

boolean
fIsTXpending(void)
{
    if ( TX_FIFO_EMPTY )
        return( FALSE );
    return( TRUE );
}

static long int
lTXspacingTimerHandler(int nHandle,int nActivity)
    {
    int nKey;

    if ( nActivity != T_EXPIRED )
        return(0L);

    LOCK_EVERYTHING(nKey);  // start critical section

    V_SEND_DEBUG_STRING("*");

    // skip any cancelled frames
    while ( !TX_FIFO_EMPTY &&
            cfsTXfifo[nTXfifoOut].bFrameType == TYPE_NONE ) {
        NEXT_TX_FIFO_OUT;
        }

    if ( !TX_FIFO_EMPTY )
    {
```

```
    // queue up the frame; if it is an IF, get the data from
    // the TX_IF.C module using the pointer function call

    if ( cfsTXfifo[nTXfifoOut].bFrameType == TYPE_IF ) {
        vCreateTXlinkFrame(pvGetIFstructurePointer(),
                           &sfsTransmittingFrame);
        vNowSendingIF();
        V_SEND_DEBUG_STRING("i");
        }
    else
    {
        V_SEND_DEBUG_STRING("c");
        vCreateTXlinkFrame(&(cfsTXfifo[nTXfifoOut]),
                           &sfsTransmittingFrame);
    }
    // pass the frame down to the device driver
    ML1putBlock((void far *)sfsTransmittingFrame.sFrame,
                            sfsTransmittingFrame.nFrameLength);

    fNowTransmitting = TRUE;
}
else
{
    V_SEND_DEBUG_STRING("e");
}

UNLOCK_EVERYTHING(nKey);// end critical section
return(0L);
}
```

```
#include "basetype.h"
#include "link.h"
#include "ldefines.h"
#include "lprotos.h"

// RACK transmit

int nRACKidx = -1;

void
vClearRACK(void)
    {
    vClearTXqueueEntry(nRACKidx);
    }

int
nSendRACK( void (*pfCallback)(int nStatus) )
    {
    return ( nRACKidx = nAddToTXframeQueue(pfCallback,TYPE_RACK,0) );
    }
```

File: src\TX_RACK.C

```
#include "basetype.h"
#include "link.h"
#include "ldefines.h"
#include "lprotos.h"

// SACK-transmit

int
nSendSACK(void)
    {
    return( nAddToTXframeQueue(NULL,TYPE_SACK,0) );
    }
```

File: src\TX_SACK.C

Page 1    16 JUN 93  08:40 PM

```
//#define VDEBUG

#ifdef VDEBUG
  extern void vSendDebugString(char *s);
  #define V_SEND_DEBUG_STRING(X)  vSendDebugString(X)
#else
  #define V_SEND_DEBUG_STRING(X)  /**/
#endif


#include "basetype.h"
#include "link.h"
#include "ldefines.h"
#include "lprotos.h"
#include "timing.h"

// SENS transmit

#define SENS_SPACING    10000          // 10 second SENS spacing
#define SENS_MAX        2
#define SENS_SEND_RETRY    50L         // 50 msec to retry a failed transmit

void (*pfSENSappCallback)(int nStatus) = NULL;

static volatile int thSENStimer = -1;
static volatile int nSENScount = 0;

static long int lSENStimerHandler( int nHandle, int nAction );
static void vSENScallback( int nStatus );

boolean
fInstallLinkSENSmodule(void)
    {
    pfSENSappCallback = NULL;
    if ( thSENStimer < 0 ) {
        thSENStimer = MaddTimer(lSENStimerHandler,0L);
        if ( thSENStimer < 0 )
            return(FALSE);
        }
    return(TRUE);
    }

boolean
fRemoveLinkSENSmodule(void)
    {
    if ( thSENStimer >= 0 ) {
        MdelTimer(thSENStimer,T_DELETED);
        thSENStimer = -1;
        }
    return(TRUE);
    }

int
nSendSENS(void (*pfCallback)(int nStatus))
    {
    int nReturnValue = -2;
    if ( !fIsLinkOpen() )
        return(nReturnValue);
    nSENScount = 0;
    pfSENSappCallback = pfCallback;
    nReturnValue = nAddToTXframeQueue(vSENScallback,TYPE_SENS,0);
    if ( nReturnValue < 0 )
        pfSENSappCallback = NULL;
    V_SEND_DEBUG_STRING("/");
    return(nReturnValue);
    }

void
vReceivedSACK( void )
    {
    MclrTimer(thSENStimer,T_CLEARED);
    nSENScount = 0;
    if ( pfSENSappCallback != NULL )
        (*pfSENSappCallback)(TX_FRAME_SENT);
    pfSENSappCallback = NULL;
    }

static long int
lSENStimerHandler( int nHandle, int nAction )
{
    if ( nAction != T_EXPIRED )
        return( 0L );
    V_SEND_DEBUG_STRING("(E");
    if ( nSENScount > SENS_MAX ) {
        if ( pfSENSappCallback != NULL )
            (*pfSENSappCallback)(TX_FRAME_FAILED);
        pfSENSappCallback = NULL;
        V_SEND_DEBUG_STRING("E0)");
        return( 0L );
        }
    if ( nAddToTXframeQueue(vSENScallback,TYPE_SENS,0) < 0 )
    {
        V_SEND_DEBUG_STRING("E1)");
        return(SENS_SEND_RETRY);
    }
    V_SEND_DEBUG_STRING("E2)");
    return(0L);
}

static void
vSENScallback( int nStatus )
    {
    if ( nStatus != TX_FRAME_SENT )
        return;
    ++nSENScount;
    MsetTimer(thSENStimer,SENS_SPACING);
    }
```

M/M PCM (APPENDIX H)

```
#include "basetype.hb"
#include "enums.h"
#include "leds.hb"
#include "pcb.hb"
#include "pcb_bits.hb"
#include "mobilib.h"
#include "timing.h"
#include "network.h"
#include "link.h"
#include "access.h"

#include "testing.h"
#include "mpc-r-ee.h"

#include <memory.h>

/*-----------------------------------------------------------------------*
 *
 *              Local Variables
 *
 *-----------------------------------------------------------------------*/


#define NO_MAN  (MAN)-1

static MAN localMAN = NO_MAN;

char inCS ___HW_developers___[] = "Hardware: Terry West, Doug Fregin,"
                                  " Mark Church, Mike Lazaridis.\r\n";

char inCS ___SW_developers___[] = "Software: Michael A. Barnstijn.\r\n";

static PSTR configFileName = NULL;

PSTR    pszInitAccess   = NULL;
PSTR    pszInitLink     = "MAN  -1 ??? AUTOBAUD DELAY DSR_SENSE ON";
PSTR    pszInitNetwork  = NULL;

enum
{
    MOBITEX_IDLE,
    MOBITEX_SENDING,
    MOBITEX_RECEIVING
};

enum
{
    LAST_RETURNED,
    TX_MPAK_FAILED,
    RX_MAPP_FRAME,
    OK_UNWANTED
}
static int nMOBITEXstate = -1;

static int  nSendMessageLength;
byte bSendMessage[MAX_MPAK_LENGTH];
static MAN  mSendDestination;
```

File: src\MOBITEX.C

```
int  nReceiveMessageLength;
byte bReceiveMessage[MAX_MPAK_LENGTH];

/*-----------------------------------------------------------------------*
 *
 *              Local Prototypes
 *
 *-----------------------------------------------------------------------*/


static int nMobiLibInitialize(void);
static int nGetMPAK( boolean fDoCopy );
static void vCheckForReprogramming( byte *bMPAK, int nMPAKsize );

void
vMOBITEXinitialize(void)
{
    //
    // initialize mobilib and the local Mobitex handlers
    //

    nMOBITEXstate = -1;
    nSendMessageLength = 0;
    nReceiveMessageLength = 0;
    mSendDestination = NO_MAN;

    nMobiLibInitialize();
}

void
vSendMOBITEXdata(char *sMAPPrequest,int nMAPPrequestSize)
{
    memcpy(bSendMessage,sMAPPrequest,nMAPPrequestSize);
    nSendMessageLength = nMAPPrequestSize;
    vSetParity(bSendMessage,nSendMessageLength);
    nSendSignal(SIGNAL_MOBITEX_TX_REQUESTED,MOBITEX_STATE_MACHINE);
}

int
nGetMOBITEXrxPacket(char *sMAPPresponse)
{
    memcpy(sMAPPresponse,bReceiveMessage,nReceiveMessageLength);
    return(nReceiveMessageLength);
}

void
vRunMOBITEXstateMachine(void)
{
    int nSignal = nGetSignalWaiting( MOBITEX_STATE_MACHINE );
    int nStatus;

    switch ( nMOBITEXstate )
    {
        default :
            nMOBITEXstate = MOBITEX_IDLE;
```

```
        case MOBITEX_IDLE :
            switch ( nSignal )
            {
                case SIGNAL_MOBITEX_RX_MPAK :
                    nGetMPAK(FALSE);
                    break;

                case SIGNAL_MOBITEX_TX_REQUESTED :
                    mSendDestination = mGetDTMFmanTranslation();

                    nStatus = ML3sendData( bSendMessage, nSendMessageLength,
                                           localMAN, 0,1, &mSendDestination );
                    if ( nStatus != N_MPAK_SENDING &&
                         nStatus != N_MPAK_GONE    &&
                         nStatus != N_MPAK_DONE    )
                        nSendSignal(SIGNAL_MAPP_TX_FAILED, MAPP_STATE_MACHINE);
                    else
                    {
                        nMOBITEXstate = MOBITEX_SENDING;
                    }
                    break;
            }
            break;

        case MOBITEX_SENDING :
            switch ( nSignal )
            {
                case SIGNAL_MOBITEX_RX_MPAK :
                    nGetMPAK(FALSE);
                    break;

                case SIGNAL_MOBITEX_CANCEL :
                    nMOBITEXstate = MOBITEX_IDLE;
                    break;

                case SIGNAL_MOBITEX_SENT_TO_NET :
                    nMOBITEXstate = MOBITEX_RECEIVING;
                    break;

                case SIGNAL_MOBITEX_TX_FAILED :
                    nSendSignal(SIGNAL_MAPP_TX_FAILED, MAPP_STATE_MACHINE);
                    break;
            }
            break;

        case MOBITEX_RECEIVING :
            switch ( nSignal )
            {
                case SIGNAL_MOBITEX_CANCEL :
                    nMOBITEXstate = MOBITEX_IDLE;
                    break;

                case SIGNAL_MOBITEX_RX_MPAK :
                    // get MPAK and copy MAPP frame if it checks out.
                    switch ( nGetMPAK( TRUE ) )
                    {
                        case OK_UNWANTED :
                            break;

                        case TX_MPAK_FAILED :
                            nSendSignal(SIGNAL_MAPP_TX_FAILED,
                                        MAPP_STATE_MACHINE);
                            nMOBITEXstate = MOBITEX_IDLE;
                            break;

                        case RX_MAPP_FRAME :
                            nSendSignal(SIGNAL_MAPP_RX_REPLY,
                                        MAPP_STATE_MACHINE);
                            nMOBITEXstate = MOBITEX_IDLE;
                            break;

                        case LAST_RETURNED :
                            nSendSignal(SIGNAL_MAPP_TX_UNDELIVERABLE,
                                        MAPP_STATE_MACHINE);
                            nMOBITEXstate = MOBITEX_IDLE;
                            break;
                    }
                    break;
            }
            break;
    }
}

void
vMOBITEXtiming(void)
{
}

static int
nGetMPAK( boolean fDoCopy )
{
    byte *pbData;
    int nTrafficState;
    int nDataSize,nDataOffset;
    MAN mSource,mDestination;

    int nMPAKsize;
    byte bMPAK[MAX_MPAK_LENGTH];

    if ( ML3isMPAKavailable() != N_NO_MPAKS )
    {
        switch ( ML3getMPAK(&bMPAK[0], &nMPAKsize) )
        {
            case N_NEW_MPAK :
                if ( ML3getCommand(bMPAK) == N_DATA )
                {
                    nDataOffset = ML3getDataAreaOffset(bMPAK)+3;
                    nDataSize = nMPAKsize - nDataOffset;
                    pbData = &bMPAK[nDataOffset];
                    nTrafficState = ML3getTrafficState(bMPAK);
                    mSource = ML3getSenderMAN(bMPAK);
                    mDestination = ML3getAddresseeMAN(bMPAK);
                    if ( mSource == localMAN )
                    {
```

```
                    if ( nDataSize == nSendMessageLength &&
                        memcmp(bMPAK+nDataOffset,
                               bSendMessage,nDataSize) == 0 )
                        return(LAST_RETURNED);  // returned the last sent MP
AK
                    return(OK_UNWANTED);    // returned some other MPAK
                }
                if ( mSource != mSendDestination ||
                    mDestination != localMAN )
                {
                    return( OK_UNWANTED );  // not from or to the right MAN
                }

                if ( nTrafficState != S_OK )
                {
                    return( OK_UNWANTED );  // bad traffic state
                }

                // DATA MPAK from SEND destination to LOCAL MAN,

                if ( fDoCopy &&
                    (nDataSize=nIsMAPPframe( pbData, nDataSize )) )
                {
                    memcpy(bReceiveMessage,bMPAK+nDataOffset,nDataSize);
                    nReceiveMessageLength = nDataSize;
                    return(RX_MAPP_FRAME);      // found a correct MPAK
                }
                return( OK_UNWANTED );  // might be OK, but we didn't want i
t!
            }
            else
            {
                vCheckForReprogramming(bMPAK,nMPAKsize);
                return( OK_UNWANTED );  // ignore this MPAK -- it's not DATA

            }

        case N_UNSENT_MPAK :
        case N_BAD_MPAK :
            return( TX_MPAK_FAILED );   // transmit failed.
        }
    }
    return(OK_UNWANTED);
}

/*------------------------------------------------------------------------*
 *
 * int status = mlInitialize();
 *
 * DESCRIPTION: initializes and installs all MobiLib layers and support
 *              software.  Uses stored parameters to initialize.  If
 *              the startup flag is TRUE, then the Mobitex startup sequence
 *              will be sent on the link and network layers.
 *
 * INPUTS:      NONE
 *
 * OUTPUTS:      integer status value:
 *              0               everything succeeded
 *
 *              5               error setting LINK layer parameters
 *              7               error setting NETWORK layer parameters
 *              8               error installing NETWORK layer
 *
 * SIDE-EFFECTS:   too many to list here!
 *
 * WARNINGS:       NONE
 *
 *------------------------------------------------------------------------*/


static int
nMobiLibInitialize ( void )
{
    int     nStatus;

    if (( nStatus = mlMallocInit ( "memory 64000" )) < 0 )
    {   // returns:
        //          -3 if not enough memory is available
        //          -2 if # bytes out of range
        //          -1 if badly formatted "Memory xxx" line
        //           0 if it succeeded
        //           1 if the line is not a "Memory #### bytes" line

        return ( ML_NO_MEMORY );
    }

    MinstallTimingSystem(); /* make the timer system tick! */

    ML1setAccessLayerParameters( pszInitAccess );

    if( (nStatus=ML2setLinkLayerParameters( pszInitLink )) != L_OK )
    {
        return(ML_LPARM_ERR);
    }

    if( (nStatus=ML3setNetworkLayerParameters( pszInitNetwork )) != N_OK )
    {
        return(ML_NPARM_ERR);
    }

    if( (nStatus=ML3installNetworkLayer()) != N_OK )
    {
        return(ML_LINST_ERR);
    }

    ML3setNetworkPassthru(FALSE);

    ML3startupNetwork();

    return(ML_OK);
}

//------------------------------------------------------------------------
//
```

```
//  When things happen in the mobilib subsystem, this routine is called.
//
//---------------------------------------------------------------------------

void far
ML4transportNotify( int event )
{
    switch ( event )
    {
        case SENT_TO_NETWORK :
            nSendSignal(SIGNAL_MOBITEX_SENT_TO_NET,MOBITEX_STATE_MACHINE);
            break;

        case SEND_ERROR:
            nSendSignal(SIGNAL_MOBITEX_TX_FAILED,MOBITEX_STATE_MACHINE);
            break;

        case RECEIVED_MPAK:
            nSendSignal(SIGNAL_MOBITEX_RX_MPAK,MOBITEX_STATE_MACHINE);
            break;

        case FAILED_NETWORK:
            break;

        case RESTART_NETWORK:
            break;

        case START_TRANSMIT:
            // transmits are now allowed - this is last step in network alive
            break;

        case STOP_TRANSMIT:
            // transmits ARE allowed - this happens when things are busy or net
is dropping
            break;

        case STARTED_NETWORK:
            // startup succeeded
            localMAN = ML3getLocalMANnumber();
            break;

        case CONNECTION_ESTABLISHED:
            TurnLEDon(CONTACT);
            nSendSignal(SIGNAL_RADIO_NO_ERROR,LINE_STATE_MACHINE);
            break;

        case CONNECTION_LOST:
            TurnLEDoff(CONTACT);
            nSendSignal(SIGNAL_RADIO_ERROR,LINE_STATE_MACHINE);
            break;

        default:
            break;
    }
}

enum
```

```
{
    READ_DATA,       // send back the EEPROM phone number table
    WRITE_DATA,      // program in the EEPROM phone number table
    READ_DATA_REPLY,
    WRITE_DATA_OK,
    WRITE_DATA_FAILED
};

#define REPROG_HP_NUMBER 0x00AB

static void
vCheckForReprogramming( byte *bMPAK, int nMPAKsize )
{
    byte *pbData;
    int i,j;
    unsigned uEEPROMvalue,uChecksum;
    int nTrafficState;
    int nDataSize,nDataOffset,nHPnumber,nActionType;
    MAN mSource,mDestination;
    byte bNewMODEMprotocol;
    byte _far *bMPCrSerialNumber = (byte _far *)0xFE000000L;
    boolean fWriteSucceeded;
    unsigned int uNewAutoDialThrough;

    if ( ML3getCommand(bMPAK) != N_HPDATA )
        return;

    nDataOffset   = ML3getDataAreaOffset(bMPAK)+3;
    nDataSize     = nMPAKsize - nDataOffset;
    pbData        = &bMPAK[nDataOffset];
    nTrafficState = ML3getTrafficState(bMPAK);
    mSource       = ML3getSenderMAN(bMPAK);
    mDestination  = ML3getAddresseeMAN(bMPAK);

    if ( nTrafficState != S_OK )
        return;

    nHPnumber = (int)pbData[0];

    ++pbData;
    --nDataSize;

    nActionType = (int)pbData[0];

    ++pbData;
    --nDataSize;

    if ( nHPnumber != REPROG_HP_NUMBER ||
         nActionType > WRITE_DATA ||
         nDataSize < 16 )
        return;

    if ( memcmp(pbData,bMPCrSerialNumber,16) != 0 )
        return;

    pbData += 16;
    nDataSize -= 16;
```

```
if ( nActionType == READ_DATA )
{
    bMPAK[0] = READ_DATA_REPLY;
    memcpy(bMPAK+1,bMPCrSerialNumber,16);   // bytes # 1 to 16

    bMPAK[17] = (byte)(uReadEEPROM(MPC_R_AUTO_DIAL_TIMEOUT)/500);
    bMPAK[18] = (byte) uReadEEPROM(MPC_R_MODEM_PROTOCOL);

    for ( j = 19, i = MPC_R_PHONE_TABLE;
          i < MPC_R_PHONE_TABLE_END;
          ++i, j += 2 )
    {
        uEEPROMvalue = uReadEEPROM(i);
        bMPAK[j+0] = (byte)(uEEPROMvalue & 0x00FF);
        bMPAK[j+1] = (byte)((uEEPROMvalue>>8) & 0x00FF);
    }
    nDataSize = j;
    // try, without guarantee, to send a reply
    ML3sendHPData(bMPAK,nDataSize,localMAN,0,1,&mSource,REPROG_HP_NUMBER);
    return;
}

uNewAutoDialThrough = (unsigned int)(pbData[0]); // 1/2 second units
if ( uNewAutoDialThrough > MAX_AUTO_DIAL_THROUGH )
    uNewAutoDialThrough = MAX_AUTO_DIAL_THROUGH;
uNewAutoDialThrough *= 500;     // convert to milliseconds

++pbData;
--nDataSize;

bNewMODEMprotocol = pbData[0];
if ( bNewMODEMprotocol >= MODEM_PROTOCOL_MAX )
    return;

++pbData;
--nDataSize;

if ( nDataSize != ((MPC_R_PHONE_TABLE_END-MPC_R_PHONE_TABLE)*2) )
    return;

vSetAutoDialThrough(uNewAutoDialThrough);
nWriteEEPROM(MPC_R_AUTO_DIAL_TIMEOUT, uNewAutoDialThrough);

vSetMODEMprotocol( (unsigned int)bNewMODEMprotocol );
nWriteEEPROM(MPC_R_MODEM_PROTOCOL,(unsigned int)bNewMODEMprotocol);

nWriteEEPROM(MPC_R_PHONE_CHECKSUM,0xFFFF);

for ( fWriteSucceeded = TRUE, uChecksum = 0, j = 0, i = MPC_R_PHONE_TABLE;
      i < MPC_R_PHONE_TABLE_END;
      ++i, j += 2 )
{
    uEEPROMvalue = pbData[j] + (pbData[j+1]<<8);
    uChecksum ^= uEEPROMvalue;
    nWriteEEPROM(i,uEEPROMvalue);
    if ( uReadEEPROM(i) != uEEPROMvalue )
        {
            fWriteSucceeded = FALSE;
            break;
        }
    }

    if ( fWriteSucceeded )
    {
        bMPAK[0] = WRITE_DATA_OK;
        nWriteEEPROM(MPC_R_PHONE_CHECKSUM,uChecksum);
        vGetDTMFphoneTablesFromEEPROM();
    }
    else
        bMPAK[0] = WRITE_DATA_FAILED;

    memcpy(bMPAK+1,bMPCrSerialNumber,16);

    nDataSize = 17;
    // try, without guarantee, to send a reply
    ML3sendHPData(bMPAK,nDataSize,localMAN,0,1,&mSource,REPROG_HP_NUMBER);

}
```

```
#include "basetype.hb"
#include "mem_map.hb"
#include "pcb.hb"
#include "pcb_bits.hb"
#include "leds.hb"
#include "system.hb"
#include "serial.hb"

#include "testing.h"
#include "mobilib.h"
#include "access.h"
#include "timing.h"

#include <conio.h>

//#define USE_V25

#define CONTROL_REG_0    0
#define CONTROL_REG_1    1
#define DETECT_REG       2
#define TONE_CTRL_REG    3
#define ID_REG           6

#define LONG_LOOP                  0x01
#define CALL_PROGRESS_DETECT       0x02
#define ANSWER_TONE_DETECT         0x04
#define CARRIER_DETECT             0x08
#define UNSCRAMBLED_MARK_DETECT 0x10
#define RECEIVE_DATA               0x20

#define ENABLE_TX                  0x02
#define DISABLE_TX                 0x00

// Timeouts are in milliseconds

#define CARRIER_DETECT_TIMEOUT             30000

#define V21_CARRIER_DELAY                  100

#define SCRAMBLED_MARK_RECEIVE_TIMEOUT  270
#define ONES_RECEIVE_TIMEOUT               155
#define CARRIER_DETECT_DEBOUNCE_TIMEOUT 20
#define TRANSMIT_SCRAMBLED_ONES_TIMEOUT 765
#define CCITT_2100_OFF_TIME                80
#define CCITT_2100_ON_TIME                 2600     // was 3300 -700 for min.,
#define CCITT_TRY_V21_TIME                 1000
#define CCITT_TRY_V22_TIME                 1000
#define CCITT_TRY_SILENCE_TIME             250
#define CCITT_AUTOBAUD_RETRIES             10

#define DISCONNECT_TIMEOUT                 100

#define F_CARRIER_DETECT         ( bMODEMstatus & CARRIER_DETECT )
#define F_RECEIVE_DATA           ( bMODEMstatus & RECEIVE_DATA )

#define INT_BUF_SIZE    64
```

```
char sIntBuf1[INT_BUF_SIZE];
char sIntBuf2[INT_BUF_SIZE];
static boolean fUseBuf1 = TRUE;
static int nIntLen1 = 0;
static int nIntLen2 = 0;
static int nCharTiming = 83;

static int nMODEMstate = -1;

static byte bMODEMstatus = 0;
volatile static int nMODEMdataBits = 0;
volatile static int nMODEMcountdown = 0;
volatile static int nMODEMdebouncer = 0;

#define MODEM_DATA_SENSE_PERCENTAGE     95

static char *sMODEMtxBlock   = NULL;
static int nMODEMblockLength = 0;
static int nMODEMreceiveIn   = 0;
static int nMODEMreceiveOut  = 0;
static unsigned int uMODEMprotocol = MODEM_BELL_AUTOBAUD;

#define RX_RING_SIZE    256
static char sMODEMrxRing[RX_RING_SIZE];

// Control Register 0 bits
#define MODEM_DPSK_TX_MODE       0x18
#define MODEM_FSK_TX_MODE        0x30
#define V21_FSK                  0x80
#define POWER_DOWN               0x00
#define ENABLE_TX_OUT            0x02

// Control Register 1 bits
#define TX_DATA                  0x00
#define TX_ALTERNATE             0x40
#define TX_MARK                  0x80
#define TX_SPACE                 0xC0
#define MODEM_INT_ENABLE         0x20
#define BYPASS_SCRAMBLER         0x10
#define CRYSTAL_OUTPUT           0x08
#define RESET_MODEM_CHIP         0x04
#define NO_TEST                  0x00
#define ANALOG_LOOPBACK          0x01
#define REMOTE_DIGITAL_LOOP      0x02
#define LOCAL_DIGITAL_LOOP       0x03

// Tone Control Register bits
#define RXD_TRISTATE             0x80
#define TRANSMIT_GUARD_TONE      0x40
#define TRANSMIT_ANSWER_TONE     0x20
#define TRANSMIT_DTMF            0x10
#define BELL_TONES               0x00
#define CCITT_TONES              0x01
#define CONNECT_NORMAL           0x00

void _interrupt _far vMODEMserialIntHandler(void);
```

SUPPORT FILES (APPENDIX I)

For the purposes of compiling and assembling the source code for the invention, the following Macro names are considered defined or undefined, as listed.

Macros Defined:

```
For 'C' compiles
    MPC=1
    MMPC=2
    NO_DEBUG
    RADIO

For ASM files
    MPC=1
    MX25=0
    MMPC=2
    MODELL
```

Macros Undefined:

```
COM
USE_V25
PARANORMIA
CLIPPER
DEBUG_REPLY
```

```
/********************************************************************

 This code (c) Copyright 1992  by
    , and designed by
            Research In Motion Limited
            Technology Business Park
            180 Columbia Street West
            Waterloo, Ontario
            N2L 3L3
      Phone: (519) 888-7465
        FAX: (519) 888-6906

 Author:       Michael A. Barnstijn

 Date created:   September 1990

 Description:
      Global definitions for the MobiLib-Plus Access Layer Interface

 Change History:
      14 May 1992            Release cleanup

********************************************************************
**      Changes made to this file should also be reflected in the MobiPlus.h
**      file in the p:\mobiplus directory (Developer's Kit).
*******************************************************************/

int         ML1chgAccessLayerParameters(char *string);
int         ML1getAccessLayerParameters(char *string);
int         ML1installAccessLayer(void);
int         ML1setAccessLayerParameters(char *string);
int         ML1autoBaudRadio(int command);
void        ML1autoBaudHandler( int flags );
void        ML1getAccessLayerVersionInfo(MLinfoStruct *info);
void        ML1removeAccessLayer( void );

extern void         _far ML1putBlock( byte _far * string, int length );
extern          int _far ML1getByte(void);
extern unsigned int _far ML1getAccessState(void);

typedef enum
  {
    A_OK = 0,           A_BAD_PARMS,        A_SET_PARMS,
    A_NOT_AVAILABLE,    A_WRONG_SETTING,    A_BAD_HARDWARE,
    A_NOT_INITIALIZED,  A_ALREADY_INIT,     A_BAD_EXIT,
  } Access_status;

#define A_RX_OVERFLOW     1
#define A_TX_DONE         2
#define A_RX_GOT_CHAR     4
```

```
/*******************************************************
 *                                                     *
 *                Local Prototypes                     *
 *                                                     *
 *******************************************************/

            int     ML1checkBaudRate(int *serBaud);
            int     ML1checkPort(int serPort,int *serInt);

#define NUM_BAUDS       4       /* number of different baud rates supported */

/* serial port parameters, initialized */
extern int ML1serParity;
extern int ML1serBits;
extern int ML1stopBits;
extern int ML1serPort;
extern int ML1serInt;
extern int ML1baudRate[];
extern int ML1initialized;

/* Baud rates supported: 1200, 2400, 4800, 9600 */
extern int baudinits[NUM_BAUDS];
extern int baudtimes[NUM_BAUDS];
extern int baudvalue[NUM_BAUDS];
extern int ML1lastPort;

/* interrupt handler stack area */
extern unsigned char ML1stack[2048];

/*******************************************************
 *                                                     *
 *      Information Structure for this Layer           *
 *                                                     *
 *******************************************************/
extern MLinfoStruct ML1info;
```

```
typedef unsigned int uint;
typedef unsigned char   uchar;
typedef unsigned char   byte;
typedef long int        MAN;
typedef short int       boolean;

typedef int             DataHandle;
typedef int             SessionHandle;
typedef int             TransportHandle;
typedef int             TransportDataHandle;
typedef int             TimerHandle;

typedef char *          SessionParameterString;
typedef volatile unsigned char far *    far_str;
#define inCS _based(_segname("_CODE"))

#ifndef NULL
#define NULL (char *) 0
#endif

#ifndef TRUE
#define FALSE   0
#define TRUE    (~FALSE)
#endif

#define MAX_MAN_LIST            8
#define MAX_ADDR_LIST           8
#define MAX_PSSW_LEN            8

typedef void *          PVOID;

typedef byte *          PBYTE;

typedef char *          PCHAR;
typedef char *          PSTR;

typedef int *           PINT;

typedef long *          PLONG;
typedef MAN *           PMAN;
```

File: include\BASETYPE.HB

```
Uint                    equ     <WORD>
Uchar                   equ     <BYTE>
MAN                     equ     <DWORD>
boolean                 equ     <BYTE>
tristate                equ     <BYTE>

DataHandle              equ     <WORD>
SessionHandle           equ     <WORD>
TransportHandle         equ     <WORD>
TransportDataHandle     equ     <WORD>
TimerHandle             equ     <WORD>
TransportType           equ     <WORD>
Protoocol               equ     <WORD>
Timestamp               equ     <WORD>
SessionParameterString  equ     <WORD>  ;char*

MAX_SIGNED_INT          equ     32767
MAX_UNSIGNED_INT        equ     65535

NULL                    equ      0
FALSE                   equ      0
TRUE                    equ      1
FLOATING                equ     -1

MAX_NUM_DATA_COMP_ALGOR equ     16
MAX_MAN_LIST            equ      8
MAX_ADDR_LIST           equ      8
MAX_PSSW_LEN            equ      8
```

File: include\BASETYPE.INB

```
typedef long commsetting;

#define __BAUD_SHIFT  16
#define __ABAUD_SHIFT 14
#define __BITS_SHIFT   8
#define __PARITY_SHIFT 4
#define __STOP_SHIFT   0

#define __BAUD_MASK    0x3FFF
#define __ABAUD_MASK     0x01
#define __BITS_MASK      0x0F
#define __PARITY_MASK    0x07
#define __STOP_MASK      0x03

typedef enum { NONE, EVEN, ODD } Parity;

#define BAUD_FILL(X)    ( ( (X) == 2816 ) ? 19200 : (X) )
#define BAUD_CHOP(X)    ( (X) & __BAUD_MASK )

#define BAUD_RATE(x) BAUD_FILL((int)((x>>__BAUD_SHIFT)  &__BAUD_MASK))
#define AUTOBAUD(x)  (int)((x>>__ABAUD_SHIFT) &__ABAUD_MASK)
#define DATA_BITS(x) (int)((x>>__BITS_SHIFT)  &__BITS_MASK)
#define PARITY(x)    (int)((x>>__PARITY_SHIFT)&__PARITY_MASK)
#define STOP_BITS(x) (int)((x>>__STOP_SHIFT)  &__STOP_MASK)

#define BUILD_COM(baud,dbits,parity,stop,abaud)          \
        ((long)((baud) &__BAUD_MASK)<<__BAUD_SHIFT |     \
               ((dbits)&__BITS_MASK)<<__BITS_SHIFT |     \
               ((parity)&__PARITY_MASK)<<__PARITY_SHIFT | \
               ((stop)&__STOP_MASK)<<__STOP_SHIFT |      \
               ((abaud)&__ABAUD_MASK)<<__ABAUD_SHIFT)
```

```
/* constants for the Hayes related objects in that are stored in the EEPROM
 * on the MPC.  Note that they are with repect to 16 bit entries in the EEPROM,
 * i.e. they are two bytes wide each.
 */

#define BOOT_PROFILE      0
#define RADIO_DEFAULTS   58
#define EEPROM_CHECKSUM 255
```

File: include\EEPROM.HB

```
/* enums.h */

typedef enum(   P_REGULAR,      P_TEXT,         P_DATA,
                P_HPDATA,       P_STATUS,       P_EMERGENCY ) PacketType;

/* access to link */
typedef enum (  RX_OVERFLOW = 1,        TX_DONE = 2,
                RX_GOT_CHAR = 4 ) Lcallback;

/* Notice that in the next few sets manifests with the "same" function have
 * the same value.  The Explicit assignments force the overlap.
 */

/* link to network */
typedef enum (  MPAK_RECEIVED=-20,      PACKET_SENT,            // -20
                NETWORK_CONNECTED,      NETWORK_DISCONNECTED,   // -18
                BAD_PACKET,             RECEIVED_B_FRAME,       // -16
                LINK_DISCONNECTED,      NEW_X25_PARMS,          // -14
                PACKET_RETURNED                                 // -12
                ) Ncallback;

/* network to transport */
typedef enum (  RECEIVED_MPAK=-20,      SENT_TO_NETWORK,        // -20
                CONNECTION_ESTABLISHED, CONNECTION_LOST,        // -18
                SEND_ERROR,             SEND_TIMED_OUT,         // -16
                RESTART_NETWORK,        FAILED_NETWORK,         // -14
                STOP_TRANSMIT,          START_TRANSMIT,         // -12
                STARTED_NETWORK                                 // -10
                ) Tcallback;

/* memory allocator "ml_malloc" memory pool specifier */
typedef enum (
        APP_POOL,
        COMPRESS_POOL,
        TX_POOL,
        RX_POOL,
        SESSDEF_POOL,
        TRANSDEF_POOL,
        FIXED_POOL
        ) Tmempool;

enum (
   START_COMPRESS = 1,
   STOP_COMPRESS,
   START_DECOMPRESS,
   STOP_DECOMPRESS
   );

#ifndef NO_DEBUG
  extern void * ml_malloc_ref( unsigned int size, Tmempool pool, char * filename
, int linenum );
  extern void ml_free_ref( void * pointer, char * filename, int linenum );
  #ifndef ML4MALLOC
    #define ML_MALLOC(X,Y)  ml_malloc_ref( X, Y, myFileForMemCalls, __LINE__ )
  #endif
  #ifndef ML4FREE
    #define ML_FREE(X)      ml_free_ref( X, myFileForMemCalls, __LINE__ )
  #endif
  #ifndef SET_MEM_REF_FILE
    #define SET_MEM_REF_FILE static char _based(_segname("_CODE")) myFileForMemC
alls[] = __FILE__
  #endif
#else
  #ifndef ML4MALLOC
    #define ML_MALLOC(X,Y)  ml_malloc( X, Y )
  #endif
  #ifndef ML4FREE
    #define ML_FREE(X)      ml_free( X )
  #endif
  #ifndef SET_MEM_REF_FILE
    #define SET_MEM_REF_FILE  //
  #endif
#endif

enum
{
    NO_POWER_OFF_REQUESTED,
    POWER_DOWN_SESSION,
    POWER_DOWN_RADIO,
    POWER_OFF_NOW
};
```

```
typedef enum {
    DIVIDE_0,     SINGLES_STEP,  NMI,            BREAKPOINT,
    OVERFLOW,     ARRAY_BOUNDS,  UNUSED_OPCODE,  ESC_OPCODE,
    TIMER_0,      RESERVED_9,    RESERVED_10,    RESERVED_11,
    INT0,         INT1,          INT2,           INT3,
    COPROCESSOR,  INT4,          TIMER1,         TIMER2,
    SERIAL0_REC,  SERIAL0_XMIT,  RESERVED_22,    /* ... */
    RESERVED_31=31,
    FIRST_USER=32
    } Interrupts;

/* interrupt control registers */

/* EOI register 0x02, Polling, 0x04 - 0x06, */
#define INT_REQ_VEC_TYPE      0x001F    /* 4,3,2,1,0 */
#define NSPEC_EOI_ENABLE      0x8000
#define INTERRUPT_PENDING     0x8000

/* Priority mask 0x0A - use PRIORITY from Interrupt Control */
/* Interrupt Control - Serial, Timers, int0 to int4 - 0x12 - 0x1E */
#define PRIORITY        0x07
#define DISABLE         0x08
#define EDGE_LEVEL      0x10    /* not Serial or Timer */
#define CASCADE         0x20    /* int0, int1 only */
#define NESTING         0x40    /* int0, int1 only */

/* Interrupt Request, Mask, Inservice - 0x0E, 0x08, 0x0C,  */
#define TIMER_PENDING  0x01
#define SERIAL_PENDING 0x04
#define INT0_4_PENDING 0xF8     /* 3,2,1,0,4 */
#define INT1_4_PENDING 0xE8

/* Interrupt Status register - 0x10 */
#define TIMER0_REQUEST  0x01
#define TIMER1_REQUEST  0x02
#define TIMER2_REQUEST  0x04
#define SERIAL_RECEIVE  0x08
#define SERIAL_TRANSMIT 0x10
```

File: include\INTERRUP.HB

```
; interrupt offsets into the table at the beginning of memory
DIVIDE_0        equ 00h
SINGLES_STEP    equ 04h
NMI             equ 08h
BREAKPOINT      equ 0Ch
OVERFLOW        equ 10h
ARRAY_BOUNDS    equ 14h
UNUSED_OPCODE   equ 18h
ESC_OPCODE      equ 1Ch
TIMER_0         equ 20h
RESERVED_9      equ 24h
RESERVED_10     equ 28h
RESERVED_11     equ 2Ch
INT0            equ 30h
INT1            equ 34h
INT2            equ 38h
INT3            equ 3Ch
COPROCESSOR     equ 40h
INT4            equ 44h
TIMER_1         equ 48h
TIMER_2         equ 4Ch
SERIAL0_REC     equ 50h
SERIAL0_XMIT    equ 54h
RESERVED_22     equ 58h
; ...
RESERVED_31     equ 7Ch
FIRST_USER      equ 80h

; interrupt control registers

; EOI register 0x02, Polling, 0x04 - 0x06,
INT_REQ_VEC_TYPE        equ     001Fh   ; 4,3,2,1,0
NSPEC_EOI_ENABLE        equ     8000h
INTERRUPT_PENDING       equ     8000h
;
; Priority mask 0x0A - use PRIORITY from Interrupt Control
; Interrupt Control - Serial, Timers, int0 to int4 - 0x12 - 0x1E
PRIORITY        equ     07h
DISABLE         equ     08h
EDGE_LEVEL      equ     10h     ; not Serial or Timer
CASCADE         equ     20h     ; int0, int1 only
NESTING         equ     40h     ; int0, int1 only

; Interrupt Request, Mask, Inservice - 0x0E, 0x08, 0x0C,
TIMER_PENDING   equ     01h
SERIAL_PENDING  equ     04h
INT0_4_PENDING  equ     0F8h    ; 3,2,1,0,4

; Interrupt Status register - 0x10
TIMER0_REQUEST  equ     01h
TIMER1_REQUEST  equ     02h
TIMER2_REQUEST  equ     04h
SERIAL_RECEIVE  equ     08h
SERIAL_TRANSMIT equ     10h

; various interrupt priorities
AUTOBAUD        equ     02h
SYS_CLOCK       equ     03h
SERIAL_SCC      equ     04h
SERIAL_ONBOARD  equ     05h
```

```
/* function (or non-function) definitions */
#ifdef MPC
extern void _far TurnLEDon( byte mask );
extern void _far TurnLEDoff( byte mask );
extern void _far ToggleLED( byte mask );
#else
#define TurnLEDon( mask )
#define TurnLEDoff( mask )
#define ToggleLED( mask )
#endif

/* and the actual LEDs as well */
#define RADIORX 0x20
#define RADIOTX 0x10
#define CONTACT 0x40
#define ON_LINE 0x80
```

```
extrn   TurnLEDon:far
extrn   TurnLEDoff:far
extrn   ToggleLED:far

RADIORX equ     020h
RADIOTX equ     010h
CONTACT equ     040h
ON_LINE equ     080h
```

```
#define L_NO_NETPACKS    0
#define L_NEW_NETPACK    1
#define L_UNSENT_NETPACK 2
#define L_BAD_NETPACK    3
#define L_ERROR_NETPACK  4

#define L_BAD_PARMS     -1
#define L_OK             0

void ML2vCloseLinkLayer(void);
 int ML2nBlockNetworkNotify( void );
void ML2vUnblockNetworkNotify( int nKey );
void ML2vOpenLinkLayer(void);

int ML2putNetworkPacket(volatile byte *pbData,int nDataLength,boolean fNetDone);


int ML2getNetworkPacket(byte * pbNETPACK,int * pnNETPACKlength);

void ML2cancelNetworkPacket(void);

void ML2doneNetworkPacketSend(void);

void ML2flushReceiver(void);

int ML2installLinkLayer(void);
int ML2removeLinkLayer(void);
int ML2getLinkLayerParameters(char *string);
int ML2setLinkLayerParameters(char *string);

void ML2vGetFXframe(int *pnLength, byte *pbFrame);

typedef enum {
    NFY_LINK_TXDONE,            // 0
    NFY_LINK_TXFAILED,          // 1
    NFY_LINK_RXMPAK,            // 2
    NFY_LINK_OPENED,            // 3
    NFY_LINK_CONNECTED,         // 4
    NFY_LINK_DISCONNECTED,      // 5
    NFY_LINK_NET_CONNECTED,     // 6
    NFY_LINK_NET_DISCONNECTED,  // 7
    NFY_LINK_CLOSED,            // 8
    NFY_LINK_SET_MAN_NUMBER,    // 9
    NFY_LINK_NEW_X25_PARMS      // 10
    } netNotifyType;
```

```
#include "pcb.hb"  // for LED_START

/* the following are fixed locations in the memory map */
#define RAM_START       0x0000u
#define RAM_SIZE        0x0800u /* 32k */
#define RAM1_START      0x0800u
#define RAM1_SIZE       0x0800u /* 32k */
#define FLASH_START     0xE000u /* split flash (part of boot) */
#define FLASH_SIZE      0x1800u /* application is only 96k long */
#define SIXTY_FOUR_K    0x1000u

#define BOOT_START      0xE000u
#define BOOT_SIZE       0x2000u /* 128K */

#define SERIAL_START    0x00C0u /* for the SCC */
#define SERIAL_SIZE     0x0040u /* a big 4 bytes - call it 64 bytes */

#define PCB_START       0xFF00u /* leave it there in the I/O space*/
#define PCB_SIZE        0x0100u

#define LED_START       0x0040u
#define LED_SIZE        0x0040u /* a big 1 byte - call it 64 bytes */

#define MODEM_START     0x0080u
#define MODEM_SIZE      0x0040u

#define DTMF_START      0x00C0u
#define DTMF_SIZE       0x0040u
```

```
INCLUDE pcb.inb

RAM_START       equ     00000h
RAM1_START      equ     00800h
FIRST_FLASH     equ     0E000h

FLASH_START     equ     0E000h

BOOT_START      equ     0E000h
BOOT_SIZE       equ     02000h  ; 128k

SERIAL_START    equ     000C0h  ; for the SCC
SERIAL_SIZE     equ     00040h  ; a big 7 bytes - call it 64 bytes

PCB_START       equ     0FF00h  ; leave it there in the I/O space
PCB_SIZE        equ     00100h

LED_START       equ     040h
LED_SIZE        equ     040h

MODEM_START     equ     080h
MODEM_SIZE      equ     040h

DTMF_START      equ     0C0h
DTMF_SIZE       equ     040h
```

```
/*****************************************************************

  This code (c) Copyright 1992  by
     , and designed by
              Research In Motion Limited
              Technology Business Park
              180 Columbia Street West
              Waterloo, Ontario
              N2L 3L3
       Phone: (519) 888-7465
         FAX: (519) 888-6906

  Author:       Michael A. Barnstijn

  Date created:   September 1990

  Description:
        Definitions and Function Prototypes for MobiLib-Plus

  Change History:
        14 May 1992             Release cleanup

*****************************************************************/

int MinitializeMobilib(char *storageName,int doStartup);
int MremoveMobilib(int doShutdown,int doStoreParameters);
int MshutdownSequence(void);
int MstartupSequence(int command);
int MstoreParameters(char *storageName,int doShutdown);

/* layer version/information structure (65 bytes):
        Version (0-99):         1 byte
        Revision (0-9):         1 byte
        Update (0-00):          1 byte
        DateStamp:              4 bytes:
                                    byte 0:   day of month (1-31)
                                    byte 1:   month (1-12)
                                    byte 2-3: AD year 16 bits,
                                              MSByte first

        Information           58 bytes:       character string, includes
                                               the null terminator.
            required text is:
            1) Manufacturer's name, ends with a semicolon (;)
            2) description of the layer
*/

typedef struct _MLinfoStruct {
    unsigned char version;
    unsigned char revision;
    unsigned char update;
    unsigned char idHigh;
    unsigned char idLow;
    unsigned char day;
    unsigned char month;
    unsigned char yearHigh;
    unsigned char yearLow;
    char informationString[56];
    } MLinfoStruct;
typedef MLinfoStruct *      PMLinfoStruct;

typedef long int MAN;

#define ML_EXITH_FAIL  -2    /* cannot install exit function  */
#define ML_BRKH_FAIL   -1    /* cannot install break handler  */
#define ML_OK           0    /* everything succeeded          */
#define ML_STOR_FAIL    1    /* couldn't open storage file    */
#define ML_STOR_EOF     2    /* EOF/err reading from storage  */
#define ML_APARM_ERR    3    /* error in ACCESS layer parms   */
#define ML_AINST_ERR    4    /* error installing ACCESS layer */
#define ML_LPARM_ERR    5    /* error in LINK layer parms     */
#define ML_LINST_ERR    6    /* error installing LINK layer   */
#define ML_NPARM_ERR    7    /* error in NETWORK layer parms  */
#define ML_NINST_ERR    8    /* error installing NETWORK layer*/
#define ML_NSEND_ERR    9    /* unable to send net startup    */
#define ML_NRESP_ERR   10    /* no network response to startup*/
#define ML_N_TRYING    11    /* network startup in progress   */
#define ML_NO_RADIO    12    /* autobaud could not find radio */
#define ML_NO_MEMORY   13    /* memory allocator failed */
```

```
/* constants for objects in that are stored in the EEPROM
 * on the MPC-r. The EEPROM stores WORDS - 16 bits wide.
 * Thus each item is stored as at least a word.  Note that
 * the phone number table is end-justified -- it is tucked
 * in at the high end of the EEPROM memory addressing.
 */

#define MPC_R_EE_VERSION_STORAGE 0
#define MPC_R_RADIO_DEFAULTS    1      // two words!
#define MPC_R_AUTO_DIAL_TIMEOUT 3
#define MPC_R_MODEM_PROTOCOL    4

#define MPC_R_PHONE_CHECKSUM    55
#define MPC_R_PHONE_TABLE       56
#define MPC_R_PHONE_TABLE_END   MPC_R_PHONE_TABLE+200   // end of EEprom!

unsigned uReadEEPROM( int location );
int nWriteEEPROM( int location, unsigned data );
```

```
/*****************************************************************

  This code (c) Copyright 1992  by
    , and designed by
        Research In Motion Limited
        Technology Business Park
        180 Columbia Street West
        Waterloo, Ontario
        N2L 3L3
     Phone: (519) 888-7465
       FAX: (519) 888-6906

  Author:       Michael A. Barnstijn

  Date created:   September 1990

  Description:
      Definitions and Function Prototypes for MobiLib-Plus Network Layer

  Change History:
      14 May 1992           Release cleanup

*****************************************************************
**      Changes made to this file should also be reflected in the MobiPlus.h
**      file in the p:\mobiplus directory (Developer's Kit).
*****************************************************************/

/* maximum values for MPAK limits */
#define MAX_MPAK_SIZE   560
#define MAX_MPAK_DATA   512
#define MAX_MPAK_COMMANDS 41
#define MAX_ADDRESSEES  7
#define MIN_MPAK_SIZE   8

/* subscription flags */
#define NONE_F          0x00
#define MAILBOX_F       0x01
#define DIGITAL_F       0x02
#define UNKNOWN_F       0x08
#define EXTERN_F        0x20

/* MPAK command values */
#define N_TEXT          0
#define N_DATA          1
#define N_STATUS        2
#define N_HPDATA        3
#define N_EXTPAK        4
#define N_SOS           5
#define N_SOSINFO       6
#define N_SOSACK        7
#define N_CONREQ        8
#define N_ADDCONREQ     9
#define N_CONGRA        10
#define N_CONORD        11
#define N_CONREA        12
#define N_DISCON        13
#define N_CLOOPON       14
#define N_CLOOPOFF      15
#define N_LINEON        16
#define N_LINEOFF       17
#define N_SOSCONREQ     18
#define N_EXTCONREQ     19
#define N_LOGINREQ      20
#define N_LOGINGRA      21
#define N_LOGINREF      22
#define N_LOGOUT        23
#define N_LOGOUTORD     24
#define N_BORN          25
#define N_ACTIVE        26
#define N_INACTIVE      27
#define N_DIE           28
#define N_LIVE          29
#define N_ROAMORD       30
#define N_ROAM          31
#define N_VICESOSRX     32
#define N_SOSRX         33
#define N_GROUPLIST     34
#define N_FLEXREQ       35
#defina N_FLEXLIST      36
#define N_INFOREQ       37
#define N_INFO          38
#define N_TIME          39
#define N_MODE          40

/* pre-defined MAN numbers */
#define MAN_MOBITEX     1L
#define MAN_TELEX       2L
#define MAN_PUBLIC_X21  3L
#define MAN_TELEPHONE   4L
#define MAN_PUBLIC_X25  5L
#define MAN_MSG_HANDLER 6L
#define MAN_ALL_TERMS   7L
#define MAN_NET_CUST_SERV 1000000L

/* traffic state values */
#define S_OK            0x00
#define S_FROM_MAIL     0x01
#define S_IN_MAIL       0x02
#define S_NO_TRANSFER   0x03
#define S_ILLEGAL       0x04
#define S_CONGEST       0x05
#define S_ERROR         0x06
#define S_BUSY          0x07

#define N_OK            0
#define N_ALREADY_INIT  1
#define N_BAD_EXIT      2
#define N_NO_MEMORY     3

#define N_BAD_PARMS      -3
#define N_TIMEOUT        -2
#define N_LINK_ERROR     -1
#define N_NO_MPAK_SENDING 0
#define N_MPAK_SENDING    1
```

```
#define N_MPAK_SENT        2
#define N_MPAK_DONE        3
#define N_MPAK_REFUSED     4
#define N_MPAK_BLOCKED     5
#define N_MPAK_GONE        6
#define N_MPAK_SEND_ERROR  7
#define N_TRYING           8
#define N_FAILED           9
#define N_DONE_MOX         10
#define N_DONE_8K          11
#define N_DONE_1200        12
#define N_RUNNING          13
#define N_STARTUP          14
#define N_NO_INIT          15

#define N_NO_MPAKS      0
#define N_NEW_MPAK      1
#define N_UNSENT_MPAK   2
#define N_BAD_MPAK      3
#define N_ERROR_MPAK    4

#define MIN_MPAK_LENGTH 8
#define MAX_MPAK_LENGTH 560

#define TRANSMIT        0       /* for use as "flag" in "sendCmdK()" */
#define RECEIVE         1

#define MIN_HPDATA_PROTOCOL     0
#define MAX_HPDATA_PROTOCOL     255

/* maximums according to Mobitex specifications in section 9 */
#define MAX_FREQUENCY   0x617
/* valid MANs are between 0 and 16 million and change */
#define MAX_MAN         0xFFFFFFL
#define MIN_MAN         0
#define MIN_NET_MAN     100000
#define MAX_D_UTG       9
#define MAX_S_UTG       15
#define MAX_TYP         8
#define PASSWORD_LEN    8
#define MAX_TFN         20

#define MAX_SOS_DATA    256
#define MAXFLEX 7       /* maximum number of transferred subscriptions */
#define MAXGROUP 15     /* maximum number of defined local groups */

enum { IDLE, APP_SEND, NET_STARTING, APP_SEND_AND_NET_START_REQ };
enum { APP_SEND_DONE = -1, RESTART_CHECK, APP_SEND_CHECK, RESTART_DONE };
enum { CANT_SEND_NOW, OK_TO_SEND };

#define AS_STATUS_OFFSET 25

//  Network Activity States
//  0 if inactive, 1 if active accepted, -1 if requesting active (changing).
#define     NETWORK_ACT_BUSY        -1
#define     NETWORK_ACT_INACTIVE    0
#define     NETWORK_ACT_ACTIVE      1
```

```
#define     NETWORK_ACT_MIN     NETWORK_ACT_BUSY
#define     NETWORK_ACT_MAX     NETWORK_ACT_ACTIVE

#define     NUM_TIMESTAMP_BYTES     3

/* definition of MPAK time structure */
typedef struct _MPAKtime
{
    int nYear, nMonth, nDay, nHour, nMinute;
} MpakTime;
typedef MpakTime *      PMpakTime;

/*
** function prototypes
*/

/*
**  Network activity state management routines.
*/
    int         ML3isNetworkActive ( void );

/*
**  MAN number functions.
*/
    MAN         ML3getLocalMANnumber ( void );

/*
**  Functions to take information out of network packets.
*/
    int         ML3decodeTime ( PVOID pvPacketBuffer,
                    PMpakTime pmtPacketTime );


/*
**  Net7.c.
*/
    MAN         ML3getSenderMAN ( PVOID pvPacketBuffer );
    int         ML3numAddressees ( PVOID pvPacketBuffer );
    MAN         ML3getAddresseeMAN ( PVOID pvPacketBuffer );
    void        ML3getAddresseeList ( PVOID pvPacketBuffer,
                    PMAN pmAddressees );
    int         ML3getSubscriptionFlags ( PVOID pvPacketBuffer );
    int         ML3getTrafficState ( PVOID pvPacketBuffer );
    int         ML3getDataAreaOffset ( PVOID pvPacketBuffer );

/*
**  Net9.c
*/
    int         ML3getCommand ( PVOID pvPacketBuffer );
    PCHAR       ML3getCommandName ( int nCommand );
    int         ML3getCommandValue ( int nCommand );
    int         ML3getCommandFlags ( int nCommand );
    int         ML3hasDie ( int nCommand );
    int         ML3hasTime ( int nCommand );
    int         ML3convertCommandName ( PCHAR pszCommandString );
```

```
/*
** Net10.c
*/
    boolean     ML3getBlockingSend ( void );
    boolean     ML3setBlockingSend ( boolean fNewValue );
    void        ML3startupNetwork(void);
    int         ML3sendActive ( MAN mSource );
    int         ML3sendInactive ( MAN mSource );
    int         ML2isLinkRadio ( void );

/*
** Net12.c
*/
    int         ML3getMPAK ( PVOID pvMpakBuffer, PINT piMpakSize );
    int         ML3isMPAKavailable ( void );

/*
** Net13.c
*/
    void        ML3flushReceiver ( void );

/*
** Net18.c
*/
    int         ML3setNetworkPassthru ( int nSetValue );
    int         ML3getNetworkPassthru ( void );


/*
** Net21.c
*/
    int         ML3okToTransmit ( void );
    int         ML3getSendStatus ( void );
    void        ML3flushTransmitter ( void );

/*
** Notification for the LINK layer only (net25)...
*/
    void _far   ML3networkNotify ( Ncallback nMessageType, ... );

/*
** net26.c
*/
    void        ML3getNetworkLayerVersionInfo ( PMlInfoStruct pmisFill );
    int         ML3getNetworkLayerParameters ( PSTR pszString );
    int         ML3setNetworkLayerParameters ( PSTR pszString );

/*
** Net27.c
*/
    void        ML3startupNetwork ( void );


/*
** Net29.c
*/
    void        ML3removeNetworkLayer ( void );
    int         ML3shutdownNetworkLayer ( void );
    int         ML3isShutdownDone ( void );

/*
** Network.c
*/
    int         ML3installNetworkLayer ( void );

/*
** Routines to send packets of given types.
*/
    int         ML3returnMPAKasUnknown ( PVOID pvBuffer, int nBufferSize );

    int         ML3sendActive ( MAN mSource );
    int         ML3sendData ( PCHAR pszData, int nDataLength, MAN mSource,
                    int nSubscriptionFlags, int nNumberOfMans,
                    PMAN pmDestinationMans );
    int         ML3sendFlexlist ( PMAN pmFlexList,int nNumberOfFlexEntries,
                    MAN mSource, MAN mDestination );
    int         ML3sendHPData ( PVOID pvData, int nLength, MAN mSource,
                    int nSubscriptionFlags, int nNumberOfDestinationMans,
                    PMAN pmDestinationMans, int nProtocol );
    int         ML3sendLogin ( MAN mLogin, PSTR pszPassword, MAN mSource );
    int         ML3sendRoam ( void );
    int         ML3sendStatus ( int nStatusValue, MAN mSource,
                    int nSubscriptionFlags, int nNumberOfDestinationMans,
                    PMAN pmDestinationMans );


/*
** Unused MPAK packet generators.
*/
        int ML3sendInactive(MAN);
        int ML3sendBorn(void);
        int ML3sendText(char *,MAN,int,int,MAN *);
        int ML3sendEXTPAK(char *,int,MAN,MAN);
        int ML3sendLogout(MAN,MAN);
        int ML3sendSOSACK(int,MAN,MAN);
        int ML3sendSOS(char *text,int length,MAN MANfrom,MAN MANto);

        int ML3sendVICESOSRX(MAN MANfrom);
        int ML3sendSOSRX(MAN MANfrom);
        int ML3sendCONREQ( MAN MANfrom, MAN MANto, int lineNumber,
            int connectID, int subscriptionFlags );
        int ML3sendCONREA(MAN MANfrom,MAN MANto,int lineNumber,int connectID);
        int ML3sendDISCON(MAN MANfrom,MAN MANto,int lineNumber,int connectID);
        int ML3sendSOSCONREQ(MAN MANfrom,MAN MANto,int lineNumber,int connectID
);
        int ML3sendADDCONREQ(byte *data,int dataLength,MAN MANfrom,MAN MANto,in
t lineNumber,int connectID,int subscriptionFlags);
        int ML3sendEXTCONREQ(char *dest,MAN MANfrom,MAN MANto,int lineNumber,in
t connectID,int subscriptionFlags);
        int ML3sendLINEON(MAN MANfrom,int lineNumber);
        int ML3sendLINEOFF(MAN MANfrom,int lineNumber);
```

```
#define CPU_CLOCK  5529600L

/* The following are BYTE offsets into the PCB */
#define PCB_BASE        0xFF00u /* in the IO space */

#define INTERRUPTS      0x02
//-------------------------
#define END_OF_INT      0x02
#define POLL            0x04
#define POLL_STATUS     0x06
#define INTERRUPT_MASK  0x08
#define PRIORITY_MASK   0x0A
#define IN_SERVICE      0x0C
#define INT_REQUEST     0x0E
#define INT_STATUS      0x10
#define TIMER_CONTROL   0x12
#define SERIAL_CONTROL  0x14
#define INT4_CONTROL    0x16
#define INT0_CONTROL    0x18
#define INT1_CONTROL    0x1A
#define INT2_CONTROL    0x1C
#define INT3_CONTROL    0x1E


#define TIMERS          0x30
//-------------------------
#define TIMER0_COUNT    0x30
#define TIMER0_COMPAREA 0x32
#define TIMER0_COMPAREB 0x34
#define TIMER0_CONTROL  0x36
#define TIMER1_COUNT    0x38
#define TIMER1_COMPAREA 0x3A
#define TIMER1_COMPAREB 0x3C
#define TIMER1_CONTROL  0x3E
#define TIMER2_COUNT    0x40
#define TIMER2_COMPAREA 0x42
#define TIMER2_CONTROL  0x46


#define PORT            0x50
//-------------------------
#define PORT1_DIR       0x50
#define PORT1_PIN       0x52
#define PORT1_CONTROL   0x54
#define PORT1_LATCH     0x56
#define PORT2_DIR       0x58
#define PORT2_PIN       0x5A
#define PORT2_CONTROL   0x5C
#define PORT2_LATCH     0x5E


#define SERIAL          0x60
//-------------------------
#define SERIAL0_BAUD    0x60
#define SERIAL0_COUNT   0x62
#define SERIAL0_CONTROL 0x64
#define SERIAL0_STATUS  0x66
#define SERIAL0_RBUF    0x68
#define SERIAL0_TBUF    0x6A
#define SERIAL1_BAUD    0x70
#define SERIAL1_COUNT   0x72
#define SERIAL1_CONTROL 0x74
#define SERIAL1_STATUS  0x76
#define SERIAL1_RBUF    0x78
#define SERIAL1_TBUF    0x7A


#define CHIP_SELECT     0x80
//-------------------------
#define GCS_START(x)    (0x80+(unsigned)((x)<<2))
#define GCS_STOP(x)     (0x82+(unsigned)((x)<<2))
#define LCS_START       0xA0
#define LCS_STOP        0xA2
#define UCS_START       0xA4
#define UCS_STOP        0xA6
#define RELOCATION      0xA8


#define REFRESH_ETC     0xB0
//-------------------------
#define REFRESH_BASE    0xB0
#define REFRESH_TIME    0xB2
#define REFRESH_CONTROL 0xB4
#define REFRESH_ADDRESS 0xB6
#define POWER_CONTROL   0xB8
#define STEP_ID         0xBC
```

```
; The following are BYTE offsets into the PCB
PCB_BASE         equ     0FF00h  ; in the IO space


INTERRUPTS       equ      002h
;-----------------------------
END_OF_INT       equ      002h
POLL             equ      004h
POLL_STATUS      equ      006h
INTERRUPT_MASK   equ      008h
PRIORITY_MASK    equ      00Ah
IN_SERVICE       equ      00Ch
INT_REQUEST      equ      00Eh
INT_STATUS       equ      010h
TIMER_CONTROL    equ      012h
SERIAL_CONTROL   equ      014h
INT4_CONTROL     equ      016h
INT0_CONTROL     equ      018h
INT1_CONTROL     equ      01Ah
INT2_CONTROL     equ      01Ch
INT3_CONTROL     equ      01Eh


TIMERS           equ      030h
;-----------------------------
TIMER0_COUNT     equ      030h
TIMER0_COMPAREA  equ      032h
TIMER0_COMPAREB  equ      034h
TIMER0_CONTROL   equ      036h
TIMER1_COUNT     equ      038h
TIMER1_COMPAREA  equ      03Ah
TIMER1_COMPAREB  equ      03Ch
TIMER1_CONTROL   equ      03Eh
TIMER2_COUNT     equ      040h
TIMER2_COMPAREA  equ      042h
TIMER2_CONTROL   equ      046h


PORT             equ      050h
;-----------------------------
PORT1_DIR        equ      050h
PORT1_PIN        equ      052h
PORT1_CONTROL    equ      054h
PORT1_LATCH      equ      056h
PORT2_DIR        equ      058h
PORT2_PIN        equ      05Ah
PORT2_CONTROL    equ      05Ch
PORT2_LATCH      equ      05Eh


SERIAL           equ      060h
;-----------------------------
SERIAL0_BAUD     equ      060h
SERIAL0_COUNT    equ      062h
SERIAL0_CONTROL  equ      064h
SERIAL0_STATUS   equ      066h
SERIAL0_RBUF     equ      068h
SERIAL0_TBUF     equ      06Ah
SERIAL1_BAUD     equ      070h
SERIAL1_COUNT    equ      072h
SERIAL1_CONTROL  equ      074h
SERIAL1_STATUS   equ      076h
SERIAL1_RBUF     equ      078h
SERIAL1_TBUF     equ      07Ah


CHIP_SELECT      equ      080h
;-----------------------------
GCS0_START       equ      080h
GCS0_STOP        equ      082h
GCS1_START       equ      084h
GCS1_STOP        equ      086h
GCS2_START       equ      088h
GCS2_STOP        equ      08Ah
GCS3_START       equ      08Ch
GCS3_STOP        equ      08Eh
GCS4_START       equ      090h
GCS4_STOP        equ      092h
GCS5_START       equ      094h
GCS5_STOP        equ      096h
GCS6_START       equ      098h
GCS6_STOP        equ      09Ah
GCS7_START       equ      09Ch
GCS7_STOP        equ      09Eh
LCS_START        equ      0A0h
LCS_STOP         equ      0A2h
UCS_START        equ      0A4h
UCS_STOP         equ      0A6h
RELOCATION       equ      0A8h


REFRESH_ETC      equ      0B0h
;-----------------------------
REFRESH_BASE     equ      0B0h
REFRESH_TIME     equ      0B2h
REFRESH_CONTROL  equ      0B4h
REFRESH_ADDRESS  equ      0B6h
POWER_CONTROL    equ      0B8h
STEP_ID          equ      0BCh
```

```
/* interrupt control registers */

/* EOI register (0x02) */
#define INT_REQ_VEC_TYPE     0x001F   /* 0-4 */
#define NSPEC_EOI_ENABLE     0x8000

/* 0x04, 0x06 - bottom bits are the same and we have */
#define IREQ_PRESENT         0x8000

/* 0x08, 0x0c, 0x0e */
#define TIMER                0x0001

/* Chip select units - 0x80 - 0xA7 (by 4s) */
#define ADDRESS_MASK         0xFFC0u
#define ADDRESS_SHIFT          0x04   /* mask = (address>>4)&0xFFC0 */
#define WAIT_STATES            0x0F
#define SELECT_ENABLE          0x08
#define IGNORE_TOP             0x04
#define IO_MEM_SELECT          0x02
#define EXTERN_READY           0x01

/* serial chips */

#define INTERNAL_CLOCK       0x8000   /* in Baud rate count SERIALx_BAUD */

#define BREAK_0              0x0200   /* in the status register SERIALx_STATUS */

#define BREAK_1              0x0100
#define PARITY_ERROR         0x0080
#define REC_INT_REQ          0x0040
#define TX_INT_REQ           0x0020
#define FRAMING_ERROR        0x0010
#define TX_EMPTY             0x0008
#define OVERRUN_ERROR        0x0004
#define CTS_VALUE            0x0002

#define SEND_BREAK           0x0100   /* in control register SERIALx_CONTROL */
#define NINTH_DATA_BIT       0x0080
#define CTS_ENABLE           0x0040
#define RECEIVE_ENABLE       0x0020
#define EVEN_PARITY          0x0010
#define USE_PARITY           0x0008
#define MODE                 0x0007   /* 0 to 4 only */

// timer control

#define ENABLE_TIMER         0xC000
#define DISABLE_TIMER        0x4000
#define GENERATE_INT         0x2000
#define USING_COMPAREA       0x0000
#define USING_COMPAREB       0x1000
#define MAX_COUNT_OCCURED    0x0020
#define COUNT_TIN_EDGES      0x0004
#define COUNT_INTERNAL       0x0000
#define RETRIGGER_GATE       0x0000
#define RETRIGGER_COUNT      0x0010
#define PRESCALE_BY4         0x0000
#define PRESCALE_TIMER2      0x0008
#define ALTERNATE_REGS       0x0002
#define ONE_SHOT             0x0000
#define RUN_CONTINUOUS       0x0001
```

```
; interrupt control registers

; EOI register (0x02)
INT_REQ_VEC_TYPE     equ 0001Fh ; 0-4
NSPEC_EOI_ENABLE     equ 08000h

; 0x04, 0x06 - bottom bits are the same and we have
IREQ_PRESENT         equ 08000h

; 0x08, 0x0c, 0x0e
TIMER                equ 00001h

; Chip select units - 0x80 - 0xA7 (by 4s)
ADDRESS_MASK         equ OFFC0h
ADDRESS_SHIFT        equ 004h  ; mask = (address>>4)&0xFFC0
WAIT_STATES          equ 00Fh
SELECT_ENABLE        equ 008h
IGNORE_TOP           equ 004h
IO_MEM_SELECT        equ 002h
EXTERN_READY         equ 001h


; serial chips

INTERNAL_CLOCK       equ 8000h ; in Baud rate count SERIALx_BAUD

BREAK_0              equ 0200h ; in the status register SERIALx_STATUS
BREAK_1              equ 0100h
PARITY_ERROR         equ 0080h
REC_INT_REQ          equ 0040h
TX_INT_REQ           equ 0020h
FRAMING_ERROR        equ 0010h
TX_EMPTY             equ 0008h
OVERRUN_ERROR        equ 0004h
CTS_VALUE            equ 0002h

SEND_BREAK           equ 0100h ; in the control register SERIALx_CONTROL
NINTH_DATA_BIT       equ 0080h
CTS_ENABLE           equ 0040h
RECEIVE_ENABLE       equ 0020h
EVEN_PARITY          equ 0010h
USE_PARITY           equ 0008h
MODE                 equ 0007h ; 0 to 4 only

; timer control

ENABLE_TIMER       equ 0C000h
DISABLE_TIMER      equ  4000h
GENERATE_INT       equ  2000h
USING_COMPAREA     equ  0000h
USING_COMPAREB     equ  1000h
MAX_COUNT_OCCURED  equ  0020h
COUNT_TIN_EDGES    equ  0004h
COUNT_INTERNAL     equ  0000h
RETRIGGER_GATE     equ  0000h
RETRIGGER_COUNT    equ  0010h
PRESCALE_BY4       equ  0000h
PRESCALE_TIMER2    equ  0008h
ALTERNATE_REGS     equ  0002h
ONE_SHOT           equ  0000h
RUN_CONTINUOUS     equ  0001h
```

```
#define BAUD_INTERNAL_COMPARE(X) ((unsigned short int)((CPU_CLOCK/(8L*(X)))-1L))


#define S16450_COMPARE  3L
#define S16450_CLOCK    ((CPU_CLOCK)/(8L*S16450_COMPARE))

#define BAUD_16450_DIVISOR(X) ((unsigned short int)(S16450_CLOCK/(16L*(X))))

#define RADIO           0
#define HOST            1
```

```
#define MASTER_CLOCK 11059200
#define MILLISECOND  1382
#define FIVE_MSEC    6912

#define SYSTEM_CLOCK MASTER_CLOCK/2
#define TIMER_CLOCK  MASTER_CLOCK/8
#define SERIAL_CLOCK MASTER_CLOCK/4
```

```
if MMPC EQ 1
MASTER_CLOCK equ 14745600
MILLISECOND  equ 1843
FIVE_MSEC    equ 9216
else
if MMPC EQ 2
MASTER_CLOCK equ 11059200
MILLISECOND  equ 1382
FIVE_MSEC    equ 6912
else
if MPC EQ 2
MASTER_CLOCK equ 32000000
MILLISECOND  equ 4000
FIVE_MSEC    equ 20000
else
MASTER_CLOCK equ 24576000
MILLISECOND  equ 3072
FIVE_MSEC    equ 15360
endif
endif
endif

SYSTEM_CLOCK equ MASTER_CLOCK/2
TIMER_CLOCK  equ MASTER_CLOCK/8
SERIAL_CLOCK equ MASTER_CLOCK/4
```

File: include\SYSTEM.INC

```
enum
{
    LINE_STATE_MACHINE,
    MODEM_STATE_MACHINE,
    MAPP_STATE_MACHINE,
    MOBITEX_STATE_MACHINE,
    DTMF_STATE_MACHINE,
    STATE_MACHINE_MAX
};

enum
{
    BAD_STATE_MACHINE,
    SIGNALS_FULL,
    SIGNAL_NONE,
    SIGNAL_ON_HOOK,
    SIGNAL_OFF_HOOK,
    SIGNAL_RADIO_ERROR,
    SIGNAL_RADIO_NO_ERROR,
    SIGNAL_MODEM_CONNECTED,
    SIGNAL_MODEM_DISCONNECTED,
    SIGNAL_AUTO_DIAL_THRU_TIMEOUT,
    SIGNAL_MODEM_TURN_OFF_TIMEOUT,
    SIGNAL_DISCONNECT_MODEM,
    SIGNAL_DTMF_DIALING_DETECTED,
    SIGNAL_START_MODEM_CONNECT,
    SIGNAL_START_MAPP_PROCESS,
    SIGNAL_MAPP_FRAME_RECEIVED,
    SIGNAL_DTMF_CLEAR,
    SIGNAL_CANCEL_MAPP_PROCESS,
    SIGNAL_BREAK_MAPP,
    SIGNAL_DIAL_BACKUP,
    SIGNAL_DIAL_DONE,
    SIGNAL_DTMF_QUIET_TIMEOUT,
    SIGNAL_MAPP_ENQ_TIMEOUT,
    SIGNAL_MAPP_ACK_TIMEOUT,
    SIGNAL_MAPP_RX_LIMIT_TIMEOUT,
    SIGNAL_MAPP_RESPONSE_TIMEOUT,
    SIGNAL_MAPP_TX_DONE,
    SIGNAL_MAPP_TX_FAILED,
    SIGNAL_MAPP_TX_UNDELIVERABLE,
    SIGNAL_MAPP_RX_REPLY,
    SIGNAL_MODEM_COUNTDOWN,
    SIGNAL_MODEM_DEBOUNCER,
    SIGNAL_MOBITEX_CANCEL,
    SIGNAL_MOBITEX_TX_REQUESTED,
    SIGNAL_MOBITEX_RX_MPAK,
    SIGNAL_MOBITEX_SENT_TO_NET,
    SIGNAL_MOBITEX_TX_FAILED,
    SIGNAL_COUNT
};

#ifdef DEFINE_GLOBALS
char *sSignalNames[SIGNAL_COUNT] =
{
    "BAD_STATE_MACHINE",
    "SIGNALS_FULL",
```

File: include\TESTING.H

```
    "NONE",
    "ON_HOOK",
    "OFF_HOOK",
    "RADIO_ERROR",
    "RADIO_NO_ERROR",
    "MODEM_CONNECTED",
    "MODEM_DISCONNECTED",
    "AUTO_DIAL_THRU_TIMEOUT",
    "MODEM_TURN_OFF_TIMEOUT",
    "DISCONNECT_MODEM",
    "DTMF_DIALING_DETECTED",
    "START_MODEM_CONNECT",
    "START_MAPP_PROCESS",
    "MAPP_FRAME_RECEIVED",
    "DTMF_CLEAR",
    "CANCEL_MAPP_PROCESS",
    "BREAK_MAPP",
    "DIAL_BACKUP",
    "DIAL_DONE",
    "DTMF_QUIET_TIMEOUT",
    "MAPP_ENQ_TIMEOUT",
    "MAPP_ACK_TIMEOUT",
    "MAPP_RX_LIMIT_TIMEOUT",
    "MAPP_RESPONSE_TIMEOUT",
    "MAPP_TX_DONE",
    "MAPP_TX_FAILED",
    "MAPP_TX_UNDELIVERABLE",
    "MAPP_RX_REPLY",
    "MODEM_COUNTDOWN",
    "MODEM_DEBOUNCER",
    "MOBITEX_CANCEL",
    "MOBITEX_TX_REQUESTED",
    "MOBITEX_RX_MPAK",
    "MOBITEX_SENT_TO_NET",
    "MOBITEX_TX_FAILED"
};
#else
extern char *sSignalNames[SIGNAL_COUNT];
#endif

enum
{
    AUTO_DIAL_THRU_TIMER,
    MODEM_TURN_OFF_TIMER,

};

void vSendString(char *s);
void vSendBlock( char *sBlock, int nSize );

int mlsprintf( char *str, char *fmt, ... );
boolean fGotMPCdialOut(void);

int nSendSignal(int nSignal, int nStateMachine);
int nGetSignalWaiting( int nStateMachine );
void vSignalInitialize(void);
```

```
void vSetCountdownTimer(int nTimer,int nMilliseconds,int nSignal,int nStateMachi
ne);
void vSetRelay(boolean fEnergize);
boolean fTestAndClearBoolean( boolean *pfFlag );
void vSetRelay(boolean fEnergize);

int nPowerOffRequested(void);
void vPowerDownComplete(void);
void vSetupPowerdown(void);

void vTimerInitialize(void);

void vWaitForTXdone(void);

void vSetAutoDialThrough( unsigned int uNewSetting );
unsigned int uGetAutoDialThrough( void );
#define MAX_AUTO_DIAL_THROUGH   130     // 65000 mSec in 500 mSec units

unsigned int uGetMODEMprotocol( void );
void vSetMODEMprotocol( unsigned int uNewProtocol );
enum
{
    MODEM_BELL_212A,
    MODEM_BELL_103,
    MODEM_CCITT_V22,
    MODEM_CCITT_V21,
    MODEM_BELL_AUTOBAUD,
    MODEM_CCITT_AUTOBAUD,
    MODEM_PROTOCOL_MAX
};

void vMODEMinitialize(void);
void vRunMODEMstateMachine(void);
void vMODEMoff(void);
void vMODEMtiming(void);

void vInitializeTestSystem(void);
int nRXserialChar( void );

void vDTMFinitialize(void);
void vRunDTMFstateMachine(void);
void vDTMFtiming(void);
MAN mGetDTMFmanTranslation(void);
void vGetDTMFphoneTablesFromEEPROM(void);
void vSetDTMFdefaultsInEEPROM(void);

int ML1installAccessLayer( void );

void vSimulate188reset(void);

void _far Onboard_async_channel_setup( unsigned short int baudCompare );

boolean fTestAndClearBoolean( boolean *pfFlag );

void vRunLINEstateMachine( void );
void vLINEinitialize( void );
```

File: include\TESTING.H

```
extern byte ledTranslate[16];

extern volatile unsigned int uStateMachineTick;
extern char sDisplayBuf[256];

#define LEDFIX( x ) ledTranslate[((x>>4)&0x000F)]

#define RX_OVERFLOW 1
#define TX_DONE     2
#define RX_GOT_CHAR 4

#define TIMER_DURATION  FIVE_MSEC
#define MS_TO_TICKS(X)  (((X)+2)/5u)
#define PERCENTAGE(X,Y) ((((X)*(Y))+50)/100)

#define FAST_TIMING     1u
#define SLOW_TIMING     5u

unsigned readEEPROM( int location );
int writeEEPROM( int location, unsigned data );

void vMOBITEXinitialize(void);
void vMOBITEXtiming(void);
void vSendMOBITEXdata(char *sMAPPrequest,int nMAPPrequestSize);
int  nGetMOBITEXrxPacket(char *sMAPPresponse);
void vRunMOBITEXstateMachine(void);

void vMAPPinitialize(void);
void vMAPPtiming(void);
int  nIsMAPPframe( char *sPacket, int nLength );
void vRunMAPPstateMachine(void);

void vBug(int x);
#define BUG_OUT(X) vBug(X)

void vSendMODEMblock(unsigned char *sBlock, int nBlockSize);
int nGetMODEMchar( void );
void vLINEtiming(void);

void vSetParity(unsigned char *pBlock, int nSize);

int nCharTimeX10(void);
```

```
boolean ATwaiting( void );
boolean NETwaiting( void );
boolean StopCallLater( int sig );
char GetATchar( void );
int GetNETchar( void );
int AllocateCallLater( void (*his_routine)() );
int StartCallLater( int sig,int howlong,... );
int StateCallLater( int sig );
int find_signature( void );
int getdecimal( int low,int high );
int getdigit( int low,int high );
int mlsprintf( char *str, char *fmt, ... );
int mlslprintf( char *str, int maxsize, char *fmt, ... );
long CallLaterTimer( int handle,int activity );
short PauseCallLater( int sig );
short RestartCallLater( int sig );
short ResumeCallLater( int sig );
void *ml_malloc( unsigned int size, Tmempool pool );
void Dbg_printf( void *format,... );
boolean FlushBuff( void );
void FreeCallLater( int sig );
void PauseSysCallLater( void );
void PutATchar( char outgoing );
boolean PutNETbuff( char outgoing );
void ResumeSysCallLater( void );
void autobaud( void );
void dbg_dec( unsigned long int_num );
void dbg_hex( unsigned long hex_num );
void getATbuff( int nMaxSize );
void ml_free( void *pointer );
void put_s( char _far *str );
void putcrlf( void );
void putdec( unsigned int numb );
void puthex( unsigned char numb );
void sendResultCode( int error_code );
void sendText( char *string );
boolean fNETbuffFull(void);
int nPowerOffRequested(void);
```

File: include\UTILS.HPC

What is claimed is:

1. A method for dual use of radio communication and telephone communication for evaluating a transaction request that includes the transmission and verification of coded data comprising the steps of:

a) obtaining one or more external encoded data signals containing information from at least one encoded data signal source to evaluate the transaction request;

b) determining from said external encoded data signals whether the transaction request is to be performed through use of a radio frequency data communication network or a telephone communication network; and c) transmitting the information contained in said external encoded data signals either by radio communication or telephone communication according to the results of said determining step.

2. A system for transmission and reception of transaction data including the transmission and verification of coded data over at least one of a plurality of communication networks comprising:

a) at least one encoded data signal source providing at least a portion of said transaction data;

b) a translation and connection device comprising means for combining, processing, and emitting information received from each encoded data signal source and further comprising means for processing a transaction in accordance with said transaction data and an authorization signal, said translation and connection device determining from at least a portion of said information received from each encoded data signal source, which of the plurality of communication networks is to be used to process the transaction; and c) a host device operatively connected by radio communication to said translation and connection device for receiving and interpreting said transaction data and for transmitting said authorization signal to said translation and connection device.

3. The method of claim 1, wherein said determining step further comprises the steps of:

a) generating a destination code that includes the telephone number of a transaction authorization center and one or more additional telephone compatible data characters; and b) monitoring said destination code for the presence of said telephone compatible data characters signifying whether evaluation and authorization of the transaction request is to be accomplished through radio communication or telephone communication.

4. The method of claim 3, wherein said destination code includes a data communication identification number, designating either radio communication or telephone communication, set off between delimiter characters.

5. The method of claim 3, wherein said destination code includes a delay character designating either radio communication or telephone communication.

6. The method of claim 1, wherein the determining step is accomplished through use of a preprogrammed point of sale credit card reader.

7. The method of claim 3, wherein the generation of said destination code is accomplished through use of a preprogrammed point of sale credit card reader.

* * * * *

UNITED STATES PATENT AND TRADEMARK OFFICE

CERTIFICATE OF CORRECTION

PATENT NO. : 5,444,763
APPLICATION NO. : 08/078418
DATED : August 22, 1995
INVENTOR(S) : Lazaridis et al.

It is certified that error appears in the above-identified patent and that said Letters Patent is hereby corrected as shown below:

On the Title Page Item (22)

Change "[22] Filed: Jun. 27, 1993" to -- [22] Filed: Jun. 17, 1993 --

Signed and Sealed this

Seventeenth Day of November, 2009

David J. Kappos

David J. Kappos
*Director of the United States Patent and Trademark Office*